US006688848B2

United States Patent

(12) United States Patent
Ohtsuka

(10) Patent No.: US 6,688,848 B2
(45) Date of Patent: Feb. 10, 2004

(54) PROPELLER FAN, MOLDING DIE FOR PROPELLER FAN, AND FLUID FEEDING DEVICE

(75) Inventor: Masaki Ohtsuka, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 10/070,155

(22) PCT Filed: Jul. 3, 2001

(86) PCT No.: PCT/JP01/05777

§ 371 (c)(1),
(2), (4) Date: Jun. 17, 2002

(87) PCT Pub. No.: WO02/02950

PCT Pub. Date: Jan. 10, 2002

(65) Prior Publication Data

US 2003/0103846 A1 Jun. 5, 2003

(30) Foreign Application Priority Data

| | | | |
|---|---|---|---|
| Jul. 4, 2000 | (JP) | ........................................ | 2000-202717 |
| Aug. 11, 2000 | (JP) | ........................................ | 2000-244268 |
| Aug. 28, 2000 | (JP) | ........................................ | 2000-256867 |

(51) Int. Cl.[7] ................................................ F04D 29/38

(52) U.S. Cl. .................................. 416/189; 416/DIG. 2

(58) Field of Search ................................ 416/189, 239, 416/241 A, DIG. 2; 269/299

(56) References Cited

U.S. PATENT DOCUMENTS

| | | | | |
|---|---|---|---|---|
| 4,569,632 A | * | 2/1986 | Gray, III ..................... | 416/189 |
| 5,961,289 A | * | 10/1999 | Lohmann .................... | 416/189 |
| 6,287,078 B1 | * | 9/2001 | Min et al. ................... | 416/189 |

FOREIGN PATENT DOCUMENTS

| | | |
|---|---|---|
| JP | 61-65098 A | 4/1986 |
| JP | 10-15793 A | 6/1998 |
| JP | 10-159795 A | 6/1998 |

* cited by examiner

*Primary Examiner*—Edward K. Look
*Assistant Examiner*—Igor Kershteyn
(74) *Attorney, Agent, or Firm*—Birch, Stewart, Kolasch & Birch, LLP

(57) ABSTRACT

In a propeller fan (1) according to the present invention, when coordinates in a cylindrical coordinate system having a z axis as a rotation axis of the propeller fan (1) are (r, θ, z), a curved shape defined by prescribed r, θ and z coordinate values is determined as a base shape of a surface of a blade (3) of the propeller fan (1), and the surface of the blade (3) of the propeller fan (1) is configured by a curved surface obtained by enlarging or reducing the base shape in at least one of r, θ and z directions.

45 Claims, 30 Drawing Sheets

PROPELLER FAN, MOLDING DIE FOR PROPELLER FAN, AND FLUID FEEDING DEVICE

This application is the national phase under 35 U.S.C. §371 of PCT International Application No. PCT/JP01/05777 which has an International filing date of Jul. 3, 2001, which designated the United States of America.

TECHNICAL FIELD

The present invention relates to a propeller fan constituting a blower together with a drive motor; a molding die for the propeller fan; and a fluid feeding device provided with the blower, such as an outside unit of an air conditioner, an air cleaner, a humidifier, a dehumidifier, an electric fan, a fan heater, a cooling device, and a ventilator.

BACKGROUND ART

Conventionally, a propeller fan is used in a blower or a cooler. For example, the outside unit of an air conditioner is provided with a propeller fan for cooling.

The propeller fan for cooling has conventionally had a problem such that it produces high noise at rotation and thus is inefficient. Airflow may be reduced to lower the noise, which then presents a problem of insufficient achievement of cooling effect.

Moreover, there also was a problem of heavy weight, increasing not only the cost of manufacturing, but also the load applied to a drive motor at startup of the blower. Thus, the weight of the propeller fan may be made lighter, simply, by reducing the thickness of a blade. However, when the thickness of the blade is simply reduced, flow tends to separate from the wing, causing a problem such that, in addition to that the noise is increased, the rigidity of the blade is lowered, a centrifugal force deforms the blade at the time of operation of the blower, which reduces the height of the fan in the axial direction, and thus the airflow is degraded.

Moreover, there also was a problem such that the strength in the vicinity of a root of the blade is lower, causing the fan to rotate at a high speed when windblast is applied to the blower, and the centrifugal force therefrom damages the fan. Here, as a simple manner, the thickness of the blade root may partially be increased in order to increase the strength of the propeller fan. However, when the thickness of a part of the blade root is simply increased, cooling time at fabrication is increased to a large degree, raising the cost.

DISCLOSURE OF THE INVENTION

The present invention was made in view of the problems in the conventional example above, and an object of the present invention is to provide a propeller fan that can realize high airflow, high efficiency and low noise; a die for molding the same; and a fluid feeding device that can realize high airflow, high efficiency and low noise.

Another object of the present invention is to provide a propeller fan that can realize high airflow, high efficiency, low noise, light weight and low cost; a die for molding the same; and a fluid feeding device that can realize high airflow, high efficiency, low noise, light weight and low cost.

A further object of the present invention is to provide a propeller fan that can realize high airflow, high efficiency, low noise, light weight, low cost and increased strength; a die for molding the same; and a fluid feeding device that can realize high airflow, high efficiency, low noise, light weight, low cost and increased strength.

In a propeller fan according to the present invention, when coordinates in a cylindrical coordinate system having a z axis as a rotation axis of the propeller fan are (r, θ, z), a curved shape defined by a r coordinate value, a θ coordinate value and a z coordinate value indicated in Tables 3 and 4 below is determined as a base shape of the blade surface of the propeller fan, and the surface of the blade of the propeller fan is configured by a curved surface obtained by enlarging or reducing the base shape in at least one of r, θ and z directions.

TABLE 3

| | θ | | | | | | | | | | | |
|---|---|---|---|---|---|---|---|---|---|---|---|---|
| r | 0.042 | 0.083 | 0.125 | 0.167 | 0.208 | 0.25 | 0.292 | 0.333 | 0.375 | 0.417 | 0.458 | 0.5 |
| 0.4 | | 0.145 | 0.181 | 0.214 | 0.246 | 0.276 | 0.304 | 0.329 | 0.353 | 0.375 | 0.395 | 0.414 |
| | | 0.137 | 0.164 | 0.190 | 0.214 | 0.237 | 0.261 | 0.284 | 0.307 | 0.329 | 0.350 | 0.371 |
| 0.45 | 0.085 | 0.134 | 0.176 | 0.215 | 0.249 | 0.280 | 0.310 | 0.337 | 0.363 | 0.388 | 0.412 | 0.433 |
| | 0.080 | 0.118 | 0.152 | 0.183 | 0.211 | 0.239 | 0.265 | 0.291 | 0.317 | 0.341 | 0.365 | 0.387 |
| 0.5 | 0.074 | 0.124 | 0.168 | 0.209 | 0.246 | 0.282 | 0.315 | 0.345 | 0.375 | 0.402 | 0.428 | 0.453 |
| | 0.061 | 0.105 | 0.144 | 0.179 | 0.211 | 0.242 | 0.271 | 0.300 | 0.328 | 0.355 | 0.381 | 0.405 |
| 0.55 | 0.044 | 0.102 | 0.153 | 0.200 | 0.242 | 0.282 | 0.319 | 0.354 | 0.386 | 0.417 | 0.445 | 0.473 |
| | 0.036 | 0.087 | 0.133 | 0.174 | 0.211 | 0.246 | 0.279 | 0.310 | 0.340 | 0.369 | 0.397 | 0.424 |
| 0.6 | | 0.077 | 0.137 | 0.190 | 0.238 | 0.283 | 0.325 | 0.364 | 0.399 | 0.433 | 0.464 | 0.494 |
| | | 0.065 | 0.120 | 0.168 | 0.211 | 0.250 | 0.286 | 0.320 | 0.352 | 0.384 | 0.414 | 0.443 |
| 0.65 | | 0.050 | 0.119 | 0.180 | 0.234 | 0.285 | 0.331 | 0.374 | 0.413 | 0.450 | 0.484 | 0.517 |
| | | 0.043 | 0.105 | 0.160 | 0.210 | 0.254 | 0.295 | 0.332 | 0.367 | 0.400 | 0.433 | 0.464 |
| 0.7 | | | 0.096 | 0.167 | 0.228 | 0.283 | 0.333 | 0.379 | 0.422 | 0.462 | 0.501 | 0.538 |
| | | | 0.087 | 0.152 | 0.210 | 0.261 | 0.307 | 0.349 | 0.387 | 0.423 | 0.457 | 0.489 |
| 0.75 | | | 0.072 | 0.152 | 0.222 | 0.284 | 0.339 | 0.389 | 0.435 | 0.478 | 0.519 | 0.558 |
| | | | 0.065 | 0.137 | 0.201 | 0.258 | 0.308 | 0.354 | 0.395 | 0.435 | 0.473 | 0.510 |
| 0.8 | | | 0.043 | 0.133 | 0.212 | 0.282 | 0.346 | 0.402 | 0.452 | 0.498 | 0.541 | 0.582 |
| | | | 0.040 | 0.119 | 0.191 | 0.255 | 0.311 | 0.361 | 0.408 | 0.450 | 0.490 | 0.529 |
| 0.85 | | | | 0.114 | 0.203 | 0.282 | 0.350 | 0.410 | 0.465 | 0.514 | 0.560 | 0.604 |
| | | | | 0.103 | 0.183 | 0.252 | 0.313 | 0.369 | 0.419 | 0.466 | 0.510 | 0.552 |
| 0.9 | | | | 0.093 | 0.193 | 0.278 | 0.351 | 0.415 | 0.473 | 0.526 | 0.575 | 0.621 |
| | | | | 0.086 | 0.174 | 0.250 | 0.317 | 0.376 | 0.431 | 0.481 | 0.528 | 0.572 |
| 0.95 | | | | | 0.180 | 0.274 | 0.352 | 0.420 | 0.480 | 0.535 | 0.586 | 0.635 |
| | | | | | 0.165 | 0.251 | 0.324 | 0.387 | 0.444 | 0.496 | 0.546 | 0.594 |

TABLE 3-continued

| | θ | | | | | | | | | | | |
|---|---|---|---|---|---|---|---|---|---|---|---|---|
| r | 0.542 | 0.583 | 0.625 | 0.667 | 0.708 | 0.75 | 0.792 | 0.833 | 0.875 | 0.917 | 0.958 | 1 |
| 0.4 | 0.429 | 0.438 | | | | | | | | | | |
| | 0.392 | 0.414 | | | | | | | | | | |
| 0.45 | 0.452 | 0.466 | 0.474 | | | | | | | | | |
| | 0.409 | 0.430 | 0.453 | | | | | | | | | |
| 0.5 | 0.475 | 0.494 | 0.508 | 0.515 | | | | | | | | |
| | 0.428 | 0.450 | 0.473 | 0.498 | | | | | | | | |
| 0.55 | 0.498 | 0.521 | 0.540 | 0.554 | 0.559 | | | | | | | |
| | 0.449 | 0.473 | 0.497 | 0.522 | 0.549 | | | | | | | |
| 0.6 | 0.522 | 0.549 | 0.573 | 0.593 | 0.606 | | | | | | | |
| | 0.471 | 0.498 | 0.524 | 0.550 | 0.577 | | | | | | | |
| 0.65 | 0.547 | 0.577 | 0.605 | 0.630 | 0.650 | 0.663 | | | | | | |
| | 0.494 | 0.524 | 0.552 | 0.580 | 0.607 | 0.637 | | | | | | |
| 0.7 | 0.572 | 0.604 | 0.634 | 0.662 | 0.688 | 0.709 | 0.723 | | | | | |
| | 0.521 | 0.551 | 0.580 | 0.608 | 0.636 | 0.664 | 0.696 | | | | | |
| 0.75 | 0.595 | 0.629 | 0.662 | 0.692 | 0.720 | 0.746 | 0.769 | 0.784 | | | | |
| | 0.544 | 0.577 | 0.608 | 0.638 | 0.666 | 0.693 | 0.722 | 0.753 | | | | |
| 0.8 | 0.621 | 0.659 | 0.694 | 0.726 | 0.756 | 0.785 | 0.809 | 0.829 | 0.845 | | | |
| | 0.567 | 0.604 | 0.638 | 0.670 | 0.700 | 0.729 | 0.754 | 0.779 | 0.809 | | | |
| 0.85 | 0.646 | 0.686 | 0.725 | 0.761 | 0.793 | 0.821 | 0.848 | 0.873 | 0.895 | 0.907 | 0.913 | |
| | 0.593 | 0.632 | 0.670 | 0.705 | 0.736 | 0.764 | 0.790 | 0.816 | 0.840 | 0.864 | 0.893 | |
| 0.9 | 0.666 | 0.709 | 0.751 | 0.791 | 0.826 | 0.858 | 0.885 | 0.908 | 0.930 | 0.949 | 0.963 | 0.969 |
| | 0.615 | 0.657 | 0.699 | 0.737 | 0.772 | 0.802 | 0.829 | 0.852 | 0.875 | 0.897 | 0.919 | 0.943 |
| 0.95 | 0.681 | 0.726 | 0.769 | 0.811 | 0.850 | 0.884 | 0.914 | 0.939 | 0.960 | 0.976 | 0.990 | 0.997 |
| | 0.640 | 0.685 | 0.728 | 0.769 | 0.807 | 0.840 | 0.869 | 0.894 | 0.916 | 0.936 | 0.957 | 0.979 |

BOSS RATIO ν = 0.35

TABLE 4

| r | θ | z |
|---|---|---|
| 0.383 | 0.641 | 0.453 |
| | | 0.446 |
| 0.466 | 0.660 | 0.487 |
| | | 0.480 |
| 0.569 | 0.724 | 0.577 |
| | | 0.571 |
| 0.697 | 0.814 | 0.721 |
| | | 0.714 |
| 0.859 | 0.984 | 0.923 |
| | | 0.916 |
| 0.924 | 1.034 | 0.984 |
| | | 0.978 |
| 0.972 | 0.981 | 0.998 |
| | | 0.991 |
| 0.993 | 0.910 | 0.985 |
| | | 0.977 |
| 1.000 | 0.838 | 0.953 |
| | | 0.946 |
| 1.000 | 0.757 | 0.900 |
| | | 0.893 |
| 1.000 | 0.678 | 0.829 |
| | | 0.823 |
| 1.000 | 0.539 | 0.680 |
| | | 0.674 |
| 1.000 | 0.403 | 0.515 |
| | | 0.509 |
| 1.000 | 0.334 | 0.415 |
| | | 0.411 |
| 1.000 | 0.260 | 0.279 |
| | | 0.275 |
| 1.000 | 0.209 | 0.157 |
| | | 0.154 |
| 0.972 | 0.181 | 0.092 |
| | | 0.090 |
| 0.946 | 0.170 | 0.077 |
| | | 0.075 |
| 0.877 | 0.147 | 0.051 |
| | | 0.049 |
| 0.847 | 0.138 | 0.044 |
| | | 0.042 |
| 0.808 | 0.125 | 0.038 |
| | | 0.037 |
| 0.762 | 0.110 | 0.033 |
| | | 0.031 |
| 0.728 | 0.098 | 0.028 |
| | | 0.026 |
| 0.704 | 0.090 | 0.026 |
| | | 0.024 |
| 0.680 | 0.079 | 0.023 |
| | | 0.022 |
| 0.641 | 0.062 | 0.015 |
| | | 0.013 |
| 0.584 | 0.034 | 0.006 |
| | | 0.004 |
| 0.521 | 0.014 | 0.027 |
| | | 0.020 |

In Tables 3 and 4, r indicates a non-dimensional r coordinate in the radial direction in the cylindrical coordinate system having the z axis as the rotation axis of the propeller fan, θ indicates a non-dimensional θ coordinate in the circumferential direction in the cylindrical coordinate system having the z axis as the rotation axis of the propeller fan, and z indicates a non-dimensional z coordinate in the axial direction (the direction of height) in the cylindrical coordinate system having the z axis as the rotation axis of the propeller fan.

Moreover, the top of each column ($z_u$) indicates a coordinate value on a negative pressure side (suction side) of the propeller fan, whereas the bottom of each column ($z_d$) indicates a coordinate value on a positive pressure side (blowing side) thereof. Table 3 indicates a non-dimensional coordinate value of z where r is within the range of 0.4 to 0.95 and where θ is within the range of 0.042 to 1, and Table 4 indicates non-dimensional coordinate values of r, θ and z at an outer edge portion of a blade. It is noted that the contents of Table 1 are the same as those in Table 3, and the contents of Table 2 are the same as those in Table 4.

Furthermore, values within the range of ±5% of the coordinate values calculated by transformation formulas of the present invention should be interpreted as included in a range of error and equivalent to the coordinate values of the present invention. This means that the shape defined by the coordinate values within the range of ±5% of the coordinate values calculated by transformation formulas of the present invention should be interpreted as included in a technical range of the present invention.

In addition, the shape defined by coordinate values obtained by uniformly transforming coordinate values indicated in Tables 1 to 4 should also be interpreted as included within the range of equivalent to the base shape of the present invention.

In a die for molding a propeller fan according to one aspect of the present invention, the surface of a portion forming the surface of a blade of the propeller fan is configured by a curved surface obtained by enlarging or reducing the base shape in at least one of r, θ and z directions.

When the diameter of the propeller fan of the present invention is D, the height in the z direction which is the axial direction is h and the expansion angle of the blade is λ; r, θ, z coordinates $(r_1, \theta_1, z_{1u})$ that define the surface on the suction side of the blade and r, θ, z coordinates $(r_1, \theta_1, z_{1d})$ that define the surface on the blowing side of the blade are obtained by a transformation formula (7) below using three-dimensional coordinate values indicated in Tables 3 and 4. Then, the surface of the blade of the propeller fan is configured by a curved surface defined by the coordinates $(r_1, \theta_1, z_{1u})$ and the coordinates $(r_1, \theta_1, z_{1d})$.

It is noted that, in such a case that a transformation formula is used to change the form of the base shape, coordinate values obtained by uniformly transforming three-dimensional coordinate values indicated in Tables 3 and 4 may also be used to obtain the same result. Therefore, coordinate values calculated using such transformed coordinate values should also be interpreted as included in the technical range of the present invention, as long as the values can be calculated by respective transformation formulas below.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality; } b, d, f_u, f_d\text{: constant})\\
&\text{wherein}\\
&a = \frac{D}{2}\\
&b = 0\\
&c = \lambda\\
&d\text{: optional}\\
&h = e_u \geqq e_d\\
&f_u \geqq f_d\text{: optional}
\end{aligned}\right\} \quad (7)$$

In a die for molding a propeller fan according to another aspect of the present invention, the surface of a portion forming the surface of a blade of the propeller fan is configured by a curved surface defined by r, θ, z coordinates $(r_1, \theta_1, z_{1u})$ and r, θ, z coordinates $(r_1, \theta_1, z_{1d})$ obtained by the transformation formula (7) above.

When the diameter of the propeller fan is D, the height in the z direction which is the axial direction is h and the number of blades is n; r, θ, z coordinates $(r_1, \theta_1, z_{1u})$ that define the surface on the suction side of the blade and r, θ, z coordinates $(r_1, \theta_1, z_{1d})$ that define the surface on the blowing side of the blade are obtained by a transformation formula (8) below using three-dimensional coordinate values indicated in Tables 3 and 4. Then, the surface of the blade of the propeller fan is configured by a curved surface defined by the coordinates $(r_1, \theta_1, z_{1u})$ and the coordinates $(r_1, \theta_1, z_{1d})$.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality; } b, d, f_u, f_d\text{: constant})\\
&\text{wherein}\\
&a = \frac{D}{2}\\
&b = 0\\
&c = \frac{360}{n}\\
&d\text{: optional}\\
&h = e_u \geqq e_d\\
&f_u \geqq f_d\text{: optional}
\end{aligned}\right\} \quad (8)$$

In a die for molding a propeller fan according to a further aspect of the present invention, the surface of a portion forming the surface of a blade of the propeller fan is configured by a curved surface defined by the coordinates $(r_1, \theta_1, z_{1u})$ and the coordinates $(r_1, \theta_1, z_{1d})$ obtained by the transformation formula (8) above.

When the diameter of the propeller fan is D and the height in the z direction which is the axial direction is h; r, θ, z coordinates $(r_1, \theta_1, z_{1u})$ that define the surface on the suction side of the blade and r, θ, z coordinates $(r_1, \theta_1, z_{1d})$ that define the surface on the blowing side of the blade are obtained by a transformation formula (9) below using three-dimensional coordinate values indicated in Tables 3 and 4. Then, the surface of the blade of the propeller fan is configured by a curved surface defined by the coordinates $(r_1, \theta_1, z_{1u})$ and the coordinates $(r_1, \theta_1, z_{1d})$.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality; } b, d, f_u, f_d\text{: constant})\\
&\text{wherein}\\
&a = \frac{D}{2}\\
&b = 0\\
&c = \frac{2400}{7}\times\frac{h}{D}\\
&d\text{: optional}\\
&h = e_u \geqq e_d\\
&f_u \geqq f_d\text{: optional}
\end{aligned}\right\} \quad (9)$$

In a die for molding a propeller fan according to yet another aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (9) above.

When the diameter of the propeller fan is D, the boss ratio which is the ratio of the diameter of the propeller fan to that of a boss portion is v, the height in the z direction which is the axial direction is h, and the expansion angle of the blade is λ; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (10) below using three-dimensional coordinate values indicated in Tables 3 and 4. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

$$\left.\begin{array}{l} r_1 = a\times r + b \text{ (mm)} \\ \theta_1 = c\times\theta + d \text{ (deg)} \\ z_{1u} = e_u\times z_u + f_u \text{ (mm)} \\ z_{1d} = e_d\times z_d + f_d \text{ (mm)} \\ (a, c, e_u, e_d\text{: factor of proportionality, } b, d, f_u, f_d\text{: constant}) \\ a = \frac{10}{13}D(1-v) \\ b = -\frac{10}{13}D(1-v)\times 0.35 + \frac{vD}{2} \\ c = \lambda \\ d\text{: optional} \\ h = e_u \geqq e_d \\ f_u \geqq f_d\text{: optional} \end{array}\right\} \quad (10)$$

In a die for molding a propeller fan according to a further aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (10) above.

When the diameter of the propeller fan is D, the boss ratio which is the ratio of the diameter of the propeller fan to that of the boss portion is v, the height in the z direction which is the axial direction is h, and the number of blades is n; r, θ, z coordinates (($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (11) below using three-dimensional coordinate values indicated in Tables 3 and 4. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

$$\left.\begin{array}{l} r_1 = a\times r + b \text{ (mm)} \\ \theta_1 = c\times\theta + d \text{ (deg)} \\ z_{1u} = e_u\times z_u + f_u \text{ (mm)} \\ z_{1d} = e_d\times z_d + f_d \text{ (mm)} \\ (a, c, e_u, e_d\text{: factor of proportionality, } b, d, f_u, f_d\text{: constant}) \\ \text{wherein} \\ a = \frac{10}{13}D(1-v) \\ b = -\frac{10}{13}D(1-v)\times 0.35 + \frac{vD}{2} \\ c = \frac{360}{n} \\ d\text{:optional} \\ h = e_u \geqq e_d \\ f_u \geqq f_d\text{: optional} \end{array}\right\} \quad (11)$$

In a die for molding a propeller fan according to a yet further aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (11) above.

When the diameter of the propeller fan is D, the boss ratio which is the ratio of the diameter of the propeller fan to that of the boss portion is v, and the height in the z direction which is the axial direction is h; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (12) below using three-dimensional coordinate values indicated in Tables 3 and 4. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

$$\left.\begin{array}{l} r_1 = a\times r + b \text{ (mm)} \\ \theta_1 = c\times\theta + d \text{ (deg)} \\ z_{1u} = e_u\times z_u + f_u \text{ (mm)} \\ z_{1d} = e_d\times z_d + f_d \text{ (mm)} \\ (a, c, e_u, e_d\text{: factor of proportionality, } b, d, f_u, f_d\text{: constant}) \\ \text{wherein} \\ a = \frac{10}{13}D(1-v) \\ b = -\frac{10}{13}D(1-v)\times 0.35 + \frac{vD}{2} \\ c = \frac{2400}{7}\times\frac{h}{D} \\ d\text{:optional} \\ h = e_u \geqq e_d \\ f_u \geqq f_d\text{: optional} \end{array}\right\} \quad (12)$$

In a die for molding a propeller fan according to another aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (12) above.

A fluid feeding device of the present invention includes a blower having any one of the propeller fans described above and a drive motor driving the propeller fan.

In a propeller fan according to the present invention, when coordinates in a cylindrical coordinate system having a z axis as a rotation axis of the propeller fan are (r, θ, z), a curved shape defined by a r coordinate value, a θ coordinate value and a z coordinate value indicated in Table 2 below is determined as a base shape of the surface of a blade of the propeller fan, and the surface of the blade of the propeller fan is configured by a curved surface obtained by enlarging or reducing the base shape in at lease one of r, θ and z directions.

TABLE 102

| | θ | | | | | | | | | | | |
|---|---|---|---|---|---|---|---|---|---|---|---|---|
| r | 0.042 | 0.083 | 0.125 | 0.167 | 0.208 | 0.25 | 0.292 | 0.333 | 0.375 | 0.417 | 0.458 | 0.5 |
| 0.3 | | | 0.190 | 0.215 | 0.238 | 0.261 | 0.284 | 0.307 | 0.329 | 0.350 | 0.371 | 0.390 |
| | | | 0.168 | 0.184 | 0.201 | 0.218 | 0.234 | 0.252 | 0.270 | 0.288 | 0.308 | 0.327 |
| 0.35 | | 0.146 | 0.180 | 0.210 | 0.238 | 0.266 | 0.292 | 0.318 | 0.342 | 0.365 | 0.387 | 0.409 |
| | | 0.126 | 0.150 | 0.174 | 0.197 | 0.220 | 0.243 | 0.267 | 0.290 | 0.314 | 0.337 | 0.359 |
| 0.4 | 0.087 | 0.132 | 0.170 | 0.205 | 0.238 | 0.270 | 0.300 | 0.328 | 0.355 | 0.380 | 0.405 | 0.428 |
| | 0.076 | 0.110 | 0.142 | 0.172 | 0.201 | 0.229 | 0.257 | 0.284 | 0.310 | 0.336 | 0.361 | 0.384 |
| 0.45 | 0.069 | 0.116 | 0.160 | 0.201 | 0.238 | 0.274 | 0.307 | 0.339 | 0.368 | 0.396 | 0.423 | 0.448 |
| | 0.055 | 0.098 | 0.137 | 0.173 | 0.207 | 0.239 | 0.270 | 0.299 | 0.328 | 0.355 | 0.382 | 0.407 |
| 0.5 | 0.042 | 0.099 | 0.150 | 0.196 | 0.239 | 0.278 | 0.315 | 0.350 | 0.382 | 0.413 | 0.442 | 0.469 |
| | 0.033 | 0.084 | 0.131 | 0.173 | 0.212 | 0.247 | 0.280 | 0.312 | 0.343 | 0.373 | 0.401 | 0.428 |
| 0.55 | 0.010 | 0.079 | 0.138 | 0.190 | 0.238 | 0.282 | 0.292 | 0.360 | 0.395 | 0.428 | 0.459 | 0.489 |
| | 0.006 | 0.067 | 0.121 | 0.170 | 0.213 | 0.252 | 0.289 | 0.323 | 0.356 | 0.387 | 0.418 | 0.447 |
| 0.6 | | 0.056 | 0.122 | 0.180 | 0.233 | 0.281 | 0.326 | 0.367 | 0.405 | 0.441 | 0.475 | 0.507 |
| | | 0.046 | 0.107 | 0.162 | 0.211 | 0.256 | 0.296 | 0.334 | 0.369 | 0.403 | 0.435 | 0.466 |
| 0.65 | | 0.029 | 0.102 | 0.167 | 0.226 | 0.278 | 0.326 | 0.370 | 0.411 | 0.450 | 0.487 | 0.522 |
| | | 0.023 | 0.093 | 0.157 | 0.214 | 0.264 | 0.309 | 0.351 | 0.389 | 0.425 | 0.459 | 0.491 |
| 0.7 | | | 0.082 | 0.156 | 0.221 | 0.278 | 0.329 | 0.376 | 0.419 | 0.460 | 0.499 | 0.535 |
| | | | 0.074 | 0.147 | 0.210 | 0.266 | 0.316 | 0.361 | 0.403 | 0.443 | 0.480 | 0.515 |
| 0.75 | | | 0.058 | 0.139 | 0.212 | 0.276 | 0.333 | 0.385 | 0.431 | 0.474 | 0.515 | 0.554 |
| | | | 0.051 | 0.130 | 0.201 | 0.263 | 0.319 | 0.369 | 0.414 | 0.456 | 0.496 | 0.535 |
| 0.8 | | | | 0.123 | 0.204 | 0.275 | 0.338 | 0.394 | 0.444 | 0.491 | 0.534 | 0.575 |
| | | | | 0.114 | 0.192 | 0.261 | 0.322 | 0.376 | 0.426 | 0.472 | 0.515 | 0.556 |
| 0.85 | | | | 0.107 | 0.197 | 0.274 | 0.341 | 0.401 | 0.455 | 0.504 | 0.550 | 0.594 |
| | | | | 0.098 | 0.221 | 0.258 | 0.324 | 0.382 | 0.435 | 0.485 | 0.531 | 0.574 |
| 0.9 | | | | 0.087 | 0.187 | 0.271 | 0.343 | 0.406 | 0.463 | 0.515 | 0.564 | 0.610 |
| | | | | 0.081 | 0.176 | 0.256 | 0.326 | 0.388 | 0.444 | 0.496 | 0.545 | 0.591 |
| 0.95 | | | | | 0.175 | 0.268 | 0.346 | 0.413 | 0.472 | 0.526 | 0.577 | 0.625 |
| | | | | | 0.166 | 0.256 | 0.331 | 0.396 | 0.454 | 0.508 | 0.559 | 0.607 |

| | θ | | | | | | | | | | | |
|---|---|---|---|---|---|---|---|---|---|---|---|---|
| r | 0.542 | 0.583 | 0.625 | 0.667 | 0.708 | 0.75 | 0.792 | 0.833 | 0.875 | 0.917 | 0.958 | 1 |
| 0.3 | 0.409 | 0.427 | 0.443 | 0.456 | 0.465 | 0.468 | | | | | | |
| | 0.346 | 0.365 | 0.384 | 0.403 | 0.422 | 0.444 | | | | | | |
| 0.35 | 0.428 | 0.446 | 0.459 | 0.465 | | | | | | | | |
| | 0.381 | 0.402 | 0.423 | 0.445 | | | | | | | | |
| 0.4 | 0.449 | 0.466 | 0.479 | 0.485 | | | | | | | | |
| | 0.407 | 0.428 | 0.449 | 0.472 | | | | | | | | |
| 0.45 | 0.471 | 0.491 | 0.506 | 0.516 | | | | | | | | |
| | 0.430 | 0.453 | 0.475 | 0.497 | | | | | | | | |
| 0.5 | 0.494 | 0.518 | 0.538 | 0.553 | 0.560 | | | | | | | |
| | 0.453 | 0.477 | 0.501 | 0.524 | 0.549 | | | | | | | |
| 0.55 | 0.517 | 0.543 | 0.568 | 0.588 | 0.603 | | | | | | | |
| | 0.475 | 0.502 | 0.527 | 0.552 | 0.578 | | | | | | | |
| 0.6 | 0.537 | 0.566 | 0.594 | 0.618 | 0.639 | 0.654 | | | | | | |
| | 0.496 | 0.525 | 0.553 | 0.580 | 0.606 | 0.634 | | | | | | |
| 0.65 | 0.555 | 0.586 | 0.616 | 0.644 | 0.670 | 0.692 | 0.706 | | | | | |
| | 0.522 | 0.551 | 0.580 | 0.608 | 0.635 | 0.662 | 0.690 | | | | | |
| 0.7 | 0.571 | 0.605 | 0.637 | 0.668 | 0.696 | 0.723 | 0.745 | 0.760 | | | | |
| | 0.548 | 0.580 | 0.609 | 0.637 | 0.664 | 0.691 | 0.717 | 0.746 | | | | |
| 0.75 | 0.592 | 0.628 | 0.662 | 0.694 | 0.724 | 0.752 | 0.777 | 0.799 | 0.815 | | | |
| | 0.572 | 0.607 | 0.639 | 0.670 | 0.699 | 0.724 | 0.749 | 0.774 | 0.801 | | | |
| 0.8 | 0.614 | 0.653 | 0.689 | 0.723 | 0.754 | 0.783 | 0.811 | 0.835 | 0.854 | 0.870 | | |
| | 0.595 | 0.633 | 0.669 | 0.702 | 0.731 | 0.760 | 0.787 | 0.809 | 0.830 | 0.855 | | |
| 0.85 | 0.636 | 0.676 | 0.716 | 0.752 | 0.786 | 0.815 | 0.842 | 0.867 | 0.891 | 0.910 | 0.924 | |
| | 0.617 | 0.658 | 0.697 | 0.733 | 0.765 | 0.794 | 0.819 | 0.844 | 0.867 | 0.888 | 0.907 | |
| 0.9 | 0.654 | 0.697 | 0.739 | 0.779 | 0.815 | 0.847 | 0.875 | 0.899 | 0.921 | 0.941 | 0.958 | 0.970 |
| | 0.635 | 0.678 | 0.720 | 0.760 | 0.796 | 0.827 | 0.854 | 0.878 | 0.899 | 0.920 | 0.938 | 0.955 |
| 0.95 | 0.671 | 0.716 | 0.759 | 0.800 | 0.839 | 0.873 | 0.903 | 0.928 | 0.950 | 0.968 | 0.984 | 0.996 |
| | 0.654 | 0.700 | 0.743 | 0.785 | 0.823 | 0.857 | 0.886 | 0.911 | 0.933 | 0.952 | 0.970 | 0.987 |

BOSS RATIO ν = 0.275

In Table 102, r indicates a non-dimensional r coordinate in the radial direction in the cylindrical coordinate system having the z axis as the rotation axis of the propeller fan, θ indicates a non-dimensional θ coordinate in the circumferential direction in the cylindrical coordinate system having the z axis as the rotation axis of the propeller fan, and z indicates a non-dimensional z coordinate in the axial direction (the direction of height) in the cylindrical coordinate system having the z axis as the rotation axis of the propeller fan.

Moreover, the top of each column ($z_u$) indicates a coordinate value on a negative pressure side (suction side) of the propeller fan, whereas the bottom of each column ($z_d$) indicates a coordinate value on a positive pressure side (blowing side). Table 102 indicates a non-dimensional coordinate value of z where r is within the range of 0.3 to 0.95 and θ is within the range of 0.042 to 1. It is noted that the contents of Table 101 are the same as those in Table 102.

Furthermore, values within the range of ±5% of coordinate values calculated by a transformation formula of the present invention should be interpreted as included in a range of error and equivalent to the coordinate values of the present invention. This means that the shape defined by the coordinate values within the range of ±5% of the coordinate values calculated by a transformation formula of the present invention should be interpreted as included in a technical range of the present invention.

In addition, the shape defined by coordinate values obtained by uniformly transforming coordinate values indicated in Table 102 should also be interpreted as included within the range of equivalent to the base shape of the present invention.

In a die for molding a propeller fan according to one aspect of the present invention, the surface of a portion forming the surface of a blade of the propeller fan is configured by a curved surface obtained by enlarging or reducing the base shape in at least one of r, θ and z directions.

When the diameter of the propeller fan of the present invention is D, the height in the z direction which is the axial direction is h and the expansion angle of the blade is λ; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (107) below using three-dimensional coordinate values indicated in Table 2. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

It is noted that in such a case that a transformation formula is used to change the form of the base shape, coordinate values obtained by uniformly transforming three-dimensional coordinate values indicated in Table 2 may be used to obtain the same result. Therefore, coordinate values calculated using such transformed coordinate values should also be interpreted as included in the technical range of the present invention, as long as the value can be calculated by respective transformation formulas below.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = \frac{D}{2} \\ b = 0 \\ c = \lambda \\ d\text{:optional} \\ h = e_u \geqq e_d \\ f_u \geqq f_d\text{: optional} \end{array}\right\} \quad (107)$$

In a die for molding a propeller fan according to another aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (107) above.

When the diameter of the propeller fan is D, the height in the z direction which is the axial direction is h, and the number of blades is n; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (108) below using three-dimensional coordinate values indicated in Table 2. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = \frac{D}{2} \\ b = 0 \\ c = \frac{360}{n} \\ d\text{:optional} \\ h = e_u \geqq e_d \\ f_u \geqq f_d\text{: optional} \end{array}\right\} \quad (108)$$

In a die for molding a propeller fan according to a further aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (108) above.

When the diameter of the propeller fan is D and the height in the z direction which is the axial direction is h; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (109) below using three-dimensional coordinate values indicated in Table 2. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

$$
\left.\begin{array}{l}
r_1 = a \times r + b \text{ (mm)} \\
\theta_1 = c \times \theta + d \text{ (deg)} \\
z_{1u} = e_u \times z_u + f_u \text{ (mm)} \\
z_{1d} = e_d \times z_d + f_d \text{ (mm)} \\
(a, c, e_u, e_d\text{: factor of proportionality; } b, d, f_u, f_d\text{: constant}) \\
\text{wherein} \\
a = \frac{D}{2} \\
b = 0 \\
c = \frac{2400}{7} \times \frac{h}{D} \\
d\text{:optional} \\
h = e_u \geqq e_d \\
f_u \geqq f_d\text{: optional}
\end{array}\right\} \quad (109)
$$

In a die for molding a propeller fan according to yet another aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (109) above.

When the diameter of the propeller fan is D, the boss ratio which is the ratio of the diameter of the propeller fan to that of a boss portion is ν, the height in the z direction which is the axial direction is h, and the expansion angle of the blade is λ; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (110) below using three-dimensional coordinate values indicated in Table 2. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

$$
\left.\begin{array}{l}
r_1 = a \times r + b \text{ (mm)} \\
\theta_1 = c \times \theta + d \text{ (deg)} \\
z_{1u} = e_u \times z_u + f_u \text{ (mm)} \\
z_{1d} = e_d \times z_d + f_d \text{ (mm)} \\
(a, c, e_u, e_d\text{: factor of proportionality; } b, d, f_u, f_d\text{: constant}) \\
a = \frac{20}{29} D(1 - \nu) \\
b = -\frac{20}{29} D(1 - \nu) \times 0.275 + \frac{\nu D}{2} \\
c = \lambda \\
d\text{:optional} \\
h = e_u \geqq e_d \\
f_u \geqq f_d\text{: optional}
\end{array}\right\} \quad (110)
$$

In a die for molding a propeller fan according to yet another aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (110) above.

When the diameter of the propeller fan is D, the boss ratio which is the ratio of the diameter of the propeller fan to that of a boss portion is ν, the height in the z direction which is the axial direction is h, and the number of blades is n; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (111) below using three-dimensional coordinate values indicated in Table 2. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

$$
\left.\begin{array}{l}
r_1 = a \times r + b \text{ (mm)} \\
\theta_1 = c \times \theta + d \text{ (deg)} \\
z_{1u} = e_u \times z_u + f_u \text{ (mm)} \\
z_{1d} = e_d \times z_d + f_d \text{ (mm)} \\
(a, c, e_u, e_d\text{: factor of proportionality; } b, d, f_u, f_d\text{: constant}) \\
\text{wherein} \\
a = \frac{20}{29} D(1 - \nu) \\
b = -\frac{20}{29} D(1 - \nu) \times 0.275 + \frac{\nu D}{2} \\
c = 360/n \\
d\text{: optional} \\
h = e_u \geqq e_d \\
f_u \geqq f_d\text{: optional}
\end{array}\right\} \quad (111)
$$

In a die for molding a propeller fan according to a further aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (111) above.

When the diameter of the propeller fan is D, the boss ratio which is the ratio of the diameter of the propeller fan to that of a boss portion is ν, and the height in the z direction which is the axial direction is h; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (112) below using three-dimensional coordinate values indicated in Table 102. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

$$
\left.\begin{array}{l}
r_1 = a \times r + b \text{ (mm)} \\
\theta_1 = c \times \theta + d \text{ (deg)} \\
z_{1u} = e_u \times z_u + f_u \text{ (mm)} \\
z_{1d} = e_d \times z_d + f_d \text{ (mm)} \\
(a, c, e_u, e_d\text{: factor of proportionality; } b, d, f_u, f_d\text{: constant}) \\
\text{wherein} \\
a = \frac{20}{29} D(1 - \nu) \\
b = -\frac{20}{29} D(1 - \nu) \times 0.275 + \frac{\nu D}{2} \\
c = \frac{2400}{7} \times \frac{h}{D} \\
d\text{: optional} \\
h = e_u \geqq e_d \\
f_u \geqq f_d\text{: optional}
\end{array}\right\} \quad (112)
$$

In a die for molding a propeller fan according to a further aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (112) above.

A fluid feeding device of the present invention includes a blower having any one of the propeller fans described above and a drive motor driving the propeller fan.

In a propeller fan according to the present invention, when coordinates in a cylindrical coordinate system having a z axis as a rotation axis of the propeller fan are (r, θ, z), the shape of a curved surface defined by a r coordinate value, a θ coordinate value and a z coordinate value indicated in Table 202 below is determined as a base shape of the surface of a blade of the propeller fan, and the surface of the blade of the propeller fan is configured by a curved surface obtained by enlarging or reducing the base shape in at least one of r, θ and z directions.

TABLE 202

| | θ | | | | | | | | | | | |
|---|---|---|---|---|---|---|---|---|---|---|---|---|
| r | 0.042 | 0.083 | 0.125 | 0.167 | 0.208 | 0.25 | 0.292 | 0.333 | 0.375 | 0.417 | 0.458 | 0.5 |
| 0.3 | | | 0.191 | 0.217 | 0.241 | 0.264 | 0.288 | 0.311 | 0.333 | 0.355 | 0.376 | 0.395 |
| | | | 0.168 | 0.184 | 0.200 | 0.216 | 0.233 | 0.249 | 0.267 | 0.285 | 0.304 | 0.324 |
| 0.35 | | 0.147 | 0.181 | 0.212 | 0.242 | 0.270 | 0.297 | 0.322 | 0.346 | 0.370 | 0.392 | 0.413 |
| | | 0.127 | 0.150 | 0.173 | 0.196 | 0.218 | 0.241 | 0.264 | 0.287 | 0.311 | 0.334 | 0.356 |
| 0.4 | 0.088 | 0.133 | 0.172 | 0.208 | 0.242 | 0.274 | 0.304 | 0.332 | 0.359 | 0.385 | 0.409 | 0.432 |
| | 0.076 | 0.110 | 0.141 | 0.171 | 0.199 | 0.227 | 0.254 | 0.280 | 0.307 | 0.332 | 0.357 | 0.380 |
| 0.45 | 0.070 | 0.118 | 0.162 | 0.203 | 0.241 | 0.277 | 0.311 | 0.343 | 0.373 | 0.401 | 0.427 | 0.452 |
| | 0.055 | 0.097 | 0.136 | 0.171 | 0.204 | 0.236 | 0.266 | 0.295 | 0.324 | 0.351 | 0.377 | 0.402 |
| 0.5 | 0.042 | 0.100 | 0.151 | 0.198 | 0.241 | 0.281 | 0.319 | 0.354 | 0.386 | 0.417 | 0.446 | 0.473 |
| | 0.033 | 0.083 | 0.130 | 0.171 | 0.209 | 0.244 | 0.277 | 0.308 | 0.339 | 0.368 | 0.397 | 0.424 |
| 0.55 | 0.010 | 0.079 | 0.139 | 0.192 | 0.240 | 0.284 | 0.325 | 0.364 | 0.399 | 0.432 | 0.463 | 0.493 |
| | 0.007 | 0.066 | 0.120 | 0.168 | 0.211 | 0.250 | 0.286 | 0.320 | 0.352 | 0.383 | 0.414 | 0.443 |
| 0.6 | | 0.056 | 0.123 | 0.182 | 0.235 | 0.283 | 0.328 | 0.370 | 0.409 | 0.445 | 0.478 | 0.511 |
| | | 0.046 | 0.106 | 0.161 | 0.209 | 0.254 | 0.294 | 0.331 | 0.366 | 0.399 | 0.431 | 0.462 |
| 0.65 | | 0.028 | 0.102 | 0.168 | 0.227 | 0.279 | 0.327 | 0.372 | 0.413 | 0.452 | 0.489 | 0.525 |
| | | 0.023 | 0.093 | 0.156 | 0.213 | 0.263 | 0.308 | 0.349 | 0.387 | 0.423 | 0.456 | 0.488 |
| 0.7 | | | 0.082 | 0.156 | 0.221 | 0.279 | 0.330 | 0.377 | 0.420 | 0.461 | 0.500 | 0.537 |
| | | | 0.074 | 0.147 | 0.210 | 0.266 | 0.315 | 0.360 | 0.402 | 0.442 | 0.479 | 0.513 |
| 0.75 | | | 0.058 | 0.140 | 0.212 | 0.277 | 0.334 | 0.386 | 0.432 | 0.475 | 0.516 | 0.556 |
| | | | 0.051 | 0.130 | 0.200 | 0.263 | 0.318 | 0.368 | 0.413 | 0.455 | 0.495 | 0.533 |
| 0.8 | | | | 0.123 | 0.204 | 0.276 | 0.339 | 0.395 | 0.446 | 0.492 | 0.535 | 0.576 |
| | | | | 0.113 | 0.191 | 0.260 | 0.320 | 0.375 | 0.425 | 0.471 | 0.514 | 0.554 |
| 0.85 | | | | 0.108 | 0.197 | 0.275 | 0.342 | 0.402 | 0.456 | 0.506 | 0.552 | 0.595 |
| | | | | 0.098 | 0.183 | 0.257 | 0.322 | 0.381 | 0.434 | 0.483 | 0.529 | 0.573 |
| 0.9 | | | | 0.087 | 0.188 | 0.272 | 0.345 | 0.408 | 0.465 | 0.517 | 0.566 | 0.612 |
| | | | | 0.081 | 0.175 | 0.255 | 0.325 | 0.387 | 0.443 | 0.494 | 0.543 | 0.589 |
| 0.95 | | | | | 0.175 | 0.269 | 0.347 | 0.414 | 0.473 | 0.528 | 0.578 | 0.626 |
| | | | | | 0.166 | 0.255 | 0.330 | 0.395 | 0.453 | 0.507 | 0.557 | 0.606 |

| | θ | | | | | | | | | | | |
|---|---|---|---|---|---|---|---|---|---|---|---|---|
| r | 0.542 | 0.583 | 0.625 | 0.667 | 0.708 | 0.75 | 0.792 | 0.833 | 0.875 | 0.917 | 0.958 | 1 |
| 0.3 | 0.414 | 0.432 | 0.447 | 0.460 | 0.468 | 0.468 | | | | | | |
| | 0.343 | 0.362 | 0.381 | 0.400 | 0.421 | 0.445 | | | | | | |
| 0.35 | 0.433 | 0.450 | 0.461 | 0.465 | | | | | | | | |
| | 0.377 | 0.399 | 0.421 | 0.445 | | | | | | | | |
| 0.4 | 0.453 | 0.470 | 0.482 | 0.485 | | | | | | | | |
| | 0.403 | 0.424 | 0.447 | 0.471 | | | | | | | | |
| 0.45 | 0.475 | 0.495 | 0.510 | 0.517 | | | | | | | | |
| | 0.426 | 0.448 | 0.471 | 0.495 | | | | | | | | |
| 0.5 | 0.499 | 0.522 | 0.541 | 0.556 | 0.561 | | | | | | | |
| | 0.449 | 0.473 | 0.497 | 0.521 | 0.549 | | | | | | | |
| 0.55 | 0.521 | 0.547 | 0.571 | 0.591 | 0.605 | | | | | | | |
| | 0.471 | 0.498 | 0.523 | 0.549 | 0.576 | | | | | | | |
| 0.6 | 0.541 | 0.570 | 0.597 | 0.622 | 0.642 | 0.655 | | | | | | |
| | 0.492 | 0.521 | 0.549 | 0.576 | 0.603 | 0.632 | | | | | | |
| 0.65 | 0.558 | 0.590 | 0.620 | 0.648 | 0.673 | 0.694 | 0.707 | | | | | |
| | 0.519 | 0.548 | 0.576 | 0.604 | 0.631 | 0.659 | 0.689 | | | | | |
| 0.7 | 0.573 | 0.607 | 0.640 | 0.671 | 0.700 | 0.726 | 0.747 | 0.761 | | | | |
| | 0.546 | 0.578 | 0.607 | 0.634 | 0.661 | 0.688 | 0.715 | 0.745 | | | | |
| 0.75 | 0.594 | 0.630 | 0.664 | 0.696 | 0.726 | 0.754 | 0.780 | 0.801 | 0.816 | | | |
| | 0.570 | 0.605 | 0.638 | 0.668 | 0.696 | 0.721 | 0.746 | 0.771 | 0.800 | | | |
| 0.8 | 0.616 | 0.654 | 0.691 | 0.725 | 0.756 | 0.785 | 0.813 | 0.837 | 0.856 | 0.871 | | |
| | 0.594 | 0.632 | 0.667 | 0.700 | 0.730 | 0.758 | 0.785 | 0.807 | 0.828 | 0.854 | | |
| 0.85 | 0.637 | 0.678 | 0.717 | 0.754 | 0.788 | 0.817 | 0.844 | 0.869 | 0.893 | 0.912 | 0.925 | |
| | 0.615 | 0.656 | 0.695 | 0.731 | 0.764 | 0.792 | 0.817 | 0.842 | 0.865 | 0.886 | 0.906 | |
| 0.9 | 0.656 | 0.698 | 0.740 | 0.780 | 0.816 | 0.848 | 0.876 | 0.901 | 0.923 | 0.943 | 0.959 | 0.971 |
| | 0.634 | 0.677 | 0.719 | 0.759 | 0.794 | 0.825 | 0.853 | 0.876 | 0.897 | 0.918 | 0.937 | 0.954 |
| 0.95 | 0.672 | 0.717 | 0.760 | 0.801 | 0.840 | 0.874 | 0.904 | 0.929 | 0.951 | 0.969 | 0.985 | 0.996 |
| | 0.653 | 0.698 | 0.742 | 0.783 | 0.822 | 0.856 | 0.885 | 0.910 | 0.932 | 0.951 | 0.969 | 0.986 |

BOSS RATIO ν = 0.275

In Table 202, r indicates a non-dimensional r coordinate in the radial direction in the cylindrical coordinate system having the z axis as the rotation axis of the propeller fan, θ indicates a non-dimensional θ coordinate in the circumferential direction in the cylindrical coordinate system having the z axis as the rotation axis of the propeller fan, and z indicates a non-dimensional z coordinate in the axial direction (the direction of height) in the cylindrical coordinate system having the z axis as the rotation axis of the propeller fan.

Moreover, the top of each column ($z_u$) indicates a coordinate value on a negative pressure side (suction side) of the propeller fan, whereas the bottom of each column ($z_d$) indicates a coordinate value on a positive pressure side (blowing side) thereof. Table 202 indicates a non-dimensional coordinate value of z where r is within the range of 0.3 to 0.95 and where θ is within the range of 0.042 to 1. It is noted that the contents of Table 201 are the same as those in Table 202.

Furthermore, values within the range of ±5% of coordinate values calculated by a transformation formula of the present invention should be interpreted as included in a range of error and equivalent to the coordinate values of the present invention. This means that the shape defined by the coordinate values within the range of ±5% of coordinate values calculated by a transformation formula of the present invention should be interpreted as included in a technical range of the present invention.

In addition, the shape defined by coordinate values obtained by uniformly transforming coordinate values indicated in Table 202 should also be interpreted as included within the range of equivalent to the base shape of the present invention.

In a die for molding a propeller fan according to one aspect of the present invention, the surface of a portion forming the surface of a blade of the propeller fan is configured by a curved surface obtained by enlarging or reducing the base shape in at least one of r, θ and z directions.

When the diameter of the propeller fan of the present invention is D, the height in the z direction which is the axial direction is h and the expansion angle of the blade is λ; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (207) below using three-dimensional coordinate values indicated in Table 2. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

It is noted that, in such a case that a transformation formula is used to change the form of the base shape, coordinate values obtained by uniformly transforming three-dimensional coordinate values indicated in Table 2 may also be used to obtain the same result. Therefore, coordinate values calculated using such transformed coordinate values should also be interpreted as included in the technical range of the present invention, as long as the values can be calculated by respective transformation formulas below.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality; } b, d, f_u, f_d\text{: constant})\\
&\text{wherein}\\
&a = D/2\\
&b = 0\\
&c = \lambda\\
&d\text{: optional}\\
&h = e_u \geqq e_d\\
&f_u \geqq f_d\text{: optional}
\end{aligned}\right\} \quad (207)$$

In a die for molding a propeller fan according to another aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (207) above.

When the diameter of the propeller fan is D, the height in the z direction which is the axial direction is h, and the number of blades is n; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (208) below using three-dimensional coordinate values indicated in Table 2. Then, the surface of the blade of the propeller fan is configured by a curved surface defined by the coordinates ($r_1$, $\theta_1$, $z_{1u}$) and the coordinates ($r_1$, $\theta_1$, $z_{1d}$).

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality; } b, d, f_u, f_d\text{: constant})\\
&\text{wherein}\\
&a = D/2\\
&b = 0\\
&c = 360/n\\
&d\text{: optional}\\
&h = e_u \geqq e_d\\
&f_u \geqq f_d\text{: optional}
\end{aligned}\right\} \quad (208)$$

In a die for molding a propeller fan according to a further aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (208) above.

When the diameter of the propeller fan is D and the height in the z direction which is the axial direction is h; r, θ, z coordinates ($r_1$, $\theta_1$, $z_{1u}$) that define the surface on the suction side of the blade and r, θ, z coordinates ($r_1$, $\theta_1$, $z_{1d}$) that define the surface on the blowing side of the blade are obtained by a transformation formula (209) below using three-dimensional coordinate values indicated in Table 202 above. Then, the surface of the blade of the propeller fan is configured by a curved surface defined by the coordinates $(r_1, \theta_1, z_{1u})$ and the coordinates $(r_1, \theta_1, z_{1d})$.

$$\left.\begin{aligned} &r_1 = a\times r + b \text{ (mm)}\\ &\theta_1 = c\times\theta + d \text{ (deg)}\\ &z_{1u} = e_u\times z_u + f_u \text{ (mm)}\\ &z_{1d} = e_d\times z_d + f_d \text{ (mm)}\\ &(a, c, e_u, e_d\text{: factor of proportionality; } b, d, f_u, f_d\text{: constant})\\ &\text{wherein}\\ &a = D/2\\ &b = 0\\ &c = \frac{2400}{7}\times\frac{h}{D}\\ &d\text{: optional}\\ &h = e_u \geqq e_d\\ &f_u \geqq f_d\text{: optional} \end{aligned}\right\} \quad (209)$$

In a die for molding a propeller fan according to yet another aspect of the present invention, the surface of a portion forming the surface of a blade of the propeller fan is configured by a curved surface defined by the coordinates $(r_1, \theta_1, z_{1u})$ and the coordinates $(r_1, \theta_1, z_{1d})$ obtained by the transformation formula (209) above.

When the diameter of the propeller fan is D, the boss ratio which is the ratio of the diameter of the propeller fan to that of a boss portion is ν, the height in the z direction which is the axial direction is h, and the expansion angle of the blade is λ; r, θ, z coordinates $(r_1, \theta_1, z_{1u})$ that define the surface on the suction side of the blade and r, θ, z coordinates $(r_1, \theta_1, z_{1d})$ that define the surface on the blowing side of the blade are obtained by a transformation formula (210) below using three-dimensional coordinate values indicated in Table 202. Then, the surface of the blade of the propeller fan is configured by a curved surface defined by the coordinates $(r_1, \theta_1, z_{1u})$ and the coordinates $(r_1, \theta_1, z_{1d})$.

$$\left.\begin{aligned} &r_1 = a\times r + b \text{ (mm)}\\ &\theta_1 = c\times\theta + d \text{ (deg)}\\ &z_{1u} = e_u\times z_u + f_u \text{ (mm)}\\ &z_{1d} = e_d\times z_d + f_d \text{ (mm)}\\ &(a, c, e_u, e_d\text{: factor of proportionality; } b, d, f_u, f_d\text{: constant})\\ &\text{wherein}\\ &a = \frac{20}{29}D(1-\nu)\\ &b = -\frac{20}{29}D(1-\nu)\times 0.275 + \frac{\nu D}{2}\\ &c = \lambda\\ &d\text{: optional}\\ &h = e_u \geqq e_d\\ &f_u \geqq f_d\text{: optional} \end{aligned}\right\} \quad (210)$$

In a die for molding a propeller fan according to a further aspect of the present invention, the surface of a portion forming the surface of a blade of the propeller fan is configured by a curved surface defined by the coordinates $(r_1, \theta_1, z_{1u})$ and the coordinates $(r_1, \theta_1, z_{1d})$ obtained by the transformation formula (210) above.

When the diameter of the propeller fan is D, the boss ratio which is the ratio of the diameter of the propeller fan to that of a boss portion is ν, the height in the z direction which is the axial direction is h, and the number of blades is n; r, θ, z coordinates $(r_1, \theta_1, z_{1u})$ that define the surface on the suction side of the blade and r, θ, z coordinates $(r_1, \theta_1, z_{1d})$ that define the surface on the blowing side of the blade are obtained by a transformation formula (211) below using three-dimensional coordinate values indicated in Table 202. Then, the surface of the blade of the propeller fan is configured by a curved surface defined by the coordinates $(r_1, \theta_1, z_{1u})$ and the coordinates $(r_1, \theta_1, z_{1d})$.

$$\left.\begin{aligned} &r_1 = a\times r + b \text{ (mm)}\\ &\theta_1 = c\times\theta + d \text{ (deg)}\\ &z_{1u} = e_u\times z_u + f_u \text{ (mm)}\\ &z_{1d} = e_d\times z_d + f_d \text{ (mm)}\\ &(a, c, e_u, e_d\text{: factor of proportionality; } b, d, f_u, f_d\text{: constant})\\ &\text{wherein}\\ &a = \frac{20}{29}D(1-\nu)\\ &b = -\frac{20}{29}D(1-\nu)\times 0.275 + \frac{\nu D}{2}\\ &c = 360/n\\ &d\text{: optional}\\ &h = e_u \geqq e_d\\ &f_u \geqq f_d\text{: optional} \end{aligned}\right\} \quad (211)$$

In a die for molding a propeller fan according to a further aspect of the present invention, the surface of a portion forming the surface of a blade of the propeller fan is configured by a curved surface defined by the coordinates $(r_1, \theta_1, z_{1u})$ and the coordinates $(r_1, \theta_1, z_{1d})$ obtained by the transformation formula (211) above.

When the diameter of the propeller fan is D, the boss ratio which is the ratio of the diameter of the propeller fan to that of a boss portion is ν, and the height in the z direction which is the axial direction of the propeller fan is h; r, θ, z coordinates $(r_1, \theta_1, z_{1u})$ that define the surface on the suction side of the blade and r, θ, z coordinates $(r_1, \theta_1, z_{1d})$ that define the surface on the blowing side of the blade are obtained by a transformation formula (212) below using three-dimensional coordinate values indicated in Table 2. Then, the surface of the blade of the propeller fan is configured by a curved surface defined by the coordinates $(r_1, \theta_1, z_{1u})$ and the coordinates $(r_1, \theta_1, z_{1d})$.

$$\left.\begin{aligned} &r_1 = a\times r + b \text{ (mm)}\\ &\theta_1 = c\times\theta + d \text{ (deg)}\\ &z_{1u} = e_u\times z_u + f_u \text{ (mm)}\\ &z_{1d} = e_d\times z_d + f_d \text{ (mm)}\\ &(a, c, e_u, e_d\text{: factor of proportionality; } b, d, f_u, f_d\text{: constant})\\ &\text{wherein}\\ &a = \frac{20}{29}D(1-\nu)\\ &b = -\frac{20}{29}D(1-\nu)\times 0.275 + \frac{\nu D}{2}\\ &c = \frac{2400}{7}\times\frac{h}{D}\\ &d\text{: optional}\\ &h = e_u \geqq e_d\\ &f_u \geqq f_d\text{: optional} \end{aligned}\right\} \quad (212)$$

In a die for molding a propeller fan according to another aspect of the present invention, the surface of a portion forming the surface of a blade of the propeller fan is configured by a curved surface defined by the coordinates ($r_1$, $\theta_1$, $z_{1u}$) and the coordinates ($r_1$, $\theta_1$, $z_{1d}$) obtained by the transformation formula (212) above.

A fluid feeding device of the present invention includes a blower having any one of the propeller fans described above and a drive motor driving the propeller fan.

BRIEF DESCRIPTION OF THE DRAWINGS

FIGS. 8A and 8C are side views of a fluid feeding device of the present invention, whereas

FIGS. 18A and 18C are side views of a fluid feeding device of the present invention, whereas

FIGS. 28A and 28C are side views of a fluid feeding device of the present invention, whereas

BEST MODES FOR CARRYING OUT THE INVENTION

Embodiments of a propeller fan, a die for molding the propeller fan, and a fluid feeding device according to the present invention will be described below with reference to FIGS. 1 to 30.

Figure 1:
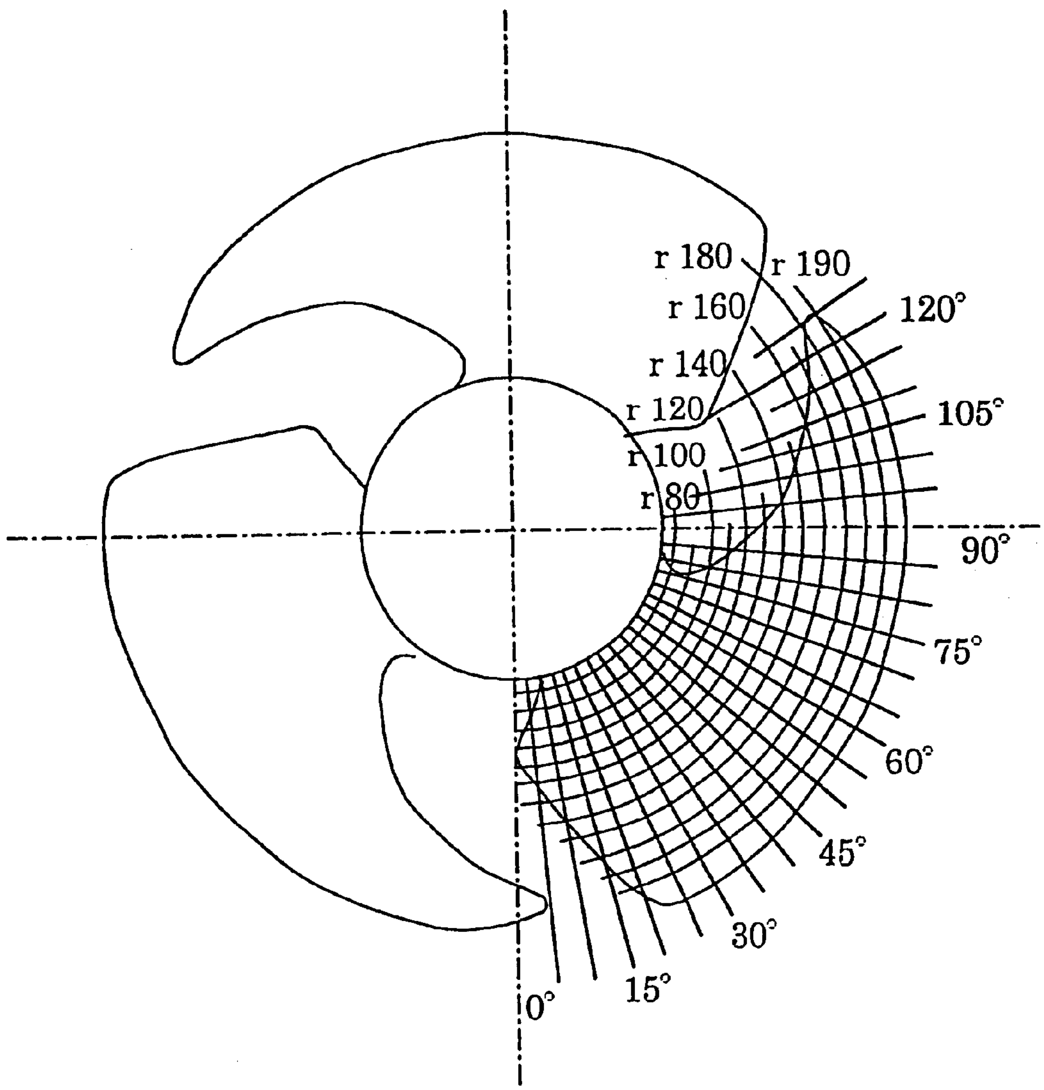
FIG. 1 is a front view of a propeller fan according to Embodiment 1 of the present invention.
Figure 2:
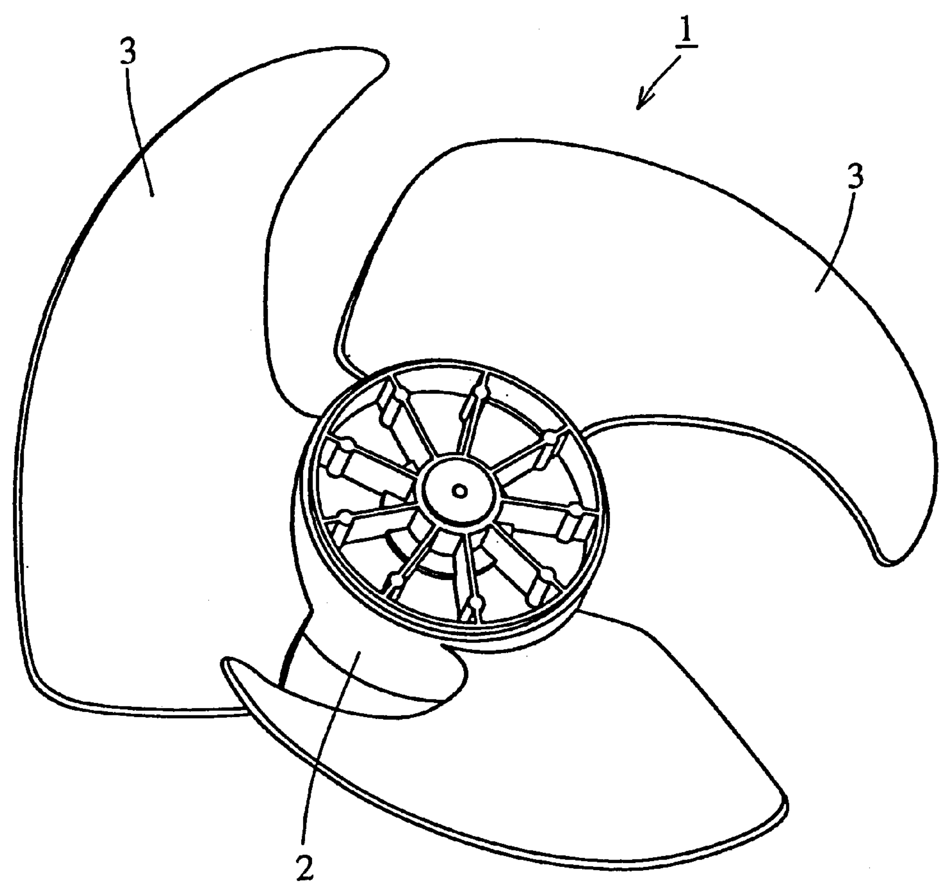
FIG. 2 is a perspective view of (the negative pressure surface side of) the propeller fan in Embodiment 1 of the present invention.
Figure 3:
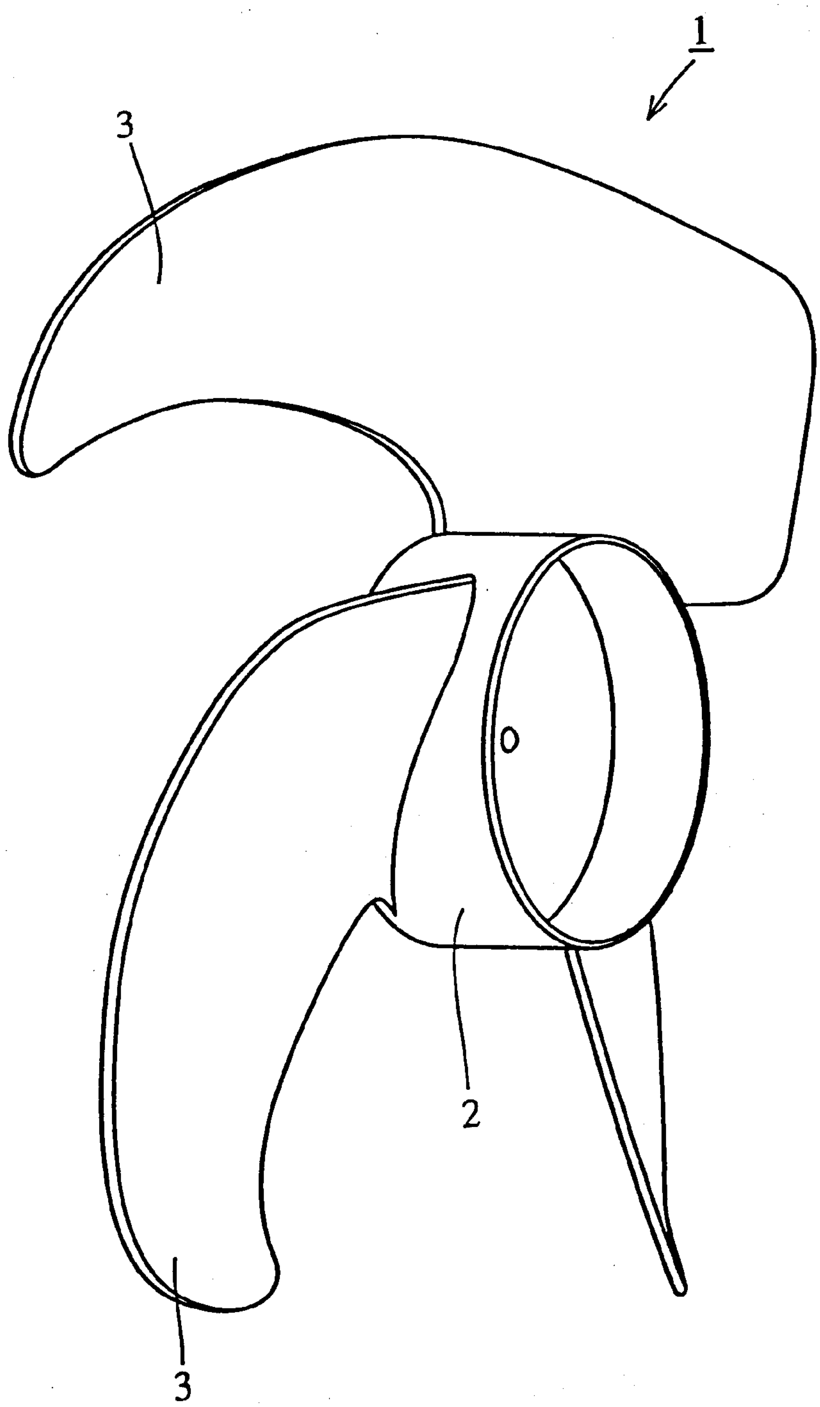
FIG. 3 is a perspective view of (the positive pressure surface side of) the propeller fan in Embodiment 1 of the present invention.

FIG. 1 shows a front view of a propeller fan 1 of the present invention. Propeller fan 1 of the present invention is molded in one piece by synthetic resin such as, for example, AS resin with glass fiber. For propeller fan 1, the diameter D=400 mm, the height in the axial direction (z direction) h=140 mm, the number of blades n=3, the expansion angle of a blade $\lambda$=120 degrees (deg) and a boss ratio $\nu$=0.35 (boss diameter $\nu$D=140 mm), and three blades 3 are radially and integrally provided on the periphery of a boss portion 2.

Then, it is an important feature of the present invention that the shape of the surface of blade 3 of propeller fan 1 is obtained based on a base shape defined by specific coordinate values. Thus, the shape of a curved surface defined by coordinate values obtained by transforming the coordinate values in the base shape in the r, $\theta$ and z directions using prescribed transformation formulas respectively is determined as the shape of the surface of blade 3 of propeller fan 1.

The base shape of the present invention is typically defined by the coordinate values indicated in Tables 3 and 4 described earlier. However, the shape, which is defined by coordinate values obtained by uniformly transforming the coordinate values indicated in Tables 3 and 4 described earlier by e.g. multiplying the coordinate values with prescribed coefficients, should also be interpreted as equivalent to the base shape of the present invention.

When expressed by a cylindrical coordinate system in which the z axis is set as a rotation axis of propeller fan 1, coordinates ($r_1$, $\theta_1$, $z_{1u}$) of a surface on a negative pressure side of blade 3 and coordinates ($r_1$, $\theta_1$, $z_{1d}$) of a surface on a positive pressure side of blade 3 are coordinate values obtained by transforming non-dimensionally expressed three-dimensional coordinate values indicated in Tables 3 and 4 using a transformation formula 13, and the surface on the negative pressure side and the surface on the positive pressure side are configured by curved surfaces defined by the obtained coordinate values, i.e. a curved surface specified by coordinate values indicated in Tables 5 and 6.

It is noted that the curved surface may also be specified by coordinate values within the range of ±5% of each coordinate value. Moreover, it may be possible to obtain coordinate values indicated in Tables 5 and 6 using coordinate values obtained by uniformly transforming the coordinate values indicated in Tables 3 and 4 described earlier. However, this should be interpreted as a modification within the range of equivalent to the present invention, since it can be applied only by slightly modifying transformation 13.

$$
\left.
\begin{aligned}
& r_1 = a \times r + b \ \text{(mm)} \\
& \theta_1 = c \times \theta + d \ \text{(deg)} \\
& z_{1u} = e_u \times z_u + f_u \ \text{(mm)} \\
& z_{1d} = e_d \times z_d + f_d \ \text{(mm)} \\
& (a,\ c,\ e_u,\ e_d\text{: factor of proportionality; } b,\ d,\ f_u,\ f_d\text{: constant}) \\
& \text{wherein} \\
& a = D/2 = 400/2 = 200 \\
& b = 0 \\
& c = \lambda = 360/n = \frac{2400}{7} \times \frac{h}{D} = \frac{2400}{7} \times \frac{140}{400} = 120 \\
& d = 0 \\
& e_u = e_d = h = 140 \\
& f_u = f_d = 0
\end{aligned}
\right\} \quad (13)
$$

TABLE 5

| EMBODIMENT 1 | | | | | | | | | | | | | | |
|---|---|---|---|---|---|---|---|---|---|---|---|---|---|---|
| | θ | | | | | | | | | | | | | |
| r | 5 | 10 | 15 | 20 | 25 | 30 | 35 | 40 | 45 | 50 | 55 | 60 | 65 | 70 |
| 80 | | 20.36 | 25.34 | 30.00 | 34.46 | 38.65 | 42.52 | 46.08 | 49.39 | 52.49 | 55.36 | 57.96 | 60.02 | 61.27 |
| | | 19.19 | 22.97 | 26.56 | 29.91 | 33.18 | 36.47 | 39.76 | 42.98 | 46.07 | 49.03 | 51.96 | 54.89 | 57.99 |
| 90 | 11.84 | 18.75 | 24.70 | 30.07 | 34.89 | 39.26 | 43.36 | 47.22 | 50.87 | 54.35 | 57.64 | 60.68 | 63.30 | 65.30 |
| | 11.18 | 16.51 | 21.33 | 25.59 | 29.55 | 33.39 | 37.14 | 40.80 | 44.35 | 47.78 | 51.07 | 54.21 | 57.22 | 60.21 |
| 100 | 10.33 | 17.37 | 23.51 | 29.19 | 34.48 | 39.42 | 44.03 | 48.36 | 52.43 | 56.29 | 59.94 | 63.36 | 66.49 | 69.17 |
| | 8.52 | 14.71 | 20.11 | 25.01 | 29.55 | 33.86 | 38.00 | 42.01 | 45.91 | 49.67 | 53.27 | 56.68 | 59.91 | 63.05 |
| 110 | 6.21 | 14.29 | 21.44 | 27.93 | 33.92 | 39.48 | 44.66 | 49.50 | 54.04 | 58.32 | 62.35 | 66.15 | 69.69 | 72.92 |
| | 4.97 | 12.16 | 18.60 | 24.37 | 29.60 | 34.42 | 38.99 | 43.36 | 47.58 | 51.67 | 55.59 | 59.33 | 62.88 | 66.25 |
| 120 | | 10.71 | 19.11 | 26.57 | 33.37 | 39.65 | 45.48 | 50.89 | 55.92 | 60.59 | 64.98 | 69.13 | 73.07 | 76.81 |
| | | 9.11 | 16.73 | 23.49 | 29.51 | 34.97 | 40.02 | 44.78 | 49.32 | 53.70 | 57.93 | 62.01 | 65.94 | 69.71 |
| 130 | | 7.02 | 16.69 | 25.16 | 32.82 | 39.83 | 46.30 | 52.29 | 57.83 | 62.98 | 67.78 | 72.31 | 76.61 | 80.73 |
| | | 6.08 | 14.72 | 22.44 | 29.37 | 35.62 | 41.29 | 46.50 | 51.40 | 56.06 | 60.56 | 64.94 | 69.19 | 73.31 |
| 140 | | | 13.47 | 23.32 | 31.95 | 39.64 | 46.60 | 53.03 | 59.05 | 64.74 | 70.19 | 75.25 | 80.05 | 84.52 |
| | | | 12.22 | 21.33 | 29.40 | 36.56 | 42.98 | 48.79 | 54.14 | 59.16 | 63.93 | 68.50 | 72.88 | 77.08 |
| 150 | | | 10.05 | 21.25 | 31.04 | 39.74 | 47.51 | 54.51 | 60.93 | 66.94 | 72.66 | 78.12 | 83.24 | 87.99 |
| | | | 9.05 | 19.18 | 28.19 | 36.14 | 43.17 | 49.51 | 55.35 | 60.89 | 66.21 | 71.33 | 76.16 | 80.73 |
| 160 | | | 5.96 | 18.57 | 29.65 | 39.54 | 48.37 | 56.24 | 63.30 | 69.74 | 75.72 | 81.43 | 86.95 | 92.22 |
| | | | 5.58 | 16.69 | 26.79 | 35.67 | 43.53 | 50.60 | 57.05 | 63.02 | 68.64 | 74.09 | 79.40 | 84.50 |
| 170 | | | | 15.93 | 28.44 | 39.41 | 48.98 | 57.43 | 65.03 | 71.96 | 78.42 | 84.51 | 90.37 | 96.06 |
| | | | | 14.36 | 25.56 | 35.24 | 43.84 | 51.60 | 58.70 | 65.28 | 71.45 | 77.31 | 83.00 | 88.53 |
| 180 | | | | 12.98 | 27.05 | 38.97 | 49.19 | 58.15 | 66.20 | 73.58 | 80.46 | 86.96 | 93.19 | 99.21 |
| | | | | 11.97 | 24.41 | 34.96 | 44.34 | 52.70 | 60.29 | 67.30 | 73.88 | 80.13 | 86.13 | 92.01 |
| 190 | | | | | 25.14 | 38.38 | 49.32 | 58.78 | 67.22 | 74.94 | 82.10 | 88.85 | 95.35 | 101.59 |
| | | | | | 23.04 | 35.12 | 45.33 | 54.17 | 62.13 | 69.50 | 76.45 | 83.12 | 89.61 | 95.86 |
| (mm) | | | | | | | | | | | | | | |

| | θ | | | | | | | | | |
|---|---|---|---|---|---|---|---|---|---|---|
| r | 75 | 80 | 85 | 90 | 95 | 100 | 105 | 110 | 115 | 120 (deg) |
| 80 | | | | | | | | | | |
| 90 | 66.35 | | | | | | | | | |
| | 63.39 | | | | | | | | | |
| 100 | 71.18 | 72.05 | | | | | | | | |
| | 66.22 | 69.66 | | | | | | | | |
| 110 | 75.65 | 77.62 | 78.26 | | | | | | | |
| | 69.58 | 73.01 | 76.90 | | | | | | | |
| 120 | 80.18 | 82.95 | 84.78 | | | | | | | |
| | 73.39 | 77.01 | 80.82 | | | | | | | |
| 130 | 84.63 | 88.15 | 91.01 | 92.76 | | | | | | |
| | 77.29 | 81.15 | 85.02 | 89.15 | | | | | | |
| 140 | 88.69 | 92.63 | 96.25 | 99.29 | 101.19 | | | | | |
| | 81.14 | 85.10 | 89.03 | 93.02 | 97.44 | | | | | |
| 150 | 92.62 | 96.90 | 100.83 | 104.48 | 107.63 | 109.73 | | | | |
| | 85.13 | 89.25 | 93.19 | 97.08 | 101.03 | 105.47 | | | | |
| 160 | 97.14 | 101.64 | 105.86 | 109.91 | 113.19 | 116.11 | 118.25 | | | |
| | 89.30 | 93.73 | 97.98 | 102.08 | 105.56 | 109.11 | 113.20 | | | |
| 170 | 101.50 | 106.51 | 111.00 | 114.93 | 118.65 | 122.20 | 125.26 | 126.99 | 127.75 | |
| | 93.77 | 98.64 | 103.00 | 106.90 | 110.64 | 114.28 | 117.65 | 120.94 | 125.07 | |

TABLE 5-continued

| EMBODIMENT 1 | | | | | | | | | | |
|---|---|---|---|---|---|---|---|---|---|---|
| 180 | 105.12 | 110.69 | 115.67 | 120.05 | 123.85 | 127.09 | 130.15 | 132.82 | 134.80 | 135.62 |
| | 97.79 | 103.20 | 108.03 | 112.33 | 116.02 | 119.27 | 122.50 | 125.62 | 128.68 | 131.96 |
| 190 | 107.62 | 113.53 | 119.04 | 123.81 | 127.91 | 131.40 | 134.34 | 136.68 | 138.54 | 139.54 |
| | 101.86 | 107.64 | 112.97 | 117.62 | 121.64 | 125.20 | 128.24 | 131.03 | 134.02 | 137.11 |
| (mm) | | | | | | | | | | |

DIAMETER D = 400
HEIGHT h = 140
EXPANSION ANGLE λ = 120
BOSS RATIO ν = 0.35

TABLE 6

| EMBODIMENT 1 | | |
|---|---|---|
| r | θ | z |
| 76.66 | 76.94 | 63.35<br>62.48 |
| 93.28 | 79.17 | 68.12<br>67.19 |
| 113.77 | 86.89 | 80.79<br>79.89 |
| 139.44 | 97.66 | 100.97<br>100.01 |
| 171.74 | 118.05 | 129.27<br>128.27 |
| 184.85 | 124.06 | 137.77<br>136.87 |
| 194.35 | 117.68 | 139.69<br>138.69 |
| 198.53 | 109.19 | 137.85<br>136.75 |
| 200.00 | 100.51 | 133.44<br>132.44 |
| 200.00 | 90.84 | 125.96<br>124.96 |
| 200.00 | 81.38 | 116.11<br>115.17 |
| 200.00 | 64.63 | 95.15<br>94.35 |
| 200.00 | 48.38 | 72.05<br>71.32 |
| 200.00 | 40.13 | 58.09<br>57.47 |
| 200.00 | 31.14 | 39.02<br>38.56 |
| 200.00 | 25.02 | 21.98<br>21.58 |
| 194.35 | 21.73 | 12.84<br>12.64 |
| 189.19 | 20.42 | 10.71<br>10.46 |
| 175.45 | 17.66 | 7.14<br>6.89 |
| 169.45 | 16.52 | 6.15<br>5.90 |
| 161.55 | 15.04 | 5.36<br>5.12 |
| 152.44 | 13.25 | 4.62<br>4.37 |
| 145.51 | 11.80 | 3.92<br>3.67 |
| 140.87 | 10.74 | 3.57<br>3.32 |
| 136.01 | 9.42 | 3.26<br>3.01 |
| 128.17 | 7.44 | 2.12<br>1.87 |
| 116.86 | 4.09 | 0.79<br>0.54 |
| 104.20 | 1.70 | 3.75<br>2.76 |

FIG. 1 shows a cylindrical coordinate system of r and θ by dashed lines. It is noted that, though the z axis is not shown in FIG. 1, the z axis is a line passing the center of rotation 0 of boss portion 2 of propeller fan 1 in FIG. 1 and perpendicular to the plane of the drawing (that is, a line overlapping with a core of the rotation axis of propeller fan 1).

In FIG. 1, for blade 3 of propeller fan 1, lines are drawn in the r direction that divide the blade at intervals of every 10 mm in the range between 80 mm and 190 mm, and lines are drawn that divide the blade in the θ direction at intervals of every 5 deg in the range between 0 deg and 125 deg, a coordinate value of z at each crossing point being indicated in Table 5. Here, the top of each column indicates a value on the negative pressure surface side (suction side) of the propeller fan, whereas the bottom of each column indicates a value on the positive pressure surface side (blowing side). Moreover, each coordinate value of r, θ, z at an outer edge portion of blade 3 having θ within the range between 0 deg and 125 deg are indicated in Table 6.

It is noted that blade 3 is made thicker at a root portion of blade 3. Moreover, the shape of the surface of blade 3 may be smooth, or may be provided with concavities and convexities in a form of grooves, protrusions or dimples. Furthermore, the trailing edge of blade 3 may have a shape of saw teeth. Note that, in each transformation formula, d and $f_u=f_d$ are indicated as optional because the shape of the propeller fan can be the same irrespective of a value selected for d and $f_u=f_d$.

Moreover, propeller fan 1 of the present invention may be molded in one piece by synthetic resin such as ABS (acrylonitrile-butadiene-styrene) resin or polypropylene (PP), or may be integrally molded in one piece by synthetic resin having an increased intensity by including mica or the like, or may be non-integrally molded.

Figure 7:
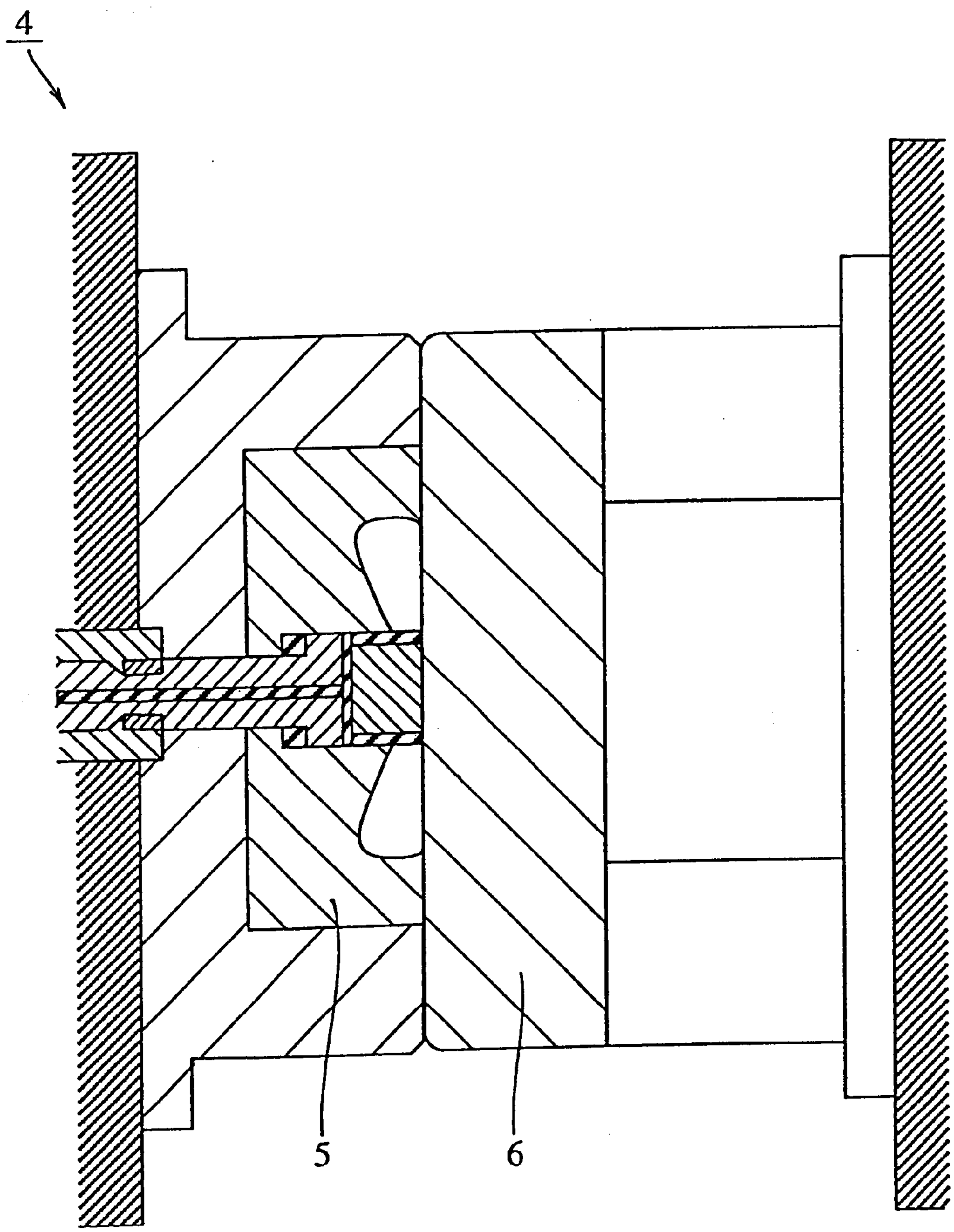
FIG. 7 is a partial section side view of a die for molding a propeller fan of the present invention.
Figure 8A:
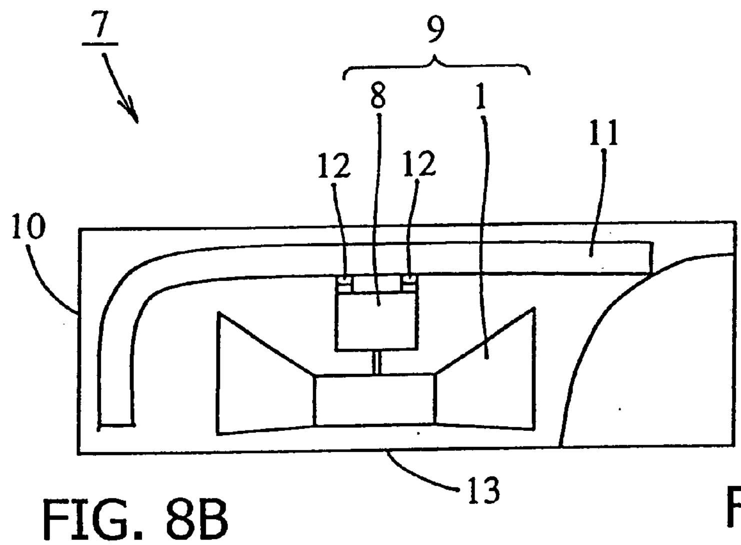
Figure 8B:
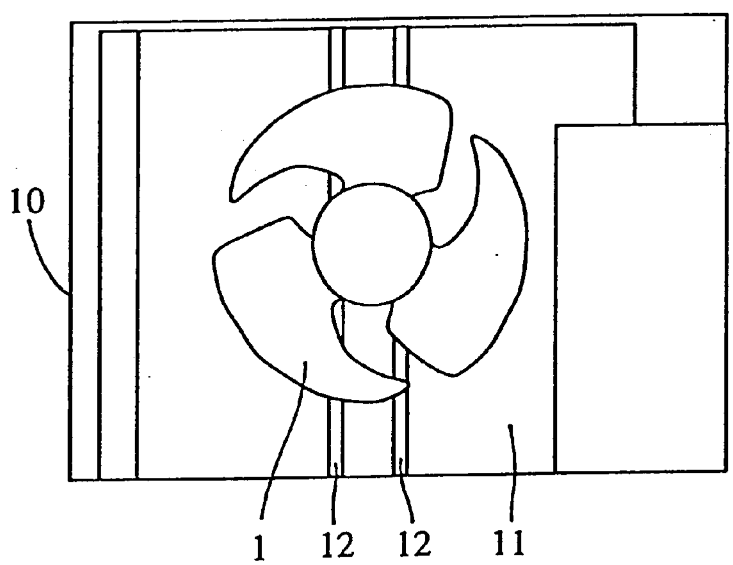
FIG. 8B is a front configuration view of the fluid feeding device of the present invention.
Figure 8C:
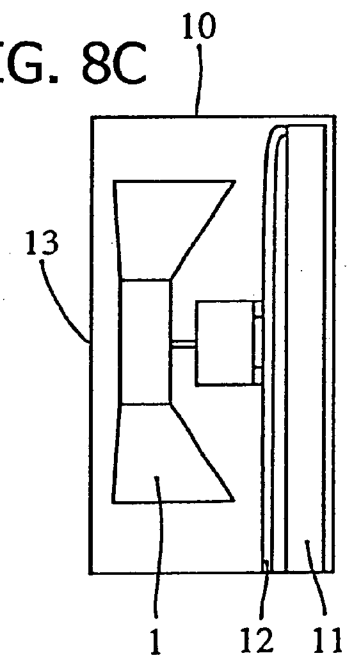

FIG. 7 shows an example of a propeller-fan-molding die 4 for forming propeller fan 1 shown in FIG. 1. Die 4 is for molding propeller fan 1 by synthetic resin, and has a fixed-side die 5 and a movable-side die 6, as shown in FIG. 7.

Then, the shape of a cavity defined by the both dies 5 and 6 is made approximately the same as the shape of propeller fan 1. Coordinates $(r_1, \theta_1, z_{1u})$ on the die surface of a portion forming the surface of blade 3 in fixed-side die 5 described above and coordinates $(r_1, \theta_1, z_{1d})$ on the die surface of a portion forming the surface of blade 3 in movable-side die 6 are obtained by transforming non-dimensionally expressed three-dimensional coordinate values indicated in Tables 3 and 4 using a transformation formula 14 below.

$$r_1 = a \times r + b \text{ (mm)}$$
$$\theta_1 = c \times \theta + d \text{ (deg)}$$
$$z_{1u} = e_u \times z_u + f_u \text{ (mm)}$$
$$z_{1d} = e_d \times z_d + f_d \text{ (mm)}$$
$$(a,\ c,\ e_u,\ e_d\text{: factor of proportionality; } b,\ d,\ f_u,\ f_d\text{: constant})$$

wherein $$a = D/2 = 400/2 = 200$$
$$b = 0$$
$$c = \lambda = 360/n = \frac{2400}{7} \times \frac{h}{D} = \frac{2400}{7} \times \frac{140}{400} = 120$$
$$d = 0$$
$$e_u = e_d = h = 140$$
$$f_u = f_d = 0 \tag{14}$$

That is, fixed-side die 5 and movable-side die 6 have curved portions respectively specified by coordinate values indicated in Tables 5 and 6. It is noted that, in this case also, each curved surface may be specified by coordinate values within the range of ±5% of each coordinate value.

Here, the dimension of the curved shape of the die may be determined in consideration of mold shrinkage. In this case, the coordinate data above may be corrected in consideration of the mold shrinkage, warping and deformation, to form molding die 4, such that propeller fan 1 having blade 3 with a three-dimensional curved surface specified by coordinate values within the range of ±5% of three-dimensional coordinate values indicated in Tables 5 and 6 above is formed after the mold shrinkage, and these are encompassed by the molding die of the present invention.

Moreover, though die 4 for molding the propeller fan in the present embodiment includes the negative pressure side surface of propeller fan 1 formed by fixed-side die 5 and a positive pressure side surface of propeller fan formed by movable-side die 6 as shown in FIG. 7, it may be possible to form the positive pressure side surface of propeller fan 1 by fixed-side die 5 and the negative pressure side surface of propeller fan 1 by movable-side die 6.

Embodiments and comparison examples of the present invention will be described below in detail.

Embodiment 1

Propeller fan 1 shown in FIG. 1 having the diameter D=400 mm, the height in the axial direction (z direction) h=140 mm, the number of blades n=3, the expansion angle of a blade λ=120 deg, the boss ratio ν=0.35 (boss diameter νD=140 mm) was formed such that the surface of the blade is a three-dimensional curved surface specified by Tables 5 and 6. Note that FIGS. 2 and 3 each shows a perspective view of propeller fan 1 in the present Embodiment 1.

Embodiment 2

Propeller fan 1 having the diameter D=400 mm, the height in the axial direction (z direction) h=154 mm, the number of blades n=3, the expansion angle of a blade λ=120 deg, the boss ratio ν=0.35 (boss diameter νD=140 mm) was formed such that the surface of the blade is a curved surface formed by transforming the curved surface defined by non-dimensionally expressed three-dimensional coordinates specified by Tables 3 and 4 using a transformation formula 15 below, i.e. a three-dimensional curved surface specified by Tables 7 and 8.

$$r_1 = a \times r + b \text{ (mm)}$$
$$\theta_1 = c \times \theta + d \text{ (deg)}$$
$$z_{1u} = e_u \times z_u + f_u \text{ (mm)}$$
$$z_{1d} = e_d \times z_d + f_d \text{ (mm)}$$
$$(a,\ c,\ e_u,\ e_d\text{: factor of proportionality, } b,\ d,\ f_u,\ f_d\text{: constant})$$

wherein $$a = D/2 = 400/2 = 200$$
$$b = 0$$
$$c = \lambda = 360/n = 120$$
$$d = 0$$
$$e_u = e_d = h = 154$$
$$f_u = f_d = 0 \tag{15}$$

TABLE 7

EMBODIMENT 7

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 80 | | 22.40 | 27.87 | 33.00 | 37.91 | 42.52 | 46.77 | 50.69 | 54.33 | 57.74 | 60.90 | 63.76 | 66.02 | 67.40 |
| | | 21.11 | 25.27 | 29.22 | 32.90 | 36.50 | 40.12 | 43.74 | 47.28 | 50.68 | 53.93 | 57.16 | 60.38 | 63.79 |
| 90 | 13.02 | 20.63 | 27.17 | 33.08 | 38.38 | 43.19 | 47.70 | 51.94 | 55.96 | 59.79 | 63.40 | 66.75 | 69.63 | 71.83 |
| | 12.30 | 18.16 | 23.46 | 28.15 | 32.51 | 36.73 | 40.85 | 44.88 | 48.79 | 52.56 | 56.18 | 59.63 | 62.94 | 66.23 |
| 100 | 11.36 | 19.11 | 25.86 | 32.11 | 37.93 | 43.36 | 48.43 | 53.20 | 57.67 | 61.92 | 65.93 | 69.70 | 73.14 | 76.09 |
| | 9.37 | 16.18 | 22.12 | 27.51 | 32.51 | 37.25 | 41.80 | 46.21 | 50.50 | 54.64 | 58.60 | 62.35 | 65.90 | 69.36 |
| 110 | 6.83 | 15.72 | 23.58 | 30.72 | 37.31 | 43.43 | 49.13 | 54.45 | 59.44 | 64.15 | 68.59 | 72.77 | 76.66 | 80.21 |
| | 5.47 | 13.38 | 20.46 | 26.81 | 32.56 | 37.86 | 42.89 | 47.70 | 52.34 | 56.84 | 61.15 | 65.26 | 69.17 | 72.88 |
| 120 | | 11.78 | 21.02 | 29.23 | 36.71 | 43.62 | 50.03 | 55.98 | 61.51 | 66.65 | 71.48 | 76.04 | 80.38 | 84.49 |
| | | 10.02 | 18.40 | 25.84 | 32.46 | 38.47 | 44.02 | 49.26 | 54.25 | 59.07 | 63.72 | 68.21 | 72.53 | 76.68 |
| 130 | | 7.72 | 18.36 | 27.68 | 36.10 | 43.81 | 50.93 | 57.52 | 63.61 | 69.28 | 74.56 | 79.54 | 84.27 | 88.80 |
| | | 6.69 | 16.19 | 24.68 | 32.31 | 39.18 | 45.42 | 51.15 | 56.54 | 61.67 | 66.62 | 71.43 | 76.11 | 80.64 |
| 140 | | | 14.82 | 25.65 | 35.15 | 43.60 | 51.26 | 58.33 | 64.96 | 71.21 | 77.21 | 82.78 | 88.06 | 92.97 |
| | | | 13.44 | 23.46 | 32.34 | 40.22 | 47.28 | 53.67 | 59.55 | 65.08 | 70.32 | 75.35 | 80.17 | 84.79 |
| 150 | | | 11.06 | 23.38 | 34.14 | 43.71 | 52.26 | 59.96 | 67.02 | 73.63 | 79.93 | 85.93 | 91.56 | 96.79 |
| | | | 9.96 | 21.10 | 31.01 | 39.75 | 47.49 | 54.46 | 60.89 | 66.98 | 72.83 | 78.46 | 83.78 | 88.80 |
| 160 | | | 6.56 | 20.43 | 32.62 | 43.49 | 53.21 | 61.86 | 69.63 | 76.71 | 83.29 | 89.57 | 95.65 | 101.44 |
| | | | 6.14 | 18.36 | 29.47 | 39.24 | 47.88 | 55.66 | 62.76 | 69.32 | 75.50 | 81.50 | 87.34 | 92.95 |
| 170 | | | | 17.52 | 31.28 | 43.35 | 53.88 | 63.17 | 71.53 | 79.16 | 86.26 | 92.96 | 99.41 | 105.67 |
| | | | | 15.80 | 28.12 | 38.76 | 48.22 | 56.76 | 64.57 | 71.81 | 78.60 | 85.04 | 91.30 | 97.38 |
| 180 | | | | 14.28 | 29.76 | 42.87 | 54.11 | 63.97 | 72.82 | 80.94 | 88.51 | 95.66 | 102.51 | 109.13 |
| | | | | 13.17 | 26.85 | 38.46 | 48.77 | 57.97 | 66.32 | 74.03 | 81.27 | 88.14 | 94.74 | 101.21 |

TABLE 7-continued

EMBODIMENT 7

| r | | | | | | | | | | |
|---|---|---|---|---|---|---|---|---|---|---|
| 190 | 27.65 | 42.22 | 54.25 | 64.66 | 73.94 | 82.43 | 90.31 | 97.74 | 104.89 | 111.75 |
| | 25.34 | 38.63 | 49.86 | 59.59 | 68.34 | 76.45 | 84.10 | 91.43 | 98.57 | 105.45 |
| (mm) | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 80 | | | | | | | | | | | |
| 90 | 72.99 | | | | | | | | | | |
| | 69.73 | | | | | | | | | | |
| 100 | 78.30 | 79.26 | | | | | | | | | |
| | 72.84 | 76.63 | | | | | | | | | |
| 110 | 83.22 | 85.38 | 86.09 | | | | | | | | |
| | 76.54 | 80.31 | 84.59 | | | | | | | | |
| 120 | 88.20 | 91.25 | 93.26 | | | | | | | | |
| | 80.73 | 84.71 | 88.90 | | | | | | | | |
| 130 | 93.09 | 96.97 | 100.11 | 102.04 | | | | | | | |
| | 85.02 | 89.27 | 93.52 | 98.07 | | | | | | | |
| 140 | 97.56 | 101.89 | 105.88 | 109.22 | 111.31 | | | | | | |
| | 89.25 | 93.61 | 97.93 | 102.32 | 107.18 | | | | | | |
| 150 | 101.88 | 106.59 | 110.91 | 114.93 | 118.39 | 120.70 | | | | | |
| | 93.64 | 98.18 | 102.51 | 106.79 | 111.13 | 116.02 | | | | | |
| 160 | 106.85 | 111.80 | 116.45 | 120.90 | 124.51 | 127.72 | 130.08 | | | | |
| | 98.23 | 103.10 | 107.78 | 112.29 | 116.12 | 120.02 | 124.52 | | | | |
| 170 | 111.65 | 117.16 | 122.10 | 126.42 | 130.52 | 134.42 | 137.79 | 139.69 | 140.53 | | |
| | 103.15 | 108.50 | 113.30 | 117.59 | 121.70 | 125.71 | 129.42 | 133.03 | 137.58 | | |
| 180 | 115.63 | 121.76 | 127.24 | 132.06 | 136.24 | 139.80 | 143.17 | 146.10 | 148.28 | 149.18 | |
| | 107.57 | 113.52 | 118.83 | 123.56 | 127.62 | 131.20 | 134.75 | 138.18 | 141.55 | 145.16 | |
| 190 | 118.38 | 124.88 | 130.94 | 136.19 | 140.70 | 144.54 | 147.77 | 150.35 | 152.39 | 153.49 | |
| | 112.05 | 118.40 | 124.17 | 129.38 | 133.80 | 137.72 | 141.06 | 144.13 | 147.42 | 150.82 | |
| (mm) | | | | | | | | | | | |

DIAMETER D = 400
HEIGHT h = 154
EXPANSION ANGLE λ = 120
BOSS RATIO ν = 0.35

TABLE 8

EMBODIMENT 2

| r | θ | z |
|---|---|---|
| 76.66 | 76.94 | 69.69 |
| | | 68.73 |
| 93.28 | 79.17 | 74.93 |
| | | 73.91 |
| 113.77 | 86.89 | 88.87 |
| | | 87.88 |
| 139.44 | 97.66 | 111.07 |
| | | 110.01 |
| 171.74 | 118.05 | 142.20 |
| | | 141.10 |
| 184.85 | 124.06 | 151.55 |
| | | 150.56 |
| 194.35 | 117.68 | 153.66 |
| | | 152.56 |
| 198.53 | 109.19 | 151.64 |
| | | 150.43 |
| 200.00 | 100.51 | 146.78 |
| | | 145.68 |
| 200.00 | 90.84 | 138.56 |
| | | 137.46 |
| 200.00 | 81.38 | 127.72 |
| | | 126.69 |
| 200.00 | 64.63 | 104.67 |
| | | 103.79 |
| 200.00 | 48.38 | 79.26 |
| | | 78.45 |
| 200.00 | 40.13 | 63.90 |
| | | 63.22 |
| 200.00 | 31.14 | 42.92 |
| | | 42.42 |

TABLE 8-continued

EMBODIMENT 2

| r | θ | z |
|---|---|---|
| 200.00 | 25.02 | 24.18 |
| | | 23.74 |
| 194.35 | 21.73 | 14.12 |
| | | 13.90 |
| 189.19 | 20.42 | 11.78 |
| | | 11.51 |
| 175.45 | 17.66 | 7.85 |
| | | 7.58 |
| 169.45 | 16.52 | 6.77 |
| | | 6.49 |
| 161.55 | 15.04 | 5.90 |
| | | 5.63 |
| 152.44 | 13.25 | 5.08 |
| | | 4.81 |
| 145.51 | 11.80 | 4.31 |
| | | 4.04 |
| 140.87 | 10.74 | 3.93 |
| | | 3.65 |
| 136.01 | 9.42 | 3.59 |
| | | 3.31 |
| 128.17 | 7.44 | 2.33 |
| | | 2.06 |
| 116.86 | 4.09 | 0.87 |
| | | 0.59 |
| 104.20 | 1.70 | 4.13 |
| | | 3.04 |

Embodiment 3

Propeller fan 1 having the diameter D=400 mm, the height in the axial direction (z direction) h=147 mm, the number of blades n=3, the expansion angle of a blade λ=120 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 16 below, i.e. a three-dimensional curved surface specified by Tables 9 and 10.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = D/2 = 400/2 = 200 \\ b = 0 \\ c = \lambda = 360/n = 120 \\ d = 0 \\ e_u = e_d = h = 147 \\ f_u = f_d = 0 \end{array}\right\} \quad (16)$$

TABLE 9

EMBODIMENT 3

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 80 | | 21.38 | 26.61 | 31.50 | 36.18 | 40.58 | 44.65 | 48.38 | 51.86 | 55.11 | 58.13 | 60.86 | 63.02 | 64.33 |
| | | 20.15 | 24.12 | 27.89 | 31.41 | 34.84 | 38.29 | 41.75 | 45.13 | 48.37 | 51.48 | 54.56 | 57.63 | 60.89 |
| 90 | 12.43 | 19.69 | 25.94 | 31.57 | 36.63 | 41.22 | 45.53 | 49.58 | 53.41 | 57.07 | 60.52 | 63.71 | 66.47 | 68.57 |
| | 11.74 | 17.34 | 22.40 | 26.87 | 31.03 | 35.06 | 39.00 | 42.84 | 46.57 | 50.17 | 53.62 | 56.92 | 60.08 | 63.22 |
| 100 | 10.85 | 18.24 | 24.69 | 30.65 | 36.20 | 41.39 | 46.23 | 50.78 | 55.05 | 59.10 | 62.94 | 66.53 | 69.81 | 72.63 |
| | 8.95 | 15.45 | 21.12 | 26.26 | 31.03 | 35.55 | 39.90 | 44.11 | 48.21 | 52.15 | 55.93 | 59.51 | 62.91 | 66.20 |
| 110 | 6.52 | 15.00 | 22.51 | 29.33 | 35.62 | 41.45 | 46.89 | 51.98 | 56.74 | 61.24 | 65.47 | 69.46 | 73.17 | 76.57 |
| | 5.22 | 12.77 | 19.53 | 25.59 | 31.08 | 36.14 | 40.94 | 45.53 | 49.96 | 54.25 | 58.37 | 62.30 | 66.02 | 69.56 |
| 120 | | 11.25 | 20.07 | 27.90 | 35.04 | 41.63 | 47.75 | 53.43 | 58.72 | 63.62 | 68.23 | 72.59 | 76.72 | 80.65 |
| | | 9.57 | 17.57 | 24.66 | 30.99 | 36.72 | 42.02 | 47.02 | 51.79 | 56.39 | 60.83 | 65.11 | 69.24 | 73.20 |
| 130 | | 7.37 | 17.52 | 26.42 | 34.46 | 41.82 | 48.62 | 54.90 | 60.72 | 66.13 | 71.17 | 75.93 | 80.44 | 84.77 |
| | | 6.38 | 15.46 | 23.56 | 30.84 | 37.40 | 43.35 | 48.83 | 53.97 | 58.86 | 63.59 | 68.19 | 72.65 | 76.98 |
| 140 | | | 14.14 | 24.49 | 33.55 | 41.62 | 48.93 | 55.68 | 62.00 | 67.98 | 73.70 | 79.01 | 84.05 | 88.75 |
| | | | 12.83 | 22.40 | 30.87 | 38.39 | 45.13 | 51.23 | 56.85 | 62.12 | 67.13 | 71.93 | 76.52 | 80.93 |
| 150 | | | 10.55 | 22.31 | 32.59 | 41.73 | 49.89 | 57.24 | 63.98 | 70.29 | 76.29 | 82.03 | 87.40 | 92.39 |
| | | | 9.50 | 20.14 | 29.60 | 37.95 | 45.33 | 51.99 | 58.12 | 63.93 | 69.52 | 74.90 | 79.97 | 84.77 |
| 160 | | | 6.26 | 19.50 | 31.13 | 41.52 | 50.79 | 59.05 | 66.47 | 73.23 | 79.51 | 85.50 | 91.30 | 96.83 |
| | | | 5.86 | 17.52 | 28.13 | 37.45 | 45.71 | 53.13 | 59.90 | 66.17 | 72.07 | 77.79 | 83.37 | 88.73 |
| 170 | | | | 16.73 | 29.86 | 41.38 | 51.43 | 60.30 | 68.28 | 75.56 | 82.34 | 88.74 | 94.89 | 100.86 |
| | | | | 15.08 | 26.84 | 37.00 | 46.03 | 54.18 | 61.64 | 68.54 | 75.02 | 81.18 | 87.15 | 92.96 |
| 180 | | | | 13.63 | 28.40 | 40.92 | 51.65 | 61.06 | 69.51 | 77.26 | 84.48 | 91.31 | 97.85 | 104.17 |
| | | | | 12.57 | 25.63 | 36.71 | 46.56 | 55.34 | 63.30 | 70.67 | 77.57 | 84.14 | 90.44 | 96.61 |
| 190 | | | | | 26.40 | 40.30 | 51.79 | 61.72 | 70.58 | 78.69 | 86.21 | 93.29 | 100.12 | 106.67 |
| | | | | | 24.19 | 36.88 | 47.60 | 56.88 | 65.24 | 72.98 | 80.27 | 87.28 | 94.09 | 100.65 |
| (mm) | | | | | | | | | | | | | | |

| r | θ 75 | 80 | 85 | 90 | 95 | 100 | 105 | 110 | 115 | 120 | (deg) |
|---|---|---|---|---|---|---|---|---|---|---|---|
| 80 | | | | | | | | | | | |
| 90 | 69.67 | | | | | | | | | | |
| | 66.56 | | | | | | | | | | |
| 100 | 74.74 | 75.65 | | | | | | | | | |
| | 69.53 | 73.14 | | | | | | | | | |
| 110 | 79.43 | 81.50 | 82.17 | | | | | | | | |
| | 73.06 | 76.66 | 80.75 | | | | | | | | |
| 120 | 84.19 | 87.10 | 89.02 | | | | | | | | |
| | 77.06 | 80.86 | 84.86 | | | | | | | | |
| 130 | 88.86 | 92.56 | 95.56 | 97.40 | | | | | | | |
| | 81.15 | 85.21 | 89.27 | 93.61 | | | | | | | |
| 140 | 93.12 | 97.26 | 101.06 | 104.25 | 106.25 | | | | | | |
| | 85.20 | 89.36 | 93.48 | 97.67 | 102.31 | | | | | | |
| 150 | 97.25 | 101.75 | 105.87 | 109.70 | 113.01 | 115.22 | | | | | |
| | 89.39 | 93.71 | 97.85 | 101.93 | 106.08 | 110.74 | | | | | |
| 160 | 102.00 | 106.72 | 111.15 | 115.41 | 118.85 | 121.92 | 124.16 | | | | |
| | 93.77 | 98.42 | 102.88 | 107.18 | 110.84 | 114.57 | 118.86 | | | | |
| 170 | 106.58 | 111.84 | 116.55 | 120.68 | 124.58 | 128.31 | 131.52 | 133.34 | 134.14 | | |
| | 98.46 | 103.57 | 108.15 | 112.25 | 116.17 | 119.99 | 123.53 | 126.99 | 131.32 | | |
| 180 | 110.38 | 116.22 | 121.45 | 126.05 | 130.04 | 133.44 | 136.66 | 139.46 | 141.54 | 142.40 | |
| | 102.68 | 108.36 | 113.43 | 117.95 | 121.82 | 125.23 | 128.63 | 131.90 | 135.11 | 138.56 | |

TABLE 9-continued

| EMBODIMENT 3 | | | | | | | | | | |
|---|---|---|---|---|---|---|---|---|---|---|
| 190 | 113.00 | 119.21 | 124.99 | 130.00 | 134.31 | 137.97 | 141.06 | 143.51 | 145.47 | 146.52 |
| | 106.95 | 113.02 | 118.62 | 123.50 | 127.72 | 131.46 | 134.65 | 137.58 | 140.72 | 143.97 |
| (mm) | | | | | | | | | | |

DIAMETER D = 400
HEIGHT h = 147
EXPANSION ANGLE λ = 120
BOSS RATIO ν = 0.35

TABLE 10

| EMBODIMENT 3 | | |
|---|---|---|
| r | θ | z |
| 76.66 | 76.94 | 66.52 |
| | | 65.60 |
| 93.28 | 79.17 | 71.53 |
| | | 70.55 |
| 113.77 | 86.89 | 84.83 |
| | | 83.88 |
| 139.44 | 97.66 | 106.02 |
| | | 105.01 |
| 171.74 | 118.05 | 135.73 |
| | | 134.68 |
| 184.85 | 124.06 | 144.66 |
| | | 143.71 |
| 194.35 | 117.68 | 146.67 |
| | | 145.62 |
| 198.53 | 109.19 | 144.74 |
| | | 143.59 |
| 200.00 | 100.51 | 140.11 |
| | | 139.06 |
| 200.00 | 90.84 | 132.26 |
| | | 131.21 |
| 200.00 | 81.38 | 121.92 |
| | | 120.93 |
| 200.00 | 64.63 | 99.91 |
| | | 99.07 |
| 200.00 | 48.38 | 75.65 |
| | | 74.89 |
| 200.00 | 40.13 | 60.99 |
| | | 60.34 |
| 200.00 | 31.14 | 40.97 |
| | | 40.49 |
| 200.00 | 25.02 | 23.08 |
| | | 22.66 |
| 194.35 | 21.73 | 13.48 |
| | | 13.27 |
| 189.19 | 20.42 | 11.25 |
| | | 10.98 |
| 175.45 | 17.66 | 7.50 |
| | | 7.23 |
| 169.45 | 16.52 | 6.46 |
| | | 6.20 |
| 161.55 | 15.04 | 5.63 |
| | | 5.38 |
| 152.44 | 13.25 | 4.85 |
| | | 4.59 |
| 145.51 | 11.80 | 4.12 |
| | | 3.85 |
| 140.87 | 10.74 | 3.75 |
| | | 3.49 |
| 136.01 | 9.42 | 3.42 |
| | | 3.16 |
| 128.17 | 7.44 | 2.23 |
| | | 1.96 |
| 116.86 | 4.09 | 0.83 |
| | | 0.57 |
| 104.20 | 1.70 | 3.94 |
| | | 2.90 |

Embodiment 4

Propeller fan 1 having the diameter D=400 mm, the height in the axial direction (z direction) h=133 mm, the number of blades n=3, the expansion angle of a blade λ=120 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 17 below, i.e. a three-dimensional curved surface specified by Tables 11 and 12.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant)} \\ \text{wherein} \\ a = D/2 = 400/2 = 200 \\ b = 0 \\ c = \lambda = 360/n = 120 \\ d = 0 \\ e_u = e_d = h = 133 \\ f_u = f_d = 0 \end{array}\right\} \quad (17)$$

TABLE 11

| EMBODIMENT 4 | | | | | | | | | | | | | | | |
|---|---|---|---|---|---|---|---|---|---|---|---|---|---|---|---|
| | θ | | | | | | | | | | | | | | |
| r | 5 | 10 | 15 | 20 | 25 | 30 | 35 | 40 | 45 | 50 | 55 | 60 | 65 | 70 | 75 (deg) |
| 80 | | 19.34 | 24.07 | 28.50 | 32.74 | 36.72 | 40.39 | 43.78 | 46.92 | 49.87 | 52.59 | 55.06 | 57.02 | 58.21 | |
| | | 18.23 | 21.82 | 25.23 | 28.41 | 31.52 | 34.65 | 37.77 | 40.83 | 43.77 | 46.58 | 49.36 | 52.15 | 55.09 | |
| 90 | 11.25 | 17.81 | 23.47 | 28.57 | 33.15 | 37.30 | 41.19 | 44.86 | 48.33 | 51.63 | 54.76 | 57.65 | 60.14 | 62.04 | 63.03 |

TABLE 11-continued

| EMBODIMENT 4 | | | | | | | | | | | | | | | |
|---|---|---|---|---|---|---|---|---|---|---|---|---|---|---|---|
| | 10.62 | 15.68 | 20.26 | 24.31 | 28.07 | 31.72 | 35.28 | 38.76 | 42.13 | 45.39 | 48.52 | 51.50 | 54.36 | 57.20 | 60.22 |
| 100 | 9.81 | 16.50 | 22.33 | 27.73 | 32.76 | 37.45 | 41.83 | 45.94 | 49.81 | 53.48 | 56.94 | 60.19 | 63.17 | 65.71 | 67.62 |
| | 8.09 | 13.97 | 19.10 | 23.76 | 28.07 | 32.17 | 36.10 | 39.91 | 43.61 | 47.19 | 50.61 | 53.85 | 56.91 | 59.90 | 62.91 |
| 110 | 5.90 | 13.58 | 20.37 | 26.53 | 32.22 | 37.51 | 42.43 | 47.03 | 51.34 | 55.40 | 59.23 | 62.84 | 66.21 | 69.27 | 71.87 |
| | 4.72 | 11.55 | 17.67 | 23.15 | 28.12 | 32.70 | 37.04 | 41.19 | 45.20 | 49.09 | 52.81 | 56.36 | 59.74 | 62.94 | 66.10 |
| 120 | | 10.17 | 18.15 | 25.24 | 31.70 | 37.67 | 43.21 | 48.35 | 53.12 | 57.56 | 61.73 | 65.67 | 69.42 | 72.97 | 76.17 |
| | | 8.65 | 15.89 | 22.32 | 28.03 | 33.22 | 38.02 | 42.54 | 46.85 | 51.02 | 55.03 | 58.91 | 62.64 | 66.22 | 69.72 |
| 130 | | 6.67 | 15.86 | 23.90 | 31.18 | 37.84 | 43.99 | 49.68 | 54.94 | 59.83 | 64.39 | 68.69 | 72.78 | 76.69 | 80.40 |
| | | 5.78 | 13.98 | 21.32 | 27.90 | 33.84 | 39.23 | 44.18 | 48.83 | 53.26 | 57.53 | 61.69 | 65.73 | 69.64 | 73.43 |
| 140 | | | 12.80 | 22.15 | 30.35 | 37.66 | 44.27 | 50.38 | 56.10 | 61.50 | 66.68 | 71.49 | 76.05 | 80.29 | 84.26 |
| | | | 11.61 | 20.26 | 27.93 | 34.73 | 40.83 | 46.35 | 51.43 | 56.20 | 60.73 | 65.08 | 69.24 | 73.23 | 77.08 |
| 150 | | | 9.55 | 20.19 | 29.49 | 37.75 | 45.13 | 51.78 | 57.88 | 63.59 | 69.03 | 74.21 | 79.08 | 83.59 | 87.99 |
| | | | 8.60 | 18.22 | 26.78 | 34.33 | 41.01 | 47.03 | 52.58 | 57.85 | 62.90 | 67.76 | 72.35 | 76.69 | 80.87 |
| 160 | | | 5.66 | 17.64 | 28.17 | 37.56 | 45.95 | 53.43 | 60.14 | 66.25 | 71.93 | 77.36 | 82.60 | 87.61 | 92.28 |
| | | | 5.30 | 15.86 | 25.45 | 33.89 | 41.35 | 48.07 | 54.20 | 59.87 | 65.21 | 70.39 | 75.43 | 80.28 | 84.84 |
| 170 | | | | 15.13 | 27.02 | 37.44 | 46.53 | 54.56 | 61.78 | 68.36 | 74.50 | 80.28 | 85.85 | 91.26 | 96.43 |
| | | | | 13.64 | 24.28 | 33.48 | 41.65 | 49.02 | 55.77 | 62.02 | 67.88 | 73.44 | 78.85 | 84.10 | 89.08 |
| 180 | | | | 12.33 | 25.70 | 37.02 | 46.73 | 55.24 | 62.89 | 69.90 | 76.44 | 82.61 | 88.53 | 94.25 | 99.86 |
| | | | | 11.37 | 23.19 | 33.21 | 42.12 | 50.07 | 57.28 | 63.94 | 70.19 | 76.12 | 81.82 | 87.41 | 92.90 |
| 190 | | | | | 23.88 | 36.46 | 46.85 | 55.84 | 63.86 | 71.19 | 78.00 | 84.41 | 90.58 | 96.51 | 102.24 |
| | | | | | 21.89 | 33.36 | 43.06 | 51.46 | 59.02 | 66.03 | 72.63 | 78.96 | 85.13 | 91.07 | 96.77 |
| (mm) | | | | | | | | | | | | | | | |

| | θ | | | | | | | | | |
|---|---|---|---|---|---|---|---|---|---|---|
| r | 80 | 85 | 90 | 95 | 100 | 105 | 110 | 115 | 120 | (deg) |
| 80 | | | | | | | | | | |
| 90 | | | | | | | | | | |
| 100 | 68.45 | | | | | | | | | |
| | 66.18 | | | | | | | | | |
| 110 | 73.74 | 74.35 | | | | | | | | |
| | 69.36 | 73.06 | | | | | | | | |
| 120 | 78.80 | 80.54 | | | | | | | | |
| | 73.16 | 76.78 | | | | | | | | |
| 130 | 83.74 | 86.46 | 88.12 | | | | | | | |
| | 77.09 | 80.77 | 84.69 | | | | | | | |
| 140 | 88.00 | 91.44 | 94.33 | 96.13 | | | | | | |
| | 80.85 | 84.58 | 88.37 | 92.57 | | | | | | |
| 150 | 92.06 | 95.79 | 99.26 | 102.25 | 104.24 | | | | | |
| | 84.79 | 88.53 | 92.23 | 95.98 | 100.20 | | | | | |
| 160 | 96.56 | 100.57 | 104.41 | 107.53 | 110.30 | 112.34 | | | | |
| | 89.04 | 93.08 | 96.98 | 100.28 | 103.65 | 107.54 | | | | |
| 170 | 101.18 | 105.45 | 109.18 | 112.72 | 116.09 | 119.00 | 120.64 | 121.36 | | |
| | 93.71 | 97.85 | 101.56 | 105.11 | 108.57 | 111.77 | 114.89 | 118.82 | | |
| 180 | 105.16 | 109.89 | 114.05 | 117.66 | 120.74 | 123.64 | 126.18 | 128.06 | 128.84 | |
| | 98.04 | 102.63 | 106.71 | 110.22 | 113.31 | 116.38 | 119.34 | 122.25 | 125.39 | |
| 190 | 107.85 | 113.09 | 117.62 | 121.51 | 124.83 | 127.62 | 129.85 | 131.61 | 132.56 | |
| | 102.26 | 107.32 | 111.74 | 115.56 | 118.94 | 121.83 | 124.48 | 127.32 | 130.25 | |
| (mm) | | | | | | | | | | |

DIAMETER D = 400
HEIGHT h = 133
EXPANSION ANGLE λ = 120
BOSS RATIO ν ± 0.35

TABLE 12

| EMBODIMENT 4 | | |
|---|---|---|
| r | θ | z |
| 76.66 | 76.94 | 60.18 |
| | | 59.36 |
| 93.28 | 79.17 | 64.71 |
| | | 63.83 |
| 113.77 | 86.89 | 76.75 |
| | | 75.90 |
| 139.44 | 97.66 | 95.92 |
| | | 95.01 |
| 171.74 | 118.05 | 122.81 |
| | | 121.86 |
| 184.85 | 124.06 | 130.88 |
| | | 130.03 |

TABLE 12-continued

| EMBODIMENT 4 | | |
|---|---|---|
| r | θ | z |
| 194.35 | 117.68 | 132.71 |
| | | 131.76 |
| 198.53 | 109.19 | 130.96 |
| | | 129.91 |
| 200.00 | 100.51 | 126.77 |
| | | 125.82 |
| 200.00 | 90.84 | 119.66 |
| | | 118.71 |
| 200.00 | 81.38 | 110.30 |
| | | 109.41 |
| 200.00 | 64.63 | 90.39 |
| | | 89.63 |

TABLE 12-continued

| EMBODIMENT 4 | | |
|---|---|---|
| r | θ | z |
| 200.00 | 48.38 | 68.45 |
| | | 67.75 |
| 200.00 | 40.13 | 55.19 |
| | | 54.60 |
| 200.00 | 31.14 | 37.07 |
| | | 36.63 |
| 200.00 | 25.02 | 20.88 |
| | | 20.50 |
| 194.35 | 21.73 | 12.20 |
| | | 12.01 |
| 189.19 | 20.42 | 10.17 |
| | | 9.94 |
| 175.45 | 17.66 | 6.78 |
| | | 6.55 |
| 169.45 | 16.52 | 5.84 |
| | | 5.61 |
| 161.55 | 15.04 | 5.09 |
| | | 4.86 |
| 152.44 | 13.25 | 4.39 |
| | | 4.15 |
| 145.51 | 11.80 | 3.72 |
| | | 3.49 |
| 140.87 | 10.74 | 3.39 |
| | | 3.15 |
| 136.01 | 9.42 | 3.10 |
| | | 2.86 |
| 128.17 | 7.44 | 2.01 |
| | | 1.78 |
| 116.86 | 4.09 | 0.75 |
| | | 0.51 |
| 104.20 | 1.70 | 3.56 |
| | | 2.62 |

Embodiment 5

Propeller fan 1 having the diameter D=400 mm, the height in the axial direction (z direction) h=126 mm, the number of blades n=3, the expansion angle of a blade λ=120 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 18, i.e. a three-dimensional curved surface specified by Tables 13 and 14.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = D/2 = 400/2 = 200 \\ b = 0 \\ c = \lambda = 360/n = 120 \\ d = 0 \\ e_u = e_d = h = 126 \\ f_u = f_d = 0 \end{array}\right\} \quad (18)$$

TABLE 13

| EMBODIMENT 5 | | | | | | | | | | | | | | | | |
|---|---|---|---|---|---|---|---|---|---|---|---|---|---|---|---|---|
| | θ | | | | | | | | | | | | | | | |
| r | 5 | 10 | 15 | 20 | 25 | 30 | 35 | 40 | 45 | 50 | 55 | 60 | 65 | 70 | 75 | (deg) |
| 80 | | 18.32 | 22.81 | 27.00 | 31.01 | 34.79 | 38.27 | 41.47 | 44.45 | 47.24 | 49.82 | 52.16 | 54.02 | 55.14 | | |
| | | 17.27 | 20.67 | 23.90 | 26.92 | 29.86 | 32.82 | 35.78 | 38.68 | 41.46 | 44.13 | 46.76 | 49.40 | 52.19 | | |
| 90 | 10.66 | 16.88 | 22.23 | 27.06 | 31.40 | 35.33 | 39.02 | 42.50 | 45.78 | 48.92 | 51.88 | 54.61 | 56.97 | 58.77 | 59.72 | |
| | 10.06 | 14.86 | 19.20 | 23.03 | 26.60 | 30.05 | 33.43 | 36.72 | 39.92 | 43.00 | 45.96 | 48.79 | 51.50 | 54.19 | 57.05 | |
| 100 | 9.30 | 15.63 | 21.16 | 26.27 | 31.03 | 35.48 | 39.63 | 43.52 | 47.19 | 50.66 | 53.95 | 57.02 | 59.84 | 62.25 | 64.06 | |
| | 7.67 | 13.24 | 18.10 | 22.51 | 26.60 | 30.47 | 34.20 | 37.81 | 41.32 | 44.70 | 47.94 | 51.01 | 53.92 | 56.75 | 59.60 | |
| 110 | 5.59 | 12.86 | 19.30 | 25.14 | 30.53 | 35.53 | 40.19 | 44.55 | 48.64 | 52.49 | 56.12 | 59.54 | 62.72 | 65.63 | 68.09 | |
| | 4.47 | 10.94 | 16.74 | 21.93 | 26.64 | 30.98 | 35.09 | 39.02 | 42.82 | 46.50 | 50.03 | 53.40 | 56.59 | 59.63 | 62.62 | |
| 120 | | 9.64 | 17.20 | 23.91 | 30.03 | 35.69 | 40.93 | 45.80 | 50.33 | 54.53 | 58.48 | 62.22 | 65.76 | 69.13 | 72.16 | |
| | | 8.20 | 15.06 | 21.14 | 26.56 | 31.47 | 36.02 | 40.30 | 44.39 | 48.33 | 52.14 | 55.81 | 59.35 | 62.74 | 66.05 | |
| 130 | | 6.32 | 15.02 | 22.64 | 29.54 | 35.85 | 41.67 | 47.06 | 52.05 | 56.68 | 61.00 | 65.08 | 68.95 | 72.66 | 76.17 | |
| | | 5.47 | 13.25 | 20.20 | 26.43 | 32.06 | 37.16 | 41.85 | 46.26 | 50.45 | 54.50 | 58.45 | 62.27 | 65.98 | 69.56 | |
| 140 | | | 12.12 | 20.99 | 28.76 | 35.68 | 41.94 | 47.73 | 53.15 | 58.27 | 63.17 | 67.73 | 72.05 | 76.07 | 79.82 | |
| | | | 11.00 | 19.20 | 26.46 | 32.90 | 38.68 | 43.91 | 48.73 | 53.24 | 57.54 | 61.65 | 65.59 | 69.37 | 73.03 | |
| 150 | | | 9.05 | 19.13 | 27.94 | 35.77 | 42.76 | 49.06 | 54.84 | 60.25 | 65.39 | 70.31 | 74.92 | 79.19 | 83.36 | |
| | | | 8.15 | 17.26 | 25.37 | 32.53 | 38.85 | 44.56 | 49.82 | 54.80 | 59.59 | 64.20 | 68.54 | 72.66 | 76.62 | |
| 160 | | | 5.36 | 16.71 | 26.69 | 35.59 | 43.53 | 50.62 | 56.97 | 62.77 | 68.15 | 73.29 | 78.26 | 83.00 | 87.43 | |
| | | | 5.02 | 15.02 | 24.11 | 32.10 | 39.18 | 45.54 | 51.35 | 56.72 | 61.78 | 66.68 | 71.46 | 76.05 | 80.37 | |
| 170 | | | | 14.34 | 25.60 | 35.47 | 44.08 | 51.69 | 58.53 | 64.76 | 70.58 | 76.06 | 81.33 | 86.45 | 91.35 | |
| | | | | 12.92 | 23.00 | 31.72 | 39.46 | 46.44 | 52.83 | 58.75 | 64.31 | 69.58 | 74.70 | 79.68 | 84.39 | |
| 180 | | | | 11.68 | 24.35 | 35.07 | 44.27 | 52.34 | 59.58 | 66.22 | 72.41 | 78.26 | 83.87 | 89.29 | 94.61 | |
| | | | | 10.77 | 21.97 | 31.46 | 39.91 | 47.43 | 54.26 | 60.57 | 66.49 | 72.12 | 77.52 | 82.81 | 88.01 | |
| 190 | | | | | 22.63 | 34.54 | 44.39 | 52.90 | 60.50 | 67.45 | 73.89 | 79.97 | 85.82 | 91.43 | 96.86 | |
| | | | | | 20.74 | 31.61 | 40.80 | 48.75 | 55.92 | 62.55 | 68.81 | 74.81 | 80.65 | 86.27 | 91.67 | |
| (mm) | | | | | | | | | | | | | | | | |

TABLE 13-continued

| EMBODIMENT 5 | | | | | | | | | | |
|---|---|---|---|---|---|---|---|---|---|---|
| | θ | | | | | | | | | |
| r | 80 | 85 | 90 | 95 | 100 | 105 | 110 | 115 | 120 | (deg) |
| 80 | | | | | | | | | | |
| 90 | | | | | | | | | | |
| 100 | 64.85 | | | | | | | | | |
| | 62.69 | | | | | | | | | |
| 110 | 69.86 | 70.43 | | | | | | | | |
| | 65.71 | 69.21 | | | | | | | | |
| 120 | 74.66 | 76.30 | | | | | | | | |
| | 69.31 | 72.74 | | | | | | | | |
| 130 | 79.34 | 81.91 | 83.48 | | | | | | | |
| | 73.04 | 76.52 | 80.24 | | | | | | | |
| 140 | 83.37 | 86.63 | 89.36 | 91.07 | | | | | | |
| | 76.59 | 80.13 | 83.72 | 87.70 | | | | | | |
| 150 | 87.21 | 90.75 | 94.03 | 96.87 | 98.76 | | | | | |
| | 80.33 | 83.87 | 87.37 | 90.93 | 94.92 | | | | | |
| 160 | 91.48 | 95.27 | 98.92 | 101.87 | 104.50 | 106.43 | | | | |
| | 84.36 | 88.18 | 91.87 | 95.00 | 98.20 | 101.88 | | | | |
| 170 | 95.86 | 99.90 | 103.44 | 106.79 | 109.98 | 112.73 | 114.29 | 114.98 | | |
| | 88.78 | 92.70 | 96.21 | 99.58 | 102.85 | 105.89 | 108.85 | 112.56 | | |
| 180 | 99.62 | 104.10 | 108.05 | 111.47 | 114.38 | 117.14 | 119.54 | 121.32 | 122.06 | |
| | 92.88 | 97.23 | 101.10 | 104.42 | 107.34 | 110.25 | 113.06 | 115.81 | 118.76 | |
| 190 | 102.18 | 107.14 | 111.43 | 115.12 | 118.26 | 120.91 | 123.01 | 124.69 | 125.59 | |
| | 96.88 | 101.67 | 105.86 | 109.48 | 112.68 | 115.42 | 117.93 | 120.62 | 123.40 | |
| (mm) | | | | | | | | | | |

DIAMETER D = 400
HEIGHT h = 126
EXPANSION ANGLE λ = 120
BOSS RATIO ν = 0.35

TABLE 14

| EMBODIMENT 5 | | |
|---|---|---|
| r | θ | z |
| 76.66 | 76.94 | 57.02 |
| | | 56.23 |
| 93.28 | 79.17 | 61.31 |
| | | 60.47 |
| 113.77 | 86.89 | 72.71 |
| | | 71.90 |
| 139.44 | 97.66 | 90.87 |
| | | 90.01 |
| 171.74 | 118.05 | 116.34 |
| | | 115.44 |
| 184.85 | 124.06 | 123.99 |
| | | 123.18 |
| 194.35 | 117.68 | 125.72 |
| | | 124.82 |
| 198.53 | 109.19 | 124.07 |
| | | 123.08 |
| 200.00 | 100.51 | 120.10 |
| | | 119.20 |
| 200.00 | 90.84 | 113.36 |
| | | 112.46 |
| 200.00 | 81.38 | 104.50 |
| | | 103.65 |
| 200.00 | 64.63 | 85.64 |
| | | 84.92 |
| 200.00 | 48.38 | 64.85 |
| | | 64.19 |
| 200.00 | 40.13 | 52.28 |
| | | 51.72 |
| 200.00 | 31.14 | 35.12 |
| | | 34.70 |
| 200.00 | 25.02 | 19.78 |
| | | 19.42 |
| 194.35 | 21.73 | 11.56 |
| | | 11.38 |
| 189.19 | 20.42 | 9.64 |

TABLE 14-continued

| EMBODIMENT 5 | | |
|---|---|---|
| r | θ | z |
| | | 9.41 |
| 175.45 | 17.66 | 6.43 |
| | | 6.20 |
| 169.45 | 16.52 | 5.54 |
| | | 5.31 |
| 161.55 | 15.04 | 4.82 |
| | | 4.61 |
| 152.44 | 13.25 | 4.16 |
| | | 3.93 |
| 145.51 | 11.80 | 3.53 |
| | | 3.30 |
| 140.87 | 10.74 | 3.21 |
| | | 2.99 |
| 136.01 | 9.42 | 2.93 |
| | | 2.71 |
| 128.17 | 7.44 | 1.91 |
| | | 1.68 |
| 116.86 | 4.09 | 0.71 |
| | | 0.49 |
| 104.20 | 1.70 | 3.38 |
| | | 2.48 |

Embodiment 6

Propeller fan 1 having the diameter D=400 mm, the height in the, axial direction (z direction) h=112 mm, the number of blades n=3, the expansion angle of a blade λ=120 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 19 below, i.e. a three-dimensional curved surface specified by Tables 15 and 16.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = D/2 = 400/2 = 200\\
&b = 0\\
&c = \lambda = 360/n = 120\\
&d = 0\\
&e_u = e_d = h = 112\\
&f_u = f_d = 0
\end{aligned}\right\} \quad (19)$$

TABLE 15

EMBODIMENT 6

| | θ | | | | | | | | | | | | | | |
|---|---|---|---|---|---|---|---|---|---|---|---|---|---|---|---|
| r | 5 | 10 | 15 | 20 | 25 | 30 | 35 | 40 | 45 | 50 | 55 | 60 | 65 | 70 | (deg.) |
| 80 | | 16.29 | 20.27 | 24.00 | 27.57 | 30.92 | 34.02 | 36.86 | 39.51 | 41.99 | 44.29 | 46.37 | 48.02 | 49.02 | |
| | | 15.35 | 18.38 | 21.25 | 23.93 | 26.54 | 29.18 | 31.81 | 34.38 | 36.86 | 39.22 | 41.57 | 43.91 | 46.39 | |
| 90 | 9.47 | 15.00 | 19.76 | 24.06 | 27.91 | 31.41 | 34.69 | 37.78 | 40.70 | 43.48 | 46.11 | 48.54 | 50.64 | 52.24 | |
| | 8.94 | 13.21 | 17.06 | 20.47 | 23.64 | 26.71 | 29.71 | 32.64 | 35.48 | 38.22 | 40.86 | 43.37 | 45.78 | 48.17 | |
| 100 | 8.26 | 13.90 | 18.81 | 23.35 | 27.58 | 31.54 | 35.22 | 38.69 | 41.94 | 45.03 | 47.95 | 50.69 | 53.19 | 55.34 | |
| | 6.82 | 11.77 | 16.09 | 20.01 | 23.64 | 27.09 | 30.40 | 33.61 | 36.73 | 39.74 | 42.62 | 45.34 | 47.93 | 50.44 | |
| 110 | 4.97 | 11.43 | 17.15 | 22.34 | 27.14 | 31.58 | 35.73 | 39.60 | 43.23 | 46.66 | 49.88 | 52.92 | 55.75 | 58.34 | |
| | 3.98 | 9.73 | 14.88 | 19.50 | 23.68 | 27.54 | 31.19 | 34.69 | 38.06 | 41.34 | 44.47 | 47.46 | 50.30 | 53.00 | |
| 120 | | 8.57 | 15.29 | 21.26 | 26.70 | 31.72 | 36.38 | 40.71 | 44.74 | 48.47 | 51.98 | 55.30 | 58.46 | 61.45 | |
| | | 7.29 | 13.38 | 18.79 | 23.61 | 27.98 | 32.02 | 35.82 | 39.46 | 42.96 | 46.34 | 49.61 | 52.75 | 55.77 | |
| 130 | | 5.62 | 13.35 | 20.13 | 26.26 | 31.86 | 37.04 | 41.83 | 46.26 | 50.38 | 54.22 | 57.85 | 61.29 | 64.58 | |
| | | 4.86 | 11.78 | 17.95 | 23.50 | 28.50 | 33.03 | 37.20 | 41.12 | 44.85 | 48.45 | 51.95 | 55.35 | 58.65 | |
| 140 | | | 10.78 | 18.66 | 25.56 | 31.71 | 37.28 | 42.42 | 47.24 | 51.79 | 56.15 | 60.20 | 64.04 | 67.62 | |
| | | | 9.78 | 17.06 | 23.52 | 29.25 | 34.38 | 39.03 | 43.31 | 47.33 | 51.14 | 54.80 | 58.30 | 61.66 | |
| 150 | | | 8.04 | 17.00 | 24.83 | 31.79 | 38.01 | 43.61 | 48.74 | 53.55 | 58.13 | 62.50 | 66.59 | 70.39 | |
| | | | 7.24 | 15.34 | 22.55 | 28.91 | 34.54 | 39.61 | 44.28 | 48.71 | 52.97 | 57.06 | 60.93 | 64.58 | |
| 160 | | | 4.77 | 14.86 | 23.72 | 31.63 | 38.70 | 44.99 | 50.64 | 55.79 | 60.58 | 65.14 | 69.56 | 73.78 | |
| | | | 4.46 | 13.35 | 21.43 | 28.54 | 34.82 | 40.48 | 45.64 | 50.42 | 54.91 | 59.27 | 63.52 | 67.60 | |
| 170 | | | | 12.74 | 22.75 | 31.53 | 39.18 | 45.94 | 52.02 | 57.57 | 62.74 | 67.61 | 72.30 | 76.85 | |
| | | | | 11.49 | 20.45 | 28.19 | 35.07 | 41.28 | 46.96 | 52.22 | 57.16 | 61.85 | 66.40 | 70.82 | |
| 180 | | | | 10.38 | 21.64 | 31.18 | 39.35 | 46.52 | 52.96 | 58.86 | 64.37 | 69.57 | 74.55 | 79.37 | |
| | | | | 9.58 | 19.53 | 27.97 | 35.47 | 42.16 | 48.23 | 53.84 | 59.10 | 64.10 | 68.90 | 73.61 | |
| 190 | | | | | 20.11 | 30.70 | 39.46 | 47.02 | 53.78 | 59.95 | 65.68 | 71.08 | 76.28 | 81.27 | |
| | | | | | 18.43 | 28.10 | 36.26 | 43.34 | 49.70 | 55.60 | 61.16 | 66.50 | 71.69 | 76.69 | |
| (mm) | | | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 80 | | | | | | | | | | | |
| 90 | 53.08 | | | | | | | | | | |
| | 50.71 | | | | | | | | | | |
| 100 | 56.94 | 57.64 | | | | | | | | | |
| | 52.98 | 55.73 | | | | | | | | | |
| 110 | 60.52 | 62.10 | 62.61 | | | | | | | | |
| | 55.66 | 58.41 | 61.52 | | | | | | | | |
| 120 | 64.14 | 66.36 | 67.82 | | | | | | | | |
| | 58.71 | 61.61 | 64.66 | | | | | | | | |
| 130 | 67.70 | 70.52 | 72.81 | 74.21 | | | | | | | |
| | 61.83 | 64.92 | 68.02 | 71.32 | | | | | | | |
| 140 | 70.95 | 74.10 | 77.00 | 79.43 | 80.95 | | | | | | |
| | 64.91 | 68.08 | 71.22 | 74.42 | 77.95 | | | | | | |
| 150 | 74.10 | 77.52 | 80.66 | 83.58 | 86.10 | 87.78 | | | | | |
| | 68.10 | 71.40 | 74.55 | 77.66 | 80.82 | 84.38 | | | | | |
| 160 | 77.71 | 81.31 | 84.69 | 87.93 | 90.55 | 92.89 | 94.60 | | | | |
| | 71.44 | 74.98 | 78.38 | 81.66 | 84.45 | 87.29 | 90.56 | | | | |
| 170 | 81.20 | 85.21 | 88.80 | 91.94 | 94.92 | 97.76 | 100.21 | 101.59 | 102.20 | | |
| | 75.02 | 78.91 | 82.40 | 85.52 | 88.51 | 91.42 | 94.12 | 96.75 | 100.06 | | |
| 180 | 84.10 | 88.55 | 92.54 | 96.04 | 99.08 | 101.67 | 104.12 | 106.26 | 107.84 | 108.50 | |
| | 78.23 | 82.56 | 86.42 | 89.86 | 92.82 | 95.42 | 98.00 | 100.50 | 102.94 | 105.57 | |

TABLE 15-continued

| EMBODIMENT 6 | | | | | | | | | | |
|---|---|---|---|---|---|---|---|---|---|---|
| 190 | 86.10 | 90.82 | 95.23 | 99.05 | 102.33 | 105.12 | 107.47 | 109.34 | 110.83 | 111.63 |
| | 81.49 | 86.11 | 90.38 | 94.10 | 97.31 | 100.16 | 102.59 | 104.82 | 107.22 | 109.69 |
| (mm) | | | | | | | | | | |

DIAMETER D = 400
HEIGHT h = 112
EXPANSION ANGLE λ = 120
BOSS RATIO ν = 0.35

TABLE 16

| EMBODIMENT 6 | | |
|---|---|---|
| r | θ | z |
| 76.66 | 76.94 | 50.68 |
| | | 49.98 |
| 93.28 | 79.17 | 54.50 |
| | | 53.75 |
| 113.77 | 86.89 | 64.63 |
| | | 63.91 |
| 139.44 | 97.66 | 80.78 |
| | | 80.01 |
| 171.74 | 118.05 | 103.42 |
| | | 102.62 |
| 184.85 | 124.06 | 110.22 |
| | | 109.50 |
| 194.35 | 117.68 | 111.75 |
| | | 110.95 |
| 198.53 | 109.19 | 110.28 |
| | | 109.40 |
| 200.00 | 100.51 | 106.75 |
| | | 105.95 |
| 200.00 | 90.84 | 100.77 |
| | | 99.97 |
| 200.00 | 81.38 | 92.89 |
| | | 92.14 |
| 200.00 | 64.63 | 76.12 |
| | | 75.48 |
| 200.00 | 48.38 | 57.64 |
| | | 57.06 |
| 200.00 | 40.13 | 46.47 |
| | | 45.98 |
| 200.00 | 31.14 | 31.22 |
| | | 30.85 |
| 200.00 | 25.02 | 17.58 |
| | | 17.26 |
| 194.35 | 21.73 | 10.27 |
| | | 10.11 |
| 189.19 | 20.42 | 8.57 |
| | | 8.37 |
| 175.45 | 17.66 | 5.71 |
| | | 5.51 |
| 169.45 | 16.52 | 4.92 |
| | | 4.72 |
| 161.55 | 15.04 | 4.29 |
| | | 4.10 |
| 152.44 | 13.25 | 3.70 |
| | | 3.50 |
| 145.51 | 11.80 | 3.14 |
| | | 2.94 |

TABLE 16-continued

| EMBODIMENT 6 | | |
|---|---|---|
| r | θ | z |
| 140.87 | 10.74 | 2.86 |
| | | 2.66 |
| 136.01 | 9.42 | 2.61 |
| | | 2.41 |
| 128.17 | 7.44 | 1.70 |
| | | 1.50 |
| 116.86 | 4.09 | 0.63 |
| | | 0.43 |
| 104.20 | 1.70 | 3.00 |
| | | 2.21 |

Embodiment 7

Propeller fan 1 having the diameter D=400 mm, the height in the axial direction (z direction) h=126 mm, the number of blades n=3, the expansion angle of a blade λ=108 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 20 below, i.e. a three-dimensional curved surface specified by Tables 17 and 18.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = D/2 = 400/2 = 200 \\ b = 0 \\ c = \frac{2400}{7} \times \frac{h}{D} = \frac{2400}{7} \times \frac{126}{400} = 108 \\ d = 0 \\ e_u = e_d = h = 126 \\ f_u = f_d = 0 \end{array}\right\} \quad (20)$$

TABLE 17

| EMBODIMENT 7 | | | | | | | | | | | | | | | |
|---|---|---|---|---|---|---|---|---|---|---|---|---|---|---|---|
| | θ | | | | | | | | | | | | | | |
| r | 4.5 | 9 | 13.5 | 18 | 22.5 | 27 | 31.5 | 36 | 40.5 | 45 | 49.5 | 54 | 58.5 | 63 | 67.5 (deg) |
| 80 | | 18.32 | 22.81 | 27.00 | 31.01 | 34.79 | 38.27 | 41.47 | 44.45 | 47.24 | 49.82 | 52.16 | 54.02 | 55.14 | |
| | | 17.27 | 20.67 | 23.90 | 26.92 | 29.86 | 32.82 | 35.78 | 38.68 | 41.46 | 44.13 | 46.76 | 49.40 | 52.19 | |

TABLE 17-continued

EMBODIMENT 7

| | | | | | | | | | | | | | | | |
|---|---|---|---|---|---|---|---|---|---|---|---|---|---|---|---|
| 90 | 10.66 | 16.88 | 22.23 | 27.06 | 31.40 | 35.33 | 39.02 | 42.50 | 45.78 | 48.92 | 51.88 | 54.61 | 56.97 | 58.77 | 59.72 |
| | 10.06 | 14.86 | 19.20 | 23.03 | 26.60 | 30.05 | 33.43 | 36.72 | 39.92 | 43.00 | 45.96 | 48.79 | 51.50 | 54.19 | 57.05 |
| 100 | 9.30 | 15.63 | 21.16 | 26.27 | 31.03 | 35.48 | 39.63 | 43.52 | 47.19 | 50.66 | 53.95 | 57.02 | 59.84 | 62.25 | 64.06 |
| | 7.67 | 13.24 | 18.10 | 22.51 | 26.60 | 30.47 | 34.20 | 37.81 | 41.32 | 44.70 | 47.94 | 51.01 | 53.92 | 56.75 | 59.60 |
| 110 | 5.59 | 12.86 | 19.30 | 25.14 | 30.53 | 35.53 | 40.19 | 44.55 | 48.64 | 52.49 | 56.12 | 59.54 | 62.72 | 65.63 | 68.09 |
| | 4.47 | 10.94 | 16.74 | 21.93 | 26.64 | 30.98 | 35.09 | 39.02 | 42.82 | 46.50 | 50.03 | 53.40 | 56.59 | 59.63 | 62.62 |
| 120 | | 9.64 | 17.20 | 23.91 | 30.03 | 35.69 | 40.93 | 45.80 | 50.33 | 54.53 | 58.48 | 62.22 | 65.76 | 69.13 | 72.16 |
| | | 8.20 | 15.06 | 21.14 | 26.56 | 31.47 | 36.02 | 40.30 | 44.39 | 48.33 | 52.14 | 55.81 | 59.35 | 62.74 | 66.05 |
| 130 | | 6.32 | 15.02 | 22.64 | 29.54 | 35.85 | 41.67 | 47.06 | 52.05 | 56.68 | 61.00 | 65.08 | 68.95 | 72.66 | 76.17 |
| | | 5.47 | 13.25 | 20.20 | 26.43 | 32.06 | 37.16 | 41.85 | 46.26 | 50.45 | 54.50 | 58.45 | 62.27 | 65.98 | 69.56 |
| 140 | | | 12.12 | 20.99 | 28.76 | 35.68 | 41.94 | 47.73 | 53.15 | 58.27 | 63.17 | 67.73 | 72.05 | 76.07 | 79.82 |
| | | | 11.00 | 19.20 | 26.46 | 32.90 | 38.68 | 43.91 | 48.73 | 53.24 | 57.54 | 61.65 | 65.59 | 69.37 | 73.03 |
| 150 | | | 9.05 | 19.13 | 27.94 | 35.77 | 42.76 | 49.06 | 54.84 | 60.25 | 65.39 | 70.31 | 74.92 | 79.19 | 83.36 |
| | | | 8.15 | 17.26 | 25.37 | 32.53 | 38.85 | 44.56 | 49.82 | 54.80 | 59.59 | 64.20 | 68.54 | 72.66 | 76.62 |
| 160 | | | 5.36 | 16.71 | 26.69 | 35.59 | 43.53 | 50.62 | 56.97 | 62.77 | 68.15 | 73.29 | 78.26 | 83.00 | 87.43 |
| | | | 5.02 | 15.02 | 24.11 | 32.10 | 39.18 | 45.54 | 51.35 | 56.72 | 61.78 | 66.68 | 71.46 | 76.05 | 80.37 |
| 170 | | | | 14.34 | 25.60 | 35.47 | 44.08 | 51.69 | 58.53 | 64.76 | 70.58 | 76.06 | 81.33 | 86.45 | 91.35 |
| | | | | 12.92 | 23.00 | 31.72 | 39.46 | 46.44 | 52.83 | 58.75 | 64.31 | 69.58 | 74.70 | 79.68 | 84.39 |
| 180 | | | | 11.68 | 24.35 | 35.07 | 44.27 | 52.34 | 59.58 | 66.22 | 72.41 | 78.26 | 83.87 | 89.29 | 94.61 |
| | | | | 10.77 | 21.97 | 31.46 | 39.91 | 47.43 | 54.26 | 60.57 | 66.49 | 72.12 | 77.52 | 82.81 | 88.01 |
| 190 | | | | | 22.63 | 34.54 | 44.39 | 52.90 | 60.50 | 67.45 | 73.89 | 79.97 | 85.82 | 91.43 | 96.86 |
| | | | | | 20.74 | 31.61 | 40.80 | 48.75 | 55.92 | 62.55 | 68.81 | 74.81 | 80.65 | 86.27 | 91.67 |
| (mm) | | | | | | | | | | | | | | | |

| | θ | | | | | | | | | |
|---|---|---|---|---|---|---|---|---|---|---|
| r | 72 | 76.5 | 81 | 85.5 | 90 | 94.5 | 99 | 103.5 | 108 | (deg) |
| 80 | | | | | | | | | | |
| 90 | | | | | | | | | | |
| 100 | 64.85 | | | | | | | | | |
| | 62.69 | | | | | | | | | |
| 110 | 69.86 | 70.43 | | | | | | | | |
| | 65.71 | 69.21 | | | | | | | | |
| 120 | 74.66 | 76.30 | | | | | | | | |
| | 69.31 | 72.74 | | | | | | | | |
| 130 | 79.34 | 81.91 | 83.48 | | | | | | | |
| | 73.04 | 76.52 | 80.24 | | | | | | | |
| 140 | 83.37 | 86.63 | 89.36 | 91.07 | | | | | | |
| | 76.59 | 80.13 | 83.72 | 87.70 | | | | | | |
| 150 | 87.21 | 90.75 | 94.03 | 96.87 | 98.76 | | | | | |
| | 80.33 | 83.87 | 87.37 | 90.93 | 94.92 | | | | | |
| 160 | 91.48 | 95.27 | 98.92 | 101.87 | 104.50 | 106.43 | | | | |
| | 84.36 | 88.18 | 91.87 | 95.00 | 98.20 | 101.88 | | | | |
| 170 | 95.86 | 99.90 | 103.44 | 106.79 | 109.98 | 112.73 | 114.29 | 114.98 | | |
| | 88.78 | 92.70 | 96.21 | 99.58 | 102.85 | 105.89 | 108.85 | 112.56 | | |
| 180 | 99.62 | 104.10 | 108.05 | 111.47 | 114.38 | 117.14 | 119.54 | 121.32 | 122.06 | |
| | 92.88 | 97.23 | 101.10 | 104.42 | 107.34 | 110.25 | 113.06 | 115.81 | 118.76 | |
| 190 | 102.18 | 107.14 | 111.43 | 115.12 | 118.26 | 120.91 | 123.01 | 124.69 | 125.59 | |
| | 96.88 | 101.67 | 105.86 | 109.48 | 112.68 | 115.42 | 117.93 | 120.62 | 123.40 | |
| (mm) | | | | | | | | | | |

DIAMETER D = 400
HEIGHT h = 126
EXPANSION ANGLE λ = 108
BOSS RATIO ν = 0.35

TABLE 18

EMBODIMENT 7

| r | θ | z |
|---|---|---|
| 76.66 | 69.25 | 57.02 |
| | | 56.23 |
| 93.28 | 71.25 | 61.31 |
| | | 60.47 |
| 113.77 | 78.20 | 72.71 |
| | | 71.90 |
| 139.44 | 87.89 | 90.87 |
| | | 90.01 |
| 171.74 | 106.25 | 116.34 |
| | | 115.44 |

TABLE 18-continued

EMBODIMENT 7

| r | θ | z |
|---|---|---|
| 184.85 | 111.65 | 123.99 |
| | | 123.18 |
| 194.35 | 105.91 | 125.72 |
| | | 124.82 |
| 198.53 | 98.27 | 124.07 |
| | | 123.08 |
| 200.00 | 90.46 | 120.10 |
| | | 119.20 |
| 200.00 | 81.76 | 113.36 |
| | | 112.46 |

TABLE 18-continued

| EMBODIMENT 7 | | |
|---|---|---|
| r | θ | z |
| 200.00 | 73.24 | 104.50 |
| | | 103.65 |
| 200.00 | 58.17 | 85.64 |
| | | 84.92 |
| 200.00 | 43.54 | 64.85 |
| | | 64.19 |
| 200.00 | 36.12 | 52.28 |
| | | 51.72 |
| 200.00 | 28.03 | 35.12 |
| | | 34.70 |
| 200.00 | 22.52 | 19.78 |
| | | 19.42 |
| 194.35 | 19.56 | 11.56 |
| | | 11.38 |
| 189.19 | 18.38 | 9.64 |
| | | 9.41 |
| 175.45 | 15.89 | 6.43 |
| | | 6.20 |
| 169.45 | 14.87 | 5.54 |
| | | 5.31 |
| 161.55 | 13.54 | 4.82 |
| | | 4.61 |
| 152.44 | 11.93 | 4.16 |
| | | 3.93 |
| 145.51 | 10.62 | 3.53 |
| | | 3.30 |
| 140.87 | 9.67 | 3.21 |
| | | 2.99 |
| 136.01 | 8.48 | 2.93 |
| | | 2.71 |
| 128.17 | 6.70 | 1.91 |
| | | 1.68 |
| 116.86 | 3.68 | 0.71 |
| | | 0.49 |

TABLE 18-continued

| EMBODIMENT 7 | | |
|---|---|---|
| r | θ | z |
| 104.20 | 1.53 | 3.38 |
| | | 2.48 |

Embodiment 8

Propeller fan 1 having the diameter D=400 mm, the height in the axial direction (z direction) h=140 mm, the number of blades n=3, the expansion angle of a blade λ=90 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 21 below, i.e. a three-dimensional curved surface specified by Tables 19 and 20.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = D/2 = 400/2 = 200 \\ b = 0 \\ c = \lambda = 90 \\ d = 0 \\ e_u = e_d = h = 140 \\ f_u = f_d = 0 \end{array}\right\} \quad (21)$$

TABLE 19

| EMBODIMENT 8 | | | | | | | | | | | | | | | | |
|---|---|---|---|---|---|---|---|---|---|---|---|---|---|---|---|---|
| | θ | | | | | | | | | | | | | | | |
| r | 3.75 | 7.5 | 11.25 | 15 | 18.75 | 22.5 | 26.25 | 30 | 33.75 | 37.5 | 41.25 | 45 | 48.75 | 52.5 | 56.25 | (deg) |
| 80 | | 20.36 | 25.34 | 30.00 | 34.46 | 38.65 | 42.52 | 46.08 | 49.39 | 52.49 | 55.36 | 57.96 | 60.02 | 61.27 | | |
| | | 19.19 | 22.97 | 26.56 | 29.91 | 33.18 | 36.47 | 39.76 | 42.98 | 46.07 | 49.03 | 51.96 | 54.89 | 57.99 | | |
| 90 | 11.84 | 18.75 | 24.70 | 30.07 | 34.89 | 39.26 | 43.36 | 47.22 | 50.87 | 54.35 | 57.64 | 60.68 | 63.30 | 65.30 | 66.35 | |
| | 11.18 | 16.51 | 21.33 | 25.59 | 29.55 | 33.39 | 37.14 | 40.80 | 44.35 | 47.78 | 51.07 | 54.21 | 57.22 | 60.21 | 63.39 | |
| 100 | 10.33 | 17.37 | 23.51 | 29.19 | 34.48 | 39.42 | 44.03 | 48.36 | 52.43 | 56.29 | 59.94 | 63.36 | 66.49 | 69.17 | 71.18 | |
| | 8.52 | 14.71 | 20.11 | 25.01 | 29.55 | 33.86 | 38.00 | 42.01 | 45.91 | 49.67 | 53.27 | 56.68 | 59.91 | 63.05 | 66.22 | |
| 110 | 6.21 | 14.29 | 21.44 | 27.93 | 33.92 | 39.48 | 44.66 | 49.50 | 54.04 | 58.32 | 62.35 | 66.15 | 69.69 | 72.92 | 75.65 | |
| | 4.97 | 12.16 | 18.60 | 24.37 | 29.60 | 34.42 | 38.99 | 43.36 | 47.58 | 51.67 | 55.59 | 59.33 | 62.88 | 66.25 | 69.58 | |
| 120 | | 10.71 | 19.11 | 26.57 | 33.37 | 39.65 | 45.48 | 50.89 | 55.92 | 60.59 | 64.98 | 69.13 | 73.07 | 76.81 | 80.18 | |
| | | 9.11 | 16.73 | 23.49 | 29.51 | 34.97 | 40.02 | 44.78 | 49.32 | 53.70 | 57.93 | 62.01 | 65.94 | 69.71 | 73.39 | |
| 130 | | 7.02 | 16.69 | 25.16 | 32.82 | 39.83 | 46.30 | 52.29 | 57.83 | 62.98 | 67.78 | 72.31 | 76.61 | 80.73 | 84.63 | |
| | | 6.08 | 14.72 | 22.44 | 29.37 | 35.62 | 41.29 | 46.50 | 51.40 | 56.06 | 60.56 | 64.94 | 69.19 | 73.31 | 77.29 | |
| 140 | | | 13.47 | 23.32 | 31.95 | 39.64 | 46.60 | 53.03 | 59.05 | 64.74 | 70.19 | 75.25 | 80.05 | 84.52 | 88.69 | |
| | | | 12.22 | 21.33 | 29.40 | 36.56 | 42.98 | 48.79 | 54.14 | 59.16 | 63.93 | 68.50 | 72.88 | 77.08 | 81.14 | |
| 150 | | | 10.05 | 21.25 | 31.04 | 39.74 | 47.51 | 54.51 | 60.93 | 66.94 | 72.66 | 78.12 | 83.24 | 87.99 | 92.62 | |
| | | | 9.05 | 19.18 | 28.19 | 36.14 | 43.17 | 49.51 | 55.35 | 60.89 | 66.21 | 71.33 | 76.16 | 80.73 | 85.13 | |
| 160 | | | 5.96 | 18.57 | 29.65 | 39.54 | 48.37 | 56.24 | 63.30 | 69.74 | 75.72 | 81.43 | 86.95 | 92.22 | 97.14 | |
| | | | 5.58 | 16.69 | 26.79 | 35.67 | 43.53 | 50.60 | 57.05 | 63.02 | 68.64 | 74.09 | 79.40 | 84.50 | 89.30 | |
| 170 | | | | 15.93 | 28.44 | 39.41 | 48.98 | 57.43 | 65.03 | 71.96 | 78.42 | 84.51 | 90.37 | 96.06 | 101.50 | |
| | | | | 14.36 | 25.56 | 35.24 | 43.84 | 51.60 | 58.70 | 65.28 | 71.45 | 77.31 | 83.00 | 88.53 | 93.77 | |
| 180 | | | | 12.98 | 27.05 | 38.97 | 49.19 | 58.15 | 66.20 | 73.58 | 80.46 | 86.96 | 93.19 | 99.21 | 105.12 | |
| | | | | 11.97 | 24.41 | 34.96 | 44.34 | 52.70 | 60.29 | 67.30 | 73.88 | 80.13 | 86.13 | 92.01 | 97.79 | |
| 190 | | | | | 25.14 | 38.38 | 49.32 | 58.78 | 67.22 | 74.94 | 82.10 | 88.85 | 95.35 | 101.59 | 107.62 | |
| | | | | | 23.04 | 35.12 | 45.33 | 54.17 | 62.13 | 69.50 | 76.45 | 83.12 | 89.61 | 95.86 | 101.86 | |
| (mm) | | | | | | | | | | | | | | | | |

TABLE 19-continued

| EMBODIMENT 8 | | | | | | | | | | |
|---|---|---|---|---|---|---|---|---|---|---|
| | θ | | | | | | | | | |
| r | 60 | 63.75 | 67.5 | 71.25 | 75 | 78.75 | 82.5 | 86.25 | 90 | (deg) |
| 80 | | | | | | | | | | |
| 90 | | | | | | | | | | |
| 100 | 72.05 | | | | | | | | | |
| | 69.66 | | | | | | | | | |
| 110 | 77.62 | 78.26 | | | | | | | | |
| | 73.01 | 76.90 | | | | | | | | |
| 120 | 82.95 | 84.78 | | | | | | | | |
| | 77.01 | 80.82 | | | | | | | | |
| 130 | 88.15 | 91.01 | 92.76 | | | | | | | |
| | 81.15 | 85.02 | 89.15 | | | | | | | |
| 140 | 92.63 | 96.25 | 99.29 | 101.19 | | | | | | |
| | 85.10 | 89.03 | 93.02 | 97.44 | | | | | | |
| 150 | 96.90 | 100.83 | 104.48 | 107.63 | 109.73 | | | | | |
| | 89.25 | 93.19 | 97.08 | 101.03 | 105.47 | | | | | |
| 160 | 101.64 | 105.86 | 109.91 | 113.19 | 116.11 | 118.25 | | | | |
| | 93.73 | 97.98 | 102.08 | 105.56 | 109.11 | 113.20 | | | | |
| 170 | 106.51 | 111.00 | 114.93 | 118.65 | 122.20 | 125.26 | 126.99 | 127.75 | | |
| | 98.64 | 103.00 | 106.90 | 110.64 | 114.28 | 117.65 | 120.94 | 125.07 | | |
| 180 | 110.69 | 115.67 | 120.05 | 123.85 | 127.09 | 130.15 | 132.82 | 134.80 | 135.62 | |
| | 103.20 | 108.03 | 112.33 | 116.02 | 119.27 | 122.50 | 125.62 | 128.68 | 131.96 | |
| 190 | 113.53 | 119.04 | 123.81 | 127.91 | 131.40 | 134.34 | 136.68 | 138.54 | 139.54 | |
| | 107.64 | 112.97 | 117.62 | 121.64 | 125.20 | 128.24 | 131.03 | 134.02 | 137.11 | |
| (mm) | | | | | | | | | | |

DIAMETER D = 400
HEIGHT h = 140
EXPANSION ANGLE λ =90
BOSS RATIO ν = 0.35

TABLE 20

| r | θ | z |
|---|---|---|
| 76.66 | 57.71 | 63.35 |
| | | 62.48 |
| 93.28 | 59.38 | 68.12 |
| | | 67.19 |
| 113.77 | 65.17 | 80.79 |
| | | 79.89 |
| 139.44 | 73.25 | 100.97 |
| | | 100.01 |
| 171.74 | 88.54 | 129.27 |
| | | 128.27 |
| 184.85 | 93.05 | 137.77 |
| | | 136.87 |
| 194.35 | 88.26 | 139.69 |
| | | 138.69 |
| 198.53 | 81.89 | 137.85 |
| | | 136.75 |
| 200.00 | 75.38 | 133.44 |
| | | 132.44 |
| 200.00 | 68.13 | 125.96 |
| | | 124.96 |
| 200.00 | 61.04 | 116.11 |
| | | 115.17 |
| 200.00 | 48.47 | 95.15 |
| | | 94.35 |
| 200.00 | 36.29 | 72.05 |
| | | 71.32 |
| 200.00 | 30.10 | 58.09 |
| | | 57.47 |
| 200.00 | 23.36 | 39.02 |
| | | 38.56 |
| 200.00 | 18.77 | 21.98 |
| | | 21.58 |
| 194.35 | 16.30 | 12.84 |
| | | 12.64 |
| 189.19 | 15.32 | 10.71 |
| | | 10.46 |
| 175.45 | 13.25 | 7.14 |
| | | 6.89 |
| 169.45 | 12.39 | 6.15 |
| | | 5.90 |
| 161.55 | 11.28 | 5.36 |
| | | 5.12 |
| 152.44 | 9.94 | 4.62 |
| | | 4.37 |
| 145.51 | 8.85 | 3.92 |
| | | 3.67 |
| 140.87 | 8.06 | 3.57 |
| | | 3.32 |
| 136.01 | 7.07 | 3.26 |
| | | 3.01 |
| 128.17 | 5.58 | 2.12 |
| | | 1.87 |
| 116.86 | 3.07 | 0.79 |
| | | 0.54 |
| 104.20 | 1.27 | 3.75 |
| | | 2.76 |

Embodiment 9

Propeller fan 1 having the diameter D=400 mm, the height in the axial direction (z direction) h=140 mm, the number of blades n=3, the expansion angle of a blade λ=132 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 22 below, i.e. a three-dimensional curved surface specified by Tables 21 and 22.

$$
\left.
\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = D/2 = 400/2 = 200\\
&b = 0\\
&c = \lambda = 132\\
&d = 0\\
&e_u = e_d = h = 140\\
&f_u = f_d = 0
\end{aligned}
\right\} \quad (22)
$$

TABLE 21

EMBODIMENT 9

| r | θ 5.5 | 11 | 16.5 | 22 | 27.5 | 33 | 38.5 | 44 | 49.5 | 55 | 60.5 | 66 | 71.5 | 77 |
|---|---|---|---|---|---|---|---|---|---|---|---|---|---|---|
| 80 | | 20.36 | 25.34 | 30.00 | 34.46 | 38.65 | 42.52 | 46.08 | 49.39 | 52.49 | 55.36 | 57.96 | 60.02 | 61.27 |
| | | 19.19 | 22.97 | 26.56 | 29.91 | 33.18 | 36.47 | 39.76 | 42.98 | 46.07 | 49.03 | 51.96 | 54.89 | 57.99 |
| 90 | 11.84 | 18.75 | 24.70 | 30.07 | 34.89 | 39.26 | 43.36 | 47.22 | 50.87 | 54.35 | 57.64 | 60.68 | 63.30 | 65.30 |
| | 11.18 | 16.51 | 21.33 | 25.59 | 29.55 | 33.39 | 37.14 | 40.80 | 44.35 | 47.78 | 51.07 | 54.21 | 57.22 | 60.21 |
| 100 | 10.33 | 17.37 | 23.51 | 29.19 | 34.48 | 39.42 | 44.03 | 48.36 | 52.43 | 56.29 | 59.94 | 63.36 | 66.49 | 69.17 |
| | 8.52 | 14.71 | 20.11 | 25.01 | 29.55 | 33.86 | 38.00 | 42.01 | 45.91 | 49.67 | 53.27 | 56.68 | 59.91 | 63.05 |
| 110 | 6.21 | 14.29 | 21.44 | 27.93 | 33.92 | 39.48 | 44.66 | 49.50 | 54.04 | 58.32 | 62.35 | 66.15 | 69.69 | 72.92 |
| | 4.97 | 12.16 | 18.60 | 24.37 | 29.60 | 34.42 | 38.99 | 43.36 | 47.58 | 51.67 | 55.59 | 59.33 | 62.88 | 66.25 |
| 120 | | 10.71 | 19.11 | 26.57 | 33.37 | 39.65 | 45.48 | 50.89 | 55.92 | 60.59 | 64.98 | 69.13 | 73.07 | 76.81 |
| | | 9.11 | 16.73 | 23.49 | 29.51 | 34.97 | 40.02 | 44.78 | 49.32 | 53.70 | 57.93 | 62.01 | 65.94 | 69.71 |
| 130 | | 7.02 | 16.69 | 25.16 | 32.82 | 39.83 | 46.30 | 52.29 | 57.83 | 62.98 | 67.78 | 72.31 | 76.61 | 80.73 |
| | | 6.08 | 14.72 | 22.44 | 29.37 | 35.62 | 41.29 | 46.50 | 51.40 | 56.06 | 60.56 | 64.94 | 69.19 | 73.31 |
| 140 | | | 13.47 | 23.32 | 31.95 | 39.64 | 46.60 | 53.03 | 59.05 | 64.74 | 70.19 | 75.25 | 80.05 | 84.52 |
| | | | 12.22 | 21.33 | 29.40 | 36.56 | 42.98 | 48.79 | 54.14 | 59.16 | 63.93 | 68.50 | 72.88 | 77.08 |
| 150 | | | 10.05 | 21.25 | 31.04 | 39.74 | 47.51 | 54.51 | 60.93 | 66.94 | 72.66 | 78.12 | 83.24 | 87.99 |
| | | | 9.05 | 19.18 | 28.19 | 36.14 | 43.17 | 49.51 | 55.35 | 60.89 | 66.21 | 71.33 | 76.16 | 80.73 |
| 160 | | | 5.96 | 18.57 | 29.65 | 39.54 | 48.37 | 56.24 | 63.30 | 69.74 | 75.72 | 81.43 | 86.95 | 92.22 |
| | | | 5.58 | 16.69 | 26.79 | 35.67 | 43.53 | 50.60 | 57.05 | 63.02 | 68.64 | 74.09 | 79.40 | 84.50 |
| 170 | | | | 15.93 | 28.44 | 39.41 | 48.98 | 57.43 | 65.03 | 71.96 | 78.42 | 84.51 | 90.37 | 96.06 |
| | | | | 14.36 | 25.56 | 35.24 | 43.84 | 51.60 | 58.70 | 65.28 | 71.45 | 77.31 | 83.00 | 88.53 |
| 180 | | | | 12.98 | 27.05 | 38.97 | 49.19 | 58.15 | 66.20 | 73.58 | 80.46 | 86.96 | 93.19 | 99.21 |
| | | | | 11.97 | 24.41 | 34.96 | 44.34 | 52.70 | 60.29 | 67.30 | 73.88 | 80.13 | 86.13 | 92.01 |
| 190 | | | | | 25.14 | 38.38 | 49.32 | 58.78 | 67.22 | 74.94 | 82.10 | 88.85 | 95.35 | 101.59 |
| | | | | | 23.04 | 35.12 | 45.33 | 54.17 | 62.13 | 69.50 | 76.45 | 83.12 | 89.61 | 95.86 |
| (mm) | | | | | | | | | | | | | | |

| r | θ 82.5 | 88 | 93.5 | 99 | 104.5 | 110 | 115.5 | 121 | 126.5 | 132 | (deg) |
|---|---|---|---|---|---|---|---|---|---|---|---|
| 80 | | | | | | | | | | | |
| 90 | 66.35 | | | | | | | | | | |
| | 63.39 | | | | | | | | | | |
| 100 | 71.18 | 72.05 | | | | | | | | | |
| | 66.22 | 69.66 | | | | | | | | | |
| 110 | 75.65 | 77.62 | 78.26 | | | | | | | | |
| | 69.58 | 73.01 | 76.90 | | | | | | | | |
| 120 | 80.18 | 82.95 | 84.78 | | | | | | | | |
| | 73.39 | 77.01 | 80.82 | | | | | | | | |
| 130 | 84.63 | 88.15 | 91.01 | 92.76 | | | | | | | |
| | 77.29 | 81.15 | 85.02 | 89.15 | | | | | | | |
| 140 | 88.69 | 92.63 | 96.25 | 99.29 | 101.19 | | | | | | |
| | 81.14 | 85.10 | 89.03 | 93.02 | 97.44 | | | | | | |
| 150 | 92.62 | 96.90 | 100.83 | 104.48 | 107.63 | 109.73 | | | | | |
| | 85.13 | 89.25 | 93.19 | 97.08 | 101.03 | 105.47 | | | | | |
| 160 | 97.14 | 101.64 | 105.86 | 109.91 | 113.19 | 116.11 | 118.25 | | | | |
| | 89.30 | 93.73 | 97.98 | 102.08 | 105.56 | 109.11 | 113.20 | | | | |
| 170 | 101.50 | 106.51 | 111.00 | 114.93 | 118.65 | 122.20 | 125.26 | 126.99 | 127.75 | | |
| | 93.77 | 98.64 | 103.00 | 106.90 | 110.64 | 114.28 | 117.65 | 120.94 | 125.07 | | |

TABLE 21-continued

| EMBODIMENT 9 | | | | | | | | | | |
|---|---|---|---|---|---|---|---|---|---|---|
| 180 | 105.12 | 110.69 | 115.67 | 120.05 | 123.85 | 127.09 | 130.15 | 132.82 | 134.80 | 135.62 |
| | 97.79 | 103.20 | 108.03 | 112.33 | 116.02 | 119.27 | 122.50 | 125.62 | 128.68 | 131.96 |
| 190 | 107.62 | 113.53 | 119.04 | 123.81 | 127.91 | 131.40 | 134.34 | 136.68 | 138.54 | 139.54 |
| | 101.86 | 107.64 | 112.97 | 117.62 | 121.64 | 125.20 | 128.24 | 131.03 | 134.02 | 137.11 |
| (mm) | | | | | | | | | | |

DIAMETER D = 400
HEIGHT h = 140
EXPANSION ANGLE λ = 132
BOSS RATIO ν = 0.35

TABLE 22

| EMBODIMENT 9 | | |
|---|---|---|
| r | θ | z |
| 76.66 | 84.63 | 63.35 |
| | | 62.48 |
| 93.28 | 87.09 | 68.12 |
| | | 67.19 |
| 113.77 | 95.58 | 80.79 |
| | | 79.89 |
| 139.44 | 107.43 | 100.97 |
| | | 100.01 |
| 171.74 | 129.86 | 129.27 |
| | | 128.27 |
| 184.85 | 136.47 | 137.77 |
| | | 136.87 |
| 194.35 | 129.45 | 139.69 |
| | | 138.69 |
| 198.53 | 120.11 | 137.85 |
| | | 136.75 |
| 200.00 | 110.56 | 133.44 |
| | | 132.44 |
| 200.00 | 99.92 | 125.96 |
| | | 124.96 |
| 200.00 | 89.52 | 116.11 |
| | | 115.17 |
| 200.00 | 71.09 | 95.15 |
| | | 94.35 |
| 200.00 | 53.22 | 72.05 |
| | | 71.32 |
| 200.00 | 44.14 | 58.09 |
| | | 57.47 |
| 200.00 | 34.25 | 39.02 |
| | | 38.56 |
| 200.00 | 27.52 | 21.98 |
| | | 21.58 |
| 194.35 | 23.90 | 12.84 |
| | | 12.64 |
| 189.19 | 22.46 | 10.71 |
| | | 10.46 |
| 175.45 | 19.43 | 7.14 |
| | | 6.89 |
| 169.45 | 18.17 | 6.15 |
| | | 5.90 |
| 161.55 | 16.54 | 5.36 |
| | | 5.12 |
| 152.44 | 14.58 | 4.62 |
| | | 4.37 |
| 145.51 | 12.98 | 3.92 |
| | | 3.67 |
| 140.87 | 11.81 | 3.57 |
| | | 3.32 |
| 136.01 | 10.36 | 3.26 |
| | | 3.01 |

TABLE 22-continued

| EMBODIMENT 9 | | |
|---|---|---|
| r | θ | z |
| 128.17 | 8.18 | 2.12 |
| | | 1.87 |
| 116.86 | 4.50 | 0.79 |
| | | 0.54 |
| 104.20 | 1.87 | 3.75 |
| | | 2.76 |

Embodiment 10

Propeller fan 1 having the diameter D=400 mm, the height in the axial direction (z direction) h=140 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Tables 3 and 4 using a transformation formula 23 below, i.e. a three-dimensional curved surface specified by Tables 23 and 24.

$$\left.\begin{aligned}
&r_1 = a \times r + b \text{ (mm)} \\
&\theta_1 = c \times \theta + d \text{ (deg)} \\
&z_{1u} = e_u \times z_u + f_u \text{ (mm)} \\
&z_{1d} = e_d \times z_d + f_d \text{ (mm)} \\
&(a,\ c,\ e_u,\ e_d\text{: factor of proportionality, } b,\ d,\ f_u,\ f_d\text{: constant)} \\
&\text{wherein} \\
&a = \frac{10}{13} D(1-\nu) = \frac{10}{13} \times 400 \times (1-0.275) = 233.1 \\
&b = -\frac{10}{13} D(1-\nu) \times 0.35 + \frac{\nu D}{2} \\
&\quad = -\frac{10}{13} \times 400 \times (1-0.275) \times 0.35 + \frac{0.275 \times 400}{2} \\
&\quad = -23.1 \\
&c = \lambda = 360/n = \frac{2400}{7} \times \frac{h}{D} = \frac{2400}{7} \times \frac{140}{400} = 120 \\
&d = 0 \\
&e_u = e_d = h = 140 \\
&f_u = f_d = 0
\end{aligned}\right\} \quad (23)$$

TABLE 23

EMBODIMENT 10

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 66.15 | | 20.36 | 25.34 | 30.00 | 34.46 | 38.65 | 42.52 | 46.08 | 49.39 | 52.49 | 55.36 | 57.96 | 60.02 | 61.27 |
| | | 19.19 | 22.97 | 26.56 | 29.91 | 33.18 | 36.47 | 39.76 | 42.98 | 46.07 | 49.03 | 51.96 | 54.89 | 57.99 |
| 77.31 | 11.84 | 18.75 | 24.70 | 30.07 | 34.89 | 39.26 | 43.36 | 47.22 | 50.87 | 54.35 | 57.64 | 60.68 | 63.30 | 65.30 |
| | 11.18 | 16.51 | 21.33 | 25.59 | 29.55 | 33.39 | 37.14 | 40.80 | 44.35 | 47.78 | 51.07 | 54.21 | 57.22 | 60.21 |
| 88.46 | 10.33 | 17.37 | 23.51 | 29.19 | 34.48 | 39.42 | 44.03 | 48.36 | 52.43 | 56.29 | 59.94 | 63.36 | 66.49 | 69.17 |
| | 8.52 | 14.71 | 20.11 | 25.01 | 29.55 | 33.86 | 38.00 | 42.01 | 45.91 | 49.67 | 53.27 | 56.68 | 59.91 | 63.05 |
| 99.62 | 6.21 | 14.29 | 21.44 | 27.93 | 33.92 | 39.48 | 44.66 | 49.50 | 54.04 | 58.32 | 62.35 | 66.15 | 69.69 | 72.92 |
| | 4.97 | 12.16 | 18.60 | 24.37 | 29.60 | 34.42 | 38.99 | 43.36 | 47.58 | 51.67 | 55.59 | 59.33 | 62.88 | 66.25 |
| 110.8 | | 10.71 | 19.11 | 26.57 | 33.37 | 39.65 | 45.48 | 50.89 | 55.92 | 60.59 | 64.98 | 69.13 | 73.07 | 76.81 |
| | | 9.11 | 16.73 | 23.49 | 29.51 | 34.97 | 40.02 | 44.78 | 49.32 | 53.70 | 57.93 | 62.01 | 65.94 | 69.71 |
| 121.9 | | 7.02 | 16.69 | 25.16 | 32.82 | 39.83 | 46.30 | 52.29 | 57.83 | 62.98 | 67.78 | 72.31 | 76.61 | 80.73 |
| | | 6.08 | 14.72 | 22.44 | 29.37 | 35.62 | 41.29 | 46.50 | 51.40 | 56.06 | 60.56 | 64.94 | 69.19 | 73.31 |
| 133.1 | | | 13.47 | 23.32 | 31.95 | 39.64 | 46.60 | 53.03 | 59.05 | 64.74 | 70.19 | 75.25 | 80.05 | 84.52 |
| | | | 12.22 | 21.33 | 29.40 | 36.56 | 42.98 | 48.79 | 54.14 | 59.16 | 63.93 | 68.50 | 72.88 | 77.08 |
| 144.2 | | | 10.05 | 21.25 | 31.04 | 39.74 | 47.51 | 54.51 | 60.93 | 66.94 | 72.66 | 78.12 | 83.24 | 87.99 |
| | | | 9.05 | 19.18 | 28.19 | 36.14 | 43.17 | 49.51 | 55.35 | 60.89 | 66.21 | 71.33 | 76.16 | 80.73 |
| 155.4 | | | 5.96 | 18.57 | 29.65 | 39.54 | 48.37 | 56.24 | 63.30 | 69.74 | 75.72 | 81.43 | 86.95 | 92.22 |
| | | | 5.58 | 16.69 | 26.79 | 35.67 | 43.53 | 50.60 | 57.05 | 63.02 | 68.64 | 74.09 | 79.40 | 84.50 |
| 166.5 | | | | 15.93 | 28.44 | 39.41 | 48.98 | 57.43 | 65.03 | 71.96 | 78.42 | 84.51 | 90.37 | 96.06 |
| | | | | 14.36 | 25.56 | 35.24 | 43.84 | 51.60 | 58.70 | 65.28 | 71.45 | 77.31 | 83.00 | 88.53 |
| 177.7 | | | | 12.98 | 27.05 | 38.97 | 49.19 | 58.15 | 66.20 | 73.58 | 80.46 | 86.96 | 93.19 | 99.21 |
| | | | | 11.97 | 24.41 | 34.96 | 44.34 | 52.70 | 60.29 | 67.30 | 73.88 | 80.13 | 86.13 | 92.01 |
| 188.8 | | | | | 25.14 | 38.38 | 49.32 | 58.78 | 67.22 | 74.94 | 82.10 | 88.85 | 95.35 | 101.59 |
| | | | | | 23.04 | 35.12 | 45.33 | 54.17 | 62.13 | 69.50 | 76.45 | 83.12 | 89.61 | 95.86 |
| (mm) | | | | | | | | | | | | | | |

| r | θ 75 | 80 | 85 | 90 | 95 | 100 | 105 | 110 | 115 | 120 | (deg) |
|---|---|---|---|---|---|---|---|---|---|---|---|
| 66.15 | | | | | | | | | | | |
| 77.31 | 66.35 | | | | | | | | | | |
| | 63.39 | | | | | | | | | | |
| 88.46 | 71.18 | 72.05 | | | | | | | | | |
| | 66.22 | 69.66 | | | | | | | | | |
| 99.62 | 75.65 | 77.62 | 78.26 | | | | | | | | |
| | 69.58 | 73.01 | 76.90 | | | | | | | | |
| 110.8 | 80.18 | 82.95 | 84.78 | | | | | | | | |
| | 73.39 | 77.01 | 80.82 | | | | | | | | |
| 121.9 | 84.63 | 88.15 | 91.01 | 92.76 | | | | | | | |
| | 77.29 | 81.15 | 85.02 | 89.15 | | | | | | | |
| 133.1 | 88.69 | 92.63 | 96.25 | 99.29 | 101.19 | | | | | | |
| | 81.14 | 85.10 | 89.03 | 93.02 | 97.44 | | | | | | |
| 144.2 | 92.62 | 96.90 | 100.83 | 104.48 | 107.63 | 109.73 | | | | | |
| | 85.13 | 89.25 | 93.19 | 97.08 | 101.03 | 105.47 | | | | | |
| 155.4 | 97.14 | 101.64 | 105.86 | 109.91 | 113.19 | 116.11 | 118.25 | | | | |
| | 89.30 | 93.73 | 97.98 | 102.08 | 105.56 | 109.11 | 113.20 | | | | |
| 166.5 | 101.50 | 106.51 | 111.00 | 114.93 | 118.65 | 122.20 | 125.26 | 126.99 | 127.75 | | |
| | 93.77 | 98.64 | 103.00 | 106.90 | 110.64 | 114.28 | 117.65 | 120.94 | 125.07 | | |
| 177.7 | 105.12 | 110.69 | 115.67 | 120.05 | 123.85 | 127.09 | 130.15 | 132.82 | 134.80 | 135.62 | |
| | 97.79 | 103.20 | 108.03 | 112.33 | 116.02 | 119.27 | 122.50 | 125.62 | 128.68 | 131.96 | |
| 188.8 | 107.62 | 113.53 | 119.04 | 123.81 | 127.91 | 131.40 | 134.34 | 136.68 | 138.54 | 139.54 | |
| | 101.86 | 107.64 | 112.97 | 117.62 | 121.64 | 125.20 | 128.24 | 131.03 | 134.02 | 137.11 | |
| (mm) | | | | | | | | | | | |

DIAMETER D = 400
HEIGHT h = 140
EXPANSION ANGLE λ = 120
BOSS RATIO ν = 0.275

TABLE 24

EMBODIMENT 10

| r | θ | z |
|---|---|---|
| 62.43 | 76.94 | 63.35 |
| | | 62.48 |
| 80.97 | 79.17 | 68.12 |
| | | 67.19 |

TABLE 24-continued

EMBODIMENT 10

| r | θ | z |
|---|---|---|
| 103.82 | 86.89 | 80.79 |
| | | 79.89 |
| 132.45 | 97.66 | 100.97 |
| | | 100.01 |

TABLE 24-continued

| EMBODIMENT 10 | | |
|---|---|---|
| r | θ | z |
| 168.48 | 118.05 | 129.27 |
| | | 128.27 |
| 183.10 | 124.06 | 137.77 |
| | | 136.87 |
| 193.70 | 117.68 | 139.69 |
| | | 138.69 |
| 198.36 | 109.19 | 137.85 |
| | | 136.75 |
| 200.00 | 100.51 | 133.44 |
| | | 132.44 |
| 200.00 | 90.84 | 125.96 |
| | | 124.96 |
| 200.00 | 81.38 | 116.11 |
| | | 115.17 |
| 200.00 | 64.63 | 95.15 |
| | | 94.35 |
| 200.00 | 48.38 | 72.05 |
| | | 71.32 |
| 200.00 | 40.13 | 58.09 |
| | | 57.47 |
| 200.00 | 31.14 | 39.02 |
| | | 38.56 |
| 200.00 | 25.02 | 21.98 |
| | | 21.58 |
| 193.70 | 21.73 | 12.84 |
| | | 12.64 |
| 187.94 | 20.42 | 10.71 |
| | | 10.46 |
| 172.62 | 17.66 | 7.14 |
| | | 6.89 |
| 165.93 | 16.52 | 6.15 |
| | | 5.90 |
| 157.11 | 15.04 | 5.36 |
| | | 5.12 |
| 146.95 | 13.25 | 4.62 |
| | | 4.37 |
| 139.22 | 11.80 | 3.92 |
| | | 3.67 |
| 134.05 | 10.74 | 3.57 |
| | | 3.32 |
| 128.63 | 9.42 | 3.26 |
| | | 3.01 |

TABLE 24-continued

| EMBODIMENT 10 | | |
|---|---|---|
| r | θ | z |
| 119.88 | 7.44 | 2.12 |
| | | 1.87 |
| 107.27 | 4.09 | 0.79 |
| | | 0.54 |
| 93.15 | 1.70 | 3.75 |
| | | 2.76 |

Embodiment 11

Propeller fan 1 having the diameter D=400 mm, the height in the axial direction (z direction) h=112 mm, the number of blades n=3, the expansion angle of a blade λ=120 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 24 below, i.e. a three-dimensional curved surface specified by Tables 25 and 26.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = D/2 = 400/2 = 200\\
&b = 0\\
&c = \lambda = 360/n = 120\\
&d = 0\\
&e_u = h = 112\\
&e_d = 106.4\\
&f_u = f_d = 0
\end{aligned}\right\} \quad (24)$$

TABLE 25

| EMBODIMENT 11 | | | | | | | | | | | | | | |
|---|---|---|---|---|---|---|---|---|---|---|---|---|---|---|
| | θ | | | | | | | | | | | | | |
| r | 5 | 10 | 15 | 20 | 25 | 30 | 35 | 40 | 45 | 50 | 55 | 60 | 65 | 70 |
| 80 | | 16.29 | 20.27 | 24.00 | 27.57 | 30.92 | 34.02 | 36.86 | 39.51 | 41.99 | 44.29 | 46.37 | 48.02 | 49.02 |
| | | 14.58 | 17.46 | 20.19 | 22.73 | 25.22 | 27.72 | 30.22 | 32.66 | 35.01 | 37.26 | 39.49 | 41.72 | 44.07 |
| 90 | 9.47 | 15.00 | 19.76 | 24.06 | 27.91 | 31.41 | 34.69 | 37.78 | 40.70 | 43.48 | 46.11 | 48.54 | 50.64 | 52.24 |
| | 8.50 | 12.55 | 16.21 | 19.45 | 22.46 | 25.38 | 28.23 | 31.01 | 33.71 | 36.31 | 38.81 | 41.20 | 43.49 | 45.76 |
| 100 | 8.26 | 13.90 | 18.81 | 23.35 | 27.58 | 31.54 | 35.22 | 38.69 | 41.94 | 45.03 | 47.95 | 50.69 | 53.19 | 55.34 |
| | 6.48 | 11.18 | 15.28 | 19.01 | 22.46 | 25.73 | 28.88 | 31.93 | 34.89 | 37.75 | 40.49 | 43.08 | 45.53 | 47.92 |
| 110 | 4.97 | 11.43 | 17.15 | 22.34 | 27.14 | 31.58 | 35.73 | 39.60 | 43.23 | 46.66 | 49.88 | 52.92 | 55.75 | 58.34 |
| | 3.78 | 9.24 | 14.14 | 18.52 | 22.50 | 26.16 | 29.63 | 32.95 | 36.16 | 39.27 | 42.25 | 45.09 | 47.79 | 50.35 |
| 120 | | 8.57 | 15.29 | 21.26 | 26.70 | 31.72 | 36.38 | 40.71 | 44.74 | 48.47 | 51.98 | 55.30 | 58.46 | 61.45 |
| | | 6.92 | 12.71 | 17.85 | 22.43 | 26.58 | 30.42 | 34.03 | 37.48 | 40.81 | 44.03 | 47.13 | 50.11 | 52.98 |
| 130 | | 5.62 | 13.35 | 20.13 | 26.26 | 31.86 | 37.04 | 41.83 | 46.26 | 50.38 | 54.22 | 57.85 | 61.29 | 64.58 |
| | | 4.62 | 11.19 | 17.05 | 22.32 | 27.07 | 31.38 | 35.34 | 39.06 | 42.61 | 46.03 | 49.35 | 52.58 | 55.72 |
| 140 | | | 10.78 | 18.66 | 25.56 | 31.71 | 37.28 | 42.42 | 47.24 | 51.79 | 56.15 | 60.20 | 64.04 | 67.62 |
| | | | 9.29 | 16.21 | 22.34 | 27.79 | 32.66 | 37.08 | 41.15 | 44.96 | 48.59 | 52.06 | 55.39 | 58.58 |
| 150 | | | 8.04 | 17.00 | 24.83 | 31.79 | 38.01 | 43.61 | 48.74 | 53.55 | 58.13 | 62.50 | 66.59 | 70.39 |
| | | | 6.88 | 14.58 | 21.42 | 27.47 | 32.81 | 37.63 | 42.07 | 46.28 | 50.32 | 54.21 | 57.88 | 61.35 |
| 160 | | | 4.77 | 14.86 | 23.72 | 31.63 | 38.70 | 44.99 | 50.64 | 55.79 | 60.58 | 65.14 | 69.56 | 73.78 |
| | | | 4.24 | 12.68 | 20.36 | 27.11 | 33.08 | 38.46 | 43.36 | 47.90 | 52.17 | 56.31 | 60.34 | 64.22 |
| 170 | | | | 12.74 | 22.75 | 31.53 | 39.18 | 45.94 | 52.02 | 57.57 | 62.74 | 67.61 | 72.30 | 76.85 |
| | | | | 10.91 | 19.43 | 26.78 | 33.32 | 39.22 | 44.61 | 49.61 | 54.30 | 58.76 | 63.08 | 67.28 |
| 180 | | | | 10.38 | 21.64 | 31.18 | 39.35 | 46.52 | 52.96 | 58.86 | 64.37 | 69.57 | 74.55 | 79.37 |

TABLE 25-continued

EMBODIMENT 11

| | | | | | | | | | | | | |
|---|---|---|---|---|---|---|---|---|---|---|---|---|
| | 9.10 | 18.55 | 26.57 | 33.70 | 40.05 | 45.82 | 51.15 | 56.15 | 60.90 | 65.46 | 69.93 | |
| 190 | | 20.11 | 30.70 | 39.46 | 47.02 | 53.78 | 59.95 | 65.68 | 71.08 | 76.28 | 81.27 | |
| | | 17.51 | 26.69 | 34.45 | 41.17 | 47.22 | 52.82 | 58.10 | 63.17 | 68.10 | 72.85 | |
| (mm) | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 80 | | | | | | | | | | | |
| 90 | 53.08 | | | | | | | | | | |
| | 48.18 | | | | | | | | | | |
| 100 | 56.94 | 57.64 | | | | | | | | | |
| | 50.33 | 52.94 | | | | | | | | | |
| 110 | 60.52 | 62.10 | 62.61 | | | | | | | | |
| | 52.88 | 55.49 | 58.44 | | | | | | | | |
| 120 | 64.14 | 66.36 | 67.82 | | | | | | | | |
| | 55.78 | 58.53 | 61.42 | | | | | | | | |
| 130 | 67.70 | 70.52 | 72.81 | 74.21 | | | | | | | |
| | 58.74 | 61.67 | 64.62 | 67.75 | | | | | | | |
| 140 | 70.95 | 74.10 | 77.00 | 79.43 | 80.95 | | | | | | |
| | 61.67 | 64.68 | 67.66 | 70.70 | 74.05 | | | | | | |
| 150 | 74.10 | 77.52 | 80.66 | 83.58 | 86.10 | 87.78 | | | | | |
| | 64.70 | 67.83 | 70.82 | 73.78 | 76.78 | 80.16 | | | | | |
| 160 | 77.71 | 81.31 | 84.69 | 87.93 | 90.55 | 92.89 | 94.60 | | | | |
| | 67.87 | 71.23 | 74.46 | 77.58 | 80.23 | 82.92 | 86.03 | | | | |
| 170 | 81.20 | 85.21 | 88.80 | 91.94 | 94.92 | 97.76 | 100.21 | 101.59 | 102.20 | | |
| | 71.27 | 74.97 | 78.28 | 81.24 | 84.09 | 86.85 | 89.41 | 91.91 | 95.05 | | |
| 180 | 84.10 | 88.55 | 92.54 | 96.04 | 99.08 | 101.67 | 104.12 | 106.26 | 107.84 | 108.50 | |
| | 74.32 | 78.43 | 82.10 | 85.37 | 88.18 | 90.65 | 93.10 | 95.47 | 97.80 | 100.29 | |
| 190 | 86.10 | 90.82 | 95.23 | 99.05 | 102.33 | 105.12 | 107.47 | 109.34 | 110.83 | 111.63 | |
| | 77.41 | 81.81 | 85.86 | 89.39 | 92.45 | 95.15 | 97.46 | 99.58 | 101.86 | 104.20 | |
| (mm) | | | | | | | | | | | |

DIAMETER D = 400
HEIGHT h = 112 (eu = 112, ed = 106.4, fu = fd = 0)
EXPANSION ANGLE λ = 120
BOSS RATIO ν = 0.35

TABLE 26

EMBODIMENT 11

| r | θ | z |
|---|---|---|
| 76.66 | 76.94 | 50.68 |
| | | 47.48 |
| 93.28 | 79.17 | 54.50 |
| | | 51.06 |
| 113.77 | 86.89 | 64.63 |
| | | 60.72 |
| 139.44 | 97.66 | 80.78 |
| | | 76.01 |
| 171.74 | 118.05 | 103.42 |
| | | 97.49 |
| 184.85 | 124.06 | 110.22 |
| | | 104.02 |
| 194.35 | 117.68 | 111.75 |
| | | 105.40 |
| 198.53 | 109.19 | 110.28 |
| | | 103.93 |
| 200.00 | 100.51 | 106.75 |
| | | 100.65 |
| 200.00 | 90.84 | 100.77 |
| | | 94.97 |
| 200.00 | 81.38 | 92.89 |
| | | 87.53 |
| 200.00 | 64.63 | 76.12 |
| | | 71.71 |
| 200.00 | 48.38 | 57.64 |
| | | 54.20 |
| 200.00 | 40.13 | 46.47 |
| | | 43.68 |
| 200.00 | 31.14 | 31.22 |

TABLE 26-continued

EMBODIMENT 11

| r | θ | z |
|---|---|---|
| | | 29.31 |
| 200.00 | 25.02 | 17.58 |
| | | 16.40 |
| 194.35 | 21.73 | 10.27 |
| | | 9.61 |
| 189.19 | 20.42 | 8.57 |
| | | 7.95 |
| 175.45 | 17.66 | 5.71 |
| | | 5.24 |
| 169.45 | 16.52 | 4.92 |
| | | 4.48 |
| 161.55 | 15.04 | 4.29 |
| | | 3.89 |
| 152.44 | 13.25 | 3.70 |
| | | 3.32 |
| 145.51 | 11.80 | 3.14 |
| | | 2.79 |
| 140.87 | 10.74 | 2.86 |
| | | 2.52 |
| 136.01 | 9.42 | 2.61 |
| | | 2.29 |
| 128.17 | 7.44 | 1.70 |
| | | 1.42 |
| 116.86 | 4.09 | 0.63 |
| | | 0.41 |
| 104.20 | 1.70 | 3.00 |
| | | 2.10 |

Embodiment 12

Propeller fan 1 having the diameter D=400 mm, the height in the axial direction (z direction) h=112 mm, the number of blades n=3, the expansion angle of a blade λ=120 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 25 below, i.e. a three-dimensional curved surface specified by Tables 27 and 28.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of porportionality; } b,\ d,\ f_u,\ f_d\text{: constant}) \\ \text{wherein} \\ a = D/2 = 400/2 = 200 \\ b = 0 \\ c = \lambda = 360/n = 120 \\ d = 0 \\ e_u = e_d = h = 112 \\ f_u = 3 \\ f_d = 0 \end{array}\right\} \quad (25)$$

TABLE 27

EMBODIMENT 12

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 80 | | 19.29 | 23.27 | 27.00 | 30.57 | 33.92 | 37.02 | 39.86 | 42.51 | 44.99 | 47.29 | 49.37 | 51.02 | 52.02 |
| | | 15.35 | 18.38 | 21.25 | 23.93 | 26.54 | 29.18 | 31.81 | 34.38 | 36.86 | 39.22 | 41.57 | 43.91 | 46.39 |
| 90 | 12.47 | 18.00 | 22.76 | 27.06 | 30.91 | 34.41 | 37.69 | 40.78 | 43.70 | 46.48 | 49.11 | 51.54 | 53.64 | 55.24 |
| | 8.94 | 13.21 | 17.06 | 20.47 | 23.64 | 26.71 | 29.71 | 32.64 | 35.48 | 38.22 | 40.86 | 43.37 | 45.78 | 48.17 |
| 100 | 11.26 | 16.90 | 21.81 | 26.35 | 30.58 | 34.54 | 38.22 | 41.69 | 44.94 | 48.03 | 50.95 | 53.69 | 56.19 | 58.34 |
| | 6.82 | 11.77 | 16.09 | 20.01 | 23.64 | 27.09 | 30.40 | 33.61 | 36.73 | 39.74 | 42.62 | 45.34 | 47.93 | 50.44 |
| 110 | 7.97 | 14.43 | 20.15 | 25.34 | 30.14 | 34.58 | 38.73 | 42.60 | 46.23 | 49.66 | 52.88 | 55.92 | 58.75 | 61.34 |
| | 3.98 | 9.73 | 14.88 | 19.50 | 23.68 | 27.54 | 31.19 | 34.69 | 38.06 | 41.34 | 44.47 | 47.46 | 50.30 | 53.00 |
| 120 | | 11.57 | 18.29 | 24.26 | 29.70 | 34.72 | 39.38 | 43.71 | 47.74 | 51.47 | 54.98 | 58.30 | 61.46 | 64.45 |
| | | 7.29 | 13.38 | 18.79 | 23.61 | 27.98 | 32.02 | 35.82 | 39.46 | 42.96 | 46.34 | 49.61 | 52.75 | 55.77 |
| 130 | | 8.62 | 16.35 | 23.13 | 29.26 | 34.86 | 40.04 | 44.83 | 49.26 | 53.38 | 57.22 | 60.85 | 64.29 | 67.58 |
| | | 4.86 | 11.78 | 17.95 | 23.50 | 28.50 | 33.03 | 37.20 | 41.12 | 44.85 | 48.45 | 51.95 | 55.35 | 58.65 |
| 140 | | | 13.78 | 21.66 | 28.56 | 34.71 | 40.28 | 45.42 | 50.24 | 54.79 | 59.15 | 63.20 | 67.04 | 70.62 |
| | | | 9.78 | 17.06 | 23.52 | 29.25 | 34.38 | 39.03 | 43.31 | 47.33 | 51.14 | 54.80 | 58.30 | 61.66 |
| 150 | | | 11.04 | 20.00 | 27.83 | 34.79 | 41.01 | 46.61 | 51.74 | 56.55 | 61.13 | 65.50 | 69.59 | 73.39 |
| | | | 7.24 | 15.34 | 22.55 | 28.91 | 34.54 | 39.61 | 44.28 | 48.71 | 52.97 | 57.06 | 60.93 | 64.58 |
| 160 | | | 7.77 | 17.86 | 26.72 | 34.63 | 41.70 | 47.99 | 53.64 | 58.79 | 63.58 | 68.14 | 72.56 | 76.78 |
| | | | 4.46 | 13.35 | 21.43 | 28.54 | 34.82 | 40.48 | 45.64 | 50.42 | 54.91 | 59.27 | 63.52 | 67.60 |
| 170 | | | | 15.74 | 25.75 | 34.53 | 42.18 | 48.94 | 55.02 | 60.57 | 65.74 | 70.61 | 75.30 | 79.85 |
| | | | | 11.49 | 20.45 | 28.19 | 35.07 | 41.28 | 46.96 | 52.22 | 57.16 | 61.85 | 66.40 | 70.82 |
| 180 | | | | 13.38 | 24.64 | 34.18 | 42.35 | 49.52 | 55.96 | 61.86 | 67.37 | 72.57 | 77.55 | 82.37 |
| | | | | 9.58 | 19.53 | 27.97 | 35.47 | 42.16 | 48.23 | 53.84 | 59.10 | 64.10 | 68.90 | 73.61 |
| 190 | | | | | 23.11 | 33.70 | 42.46 | 50.02 | 56.78 | 62.95 | 68.68 | 74.08 | 79.28 | 84.27 |
| | | | | | 18.43 | 28.10 | 36.26 | 43.34 | 49.70 | 55.60 | 61.16 | 66.50 | 71.69 | 76.69 |
| (mm) | | | | | | | | | | | | | | |

| r | θ 75 | 80 | 85 | 90 | 95 | 100 | 105 | 110 | 115 | 120 | (deg) |
|---|---|---|---|---|---|---|---|---|---|---|---|
| 80 | | | | | | | | | | | |
| 90 | 56.08 | | | | | | | | | | |
| | 50.71 | | | | | | | | | | |
| 100 | 59.94 | 60.64 | | | | | | | | | |
| | 52.98 | 55.73 | | | | | | | | | |
| 110 | 63.52 | 65.10 | 65.61 | | | | | | | | |
| | 55.66 | 58.41 | 61.52 | | | | | | | | |

TABLE 27-continued

| EMBODIMENT 12 | | | | | | | | | | |
|---|---|---|---|---|---|---|---|---|---|---|
| 120 | 67.14 | 69.36 | 70.82 | | | | | | | |
| | 58.71 | 61.61 | 64.66 | | | | | | | |
| 130 | 70.70 | 73.52 | 75.81 | 77.21 | | | | | | |
| | 61.83 | 64.92 | 68.02 | 71.32 | | | | | | |
| 140 | 73.95 | 77.10 | 80.00 | 82.43 | 83.95 | | | | | |
| | 64.91 | 68.08 | 71.22 | 74.42 | 77.95 | | | | | |
| 150 | 77.10 | 80.52 | 83.66 | 86.58 | 89.10 | 90.78 | | | | |
| | 68.10 | 71.40 | 74.55 | 77.66 | 80.82 | 84.38 | | | | |
| 160 | 80.71 | 84.31 | 87.69 | 90.93 | 93.55 | 95.89 | 97.60 | | | |
| | 71.44 | 74.98 | 78.38 | 81.66 | 84.45 | 87.29 | 90.56 | | | |
| 170 | 84.20 | 88.21 | 91.80 | 94.94 | 97.92 | 100.76 | 103.21 | 104.59 | 105.20 | |
| | 75.02 | 78.91 | 82.40 | 85.52 | 88.51 | 91.42 | 94.12 | 96.75 | 100.06 | |
| 180 | 87.10 | 91.55 | 95.54 | 99.04 | 102.08 | 104.67 | 107.12 | 109.26 | 110.84 | 111.50 |
| | 78.23 | 82.56 | 86.42 | 89.86 | 92.82 | 95.42 | 98.00 | 100.50 | 102.94 | 105.57 |
| 190 | 89.10 | 93.82 | 98.23 | 102.05 | 105.33 | 108.12 | 110.47 | 112.34 | 113.83 | 114.63 |
| | 81.49 | 86.11 | 90.38 | 94.10 | 97.31 | 100.16 | 102.59 | 104.82 | 107.22 | 109.69 |
| (mm) | | | | | | | | | | |

DIAMETER D = 400
HEIGHT h = 112 (eu = 112, ed = 112, fu = 3, fd = 0)
EXPANSION ANGLE λ = 120
BOSS RATIO ν = 0.35

TABLE 28

| EMBODIMENT 12 | | |
|---|---|---|
| r | θ | z |
| 76.66 | 76.94 | 53.68 |
| | | 49.98 |
| 93.28 | 79.17 | 57.50 |
| | | 53.75 |
| 113.77 | 86.89 | 67.63 |
| | | 63.91 |
| 139.44 | 97.66 | 83.78 |
| | | 80.01 |
| 171.74 | 118.05 | 106.42 |
| | | 102.62 |
| 184.85 | 124.06 | 113.22 |
| | | 109.50 |
| 194.35 | 117.68 | 114.75 |
| | | 110.95 |
| 198.53 | 109.19 | 113.28 |
| | | 109.40 |
| 200.00 | 100.51 | 109.75 |
| | | 105.95 |
| 200.00 | 90.84 | 103.77 |
| | | 99.97 |
| 200.00 | 81.38 | 95.89 |
| | | 92.14 |
| 200.00 | 64.63 | 79.12 |
| | | 75.48 |
| 200.00 | 48.38 | 60.64 |
| | | 57.06 |
| 200.00 | 40.13 | 49.47 |
| | | 45.98 |
| 200.00 | 31.14 | 34.22 |
| | | 30.85 |
| 200.00 | 25.02 | 20.58 |
| | | 17.26 |
| 194.35 | 21.73 | 13.27 |
| | | 10.11 |
| 189.19 | 20.42 | 11.57 |
| | | 8.37 |

TABLE 28-continued

| EMBODIMENT 12 | | |
|---|---|---|
| r | θ | z |
| 175.45 | 17.66 | 8.71 |
| | | 5.51 |
| 169.45 | 16.52 | 7.92 |
| | | 4.72 |
| 161.55 | 15.04 | 7.29 |
| | | 4.10 |
| 152.44 | 13.25 | 6.70 |
| | | 3.50 |
| 145.51 | 11.80 | 6.14 |
| | | 2.94 |
| 140.87 | 10.74 | 5.86 |
| | | 2.66 |
| 136.01 | 9.42 | 5.61 |
| | | 2.41 |
| 128.17 | 7.44 | 4.70 |
| | | 1.50 |
| 116.86 | 4.09 | 3.63 |
| | | 0.43 |
| 104.20 | 1.70 | 6.00 |
| | | 2.21 |

Embodiment 13

Propeller fan 1 having the diameter D=400 mm, the height in the axial direction (z direction) h=112 mm, the number of blades n=3, the expansion angle of a blade λ=120 deg, the boss ratio ν=0.35 (boss diameter νD=140 mm) was formed to have a curved surface formed by transforming the curved surface defined by non-dimensionally expressed three-dimensional coordinates specified by Tables 3 and 4 using a transformation formula 26 below, i.e. a three-dimensional curved surface specified by Tables 29 and 30.

$$
\left.
\begin{aligned}
&r_1 = a \times r + b \text{ (mm)} \\
&\theta_1 = c \times \theta + d \text{ (deg)} \\
&z_{1u} = e_u \times z_u + f_u \text{ (mm)} \\
&z_{1d} = e_d \times z_d + f_d \text{ (mm)} \\
&(a, c, e_u, e_d\text{: factor of porportionality; } b, d, f_u, f_d\text{: constant}) \\
&\text{wherein} \\
&a = D/2 = 400/2 = 200 \\
&b = 0 \\
&c = \lambda = 360/n = 120 \\
&d = 0 \\
&e_u = h = 112 \\
&e_d = 106.4 \\
&f_u = 3 \\
&f_d = 0
\end{aligned}
\right\} \quad (26)
$$

TABLE 29

EMBODIMENT 13

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 80 | | 19.29 | 23.27 | 27.00 | 30.57 | 33.92 | 37.02 | 39.86 | 42.51 | 44.99 | 47.29 | 49.37 | 51.02 | 52.02 |
| | | 14.58 | 17.46 | 20.19 | 22.73 | 25.22 | 27.72 | 30.22 | 32.66 | 35.01 | 37.26 | 39.49 | 41.72 | 44.07 |
| 90 | 12.47 | 18.00 | 22.76 | 27.06 | 30.91 | 34.41 | 37.69 | 40.78 | 43.70 | 46.48 | 49.11 | 51.54 | 53.64 | 55.24 |
| | 8.50 | 12.55 | 16.21 | 19.45 | 22.46 | 25.38 | 28.23 | 31.01 | 33.71 | 36.31 | 38.81 | 41.20 | 43.49 | 45.76 |
| 100 | 11.26 | 16.90 | 21.81 | 26.35 | 30.58 | 34.54 | 38.22 | 41.69 | 44.94 | 48.03 | 50.95 | 53.69 | 56.19 | 58.34 |
| | 6.48 | 11.18 | 15.28 | 19.01 | 22.46 | 25.73 | 28.88 | 31.93 | 34.89 | 37.75 | 40.49 | 43.08 | 45.53 | 47.92 |
| 110 | 7.97 | 14.43 | 20.15 | 25.34 | 30.14 | 34.58 | 38.73 | 42.60 | 46.23 | 49.66 | 52.88 | 55.92 | 58.75 | 61.34 |
| | 3.78 | 9.24 | 14.14 | 18.52 | 22.50 | 26.16 | 29.63 | 32.95 | 36.16 | 39.27 | 42.25 | 45.09 | 47.79 | 50.35 |
| 120 | | 11.57 | 18.29 | 24.26 | 29.70 | 34.72 | 39.38 | 43.71 | 47.74 | 51.47 | 54.98 | 58.30 | 61.46 | 64.45 |
| | | 6.92 | 12.71 | 17.85 | 22.43 | 26.58 | 30.42 | 34.03 | 37.48 | 40.81 | 44.03 | 47.13 | 50.11 | 52.98 |
| 130 | | 8.62 | 16.35 | 23.13 | 29.26 | 34.86 | 40.04 | 44.83 | 49.26 | 53.38 | 57.22 | 60.85 | 64.29 | 67.58 |
| | | 4.62 | 11.19 | 17.05 | 22.32 | 27.07 | 31.38 | 35.34 | 39.06 | 42.61 | 46.03 | 49.35 | 52.58 | 55.72 |
| 140 | | | 13.78 | 21.66 | 28.56 | 34.71 | 40.28 | 45.42 | 50.24 | 54.79 | 59.15 | 63.20 | 67.04 | 70.62 |
| | | | 9.29 | 16.21 | 22.34 | 27.79 | 32.66 | 37.08 | 41.15 | 44.96 | 48.59 | 52.06 | 55.39 | 58.58 |
| 150 | | | 11.04 | 20.00 | 27.83 | 34.79 | 41.01 | 46.61 | 51.74 | 56.55 | 61.13 | 65.50 | 69.59 | 73.39 |
| | | | 6.88 | 14.58 | 21.42 | 27.47 | 32.81 | 37.63 | 42.07 | 46.28 | 50.32 | 54.21 | 57.88 | 61.35 |
| 160 | | | 7.77 | 17.86 | 26.72 | 34.63 | 41.70 | 47.99 | 53.64 | 58.79 | 63.58 | 68.14 | 72.56 | 76.78 |
| | | | 4.24 | 12.68 | 20.36 | 27.11 | 33.08 | 38.46 | 43.36 | 47.90 | 52.17 | 56.31 | 60.34 | 64.22 |
| 170 | | | | 15.74 | 25.75 | 34.53 | 42.18 | 48.94 | 55.02 | 60.57 | 65.74 | 70.61 | 75.30 | 79.85 |
| | | | | 10.91 | 19.43 | 26.78 | 33.32 | 39.22 | 44.61 | 49.61 | 54.30 | 58.76 | 63.08 | 67.28 |
| 180 | | | | 13.38 | 24.64 | 34.18 | 42.35 | 49.52 | 55.96 | 61.86 | 67.37 | 72.57 | 77.55 | 82.37 |
| | | | | 9.10 | 18.55 | 26.57 | 33.70 | 40.05 | 45.82 | 51.15 | 56.15 | 60.90 | 65.46 | 69.93 |
| 190 | | | | | 23.11 | 33.70 | 42.46 | 50.02 | 56.78 | 62.95 | 68.68 | 74.08 | 79.28 | 84.27 |
| | | | | | 17.51 | 26.69 | 34.45 | 41.17 | 47.22 | 52.82 | 58.10 | 63.17 | 68.10 | 72.85 |
| (mm) | | | | | | | | | | | | | | |

| r | θ 75 | 80 | 85 | 90 | 95 | 100 | 105 | 110 | 115 | 120 | (deg) |
|---|---|---|---|---|---|---|---|---|---|---|---|
| 80 | | | | | | | | | | | |
| 90 | 56.08 | | | | | | | | | | |
| | 48.18 | | | | | | | | | | |
| 100 | 59.94 | 60.64 | | | | | | | | | |
| | 50.33 | 52.94 | | | | | | | | | |
| 110 | 63.52 | 65.10 | 65.61 | | | | | | | | |
| | 52.88 | 55.49 | 58.44 | | | | | | | | |
| 120 | 67.14 | 69.36 | 70.82 | | | | | | | | |
| | 55.78 | 58.53 | 61.42 | | | | | | | | |
| 130 | 70.70 | 73.52 | 75.81 | 77.21 | | | | | | | |
| | 58.74 | 61.67 | 64.62 | 67.75 | | | | | | | |
| 140 | 73.95 | 77.10 | 80.00 | 82.43 | 83.95 | | | | | | |
| | 61.67 | 64.68 | 67.66 | 70.70 | 74.05 | | | | | | |
| 150 | 77.10 | 80.52 | 83.66 | 86.58 | 89.10 | 90.78 | | | | | |
| | 64.70 | 67.83 | 70.82 | 73.78 | 76.78 | 80.16 | | | | | |
| 160 | 80.71 | 84.31 | 87.69 | 90.93 | 93.55 | 95.89 | 97.60 | | | | |
| | 67.87 | 71.23 | 74.46 | 77.58 | 80.23 | 82.92 | 86.03 | | | | |
| 170 | 84.20 | 88.21 | 91.80 | 94.94 | 97.92 | 100.76 | 103.21 | 104.59 | 105.20 | | |

TABLE 29-continued

| EMBODIMENT 13 | | | | | | | | | | |
|---|---|---|---|---|---|---|---|---|---|---|
| | 71.27 | 74.97 | 78.28 | 81.24 | 84.09 | 86.85 | 89.41 | 91.91 | 95.05 | |
| 180 | 87.10 | 91.55 | 95.54 | 99.04 | 102.08 | 104.67 | 107.12 | 109.26 | 110.84 | 111.50 |
| | 74.32 | 78.43 | 82.10 | 85.37 | 88.18 | 90.65 | 93.10 | 95.47 | 97.80 | 100.29 |
| 190 | 89.10 | 93.82 | 98.23 | 102.05 | 105.33 | 108.12 | 110.47 | 112.34 | 113.83 | 114.63 |
| | 77.41 | 81.81 | 85.86 | 89.39 | 92.45 | 95.15 | 97.46 | 99.58 | 101.86 | 104.20 |
| (mm) | | | | | | | | | | |

DIAMETER D = 400
HEIGHT h = 112 (eu = 112, ed = 106.4, fu = 3, fd = 0)
EXPANSION ANGLE λ = 120
BOSS RATIO ν = 0.35

TABLE 30

| EMBODIMENT 13 | | |
|---|---|---|
| r | θ | z |
| 76.66 | 76.94 | 53.68 |
| | | 47.48 |
| 93.28 | 79.17 | 57.50 |
| | | 51.06 |
| 113.77 | 86.89 | 67.63 |
| | | 60.72 |
| 139.44 | 97.66 | 83.78 |
| | | 76.01 |
| 171.74 | 118.05 | 106.42 |
| | | 97.49 |
| 184.85 | 124.06 | 113.22 |
| | | 104.02 |
| 194.35 | 117.68 | 114.75 |
| | | 105.40 |
| 198.53 | 109.19 | 113.28 |
| | | 103.93 |
| 200.00 | 100.51 | 109.75 |
| | | 100.65 |
| 200.00 | 90.84 | 103.77 |
| | | 94.97 |
| 200.00 | 81.38 | 95.89 |
| | | 87.53 |
| 200.00 | 64.63 | 79.12 |
| | | 71.71 |
| 200.00 | 48.38 | 60.64 |
| | | 54.20 |
| 200.00 | 40.13 | 49.47 |
| | | 43.68 |
| 200.00 | 31.14 | 34.22 |
| | | 29.31 |
| 200.00 | 25.02 | 20.58 |
| | | 16.40 |
| 194.35 | 21.73 | 13.27 |
| | | 9.61 |
| 189.19 | 20.42 | 11.57 |
| | | 7.95 |
| 175.45 | 17.66 | 8.71 |
| | | 5.24 |
| 169.45 | 16.52 | 7.92 |
| | | 4.48 |
| 161.55 | 15.04 | 7.29 |
| | | 3.89 |
| 152.44 | 13.25 | 6.70 |
| | | 3.32 |
| 145.51 | 11.80 | 6.14 |
| | | 2.79 |
| 140.87 | 10.74 | 5.86 |
| | | 2.52 |
| 136.01 | 9.42 | 5.61 |
| | | 2.29 |

TABLE 30-continued

| EMBODIMENT 13 | | |
|---|---|---|
| r | θ | z |
| 128.17 | 7.44 | 4.70 |
| | | 1.42 |
| 116.86 | 4.09 | 3.63 |
| | | 0.41 |
| 104.20 | 1.70 | 6.00 |
| | | 2.10 |

Embodiment 14

Propeller fan 1 having the diameter D=316 mm, the height in the axial direction (z direction) h=100 mm, the number of blades n=3, the expansion angle of a blade λ=120 deg, the boss ratio ν=0.272 (boss diameter νD=86 mm) was formed to have a curved surface formed by transforming the curved surface defined by non-dimensionally expressed three-dimensional coordinates specified by Tables 3 and 4 using a transformation formula 27 below, i.e. a three-dimensional curved surface specified by Tables 31 and 32.

$$\left.\begin{aligned}
&r_1 = a \times r + b \text{ (mm)} \\
&\theta_1 = c \times \theta + d \text{ (deg)} \\
&z_{1u} = e_u \times z_u + f_u \text{ (mm)} \\
&z_{1d} = e_d \times z_d + f_d \text{ (mm)} \\
&(a,\ c,\ e_u,\ e_d\text{: factor of porportionality; } b,\ d,\ f_u,\ f_d\text{: constant}) \\
&\text{wherein} \\
&a = \frac{10}{13}D(1-\nu) = \frac{10}{13} \times 316 \times (1-0.272) = 176.9 \\
&b = -\frac{10}{13}D(1-\nu) \times 0.35 + \frac{\nu D}{2} \\
&\quad = -\frac{10}{13} \times 316 \times (1-0.272) \times 0.35 + \frac{0.272 \times 316}{2} \\
&\quad = -18.9 \\
&c = \lambda = 360/n = 360/3 = 120 \\
&d = 0 \\
&e_u = e_d = h = 100 \\
&f_u = f_d = 0
\end{aligned}\right\} \quad (27)$$

TABLE 31

| EMBODIMENT 14 | | | | | | | | | | | | | |
|---|---|---|---|---|---|---|---|---|---|---|---|---|---|
| | θ | | | | | | | | | | | | |
| r | 5 | 10 | 15 | 20 | 25 | 30 | 35 | 40 | 45 | 50 | 55 | 60 | 65 |
| 51.85 | | 14.54 | 18.10 | 21.43 | 24.61 | 27.61 | 30.37 | 32.91 | 35.28 | 37.49 | 39.54 | 41.40 | 42.87 |
| | | 13.71 | 16.41 | 18.97 | 21.36 | 23.70 | 26.05 | 28.40 | 30.70 | 32.91 | 35.02 | 37.11 | 39.21 |
| 60.69 | 8.46 | 13.39 | 17.64 | 21.48 | 24.92 | 28.04 | 30.97 | 33.73 | 36.34 | 38.82 | 41.17 | 43.34 | 45.21 |
| | 7.99 | 11.79 | 15.24 | 18.28 | 21.11 | 23.85 | 26.53 | 29.14 | 31.68 | 34.13 | 36.48 | 38.72 | 40.87 |
| 69.54 | 7.38 | 12.41 | 16.79 | 20.85 | 24.63 | 28.16 | 31.45 | 34.54 | 37.45 | 40.21 | 42.81 | 45.26 | 47.49 |
| | 6.09 | 10.51 | 14.36 | 17.86 | 21.11 | 24.19 | 27.14 | 30.01 | 32.79 | 35.48 | 38.05 | 40.49 | 42.79 |
| 78.38 | 4.44 | 10.21 | 15.31 | 19.95 | 24.23 | 28.20 | 31.90 | 35.36 | 38.60 | 41.66 | 44.54 | 47.25 | 49.78 |
| | 3.55 | 8.69 | 13.29 | 17.41 | 21.14 | 24.59 | 27.85 | 30.97 | 33.99 | 36.91 | 39.71 | 42.38 | 44.91 |
| 87.23 | | 7.65 | 13.65 | 18.98 | 23.84 | 28.32 | 32.49 | 36.35 | 39.94 | 43.28 | 46.41 | 49.38 | 52.19 |
| | | 6.51 | 11.95 | 16.78 | 21.08 | 24.98 | 28.59 | 31.99 | 35.23 | 38.36 | 41.38 | 44.29 | 47.10 |
| 96.08 | | 5.01 | 11.92 | 17.97 | 23.44 | 28.45 | 33.07 | 37.35 | 41.31 | 44.99 | 48.41 | 51.65 | 54.72 |
| | | 4.34 | 10.51 | 16.03 | 20.98 | 25.44 | 29.49 | 33.21 | 36.71 | 40.04 | 43.26 | 46.39 | 49.42 |
| 104.9 | | | 9.62 | 16.66 | 22.82 | 28.31 | 33.29 | 37.88 | 42.18 | 46.24 | 50.14 | 53.75 | 57.18 |
| | | | 8.73 | 15.24 | 21.00 | 26.11 | 30.70 | 34.85 | 38.67 | 42.26 | 45.66 | 48.93 | 52.06 |
| 113.8 | | | 7.18 | 15.18 | 22.17 | 28.39 | 33.94 | 38.94 | 43.52 | 47.81 | 51.90 | 55.80 | 59.46 |
| | | | 6.46 | 13.70 | 20.14 | 25.81 | 30.84 | 35.36 | 39.54 | 43.49 | 47.29 | 50.95 | 54.40 |
| 122.6 | | | 4.26 | 13.26 | 21.18 | 28.24 | 34.55 | 40.17 | 45.21 | 49.81 | 54.09 | 58.16 | 62.11 |
| | | | 3.99 | 11.92 | 19.14 | 25.48 | 31.09 | 36.14 | 40.75 | 45.01 | 49.03 | 52.92 | 56.71 |
| 131.5 | | | | 11.38 | 20.31 | 28.15 | 34.99 | 41.02 | 46.45 | 51.40 | 56.01 | 60.36 | 64.55 |
| | | | | 10.26 | 18.26 | 25.17 | 31.31 | 36.86 | 41.93 | 46.63 | 51.04 | 55.22 | 59.29 |
| 140.3 | | | | 9.27 | 19.32 | 27.84 | 35.14 | 41.54 | 47.29 | 52.56 | 57.47 | 62.11 | 66.56 |
| | | | | 8.55 | 17.44 | 24.97 | 31.67 | 37.64 | 43.06 | 48.07 | 52.77 | 57.24 | 61.52 |
| 149.2 | | | | | 17.96 | 27.41 | 35.23 | 41.99 | 48.01 | 53.53 | 58.64 | 63.46 | 68.11 |
| | | | | | 16.46 | 25.09 | 32.38 | 38.69 | 44.38 | 49.64 | 54.61 | 59.37 | 64.01 |
| (mm) | | | | | | | | | | | | | |

| | θ | | | | | | | | | | |
|---|---|---|---|---|---|---|---|---|---|---|---|
| r | 70 | 75 | 80 | 85 | 90 | 95 | 100 | 105 | 110 | 115 | 120 (deg) |
| 51.85 | 43.76 | | | | | | | | | | |
| | 41.42 | | | | | | | | | | |
| 60.69 | 46.64 | 47.39 | | | | | | | | | |
| | 43.01 | 45.28 | | | | | | | | | |
| 69.54 | 49.41 | 50.84 | 51.46 | | | | | | | | |
| | 45.04 | 47.30 | 49.76 | | | | | | | | |
| 78.38 | 52.09 | 54.04 | 55.44 | 55.90 | | | | | | | |
| | 47.32 | 49.70 | 52.15 | 54.93 | | | | | | | |
| 87.23 | 54.86 | 57.27 | 59.25 | 60.56 | | | | | | | |
| | 49.79 | 52.42 | 55.01 | 57.73 | | | | | | | |
| 96.08 | 57.66 | 60.45 | 62.96 | 65.01 | 66.26 | | | | | | |
| | 52.36 | 55.21 | 57.96 | 60.73 | 63.68 | | | | | | |
| 104.9 | 60.37 | 63.35 | 66.16 | 68.75 | 70.92 | 72.28 | | | | | |
| | 55.06 | 57.96 | 60.79 | 63.59 | 66.44 | 69.60 | | | | | |
| 113.8 | 62.85 | 66.16 | 69.21 | 72.02 | 74.63 | 76.88 | 78.38 | | | | |
| | 57.66 | 60.81 | 63.75 | 66.56 | 69.34 | 72.16 | 75.34 | | | | |
| 122.6 | 65.87 | 69.39 | 72.60 | 75.61 | 78.51 | 80.85 | 82.94 | 84.46 | | | |
| | 60.36 | 63.79 | 66.95 | 69.99 | 72.91 | 75.40 | 77.94 | 80.86 | | | |
| 131.5 | 68.61 | 72.50 | 76.08 | 79.29 | 82.09 | 84.75 | 87.29 | 89.47 | 90.71 | 91.25 | |
| | 63.24 | 66.98 | 70.46 | 73.57 | 76.36 | 79.03 | 81.63 | 84.04 | 86.39 | 89.34 | |
| 140.3 | 70.86 | 75.09 | 79.06 | 82.62 | 85.75 | 88.46 | 90.78 | 92.96 | 94.87 | 96.29 | 96.87 |
| | 65.72 | 69.85 | 73.71 | 77.16 | 80.24 | 82.87 | 85.19 | 87.50 | 89.73 | 91.91 | 94.26 |
| 149.2 | 72.56 | 76.87 | 81.09 | 85.03 | 88.44 | 91.36 | 93.86 | 95.96 | 97.63 | 98.96 | 99.67 |
| | 68.47 | 72.76 | 76.89 | 80.69 | 84.01 | 86.89 | 89.43 | 91.60 | 93.59 | 95.73 | 97.94 |
| (mm) | | | | | | | | | | | |

DIAMETER D = 316
HEIGHT h = 100
EXPANSION ANGLE λ = 120
BOSS RATIO ν = 0.272

TABLE 32

| EMBODIMENT 14 | | |
|---|---|---|
| r | θ | z |
| 48.89 | 76.94 | 45.25 |
| | | 44.63 |

TABLE 32-continued

| EMBODIMENT 14 | | |
|---|---|---|
| r | θ | z |
| 63.59 | 79.17 | 48.66 |
| | | 47.99 |

TABLE 32-continued

| EMBODIMENT 14 | | |
|---|---|---|
| r | θ | z |
| 81.72 | 86.89 | 57.71 |
| | | 57.06 |
| 104.43 | 97.66 | 72.12 |
| | | 71.44 |
| 133.00 | 118.05 | 92.34 |
| | | 91.62 |
| 144.60 | 124.06 | 98.41 |
| | | 97.76 |
| 153.00 | 117.68 | 99.78 |
| | | 99.06 |
| 156.70 | 109.19 | 98.46 |
| | | 97.68 |
| 158.00 | 100.51 | 95.31 |
| | | 94.60 |
| 158.00 | 90.84 | 89.97 |
| | | 89.26 |
| 158.00 | 81.38 | 82.94 |
| | | 82.26 |
| 158.00 | 64.63 | 67.96 |
| | | 67.39 |
| 158.00 | 48.38 | 51.46 |
| | | 50.94 |
| 158.00 | 40.13 | 41.49 |
| | | 41.05 |
| 158.00 | 31.14 | 27.87 |
| | | 27.54 |
| 158.00 | 25.02 | 15.70 |
| | | 15.41 |
| 153.00 | 21.73 | 9.17 |
| | | 9.03 |
| 148.44 | 20.42 | 7.65 |
| | | 7.47 |
| 136.28 | 17.66 | 5.10 |
| | | 4.92 |
| 130.98 | 16.52 | 4.39 |
| | | 4.21 |
| 123.99 | 15.04 | 3.83 |
| | | 3.66 |
| 115.96 | 13.25 | 3.30 |
| | | 3.12 |
| 109.80 | 11.80 | 2.80 |
| | | 2.62 |
| 105.69 | 10.74 | 2.55 |
| | | 2.37 |
| 101.39 | 9.42 | 2.33 |
| | | 2.15 |
| 94.46 | 7.44 | 1.51 |
| | | 1.34 |
| 84.45 | 4.09 | 0.56 |
| | | 0.39 |
| 73.25 | 1.70 | 2.68 |
| | | 1.97 |

Embodiment 15

Propeller fan 1 having the diameter D=316 mm, the height in the axial direction (z direction) h=100 mm, the number of blades n=4, the expansion angle of a blade λ=90 deg, the boss ratio ν=0.272 (boss diameter νD=86 mm) was formed to have a curved surface formed by transforming the curved surface defined by non-dimensionally expressed three-dimensional coordinates specified by Tables 3 and 4 using a transformation formula 28 below, i.e. a three-dimensional curved surface specified by Tables 33 and 34.

$$\left.\begin{aligned}
&r_1 = a \times r + b \text{ (mm)} \\
&\theta_1 = c \times \theta + d \text{ (deg)} \\
&z_{1u} = e_u \times z_u + f_u \text{ (mm)} \\
&z_{1d} = e_d \times z_d + f_d \text{ (mm)} \\
&(a,\ c,\ e_u,\ e_d\text{: factor of porportionality; } b,\ d,\ f_u,\ f_d\text{: constant}) \\
&\text{wherein} \\
&a = \frac{10}{13}D(1-\nu) = \frac{10}{13} \times 316 \times (1-0.272) = 176.9 \\
&b = -\frac{10}{13}D(1-\nu) \times 0.35 + \frac{\nu D}{2} \\
&\quad = -\frac{10}{13} \times 316 \times (1-0.272) \times 0.35 + \frac{0.272 \times 316}{2} \\
&\quad = -18.9 \\
&c = \lambda = 360/n = 360/4 = 90 \\
&d = 0 \\
&e_u = e_d = h = 100 \\
&f_u = f_d = 0
\end{aligned}\right\} \quad (28)$$

TABLE 33

| EMBODIMENT 15 | | | | | | | | | | | | | |
|---|---|---|---|---|---|---|---|---|---|---|---|---|---|
| | θ | | | | | | | | | | | | |
| r | 3.75 | 7.5 | 11.25 | 15 | 18.75 | 22.5 | 26.25 | 30 | 33.75 | 37.5 | 41.25 | 45 | 48.75 |
| 51.85 | | 14.54 | 18.10 | 21.43 | 24.61 | 27.61 | 30.37 | 32.91 | 35.28 | 37.49 | 39.54 | 41.40 | 42.87 |
| | | 13.71 | 16.41 | 18.97 | 21.36 | 23.70 | 26.05 | 28.40 | 30.70 | 32.91 | 35.02 | 37.11 | 39.21 |
| 60.69 | 8.46 | 13.39 | 17.64 | 21.48 | 24.92 | 28.04 | 30.97 | 33.73 | 36.34 | 38.82 | 41.17 | 43.34 | 45.21 |
| | 7.99 | 11.79 | 15.24 | 18.28 | 21.11 | 23.85 | 26.53 | 29.14 | 31.68 | 34.13 | 36.48 | 38.72 | 40.87 |
| 69.54 | 7.38 | 12.41 | 16.79 | 20.85 | 24.63 | 28.16 | 31.45 | 34.54 | 37.45 | 40.21 | 42.81 | 45.26 | 47.49 |
| | 6.09 | 10.51 | 14.36 | 17.86 | 21.11 | 24.19 | 27.14 | 30.01 | 32.79 | 35.48 | 38.05 | 40.49 | 42.79 |
| 78.38 | 4.44 | 10.21 | 15.31 | 19.95 | 24.23 | 28.20 | 31.90 | 35.36 | 38.60 | 41.66 | 44.54 | 47.25 | 49.78 |
| | 3.55 | 8.69 | 13.29 | 17.41 | 21.14 | 24.59 | 27.85 | 30.97 | 33.99 | 36.91 | 39.71 | 42.38 | 44.91 |
| 87.23 | | 7.65 | 13.65 | 18.98 | 23.84 | 28.32 | 32.49 | 36.35 | 39.94 | 43.28 | 46.41 | 49.38 | 52.19 |
| | | 6.51 | 11.95 | 16.78 | 21.08 | 24.98 | 28.59 | 31.99 | 35.23 | 38.36 | 41.38 | 44.29 | 47.10 |
| 96.08 | | 5.01 | 11.92 | 17.97 | 23.44 | 28.45 | 33.07 | 37.35 | 41.31 | 44.99 | 48.41 | 51.65 | 54.72 |
| | | 4.34 | 10.51 | 16.03 | 20.98 | 25.44 | 29.49 | 33.21 | 36.71 | 40.04 | 43.26 | 46.39 | 49.42 |
| 104.9 | | | 9.62 | 16.66 | 22.82 | 28.31 | 33.29 | 37.88 | 42.18 | 46.24 | 50.14 | 53.75 | 57.18 |
| | | | 8.73 | 15.24 | 21.00 | 26.11 | 30.70 | 34.85 | 38.67 | 42.26 | 45.66 | 48.93 | 52.06 |
| 113.8 | | | 7.18 | 15.18 | 22.17 | 28.39 | 33.94 | 38.94 | 43.52 | 47.81 | 51.90 | 55.80 | 59.46 |
| | | | 6.46 | 13.70 | 20.14 | 25.81 | 30.84 | 35.36 | 39.54 | 43.49 | 47.29 | 50.95 | 54.40 |
| 122.6 | | | 4.26 | 13.26 | 21.18 | 28.24 | 34.55 | 40.17 | 45.21 | 49.81 | 54.09 | 58.16 | 62.11 |

TABLE 33-continued

| EMBODIMENT 15 | | | | | | | | | | | | | |
|---|---|---|---|---|---|---|---|---|---|---|---|---|---|
| | | | 3.99 | 11.92 | 19.14 | 25.48 | 31.09 | 36.14 | 40.75 | 45.01 | 49.03 | 52.92 | 56.71 |
| 131.5 | | | | 11.38 | 20.31 | 28.15 | 34.99 | 41.02 | 46.45 | 51.40 | 56.01 | 60.36 | 64.55 |
| | | | | 10.26 | 18.26 | 25.17 | 31.31 | 36.86 | 41.93 | 46.63 | 51.04 | 55.22 | 59.29 |
| 140.3 | | | | 9.27 | 19.32 | 27.84 | 35.14 | 41.54 | 47.29 | 52.56 | 57.47 | 62.11 | 66.56 |
| | | | | 8.55 | 17.44 | 24.97 | 31.67 | 37.64 | 43.06 | 48.07 | 52.77 | 57.24 | 61.52 |
| 149.2 | | | | | 17.96 | 27.41 | 35.23 | 41.99 | 48.01 | 53.53 | 58.64 | 63.46 | 68.11 |
| | | | | | 16.46 | 25.09 | 32.38 | 38.69 | 44.38 | 49.64 | 54.61 | 59.37 | 64.01 |
| (mm) | | | | | | | | | | | | | |

| | θ | | | | | | | | | | | |
|---|---|---|---|---|---|---|---|---|---|---|---|---|
| r | 52.5 | 56.25 | 60 | 63.75 | 67.5 | 71.25 | 75 | 78.75 | 82.5 | 86.25 | 90 | (deg) |
| 51.85 | 43.76 | | | | | | | | | | | |
| | 41.42 | | | | | | | | | | | |
| 60.69 | 46.64 | 47.39 | | | | | | | | | | |
| | 43.01 | 45.28 | | | | | | | | | | |
| 69.54 | 49.41 | 50.84 | 51.46 | | | | | | | | | |
| | 45.04 | 47.30 | 49.76 | | | | | | | | | |
| 78.38 | 52.09 | 54.04 | 55.44 | 55.90 | | | | | | | | |
| | 47.32 | 49.70 | 52.15 | 54.93 | | | | | | | | |
| 87.23 | 54.86 | 57.27 | 59.25 | 60.56 | | | | | | | | |
| | 49.79 | 52.42 | 55.01 | 57.73 | | | | | | | | |
| 96.08 | 57.66 | 60.45 | 62.96 | 65.01 | 66.26 | | | | | | | |
| | 52.36 | 55.21 | 57.96 | 60.73 | 63.68 | | | | | | | |
| 104.9 | 60.37 | 63.35 | 66.16 | 68.75 | 70.92 | 72.28 | | | | | | |
| | 55.06 | 57.96 | 60.79 | 63.59 | 66.44 | 69.60 | | | | | | |
| 113.8 | 62.85 | 66.16 | 69.21 | 72.02 | 74.63 | 76.88 | 78.38 | | | | | |
| | 57.66 | 60.81 | 63.75 | 66.56 | 69.34 | 72.16 | 75.34 | | | | | |
| 122.6 | 65.87 | 69.39 | 72.60 | 75.61 | 78.51 | 80.85 | 82.94 | 84.46 | | | | |
| | 60.36 | 63.79 | 66.95 | 69.99 | 72.91 | 75.40 | 77.94 | 80.86 | | | | |
| 131.5 | 68.61 | 72.50 | 76.08 | 79.29 | 82.09 | 84.75 | 87.29 | 89.47 | 90.71 | 91.25 | | |
| | 63.24 | 66.98 | 70.46 | 73.57 | 76.36 | 79.03 | 81.63 | 84.04 | 86.39 | 89.34 | | |
| 140.3 | 70.86 | 75.09 | 79.06 | 82.62 | 85.75 | 88.46 | 90.78 | 92.96 | 94.87 | 96.29 | 96.87 | |
| | 65.72 | 69.85 | 73.71 | 77.16 | 80.24 | 82.87 | 85.19 | 87.50 | 89.73 | 91.91 | 94.26 | |
| 149.2 | 72.56 | 76.87 | 81.09 | 85.03 | 88.44 | 91.36 | 93.86 | 95.96 | 97.63 | 98.96 | 99.67 | |
| | 68.47 | 72.76 | 76.89 | 80.69 | 84.01 | 86.89 | 89.43 | 91.60 | 93.59 | 95.73 | 97.94 | |
| (mm) | | | | | | | | | | | | |

DIAMETER D = 316
HEIGHT h = 100
EXPANSION ANGLE λ = 90
BOSS RATIO ν = 0.272

TABLE 34

| EMBODIMENT 15 | | |
|---|---|---|
| r | θ | z |
| 48.89 | 57.71 | 45.25 |
| | | 44.63 |
| 63.59 | 59.38 | 48.66 |
| | | 47.99 |
| 81.72 | 65.17 | 57.71 |
| | | 57.06 |
| 104.43 | 73.25 | 72.12 |
| | | 71.44 |
| 133.00 | 88.54 | 92.34 |
| | | 91.62 |
| 144.60 | 93.05 | 98.41 |
| | | 97.76 |
| 153.00 | 88.26 | 99.78 |
| | | 99.06 |
| 156.70 | 81.89 | 98.46 |
| | | 97.68 |
| 158.00 | 75.38 | 95.31 |
| | | 94.60 |
| 158.00 | 68.13 | 89.97 |
| | | 89.26 |
| 158.00 | 61.04 | 82.94 |
| | | 82.26 |
| 158.00 | 48.47 | 67.96 |
| | | 67.39 |

TABLE 34-continued

| EMBODIMENT 15 | | |
|---|---|---|
| r | θ | z |
| 158.00 | 36.29 | 51.46 |
| | | 50.94 |
| 158.00 | 30.10 | 41.49 |
| | | 41.05 |
| 158.00 | 23.36 | 27.87 |
| | | 27.54 |
| 158.00 | 18.77 | 15.70 |
| | | 15.41 |
| 153.00 | 16.30 | 9.17 |
| | | 9.03 |
| 148.44 | 15.32 | 7.65 |
| | | 7.47 |
| 136.28 | 13.25 | 5.10 |
| | | 4.92 |
| 130.98 | 12.39 | 4.39 |
| | | 4.21 |
| 123.99 | 11.28 | 3.83 |
| | | 3.66 |
| 115.93 | 9.94 | 3.30 |
| | | 3.12 |
| 109.80 | 8.85 | 2.80 |
| | | 2.62 |
| 105.69 | 8.06 | 2.55 |
| | | 2.37 |

TABLE 34-continued

| EMBODIMENT 15 | | |
|---|---|---|
| r | θ | z |
| 101.39 | 7.07 | 2.33 |
| | | 2.15 |
| 94.46 | 5.58 | 1.51 |
| | | 1.34 |
| 84.45 | 3.07 | 0.56 |
| | | 0.39 |
| 73.25 | 1.27 | 2.68 |
| | | 1.97 |

Embodiment 16

Propeller fan 1 having the diameter D=316 mm, the height in the axial direction (z direction) h=100 mm, the number of blades n=5, the expansion angle of a blade λ=72 deg, the boss ratio ν=0.272 (boss diameter νD=86 mm) was formed to have a curved surface formed by transforming the curved surface defined by non-dimensionally expressed three-dimensional coordinates specified by Tables 3 and 4 using a transformation formula 29 below, i.e. a three-dimensional curved surface specified by Tables 35 and 36.

$$\left.\begin{aligned}
&r_1 = a \times r + b \text{ (mm)} \\
&\theta_1 = c \times \theta + d \text{ (deg)} \\
&z_{1u} = e_u \times z_u + f_u \text{ (mm)} \\
&z_{1d} = e_d \times z_d + f_d \text{ (mm)} \\
&(a, c, e_u, e_d\text{: factor of porportionality; } b, d, f_u, f_d\text{: constant}) \\
&\text{wherein} \\
&a = \frac{10}{13}D(1-\nu) = \frac{10}{13} \times 316 \times (1-0.272) = 176.9 \\
&b = -\frac{10}{13}D(1-\nu) \times 0.35 + \frac{\nu D}{2} \\
&\quad = -\frac{10}{13} \times 316 \times (1-0.272) \times 0.35 + \frac{0.272 \times 316}{2} \\
&\quad = -18.9 \\
&c = \lambda = 360/n = 360/5 = 72 \\
&d = 0 \\
&e_u = e_d = h = 100 \\
&f_u = f_d = 0
\end{aligned}\right\} \quad (29)$$

TABLE 35

EMBODIMENT 16

| r | θ 3 | 6 | 9 | 12 | 15 | 18 | 21 | 24 | 27 | 30 | 33 | 36 | 39 |
|---|---|---|---|---|---|---|---|---|---|---|---|---|---|
| 51.85 | | 14.54 | 18.10 | 21.43 | 24.61 | 27.61 | 30.37 | 32.91 | 35.28 | 37.49 | 39.54 | 41.40 | 42.87 |
| | | 13.71 | 16.41 | 18.97 | 21.36 | 23.70 | 26.05 | 28.40 | 30.70 | 32.91 | 35.02 | 37.11 | 39.21 |
| 60.69 | 8.46 | 13.39 | 17.64 | 21.48 | 24.92 | 28.04 | 30.97 | 33.73 | 36.34 | 38.82 | 41.17 | 43.34 | 45.21 |
| | 7.99 | 11.79 | 15.24 | 18.28 | 21.11 | 23.85 | 26.53 | 29.14 | 31.68 | 34.13 | 36.48 | 38.72 | 40.87 |
| 69.54 | 7.38 | 12.41 | 16.79 | 20.85 | 24.63 | 28.16 | 31.45 | 34.54 | 37.45 | 40.21 | 42.81 | 45.26 | 47.49 |
| | 6.09 | 10.51 | 14.36 | 17.86 | 21.11 | 24.19 | 27.14 | 30.01 | 32.79 | 35.48 | 38.05 | 40.49 | 42.79 |
| 78.38 | 4.44 | 10.21 | 15.31 | 19.95 | 24.23 | 28.20 | 31.90 | 35.36 | 38.60 | 41.66 | 44.54 | 47.25 | 49.78 |
| | 3.55 | 8.69 | 13.29 | 17.41 | 21.14 | 24.59 | 27.85 | 30.97 | 33.99 | 36.91 | 39.71 | 42.38 | 44.91 |
| 87.23 | | 7.65 | 13.65 | 18.98 | 23.84 | 28.32 | 32.49 | 36.35 | 39.94 | 43.28 | 46.41 | 49.38 | 52.19 |
| | | 6.51 | 11.95 | 16.78 | 21.08 | 24.98 | 28.59 | 31.99 | 35.23 | 38.36 | 41.38 | 44.29 | 47.10 |
| 96.08 | | 5.01 | 11.92 | 17.97 | 23.44 | 28.45 | 33.07 | 37.35 | 41.31 | 44.99 | 48.41 | 51.65 | 54.72 |
| | | 4.34 | 10.51 | 16.03 | 20.98 | 25.44 | 29.49 | 33.21 | 36.71 | 40.04 | 43.26 | 46.39 | 49.42 |
| 104.9 | | | 9.62 | 16.66 | 22.82 | 28.31 | 33.29 | 37.88 | 42.18 | 46.24 | 50.14 | 53.75 | 57.18 |
| | | | 8.73 | 15.24 | 21.00 | 26.11 | 30.70 | 34.85 | 38.67 | 42.26 | 45.66 | 48.93 | 52.06 |
| 113.8 | | | 7.18 | 15.18 | 22.17 | 28.39 | 33.94 | 38.94 | 43.52 | 47.81 | 51.90 | 55.80 | 59.46 |
| | | | 6.46 | 13.70 | 20.14 | 25.81 | 30.84 | 35.36 | 39.54 | 43.49 | 47.29 | 50.95 | 54.40 |
| 122.6 | | | 4.26 | 13.26 | 21.18 | 28.24 | 34.55 | 40.17 | 45.21 | 49.81 | 54.09 | 58.16 | 62.11 |
| | | | 3.99 | 11.92 | 19.14 | 25.48 | 31.09 | 36.14 | 40.75 | 45.01 | 49.03 | 52.92 | 56.71 |
| 131.5 | | | | 11.38 | 20.31 | 28.15 | 34.99 | 41.02 | 46.45 | 51.40 | 56.01 | 60.36 | 64.55 |
| | | | | 10.26 | 18.26 | 25.17 | 31.31 | 36.86 | 41.93 | 46.63 | 51.04 | 55.22 | 59.29 |
| 140.3 | | | | 9.27 | 19.32 | 27.84 | 35.14 | 41.54 | 47.29 | 52.56 | 57.47 | 62.11 | 66.56 |
| | | | | 8.55 | 17.44 | 24.97 | 31.67 | 37.64 | 43.06 | 48.07 | 52.77 | 57.24 | 61.52 |
| 149.2 | | | | | 17.96 | 27.41 | 35.23 | 41.99 | 48.01 | 53.53 | 58.64 | 63.46 | 68.11 |
| | | | | | 16.46 | 25.09 | 32.38 | 38.69 | 44.38 | 49.64 | 54.61 | 59.37 | 64.01 |
| (mm) | | | | | | | | | | | | | |

| r | θ 42 | 45 | 48 | 51 | 54 | 57 | 60 | 63 | 66 | 69 | 72 | (deg) |
|---|---|---|---|---|---|---|---|---|---|---|---|---|
| 51.85 | 43.76 | | | | | | | | | | | |
| | 41.42 | | | | | | | | | | | |
| 60.69 | 46.64 | 47.39 | | | | | | | | | | |
| | 43.01 | 45.28 | | | | | | | | | | |
| 69.54 | 49.41 | 50.84 | 51.46 | | | | | | | | | |
| | 45.04 | 47.30 | 49.76 | | | | | | | | | |
| 78.38 | 52.09 | 54.04 | 55.44 | 55.90 | | | | | | | | |
| | 47.32 | 49.70 | 52.15 | 54.93 | | | | | | | | |
| 87.23 | 54.86 | 57.27 | 59.25 | 60.56 | | | | | | | | |
| | 49.79 | 52.42 | 55.01 | 57.73 | | | | | | | | |

TABLE 35-continued

| EMBODIMENT 16 | | | | | | | | | | | |
|---|---|---|---|---|---|---|---|---|---|---|---|
| 96.08 | 57.66 | 60.45 | 62.96 | 65.01 | 66.26 | | | | | | |
| | 52.36 | 55.21 | 57.96 | 60.73 | 63.68 | | | | | | |
| 104.9 | 60.37 | 63.35 | 66.16 | 68.75 | 70.92 | 72.28 | | | | | |
| | 55.06 | 57.96 | 60.79 | 63.59 | 66.44 | 69.60 | | | | | |
| 113.8 | 62.85 | 66.16 | 69.21 | 72.02 | 74.63 | 76.88 | 78.38 | | | | |
| | 57.66 | 60.81 | 63.75 | 66.56 | 69.34 | 72.16 | 75.34 | | | | |
| 122.6 | 65.87 | 69.39 | 72.60 | 75.61 | 78.51 | 80.85 | 82.94 | 84.46 | | | |
| | 60.36 | 63.79 | 66.95 | 69.99 | 72.91 | 75.40 | 77.94 | 80.86 | | | |
| 131.5 | 68.61 | 72.50 | 76.08 | 79.29 | 82.09 | 84.75 | 87.29 | 89.47 | 90.71 | 91.25 | |
| | 63.24 | 66.98 | 70.46 | 73.57 | 76.36 | 79.03 | 81.63 | 84.04 | 86.39 | 89.34 | |
| 140.3 | 70.86 | 75.09 | 79.06 | 82.62 | 85.75 | 88.46 | 90.78 | 92.96 | 94.87 | 96.29 | 96.87 |
| | 65.72 | 69.85 | 73.71 | 77.16 | 80.24 | 82.87 | 85.19 | 87.50 | 89.73 | 91.91 | 94.26 |
| 149.2 | 72.56 | 76.87 | 81.09 | 85.03 | 88.44 | 91.36 | 93.86 | 95.96 | 97.63 | 98.96 | 99.67 |
| | 68.47 | 72.76 | 76.89 | 80.69 | 84.01 | 86.89 | 89.43 | 91.60 | 93.59 | 95.73 | 97.94 |
| (mm) | | | | | | | | | | | |

DIAMETER D = 316
HEIGHT h = 100
EXPANSION ANGLE λ = 72
BOSS RATIO ν = 0.272

TABLE 36

| EMBODIMENT 16 | | |
|---|---|---|
| r | θ | z |
| 48.89 | 46.16 | 45.25 |
| | | 44.63 |
| 63.59 | 47.50 | 48.66 |
| | | 47.99 |
| 81.72 | 52.13 | 57.71 |
| | | 57.06 |
| 104.43 | 58.60 | 72.12 |
| | | 71.44 |
| 133.00 | 70.83 | 92.34 |
| | | 91.62 |
| 144.60 | 74.44 | 98.41 |
| | | 97.76 |
| 153.00 | 70.61 | 99.78 |
| | | 99.06 |
| 156.70 | 65.51 | 98.46 |
| | | 97.68 |
| 158.00 | 60.31 | 95.31 |
| | | 94.60 |
| 158.00 | 54.50 | 89.97 |
| | | 89.26 |
| 158.00 | 48.83 | 82.94 |
| | | 82.26 |
| 158.00 | 38.78 | 67.96 |
| | | 67.39 |
| 158.00 | 29.03 | 51.46 |
| | | 50.94 |
| 158.00 | 24.08 | 41.49 |
| | | 41.05 |
| 158.00 | 18.68 | 27.87 |
| | | 27.54 |
| 158.00 | 15.01 | 15.70 |
| | | 15.41 |
| 153.00 | 13.04 | 9.17 |
| | | 9.03 |
| 148.44 | 12.25 | 7.65 |
| | | 7.47 |

TABLE 36-continued

| EMBODIMENT 16 | | |
|---|---|---|
| r | θ | z |
| 136.28 | 10.60 | 5.10 |
| | | 4.92 |
| 130.98 | 9.91 | 4.39 |
| | | 4.21 |
| 123.99 | 9.02 | 3.83 |
| | | 3.66 |
| 115.93 | 7.95 | 3.30 |
| | | 3.12 |
| 109.80 | 7.08 | 2.80 |
| | | 2.62 |
| 105.69 | 6.44 | 2.55 |
| | | 2.37 |
| 101.39 | 5.65 | 2.33 |
| | | 2.15 |
| 94.46 | 4.46 | 1.51 |
| | | 1.34 |
| 84.45 | 2.45 | 0.56 |
| | | 0.39 |
| 73.25 | 1.02 | 2.68 |
| | | 1.97 |

Embodiment 17

Propeller fan 1 having the diameter D=316 mm, the height in the axial direction (z direction) h=100 mm, the number of blades n=5, the expansion angle of a blade λ=108.5 deg, the boss ratio ν=0.272 (boss diameter νD=86 mm) was formed to have a curved surface formed by transforming the curved surface defined by non-dimensionally expressed three-dimensional coordinates specified by Tables 3 and 4 using a transformation formula 30 below, i.e. a three-dimensional curved surface specified by Tables 37 and 38.

$$
\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of porportionality; } b,\ d,\ f_u,\ f_d\text{: constant})\\
&\text{wherein}\\
&a = \frac{10}{13}D(1-v) = \frac{10}{13}\times 316\times(1-0.272) = 176.9\\
&b = -\frac{10}{13}D(1-v)\times 0.35 + \frac{vD}{2}\\
&\quad = -\frac{10}{13}\times 316\times(1-0.272)\times 0.35 + \frac{0.272\times 316}{2}\\
&\quad = -18.9\\
&c = \lambda = \frac{2400}{7}\times\frac{h}{D} = \frac{2400}{7}\times\frac{140}{400} = 108.5\\
&d = 0\\
&e_u = e_d = h = 100\\
&f_u = f_d = 0
\end{aligned}\right\} \quad (30)
$$

TABLE 37

EMBODIMENT 17

| r | θ 4.521 | 9.042 | 13.56 | 18.08 | 22.6 | 27.13 | 31.65 | 36.17 | 40.69 | 45.21 | 49.73 | 54.25 | 58.77 |
|---|---|---|---|---|---|---|---|---|---|---|---|---|---|
| 51.85 | | 14.54 | 18.10 | 21.43 | 24.61 | 27.61 | 30.37 | 32.91 | 35.28 | 37.49 | 39.54 | 41.40 | 42.87 |
| | | 13.71 | 16.41 | 18.97 | 21.36 | 23.70 | 26.05 | 28.40 | 30.70 | 32.91 | 35.02 | 37.11 | 39.21 |
| 60.69 | 8.46 | 13.39 | 17.64 | 21.48 | 24.92 | 28.04 | 30.97 | 33.73 | 36.34 | 38.82 | 41.17 | 43.34 | 45.21 |
| | 7.99 | 11.79 | 15.24 | 18.28 | 21.11 | 23.85 | 26.53 | 29.14 | 31.68 | 34.13 | 36.48 | 38.72 | 40.87 |
| 69.54 | 7.38 | 12.41 | 16.79 | 20.85 | 24.63 | 28.16 | 31.45 | 34.54 | 37.45 | 40.21 | 42.81 | 45.26 | 47.49 |
| | 6.09 | 10.51 | 14.36 | 17.86 | 21.11 | 24.19 | 27.14 | 30.01 | 32.79 | 35.48 | 38.05 | 40.49 | 42.79 |
| 78.38 | 4.44 | 10.21 | 15.31 | 19.95 | 24.23 | 28.20 | 31.90 | 35.36 | 38.60 | 41.66 | 44.54 | 47.25 | 49.78 |
| | 3.55 | 8.69 | 13.29 | 17.41 | 21.14 | 24.59 | 27.85 | 30.97 | 33.99 | 36.91 | 39.71 | 42.38 | 44.91 |
| 87.23 | | 7.65 | 13.65 | 18.98 | 23.84 | 28.32 | 32.49 | 36.35 | 39.94 | 43.28 | 46.41 | 49.38 | 52.19 |
| | | 6.51 | 11.95 | 16.78 | 21.08 | 24.98 | 28.59 | 31.99 | 35.23 | 38.36 | 41.38 | 44.29 | 47.10 |
| 96.08 | | 5.01 | 11.92 | 17.97 | 23.44 | 28.45 | 33.07 | 37.35 | 41.31 | 44.99 | 48.41 | 51.65 | 54.72 |
| | | 4.34 | 10.51 | 16.03 | 20.98 | 25.44 | 29.49 | 33.21 | 36.71 | 40.04 | 43.26 | 46.39 | 49.42 |
| 104.9 | | | 9.62 | 16.66 | 22.82 | 28.31 | 33.29 | 37.88 | 42.18 | 46.24 | 50.14 | 53.75 | 57.18 |
| | | | 87.3 | 15.24 | 21.00 | 26.11 | 30.70 | 34.85 | 38.67 | 42.26 | 45.66 | 48.93 | 52.06 |
| 113.8 | | | 7.18 | 15.18 | 22.17 | 28.39 | 33.94 | 38.94 | 43.52 | 47.81 | 51.90 | 55.80 | 59.46 |
| | | | 6.46 | 13.70 | 20.14 | 25.81 | 30.84 | 35.36 | 39.54 | 43.49 | 47.29 | 50.95 | 54.40 |
| 122.6 | | | 4.26 | 13.26 | 21.18 | 28.24 | 34.55 | 40.17 | 45.21 | 49.81 | 54.09 | 58.16 | 62.11 |
| | | | 3.99 | 11.92 | 19.14 | 25.48 | 31.09 | 36.14 | 40.75 | 45.01 | 49.03 | 52.92 | 56.71 |
| 131.5 | | | | 11.38 | 20.31 | 28.15 | 34.99 | 41.02 | 46.45 | 51.40 | 56.01 | 60.36 | 64.55 |
| | | | | 10.26 | 18.26 | 25.17 | 31.31 | 36.86 | 41.93 | 46.63 | 51.04 | 55.22 | 59.29 |
| 140.3 | | | | 9.27 | 19.32 | 27.84 | 35.14 | 41.54 | 47.29 | 52.56 | 57.47 | 62.11 | 66.56 |
| | | | | 8.55 | 17.44 | 24.97 | 31.67 | 37.64 | 43.06 | 48.07 | 52.77 | 57.24 | 61.52 |
| 149.2 | | | | | 17.96 | 27.41 | 35.23 | 41.99 | 48.01 | 53.53 | 58.64 | 63.46 | 68.11 |
| | | | | | 16.46 | 25.09 | 32.38 | 38.69 | 44.38 | 49.64 | 54.61 | 59.37 | 64.01 |
| (mm) | | | | | | | | | | | | | |

| r | θ 63.29 | 67.81 | 72.33 | 76.85 | 81.38 | 85.9 | 90.42 | 94.94 | 99.46 | 104 | 108.5 | (deg) |
|---|---|---|---|---|---|---|---|---|---|---|---|---|
| 51.85 | 43.76 | | | | | | | | | | | |
| | 41.42 | | | | | | | | | | | |
| 60.69 | 46.64 | 47.39 | | | | | | | | | | |
| | 43.01 | 45.28 | | | | | | | | | | |
| 69.54 | 49.41 | 50.84 | 51.46 | | | | | | | | | |
| | 45.04 | 47.30 | 49.76 | | | | | | | | | |
| 78.38 | 52.09 | 54.04 | 55.44 | 55.90 | | | | | | | | |
| | 47.32 | 49.70 | 52.15 | 54.93 | | | | | | | | |
| 87.23 | 54.86 | 57.27 | 59.25 | 60.56 | | | | | | | | |
| | 49.79 | 52.42 | 55.01 | 57.73 | | | | | | | | |
| 96.08 | 57.66 | 60.45 | 62.96 | 65.01 | 66.26 | | | | | | | |
| | 52.36 | 55.21 | 57.96 | 60.73 | 63.68 | | | | | | | |
| 104.9 | 60.37 | 63.35 | 66.16 | 68.75 | 70.92 | 72.28 | | | | | | |
| | 55.06 | 57.96 | 60.79 | 63.59 | 66.44 | 69.60 | | | | | | |

TABLE 37-continued

| EMBODIMENT 17 | | | | | | | | | | | |
|---|---|---|---|---|---|---|---|---|---|---|---|
| 113.8 | 62.85 | 66.16 | 69.21 | 72.02 | 74.63 | 76.88 | 78.38 | | | | |
| | 57.66 | 60.81 | 63.75 | 66.56 | 69.34 | 72.16 | 75.34 | | | | |
| 122.6 | 65.87 | 69.39 | 72.60 | 75.61 | 78.51 | 80.85 | 82.94 | 84.46 | | | |
| | 60.36 | 63.79 | 66.95 | 69.99 | 72.91 | 75.40 | 77.94 | 80.86 | | | |
| 131.5 | 68.61 | 72.50 | 76.08 | 79.29 | 82.09 | 84.75 | 87.29 | 89.47 | 90.71 | 91.25 | |
| | 63.24 | 66.98 | 70.46 | 73.57 | 76.36 | 79.03 | 81.63 | 84.04 | 86.39 | 89.34 | |
| 140.3 | 70.86 | 75.09 | 79.06 | 82.62 | 85.75 | 88.46 | 90.78 | 92.96 | 94.87 | 96.29 | 96.87 |
| | 65.72 | 69.85 | 73.71 | 77.16 | 80.24 | 82.87 | 85.19 | 87.50 | 89.73 | 91.91 | 94.26 |
| 149.2 | 72.56 | 76.87 | 81.09 | 85.03 | 88.44 | 91.36 | 93.86 | 95.96 | 97.63 | 98.96 | 99.67 |
| | 68.47 | 72.76 | 76.89 | 80.69 | 84.01 | 86.89 | 89.43 | 91.60 | 93.59 | 95.73 | 97.94 |
| (mm) | | | | | | | | | | | |

DIAMETER D = 316
HEIGHT h= 100
EXPANSION ANGLE λ = 108.5
BOSS RATIO ν = 0.272

TABLE 38

| EMBODIMENT 17 | | |
|---|---|---|
| r | θ | z |
| 48.89 | 69.57 | 45.25 |
| | | 44.63 |
| 63.59 | 71.58 | 48.66 |
| | | 47.99 |
| 81.72 | 78.56 | 57.71 |
| | | 57.06 |
| 104.43 | 88.30 | 72.12 |
| | | 71.44 |
| 133.00 | 106.74 | 92.34 |
| | | 91.62 |
| 144.60 | 112.17 | 98.41 |
| | | 97.76 |
| 153.00 | 106.40 | 99.78 |
| | | 99.06 |
| 156.70 | 98.73 | 98.46 |
| | | 97.68 |
| 158.00 | 90.88 | 95.31 |
| | | 94.60 |
| 158.00 | 82.13 | 89.97 |
| | | 89.26 |
| 158.00 | 73.58 | 82.94 |
| | | 82.26 |
| 158.00 | 58.44 | 67.96 |
| | | 67.39 |
| 158.00 | 43.74 | 51.46 |
| | | 50.94 |
| 158.00 | 36.28 | 41.49 |
| | | 41.05 |
| 158.00 | 28.16 | 27.87 |
| | | 27.54 |
| 158.00 | 22.62 | 15.70 |
| | | 15.41 |
| 153.00 | 19.65 | 9.17 |
| | | 9.03 |
| 148.44 | 18.46 | 7.65 |
| | | 7.47 |
| 136.28 | 15.97 | 5.10 |
| | | 4.92 |
| 130.98 | 14.94 | 4.39 |
| | | 4.21 |
| 123.99 | 13.60 | 3.83 |
| | | 3.66 |
| 115.93 | 11.98 | 3.30 |
| | | 3.12 |
| 109.80 | 10.67 | 2.80 |
| | | 2.62 |
| 105.69 | 9.71 | 2.55 |
| | | 2.37 |
| 101.39 | 8.52 | 2.33 |
| | | 2.15 |

TABLE 38-continued

| EMBODIMENT 17 | | |
|---|---|---|
| r | θ | z |
| 94.46 | 6.73 | 1.51 |
| | | 1.34 |
| 84.45 | 3.70 | 0.56 |
| | | 0.39 |
| 73.25 | 1.54 | 2.68 |
| | | 1.97 |

Embodiment 18

Propeller fan 1 having the diameter D=460 mm, the height in the axial direction (z direction) h=161 mm, the number of blades n=3, the expansion angle of a blade λ=120 deg, the boss ratio ν=0.326 (boss diameter νD=150 mm) was formed to have a curved surface formed by transforming the curved surface defined by non-dimensionally expressed three-dimensional coordinates specified by Tables 3 and 4 using a transformation formula 31 below, i.e. a three-dimensional curved surface specified by Tables 39 and 40.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a,\ c,\ e_u,\ e_d\text{: factor of porportionality; } b,\ d,\ f_u,\ f_d\text{: constant})\\
&\text{wherein}\\
&a = \frac{10}{13}D(1-\nu) = \frac{10}{13}\times 460\times(1-0.326) = 238.5\\
&b = -\frac{10}{13}D(1-\nu)\times 0.35 + \frac{\nu D}{2}\\
&\quad = -\frac{10}{13}\times 460\times(1-0.326)\times 0.35 + \frac{0.326\times 460}{2}\\
&\quad = -8.46\\
&c = \lambda = 360/n = \frac{2400}{7}\times\frac{h}{D} = \frac{2400}{7}\times\frac{161}{460} = 120\\
&d = 0\\
&e_u = e_d = h = 161\\
&f_u = f_d = 0
\end{aligned}\right\}\quad (31)$$

TABLE 39

| EMBODIMENT 18 | | | | | | | | | | | | | | |
|---|---|---|---|---|---|---|---|---|---|---|---|---|---|---|
| | θ | | | | | | | | | | | | | |
| r | 5 | 10 | 15 | 20 | 25 | 30 | 35 | 40 | 45 | 50 | 55 | 60 | 65 | 70 |
| 86.92 | | 23.41 | 29.14 | 34.50 | 39.63 | 44.45 | 48.90 | 52.99 | 56.80 | 60.36 | 63.66 | 66.65 | 69.02 | 70.46 |
| | | 22.07 | 26.42 | 30.54 | 34.40 | 38.16 | 41.94 | 45.72 | 49.43 | 52.98 | 56.38 | 59.75 | 63.12 | 66.69 |
| 98.85 | 13.62 | 21.56 | 28.41 | 34.58 | 40.12 | 45.15 | 49.86 | 54.30 | 58.50 | 62.50 | 66.29 | 69.78 | 72.80 | 75.10 |
| | 12.86 | 18.99 | 24.53 | 29.43 | 33.98 | 38.40 | 42.71 | 46.92 | 51.00 | 54.95 | 58.73 | 62.34 | 65.80 | 69.24 |
| 110.8 | 11.88 | 19.98 | 27.04 | 33.57 | 39.65 | 45.33 | 50.63 | 55.61 | 60.29 | 64.73 | 68.93 | 72.86 | 76.46 | 79.55 |
| | 9.80 | 16.92 | 23.13 | 28.76 | 33.98 | 38.94 | 43.70 | 48.31 | 52.80 | 57.12 | 61.26 | 65.18 | 68.90 | 72.51 |
| 122.7 | 7.14 | 16.43 | 24.66 | 32.12 | 39.01 | 45.40 | 51.36 | 56.93 | 62.15 | 67.07 | 71.70 | 76.07 | 80.14 | 83.86 |
| | 5.72 | 13.98 | 21.39 | 28.03 | 34.04 | 39.58 | 44.84 | 49.86 | 54.72 | 59.42 | 63.93 | 68.23 | 72.31 | 76.19 |
| 134.6 | | 12.32 | 21.98 | 30.56 | 38.38 | 45.60 | 52.30 | 58.52 | 64.31 | 69.68 | 74.73 | 79.50 | 84.03 | 88.33 |
| | | 10.48 | 19.24 | 27.01 | 33.94 | 40.22 | 46.02 | 51.50 | 56.72 | 61.76 | 66.62 | 71.31 | 75.83 | 80.17 |
| 146.5 | | 8.07 | 19.19 | 28.93 | 37.74 | 45.80 | 53.25 | 60.13 | 66.50 | 72.43 | 77.95 | 83.16 | 88.10 | 92.84 |
| | | 6.99 | 16.93 | 25.81 | 33.78 | 40.96 | 47.48 | 53.48 | 59.11 | 64.47 | 69.64 | 74.68 | 79.57 | 84.31 |
| 158.5 | | | 15.49 | 26.82 | 36.74 | 45.59 | 53.59 | 60.98 | 67.91 | 74.45 | 80.72 | 86.54 | 92.06 | 97.20 |
| | | | 14.05 | 24.53 | 33.81 | 42.04 | 49.43 | 56.11 | 62.26 | 68.03 | 73.52 | 78.78 | 83.81 | 88.64 |
| 170.4 | | 11.56 | 24.44 | 35.70 | 45.70 | 54.64 | 62.69 | 70.07 | 76.98 | 83.56 | 89.84 | 95.73 | 101.19 | |
| | | | 10.41 | 22.06 | 32.42 | 41.56 | 49.65 | 56.94 | 63.65 | 70.02 | 76.14 | 82.03 | 87.58 | 92.84 |
| 182.3 | | | 6.85 | 21.36 | 34.10 | 45.47 | 55.63 | 64.68 | 72.80 | 80.20 | 87.08 | 93.64 | 99.99 | 106.05 |
| | | | 6.42 | 19.19 | 30.81 | 41.02 | 50.06 | 58.19 | 65.61 | 72.47 | 78.94 | 85.20 | 91.31 | 97.18 |
| 194.2 | | | | 18.32 | 32.71 | 45.32 | 56.33 | 66.04 | 74.78 | 82.75 | 90.18 | 97.19 | 103.93 | 110.47 |
| | | | | 16.51 | 29.39 | 40.53 | 50.42 | 59.34 | 67.51 | 75.07 | 82.17 | 88.91 | 95.45 | 101.81 |
| 206.2 | | | | 14.93 | 31.11 | 44.82 | 56.57 | 66.87 | 76.13 | 84.62 | 92.53 | 100.00 | 107.17 | 114.09 |
| | | | | 13.77 | 28.07 | 40.20 | 50.99 | 60.61 | 69.33 | 77.40 | 84.96 | 92.15 | 99.05 | 105.81 |
| 218.1 | | | | | 28.91 | 44.14 | 56.72 | 67.60 | 77.30 | 86.18 | 94.42 | 102.18 | 109.65 | 116.83 |
| | | | | | 26.50 | 40.39 | 52.13 | 62.30 | 71.45 | 79.93 | 87.92 | 95.59 | 103.05 | 110.24 |
| (mm) | | | | | | | | | | | | | | |

| | θ | | | | | | | | | |
|---|---|---|---|---|---|---|---|---|---|---|
| r | 75 | 80 | 85 | 90 | 95 | 100 | 105 | 110 | 115 | 120 (deg) |
| 86.92 | | | | | | | | | | |
| 98.85 | 76.30 | | | | | | | | | |
| | 72.90 | | | | | | | | | |
| 110.8 | 81.86 | 82.86 | | | | | | | | |
| | 76.15 | 80.11 | | | | | | | | |
| 122.7 | 87.00 | 89.26 | 90.00 | | | | | | | |
| | 80.02 | 83.96 | 88.44 | | | | | | | |
| 134.6 | 92.21 | 95.39 | 97.50 | | | | | | | |
| | 84.40 | 88.56 | 92.94 | | | | | | | |
| 146.5 | 97.32 | 101.37 | 104.66 | 106.67 | | | | | | |
| | 88.88 | 93.32 | 97.77 | 102.52 | | | | | | |
| 158.5 | 101.99 | 106.52 | 110.69 | 114.18 | 116.37 | | | | | |
| | 93.31 | 97.87 | 102.38 | 106.97 | 112.06 | | | | | |
| 170.4 | 106.51 | 111.44 | 115.95 | 120.15 | 123.77 | 126.19 | | | | |
| | 97.90 | 102.64 | 107.17 | 111.64 | 116.18 | 121.29 | | | | |
| 182.3 | 111.71 | 116.89 | 121.74 | 126.40 | 130.17 | 133.53 | 135.99 | | | |
| | 102.70 | 107.79 | 112.68 | 117.39 | 121.39 | 125.48 | 130.18 | | | |
| 194.2 | 116.73 | 122.49 | 127.65 | 132.17 | 136.45 | 140.53 | 144.05 | 146.04 | 146.91 | |
| | 107.84 | 113.44 | 118.45 | 122.94 | 127.24 | 131.42 | 135.30 | 139.08 | 143.83 | |
| 206.2 | 120.89 | 127.29 | 133.02 | 138.06 | 142.43 | 146.15 | 149.67 | 152.74 | 155.02 | 155.96 |
| | 112.46 | 118.68 | 124.23 | 129.18 | 133.42 | 137.16 | 140.88 | 144.46 | 147.98 | 151.75 |
| 218.1 | 123.76 | 130.56 | 136.90 | 142.38 | 147.10 | 151.11 | 154.49 | 157.18 | 159.32 | 160.47 |
| | 117.14 | 123.79 | 129.92 | 135.26 | 139.89 | 143.98 | 147.48 | 150.68 | 154.12 | 157.68 |
| (mm) | | | | | | | | | | |

DIAMETER D = 460
HEIGHT h = 161
EXPANSION ANGLE λ = 120
BOSS RATIO ν = 0.326

TABLE 40

| EMBODIMENT 18 | | |
|---|---|---|
| r | θ | z |
| 82.94 | 76.94 | 72.85 |
| | | 71.85 |
| 102.76 | 79.17 | 78.34 |
| | | 77.27 |

TABLE 40-continued

| EMBODIMENT 18 | | |
|---|---|---|
| r | θ | z |
| 127.19 | 86.89 | 92.91 |
| | | 91.87 |
| 157.79 | 97.66 | 116.12 |
| | | 115.01 |

TABLE 40-continued

| EMBODIMENT 18 | | |
|---|---|---|
| r | θ | z |
| 196.31 | 118.05 | 148.66 |
| | | 147.51 |
| 211.94 | 124.06 | 158.44 |
| | | 157.40 |
| 223.26 | 117.68 | 160.64 |
| | | 159.49 |
| 228.25 | 109.19 | 158.53 |
| | | 157.26 |
| 230.00 | 100.51 | 153.46 |
| | | 152.31 |
| 230.00 | 90.84 | 144.85 |
| | | 143.70 |
| 230.00 | 81.38 | 133.53 |
| | | 132.45 |
| 230.00 | 64.63 | 109.42 |
| | | 108.50 |
| 230.00 | 48.38 | 82.86 |
| | | 82.02 |
| 230.00 | 40.13 | 66.80 |
| | | 66.09 |
| 230.00 | 31.14 | 44.87 |
| | | 44.34 |
| 230.00 | 25.02 | 25.28 |
| | | 24.82 |
| 223.26 | 21.73 | 14.77 |
| | | 14.54 |
| 217.11 | 20.42 | 12.32 |
| | | 12.03 |
| 200.73 | 17.66 | 8.21 |
| | | 7.92 |
| 193.58 | 16.52 | 7.07 |
| | | 6.79 |
| 184.16 | 15.04 | 6.16 |
| | | 5.89 |
| 173.29 | 125 | 5.31 |
| | | 5.03 |
| 165.03 | 11.80 | 4.51 |
| | | 4.22 |
| 159.50 | 10.74 | 4.11 |
| | | 3.82 |
| 153.70 | 9.42 | 3.75 |
| | | 3.46 |
| 144.36 | 7.44 | 2.44 |
| | | 2.15 |
| 130.87 | 4.09 | 0.91 |
| | | 0.62 |
| 115.78 | 1.70 | 4.31 |
| | | 3.17 |

Embodiment 19

Propeller fan 1 having the diameter D=460 mm, the height in the axial direction (z direction) h=168 mm, the number of blades n=3, the expansion angle of a blade λ=120 deg, the boss ratio ν=0.326 (boss diameter νD=150 mm) was formed to have a curved surface formed by transforming the curved surface defined by non-dimensionally expressed three-dimensional coordinates specified by Tables 3 and 4 using a transformation formula 32 below, i.e. a three-dimensional curved surface specified by Tables 41 and 42.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a,\ c,\ e_u,\ e_d\text{: factor of porportionality; } b,\ d,\ f_u,\ f_d\text{: constant})\\
&\text{wherein}\\
&a = \frac{10}{13}D(1-\nu) = \frac{10}{13}\times 460\times(1-0.326) = 238.5\\
&b = -\frac{10}{13}D(1-\nu)\times 0.35 + \frac{\nu D}{2}\\
&\quad = -\frac{10}{13}\times 460\times(1-0.326)\times 0.35 + \frac{0.326\times 460}{2}\\
&\quad = -8.46\\
&c = \lambda = \frac{2400}{7}\times\frac{h}{D} = \frac{2400}{7}\times\frac{161}{460} = 125.2\\
&d = 0\\
&e_u = e_d = h = 168\\
&f_u = f_d = 0
\end{aligned}\right\} \quad (32)$$

TABLE 41

| EMBODIMENT 19 | | | | | | | | | | | | | | |
|---|---|---|---|---|---|---|---|---|---|---|---|---|---|---|
| | θ | | | | | | | | | | | | | |
| r | 5.217 | 10.43 | 15.65 | 20.87 | 26.08 | 31.3 | 36.52 | 41.73 | 46.95 | 52.17 | 57.38 | 62.6 | 67.82 | 73.03 |
| 86.92 | | 24.43 | 30.41 | 36.00 | 41.35 | 46.38 | 51.02 | 55.30 | 59.27 | 62.99 | 66.43 | 69.55 | 72.02 | 73.52 |
| | | 23.03 | 27.56 | 31.87 | 35.89 | 39.82 | 43.76 | 47.71 | 51.58 | 55.28 | 58.84 | 62.35 | 65.87 | 69.59 |
| 98.85 | 14.21 | 22.50 | 29.64 | 36.08 | 41.87 | 47.11 | 52.03 | 56.66 | 61.04 | 65.22 | 69.17 | 72.82 | 75.96 | 78.36 |
| | 13.42 | 19.81 | 25.60 | 30.71 | 35.46 | 40.07 | 44.57 | 48.96 | 53.22 | 57.34 | 61.28 | 65.05 | 68.66 | 72.25 |
| 110.8 | 12.40 | 20.84 | 28.21 | 35.03 | 41.38 | 47.30 | 52.84 | 58.03 | 62.92 | 67.55 | 71.93 | 76.03 | 79.79 | 83.00 |
| | 10.22 | 17.65 | 24.13 | 30.01 | 35.46 | 40.63 | 45.60 | 50.41 | 55.09 | 59.60 | 63.92 | 68.02 | 71.89 | 75.66 |
| 122.7 | 7.45 | 17.15 | 25.73 | 33.52 | 40.70 | 47.38 | 53.59 | 59.40 | 64.85 | 69.98 | 74.82 | 79.38 | 83.63 | 87.50 |
| | 5.96 | 14.59 | 22.32 | 29.24 | 35.52 | 41.30 | 46.79 | 52.03 | 57.10 | 62.00 | 66.71 | 71.20 | 75.46 | 79.50 |
| 134.6 | | 12.85 | 22.93 | 31.88 | 40.04 | 47.58 | 54.58 | 61.07 | 67.10 | 72.71 | 77.98 | 82.96 | 87.68 | 92.17 |
| | | 10.93 | 20.08 | 28.19 | 35.41 | 41.96 | 48.02 | 53.74 | 59.18 | 64.44 | 69.52 | 74.41 | 79.13 | 83.65 |
| 146.5 | | 8.42 | 20.03 | 30.19 | 39.38 | 47.80 | 55.56 | 62.75 | 69.40 | 75.58 | 81.34 | 86.77 | 91.93 | 96.88 |
| | | 7.30 | 17.66 | 26.93 | 35.24 | 42.74 | 49.55 | 55.80 | 61.68 | 67.27 | 72.67 | 77.93 | 83.03 | 87.97 |
| 158.5 | | | 16.16 | 27.98 | 38.34 | 47.57 | 55.92 | 63.64 | 70.86 | 77.69 | 84.23 | 90.30 | 96.06 | 101.42 |
| | | | 14.66 | 25.60 | 35.28 | 43.87 | 51.58 | 58.55 | 64.97 | 70.99 | 76.72 | 82.20 | 87.46 | 92.50 |
| 170.4 | | | 12.06 | 25.50 | 37.25 | 47.69 | 57.01 | 65.41 | 73.12 | 80.33 | 87.19 | 93.74 | 99.89 | 105.59 |
| | | | 10.86 | 23.02 | 33.83 | 43.37 | 51.80 | 59.41 | 66.42 | 73.07 | 79.45 | 85.60 | 91.39 | 96.88 |
| 182.3 | | | 7.15 | 22.28 | 35.58 | 47.45 | 58.04 | 67.49 | 75.96 | 83.69 | 90.86 | 97.72 | 104.34 | 110.66 |
| | | | 6.70 | 20.03 | 32.15 | 42.80 | 52.24 | 60.72 | 68.46 | 75.62 | 82.37 | 88.91 | 95.28 | 101.40 |

TABLE 41-continued

| EMBODIMENT 19 | | | | | | | | | | | |
|---|---|---|---|---|---|---|---|---|---|---|---|
| 194.2 | 19.12 | 34.13 | 47.29 | 58.78 | 68.92 | 78.04 | 86.35 | 94.10 | 101.41 | 108.44 | 115.27 |
| | 17.23 | 30.67 | 42.29 | 52.61 | 61.92 | 70.44 | 78.34 | 85.74 | 92.77 | 99.60 | 106.24 |
| 206.2 | 15.58 | 32.46 | 46.76 | 59.03 | 69.78 | 79.44 | 88.30 | 96.55 | 104.35 | 111.83 | 119.05 |
| | 14.36 | 29.29 | 41.95 | 53.21 | 63.24 | 72.35 | 80.76 | 88.66 | 96.16 | 103.36 | 110.41 |
| 218.1 | | 30.17 | 46.06 | 59.18 | 70.54 | 80.66 | 89.93 | 98.52 | 106.62 | 114.42 | 121.91 |
| | | 27.65 | 42.14 | 54.40 | 65.00 | 74.56 | 83.40 | 91.74 | 99.74 | 107.53 | 115.03 |
| (mm) | | | | | | | | | | | |

| | θ | | | | | | | | | |
|---|---|---|---|---|---|---|---|---|---|---|
| r | 78.25 | 83.47 | 88.68 | 93.9 | 99.12 | 104.3 | 109.6 | 114.8 | 120 | 125.2 (deg) |
| 86.92 | | | | | | | | | | |
| 98.85 | 79.62 | | | | | | | | | |
| | 76.07 | | | | | | | | | |
| 110.8 | 85.42 | 86.46 | | | | | | | | |
| | 79.46 | 83.59 | | | | | | | | |
| 122.7 | 90.78 | 93.14 | 93.91 | | | | | | | |
| | 83.50 | 87.61 | 92.28 | | | | | | | |
| 134.6 | 96.22 | 99.54 | 101.74 | | | | | | | |
| | 88.07 | 92.41 | 96.98 | | | | | | | |
| 146.5 | 101.56 | 105.78 | 109.21 | 111.31 | | | | | | |
| | 92.75 | 97.38 | 102.02 | 106.98 | | | | | | |
| 158.5 | 106.43 | 111.16 | 115.50 | 119.15 | 121.43 | | | | | |
| | 97.37 | 102.12 | 106.84 | 111.62 | 116.93 | | | | | |
| 170.4 | 111.14 | 116.28 | 121.00 | 125.38 | 129.16 | 131.68 | | | | |
| | 102.16 | 107.10 | 111.83 | 116.50 | 121.24 | 126.56 | | | | |
| 182.3 | 116.57 | 121.97 | 127.03 | 131.89 | 135.83 | 139.33 | 141.90 | | | |
| | 107.16 | 112.48 | 117.58 | 122.50 | 126.67 | 130.93 | 135.84 | | | |
| 194.2 | 121.80 | 127.81 | 133.20 | 137.92 | 142.38 | 146.64 | 150.31 | 152.39 | 153.30 | |
| | 112.52 | 118.37 | 123.60 | 128.28 | 132.77 | 137.14 | 141.18 | 145.13 | 150.08 | |
| 206.2 | 126.14 | 132.83 | 138.80 | 144.06 | 148.62 | 152.51 | 156.18 | 159.38 | 161.76 | 162.74 |
| | 117.35 | 123.84 | 129.64 | 134.80 | 139.22 | 143.12 | 147.00 | 150.74 | 154.42 | 158.35 |
| 218.1 | 129.14 | 136.24 | 142.85 | 148.57 | 153.49 | 157.68 | 161.21 | 164.02 | 166.25 | 167.45 |
| | 122.23 | 129.17 | 135.56 | 141.14 | 145.97 | 150.24 | 153.89 | 157.24 | 160.82 | 164.53 |
| (mm) | | | | | | | | | | |

DIAMETER D = 460
HEIGHT h = 168
EXPANSION ANGLE λ = 125.2
BOSS RATIO ν = 0.326

TABLE 42

| EMBODIMENT 19 | | |
|---|---|---|
| r | θ | z |
| 82.94 | 80.27 | 76.02 |
| | | 74.98 |
| 102.76 | 82.60 | 81.74 |
| | | 80.63 |
| 127.19 | 90.66 | 96.95 |
| | | 95.87 |
| 157.79 | 101.89 | 121.16 |
| | | 120.01 |
| 196.31 | 123.17 | 155.12 |
| | | 153.92 |
| 211.94 | 129.44 | 165.32 |
| | | 164.24 |
| 223.26 | 122.78 | 167.63 |
| | | 166.43 |
| 228.25 | 113.92 | 165.42 |
| | | 164.10 |
| 230.00 | 104.87 | 160.13 |
| | | 158.93 |
| 230.00 | 94.78 | 151.15 |
| | | 149.95 |
| 230.00 | 84.91 | 139.33 |
| | | 138.20 |
| 230.00 | 67.43 | 114.18 |
| | | 113.22 |
| 230.00 | 50.48 | 86.46 |
| | | 85.58 |

TABLE 42-continued

| EMBODIMENT 19 | | |
|---|---|---|
| r | θ | z |
| 230.00 | 41.87 | 69.71 |
| | | 68.96 |
| 230.00 | 32.49 | 46.82 |
| | | 46.27 |
| 230.00 | 26.10 | 26.38 |
| | | 25.90 |
| 223.26 | 22.67 | 15.41 |
| | | 15.17 |
| 217.11 | 21.30 | 12.85 |
| | | 12.55 |
| 200.73 | 18.43 | 8.57 |
| | | 8.27 |
| 193.58 | 17.24 | 7.38 |
| | | 7.08 |
| 184.16 | 15.69 | 6.43 |
| | | 6.14 |
| 173.29 | 13.82 | 5.54 |
| | | 5.24 |
| 165.03 | 12.31 | 4.70 |
| | | 4.40 |
| 159.50 | 11.21 | 4.28 |
| | | 3.98 |
| 153.70 | 9.83 | 3.91 |
| | | 3.61 |
| 144.36 | 7.76 | 2.54 |
| | | 2.24 |

TABLE 42-continued

| EMBODIMENT 19 | | |
|---|---|---|
| r | θ | z |
| 130.87 | 4.27 | 0.95 |
| | | 0.65 |
| 115.78 | 1.77 | 4.50 |
| | | 3.31 |

Embodiment 20

Propeller fan 1 having the diameter D=460 mm, the height in the axial direction (z direction) h=140 mm, the number of blades n=3, the expansion angle of a blade λ=120 deg, the boss ratio ν=0.326 (boss diameter νD=150 mm) was formed to have a curved surface formed by transforming the curved surface defined by non-dimensionally expressed three-dimensional coordinates specified by Tables 3 and 4 using a transformation formula 33 below, i.e. a three-dimensional curved surface specified by Tables 43 and 44.

$$
\left.\begin{aligned}
r_1 &= a \times r + b \text{ (mm)} \\
\theta_1 &= c \times \theta + d \text{ (deg)} \\
z_{1u} &= e_u \times z_u + f_u \text{ (mm)} \\
z_{1d} &= e_d \times z_d + f_d \text{ (mm)} \\
&(a,\ c,\ e_u,\ e_d\text{: factor of porportionality; } b,\ d,\ f_u,\ f_d\text{: constant}) \\
&\text{wherein} \\
a &= \frac{10}{13}D(1-\nu) = \frac{10}{13} \times 460 \times (1-0.326) = 238.5 \\
b &= -\frac{10}{13}D(1-\nu) \times 0.35 + \frac{\nu D}{2} \\
&= -\frac{10}{13} \times 460 \times (1-0.326) \times 0.35 + \frac{0.326 \times 460}{2} \\
&= -8.46 \\
c &= \lambda = \frac{2400}{7} \times \frac{h}{D} = \frac{2400}{7} \times \frac{140}{460} = 104.3 \\
d &= 0 \\
e_u &= e_d = h = 140 \\
f_u &= f_d = 0
\end{aligned}\right\} \quad (33)
$$

TABLE 43

EMBODIMENT 20

| r | θ: 4.346 | 8.692 | 13.04 | 17.38 | 21.73 | 26.08 | 30.42 | 34.77 | 39.11 | 43.46 | 47.8 | 52.15 | 56.5 | 60.84 |
|---|---|---|---|---|---|---|---|---|---|---|---|---|---|---|
| 86.92 | | 20.36 | 25.34 | 30.00 | 34.46 | 38.65 | 42.52 | 46.08 | 49.39 | 52.49 | 55.36 | 57.96 | 60.02 | 61.27 |
| | | 19.19 | 22.97 | 26.56 | 29.91 | 33.18 | 36.47 | 39.76 | 42.98 | 46.07 | 49.03 | 51.96 | 54.89 | 57.99 |
| 98.85 | 11.84 | 18.75 | 24.70 | 30.07 | 34.89 | 39.26 | 43.36 | 47.22 | 50.87 | 54.35 | 57.64 | 60.68 | 63.30 | 65.30 |
| | 11.18 | 16.51 | 21.33 | 25.59 | 29.55 | 33.39 | 37.14 | 40.80 | 44.35 | 47.78 | 51.07 | 54.21 | 57.22 | 60.21 |
| 110.8 | 10.33 | 17.37 | 23.51 | 29.19 | 34.48 | 39.42 | 44.03 | 48.36 | 52.43 | 56.29 | 59.94 | 63.36 | 66.49 | 69.17 |
| | 8.52 | 14.71 | 20.11 | 25.01 | 29.55 | 33.86 | 38.00 | 42.01 | 45.91 | 49.67 | 53.27 | 56.68 | 59.91 | 63.05 |
| 122.7 | 6.21 | 14.29 | 21.44 | 27.93 | 33.92 | 39.48 | 44.66 | 49.50 | 54.04 | 58.32 | 62.35 | 66.15 | 69.69 | 72.92 |
| | 4.97 | 12.16 | 18.60 | 24.37 | 29.60 | 34.42 | 38.99 | 43.36 | 47.58 | 51.67 | 55.59 | 59.33 | 62.88 | 66.25 |
| 134.6 | | 10.71 | 19.11 | 26.57 | 33.37 | 39.65 | 45.48 | 50.89 | 55.92 | 60.59 | 64.98 | 69.13 | 73.07 | 76.81 |
| | | 9.11 | 16.73 | 23.49 | 29.51 | 34.97 | 40.02 | 44.78 | 49.32 | 53.70 | 57.93 | 62.01 | 65.94 | 69.71 |
| 146.5 | | 7.02 | 16.69 | 25.16 | 32.82 | 39.83 | 46.30 | 52.29 | 57.83 | 62.98 | 67.78 | 72.31 | 76.61 | 80.73 |
| | | 6.08 | 14.72 | 22.44 | 29.37 | 35.62 | 41.29 | 46.50 | 51.40 | 56.06 | 60.56 | 64.94 | 69.19 | 73.31 |
| 158.5 | | | 13.47 | 23.32 | 31.95 | 39.64 | 46.60 | 53.03 | 59.05 | 64.74 | 70.19 | 75.25 | 80.05 | 84.52 |
| | | | 12.22 | 21.33 | 29.40 | 36.56 | 42.98 | 48.79 | 54.14 | 59.16 | 63.93 | 68.50 | 72.88 | 77.08 |
| 170.4 | | | 10.05 | 21.25 | 31.04 | 39.74 | 47.51 | 54.51 | 60.93 | 66.94 | 72.66 | 78.12 | 83.24 | 87.99 |
| | | | 9.05 | 19.18 | 28.19 | 36.14 | 43.17 | 49.51 | 55.35 | 60.89 | 66.21 | 71.33 | 76.16 | 80.73 |
| 182.3 | | | 5.96 | 18.57 | 29.65 | 39.54 | 48.37 | 56.24 | 63.30 | 69.74 | 75.72 | 81.43 | 86.95 | 92.22 |
| | | | 5.58 | 16.69 | 26.79 | 35.67 | 43.53 | 50.60 | 57.05 | 63.02 | 68.64 | 74.09 | 79.40 | 84.50 |
| 194.2 | | | | 15.93 | 28.44 | 39.41 | 48.98 | 57.43 | 65.03 | 71.96 | 78.42 | 84.51 | 90.37 | 96.06 |
| | | | | 14.36 | 25.56 | 35.24 | 43.84 | 51.60 | 58.70 | 65.28 | 71.45 | 77.31 | 83.00 | 88.53 |
| 206.2 | | | | 12.98 | 27.05 | 38.97 | 49.19 | 58.15 | 66.20 | 73.58 | 80.46 | 86.96 | 93.19 | 99.21 |
| | | | | 11.97 | 24.41 | 34.96 | 44.34 | 52.70 | 60.29 | 67.30 | 73.88 | 80.13 | 86.13 | 92.01 |
| 218.1 | | | | | 25.14 | 38.38 | 49.32 | 58.78 | 67.22 | 74.94 | 82.10 | 88.85 | 95.35 | 101.59 |
| | | | | | 23.04 | 35.12 | 45.33 | 54.17 | 62.13 | 69.50 | 76.45 | 83.12 | 89.61 | 95.86 |
| (mm) | | | | | | | | | | | | | | |

| r | 65.19 | 69.53 | 73.88 | 78.23 | 82.57 | 86.92 | 91.26 | 95.61 | 99.95 | 104.3 (deg) |
|---|---|---|---|---|---|---|---|---|---|---|
| 86.92 | | | | | | | | | | |
| 98.85 | 66.35 | | | | | | | | | |
| | 63.39 | | | | | | | | | |
| 110.8 | 71.18 | 72.05 | | | | | | | | |
| | 66.22 | 69.66 | | | | | | | | |
| 122.7 | 75.65 | 77.62 | 78.26 | | | | | | | |
| | 69.58 | 73.01 | 76.90 | | | | | | | |
| 134.6 | 80.18 | 82.95 | 84.78 | | | | | | | |
| | 73.39 | 77.01 | 80.82 | | | | | | | |
| 146.5 | 84.63 | 88.15 | 91.01 | 92.76 | | | | | | |
| | 77.29 | 81.15 | 85.02 | 89.15 | | | | | | |
| 158.5 | 88.69 | 92.63 | 96.25 | 99.29 | 101.19 | | | | | |
| | 81.14 | 85.10 | 89.03 | 93.02 | 97.44 | | | | | |
| 170.4 | 92.62 | 96.90 | 100.83 | 104.48 | 107.63 | 109.73 | | | | |
| | 85.13 | 89.25 | 93.19 | 97.08 | 101.03 | 105.47 | | | | |
| 182.3 | 97.14 | 101.64 | 105.86 | 109.91 | 113.19 | 116.11 | 118.25 | | | |

TABLE 43-continued

| EMBODIMENT 20 | | | | | | | | | | |
|---|---|---|---|---|---|---|---|---|---|---|
| | 89.30 | 93.73 | 97.98 | 102.08 | 105.56 | 109.11 | 113.20 | | | |
| 194.2 | 101.50 | 106.51 | 111.00 | 114.93 | 118.65 | 122.20 | 125.26 | 126.99 | 127.75 | |
| | 93.77 | 98.64 | 103.00 | 106.90 | 110.64 | 114.28 | 117.65 | 120.94 | 125.07 | |
| 206.2 | 105.12 | 110.69 | 115.67 | 120.05 | 123.85 | 127.09 | 130.15 | 132.82 | 134.80 | 135.62 |
| | 97.79 | 103.20 | 108.03 | 112.33 | 116.02 | 119.27 | 122.50 | 125.62 | 128.68 | 131.96 |
| 218.1 | 107.62 | 113.53 | 119.04 | 123.81 | 127.91 | 131.40 | 134.34 | 136.68 | 138.54 | 139.54 |
| | 101.86 | 107.64 | 112.97 | 117.62 | 121.64 | 125.20 | 128.24 | 131.03 | 134.02 | 137.11 |
| (mm) | | | | | | | | | | |

DIAMETER D = 460
HEIGHT h = 140
EXPANSION ANGLE λ = 104.3
BOSS RATIO ν = 0.326

TABLE 44

| EMBODIMENT 20 | | |
|---|---|---|
| r | θ | z |
| 82.94 | 66.87 | 63.35 |
| | | 62.48 |
| 102.76 | 68.81 | 68.12 |
| | | 67.19 |
| 127.19 | 75.52 | 80.79 |
| | | 79.89 |
| 157.79 | 84.88 | 100.97 |
| | | 100.01 |
| 196.31 | 102.61 | 129.27 |
| | | 128.27 |
| 211.94 | 107.83 | 137.77 |
| | | 136.87 |
| 223.26 | 102.28 | 139.69 |
| | | 138.69 |
| 228.25 | 94.90 | 137.85 |
| | | 136.75 |
| 230.00 | 87.36 | 133.44 |
| | | 132.44 |
| 230.00 | 78.96 | 125.96 |
| | | 124.96 |
| 230.00 | 70.73 | 116.11 |
| | | 115.17 |
| 230.00 | 56.17 | 95.15 |
| | | 94.35 |
| 230.00 | 42.05 | 72.05 |
| | | 71.32 |
| 230.00 | 34.88 | 58.09 |
| | | 57.47 |
| 230.00 | 27.07 | 39.02 |
| | | 38.56 |
| 230.00 | 21.75 | 21.98 |
| | | 21.58 |
| 223.26 | 18.89 | 12.84 |
| | | 12.64 |
| 217.11 | 17.75 | 10.71 |
| | | 10.46 |
| 200.73 | 15.35 | 7.14 |
| | | 6.89 |
| 193.58 | 14.36 | 6.15 |
| | | 5.90 |

TABLE 44-continued

| EMBODIMENT 20 | | |
|---|---|---|
| r | θ | z |
| 184.16 | 13.07 | 5.36 |
| | | 5.12 |
| 173.29 | 11.52 | 4.62 |
| | | 4.37 |
| 165.03 | 10.26 | 3.92 |
| | | 3.67 |
| 159.50 | 9.33 | 3.57 |
| | | 3.32 |
| 153.70 | 8.19 | 3.26 |
| | | 3.01 |
| 144.36 | 6.47 | 2.12 |
| | | 1.87 |
| 130.87 | 3.55 | 0.79 |
| | | 0.54 |
| 115.78 | 1.48 | 3.75 |
| | | 2.76 |

Figure 4:
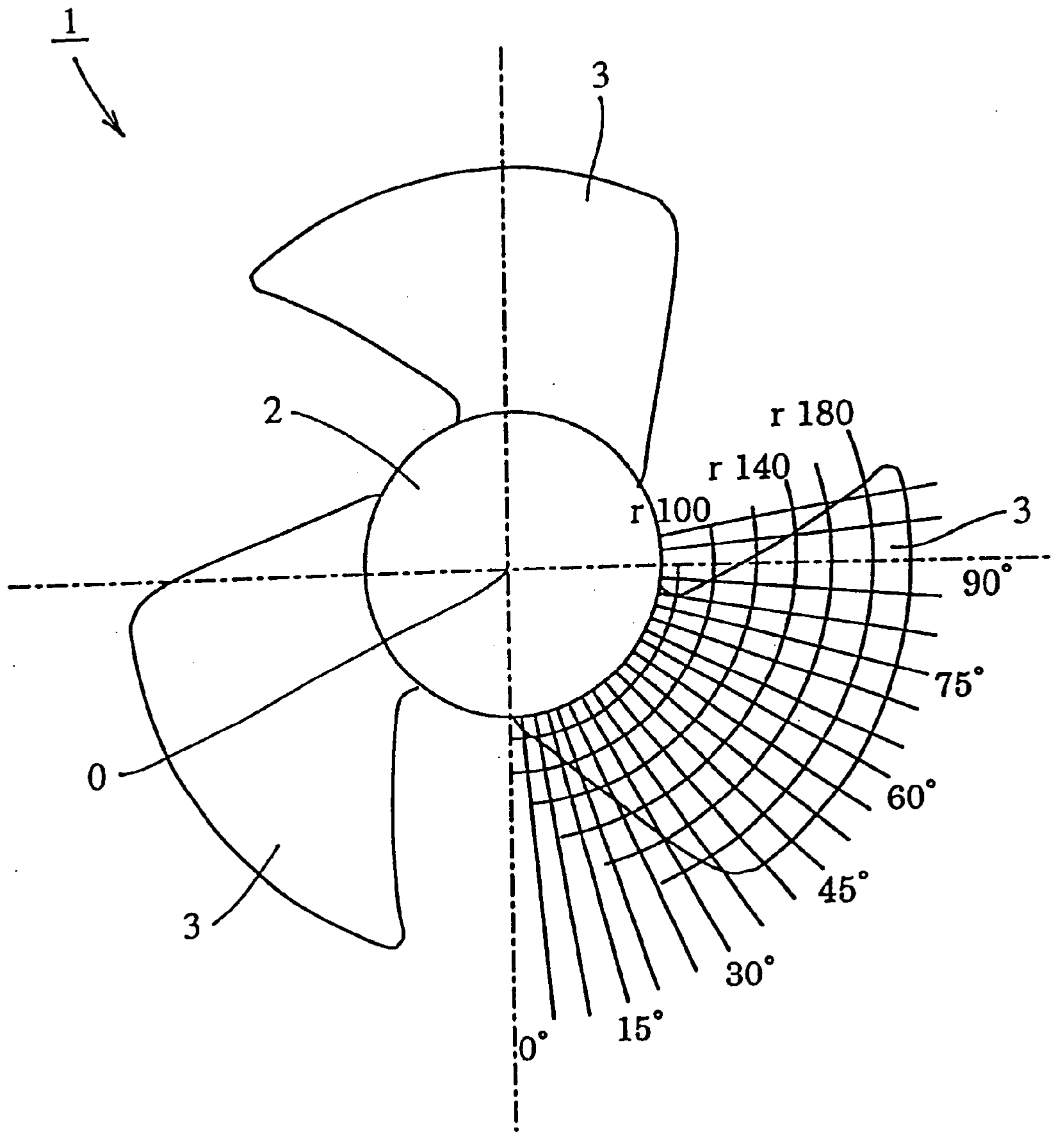
FIG. 4 is a front view of a propeller fan in Comparison Example 1.
Figure 5:
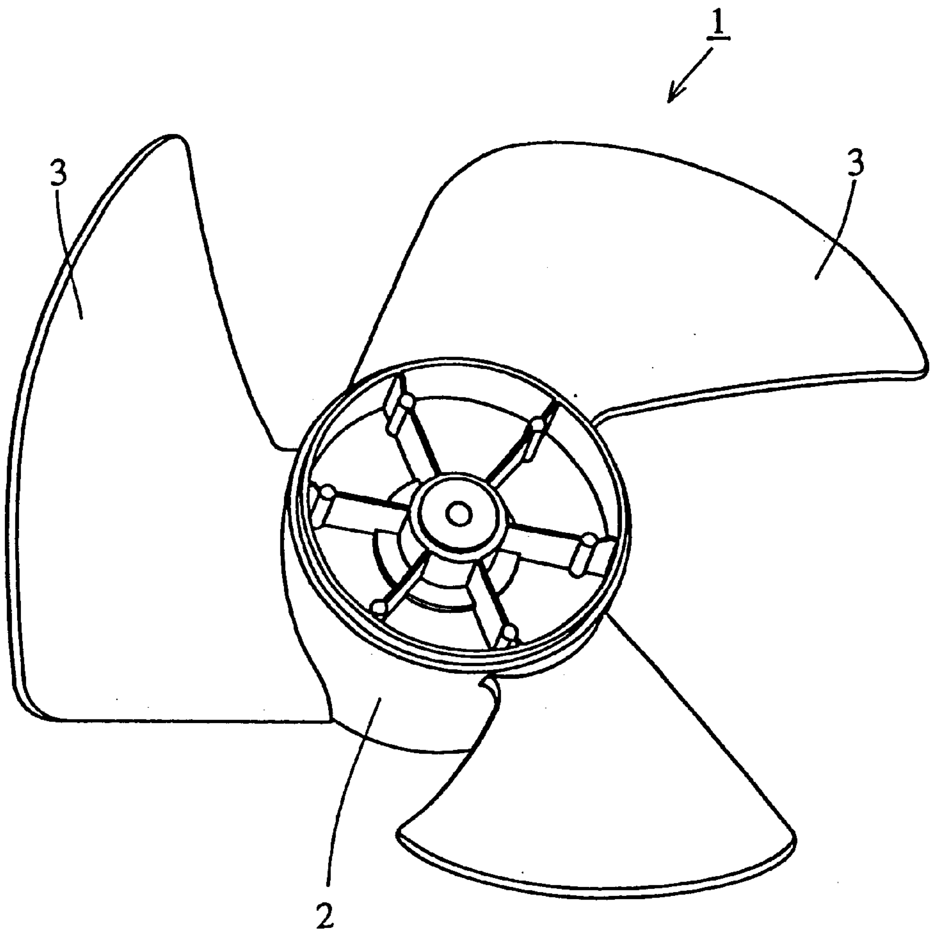
FIG. 5 is a perspective view of (the negative pressure surface side of) the propeller fan in Comparison Example 1.
Figure 6:
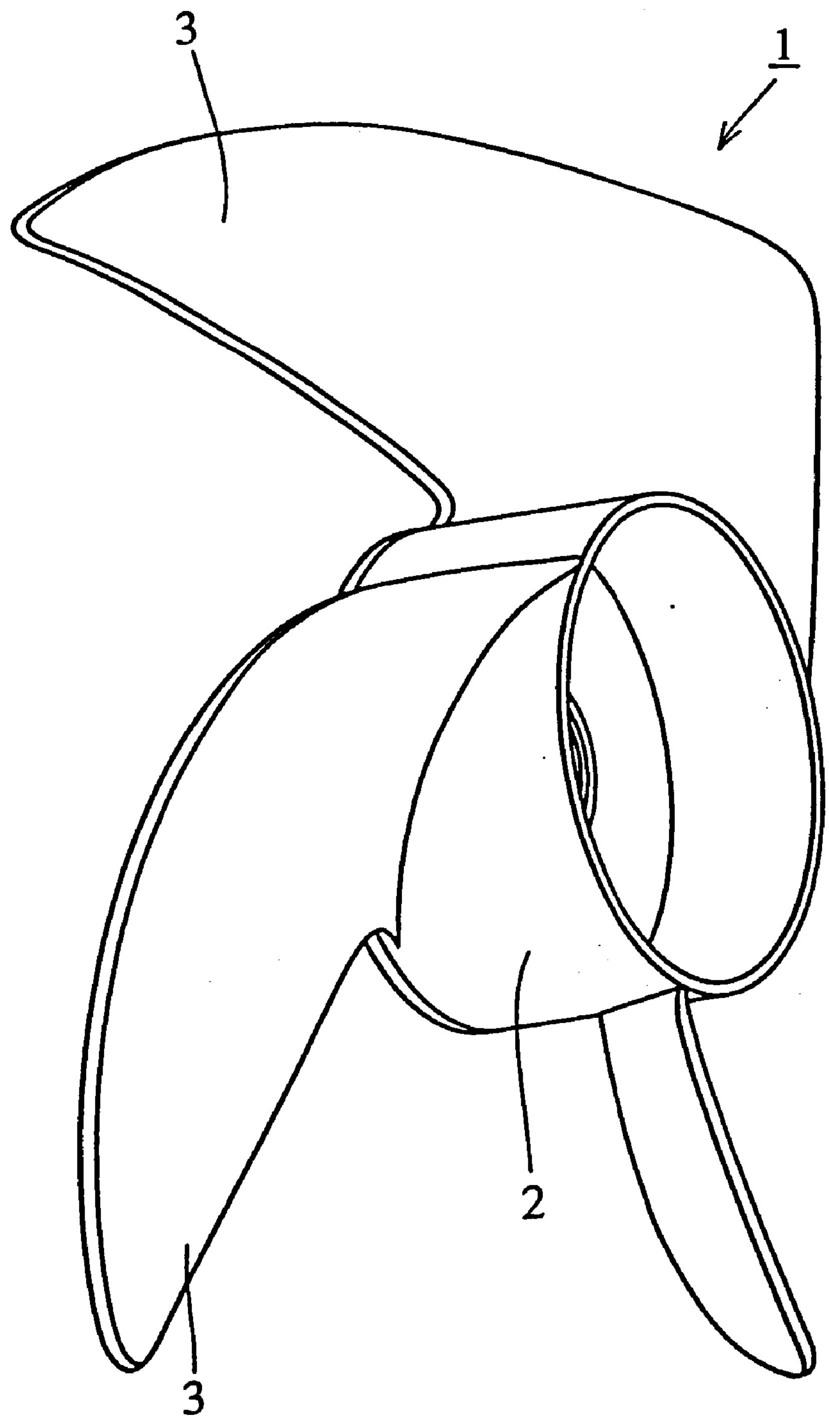
FIG. 6 is a perspective view of (the positive pressure surface side of) the propeller fan in Comparison Example 1.

Comparison examples of the present invention will be described below with reference to FIGS. 4 to 6. FIG. 4 is a front view of a propeller fan in Comparison Example 1, whereas FIGS. 5 and 6 are perspective views of the propeller fan in Comparison Example 1.

Comparison Example 1

Propeller fan 1 shown in FIG. 4 having the diameter D=400 mm, the height in the axial direction (z direction) h=140 mm, the number of blades n=3, the boss ratio ν=0.35 (boss diameter νD=140 mm) was formed such that the surface of a blade 3 is a three-dimensional curved surface specified by Table 45 below. A boss portion is denoted by 2 in the drawings. Note that r, θ, z are set as in Embodiment 1.

TABLE 45

| COMPARISON EXAMPLE 1 | | | | | | | | | | | | |
|---|---|---|---|---|---|---|---|---|---|---|---|---|
| | θ | | | | | | | | | | | |
| r | 10° | 15° | 20° | 25° | 30° | 35° | 40° | 45° | 50° | 55° | 60° | 65° |
| r 80 | 11.73 | 19.10 | 25.44 | 30.60 | 35.31 | 39.90 | 44.45 | 48.84 | 53.00 | 56.91 | 60.54 | 63.79 |
| | 6.47 | 13.00 | 19.27 | 24.95 | 29.81 | 34.29 | 38.60 | 42.80 | 46.92 | 50.95 | 54.90 | 58.74 |
| r 90 | | 12.73 | 20.94 | 27.79 | 33.67 | 39.12 | 44.39 | 49.38 | 54.09 | 58.55 | 62.71 | 66.45 |

TABLE 45-continued

COMPARISON EXAMPLE 1

| | | | | | | | | | | | |
|---|---|---|---|---|---|---|---|---|---|---|---|
| | 7.72 | 15.35 | 22.37 | 28.82 | 34.15 | 39.00 | 43.69 | 48.20 | 52.63 | 56.99 | 61.24 |
| r 100 | | 16.09 | 24.55 | 31.82 | 38.32 | 44.30 | 50.03 | 55.39 | 60.47 | 65.25 | 69.55 |
| | | 11.10 | 19.49 | 27.06 | 33.78 | 39.34 | 44.59 | 49.60 | 54.42 | 59.19 | 63.83 |
| r 110 | | | 21.17 | 29.78 | 37.40 | 44.32 | 50.81 | 56.89 | 62.60 | 67.99 | 72.88 |
| | | 6.47 | 16.35 | 25.27 | 32.95 | 39.56 | 45.48 | 51.16 | 56.38 | 61.52 | 66.48 |
| r 120 | | | 16.62 | 27.71 | 36.46 | 44.43 | 51.73 | 58.63 | 65.02 | 70.96 | 76.44 |
| | | | 12.48 | 23.19 | 32.11 | 39.60 | 46.35 | 52.75 | 58.54 | 64.01 | 69.27 |
| r 130 | | | | 25.07 | 35.42 | 44.45 | 52.76 | 60.49 | 67.60 | 74.14 | 80.18 |
| | | | | 20.47 | 30.82 | 39.57 | 47.10 | 54.26 | 60.75 | 66.61 | 72.15 |
| r 140 | | | | 21.38 | 34.00 | 44.38 | 53.67 | 62.26 | 70.13 | 77.30 | 83.88 |
| | | | | 16.83 | 29.05 | 39.13 | 47.59 | 55.60 | 62.95 | 69.35 | 75.17 |
| r 150 | | | | 15.39 | 31.83 | 43.84 | 54.32 | 63.84 | 72.47 | 80.37 | 87.60 |
| | | | | 12.94 | 26.57 | 38.27 | 47.91 | 56.81 | 64.97 | 72.10 | 78.38 |
| r 160 | | | | | 29.55 | 43.21 | 54.64 | 65.14 | 74.33 | 82.96 | 90.49 |
| | | | | | 23.69 | 37.38 | 48.40 | 57.93 | 66.86 | 74.86 | 81.82 |
| r 170 | | | | | 27.10 | 42.68 | 55.44 | 66.28 | 75.62 | 84.39 | 92.42 |
| | | | | | 21.19 | 36.26 | 48.76 | 59.06 | 68.53 | 77.20 | 85.22 |
| r 180 | | | | | 21.52 | 42.14 | 56.11 | 67.43 | 77.37 | 86.87 | 95.58 |
| | | | | | 19.14 | 35.30 | 49.17 | 60.36 | 70.38 | 79.63 | 88.20 |
| (mm) | | | | | | | | | | | |

| | θ | | | | | | |
|---|---|---|---|---|---|---|---|
| r | 70° | 75° | 80° | 85° | 90° | 95° | 100° |
| r 80 | 66.69 | | | | | | |
| | 62.24 | 65.73 | | | | | |
| r 90 | 69.78 | 72.78 | | | | | |
| | 65.20 | 69.05 | 72.74 | | | | |
| r 100 | 73.43 | 76.96 | | | | | |
| | 68.22 | 72.41 | 76.43 | 79.97 | | | |
| r 110 | 77.34 | 81.37 | 84.91 | | | | |
| | 71.29 | 75.84 | 80.24 | 84.27 | | | |
| r 120 | 81.49 | 86.04 | 90.12 | 93.56 | | | |
| | 74.42 | 79.38 | 84.27 | 88.88 | 92.94 | | |
| r 130 | 85.76 | 90.79 | 95.43 | 99.34 | | | |
| | 77.63 | 83.00 | 88.46 | 93.70 | 98.22 | | |
| r 140 | 90.14 | 95.73 | 100.80 | 105.22 | 108.78 | | |
| | 80.99 | 86.79 | 92.74 | 98.44 | 103.48 | 107.80 | |
| r 150 | 94.28 | 100.52 | 106.07 | 110.94 | 114.95 | | |
| | 84.69 | 90.96 | 97.16 | 103.19 | 108.58 | 113.56 | |
| r 160 | 97.62 | 104.34 | 110.63 | 116.05 | 120.85 | 124.87 | |
| | 88.68 | 95.47 | 101.96 | 108.15 | 113.87 | 119.15 | 123.49 |
| r 170 | 100.19 | 107.31 | 114.13 | 120.38 | 126.11 | 130.86 | |
| | 92.83 | 99.88 | 106.68 | 113.09 | 119.02 | 124.38 | 128.87 |
| r 180 | 103.50 | 111.06 | 118.11 | 124.80 | 130.98 | 136.36 | 140.79 |
| | 96.29 | 103.91 | 110.87 | 117.74 | 123.88 | 129.55 | 134.46 |
| (mm) | | | | | | | |

Comparison Example 2

Propeller fan 1 having the diameter D=316 mm, the height in the axial direction (z direction) h=100 mm, the number of blades n=5, the boss ratio ν=0.253 (boss diameter νD=80 mm) was formed such that the surface of a blade is a three-dimensional curved surface specified by Table 46 below. Note that r, θ, z are set as in Embodiment 1.

TABLE 46

COMPARISON EXAMPLE 2

| | θ | | | | | | | | | | | |
|---|---|---|---|---|---|---|---|---|---|---|---|---|
| r | 0° | 5° | 10° | 15° | 20° | 25° | 30° | 35° | 40° | 45° | 50° | 55° |
| r 45 | 31.80 | 33.99 | 36.21 | 38.47 | 40.72 | 42.84 | 44.86 | 46.79 | 48.62 | 50.36 | | |
| r 55 | | 21.58 | 25.42 | 29.09 | 32.62 | 36.02 | 39.20 | 42.17 | 44.94 | 47.51 | 49.89 | 52.12 |
| r 65 | | | | 18.45 | 23.54 | 28.39 | 32.91 | 37.05 | 40.87 | 44.39 | 47.64 | 50.63 |
| r 75 | | | | | 14.55 | 20.92 | 26.88 | 32.29 | 37.22 | 41.75 | 45.90 | 49.71 |
| r 85 | | | | | 5.55 | 13.74 | 21.12 | 27.82 | 33.89 | 39.42 | 44.49 | 49.13 |
| r 95 | | | | | | 7.05 | 15.69 | 23.59 | 30.77 | 37.25 | 43.20 | 48.63 |
| r 105 | | | | | | 0.87 | 10.64 | 19.57 | 27.73 | 35.11 | 41.84 | 47.98 |
| r 115 | | | | | | | 5.87 | 15.71 | 24.68 | 32.84 | 40.30 | 47.10 |
| r 125 | | | | | | | | 11.89 | 21.58 | 30.43 | 38.57 | 45.95 |
| r 135 | | | | | | | | 8.27 | 18.40 | 27.98 | 36.72 | 44.67 |

TABLE 46-continued

| COMPARISON EXAMPLE 2 | | | | | | | | | |
|---|---|---|---|---|---|---|---|---|---|
| r 145 | | | | | | 15.14 | 25.50 | 34.77 | 43.28 |
| r 155 | | | | | | | 22.91 | 32.82 | 41.86 |
| (mm) | | | | | | | | | |

| r | θ 60° | 65° | 70° | 75° | 80° | 85° | 90° | 95° | 100° |
|---|---|---|---|---|---|---|---|---|---|
| r 45 | | | | | | | | | |
| r 55 | 54.19 | | | | | | | | |
| r 65 | 53.40 | 55.95 | 58.28 | | | | | | |
| r 75 | 53.21 | 56.42 | 59.35 | 62.01 | | | | | |
| r 85 | 53.38 | 57.26 | 60.82 | 64.05 | 66.97 | | | | |
| r 95 | 53.60 | 58.14 | 62.30 | 66.10 | 69.55 | 72.72 | | | |
| r 105 | 53.62 | 58.78 | 63.51 | 40.83 | 71.77 | 75.43 | | | |
| r 115 | 53.33 | 59.02 | 64.28 | 69.03 | 73.40 | 77.43 | 81.05 | | |
| r 125 | 52.70 | 58.91 | 64.59 | 69.71 | 74.39 | 78.67 | 82.62 | 86.11 | |
| r 135 | 51.94 | 58.58 | 64.65 | 70.17 | 75.14 | 79.63 | 83.70 | 87.39 | |
| r 145 | 51.06 | 58.04 | 64.45 | 70.43 | 75.63 | 80.43 | 84.74 | 88.67 | 92.17 |
| r 155 | 50.08 | 57.34 | 64.11 | 70.44 | 75.95 | 81.10 | 85.79 | 89.95 | 93.67 |
| (mm) | | | | | | | | | |

Comparison Example 3

Propeller fan 1 having the diameter D=460 mm, the height in the axial direction (z direction) h=168 mm, the number of blades n=3, the boss ratio ν=0.35 (boss diameter νD=161 mm) was formed such that the surface of a blade is a three-dimensional curved surface specified by Table 47 below. Note that r, θ, z are set as in Embodiment 1.

TABLE 47

COMPARISON EXAMPLE 3

| r | θ END POINT AT TRAILING EDGE SIDE | 5° | 10° | 15° | 20° | 25° | 30° | 35° | 40° | 45° | 50° | 55° | 60° | 65° |
|---|---|---|---|---|---|---|---|---|---|---|---|---|---|---|
| r 88.5 | 0.00 | 6.00 | 12.54 | 19.50 | 25.83 | 31.51 | 37.02 | 42.04 | 46.64 | 51.26 | 55.75 | 60.17 | 64.51 | 68.67 |
| r 95 | | 5.78 | 12.77 | 20.55 | 27.94 | 34.52 | 40.58 | 46.17 | 51.36 | 56.45 | 61.43 | 66.35 | 71.14 | 75.75 |
| | 1.15 | 2.38 | 9.19 | 16.80 | 24.01 | 30.41 | 36.30 | 41.71 | 46.72 | 51.63 | 56.44 | 61.18 | 65.79 | 70.23 |
| r 105 | | | 7.06 | 15.24 | 23.89 | 31.71 | 38.60 | 44.82 | 50.57 | 56.08 | 61.49 | 66.82 | 71.97 | 76.95 |
| | 2.75 | | 4.46 | 12.50 | 21.01 | 28.69 | 35.45 | 41.53 | 47.14 | 52.51 | 57.78 | 62.97 | 67.99 | 72.83 |
| r 115 | | | | 10.57 | 20.43 | 29.72 | 37.80 | 44.75 | 51.05 | 57.01 | 62.82 | 68.52 | 74.06 | 79.40 |
| | 4.21 | | | 8.02 | 17.76 | 26.94 | 34.90 | 41.73 | 47.92 | 53.76 | 59.45 | 65.04 | 70.46 | 75.68 |
| r 125 | | | | | 16.59 | 27.30 | 37.02 | 44.95 | 51.87 | 58.29 | 64.48 | 70.52 | 76.37 | 82.01 |
| | 5.57 | | | | 14.09 | 24.70 | 34.31 | 42.14 | 48.95 | 55.27 | 61.35 | 67.29 | 73.04 | 78.57 |
| r 135 | | | | | 12.44 | 24.47 | 35.74 | 45.14 | 52.86 | 59.74 | 66.31 | 72.68 | 78.87 | 84.80 |
| | 6.83 | | | | 9.94 | 21.89 | 33.09 | 42.41 | 50.05 | 56.86 | 63.35 | 69.64 | 75.75 | 81.61 |
| r 145 | | | | | | 21.11 | 33.79 | 44.82 | 53.72 | 61.26 | 68.23 | 74.93 | 81.42 | 87.63 |
| | 8.02 | | | | | 18.66 | 31.28 | 42.24 | 51.08 | 58.55 | 65.46 | 72.10 | 78.52 | 84.67 |
| r 155 | | | | | | 17.35 | 31.43 | 44.01 | 54.51 | 62.82 | 70.23 | 77.27 | 84.05 | 90.56 |
| | 9.15 | | | | | 14.95 | 28.98 | 41.52 | 51.97 | 60.24 | 67.60 | 74.59 | 81.33 | 87.79 |
| r 165 | | | | | | 13.24 | 28.66 | 42.69 | 54.86 | 64.35 | 72.28 | 79.71 | 86.81 | 93.62 |
| | 10.21 | | | | | 10.84 | 26.23 | 40.23 | 52.37 | 61.83 | 69.72 | 77.12 | 84.19 | 90.97 |
| r 175 | | | | | | | 25.49 | 40.94 | 54.68 | 65.61 | 74.21 | 82.07 | 89.53 | 96.68 |
| | 11.21 | | | | | | 23.09 | 38.52 | 52.25 | 63.16 | 71.74 | 79.59 | 87.03 | 94.16 |
| r 185 | | | | | | | 22.17 | 38.89 | 53.89 | 66.48 | 75.97 | 84.38 | 92.23 | 99.77 |
| | 12.16 | | | | | | 19.77 | 36.48 | 51.47 | 64.05 | 73.53 | 81.94 | 89.78 | 97.31 |
| r 195 | | | | | | | 18.66 | 36.55 | 52.61 | 66.83 | 77.52 | 86.56 | 94.90 | 102.97 |
| | 13.06 | | | | | | 16.26 | 34.15 | 50.21 | 64.43 | 75.12 | 84.16 | 92.50 | 100.57 |
| r 205 | | | | | | | | 33.78 | 51.15 | 66.92 | 78.89 | 88.62 | 97.59 | 106.19 |
| | 13.91 | | | | | | | 31.38 | 48.75 | 64.52 | 76.49 | 86.22 | 95.19 | 103.79 |
| r 215 | | | | | | | | 30.90 | 49.52 | 66.71 | 80.05 | 90.51 | 100.20 | 109.51 |
| | 14.71 | | | | | | | 28.50 | 47.12 | 64.31 | 77.65 | 88.11 | 97.80 | 107.11 |
| r 225 | | | | | | | | 28.01 | 47.58 | 66.09 | 80.91 | 92.25 | 102.71 | 112.71 |
| | 15.47 | | | | | | | 25.61 | 45.18 | 63.69 | 78.51 | 89.85 | 100.31 | 110.31 |
| r 230 | | | | | | | | 26.46 | 46.67 | 65.62 | 81.23 | 93.06 | 103.93 | 114.27 |
| | 15.82 | | | | | | | 24.06 | 44.27 | 63.22 | 78.83 | 90.66 | 101.53 | 111.87 |
| (mm) | | | | | | | | | | | | | | |

TABLE 47-continued

COMPARISON EXAMPLE 3

| r | θ: END POINT AT TRAILING EDGE SIDE | 70° | 75° | 80° | 85° | 90° | 95° | 100° | 102.5° | END POINT AT LEADING EDGE SIDE |
|---|---|---|---|---|---|---|---|---|---|---|
| r 88.5 | 0.00 | 72.48 | | | | | | | | 72.48 |
| r 95 | | 80.17 | | | | | | | | |
| | 1.15 | 74.47 | | | | | | | | 77.09 |
| r 105 | | 81.75 | 86.34 | | | | | | | |
| | 2.75 | 77.49 | 81.94 | | | | | | | 84.02 |
| r 115 | | 84.48 | 89.39 | 94.10 | | | | | | |
| | 4.21 | 80.65 | 85.44 | 90.03 | | | | | | 90.83 |
| r 125 | | 87.39 | 92.61 | 97.65 | | | | | | |
| | 5.57 | 83.85 | 88.96 | 93.90 | | | | | | 97.58 |
| r 135 | | 90.45 | 95.95 | 100.97 | 106.23 | | | | | |
| | 6.83 | 87.18 | 92.60 | 97.55 | 102.73 | | | | | |
| r 145 | | 93.61 | 99.36 | 104.90 | 110.30 | | | | | 104.29 |
| | 8.02 | 90.59 | 96.27 | 101.75 | 107.08 | | | | | 110.99 |
| r 155 | | 96.87 | 102.90 | 108.74 | 114.38 | 119.80 | | | | |
| | 9.15 | 94.05 | 100.04 | 105.83 | 111.43 | 116.80 | | | | 117.70 |
| r 165 | | 100.28 | 106.59 | 112.67 | 118.62 | 124.26 | | | | |
| | 10.21 | 97.60 | 103.88 | 109.93 | 115.85 | 121.46 | | | | 124.41 |
| r 175 | | 103.71 | 110.32 | 116.69 | 122.88 | 128.76 | | | | |
| | 11.21 | 101.18 | 107.77 | 114.12 | 120.30 | 126.16 | | | | 131.15 |
| r 185 | | 107.13 | 114.13 | 120.81 | 127.30 | 133.42 | 139.16 | | | |
| | 12.16 | 104.66 | 111.65 | 118.32 | 124.80 | 130.91 | 136.64 | | | 137.92 |
| r 195 | | 110.57 | 117.93 | 124.92 | 131.63 | 137.97 | 144.00 | | | |
| | 13.06 | 108.17 | 115.53 | 122.52 | 129.23 | 135.57 | 141.60 | | | 144.71 |
| r 205 | | 114.31 | 122.06 | 129.26 | 136.03 | 142.66 | 148.92 | | | |
| | 13.91 | 111.91 | 119.66 | 126.86 | 133.63 | 140.26 | 146.52 | | | 151.53 |
| r 215 | | 118.09 | 126.39 | 133.95 | 140.62 | 147.40 | 153.94 | 160.13 | | |
| | 14.71 | 115.69 | 123.99 | 131.55 | 138.22 | 145.00 | 151.54 | 157.73 | | 158.39 |
| r 225 | | 121.82 | 130.66 | 138.70 | 145.51 | 152.30 | 159.09 | 165.48 | | |
| | 15.47 | 119.42 | 128.26 | 136.30 | 143.11 | 149.90 | 156.69 | 163.08 | | 165.27 |
| r 230 | | 123.67 | 132.77 | 141.10 | 148.07 | 154.81 | 161.74 | 168.14 | 171.12 | |
| | 15.82 | 121.27 | 130.37 | 138.70 | 145.67 | 152.41 | 159.34 | 165.74 | 168.72 | 168.72 |
| (mm) | | | | | | | | | | |

Each of the propeller fans as in Embodiments 1 to 20 and those in Comparison Examples 1 to 3 is attached to an outdoor unit of an air conditioner, and airflow, power consumption and noise are measured.

First, each fan in Embodiments 1 to 13 and in Comparison Example 1 having the fan diameter of ϕ400 was driven by a DC motor using an outdoor unit with a refrigeration capacity of a 28 kW class. The results are shown in Table 48 below.

TABLE 48

| | FAN DIAMETER | HEIGHT | NUMBER OF BLADES | BOSS DIAMETER | BOSS RATIO | a | b | c | d | eu | ed | fu | fd | AIRFLOW | POWER CONSUMPTION | NOISE |
|---|---|---|---|---|---|---|---|---|---|---|---|---|---|---|---|---|
| EMBODIMENT 1 | 400 | 140 | 3 | 140 | 0.35 | 200 | 0 | 120 | 0 | 140 | 140 | 0 | 0 | 25 m3/min | 22 W | 41 dB |
| EMBODIMENT 2 | 400 | 154 | 3 | 140 | 0.35 | 200 | 0 | 120 | 0 | 154 | 154 | 0 | 0 | 25 m3/min | 24 W | 41 dB |
| EMBODIMENT 3 | 400 | 147 | 3 | 140 | 0.35 | 200 | 0 | 120 | 0 | 147 | 147 | 0 | 0 | 25 m3/min | 23 W | 41 dB |
| EMBODIMENT 4 | 400 | 133 | 3 | 140 | 0.35 | 200 | 0 | 120 | 0 | 133 | 133 | 0 | 0 | 25 m3/min | 22 W | 42 dB |
| EMBODIMENT 5 | 400 | 126 | 3 | 140 | 0.35 | 200 | 0 | 120 | 0 | 126 | 126 | 0 | 0 | 25 m3/min | 23 W | 42 dB |
| EMBODIMENT 6 | 400 | 112 | 3 | 140 | 0.35 | 200 | 0 | 120 | 0 | 112 | 112 | 0 | 0 | 25 m3/min | 25 W | 44 dB |
| EMBODIMENT 7 | 400 | 126 | 3 | 140 | 0.35 | 200 | 0 | 108 | 0 | 126 | 126 | 0 | 0 | 25 m3/min | 22 W | 41 dB |
| EMBODIMENT 8 | 400 | 140 | 3 | 140 | 0.35 | 200 | 0 | 90 | 0 | 140 | 140 | 0 | 0 | 25 m3/min | 26 W | 44 dB |
| EMBODIMENT 9 | 400 | 140 | 3 | 140 | 0.35 | 200 | 0 | 132 | 0 | 140 | 140 | 0 | 0 | 25 m3/min | 23 W | 43 dB |

TABLE 48-continued

| | FAN DIA-METER | HEIGHT | NUMBER OF BLADES | BOSS DIA-METER | BOSS RATIO | a | b | c | d | eu | ed | fu | fd | AIR-FLOW | PO-WER CON-SUMP-TION | NOISE |
|---|---|---|---|---|---|---|---|---|---|---|---|---|---|---|---|---|
| EMBODIMENT 10 | 400 | 140 | 3 | 110 | 0.275 | 223.1 | −23.1 | 120 | 0 | 140 | 140 | 0 | 0 | 25 m3/min | 22 W | 41 dB |
| EMBODIMENT 11 | 400 | 112 | 3 | 140 | 0.35 | 200 | 0 | 120 | 0 | 112 | 106.4 | 0 | 0 | 25 m3/min | 23 W | 42 dB |
| EMBODIMENT 12 | 400 | 112 | 3 | 140 | 0.35 | 200 | 0 | 120 | 0 | 112 | 112 | 3 | 0 | 25 m3/min | 23 W | 43 dB |
| EMBODIMENT 13 | 400 | 112 | 3 | 140 | 0.35 | 200 | 0 | 120 | 0 | 112 | 106.4 | 3 | 0 | 25 m3/min | 23 W | 42 dB |
| COMPARISON EXAMPLE 1 | 400 | 140 | 3 | 140 | 0.35 | — | — | — | — | — | — | — | — | 25 m3/min | 40 W | 47 dB |

Next, each fan in Embodiments 14 to 17 and in Comparison Example 2 having the fan diameter of ϕ316 was driven by an AC motor using a built-in outdoor unit. The results are shown in Table 49 below.

TABLE 49

| | FAN DIA-METER | HEIGHT | NUMBER OF BLADES | BOSS DIA-METER | BOSS RATIO | a | b | c | d | eu | ed | fu | fd | AIR-FLOW | PO-WER CON-SUMP-TION | NOISE |
|---|---|---|---|---|---|---|---|---|---|---|---|---|---|---|---|---|
| EMBODIMENT 14 | 316 | 100 | 3 | 86 | 0.272 | 176.9 | −18.9 | 120 | 0 | 100 | 100 | 0 | 0 | 14 m3/min | 86 W | 60 dB |
| EMBODIMENT 15 | 316 | 100 | 4 | 86 | 0.272 | 176.9 | −18.9 | 90 | 0 | 100 | 100 | 0 | 0 | 14 m3/min | 95 W | 61 dB |
| EMBODIMENT 16 | 316 | 100 | 5 | 86 | 0.272 | 176.9 | −18.9 | 72 | 0 | 100 | 100 | 0 | 0 | 14 m3/min | 110 W | 60 dB |
| EMBODIMENT 17 | 316 | 100 | 5 | 86 | 0.272 | 176.9 | −18.9 | 108.5 | 0 | 100 | 100 | 0 | 0 | 14 m3/min | 90 W | 59 dB |
| COMPARISON EXAMPLE 2 | 316 | 100 | 5 | 80 | 0.253 | — | — | — | — | — | — | — | — | 14 m3/min | 128 W | 64 dB |

Next, each fan in Embodiments 18 to 20 and in Comparison Example 3 having the fan diameter of ϕ460 was driven by an AC motor using a multiple-type large outdoor unit. The results are shown in Table 50 below.

TABLE 50

| | FAN DIA-METER | HEIGHT | NUMBER OF BLADES | BOSS DIA-METER | BOSS RATIO | a | b | c | d | eu | ed | fu | fd | AIR-FLOW | PO-WER CON-SUMP-TION | NOISE |
|---|---|---|---|---|---|---|---|---|---|---|---|---|---|---|---|---|
| EMBODIMENT 18 | 460 | 161 | 3 | 150 | 0.326 | 238.5 | −8.46 | 120 | 0 | 161 | 161 | 0 | 0 | 32 m3/min | 66 W | 46 dB |
| EMBODIMENT 19 | 460 | 168 | 3 | 150 | 0.326 | 238.5 | −8.46 | 125.2 | 0 | 168 | 168 | 0 | 0 | 32 m3/min | 70 W | 48 dB |
| EMBODIMENT 20 | 460 | 140 | 3 | 150 | 0.326 | 238.5 | −8.46 | 104.3 | 0 | 140 | 140 | 0 | 0 | 32 m3/min | 72 W | 47 dB |
| COMPARISON EXAMPLE 3 | 460 | 168 | 3 | 161 | 0.35 | — | — | — | — | — | — | — | — | 32 m3/min | 122 W | 51 dB |

As can be seen from Table 48 above, it has become clear that the power consumption at the same air flow is reduced by 40% and also the noise is reduced by 4–6 dB in the propeller fan shown in Embodiments 1 to 13, compared to the case with Comparison Example 1 with the propeller fan having the same diameter.

Moreover, as can be seen from Table 49 above, it has become clear that the power consumption at the same air flow is reduced by 15–30% and also the noise is reduced by 3–5 dB in the propeller fan shown in Embodiments 14 to 17, compared to the case with Comparison Example 2 with the propeller fan having the same diameter.

Furthermore, as can be seen from Table 50 above, it has become clear that the power consumption at the same air flow is reduced by 40–45% and also the noise is reduced by 3–5 dB in the propeller fan shown in Embodiments 18 to 20, compared to the case with Comparison Example 3 with the propeller fan having the same diameter.

Moreover, as for Embodiments 1 to 6 in Table 48 above, when the same diameter D=400 mm and the same expansion angle λ=120 deg, Embodiment 1 where height h satisfies an equation 34 below, i.e. h=140, had the highest superiority in efficiency and noise.

$$c=\lambda=360/n=\frac{2400}{7}\times\frac{h}{D} \tag{34}$$

Moreover, as for Embodiments 1, 8 and 9, in Table 48 above, when the same diameter D=400 mm and the same height h=140 mm, Embodiment 1 where blade expansion angle λ satisfies an equation 35 below, i.e. λ=120, had the highest superiority in efficiency and noise.

$$c=\lambda=360/n=\frac{2400}{7}\times\frac{h}{D} \tag{35}$$

Furthermore, as for Embodiments 5 and 7 in Table 48 above, blade expansion angle λ where the same diameter D=400 mm and the same height h=126 mm was superior in Embodiment 7 to that in Embodiment 5. Therefore, when the former is not the same as the latter in an equation 36 below, the latter showed a superiority.

$$\left.\begin{aligned} c&=\lambda=360/n\\ c&=\lambda=\frac{2400}{7}\times\frac{h}{D}\end{aligned}\right\} \tag{36}$$

Moreover, in Embodiments 1 and 10 in Table 48 above, as for boss ratio ν where the same diameter D=400 mm, the same height h=140 mm and the same blade expansion angle λ=120 deg, Embodiment 10 showed a superiority in efficiency and noise as in Embodiment 1, since, in Embodiment 10, transformation satisfying an equation 37 below is performed for Embodiment 1.

$$\left.\begin{aligned} a&=\frac{10}{13}D(1-v)\\ b&=-\frac{10}{13}D(1-v)\times0.35+\frac{vD}{2}\end{aligned}\right\} \tag{37}$$

Further, in Embodiments 1, 6, and 11 to 13 in Table 48, the way of assigning $e_u$, $e_d$, $f_u$, $f_d$ in the case that the same diameter D=400 mm, the same height h=112 mm and the same blade expansion angle λ=120 deg will be described.

In Embodiment 6, the ratio of h/D is smaller, i.e., the thickness of a wing is thinner, than that in Embodiment 1. Thus, the wing is largely deformed at rotation of the fan due to the centrifugal force applied on the wing (blade), reducing the height of the wing, and therefore degradation occurs in terms of efficiency and noise.

To prevent this, relation among $e_u$, $e_d$, $f_u$ and $f_d$ is set according to the following transformation 38 to increase the thickness of the wing, resulting in Embodiments 11 to 13 being superior to Embodiment 6.

$$\left.\begin{aligned} &z_{1u}=e_u\times z_u+f_u\\ &z_{1d}=e_d\times z_d+f_d\\ &\text{wherein}\\ &\left\{\begin{matrix} e_u=e_d\\ f_u>f_d\end{matrix}\right. \text{ or } \left\{\begin{matrix} e_u>e_d\\ f_u=f_d\end{matrix}\right. \text{ or } \left\{\begin{matrix} e_u>e_d\\ f_u>f_d\end{matrix}\right\}\\ &\text{therefore,}\\ &\left\{\begin{matrix} e_u\geqq e_d\\ f_u\geqq f_d\end{matrix}\right.\end{aligned}\right\} \tag{38}$$

It is noted that, when $e_u<e_d$ and $f_u>f_d$, the shape of the wing is largely deformed, which induces deterioration in efficiency and increase in noise, and when $e_u=e_d$ and $f_u<f_d$, or $e_u>e_d$ and $f_u<f_d$, or $e_u<e_d$ and $f_u<f_d$, or when $e_u<e_d$ and $f_u=f_d$, the shape of the wing cannot be formed.

Moreover, as for Embodiments 14 to 16 in Table 49, Embodiment 14 in which the number of blades n in the case of the same diameter D=316 mm, the same height h=100 mm and blade expansion angle λ=360/n assumes a value closest to the value indicated by equation 39 below, i.e., n=3, had the highest superiority in efficiency and noise.

$$\frac{2400}{7}\times\frac{h}{D}=\frac{2400}{7}\times\frac{100}{316}=108.5 \tag{39}$$

Moreover, when Embodiments 16 and 17 in Table 49 above are compared with each other, Embodiment 17 was superior to Embodiment 16. The comparison was made for blade expansion angle λ where the same diameter D=316 mm, the same height h=100 mm and the same number of blades n=5. Therefore, when the former is not the same as the latter in an equation 40 below, the latter showed a superiority.

$$\left.\begin{aligned} c&=\lambda=360/n\\ c&=\lambda=\frac{2400}{7}\times\frac{h}{D}\end{aligned}\right\} \tag{40}$$

Moreover, as for Embodiments 18 to 20 in Table 50, Embodiment 18 was superior to Embodiments 19 and 20. The comparison was made for blade expansion angle λ and height h where the same diameter D=460 mm and the same number of blades n=3. Thus, when blade expansion angle λ and height h are selected, selection is made not only for λ to satisfy the first equation (the top equation) in an equation 41 below, but also for the number of blades n, blade expansion angle λ and height h to satisfy the second equation (the middle equation) in equation 41 below, to achieve a higher superiority. That is, in respect to the propeller fan according to the present invention, the third equation (the bottom equation) in equation 41 below is important to determine a design manual.

$$\left.\begin{aligned} c&=\lambda=\frac{2400}{7}\times\frac{h}{D}\\ c&=\lambda=360/n=\frac{2400}{7}\times\frac{h}{D}\\ 360/n&=\frac{2400}{7}\times\frac{h}{D}\end{aligned}\right\} \tag{41}$$

Next, a fluid feeding device according to the present invention will be described. A fluid feeding device 7 shown in FIG. 8 includes a blower 9 constituted by propeller fan 1 in Embodiment 1 and a drive motor 8, and feeds fluid out by blower 9.

Examples of fluid feeding device having such a configuration include an air conditioner, an air cleaner, a humidifier, an electric fan, a fan heater, a cooling device, and a ventilator. Fluid feeding device 7 in the present embodiment is an outdoor unit 10 of an air conditioner.

Figure 9:
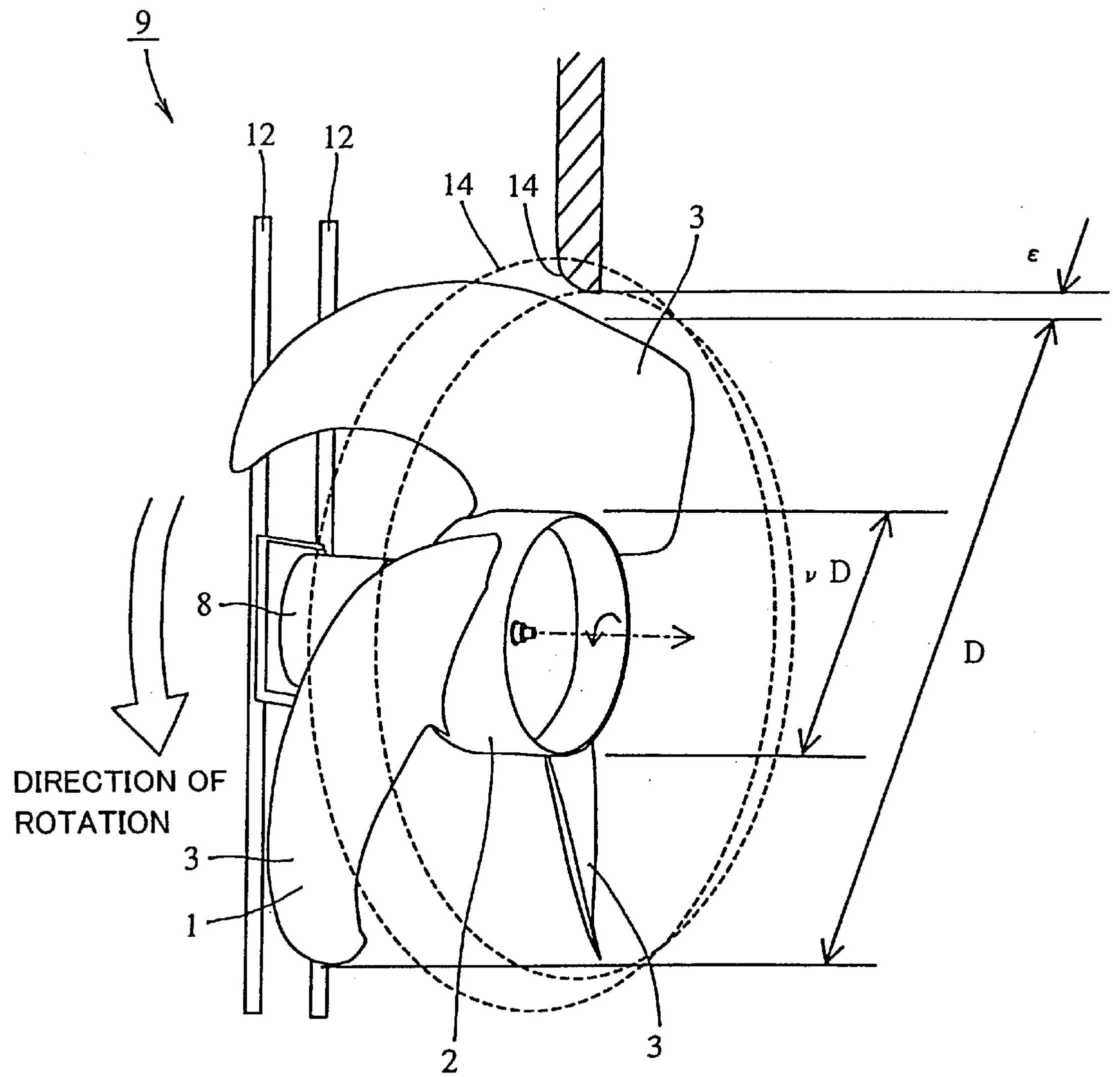
FIG. 9 is a perspective view of an embodiment of a blower of the fluid feeding device of the present invention.

Outdoor unit 10 includes an outdoor heat exchanger 11, and efficiently exchanges heat by blower 9 described above. Here, blower 9 is installed in outdoor unit 10 by a motor angle 12, and a supply opening 13 of outdoor unit 10 is formed to be a bell mouth 14 as shown in FIG. 9.

Figure 10:
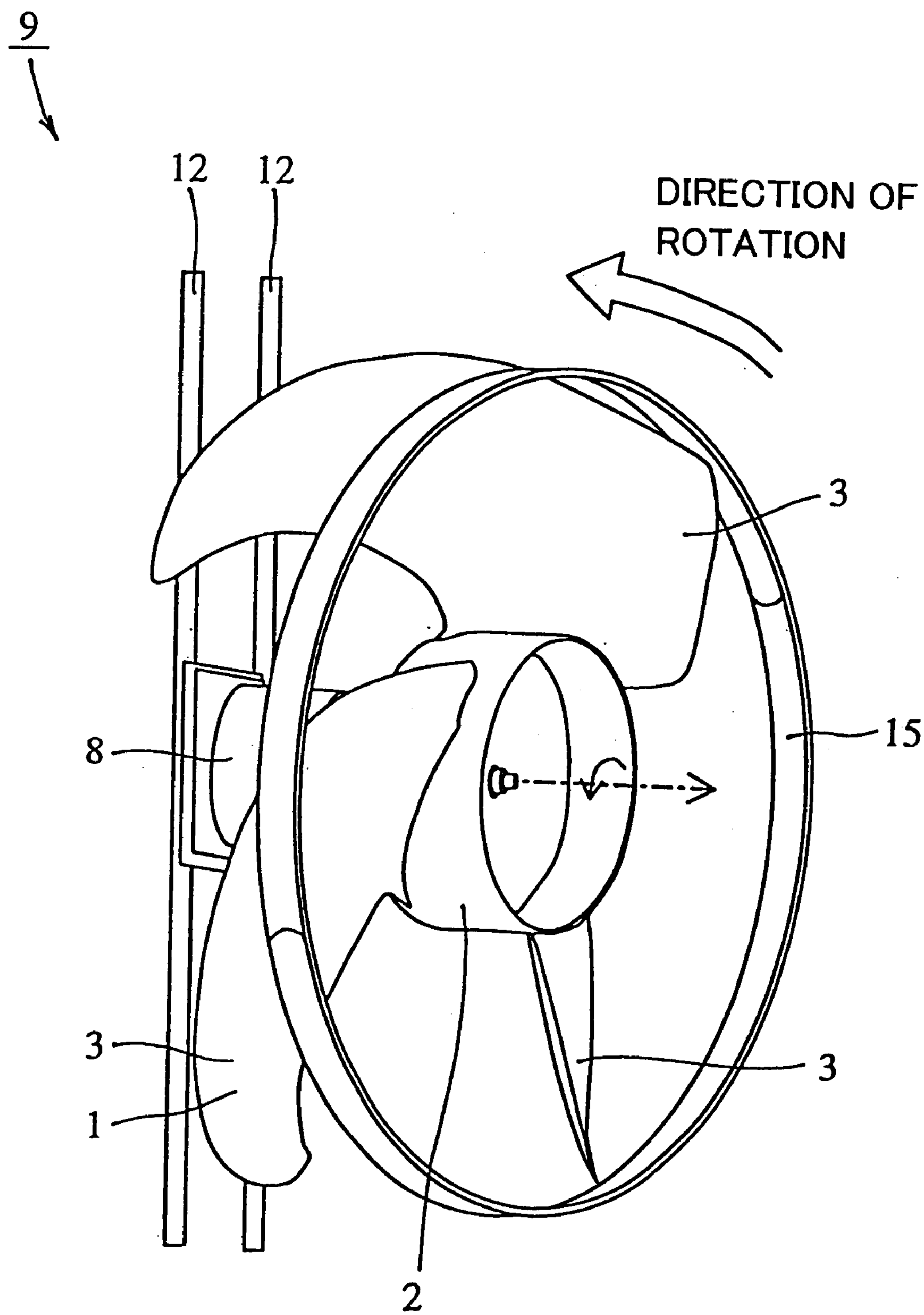
FIG. 10 is a perspective view of an embodiment of the blower of the fluid feeding device of the present invention.

Moreover, blower 9 having a ring splasher 15 installed on the periphery of propeller fan 1, as shown in FIG. 10, may also be provided at fluid feeding device 7. Here, in an air conditioner of a type having an indoor unit and an outdoor unit formed in one piece to be attached to a window or the like, drain water may be splashed up and sprayed on outdoor heat exchanger 11, to further increase the efficiency.

Outdoor unit 10 in the present embodiment is a quiet outdoor unit with reduced noise, since propeller fan 1 in Embodiment 1 is included therein. Moreover, propeller fan 1 has an increased fan efficiency, so that an efficient outdoor unit realizing energy-saving can be attained. It is presumed that propeller fans in other Embodiments can attain similar results.

Next, other embodiments of a propeller fan, a die for molding the propeller fan, and a fluid feeding device according to the present invention will be described below with reference to FIGS. 11 to 20.

Figure 11:
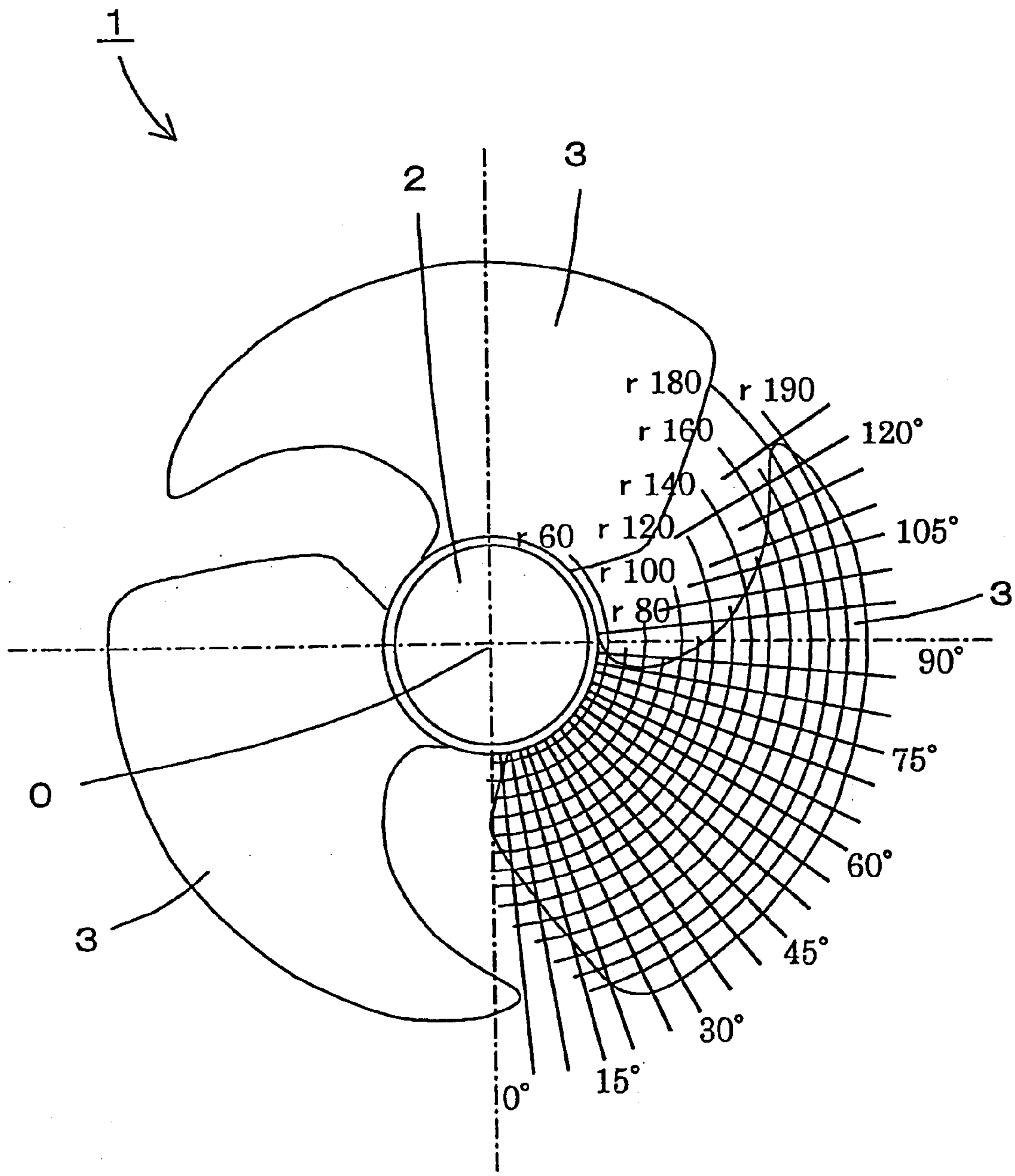
FIG. 11 is a front view of a propeller fan according to Embodiment 21 of the present invention.
Figure 12:
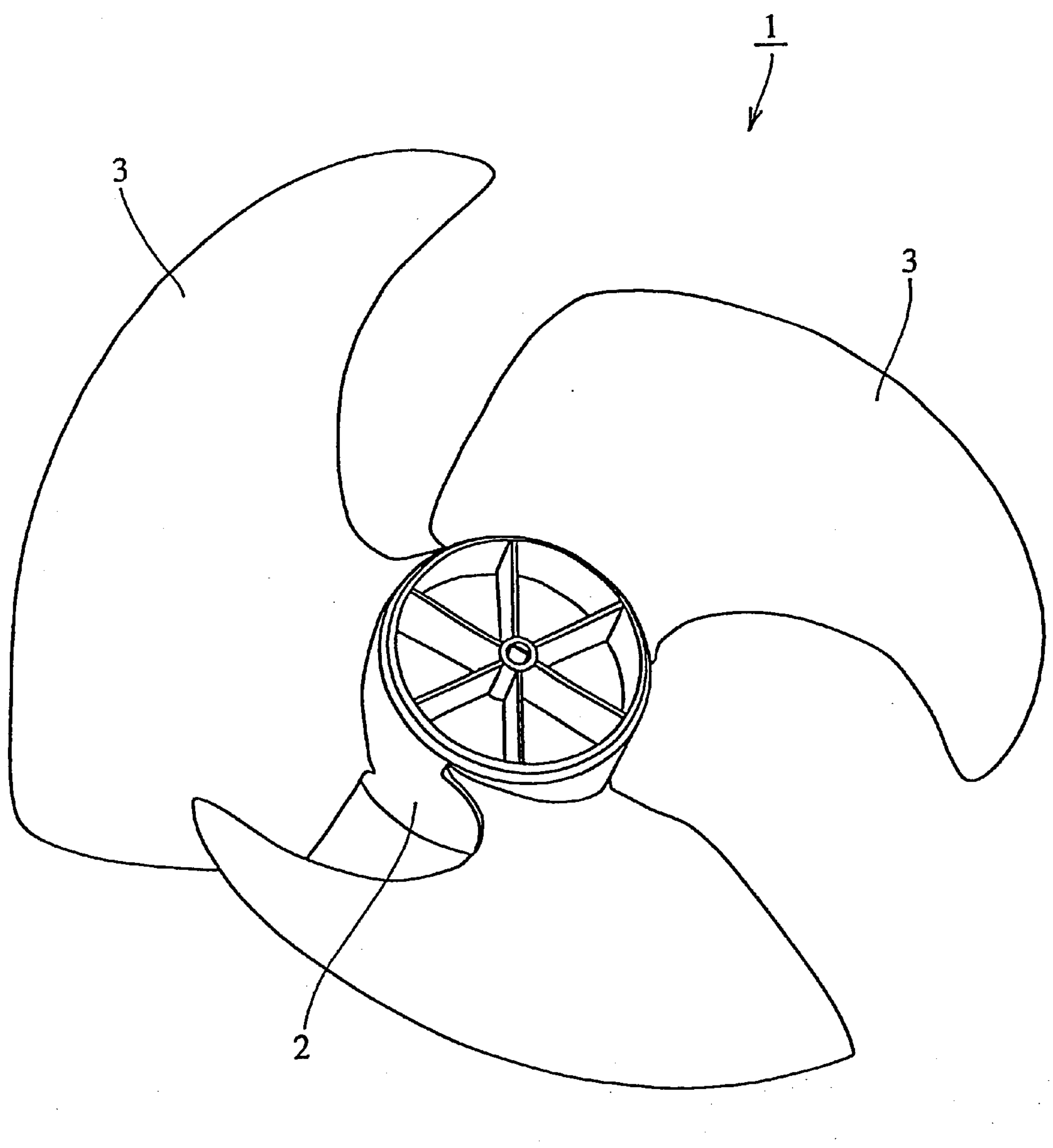
FIG. 12 is a perspective view of (the negative pressure surface side of) the propeller fan in Embodiment 21 of the present invention.
Figure 13:
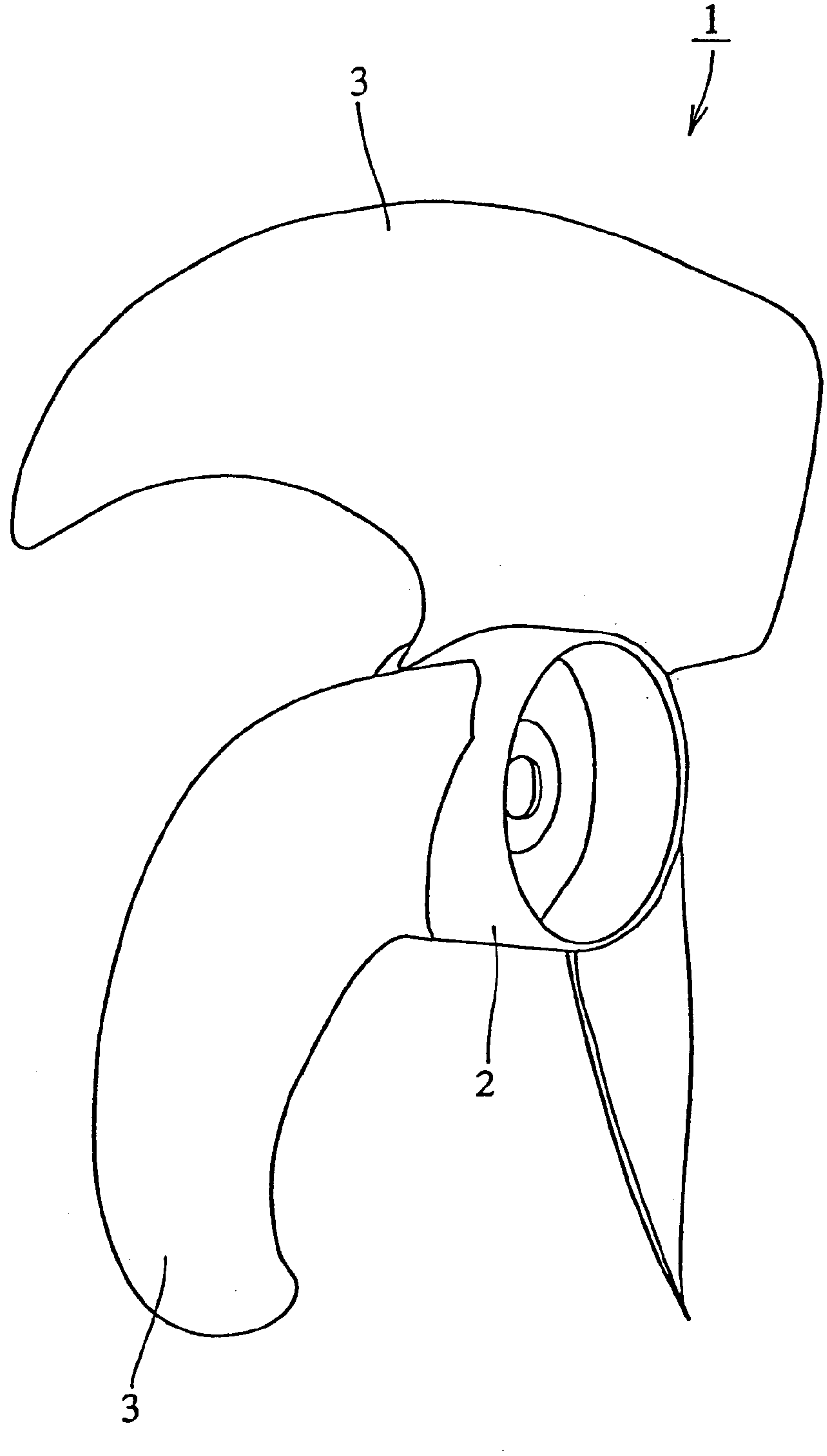
FIG. 13 is a perspective view of (the positive pressure surface side of) the propeller fan in Embodiment 21 of the present invention.

FIG. 11 shows a front view of propeller fan 1 of the present invention. Propeller fan 1 of the present invention is molded in one piece by synthetic resin such as, for example, AS resin with glass fiber. For propeller fan 1, the diameter D=400 mm, the height in the axial direction (z direction) h=140 mm, the number of blades n=3, the expansion angle of a blade λ=120 degrees (deg) and a boss ratio ν=0.275 (boss diameter νD=110 mm), and three blades 3 are radially and integrally provided on the periphery of boss portion 2.

It is an important feature of the present invention that the shape of the surface of blade 3 of propeller fan 1 is obtained based on a base shape defined by specific coordinate values. Thus, the shape of a curved surface, which is defined by coordinate values obtained by transforming the coordinate values in the base shape in the r, θ and z directions using prescribed transformation formulas respectively, is determined as the shape of the surface of blade 3 of propeller fan 1.

The base shape of the present invention is typically defined by the coordinate values indicated in Table 102 described earlier. However, the shape, which is defined by coordinate values obtained by uniformly transforming the coordinate values indicated in Table 102 by e.g. multiplying the coordinate values with prescribed coefficients, should also be interpreted as equivalent to the base shape of the present invention.

When expressed by a cylindrical coordinate system in which the z axis is set as a rotation axis of propeller fan 1, coordinates ($r_1$, $\theta_1$, $z_{1u}$) of a surface on a negative pressure side of blade 3 and coordinates ($r_1$, $\theta_1$, $z_{1d}$) of a surface on a positive pressure side of blade 3 are coordinate values obtained by transforming non-dimensionally expressed three-dimensional coordinate values indicated in Table 102 using a transformation formula 113 below, and the surface on the negative pressure side and the surface on the positive pressure side are configured by curved surfaces defined by the obtained coordinate values, i.e. a curved surface specified by coordinate values indicated in Table 103.

It is noted that the curved surface may also be specified by coordinate values within the range of ±5% of each coordinate value. Moreover, it may be possible to obtain coordinate values indicated in Table 103 using coordinate values obtained by uniformly transforming the coordinate values indicated in Table 102 described earlier. However, this should be interpreted as a modification within the range of equivalent to the present invention, since it can be applied only by slightly modifying transformation formula 13.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = D/2 = 400/2 = 200\\
&b = 0\\
&c = \lambda = 360/n = \frac{2400}{7} \times \frac{h}{D} = \frac{2400}{7} \times \frac{140}{400} = 120\\
&d = 0\\
&e_u = e_d = h = 140\\
&f_u = f_d = 0
\end{aligned}\right\} \quad (113)$$

TABLE 103

| EMBODIMENT 21 | | | | | | | | | | | | | | |
|---|---|---|---|---|---|---|---|---|---|---|---|---|---|---|
| | θ | | | | | | | | | | | | | |
| r | 5 | 10 | 15 | 20 | 25 | 30 | 35 | 40 | 45 | 50 | 55 | 60 | 65 | 70 |
| 60 | | | 26.62 | 30.10 | 33.38 | 36.60 | 39.79 | 42.94 | 46.01 | 48.99 | 51.88 | 54.65 | 57.29 | 59.76 |
| | | | 23.49 | 25.79 | 28.13 | 30.48 | 32.83 | 35.24 | 37.75 | 40.38 | 43.07 | 45.80 | 48.50 | 51.15 |
| 70 | | 20.50 | 25.15 | 29.37 | 33.38 | 37.23 | 40.93 | 44.46 | 47.83 | 51.09 | 54.22 | 57.20 | 59.99 | 62.41 |
| | | 17.68 | 21.04 | 24.33 | 27.57 | 30.80 | 34.05 | 37.35 | 40.66 | 43.94 | 47.17 | 50.29 | 53.30 | 56.23 |
| 80 | 12.22 | 18.44 | 23.78 | 28.72 | 33.36 | 37.78 | 41.95 | 45.90 | 49.64 | 53.23 | 56.65 | 59.87 | 62.82 | 65.29 |
| | 10.63 | 15.40 | 19.87 | 24.10 | 28.15 | 32.09 | 35.95 | 39.74 | 43.46 | 47.06 | 50.53 | 53.82 | 56.94 | 59.93 |
| 90 | 9.71 | 16.30 | 22.39 | 28.07 | 33.39 | 38.36 | 43.03 | 47.43 | 51.58 | 55.50 | 59.22 | 62.70 | 65.91 | 68.70 |
| | 7.69 | 13.70 | 19.17 | 24.25 | 28.98 | 33.46 | 37.75 | 41.89 | 45.89 | 49.76 | 53.46 | 56.95 | 60.24 | 63.37 |
| 100 | 5.81 | 13.80 | 20.94 | 27.43 | 33.42 | 38.98 | 44.16 | 49.00 | 53.54 | 57.82 | 61.86 | 65.66 | 69.23 | 72.48 |
| | 4.65 | 11.79 | 18.34 | 24.26 | 29.63 | 34.59 | 39.27 | 43.73 | 48.03 | 52.16 | 56.13 | 59.90 | 63.46 | 66.85 |
| 110 | 1.45 | 11.05 | 19.30 | 26.63 | 33.30 | 39.44 | 40.93 | 50.41 | 55.34 | 59.95 | 64.31 | 68.45 | 72.37 | 76.07 |
| | 0.83 | 9.36 | 17.00 | 23.77 | 29.82 | 35.33 | 40.44 | 45.26 | 49.84 | 54.24 | 58.48 | 62.56 | 66.47 | 70.22 |
| 120 | | 7.82 | 17.11 | 25.26 | 32.64 | 39.39 | 45.61 | 51.37 | 56.72 | 61.73 | 66.44 | 70.92 | 75.18 | 79.25 |

TABLE 103-continued

EMBODIMENT 21

| | | | | | | | | | | | | | |
|---|---|---|---|---|---|---|---|---|---|---|---|---|---|
| | 6.50 | 15.01 | 22.66 | 29.55 | 35.80 | 41.49 | 46.74 | 51.67 | 56.36 | 60.87 | 65.22 | 69.44 | 73.51 |
| 130 | 4.01 | 14.23 | 23.41 | 31.62 | 38.97 | 45.65 | 51.83 | 57.60 | 63.03 | 68.17 | 73.05 | 77.68 | 82.08 |
| | 3.24 | 13.00 | 21.95 | 29.92 | 36.99 | 43.32 | 49.09 | 54.45 | 59.48 | 64.22 | 68.73 | 73.04 | 77.18 |
| 140 | | 11.48 | 21.88 | 30.94 | 38.94 | 46.08 | 52.59 | 58.65 | 64.39 | 69.83 | 74.97 | 79.93 | 84.70 |
| | | 10.41 | 20.56 | 29.43 | 37.25 | 44.23 | 50.59 | 56.49 | 62.04 | 67.24 | 72.09 | 76.74 | 81.17 |
| 150 | | 8.11 | 19.51 | 29.62 | 38.63 | 46.66 | 53.84 | 60.34 | 66.35 | 72.06 | 77.57 | 82.88 | 87.94 |
| | | 7.16 | 18.21 | 28.10 | 36.88 | 44.68 | 51.66 | 58.00 | 63.89 | 69.49 | 74.88 | 80.06 | 84.95 |
| 160 | | | 17.23 | 28.54 | 38.49 | 47.29 | 55.12 | 62.19 | 68.67 | 74.71 | 80.44 | 85.98 | 91.37 |
| | | | 15.92 | 26.87 | 36.49 | 45.02 | 52.68 | 59.66 | 66.10 | 72.11 | 77.83 | 83.36 | 88.66 |
| 170 | | | 15.05 | 27.51 | 38.32 | 47.76 | 56.12 | 63.66 | 70.58 | 77.03 | 83.14 | 88.98 | 94.67 |
| | | | 13.77 | 30.94 | 36.12 | 45.29 | 53.51 | 60.96 | 67.84 | 74.29 | 80.40 | 86.33 | 92.11 |
| 180 | | | 12.17 | 26.24 | 37.97 | 48.07 | 56.91 | 64.85 | 72.16 | 78.98 | 85.44 | 91.61 | 97.58 |
| | | | 11.29 | 24.61 | 35.82 | 45.63 | 54.34 | 62.19 | 69.43 | 76.23 | 82.71 | 88.91 | 94.92 |
| 190 | | | | 24.49 | 37.59 | 48.47 | 57.78 | 66.06 | 73.67 | 80.76 | 87.47 | 93.94 | 100.17 |
| | | | | 23.30 | 35.85 | 46.33 | 55.41 | 63.61 | 71.14 | 78.22 | 85.01 | 91.61 | 97.95 |
| (mm) | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 60 | 61.98 | 63.83 | 65.10 | 65.49 | | | | | | | |
| | 53.76 | 56.36 | 59.08 | 62.17 | | | | | | | |
| 70 | 64.24 | 65.12 | | | | | | | | | |
| | 59.16 | 62.28 | | | | | | | | | |
| 80 | 67.09 | 67.84 | | | | | | | | | |
| | 62.90 | 66.04 | | | | | | | | | |
| 90 | 70.91 | 72.20 | | | | | | | | | |
| | 66.43 | 69.60 | | | | | | | | | |
| 100 | 75.28 | 77.42 | 78.45 | | | | | | | | |
| | 70.12 | 73.39 | 76.92 | | | | | | | | |
| 110 | 79.45 | 82.31 | 84.39 | | | | | | | | |
| | 73.82 | 77.33 | 80.90 | | | | | | | | |
| 120 | 83.10 | 86.59 | 89.50 | 91.52 | | | | | | | |
| | 77.42 | 81.18 | 84.89 | 88.69 | | | | | | | |
| 130 | 86.26 | 90.21 | 93.81 | 96.82 | 98.84 | | | | | | |
| | 81.18 | 85.06 | 88.84 | 92.62 | 96.60 | | | | | | |
| 140 | 89.23 | 93.48 | 97.51 | 101.18 | 104.27 | 106.41 | | | | | |
| | 85.32 | 89.23 | 93.00 | 96.71 | 100.43 | 104.47 | | | | | |
| 150 | 92.67 | 97.13 | 101.36 | 105.24 | 108.82 | 111.87 | 114.10 | | | | |
| | 89.51 | 93.84 | 97.82 | 101.36 | 104.80 | 108.31 | 112.15 | | | | |
| 160 | 96.50 | 101.24 | 105.56 | 109.64 | 113.53 | 116.87 | 119.59 | 121.74 | | | |
| | 93.66 | 98.23 | 102.39 | 106.35 | 110.15 | 113.29 | 116.26 | 119.63 | | | |
| 170 | 100.19 | 105.34 | 110.01 | 114.15 | 117.87 | 121.42 | 124.69 | 127.46 | 129.37 | | |
| | 97.58 | 102.60 | 107.14 | 111.13 | 114.70 | 118.15 | 121.39 | 124.31 | 127.04 | | |
| 180 | 103.43 | 109.02 | 114.07 | 118.53 | 122.43 | 125.83 | 128.90 | 131.73 | 134.08 | 135.77 | |
| | 100.85 | 106.45 | 111.41 | 115.77 | 119.58 | 122.87 | 125.88 | 128.76 | 131.35 | 133.74 | |
| 190 | 106.19 | 112.03 | 117.50 | 122.26 | 126.37 | 129.94 | 132.98 | 135.53 | 137.73 | 139.41 | |
| | 103.99 | 109.83 | 115.27 | 120.00 | 124.05 | 127.58 | 130.62 | 133.25 | 135.77 | 138.14 | |
| (mm) | | | | | | | | | | | |

DIAMETER D = 400
HEIGHT h = 140
EXPANSION ANGLE λ = 120
BOSS RATIO ν = 0.275

FIG. 11 shows a cylindrical coordinate system of r and θ by dashed lines. It is noted that, though the z axis is not shown in FIG. 11, the z axis is a line passing the center of rotation 0 of boss portion 2 of propeller fan 1 in FIG. 11 and perpendicular to the plane of the drawing (that is, a line overlapping with a core of the rotation axis of propeller fan 1).

In FIG. 11, for blade 3 of propeller fan 1, lines are drawn in the r direction that divide the blade at intervals of every 10 mm in the range between 60 mm and 190 mm, and lines are drawn that divide the blade in the θ direction at intervals of every 5 deg in the range between 0 deg and 125 deg, a coordinate value of z at each crossing point being indicated in Table 103. Here, the top of each column indicates a value on the negative pressure surface side (suction side) of the propeller fan, whereas the bottom of each column indicates a value on the positive pressure surface side (blowing side) thereof.

It is noted that blade 3 is made thicker at a root portion of blade 3. Moreover, a rim of blade 3 is extremely thin for weight saving, so that the thickness may be partially increased compared to that defined by Table 103 in the case that a problem occurs in resin flowage at the time of molding. Moreover, the shape of the surface of blade 3 may be smooth, or may be provided with concavities and convexities in a form of grooves, protrusions or dimples. Furthermore, the trailing edge of blade 3 may have a shape of saw teeth. Not that, in each transformation formula, d and $f_u=f_d$ are indicated as optional because the shape of the propeller fan can be the same irrespective of a value selected for d and $f_u=f_d$.

Moreover, propeller fan 1 of the present invention may be molded in one piece by synthetic resin such as ABS (acrylonitrile-butadiene-styrene) resin or polypropylene (PP), or may be integrally molded in one piece by synthetic resin having an increased intensity by including mica or the like, or may be non-integrally molded.

Figure 17:
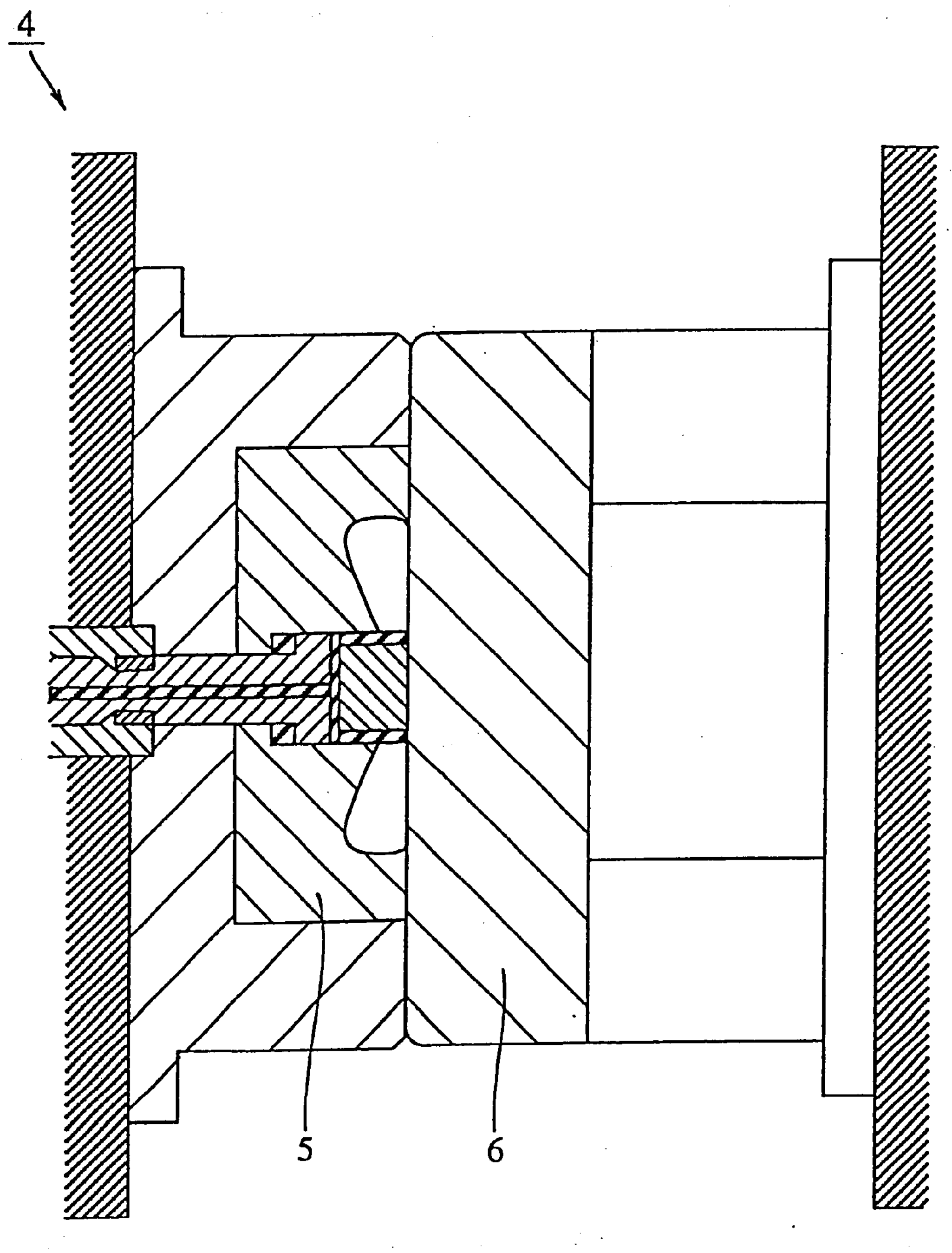
FIG. 17 is a partial side section view of a die for molding a propeller fan of the present invention.
Figure 18A:
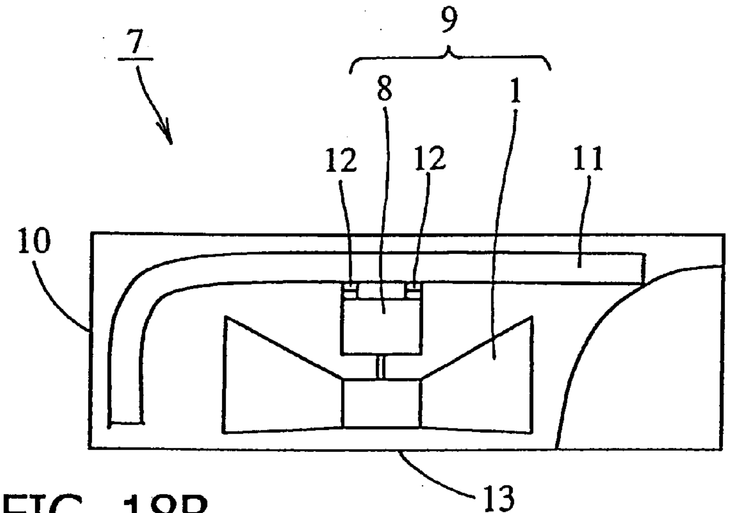
Figure 18B:
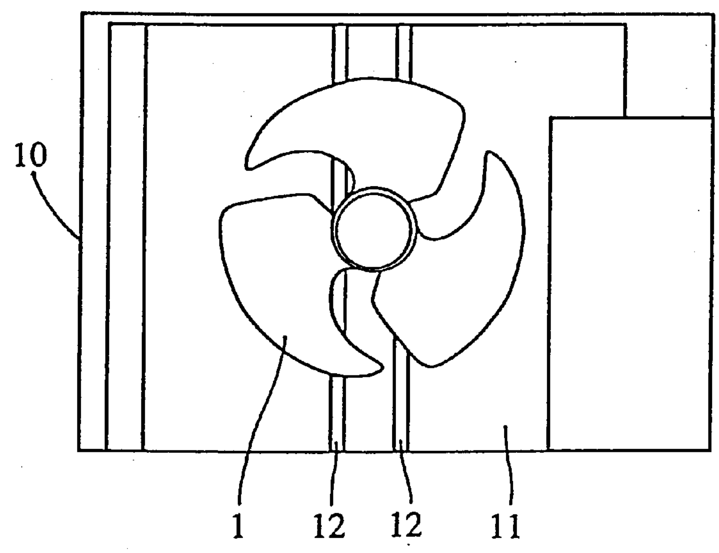
FIG. 18B is a front configuration view of the fluid feeding device of the present invention.
Figure 18C:
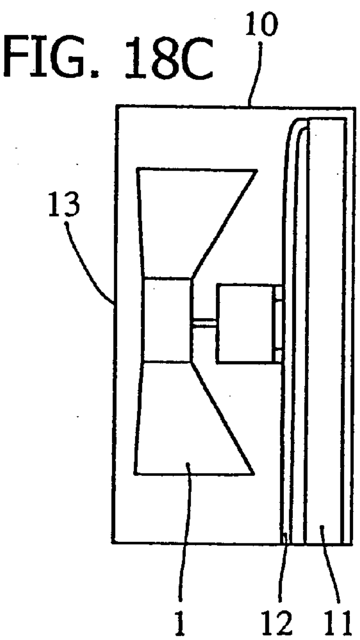

FIG. 17 shows an example of a propeller-fan-molding die 4 for forming propeller fan 1 shown in FIG. 11. Die 4 is for molding propeller fan 1 by synthetic resin, and has a fixed-side die 5 and a movable-side die 6, as shown in FIG. 17.

Then, the shape of a cavity defined by the both dies 5 and 6 is made approximately the same as the shape of propeller fan 1. Coordinates ($r_1$, $\theta_1$, $z_{1u}$) on the die surface of a portion forming the surface of blade 3 in fixed-side die 5 described above and coordinates ($r_1$, $\theta_1$, $z_{1d}$) on the die surface of a portion forming the surface of blade 3 in movable-side die 6 are obtained by transforming non-dimensionally expressed three-dimensional coordinate values indicated in Table 102 using a transformation formula 114 below.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant)}\\
&\text{wherein}\\
&a = D/2 = 400/2 = 200\\
&b = 0\\
&c = \lambda = 360/n = \frac{2400}{7} \times \frac{h}{D} = \frac{2400}{7} \times \frac{140}{400} = 120\\
&d = 0\\
&e_u = e_d = h = 140\\
&f_u = f_d = 0
\end{aligned}\right\} \quad (114)$$

That is, fixed-side die 5 and movable-side die 6 have curved portions respectively specified by coordinate values indicated in Table 103. It is noted that, in this case also, each curved surface may be specified by coordinate values within the range of ±5% of each coordinate value.

Here, the dimension of the curved surface of the die may be determined in consideration of mold shrinkage. In this case, the coordinate data above may be corrected in consideration of the mold shrinkage, warping and deformation, to form molding die 4, such that propeller fan 1 having blade 3 with a three-dimensional curved surface specified by coordinate values within the range of ±5% of three-dimensional coordinate values indicated in Table 103 above is formed after the mold shrinkage, and these are encompassed by the molding die of the present invention.

Moreover, though die 4 for molding the propeller fan in the present embodiment includes the negative pressure side surface of propeller fan 1 formed by fixed-side die 5 and a positive pressure side surface of propeller fan formed by movable-side die 6 as shown in FIG. 17, it may be possible to form the positive pressure side surface of propeller fan 1 by fixed-side die 5 and the negative pressure side surface of propeller fan 1 by movable-side die 6.

Other embodiments and comparison examples of the present invention will be described below in detail.

Embodiment 21

Propeller fan 1 shown in FIG. 11 having the diameter D=400 mm, the height in the axial direction (z direction) h=140 mm, the number of blades n=3, the expansion angle of a blade λ=120 deg, the boss ratio ν=0.275 (boss diameter νD=110 mm) was formed such that the surface of the blade is a three-dimensional curved surface as indicated in Table 103. Note that FIGS. 12 and 13 each shows a perspective view of propeller fan 1 in the present Embodiment 21.

Embodiment 22

Propeller fan 1 having the diameter D=400 mm, the height in the axial direction (z direction) h=154 mm, the number of blades n=3, the expansion angle of a blade λ=120 deg, the boss ratio ν=0.275 (boss diameter νD=110 mm) was formed such that the surface of the blade is a curved surface formed by transforming the curved surface defined by non-dimensionally expressed three-dimensional coordinates specified by Table 102 using a transformation formula 115 below, i.e. a three-dimensional curved surface specified by Table 104.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant)}\\
&\text{wherein}\\
&a = D/2 = 400/2 = 200\\
&b = 0\\
&c = \lambda = 360/n = 120\\
&d = 0\\
&e_u = e_d = h = 154\\
&f_u = f_d = 0
\end{aligned}\right\} \quad (115)$$

TABLE 104

| EMBODIMENT 22 | | | | | | | | | | | | | | |
|---|---|---|---|---|---|---|---|---|---|---|---|---|---|---|
| | θ | | | | | | | | | | | | | |
| r | 5 | 10 | 15 | 20 | 25 | 30 | 35 | 40 | 45 | 50 | 55 | 60 | 65 | 70 |
| 60 | | | 29.28 | 33.11 | 36.72 | 40.26 | 43.77 | 47.23 | 50.61 | 53.89 | 57.06 | 60.12 | 63.02 | 65.74 |
| | | | 25.84 | 28.37 | 30.94 | 33.52 | 36.11 | 38.77 | 41.53 | 44.42 | 47.38 | 50.38 | 53.35 | 56.26 |
| 70 | | 22.55 | 27.67 | 32.31 | 36.71 | 40.95 | 45.02 | 48.90 | 52.62 | 56.20 | 59.64 | 62.92 | 65.99 | 68.65 |
| | | 19.45 | 23.15 | 26.76 | 30.33 | 33.88 | 37.46 | 41.08 | 44.72 | 48.34 | 51.88 | 55.32 | 58.63 | 61.85 |
| 80 | 13.45 | 20.28 | 26.16 | 31.59 | 36.70 | 41.56 | 46.15 | 50.49 | 54.61 | 58.55 | 62.31 | 65.86 | 69.10 | 71.82 |
| | 11.69 | 16.94 | 21.86 | 26.51 | 30.97 | 35.30 | 39.55 | 43.72 | 47.80 | 51.77 | 55.58 | 59.20 | 62.64 | 65.93 |
| 90 | 10.68 | 17.93 | 24.62 | 30.88 | 36.73 | 42.20 | 47.33 | 52.17 | 56.73 | 61.05 | 65.14 | 68.97 | 72.50 | 75.57 |

TABLE 104-continued

EMBODIMENT 22

| | | | | | | | | | | | | | | |
|---|---|---|---|---|---|---|---|---|---|---|---|---|---|---|
| | 8.45 | 15.07 | 21.09 | 26.68 | 31.88 | 36.81 | 41.52 | 46.08 | 50.48 | 54.74 | 58.80 | 62.65 | 66.26 | 69.71 |
| 100 | 6.39 | 15.18 | 23.03 | 30.18 | 36.76 | 42.88 | 48.57 | 53.90 | 58.90 | 63.60 | 68.04 | 72.23 | 76.15 | 79.73 |
| | 5.12 | 12.97 | 20.17 | 26.68 | 32.59 | 38.05 | 43.20 | 48.10 | 52.83 | 57.38 | 61.74 | 65.89 | 69.81 | 73.53 |
| 110 | 1.60 | 12.16 | 21.23 | 29.30 | 36.63 | 43.38 | 45.02 | 55.45 | 60.87 | 65.95 | 70.74 | 75.29 | 79.61 | 83.68 |
| | 0.91 | 10.29 | 18.70 | 26.14 | 32.80 | 38.86 | 44.49 | 49.78 | 54.83 | 59.67 | 64.33 | 68.81 | 73.12 | 77.24 |
| 120 | | 8.60 | 18.82 | 27.79 | 35.90 | 43.33 | 50.17 | 56.51 | 62.39 | 67.90 | 73.09 | 78.01 | 82.70 | 87.18 |
| | | 7.15 | 16.51 | 24.92 | 32.51 | 39.38 | 45.64 | 51.42 | 56.84 | 62.00 | 66.96 | 71.75 | 76.38 | 80.86 |
| 130 | | 4.41 | 15.65 | 25.75 | 34.78 | 42.86 | 50.22 | 57.01 | 63.35 | 69.33 | 74.99 | 80.36 | 85.45 | 90.29 |
| | | 3.56 | 14.30 | 24.15 | 32.91 | 40.69 | 47.65 | 54.00 | 59.90 | 65.43 | 70.65 | 75.61 | 80.35 | 84.90 |
| 140 | | | 12.62 | 24.06 | 34.04 | 42.83 | 50.68 | 57.85 | 64.51 | 70.83 | 76.81 | 82.47 | 87.93 | 93.17 |
| | | | 11.46 | 22.61 | 32.38 | 40.98 | 48.66 | 55.64 | 62.14 | 68.24 | 73.96 | 79.30 | 84.42 | 89.29 |
| 150 | | | 8.92 | 21.46 | 32.59 | 42.50 | 51.33 | 59.22 | 66.37 | 72.98 | 79.26 | 85.33 | 91.17 | 96.74 |
| | | | 7.88 | 20.03 | 30.91 | 40.57 | 49.15 | 56.83 | 63.80 | 70.28 | 76.44 | 82.37 | 88.06 | 93.45 |
| 160 | | | | 18.95 | 31.39 | 42.34 | 52.02 | 60.64 | 68.41 | 75.54 | 82.19 | 88.48 | 94.58 | 100.50 |
| | | | | 17.51 | 29.55 | 40.14 | 49.52 | 57.95 | 65.63 | 72.71 | 79.32 | 85.62 | 91.70 | 97.53 |
| 170 | | | | 16.55 | 30.26 | 42.16 | 52.54 | 61.73 | 70.03 | 77.64 | 84.74 | 91.45 | 97.88 | 104.14 |
| | | | | 15.15 | 34.04 | 39.73 | 49.82 | 58.86 | 67.06 | 74.63 | 81.72 | 88.44 | 94.96 | 101.32 |
| 180 | | | | 13.38 | 28.87 | 41.77 | 52.87 | 62.60 | 71.34 | 79.38 | 86.88 | 93.98 | 100.77 | 107.33 |
| | | | | 12.42 | 27.07 | 39.40 | 50.20 | 59.77 | 68.41 | 76.37 | 83.85 | 90.98 | 97.81 | 104.42 |
| 190 | | | | | 26.94 | 41.35 | 53.32 | 63.56 | 72.67 | 81.03 | 88.83 | 96.22 | 103.33 | 110.19 |
| | | | | | 25.63 | 39.44 | 50.97 | 60.96 | 69.97 | 78.26 | 86.04 | 93.51 | 100.77 | 107.74 |
| (mm) | | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 60 | 68.18 | 70.22 | 71.61 | 72.04 | | | | | | | |
| | 59.13 | 61.99 | 64.99 | 68.39 | | | | | | | |
| 70 | 70.66 | 71.63 | | | | | | | | | |
| | 65.07 | 68.51 | | | | | | | | | |
| 80 | 73.80 | 74.62 | | | | | | | | | |
| | 69.18 | 72.64 | | | | | | | | | |
| 90 | 78.00 | 79.42 | | | | | | | | | |
| | 73.07 | 76.56 | | | | | | | | | |
| 100 | 82.81 | 85.16 | 86.29 | | | | | | | | |
| | 77.13 | 80.73 | 84.61 | | | | | | | | |
| 110 | 87.40 | 90.54 | 92.83 | | | | | | | | |
| | 81.20 | 85.07 | 88.99 | | | | | | | | |
| 120 | 91.41 | 95.24 | 98.45 | 100.67 | | | | | | | |
| | 85.16 | 89.30 | 93.38 | 97.56 | | | | | | | |
| 130 | 94.89 | 99.24 | 103.19 | 106.50 | 108.73 | | | | | | |
| | 89.30 | 93.56 | 97.72 | 101.88 | 106.26 | | | | | | |
| 140 | 98.15 | 102.83 | 107.26 | 111.30 | 114.70 | 117.05 | | | | | |
| | 93.85 | 98.15 | 102.30 | 106.38 | 110.47 | 114.91 | | | | | |
| 150 | 101.94 | 106.84 | 111.50 | 115.76 | 119.70 | 123.06 | 125.51 | | | | |
| | 98.47 | 103.23 | 107.60 | 111.49 | 115.28 | 119.15 | 123.37 | | | | |
| 160 | 106.14 | 111.36 | 116.12 | 120.60 | 124.89 | 128.56 | 131.55 | 133.92 | | | |
| | 103.02 | 108.06 | 112.63 | 116.99 | 121.17 | 124.62 | 127.89 | 131.60 | | | |
| 170 | 110.20 | 115.88 | 121.02 | 125.57 | 129.65 | 133.56 | 137.16 | 140.20 | 142.30 | | |
| | 107.34 | 112.86 | 117.85 | 122.24 | 126.17 | 129.97 | 133.53 | 136.74 | 139.75 | | |
| 180 | 113.77 | 119.92 | 125.47 | 130.38 | 134.67 | 138.41 | 141.79 | 144.90 | 147.49 | 149.35 | |
| | 110.94 | 117.09 | 122.55 | 127.35 | 131.54 | 135.15 | 138.47 | 141.64 | 144.49 | 147.12 | |
| 190 | 116.81 | 123.24 | 129.25 | 134.49 | 139.01 | 142.93 | 146.27 | 149.08 | 151.50 | 153.35 | |
| | 114.39 | 120.81 | 126.80 | 131.99 | 136.45 | 140.34 | 143.68 | 146.57 | 149.35 | 151.95 | |
| (mm) | | | | | | | | | | | |

DIAMETER D = 400
HEIGHT h = 154
EXPANSION ANGLE λ = 120
BOSS RATIO ν = 0.275

Embodiment 23

Propeller fan 1 having the diameter D=400 mm, the height in the axial direction (z direction) h=147 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 116 below, i.e. a three-dimensional curved surface specified by Table 105.

$$\left.\begin{aligned}
&r_1 = a \times r + b \text{ (mm)} \\
&\theta_1 = c \times \theta + d \text{ (deg)} \\
&z_{1u} = e_u \times z_u + f_u \text{ (mm)} \\
&z_{1d} = e_d \times z_d + f_d \text{ (mm)} \\
&(a, c, e_u, e_d\text{: factor of proportionality, } b, d, f_u, f_d\text{: constant}) \\
&\text{wherein} \\
&a = \frac{D}{2} = \frac{400}{2} = 200 \\
&b = 0 \\
&c = \lambda = \frac{360}{n} = 120 \\
&d = 0 \\
&e_u = e_d = h = 147 \\
&f_u = f_d = 0
\end{aligned}\right\} \quad (116)$$

TABLE 105

EMBODIMENT 23

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 60 | | | 27.95 | 31.61 | 35.05 | 38.43 | 41.78 | 45.09 | 48.31 | 51.44 | 54.47 | 57.38 | 60.15 | 62.75 |
| | | | 24.67 | 27.08 | 29.54 | 32.00 | 34.47 | 37.00 | 39.64 | 42.40 | 45.23 | 48.09 | 50.92 | 53.71 |
| 70 | | 21.52 | 26.41 | 30.84 | 35.04 | 39.09 | 42.98 | 46.68 | 50.23 | 53.64 | 56.93 | 60.06 | 62.99 | 65.53 |
| | | 18.56 | 22.09 | 25.55 | 28.95 | 32.34 | 35.76 | 39.22 | 42.69 | 46.14 | 49.53 | 52.80 | 55.96 | 59.04 |
| 80 | 12.83 | 19.36 | 24.97 | 30.15 | 35.03 | 39.67 | 44.05 | 48.19 | 52.13 | 55.89 | 59.48 | 62.87 | 65.96 | 68.56 |
| | 11.16 | 16.17 | 20.87 | 25.31 | 29.56 | 33.70 | 37.75 | 41.73 | 45.63 | 49.42 | 53.06 | 56.51 | 59.79 | 62.93 |
| 90 | 10.20 | 17.12 | 23.51 | 29.48 | 35.06 | 40.28 | 45.18 | 49.80 | 54.15 | 58.28 | 62.18 | 65.84 | 69.20 | 72.13 |
| | 8.07 | 14.39 | 20.13 | 25.47 | 30.43 | 35.13 | 39.63 | 43.98 | 48.19 | 52.25 | 56.13 | 59.80 | 63.25 | 66.54 |
| 100 | 6.10 | 14.49 | 21.99 | 28.80 | 35.09 | 40.93 | 46.37 | 51.45 | 56.22 | 60.71 | 64.95 | 68.94 | 72.69 | 76.10 |
| | 4.88 | 12.38 | 19.25 | 25.47 | 31.11 | 36.32 | 41.23 | 45.92 | 50.43 | 54.77 | 58.93 | 62.89 | 66.64 | 70.19 |
| 110 | 1.53 | 11.60 | 20.27 | 27.97 | 34.96 | 41.41 | 42.98 | 52.93 | 58.10 | 62.95 | 67.53 | 71.87 | 75.99 | 79.88 |
| | 0.87 | 9.82 | 17.85 | 24.95 | 31.31 | 37.10 | 42.46 | 47.52 | 52.33 | 56.95 | 61.40 | 65.68 | 69.79 | 73.73 |
| 120 | | 8.21 | 17.96 | 26.53 | 34.27 | 41.36 | 47.89 | 53.94 | 59.56 | 64.81 | 69.77 | 74.47 | 78.94 | 83.21 |
| | | 6.82 | 15.76 | 23.79 | 31.03 | 37.59 | 43.56 | 49.08 | 54.26 | 59.18 | 63.91 | 68.49 | 72.91 | 77.18 |
| 130 | | 4.21 | 14.94 | 24.58 | 33.20 | 40.92 | 47.93 | 54.42 | 60.48 | 66.18 | 71.58 | 76.70 | 81.57 | 86.18 |
| | | 3.40 | 13.65 | 23.05 | 31.41 | 38.84 | 45.49 | 51.55 | 57.17 | 62.45 | 67.43 | 72.17 | 76.69 | 81.04 |
| 140 | | | 12.05 | 22.97 | 32.49 | 40.88 | 48.38 | 55.22 | 61.58 | 67.61 | 73.32 | 78.72 | 83.93 | 88.93 |
| | | | 10.94 | 21.58 | 30.90 | 39.12 | 46.45 | 53.12 | 59.31 | 65.14 | 70.60 | 75.69 | 80.58 | 85.23 |
| 150 | | | 8.52 | 20.48 | 31.11 | 40.57 | 48.99 | 56.53 | 63.35 | 69.66 | 75.66 | 81.45 | 87.03 | 92.34 |
| | | | 7.52 | 19.12 | 29.50 | 38.72 | 46.92 | 54.25 | 60.90 | 67.08 | 72.97 | 78.63 | 84.06 | 89.20 |
| 160 | | | | 18.09 | 29.97 | 40.42 | 49.65 | 57.88 | 65.30 | 72.11 | 78.45 | 84.46 | 90.28 | 95.94 |
| | | | | 16.71 | 28.21 | 38.31 | 47.27 | 55.32 | 62.64 | 69.40 | 75.71 | 81.72 | 87.53 | 93.10 |
| 170 | | | | 15.80 | 28.89 | 40.24 | 50.15 | 58.92 | 66.84 | 74.11 | 80.89 | 87.29 | 93.43 | 99.40 |
| | | | | 14.46 | 32.49 | 37.93 | 47.56 | 56.18 | 64.01 | 71.24 | 78.00 | 84.42 | 90.64 | 96.71 |
| 180 | | | | 12.77 | 27.55 | 39.87 | 50.47 | 59.75 | 68.10 | 75.77 | 82.93 | 89.71 | 96.19 | 102.46 |
| | | | | 11.86 | 25.84 | 37.61 | 47.92 | 57.05 | 65.30 | 72.90 | 80.04 | 86.85 | 93.36 | 99.67 |
| 190 | | | | | 25.71 | 39.47 | 50.90 | 60.67 | 69.37 | 77.35 | 84.79 | 91.84 | 98.63 | 105.18 |
| | | | | | 24.47 | 37.65 | 48.65 | 58.19 | 66.79 | 74.70 | 82.13 | 89.26 | 96.19 | 102.85 |
| (mm) | | | | | | | | | | | | | | |

| r | θ 75 | 80 | 85 | 90 | 95 | 100 | 105 | 110 | 115 | 120 (deg) |
|---|---|---|---|---|---|---|---|---|---|---|
| 60 | 65.08 | 67.03 | 68.36 | 68.77 | | | | | | |
| | 56.44 | 59.17 | 62.04 | 65.28 | | | | | | |
| 70 | 67.45 | 68.37 | | | | | | | | |
| | 62.12 | 65.39 | | | | | | | | |
| 80 | 70.45 | 71.23 | | | | | | | | |
| | 66.04 | 69.34 | | | | | | | | |
| 90 | 74.45 | 75.81 | | | | | | | | |
| | 69.75 | 73.08 | | | | | | | | |
| 100 | 79.05 | 81.29 | 82.37 | | | | | | | |
| | 73.63 | 77.06 | 80.76 | | | | | | | |
| 110 | 83.43 | 86.43 | 88.61 | | | | | | | |
| | 77.51 | 81.20 | 84.94 | | | | | | | |
| 120 | 87.26 | 90.91 | 93.98 | 96.10 | | | | | | |
| | 81.29 | 85.24 | 89.13 | 93.13 | | | | | | |
| 130 | 90.57 | 94.73 | 98.50 | 101.66 | 103.78 | | | | | |

TABLE 105-continued

| EMBODIMENT 23 | | | | | | | | | | |
|---|---|---|---|---|---|---|---|---|---|---|
| | 85.24 | 89.31 | 93.28 | 97.25 | 101.43 | | | | | |
| 140 | 93.69 | 98.16 | 102.38 | 106.24 | 109.49 | 111.73 | | | | |
| | 89.59 | 93.69 | 97.65 | 101.54 | 105.45 | 109.69 | | | | |
| 150 | 97.30 | 101.99 | 106.43 | 110.50 | 114.26 | 117.46 | 119.81 | | | |
| | 93.99 | 98.53 | 102.71 | 106.43 | 110.04 | 113.73 | 117.76 | | | |
| 160 | 101.32 | 106.30 | 110.84 | 115.12 | 119.21 | 122.71 | 125.57 | 127.83 | | |
| | 98.34 | 103.14 | 107.51 | 111.67 | 115.66 | 118.96 | 122.08 | 125.61 | | |
| 170 | 105.20 | 110.61 | 115.51 | 119.86 | 123.76 | 127.49 | 130.92 | 133.83 | 135.84 | |
| | 102.46 | 107.73 | 112.49 | 116.69 | 120.44 | 124.06 | 127.46 | 130.52 | 133.40 | |
| 180 | 108.60 | 114.47 | 119.77 | 124.45 | 128.55 | 132.12 | 135.35 | 138.32 | 140.78 | 142.56 |
| | 105.89 | 111.77 | 116.98 | 121.56 | 125.56 | 129.01 | 132.18 | 135.20 | 137.92 | 140.43 |
| 190 | 111.50 | 117.64 | 123.37 | 128.38 | 132.69 | 136.43 | 139.62 | 142.30 | 144.62 | 146.38 |
| | 109.19 | 115.32 | 121.03 | 125.99 | 130.25 | 133.96 | 137.15 | 139.91 | 142.56 | 145.04 |
| (mm) | | | | | | | | | | |

DIAMETER D = 400
HEIGHT h = 147
EXPANSION ANGLE λ = 120
BOSS RATIO ν = 0.275

Embodiment 24

Propeller fan 1 having the diameter D=400 mm, the height in the axial direction (z direction) h=133 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 117 below, i.e. a three-dimensional curved surface specified by Table 106.

$$\left.\begin{array}{l} r_1 = a \times r + b \ \text{(mm)} \\ \theta_1 = c \times \theta + d \ \text{(deg)} \\ z_{1u} = e_u \times z_u + f_u \ \text{(mm)} \\ z_{1d} = e_d \times z_d + f_d \ \text{(mm)} \\ (a,\ c,\ e_u,\ e_d\text{: factor of proportionality, } b,\ d,\ f_u,\ f_d\text{: constant}) \\ \text{wherein} \\ a = \dfrac{D}{2} = \dfrac{400}{2} = 200 \\ b = 0 \\ c = \lambda = \dfrac{360}{n} = 120 \\ d = 0 \\ e_u = e_d = h = 133 \\ f_u = f_d = 0 \end{array}\right\} \quad (117)$$

TABLE 106

| EMBODIMENT 24 | | | | | | | | | | | | | | | |
|---|---|---|---|---|---|---|---|---|---|---|---|---|---|---|---|
| | θ | | | | | | | | | | | | | | |
| r | 5 | 10 | 15 | 20 | 25 | 30 | 35 | 40 | 45 | 50 | 55 | 60 | 65 | 70 | 75 |
| 60 | | | 25.29 | 28.60 | 31.71 | 34.77 | 37.80 | 40.79 | 43.71 | 46.54 | 49.28 | 51.92 | 54.43 | 56.77 | 58.88 |
| | | | 22.32 | 24.50 | 26.72 | 28.95 | 31.19 | 33.48 | 35.87 | 38.36 | 40.92 | 43.51 | 46.07 | 48.59 | 51.07 |
| 70 | | 19.47 | 23.89 | 27.90 | 31.71 | 35.37 | 38.88 | 42.23 | 45.44 | 48.53 | 51.50 | 54.34 | 56.99 | 59.28 | 61.03 |
| | | 16.80 | 19.99 | 23.11 | 26.19 | 29.26 | 32.35 | 35.48 | 38.62 | 41.74 | 44.81 | 47.77 | 50.63 | 53.42 | 56.20 |
| 80 | 11.61 | 17.52 | 22.59 | 27.28 | 31.69 | 35.89 | 39.86 | 43.60 | 47.16 | 50.57 | 53.82 | 56.88 | 59.68 | 62.03 | 63.74 |
| | 10.09 | 14.63 | 18.88 | 22.90 | 26.74 | 30.49 | 34.15 | 37.76 | 41.28 | 44.71 | 48.00 | 51.13 | 54.10 | 56.94 | 59.75 |
| 90 | 9.23 | 15.49 | 21.27 | 26.67 | 31.72 | 36.44 | 40.88 | 45.06 | 49.00 | 52.73 | 56.26 | 59.57 | 62.61 | 65.26 | 67.36 |
| | 7.30 | 13.02 | 18.22 | 23.04 | 27.54 | 31.79 | 35.86 | 39.79 | 43.60 | 47.27 | 50.78 | 54.10 | 57.23 | 60.20 | 63.11 |
| 100 | 5.52 | 13.11 | 19.89 | 26.06 | 31.75 | 37.03 | 41.95 | 46.55 | 50.87 | 54.93 | 58.76 | 62.38 | 65.76 | 68.86 | 71.52 |
| | 4.42 | 11.20 | 17.42 | 23.04 | 28.15 | 32.86 | 37.31 | 41.55 | 45.63 | 49.55 | 53.32 | 56.90 | 60.29 | 63.50 | 66.61 |

TABLE 106-continued

EMBODIMENT 24

| | | | | | | | | | | | | | | | |
|---|---|---|---|---|---|---|---|---|---|---|---|---|---|---|---|
| 110 | 1.38 | 10.50 | 18.34 | 25.30 | 31.63 | 37.46 | 38.88 | 47.89 | 52.57 | 56.96 | 61.10 | 65.02 | 68.75 | 72.27 | 75.48 |
| | 0.78 | 8.89 | 16.15 | 22.58 | 28.33 | 33.56 | 38.42 | 42.99 | 47.35 | 51.53 | 55.56 | 59.43 | 63.15 | 66.71 | 70.13 |
| 120 | | 7.43 | 16.25 | 24.00 | 31.00 | 37.42 | 43.33 | 48.80 | 53.89 | 58.64 | 63.12 | 67.37 | 71.43 | 75.29 | 78.95 |
| | | 6.17 | 14.26 | 21.52 | 28.08 | 34.01 | 39.41 | 44.41 | 49.09 | 53.54 | 57.83 | 61.96 | 65.97 | 69.83 | 73.54 |
| 130 | | 3.80 | 13.52 | 22.24 | 30.04 | 37.02 | 43.37 | 49.23 | 54.72 | 59.88 | 64.76 | 69.40 | 73.80 | 77.98 | 81.95 |
| | | 3.08 | 12.35 | 20.85 | 28.42 | 35.14 | 41.15 | 46.64 | 51.73 | 56.50 | 61.01 | 65.30 | 69.39 | 73.32 | 77.12 |
| 140 | | | 10.90 | 20.78 | 29.39 | 36.99 | 43.77 | 49.96 | 55.72 | 61.17 | 66.34 | 71.22 | 75.94 | 80.46 | 84.77 |
| | | | 9.89 | 19.53 | 27.96 | 35.39 | 42.02 | 48.06 | 53.66 | 58.93 | 63.87 | 68.48 | 72.91 | 77.11 | 81.05 |
| 150 | | | 7.71 | 18.53 | 28.14 | 36.70 | 44.33 | 51.15 | 57.32 | 63.03 | 68.45 | 73.69 | 78.74 | 83.55 | 88.04 |
| | | | 6.81 | 17.30 | 26.69 | 35.04 | 42.45 | 49.08 | 55.10 | 60.69 | 66.02 | 71.14 | 76.06 | 80.71 | 85.04 |
| 160 | | | | 16.37 | 27.11 | 36.57 | 44.92 | 52.37 | 59.08 | 65.24 | 70.98 | 76.41 | 81.68 | 86.80 | 91.67 |
| | | | | 15.12 | 25.52 | 34.66 | 42.77 | 50.05 | 56.68 | 62.79 | 68.50 | 73.94 | 79.19 | 84.23 | 88.97 |
| 170 | | | | 14.29 | 26.13 | 36.41 | 45.37 | 53.31 | 60.48 | 67.05 | 73.18 | 78.98 | 84.53 | 89.94 | 95.18 |
| | | | | 13.09 | 29.39 | 34.32 | 43.03 | 50.83 | 57.92 | 64.45 | 70.57 | 76.38 | 82.01 | 87.50 | 92.70 |
| 180 | | | | 11.56 | 24.93 | 36.07 | 45.66 | 54.06 | 61.61 | 68.55 | 75.03 | 81.16 | 87.03 | 92.70 | 98.26 |
| | | | | 10.73 | 23.38 | 34.03 | 43.35 | 51.62 | 59.08 | 65.96 | 72.42 | 78.58 | 84.47 | 90.18 | 95.81 |
| 190 | | | | | 23.26 | 35.71 | 46.05 | 54.89 | 62.76 | 69.98 | 76.72 | 83.10 | 89.24 | 95.17 | 100.88 |
| | | | | | 22.14 | 34.06 | 44.02 | 52.64 | 60.43 | 67.59 | 74.31 | 80.76 | 87.03 | 93.05 | 98.79 |
| (mm) | | | | | | | | | | | | | | | |

| | θ | | | | | | | | | |
|---|---|---|---|---|---|---|---|---|---|---|
| r | 80 | 85 | 90 | 95 | 100 | 105 | 110 | 115 | 120 | (deg) |
| 60 | 60.64 | 61.85 | 62.22 | | | | | | | |
| | 53.54 | 56.13 | 59.07 | | | | | | | |
| 70 | 61.86 | | | | | | | | | |
| | 59.17 | | | | | | | | | |
| 80 | 64.44 | | | | | | | | | |
| | 62.74 | | | | | | | | | |
| 90 | 68.59 | | | | | | | | | |
| | 66.12 | | | | | | | | | |
| 100 | 73.54 | 74.53 | | | | | | | | |
| | 69.72 | 73.07 | | | | | | | | |
| 110 | 78.20 | 80.17 | | | | | | | | |
| | 73.47 | 76.85 | | | | | | | | |
| 120 | 82.26 | 85.03 | 86.94 | | | | | | | |
| | 77.12 | 80.65 | 84.26 | | | | | | | |
| 130 | 85.70 | 89.12 | 91.98 | 93.90 | | | | | | |
| | 80.80 | 84.40 | 87.99 | 91.77 | | | | | | |
| 140 | 88.81 | 92.63 | 96.12 | 99.06 | 101.08 | | | | | |
| | 84.77 | 88.35 | 91.87 | 95.40 | 99.24 | | | | | |
| 150 | 92.27 | 96.29 | 99.98 | 103.38 | 106.28 | 108.40 | | | | |
| | 89.15 | 92.93 | 96.29 | 99.56 | 102.90 | 106.54 | | | | |
| 160 | 96.18 | 100.28 | 104.16 | 107.86 | 111.03 | 113.61 | 115.66 | | | |
| | 93.32 | 97.27 | 101.04 | 104.64 | 107.63 | 110.45 | 113.65 | | | |
| 170 | 100.07 | 104.51 | 108.45 | 111.97 | 115.35 | 118.45 | 121.09 | 122.90 | | |
| | 97.47 | 101.78 | 105.57 | 108.97 | 112.25 | 115.32 | 118.09 | 120.69 | | |
| 180 | 103.57 | 108.36 | 112.60 | 116.31 | 119.54 | 122.46 | 125.14 | 127.38 | 128.98 | |
| | 101.12 | 105.84 | 109.98 | 113.60 | 116.72 | 119.59 | 122.32 | 124.78 | 127.05 | |
| 190 | 106.43 | 111.62 | 116.15 | 120.05 | 123.44 | 126.33 | 128.75 | 130.84 | 132.44 | |
| | 104.34 | 109.51 | 114.00 | 117.85 | 121.20 | 124.09 | 126.58 | 128.98 | 131.23 | |
| (mm) | | | | | | | | | | |

DIAMETER D = 400
HEIGHT h = 133
EXPANSION ANGLE λ = 120
BOSS RATIO ν = 0.275

Embodiment 25

Propeller fan 1 having the diameter D=400 mm, the height in the axial direction (z direction) h=126 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 118 below, i.e. a three-dimensional curved surface specified by Table 107.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{D}{2} = \frac{400}{2} = 200\\
&b = 0\\
&c = \lambda = \frac{360}{n} = 120\\
&d = 0\\
&e_u = e_d = h = 126\\
&f_u = f_d = 0
\end{aligned}\right\} \quad (118)$$

TABLE 107

EMBODIMENT 25

| | θ | | | | | | | | | | | | | |
|---|---|---|---|---|---|---|---|---|---|---|---|---|---|---|
| r | 5 | 10 | 15 | 20 | 25 | 30 | 35 | 40 | 45 | 50 | 55 | 60 | 65 | 70 |
| 60 | | | 23.95 | 27.09 | 30.05 | 32.94 | 35.81 | 38.64 | 41.41 | 44.09 | 46.69 | 49.19 | 51.56 | 53.79 |
| | | | 21.14 | 23.21 | 25.32 | 27.43 | 29.55 | 31.72 | 33.98 | 36.34 | 38.76 | 41.22 | 43.65 | 46.03 |
| 70 | | 18.45 | 22.64 | 26.43 | 30.04 | 33.51 | 36.84 | 40.01 | 43.05 | 45.98 | 48.79 | 51.48 | 53.99 | 56.16 |
| | | 15.91 | 18.94 | 21.90 | 24.81 | 27.72 | 30.65 | 33.61 | 36.59 | 39.55 | 42.45 | 45.26 | 47.97 | 50.60 |
| 80 | 11.00 | 16.59 | 21.40 | 25.84 | 30.03 | 34.01 | 37.76 | 41.31 | 44.68 | 47.91 | 50.98 | 53.89 | 56.54 | 58.76 |
| | 9.56 | 13.86 | 17.89 | 21.69 | 25.34 | 28.88 | 32.36 | 35.77 | 39.11 | 42.36 | 45.48 | 48.44 | 51.25 | 53.94 |
| 90 | 8.74 | 14.67 | 20.15 | 25.27 | 30.05 | 34.53 | 38.73 | 42.68 | 46.42 | 49.95 | 53.30 | 56.43 | 59.32 | 61.83 |
| | 6.92 | 12.33 | 17.26 | 21.83 | 26.09 | 30.11 | 33.97 | 37.70 | 41.31 | 44.78 | 48.11 | 51.26 | 54.21 | 57.03 |
| 100 | 5.23 | 12.42 | 18.85 | 24.69 | 30.08 | 35.08 | 39.74 | 44.10 | 48.19 | 52.04 | 55.67 | 59.10 | 62.30 | 65.23 |
| | 4.19 | 10.61 | 16.50 | 21.83 | 26.67 | 31.13 | 35.34 | 39.36 | 43.22 | 46.95 | 50.51 | 53.91 | 57.12 | 60.16 |
| 110 | 1.31 | 9.95 | 17.37 | 23.97 | 29.97 | 35.49 | 36.84 | 45.37 | 49.80 | 53.96 | 57.88 | 61.60 | 65.13 | 68.47 |
| | 0.74 | 8.42 | 15.30 | 21.39 | 26.84 | 31.80 | 36.40 | 40.73 | 44.86 | 48.82 | 52.63 | 56.30 | 59.82 | 63.20 |
| 120 | | 7.04 | 15.40 | 22.74 | 29.37 | 35.45 | 41.05 | 46.23 | 51.05 | 55.56 | 59.80 | 63.83 | 67.67 | 71.33 |
| | | 5.85 | 13.51 | 20.39 | 26.60 | 32.22 | 37.34 | 42.07 | 46.50 | 50.73 | 54.78 | 58.70 | 62.49 | 66.15 |
| 130 | | 3.60 | 12.80 | 21.07 | 28.46 | 35.07 | 41.09 | 46.64 | 51.84 | 56.73 | 61.35 | 65.75 | 69.91 | 73.87 |
| | | 2.92 | 11.70 | 19.76 | 26.92 | 33.29 | 38.99 | 44.18 | 49.01 | 53.53 | 57.80 | 61.86 | 65.74 | 69.46 |
| 140 | | | 10.33 | 19.69 | 27.85 | 35.04 | 41.47 | 47.33 | 52.78 | 57.95 | 62.85 | 67.47 | 71.94 | 76.23 |
| | | | 9.37 | 18.50 | 26.49 | 33.53 | 39.81 | 45.53 | 50.84 | 55.83 | 60.51 | 64.88 | 69.07 | 73.05 |
| 150 | | | 7.30 | 17.56 | 26.66 | 34.77 | 41.99 | 48.45 | 54.30 | 59.71 | 64.85 | 69.81 | 74.59 | 79.15 |
| | | | 6.45 | 16.39 | 25.29 | 33.19 | 40.21 | 46.50 | 52.20 | 57.50 | 62.54 | 67.39 | 72.05 | 76.46 |
| 160 | | | | 15.51 | 25.69 | 34.64 | 42.56 | 49.61 | 55.98 | 61.81 | 67.24 | 72.39 | 77.38 | 82.23 |
| | | | | 14.33 | 24.18 | 32.84 | 40.52 | 47.41 | 53.69 | 59.49 | 64.90 | 70.05 | 75.02 | 79.80 |
| 170 | | | | 13.54 | 24.76 | 34.49 | 42.99 | 50.50 | 57.29 | 63.52 | 69.33 | 74.82 | 80.09 | 85.20 |
| | | | | 12.40 | 27.85 | 32.51 | 40.76 | 48.16 | 54.87 | 61.06 | 66.86 | 72.36 | 77.69 | 82.90 |
| 180 | | | | 10.95 | 23.62 | 34.17 | 43.26 | 51.21 | 58.37 | 64.94 | 71.08 | 76.89 | 82.45 | 87.82 |
| | | | | 10.17 | 22.15 | 32.24 | 41.07 | 48.90 | 55.97 | 62.49 | 68.61 | 74.44 | 80.02 | 85.43 |
| 190 | | | | | 22.04 | 33.83 | 43.62 | 52.00 | 59.46 | 66.30 | 72.68 | 78.72 | 84.54 | 90.16 |
| | | | | | 20.97 | 32.27 | 41.70 | 49.87 | 57.25 | 64.03 | 70.39 | 76.51 | 82.45 | 88.15 |
| (mm) | | | | | | | | | | | | | | |

| | θ | | | | | | | | | |
|---|---|---|---|---|---|---|---|---|---|---|
| r | 75 | 80 | 85 | 90 | 95 | 100 | 105 | 110 | 115 | 120 | (deg) |
| 60 | 55.78 | 57.45 | 58.59 | 58.94 | | | | | | | |
| | 48.38 | 50.72 | 53.18 | 55.96 | | | | | | | |
| 70 | 57.81 | 58.60 | | | | | | | | | |
| | 53.24 | 56.05 | | | | | | | | | |
| 80 | 60.38 | 61.05 | | | | | | | | | |
| | 56.61 | 59.44 | | | | | | | | | |
| 90 | 63.82 | 64.98 | | | | | | | | | |
| | 59.79 | 62.64 | | | | | | | | | |
| 100 | 67.75 | 69.67 | 70.60 | | | | | | | | |
| | 63.11 | 66.05 | 69.22 | | | | | | | | |
| 110 | 71.51 | 74.08 | 75.95 | | | | | | | | |
| | 66.44 | 69.60 | 72.81 | | | | | | | | |
| 120 | 74.79 | 77.93 | 80.55 | 82.37 | | | | | | | |
| | 69.67 | 73.06 | 76.40 | 79.83 | | | | | | | |

TABLE 107-continued

| EMBODIMENT 25 | | | | | | | | | | |
|---|---|---|---|---|---|---|---|---|---|---|
| 130 | 77.63 | 81.19 | 84.43 | 87.14 | 88.96 | | | | | |
| | 73.06 | 76.55 | 79.96 | 83.35 | 86.94 | | | | | |
| 140 | 80.30 | 84.14 | 87.76 | 91.07 | 93.85 | 95.76 | | | | |
| | 76.79 | 80.31 | 83.70 | 87.04 | 90.38 | 94.02 | | | | |
| 150 | 83.40 | 87.42 | 91.22 | 94.72 | 97.94 | 100.68 | 102.69 | | | |
| | 80.56 | 84.46 | 88.04 | 91.22 | 94.32 | 97.48 | 100.94 | | | |
| 160 | 86.85 | 91.12 | 95.00 | 98.67 | 102.18 | 105.18 | 107.63 | 109.57 | | |
| | 84.29 | 88.41 | 92.15 | 95.72 | 99.14 | 101.96 | 104.64 | 107.67 | | |
| 170 | 90.17 | 94.81 | 99.01 | 102.74 | 106.08 | 109.28 | 112.22 | 114.71 | 116.43 | |
| | 87.82 | 92.34 | 96.42 | 100.02 | 103.23 | 106.34 | 109.25 | 111.88 | 114.34 | |
| 180 | 93.09 | 98.12 | 102.66 | 106.67 | 110.19 | 113.25 | 116.01 | 118.56 | 120.67 | 122.19 |
| | 90.77 | 95.80 | 100.27 | 104.20 | 107.62 | 110.58 | 113.29 | 115.89 | 118.22 | 120.37 |
| 190 | 95.57 | 100.83 | 105.75 | 110.04 | 113.73 | 116.94 | 119.68 | 121.97 | 123.96 | 125.47 |
| | 93.59 | 98.85 | 103.74 | 108.00 | 111.64 | 114.82 | 117.55 | 119.92 | 122.20 | 124.32 |
| (mm) | | | | | | | | | | |

DIAMETER D = 400
HEIGHT h = 126
EXPANSION ANGLE λ = 120
BOSS RATIO ν = 0.275

Embodiment 26

Propeller fan 1 having the diameter D=400 mm, the height in the axial direction (z direction) h=112 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 119 below, i.e. a three-dimensional curved surface specified by Table 108.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = \frac{D}{2} = \frac{400}{2} = 200\\
&b = 0\\
&c = \lambda = \frac{360}{n} = 120\\
&d = 0\\
&e_u = e_d = h = 112\\
&f_u = f_d = 0
\end{aligned}\right\} \quad (119)$$

TABLE 108

| EMBODIMENT 26 | | | | | | | | | | | | | | |
|---|---|---|---|---|---|---|---|---|---|---|---|---|---|---|
| | θ | | | | | | | | | | | | | |
| r | 5 | 10 | 15 | 20 | 25 | 30 | 35 | 40 | 45 | 50 | 55 | 60 | 65 | 70 |
| 60 | | | 21.29 | 24.08 | 26.71 | 29.28 | 31.83 | 34.35 | 36.81 | 39.19 | 41.50 | 43.72 | 45.83 | 47.81 |
| | | | 18.79 | 20.63 | 22.50 | 24.38 | 26.26 | 28.19 | 30.20 | 32.30 | 34.46 | 36.64 | 38.80 | 40.92 |
| 70 | | 16.40 | 20.12 | 23.50 | 26.70 | 29.78 | 32.74 | 35.57 | 38.27 | 40.87 | 43.37 | 45.76 | 47.99 | 49.92 |
| | | 14.14 | 16.83 | 19.47 | 22.05 | 24.64 | 27.24 | 29.88 | 32.53 | 35.15 | 37.73 | 40.23 | 42.64 | 44.98 |
| 80 | 9.78 | 14.75 | 19.02 | 22.97 | 26.69 | 30.23 | 33.56 | 36.72 | 39.72 | 42.58 | 45.32 | 47.90 | 50.25 | 52.23 |
| | 8.50 | 12.32 | 15.90 | 19.28 | 22.52 | 25.67 | 28.76 | 31.80 | 34.77 | 37.65 | 40.42 | 43.06 | 45.55 | 47.95 |
| 90 | 7.77 | 13.04 | 17.91 | 22.46 | 26.71 | 30.69 | 34.43 | 37.94 | 41.26 | 44.40 | 47.37 | 50.16 | 52.73 | 54.96 |
| | 6.15 | 10.96 | 15.34 | 19.40 | 23.19 | 26.77 | 30.20 | 33.51 | 36.72 | 39.81 | 42.76 | 45.56 | 48.19 | 50.70 |

TABLE 108-continued

| EMBODIMENT 26 | | | | | | | | | | | | | | |
|---|---|---|---|---|---|---|---|---|---|---|---|---|---|---|
| 100 | 4.65 | 11.04 | 16.75 | 21.95 | 26.74 | 31.18 | 35.33 | 39.20 | 42.83 | 46.25 | 49.48 | 52.53 | 55.38 | 57.98 |
| | 3.72 | 9.43 | 14.67 | 19.41 | 23.70 | 27.67 | 31.42 | 34.99 | 38.42 | 41.73 | 44.90 | 47.92 | 50.77 | 53.48 |
| 110 | 1.16 | 8.84 | 15.44 | 21.31 | 26.64 | 31.55 | 32.74 | 40.33 | 44.27 | 47.96 | 51.45 | 54.76 | 57.90 | 60.86 |
| | 0.66 | 7.49 | 13.60 | 19.01 | 23.86 | 28.26 | 32.35 | 36.20 | 39.87 | 43.39 | 46.78 | 50.05 | 53.18 | 56.18 |
| 120 | | 6.26 | 13.69 | 20.21 | 26.11 | 31.51 | 36.49 | 41.09 | 45.38 | 49.38 | 53.15 | 56.74 | 60.15 | 63.40 |
| | | 5.20 | 12.01 | 18.12 | 23.64 | 28.64 | 33.19 | 37.39 | 41.34 | 45.09 | 48.70 | 52.18 | 55.55 | 58.80 |
| 130 | | 3.20 | 11.38 | 18.73 | 25.29 | 31.17 | 36.52 | 41.46 | 46.08 | 50.42 | 54.54 | 58.44 | 62.15 | 65.66 |
| | | 2.59 | 10.40 | 17.56 | 23.93 | 29.59 | 34.66 | 39.27 | 43.56 | 47.58 | 51.38 | 54.99 | 58.43 | 61.75 |
| 140 | | | 9.18 | 17.50 | 24.75 | 31.15 | 36.86 | 42.07 | 46.92 | 51.51 | 55.86 | 59.98 | 63.95 | 67.76 |
| | | | 8.33 | 16.44 | 23.55 | 29.80 | 35.39 | 40.47 | 45.19 | 49.63 | 53.79 | 57.67 | 61.39 | 64.93 |
| 150 | | | 6.49 | 15.61 | 23.70 | 30.91 | 37.33 | 43.07 | 48.27 | 53.08 | 57.64 | 62.05 | 66.31 | 70.35 |
| | | | 5.73 | 14.57 | 22.48 | 29.50 | 35.75 | 41.33 | 46.40 | 51.11 | 55.59 | 59.91 | 64.05 | 67.96 |
| 160 | | | | 13.78 | 22.83 | 30.79 | 37.83 | 44.10 | 49.76 | 54.94 | 59.77 | 64.35 | 68.78 | 73.09 |
| | | | | 12.73 | 21.49 | 29.19 | 36.02 | 42.15 | 47.73 | 52.88 | 57.69 | 62.27 | 66.69 | 70.93 |
| 170 | | | | 12.04 | 22.01 | 30.66 | 38.21 | 44.89 | 50.93 | 56.47 | 61.63 | 66.51 | 71.19 | 75.74 |
| | | | | 11.02 | 24.75 | 28.90 | 36.24 | 42.80 | 48.77 | 54.28 | 59.43 | 64.32 | 69.06 | 73.69 |
| 180 | | | | 9.73 | 20.99 | 30.38 | 38.45 | 45.52 | 51.88 | 57.73 | 63.19 | 68.35 | 73.29 | 78.06 |
| | | | | 9.04 | 19.69 | 28.65 | 36.51 | 43.47 | 49.75 | 55.54 | 60.99 | 66.17 | 71.13 | 75.94 |
| 190 | | | | | 19.59 | 30.07 | 38.78 | 46.23 | 52.85 | 58.93 | 64.61 | 69.98 | 75.15 | 80.14 |
| | | | | | 18.64 | 28.68 | 37.07 | 44.33 | 50.88 | 56.91 | 62.57 | 68.01 | 73.29 | 78.36 |
| (mm) | | | | | | | | | | | | | | |

| | θ | | | | | | | | | |
|---|---|---|---|---|---|---|---|---|---|---|
| r | 75 | 80 | 85 | 90 | 95 | 100 | 105 | 110 | 115 | 120 (deg) |
| 60 | 49.58 | 51.07 | 52.08 | 52.40 | | | | | | |
| | 43.00 | 45.09 | 47.27 | 49.74 | | | | | | |
| 70 | 51.39 | 52.09 | | | | | | | | |
| | 47.33 | 49.82 | | | | | | | | |
| 80 | 53.67 | 54.27 | | | | | | | | |
| | 50.32 | 52.83 | | | | | | | | |
| 90 | 56.73 | 57.76 | | | | | | | | |
| | 53.14 | 55.68 | | | | | | | | |
| 100 | 60.22 | 61.93 | 62.76 | | | | | | | |
| | 56.10 | 58.71 | 61.53 | | | | | | | |
| 110 | 63.56 | 65.85 | 67.51 | | | | | | | |
| | 59.06 | 61.87 | 64.72 | | | | | | | |
| 120 | 66.48 | 69.27 | 71.60 | 73.22 | | | | | | |
| | 61.93 | 64.95 | 67.91 | 70.96 | | | | | | |
| 130 | 69.01 | 72.17 | 75.05 | 77.45 | 79.07 | | | | | |
| | 64.95 | 68.05 | 71.07 | 74.09 | 77.28 | | | | | |
| 140 | 71.38 | 74.79 | 78.00 | 80.95 | 83.42 | 85.12 | | | | |
| | 68.26 | 71.38 | 74.40 | 77.37 | 80.34 | 83.57 | | | | |
| 150 | 74.14 | 77.70 | 81.09 | 84.19 | 87.05 | 89.50 | 91.28 | | | |
| | 71.61 | 75.07 | 78.26 | 81.09 | 83.84 | 86.65 | 89.72 | | | |
| 160 | 77.20 | 80.99 | 84.45 | 87.71 | 90.83 | 93.50 | 95.67 | 97.40 | | |
| | 74.93 | 78.59 | 81.91 | 85.08 | 88.12 | 90.63 | 93.01 | 95.71 | | |
| 170 | 80.15 | 84.27 | 88.01 | 91.32 | 94.29 | 97.13 | 99.75 | 101.97 | 103.49 | |
| | 78.06 | 82.08 | 85.71 | 88.90 | 91.76 | 94.52 | 97.11 | 99.45 | 101.64 | |
| 180 | 82.74 | 87.22 | 91.25 | 94.82 | 97.94 | 100.66 | 103.12 | 105.38 | 107.26 | 108.62 |
| | 80.68 | 85.16 | 89.13 | 92.62 | 95.66 | 98.29 | 100.71 | 103.01 | 105.08 | 106.99 |
| 190 | 84.95 | 89.63 | 94.00 | 97.81 | 101.10 | 103.95 | 106.38 | 108.42 | 110.18 | 111.53 |
| | 83.19 | 87.86 | 92.22 | 96.00 | 99.24 | 102.06 | 104.49 | 106.60 | 108.62 | 110.51 |
| (mm) | | | | | | | | | | |

DIAMETER D = 400
HEIGHT h = 112
EXPANSION ANGLE λ = 120
BOSS RATIO ν = 0.275

Embodiment 27

Propeller fan 1 having the diameter D=400 mm, the height in the axial direction (z direction) h=126 mm, the number of blades n=3, the expansion angle of a blade λ=108 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 120 below, i.e. a three-dimensional curved surface specified by Table 109.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{D}{2} = \frac{400}{2} = 200\\
&b = 0\\
&c = \frac{2400}{7} \times \frac{h}{D} = \frac{2400}{7} \times \frac{126}{400} = 108\\
&d = 0\\
&e_u = e_d = h = 126\\
&f_u = f_d = 0
\end{aligned}\right\} \quad (120)$$

TABLE 109

EMBODIMENT 27

| r | θ 4.5 | 9 | 13.5 | 18 | 22.5 | 27 | 31.5 | 36 | 40.5 | 45 | 49.5 | 54 | 58.5 | 63 |
|---|---|---|---|---|---|---|---|---|---|---|---|---|---|---|
| 60 | | | 23.95 | 27.09 | 30.05 | 32.94 | 35.81 | 38.64 | 41.41 | 44.09 | 46.69 | 49.19 | 51.56 | 53.79 |
| | | | 21.14 | 23.21 | 25.32 | 27.43 | 29.55 | 31.72 | 33.98 | 36.34 | 38.76 | 41.22 | 43.65 | 46.03 |
| 70 | | 18.45 | 22.64 | 26.43 | 30.04 | 33.51 | 36.84 | 40.01 | 43.05 | 45.98 | 48.79 | 51.48 | 53.99 | 56.16 |
| | | 15.91 | 18.94 | 21.90 | 24.81 | 27.72 | 30.65 | 33.61 | 36.59 | 39.55 | 42.45 | 45.26 | 47.97 | 50.60 |
| 80 | 11.00 | 16.59 | 21.40 | 25.84 | 30.03 | 34.01 | 37.76 | 41.31 | 44.68 | 47.91 | 50.98 | 53.89 | 56.54 | 58.76 |
| | 9.56 | 13.86 | 17.89 | 21.69 | 25.34 | 28.88 | 32.36 | 35.77 | 39.11 | 42.36 | 45.48 | 48.44 | 51.25 | 53.94 |
| 90 | 8.74 | 14.67 | 20.15 | 25.27 | 30.05 | 34.53 | 38.73 | 42.68 | 46.42 | 49.95 | 53.30 | 56.43 | 59.32 | 61.83 |
| | 6.92 | 12.33 | 17.26 | 21.83 | 26.09 | 30.11 | 33.97 | 37.70 | 41.31 | 44.78 | 48.11 | 51.26 | 54.21 | 57.03 |
| 100 | 5.23 | 12.42 | 18.85 | 24.69 | 30.08 | 35.08 | 39.74 | 44.10 | 48.19 | 52.04 | 55.67 | 59.10 | 62.30 | 65.23 |
| | 4.19 | 10.61 | 16.50 | 21.83 | 26.67 | 31.13 | 35.34 | 39.36 | 43.22 | 46.95 | 50.51 | 53.91 | 57.12 | 60.16 |
| 110 | 1.31 | 9.95 | 17.37 | 23.97 | 29.97 | 35.49 | 36.84 | 45.37 | 49.80 | 53.96 | 57.88 | 61.60 | 65.13 | 68.47 |
| | 0.74 | 8.42 | 15.30 | 21.39 | 26.84 | 31.80 | 36.40 | 40.73 | 44.86 | 48.82 | 52.63 | 56.30 | 59.82 | 63.20 |
| 120 | | 7.04 | 15.40 | 22.74 | 29.37 | 35.45 | 41.05 | 46.23 | 51.05 | 55.56 | 59.80 | 63.83 | 67.67 | 71.33 |
| | | 5.85 | 13.51 | 20.39 | 26.60 | 32.22 | 37.34 | 42.07 | 46.50 | 50.73 | 54.78 | 58.70 | 62.49 | 66.15 |
| 130 | | 3.60 | 12.80 | 21.07 | 28.46 | 35.07 | 41.09 | 46.64 | 51.84 | 56.73 | 61.35 | 65.75 | 69.91 | 73.87 |
| | | 2.92 | 11.70 | 19.76 | 26.92 | 33.29 | 38.99 | 44.18 | 49.01 | 53.53 | 57.80 | 61.86 | 65.74 | 69.46 |
| 140 | | | 10.33 | 19.69 | 27.85 | 35.04 | 41.47 | 47.33 | 52.78 | 57.95 | 62.85 | 67.47 | 71.94 | 76.23 |
| | | | 9.37 | 18.50 | 26.49 | 33.53 | 39.81 | 45.53 | 50.84 | 55.83 | 60.51 | 64.88 | 69.07 | 73.05 |
| 150 | | | 7.30 | 17.56 | 26.66 | 34.77 | 41.99 | 48.45 | 54.30 | 59.71 | 64.85 | 69.81 | 74.59 | 79.15 |
| | | | 6.45 | 16.39 | 25.29 | 33.19 | 40.21 | 46.50 | 52.20 | 57.50 | 62.54 | 67.39 | 72.05 | 76.46 |
| 160 | | | | 15.51 | 25.69 | 34.64 | 42.56 | 49.61 | 55.98 | 61.81 | 67.24 | 72.39 | 77.38 | 82.23 |
| | | | | 14.33 | 24.18 | 32.84 | 40.52 | 47.41 | 53.69 | 59.49 | 64.90 | 70.05 | 75.02 | 79.80 |
| 170 | | | | 13.54 | 24.76 | 34.49 | 42.99 | 50.50 | 57.29 | 63.52 | 69.33 | 74.82 | 80.09 | 85.20 |
| | | | | 12.40 | 27.85 | 32.51 | 40.76 | 48.16 | 54.87 | 61.06 | 66.86 | 72.36 | 77.69 | 82.90 |
| 180 | | | | 10.95 | 23.62 | 34.17 | 43.26 | 51.21 | 58.37 | 64.94 | 71.08 | 76.89 | 82.45 | 87.82 |
| | | | | 10.17 | 22.15 | 32.24 | 41.07 | 48.90 | 55.97 | 62.49 | 68.61 | 74.44 | 80.02 | 85.43 |
| 190 | | | | | 22.04 | 33.83 | 43.62 | 52.00 | 59.46 | 66.30 | 72.68 | 78.72 | 84.54 | 90.16 |
| | | | | | 20.97 | 32.27 | 41.70 | 49.87 | 57.25 | 64.03 | 70.39 | 76.51 | 82.45 | 88.15 |
| (mm) | | | | | | | | | | | | | | |

| r | θ 67.5 | 72 | 76.5 | 81 | 85.5 | 90 | 94.5 | 99 | 103.5 | 108 | (deg) |
|---|---|---|---|---|---|---|---|---|---|---|---|
| 60 | 55.78 | 57.45 | 58.59 | 58.94 | | | | | | | |
| | 48.38 | 50.72 | 53.18 | 55.96 | | | | | | | |
| 70 | 57.81 | 58.60 | | | | | | | | | |
| | 53.24 | 56.05 | | | | | | | | | |
| 80 | 60.38 | 61.05 | | | | | | | | | |
| | 56.61 | 59.44 | | | | | | | | | |
| 90 | 63.82 | 64.98 | | | | | | | | | |
| | 59.79 | 62.64 | | | | | | | | | |
| 100 | 67.75 | 69.67 | 70.60 | | | | | | | | |
| | 63.11 | 66.05 | 69.22 | | | | | | | | |
| 110 | 71.51 | 74.08 | 75.95 | | | | | | | | |
| | 66.44 | 69.60 | 72.81 | | | | | | | | |
| 120 | 74.79 | 77.93 | 80.55 | 82.37 | | | | | | | |
| | 69.67 | 73.06 | 76.40 | 79.83 | | | | | | | |

TABLE 109-continued

| EMBODIMENT 27 | | | | | | | | | | |
|---|---|---|---|---|---|---|---|---|---|---|
| 130 | 77.63 | 81.19 | 84.43 | 87.14 | 88.96 | | | | | |
| | 73.06 | 76.55 | 79.96 | 83.35 | 86.94 | | | | | |
| 140 | 80.30 | 84.14 | 87.76 | 91.07 | 93.85 | 95.76 | | | | |
| | 76.79 | 80.31 | 83.70 | 87.04 | 90.38 | 94.02 | | | | |
| 150 | 83.40 | 87.42 | 91.22 | 94.72 | 97.94 | 100.68 | 102.69 | | | |
| | 80.56 | 84.46 | 88.04 | 91.22 | 94.32 | 97.48 | 100.94 | | | |
| 160 | 86.85 | 91.12 | 95.00 | 98.67 | 102.18 | 105.18 | 107.63 | 109.57 | | |
| | 84.29 | 88.41 | 92.15 | 95.72 | 99.14 | 101.96 | 104.64 | 107.67 | | |
| 170 | 90.17 | 94.81 | 99.01 | 102.74 | 106.08 | 109.28 | 112.22 | 114.71 | 116.43 | |
| | 87.82 | 92.34 | 96.42 | 100.02 | 103.23 | 106.34 | 109.25 | 111.88 | 114.34 | |
| 180 | 93.09 | 98.12 | 102.66 | 106.67 | 110.19 | 113.25 | 116.01 | 118.56 | 120.67 | 122.19 |
| | 90.77 | 95.80 | 100.27 | 104.20 | 107.62 | 110.58 | 113.29 | 115.89 | 118.22 | 120.37 |
| 190 | 95.57 | 100.83 | 105.75 | 110.04 | 113.73 | 116.94 | 119.68 | 121.97 | 123.96 | 125.47 |
| | 93.59 | 98.85 | 103.74 | 108.00 | 111.64 | 114.82 | 117.55 | 119.92 | 122.20 | 124.32 |
| (mm) | | | | | | | | | | |

DIAMETER D = 400
HEIGHT h = 126
EXPANSION ANGLE λ = 108
BOSS RATIO ν = 0.275

Embodiment 28

Propeller fan 1 having the diameter D=400 mm, the height in the axial direction (z direction) h=140 mm, the number of blades n=3, the expansion angle of a blade λ=90 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 121 below, i.e. a three-dimensional curved surface specified by Table 110.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = \frac{D}{2} = \frac{400}{2} = 200 \\ b = 0 \\ c = \lambda = 90 \\ d = 0 \\ e_u = e_d = h = 140 \\ f_u = f_d = 0 \end{array}\right\} \quad (121)$$

TABLE 110

| EMBODIMENT 28 | | | | | | | | | | | | | | |
|---|---|---|---|---|---|---|---|---|---|---|---|---|---|---|
| | θ | | | | | | | | | | | | | |
| r | 3.75 | 7.5 | 11.25 | 15 | 18.75 | 22.5 | 26.25 | 30 | 33.75 | 37.5 | 41.25 | 45 | 48.75 | 52.5 |
| 60 | | | 26.62 | 30.10 | 33.38 | 36.60 | 39.79 | 42.94 | 46.01 | 48.99 | 51.88 | 54.65 | 57.29 | 59.76 |
| | | | 23.49 | 25.79 | 28.13 | 30.48 | 32.83 | 35.24 | 37.75 | 40.38 | 43.07 | 45.80 | 48.50 | 51.15 |
| 70 | | 20.50 | 25.15 | 29.37 | 33.38 | 37.23 | 40.93 | 44.46 | 47.83 | 51.09 | 54.22 | 57.20 | 59.99 | 62.41 |
| | | 17.68 | 21.04 | 24.33 | 27.57 | 30.80 | 34.05 | 37.35 | 40.66 | 43.94 | 47.17 | 50.29 | 53.30 | 56.23 |
| 80 | 12.22 | 18.44 | 23.78 | 28.72 | 33.36 | 37.78 | 41.95 | 45.90 | 49.64 | 53.23 | 56.65 | 59.87 | 62.82 | 65.29 |
| | 10.63 | 15.40 | 19.87 | 24.10 | 28.15 | 32.09 | 35.95 | 39.74 | 43.46 | 47.06 | 50.53 | 53.82 | 56.94 | 59.93 |
| 90 | 9.71 | 16.30 | 22.39 | 28.07 | 33.39 | 38.36 | 43.03 | 47.43 | 51.58 | 55.50 | 59.22 | 62.70 | 65.91 | 68.70 |
| | 7.69 | 13.70 | 19.17 | 24.25 | 28.98 | 33.46 | 37.75 | 41.89 | 45.89 | 49.76 | 53.46 | 56.95 | 60.24 | 63.37 |
| 100 | 5.81 | 13.80 | 20.94 | 27.43 | 33.42 | 38.98 | 44.16 | 49.00 | 53.54 | 57.82 | 61.86 | 65.66 | 69.23 | 72.48 |
| | 4.65 | 11.79 | 18.34 | 24.26 | 29.63 | 34.59 | 39.27 | 43.73 | 48.03 | 52.16 | 56.13 | 59.90 | 63.46 | 66.85 |

TABLE 110-continued

EMBODIMENT 28

| | | | | | | | | | | | | | | |
|---|---|---|---|---|---|---|---|---|---|---|---|---|---|---|
| 110 | 1.45 | 11.05 | 19.30 | 26.63 | 33.30 | 39.44 | 40.93 | 50.41 | 55.34 | 59.95 | 64.31 | 68.45 | 72.37 | 76.07 |
| | 0.83 | 9.36 | 17.00 | 23.77 | 29.82 | 35.33 | 40.44 | 45.26 | 49.84 | 54.24 | 58.48 | 62.56 | 66.47 | 70.22 |
| 120 | | 7.82 | 17.11 | 25.26 | 32.64 | 39.39 | 45.61 | 51.37 | 56.72 | 61.73 | 66.44 | 70.92 | 75.18 | 79.25 |
| | | 6.50 | 15.01 | 22.66 | 29.55 | 35.80 | 41.49 | 46.74 | 51.67 | 56.36 | 60.87 | 65.22 | 69.44 | 73.51 |
| 130 | | 4.01 | 14.23 | 23.41 | 31.62 | 38.97 | 45.65 | 51.83 | 57.60 | 63.03 | 68.17 | 73.05 | 77.68 | 82.08 |
| | | 3.24 | 13.00 | 21.95 | 29.92 | 36.99 | 43.32 | 49.09 | 54.45 | 59.48 | 64.22 | 68.73 | 73.04 | 77.18 |
| 140 | | | 11.48 | 21.88 | 30.94 | 38.94 | 46.08 | 52.59 | 58.65 | 64.39 | 69.83 | 74.97 | 79.93 | 84.70 |
| | | | 10.41 | 20.56 | 29.43 | 37.25 | 44.23 | 50.59 | 56.49 | 62.04 | 67.24 | 72.09 | 76.74 | 81.17 |
| 150 | | | 8.11 | 19.51 | 29.62 | 38.63 | 46.66 | 53.84 | 60.34 | 66.35 | 72.06 | 77.57 | 82.88 | 87.94 |
| | | | 7.16 | 18.21 | 28.10 | 36.88 | 44.68 | 51.66 | 58.00 | 63.89 | 69.49 | 74.88 | 80.06 | 84.95 |
| 160 | | | | 17.23 | 28.54 | 38.49 | 47.29 | 55.12 | 62.19 | 68.67 | 74.71 | 80.44 | 85.98 | 91.37 |
| | | | | 15.92 | 26.87 | 36.49 | 45.02 | 52.68 | 59.66 | 66.10 | 72.11 | 77.83 | 83.36 | 88.66 |
| 170 | | | | 15.05 | 27.51 | 38.32 | 47.76 | 56.12 | 63.66 | 70.58 | 77.03 | 83.14 | 88.98 | 94.67 |
| | | | | 13.77 | 30.94 | 36.12 | 45.29 | 53.51 | 60.96 | 67.84 | 74.29 | 80.40 | 86.33 | 92.11 |
| 180 | | | | 12.17 | 26.24 | 37.97 | 48.07 | 56.91 | 64.85 | 72.16 | 78.98 | 85.44 | 91.61 | 97.58 |
| | | | | 11.29 | 24.61 | 35.82 | 45.63 | 54.34 | 62.19 | 69.43 | 76.23 | 82.71 | 88.91 | 94.92 |
| 190 | | | | | 24.49 | 37.59 | 48.47 | 57.78 | 66.06 | 73.67 | 80.76 | 87.47 | 93.94 | 100.17 |
| | | | | | 23.30 | 35.85 | 46.33 | 55.41 | 63.61 | 71.14 | 78.22 | 85.01 | 91.61 | 97.95 |
| (mm) | | | | | | | | | | | | | | |

| | θ | | | | | | | | | | |
|---|---|---|---|---|---|---|---|---|---|---|---|
| r | 56.25 | 60 | 63.75 | 67.5 | 71.25 | 75 | 78.75 | 82.5 | 86.25 | 90 | (deg) |
| 60 | 61.98 | 63.83 | 65.10 | 65.49 | | | | | | | |
| | 53.76 | 56.36 | 59.08 | 62.17 | | | | | | | |
| 70 | 64.24 | 65.12 | | | | | | | | | |
| | 59.16 | 62.28 | | | | | | | | | |
| 80 | 67.09 | 67.84 | | | | | | | | | |
| | 62.90 | 66.04 | | | | | | | | | |
| 90 | 70.91 | 72.20 | | | | | | | | | |
| | 66.43 | 69.60 | | | | | | | | | |
| 100 | 75.28 | 77.42 | 78.45 | | | | | | | | |
| | 70.12 | 73.39 | 76.92 | | | | | | | | |
| 110 | 79.45 | 82.31 | 84.39 | | | | | | | | |
| | 73.82 | 77.33 | 80.90 | | | | | | | | |
| 120 | 83.10 | 86.59 | 89.50 | 91.52 | | | | | | | |
| | 77.42 | 81.18 | 84.89 | 88.69 | | | | | | | |
| 130 | 86.26 | 90.21 | 93.81 | 96.82 | 98.84 | | | | | | |
| | 81.18 | 85.06 | 88.84 | 92.62 | 96.60 | | | | | | |
| 140 | 89.23 | 93.48 | 97.51 | 101.18 | 104.27 | 106.41 | | | | | |
| | 85.32 | 89.23 | 93.00 | 96.71 | 100.43 | 104.47 | | | | | |
| 150 | 92.67 | 97.13 | 101.36 | 105.24 | 108.82 | 111.87 | 114.10 | | | | |
| | 89.51 | 93.84 | 97.82 | 101.36 | 104.80 | 108.31 | 112.15 | | | | |
| 160 | 96.50 | 101.24 | 105.56 | 109.64 | 113.53 | 116.87 | 119.59 | 121.74 | | | |
| | 93.66 | 98.23 | 102.39 | 106.35 | 110.15 | 113.29 | 116.26 | 119.63 | | | |
| 170 | 100.19 | 105.34 | 110.01 | 114.15 | 117.87 | 121.42 | 124.69 | 127.46 | 129.37 | | |
| | 97.58 | 102.60 | 107.14 | 111.13 | 114.70 | 118.15 | 121.39 | 124.31 | 127.04 | | |
| 180 | 103.43 | 109.02 | 114.07 | 118.53 | 122.43 | 125.83 | 128.90 | 131.73 | 134.08 | 135.77 | |
| | 100.85 | 106.45 | 111.41 | 115.77 | 119.58 | 122.87 | 125.88 | 128.76 | 131.35 | 133.74 | |
| 190 | 106.19 | 112.03 | 117.50 | 122.26 | 126.37 | 129.94 | 132.98 | 135.53 | 137.73 | 139.41 | |
| | 103.99 | 109.83 | 115.27 | 120.00 | 124.05 | 127.58 | 130.62 | 133.25 | 135.77 | 138.14 | |
| (mm) | | | | | | | | | | | |

DIAMETER D = 400
HEIGHT h = 140
EXPANSION ANGLE λ = 90
BOSS RATIO ν = 0.275

Embodiment 29

Propeller fan 1 having the diameter D=400 mm, the height in the axial direction (z direction) h=140 mm, the number of blades n=3, the expansion angle of a blade λ=132 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 122 below, i.e. a three-dimensional curved surface specified by Table 111.

$$
\left.
\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = \frac{D}{2} = \frac{400}{2} = 200\\
&b = 0\\
&c = \lambda = 132\\
&d = 0\\
&e_u = e_d = h = 140\\
&f_u = f_d = 0
\end{aligned}
\right\} \quad (122)
$$

TABLE 111

| EMBODIMENT 29 | | | | | | | | | | | | | | | | | | | | | | | | | |
|---|---|---|---|---|---|---|---|---|---|---|---|---|---|---|---|---|---|---|---|---|---|---|---|---|---|
| | θ | | | | | | | | | | | | | | | | | | | | | | | | |
| r | 5.5 | 11 | 16.5 | 22 | 27.5 | 33 | 38.5 | 44 | 49.5 | 55 | 60.5 | 66 | 71.5 | 77 | 82.5 | 88 | 93.5 | 99 | 104.5 | 110 | 115.5 | 121 | 126.5 | 132 | (deg) |
| 60 | | | 26.62 | 30.10 | 33.38 | 36.60 | 39.79 | 42.94 | 46.01 | 48.99 | 51.88 | 54.65 | 57.29 | 59.76 | 61.98 | 63.83 | 65.10 | 65.49 | | | | | | | |
| | | | 23.49 | 25.79 | 28.13 | 30.48 | 32.83 | 35.24 | 37.75 | 40.38 | 43.07 | 45.80 | 48.50 | 51.15 | 53.76 | 56.36 | 59.08 | 62.17 | | | | | | | |
| 70 | | 20.50 | 25.15 | 29.37 | 33.38 | 37.23 | 40.93 | 44.46 | 47.83 | 51.09 | 54.22 | 57.20 | 59.99 | 62.41 | 64.24 | 65.12 | | | | | | | | | |
| | | 17.68 | 21.04 | 24.33 | 27.57 | 30.80 | 34.05 | 37.35 | 40.66 | 43.94 | 47.17 | 50.29 | 53.30 | 56.23 | 59.16 | 62.28 | | | | | | | | | |
| 80 | 12.22 | 18.44 | 23.78 | 28.72 | 33.36 | 37.78 | 41.95 | 45.90 | 49.64 | 53.23 | 56.65 | 59.87 | 62.82 | 65.29 | 67.09 | 67.84 | | | | | | | | | |
| | 10.63 | 15.40 | 19.87 | 24.10 | 28.15 | 32.09 | 35.95 | 39.74 | 43.46 | 47.06 | 50.53 | 53.82 | 56.94 | 59.93 | 62.90 | 66.04 | | | | | | | | | |
| 90 | 9.71 | 16.30 | 22.39 | 28.07 | 33.39 | 38.36 | 43.03 | 47.43 | 51.58 | 55.50 | 59.22 | 62.70 | 65.91 | 68.70 | 70.91 | 72.20 | | | | | | | | | |
| | 7.69 | 13.70 | 19.17 | 24.25 | 28.98 | 33.46 | 37.75 | 41.89 | 45.89 | 49.76 | 53.46 | 56.95 | 60.24 | 63.37 | 66.43 | 69.60 | | | | | | | | | |
| 100 | 5.81 | 13.80 | 20.94 | 27.43 | 33.42 | 38.98 | 44.16 | 49.00 | 53.54 | 57.82 | 61.86 | 65.66 | 69.23 | 72.48 | 75.28 | 77.42 | 78.45 | | | | | | | | |
| | 4.65 | 11.79 | 18.34 | 24.26 | 29.63 | 34.59 | 39.27 | 43.73 | 48.03 | 52.16 | 56.13 | 59.90 | 63.46 | 66.85 | 70.12 | 73.39 | 76.92 | | | | | | | | |
| 110 | 1.45 | 11.05 | 19.30 | 26.63 | 33.30 | 39.44 | 40.93 | 50.41 | 55.34 | 59.95 | 64.31 | 68.45 | 72.37 | 76.07 | 79.45 | 82.31 | 84.39 | | | | | | | | |
| | 0.83 | 9.36 | 17.00 | 23.77 | 29.82 | 35.33 | 40.44 | 45.26 | 49.84 | 54.24 | 58.48 | 62.56 | 66.47 | 70.22 | 73.82 | 77.33 | 80.90 | | | | | | | | |
| 120 | | 7.82 | 17.11 | 25.26 | 32.64 | 39.39 | 45.46 | 51.37 | 56.72 | 61.73 | 66.44 | 70.92 | 75.18 | 79.25 | 83.10 | 86.59 | 89.50 | 91.52 | | | | | | | |
| | | 6.50 | 15.01 | 22.66 | 29.55 | 35.80 | 41.49 | 46.74 | 51.67 | 56.36 | 60.87 | 65.22 | 69.44 | 73.51 | 77.42 | 81.18 | 84.89 | 88.69 | | | | | | | |
| 130 | | 4.01 | 14.23 | 23.41 | 31.62 | 38.97 | 45.65 | 51.83 | 57.60 | 63.03 | 68.17 | 73.05 | 77.68 | 82.08 | 86.26 | 90.21 | 93.81 | 96.82 | 98.84 | | | | | | |
| | | 3.24 | 13.00 | 21.95 | 29.92 | 36.99 | 43.32 | 49.09 | 54.45 | 59.48 | 64.22 | 68.73 | 73.04 | 77.18 | 81.18 | 85.06 | 88.84 | 92.62 | 96.60 | | | | | | |
| 140 | | | 11.48 | 21.88 | 30.94 | 38.94 | 46.08 | 52.59 | 58.65 | 64.39 | 69.83 | 74.97 | 79.93 | 84.70 | | | | | | | | | | | |
| | | | 10.41 | 20.56 | 29.43 | 37.25 | 44.23 | 50.59 | 56.49 | 62.04 | 67.24 | 72.09 | 76.74 | 81.17 | | | | | | | | | | | |
| 150 | | | 8.11 | 19.51 | 29.62 | 38.63 | 46.66 | 53.84 | 60.34 | 66.35 | 72.06 | 77.57 | 82.88 | 87.94 | | | | | | | | | | | |
| | | | 7.16 | 18.21 | 28.10 | 36.88 | 44.68 | 51.66 | 58.00 | 63.89 | 69.49 | 74.88 | 80.06 | 84.95 | | | | | | | | | | | |
| 160 | | | | 17.23 | 28.54 | 38.49 | 47.29 | 55.12 | 62.19 | 68.67 | 74.71 | 80.44 | 85.98 | 91.37 | | | | | | | | | | | |
| | | | | 15.92 | 26.87 | 36.49 | 45.02 | 52.68 | 59.66 | 66.10 | 72.11 | 77.83 | 83.36 | 88.66 | | | | | | | | | | | |
| 170 | | | | 15.05 | 27.51 | 38.32 | 47.76 | 56.12 | 63.66 | 70.58 | 77.03 | 83.14 | 88.98 | 94.67 | | | | | | | | | | | |
| | | | | 13.77 | 30.94 | 36.12 | 45.29 | 53.51 | 60.96 | 67.84 | 74.29 | 80.40 | 86.33 | 92.11 | | | | | | | | | | | |
| 180 | | | | 12.17 | 26.24 | 37.97 | 48.07 | 56.91 | 64.85 | 72.16 | 78.98 | 85.44 | 91.61 | 97.58 | | | | | | | | | | | |
| | | | | 11.29 | 24.61 | 35.82 | 45.63 | 54.34 | 62.19 | 69.43 | 76.23 | 82.71 | 88.91 | 94.92 | | | | | | | | | | | |
| 190 | | | | | 24.49 | 37.59 | 48.47 | 57.78 | 66.06 | 73.67 | 80.76 | 87.47 | 93.94 | 100.17 | | | | | | | | | | | |
| | | | | | 23.30 | 35.85 | 46.33 | 55.41 | 63.61 | 71.14 | 78.22 | 85.01 | 91.61 | 97.95 | | | | | | | | | | | |
| (mm) | | | | | | | | | | | | | | | | | | | | | | | | | |

TABLE 111-continued

| | | | | | | | | | | |
|---|---|---|---|---|---|---|---|---|---|---|
| EMBODIMENT 29 | | | | | | | | | | |
| 140 | 89.23 | 93.48 | 97.51 | 101.18 | 104.27 | 106.41 | | | | |
| | 85.32 | 89.23 | 93.00 | 96.71 | 100.43 | 104.47 | | | | |
| 150 | 92.67 | 97.13 | 101.36 | 105.24 | 108.82 | 111.87 | 114.10 | | | |
| | 89.51 | 93.84 | 97.82 | 101.36 | 104.80 | 108.31 | 112.15 | | | |
| 160 | 96.50 | 101.24 | 105.56 | 109.64 | 113.53 | 116.87 | 119.59 | 121.74 | | |
| | 93.66 | 98.23 | 102.39 | 106.35 | 110.15 | 113.29 | 116.26 | 119.63 | | |
| 170 | 100.19 | 105.34 | 110.01 | 114.15 | 117.87 | 121.42 | 124.69 | 127.46 | 129.37 | |
| | 97.58 | 102.60 | 107.14 | 111.13 | 114.70 | 118.15 | 121.39 | 124.31 | 127.04 | |
| 180 | 103.43 | 109.02 | 114.07 | 118.53 | 122.43 | 125.83 | 128.90 | 131.73 | 134.08 | 135.77 |
| | 100.85 | 106.45 | 111.41 | 115.77 | 119.58 | 122.87 | 125.88 | 128.76 | 131.35 | 133.74 |
| 190 | 106.19 | 112.03 | 117.50 | 122.26 | 126.37 | 129.94 | 132.98 | 135.53 | 137.73 | 139.41 |
| | 103.99 | 109.83 | 115.27 | 120.00 | 124.05 | 127.58 | 130.62 | 133.25 | 135.77 | 138.14 |
| (mm) | | | | | | | | | | |

DIAMETER D = 400
HEIGHT h = 140
EXPANSION ANGLE λ = 132
BOSS RATIO ν = 0.275

Embodiment 30

Propeller fan 1 having the diameter D=400 mm, the height in the axial direction (z direction) h=140 mm, the number of blades n=3, the expansion angle of a blade λ=120 deg, the boss ratio ν=0.35 (boss diameter νD=140 mm) was formed to have a curved surface formed by transforming the curved surface defined by non-dimensionally expressed three-dimensional coordinates specified by Table 102 using a transformation formula 123 below, i.e. a three-dimensional curved surface specified by Table 112.

$$
\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = -\frac{20}{29}D(1-\nu) = \frac{20}{29} \times 400 \times (1-0.35) = 179.3\\
&b = -\frac{20}{29}D(1-\nu) \times 0.275 + \frac{\nu D}{2}\\
&\quad = -\frac{20}{29} \times 400 \times (1-0.35) \times 0.275 + \frac{0.35 \times 400}{2}\\
&\quad = 20.69\\
&c = \lambda = \frac{360}{n} = \frac{2400}{7} \times \frac{h}{D} = \frac{2400}{7} \times \frac{140}{400} = 120\\
&d = 0\\
&e_u = e_d = h = 140\\
&f_u = f_d = 0
\end{aligned}\right\} \quad (123)
$$

TABLE 112

| EMBODIMENT 30 | | | | | | | | | | | | | | |
|---|---|---|---|---|---|---|---|---|---|---|---|---|---|---|
| | θ | | | | | | | | | | | | | |
| r | 5 | 10 | 15 | 20 | 25 | 30 | 35 | 40 | 45 | 50 | 55 | 60 | 65 | 70 |
| 74.48 | | | 26.62 | 30.10 | 33.38 | 36.60 | 39.79 | 42.94 | 46.01 | 48.99 | 51.88 | 54.65 | 57.29 | 59.76 |
| | | | 23.49 | 25.79 | 28.13 | 30.48 | 32.83 | 35.24 | 37.75 | 40.38 | 43.07 | 45.80 | 48.50 | 51.15 |
| 83.45 | | 20.50 | 25.15 | 29.37 | 33.38 | 37.23 | 40.93 | 44.46 | 47.83 | 51.09 | 54.22 | 57.20 | 59.99 | 62.41 |
| | | 17.68 | 21.04 | 24.33 | 27.57 | 30.80 | 34.05 | 37.35 | 40.66 | 43.94 | 47.17 | 50.29 | 53.30 | 56.23 |
| 92.41 | 12.22 | 18.44 | 23.78 | 28.72 | 33.36 | 37.78 | 41.95 | 45.90 | 49.64 | 53.23 | 56.65 | 59.87 | 62.82 | 65.29 |
| | 10.63 | 15.40 | 19.87 | 24.10 | 28.15 | 32.09 | 35.95 | 39.74 | 43.46 | 47.06 | 50.53 | 53.82 | 56.94 | 59.93 |

TABLE 112-continued

EMBODIMENT 30

| | | | | | | | | | | | | | | |
|---|---|---|---|---|---|---|---|---|---|---|---|---|---|---|
| 101.4 | 9.71 | 16.30 | 22.39 | 28.07 | 33.39 | 38.36 | 43.03 | 47.43 | 51.58 | 55.50 | 59.22 | 62.70 | 65.91 | 68.70 |
| | 7.69 | 13.70 | 19.17 | 24.25 | 28.98 | 33.46 | 37.75 | 41.89 | 45.89 | 49.76 | 53.46 | 56.95 | 60.24 | 63.37 |
| 110.3 | 5.81 | 13.80 | 20.94 | 27.43 | 33.42 | 38.98 | 44.16 | 49.00 | 53.54 | 57.82 | 61.86 | 65.66 | 69.23 | 72.48 |
| | 4.65 | 11.79 | 18.34 | 24.26 | 29.63 | 34.59 | 39.27 | 43.73 | 48.03 | 52.16 | 56.13 | 59.90 | 63.46 | 66.85 |
| 119.3 | 1.45 | 11.05 | 19.30 | 26.63 | 33.30 | 39.44 | 40.93 | 50.41 | 55.34 | 59.95 | 64.31 | 68.45 | 72.37 | 76.07 |
| | 0.83 | 9.36 | 17.00 | 23.77 | 29.82 | 35.33 | 40.44 | 45.26 | 49.84 | 54.24 | 58.48 | 62.56 | 66.47 | 70.22 |
| 128.3 | | 7.82 | 17.11 | 25.26 | 32.64 | 39.39 | 45.61 | 51.37 | 56.72 | 61.73 | 66.44 | 70.92 | 75.18 | 79.25 |
| | | 6.50 | 15.01 | 22.66 | 29.55 | 35.80 | 41.49 | 46.74 | 51.67 | 56.36 | 60.87 | 65.22 | 69.44 | 73.51 |
| 137.2 | | 4.01 | 14.23 | 23.41 | 31.62 | 38.97 | 45.65 | 51.83 | 57.60 | 63.03 | 68.17 | 73.05 | 77.68 | 82.08 |
| | | 3.24 | 13.00 | 21.95 | 29.92 | 36.99 | 43.32 | 49.09 | 54.45 | 59.48 | 64.22 | 68.73 | 73.04 | 77.18 |
| 146.2 | | | 11.48 | 21.88 | 30.94 | 38.94 | 46.08 | 52.59 | 58.65 | 64.39 | 69.83 | 74.97 | 79.93 | 84.70 |
| | | | 10.41 | 20.56 | 29.43 | 37.25 | 44.23 | 50.59 | 56.49 | 62.04 | 67.24 | 72.09 | 76.74 | 81.17 |
| 155.2 | | | 8.11 | 19.51 | 29.62 | 38.63 | 46.66 | 53.84 | 60.34 | 66.35 | 72.06 | 77.57 | 82.88 | 87.94 |
| | | | 7.16 | 18.21 | 28.10 | 36.88 | 44.68 | 51.66 | 58.00 | 63.89 | 69.49 | 74.88 | 80.06 | 84.95 |
| 164.1 | | | | 17.23 | 28.54 | 38.49 | 47.29 | 55.12 | 62.19 | 68.67 | 74.71 | 80.44 | 85.98 | 91.37 |
| | | | | 15.92 | 26.87 | 36.49 | 45.02 | 52.68 | 59.66 | 66.10 | 72.11 | 77.83 | 83.36 | 88.66 |
| 173.1 | | | | 15.05 | 27.51 | 38.32 | 47.76 | 56.12 | 63.66 | 70.58 | 77.03 | 83.14 | 88.98 | 94.67 |
| | | | | 13.77 | 30.94 | 36.12 | 45.29 | 53.51 | 60.96 | 67.84 | 74.29 | 80.40 | 86.33 | 92.11 |
| 182.1 | | | | 12.17 | 26.24 | 37.97 | 48.07 | 56.91 | 64.85 | 72.16 | 78.98 | 85.44 | 91.61 | 97.58 |
| | | | | 11.29 | 24.61 | 35.82 | 45.63 | 54.34 | 62.19 | 69.43 | 76.23 | 82.71 | 88.91 | 94.92 |
| 191 | | | | | 24.49 | 37.59 | 48.47 | 57.78 | 66.06 | 73.67 | 80.76 | 87.47 | 93.94 | 100.17 |
| | | | | | 23.30 | 35.85 | 46.33 | 55.41 | 63.61 | 71.14 | 78.22 | 85.01 | 91.61 | 97.95 |
| (mm) | | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 74.48 | 61.98 | 63.83 | 65.10 | 65.49 | | | | | | | |
| | 53.76 | 56.36 | 59.08 | 62.17 | | | | | | | |
| 83.45 | 64.24 | 65.12 | | | | | | | | | |
| | 59.16 | 62.28 | | | | | | | | | |
| 92.41 | 67.09 | 67.84 | | | | | | | | | |
| | 62.90 | 66.04 | | | | | | | | | |
| 101.4 | 70.91 | 72.20 | | | | | | | | | |
| | 66.43 | 69.60 | | | | | | | | | |
| 110.3 | 75.28 | 77.42 | 78.45 | | | | | | | | |
| | 70.12 | 73.39 | 76.92 | | | | | | | | |
| 119.3 | 79.45 | 82.31 | 84.39 | | | | | | | | |
| | 73.82 | 77.33 | 80.90 | | | | | | | | |
| 128.3 | 83.10 | 86.59 | 89.50 | 91.52 | | | | | | | |
| | 77.42 | 81.18 | 84.89 | 88.69 | | | | | | | |
| 137.2 | 86.26 | 90.21 | 93.81 | 96.82 | 98.84 | | | | | | |
| | 81.18 | 85.06 | 88.84 | 92.62 | 96.60 | | | | | | |
| 146.2 | 89.23 | 93.48 | 97.51 | 101.18 | 104.27 | 106.41 | | | | | |
| | 85.32 | 89.23 | 93.00 | 96.71 | 100.43 | 104.47 | | | | | |
| 155.2 | 92.67 | 97.13 | 101.36 | 105.24 | 108.82 | 111.87 | 114.10 | | | | |
| | 89.51 | 93.84 | 97.82 | 101.36 | 104.80 | 108.31 | 112.15 | | | | |
| 164.1 | 96.50 | 101.24 | 105.56 | 109.64 | 113.53 | 116.87 | 119.59 | 121.74 | | | |
| | 93.66 | 98.23 | 102.39 | 106.35 | 110.15 | 113.29 | 116.26 | 119.63 | | | |
| 173.1 | 100.19 | 105.34 | 110.01 | 114.15 | 117.87 | 121.42 | 124.69 | 127.46 | 129.37 | | |
| | 97.58 | 102.60 | 107.14 | 111.13 | 114.70 | 118.15 | 121.39 | 124.31 | 127.04 | | |
| 182.1 | 103.43 | 109.02 | 114.07 | 118.53 | 122.43 | 125.83 | 128.90 | 131.73 | 134.08 | 135.77 | |
| | 100.85 | 106.45 | 111.41 | 115.77 | 119.58 | 122.87 | 125.88 | 128.76 | 131.35 | 133.74 | |
| 191 | 106.19 | 112.03 | 117.50 | 122.26 | 126.37 | 129.94 | 132.98 | 135.53 | 137.73 | 139.41 | |
| | 103.99 | 109.83 | 115.27 | 120.00 | 124.05 | 127.58 | 130.62 | 133.25 | 135.77 | 138.14 | |
| (mm) | | | | | | | | | | | |

DIAMETER D = 400
HEIGHT h = 140
EXPANSION ANGLE λ = 120
BOSS RATIO ν = 0.35

Embodiment 31

Propeller fan 1 having the diameter D=400 mm, the height in the axial direction (z direction) h=112 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 124 below, i.e. a three-dimensional curved surface specified by Table 113.

$$
\left.\begin{array}{l}
r_1 = a \times r + b \text{ (mm)} \\
\theta_1 = c \times \theta + d \text{ (deg)} \\
z_{1u} = e_u \times z_u + f_u \text{ (mm)} \\
z_{1d} = e_d \times z_d + f_d \text{ (mm)} \\
(a,\ c,\ e_u,\ e_d\text{: factor of proportionality, } b,\ d,\ f_u,\ f_d\text{: constant}) \\
\text{wherein} \\
a = \frac{D}{2} = \frac{400}{2} = 200 \\
b = 0 \\
c = \lambda = \frac{360}{n} = 120 \\
d = 0 \\
e_u = h = 112 \\
e_d = 106.4 \\
f_u = f_d = 0
\end{array}\right\} \quad (124)
$$

TABLE 113

EMBODIMENT 31

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 60 | | | 21.29 | 24.08 | 26.71 | 29.28 | 31.83 | 34.35 | 36.81 | 39.19 | 41.50 | 43.72 | 45.83 | 47.81 |
| | | | 17.85 | 19.60 | 21.38 | 23.16 | 24.95 | 26.78 | 28.69 | 30.69 | 32.73 | 34.81 | 36.86 | 38.87 |
| 70 | | 16.40 | 20.12 | 23.50 | 26.70 | 29.78 | 32.74 | 35.57 | 38.27 | 40.87 | 43.37 | 45.76 | 47.99 | 49.92 |
| | | 13.44 | 15.99 | 18.49 | 20.95 | 23.41 | 25.88 | 28.38 | 30.90 | 33.40 | 35.85 | 38.22 | 40.50 | 42.73 |
| 80 | 9.78 | 14.75 | 19.02 | 22.97 | 26.69 | 30.23 | 33.56 | 36.72 | 39.72 | 42.58 | 45.32 | 47.90 | 50.25 | 52.23 |
| | 8.08 | 11.70 | 15.10 | 18.32 | 21.39 | 24.39 | 27.32 | 30.21 | 33.03 | 35.77 | 38.40 | 40.90 | 43.28 | 45.55 |
| 90 | 7.77 | 13.04 | 17.91 | 22.46 | 26.71 | 30.69 | 34.43 | 37.94 | 41.26 | 44.40 | 47.37 | 50.16 | 52.73 | 54.96 |
| | 5.84 | 10.41 | 14.57 | 18.43 | 22.03 | 25.43 | 28.69 | 31.83 | 34.88 | 37.82 | 40.63 | 43.28 | 45.78 | 48.16 |
| 100 | 4.65 | 11.04 | 16.75 | 21.95 | 26.74 | 31.18 | 35.33 | 39.20 | 42.83 | 46.25 | 49.48 | 52.53 | 55.38 | 57.98 |
| | 3.53 | 8.96 | 13.94 | 18.44 | 22.52 | 26.29 | 29.84 | 33.24 | 36.50 | 39.64 | 42.66 | 45.52 | 48.23 | 50.80 |
| 110 | 1.16 | 8.84 | 15.44 | 21.31 | 26.64 | 31.55 | 32.74 | 40.33 | 44.27 | 47.96 | 51.45 | 54.76 | 57.90 | 60.86 |
| | 0.63 | 7.11 | 12.92 | 18.06 | 22.66 | 26.85 | 30.74 | 34.39 | 37.88 | 41.22 | 44.44 | 47.54 | 50.52 | 53.37 |
| 120 | | 6.26 | 13.69 | 20.21 | 26.11 | 31.51 | 36.49 | 41.09 | 45.38 | 49.38 | 53.15 | 56.74 | 60.15 | 63.40 |
| | | 4.94 | 11.41 | 17.22 | 22.46 | 27.21 | 31.53 | 35.52 | 39.27 | 42.83 | 46.26 | 49.57 | 52.77 | 55.86 |
| 130 | | 3.20 | 11.38 | 18.73 | 25.29 | 31.17 | 36.52 | 41.46 | 46.08 | 50.42 | 54.54 | 58.44 | 62.15 | 65.66 |
| | | 2.46 | 9.88 | 16.68 | 22.74 | 28.11 | 32.92 | 37.31 | 41.38 | 45.20 | 48.81 | 52.24 | 55.51 | 58.66 |
| 140 | | | 9.18 | 17.50 | 24.75 | 31.15 | 36.86 | 42.07 | 46.92 | 51.51 | 55.86 | 59.98 | 63.95 | 67.76 |
| | | | 7.92 | 15.62 | 22.37 | 28.31 | 33.62 | 38.45 | 42.93 | 47.15 | 51.10 | 54.79 | 58.32 | 61.69 |
| 150 | | | 6.49 | 15.61 | 23.70 | 30.91 | 37.33 | 43.07 | 48.27 | 53.08 | 57.64 | 62.05 | 66.31 | 70.35 |
| | | | 5.44 | 13.84 | 21.35 | 28.03 | 33.96 | 39.26 | 44.08 | 48.55 | 52.81 | 56.91 | 60.84 | 64.57 |
| 160 | | | | 13.78 | 22.83 | 30.79 | 37.83 | 44.10 | 49.76 | 54.94 | 59.77 | 64.35 | 68.78 | 73.09 |
| | | | | 12.10 | 20.42 | 27.73 | 34.21 | 40.04 | 45.34 | 50.23 | 54.80 | 59.15 | 63.35 | 67.39 |
| 170 | | | | 12.04 | 22.01 | 30.66 | 38.21 | 44.89 | 50.93 | 56.47 | 61.63 | 66.51 | 71.19 | 75.74 |
| | | | | 10.47 | 23.52 | 27.45 | 34.42 | 40.66 | 46.33 | 51.56 | 56.46 | 61.10 | 65.61 | 70.00 |
| 180 | | | | 9.73 | 20.99 | 30.38 | 38.45 | 45.52 | 51.88 | 57.73 | 63.19 | 68.35 | 73.29 | 78.06 |
| | | | | 8.58 | 18.70 | 27.22 | 34.68 | 41.30 | 47.27 | 52.77 | 57.94 | 62.86 | 67.57 | 72.14 |
| 190 | | | | | 19.59 | 30.07 | 38.78 | 46.23 | 52.85 | 58.93 | 64.61 | 69.98 | 75.15 | 80.14 |
| | | | | | 17.71 | 27.25 | 35.21 | 42.12 | 48.34 | 54.07 | 59.44 | 64.61 | 69.63 | 74.44 |
| (mm) | | | | | | | | | | | | | | |

| r | θ 75 | 80 | 85 | 90 | 95 | 100 | 105 | 110 | 115 | 120 | (deg) |
|---|---|---|---|---|---|---|---|---|---|---|---|
| 60 | 49.58 | 51.07 | 52.08 | 52.40 | | | | | | | |
| | 40.85 | 42.83 | 44.90 | 47.25 | | | | | | | |
| 70 | 51.39 | 52.09 | | | | | | | | | |
| | 44.96 | 47.33 | | | | | | | | | |
| 80 | 53.67 | 54.27 | | | | | | | | | |
| | 47.80 | 50.19 | | | | | | | | | |
| 90 | 56.73 | 57.76 | | | | | | | | | |
| | 50.49 | 52.89 | | | | | | | | | |
| 100 | 60.22 | 61.93 | 62.76 | | | | | | | | |
| | 53.29 | 55.78 | 58.46 | | | | | | | | |
| 110 | 63.56 | 65.85 | 67.51 | | | | | | | | |
| | 56.10 | 58.77 | 61.48 | | | | | | | | |

TABLE 113-continued

| EMBODIMENT 31 | | | | | | | | | | |
|---|---|---|---|---|---|---|---|---|---|---|
| 120 | 66.48 | 69.27 | 71.60 | 73.22 | | | | | | |
| | 58.84 | 61.70 | 64.52 | 67.41 | | | | | | |
| 130 | 69.01 | 72.17 | 75.05 | 77.45 | 79.07 | | | | | |
| | 61.70 | 64.64 | 67.52 | 70.39 | 73.42 | | | | | |
| 140 | 71.38 | 74.79 | 78.00 | 80.95 | 83.42 | 85.12 | | | | |
| | 64.84 | 67.82 | 70.68 | 73.50 | 76.32 | 79.39 | | | | |
| 150 | 74.14 | 77.70 | 81.09 | 84.19 | 87.05 | 89.50 | 91.28 | | | |
| | 68.03 | 71.32 | 74.34 | 77.03 | 79.65 | 82.32 | 85.23 | | | |
| 160 | 77.20 | 80.99 | 84.45 | 87.71 | 90.83 | 93.50 | 95.67 | 97.40 | | |
| | 71.18 | 74.66 | 77.82 | 80.83 | 83.72 | 86.10 | 88.36 | 90.92 | | |
| 170 | 80.15 | 84.27 | 88.01 | 91.32 | 94.29 | 97.13 | 99.75 | 101.97 | 103.49 | |
| | 74.16 | 77.98 | 81.42 | 84.46 | 87.17 | 89.80 | 92.26 | 94.47 | 96.55 | |
| 180 | 82.74 | 87.22 | 91.25 | 94.82 | 97.94 | 100.66 | 103.12 | 105.38 | 107.26 | 108.62 |
| | 76.65 | 80.90 | 84.67 | 87.99 | 90.88 | 93.38 | 95.67 | 97.86 | 99.83 | 101.64 |
| 190 | 84.95 | 89.63 | 94.00 | 97.81 | 101.10 | 103.95 | 106.38 | 108.42 | 110.18 | 111.53 |
| | 79.03 | 83.47 | 87.61 | 91.20 | 94.28 | 96.96 | 99.27 | 101.27 | 103.19 | 104.98 |
| (mm) | | | | | | | | | | |

DIAMETER D = 400
HEIGHT h = 112 (eu = 112, ed = 106.4, fu = fd = 0)
EXPANSION ANGLE λ = 120
BOSS RATIO ν = 0.275

Embodiment 32

Propeller fan 1 having the diameter D=400 mm, the height in the axial direction (z direction) h=112 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 125 below, i.e. a three-dimensional curved surface specified by Table 114.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = \frac{D}{2} = \frac{400}{2} = 200\\
&b = 0\\
&c = \lambda = \frac{360}{n} = 120\\
&d = 0\\
&e_u = e_d = h = 112\\
&f_u = 3\\
&f_d = 0
\end{aligned}\right\} \quad (125)$$

TABLE 114

| EMBODIMENT 32 | | | | | | | | | | | | | | |
|---|---|---|---|---|---|---|---|---|---|---|---|---|---|---|
| | θ | | | | | | | | | | | | | |
| r | 5 | 10 | 15 | 20 | 25 | 30 | 35 | 40 | 45 | 50 | 55 | 60 | 65 | 70 |
| 60 | | | 24.29 | 27.08 | 29.71 | 32.28 | 34.83 | 37.35 | 39.81 | 42.19 | 44.50 | 46.72 | 48.83 | 50.81 |
| | | | 18.79 | 20.63 | 22.50 | 24.38 | 26.26 | 28.19 | 30.20 | 32.30 | 34.46 | 36.64 | 38.80 | 40.92 |
| 70 | | 19.40 | 23.12 | 26.50 | 29.70 | 32.78 | 35.74 | 38.57 | 41.27 | 43.87 | 46.37 | 48.76 | 50.99 | 52.92 |
| | | 14.14 | 16.83 | 19.47 | 22.05 | 24.64 | 27.24 | 29.88 | 32.53 | 35.15 | 37.73 | 40.23 | 42.64 | 44.98 |

TABLE 114-continued

EMBODIMENT 32

| | | | | | | | | | | | | | | |
|---|---|---|---|---|---|---|---|---|---|---|---|---|---|---|
| 80 | 12.78 | 17.75 | 22.02 | 25.97 | 29.69 | 33.23 | 36.56 | 39.72 | 42.72 | 45.58 | 48.32 | 50.90 | 53.25 | 55.23 |
| | 8.50 | 12.32 | 15.90 | 19.28 | 22.52 | 25.67 | 28.76 | 31.80 | 34.77 | 37.65 | 40.42 | 43.06 | 45.55 | 47.95 |
| 90 | 10.77 | 16.04 | 20.91 | 25.46 | 29.71 | 33.69 | 37.43 | 40.94 | 44.26 | 47.40 | 50.37 | 53.16 | 55.73 | 57.96 |
| | 6.15 | 10.96 | 15.34 | 19.40 | 23.19 | 26.77 | 30.20 | 33.51 | 36.72 | 39.81 | 42.76 | 45.56 | 48.19 | 50.70 |
| 100 | 7.65 | 14.04 | 19.75 | 24.95 | 29.74 | 34.18 | 38.33 | 42.20 | 45.83 | 49.25 | 52.48 | 55.53 | 58.38 | 60.98 |
| | 3.72 | 9.43 | 14.67 | 19.41 | 23.70 | 27.67 | 31.42 | 34.99 | 38.42 | 41.73 | 44.90 | 47.92 | 50.77 | 53.48 |
| 110 | 4.16 | 11.84 | 18.44 | 24.31 | 29.64 | 34.55 | 35.74 | 43.33 | 47.27 | 50.96 | 54.45 | 57.76 | 60.90 | 63.86 |
| | 0.66 | 7.49 | 13.60 | 19.01 | 23.86 | 28.26 | 32.35 | 36.20 | 39.87 | 43.39 | 46.78 | 50.05 | 53.18 | 56.18 |
| 120 | | 9.26 | 16.69 | 23.21 | 29.11 | 34.51 | 39.49 | 44.09 | 48.38 | 52.38 | 56.15 | 59.74 | 63.15 | 66.40 |
| | | 5.20 | 12.01 | 18.12 | 23.64 | 28.64 | 33.19 | 37.39 | 41.34 | 45.09 | 48.70 | 52.18 | 55.55 | 58.80 |
| 130 | | 6.20 | 14.38 | 21.73 | 28.29 | 34.17 | 39.52 | 44.46 | 49.08 | 53.42 | 57.54 | 61.44 | 65.15 | 68.66 |
| | | 2.59 | 10.40 | 17.56 | 23.93 | 29.59 | 34.66 | 39.27 | 43.56 | 47.58 | 51.38 | 54.99 | 58.43 | 61.75 |
| 140 | | | 12.18 | 20.50 | 27.75 | 34.15 | 39.86 | 45.07 | 49.92 | 54.51 | 58.86 | 62.98 | 66.95 | 70.76 |
| | | | 8.33 | 16.44 | 23.55 | 29.80 | 35.39 | 40.47 | 45.19 | 49.63 | 53.79 | 57.67 | 61.39 | 64.93 |
| 150 | | | 9.49 | 18.61 | 26.70 | 33.91 | 40.33 | 46.07 | 51.27 | 56.08 | 60.64 | 65.05 | 69.31 | 73.35 |
| | | | 5.73 | 14.57 | 22.48 | 29.50 | 35.75 | 41.33 | 46.40 | 51.11 | 55.59 | 59.91 | 64.05 | 67.96 |
| 160 | | | | 16.78 | 25.83 | 33.79 | 40.83 | 47.10 | 52.76 | 57.94 | 62.77 | 67.35 | 71.78 | 76.09 |
| | | | | 12.73 | 21.49 | 29.19 | 36.02 | 42.15 | 47.73 | 52.88 | 57.69 | 62.27 | 66.69 | 70.93 |
| 170 | | | | 15.04 | 25.01 | 33.66 | 41.21 | 47.89 | 53.93 | 59.47 | 64.63 | 69.51 | 74.19 | 78.74 |
| | | | | 11.02 | 24.75 | 28.90 | 36.24 | 42.80 | 48.77 | 54.28 | 59.43 | 64.32 | 69.06 | 73.69 |
| 180 | | | | 12.73 | 23.99 | 33.38 | 41.45 | 48.52 | 54.88 | 60.73 | 66.19 | 71.35 | 76.29 | 81.06 |
| | | | | 9.04 | 19.69 | 28.65 | 36.51 | 43.47 | 49.75 | 55.54 | 60.99 | 66.17 | 71.13 | 75.94 |
| 190 | | | | | 22.59 | 33.07 | 41.78 | 49.23 | 55.85 | 61.93 | 67.61 | 72.98 | 78.15 | 83.14 |
| | | | | | 18.64 | 28.68 | 37.07 | 44.33 | 50.88 | 56.91 | 62.57 | 68.01 | 73.29 | 78.36 |
| (mm) | | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 60 | 52.58 | 54.07 | 55.08 | 55.40 | | | | | | | |
| | 43.00 | 45.09 | 47.27 | 49.74 | | | | | | | |
| 70 | 54.39 | 55.09 | | | | | | | | | |
| | 47.33 | 49.82 | | | | | | | | | |
| 80 | 56.67 | 57.27 | | | | | | | | | |
| | 50.32 | 52.83 | | | | | | | | | |
| 90 | 59.73 | 60.76 | | | | | | | | | |
| | 53.14 | 55.68 | | | | | | | | | |
| 100 | 63.22 | 64.93 | 65.76 | | | | | | | | |
| | 56.10 | 58.71 | 61.53 | | | | | | | | |
| 110 | 66.56 | 68.85 | 70.51 | | | | | | | | |
| | 59.06 | 61.87 | 64.72 | | | | | | | | |
| 120 | 69.48 | 72.27 | 74.60 | 76.22 | | | | | | | |
| | 61.93 | 64.95 | 67.91 | 70.96 | | | | | | | |
| 130 | 72.01 | 75.17 | 78.05 | 80.45 | 82.07 | | | | | | |
| | 64.95 | 68.05 | 71.07 | 74.09 | 77.28 | | | | | | |
| 140 | 74.38 | 77.79 | 81.00 | 83.95 | 86.42 | 88.12 | | | | | |
| | 68.26 | 71.38 | 74.40 | 77.37 | 80.34 | 83.57 | | | | | |
| 150 | 77.14 | 80.70 | 84.09 | 87.19 | 90.05 | 92.50 | 94.28 | | | | |
| | 71.61 | 75.07 | 78.26 | 81.09 | 83.84 | 86.65 | 89.72 | | | | |
| 160 | 80.20 | 83.99 | 87.45 | 90.71 | 93.83 | 96.50 | 98.67 | 100.40 | | | |
| | 74.93 | 78.59 | 81.91 | 85.08 | 88.12 | 90.63 | 93.01 | 95.71 | | | |
| 170 | 83.15 | 87.27 | 91.01 | 94.32 | 97.29 | 100.13 | 102.75 | 104.97 | 106.49 | | |
| | 78.06 | 82.08 | 85.71 | 88.90 | 91.76 | 94.52 | 97.11 | 99.45 | 101.64 | | |
| 180 | 85.74 | 90.22 | 94.25 | 97.82 | 100.94 | 103.66 | 106.12 | 108.38 | 110.26 | 111.62 | |
| | 80.68 | 85.16 | 89.13 | 92.62 | 95.66 | 98.29 | 100.71 | 103.01 | 105.08 | 106.99 | |
| 190 | 87.95 | 92.63 | 97.00 | 100.81 | 104.10 | 106.95 | 109.38 | 111.42 | 113.18 | 114.53 | |
| | 83.19 | 87.86 | 92.22 | 96.00 | 99.24 | 102.06 | 104.49 | 106.60 | 108.62 | 110.51 | |
| (mm) | | | | | | | | | | | |

DIAMETER D = 400
HEIGHT h = 112 (eu = 112, ed = 112, fu = 3, fd = 0)
EXPANSION ANGLE λ = 120
BOSS RATIO ν = 0.275

Embodiment 33

Propeller fan 1 having the diameter D=400 mm, the height in the axial direction (z direction) h=112 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 102 using a transformation formula 126 below, i.e. a three-dimensional curved surface specified by Table 115.

$$
\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant)}\\
&\text{wherein}\\
&a = \frac{D}{2} = \frac{400}{2} = 200\\
&b = 0\\
&c = \lambda = \frac{360}{n} = 120\\
&d = 0\\
&e_u = h = 112\\
&e_d = 106.4\\
&f_u = 3\\
&f_d = 0
\end{aligned}\right\} \quad (126)
$$

TABLE 115

EMBODIMENT 33

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 60 | | | 24.29 | 27.08 | 29.71 | 32.28 | 34.83 | 37.35 | 39.81 | 42.19 | 44.50 | 46.72 | 48.83 | 50.81 |
| | | | 17.85 | 19.60 | 21.38 | 23.16 | 24.95 | 26.78 | 28.69 | 30.69 | 32.73 | 34.81 | 36.86 | 38.87 |
| 70 | | 19.40 | 23.12 | 26.50 | 29.70 | 32.78 | 35.74 | 38.57 | 41.27 | 43.87 | 46.37 | 48.76 | 50.99 | 52.92 |
| | | 13.44 | 15.99 | 18.49 | 20.95 | 23.41 | 25.88 | 28.38 | 30.90 | 33.40 | 35.85 | 38.22 | 40.50 | 42.73 |
| 80 | 12.78 | 17.75 | 22.02 | 25.97 | 29.69 | 33.23 | 36.56 | 39.72 | 42.72 | 45.58 | 48.32 | 50.90 | 53.25 | 55.23 |
| | 8.08 | 11.70 | 15.10 | 18.32 | 21.39 | 24.39 | 27.32 | 30.21 | 33.03 | 35.77 | 38.40 | 40.90 | 43.28 | 45.55 |
| 90 | 10.77 | 16.04 | 20.91 | 25.46 | 29.71 | 33.69 | 37.43 | 40.94 | 44.26 | 47.40 | 50.37 | 53.16 | 55.73 | 57.96 |
| | 5.84 | 10.41 | 14.57 | 18.43 | 22.03 | 25.43 | 28.69 | 31.83 | 34.88 | 37.82 | 40.63 | 43.28 | 45.78 | 48.16 |
| 100 | 7.65 | 14.04 | 19.75 | 24.95 | 29.74 | 34.18 | 38.33 | 42.20 | 45.83 | 49.25 | 52.48 | 55.53 | 58.38 | 60.98 |
| | 3.53 | 8.96 | 13.94 | 18.44 | 22.52 | 26.29 | 29.84 | 33.24 | 36.50 | 39.64 | 42.66 | 45.52 | 48.23 | 50.80 |
| 110 | 4.16 | 11.84 | 18.44 | 24.31 | 29.64 | 34.55 | 35.74 | 43.33 | 47.27 | 50.96 | 54.45 | 57.76 | 60.90 | 63.86 |
| | 0.63 | 7.11 | 12.92 | 18.06 | 22.66 | 26.85 | 30.74 | 34.39 | 37.88 | 41.22 | 44.44 | 47.54 | 50.52 | 53.37 |
| 120 | | 9.26 | 16.69 | 23.21 | 29.11 | 34.51 | 39.49 | 44.09 | 48.38 | 52.38 | 56.15 | 59.74 | 63.15 | 66.40 |
| | | 4.94 | 11.41 | 17.22 | 22.46 | 27.21 | 31.53 | 35.52 | 39.27 | 42.83 | 46.26 | 49.57 | 52.77 | 55.86 |
| 130 | | 6.20 | 14.38 | 21.73 | 28.29 | 34.17 | 39.52 | 44.46 | 49.08 | 53.42 | 57.54 | 61.44 | 65.15 | 68.66 |
| | | 2.46 | 9.88 | 16.68 | 22.74 | 28.11 | 32.92 | 37.31 | 41.38 | 45.20 | 48.81 | 52.24 | 55.51 | 58.66 |
| 140 | | | 12.18 | 20.50 | 27.75 | 34.15 | 39.86 | 45.07 | 49.92 | 54.51 | 58.86 | 62.98 | 66.95 | 70.76 |
| | | | 7.92 | 15.62 | 22.37 | 28.31 | 33.62 | 38.45 | 42.93 | 47.15 | 51.10 | 54.79 | 58.32 | 61.69 |
| 150 | | | 9.49 | 18.61 | 26.70 | 33.91 | 40.33 | 46.07 | 51.27 | 56.08 | 60.64 | 65.05 | 69.31 | 73.35 |
| | | | 5.44 | 13.84 | 21.35 | 28.03 | 33.96 | 39.26 | 44.08 | 48.55 | 52.81 | 56.91 | 60.84 | 64.57 |
| 160 | | | | 16.78 | 25.83 | 33.79 | 40.83 | 47.10 | 52.76 | 57.94 | 62.77 | 67.35 | 71.78 | 76.09 |
| | | | | 12.10 | 20.42 | 27.73 | 34.21 | 40.04 | 45.34 | 50.23 | 54.80 | 59.15 | 63.35 | 67.39 |
| 170 | | | | 15.04 | 25.01 | 33.66 | 41.21 | 47.89 | 53.93 | 59.47 | 64.63 | 69.51 | 74.19 | 78.74 |
| | | | | 10.47 | 23.52 | 27.45 | 34.42 | 40.66 | 46.33 | 51.56 | 56.46 | 61.10 | 65.61 | 70.00 |
| 180 | | | | 12.73 | 23.99 | 33.38 | 41.45 | 48.52 | 54.88 | 60.73 | 66.19 | 71.35 | 76.29 | 81.06 |
| | | | | 8.58 | 18.70 | 27.22 | 34.68 | 41.30 | 47.27 | 52.77 | 57.94 | 62.86 | 67.57 | 72.14 |
| 190 | | | | | 22.59 | 33.07 | 41.78 | 49.23 | 55.85 | 61.93 | 67.61 | 72.98 | 78.15 | 83.14 |
| | | | | | 17.71 | 27.25 | 35.21 | 42.12 | 48.34 | 54.07 | 59.44 | 64.61 | 69.63 | 74.44 |
| (mm) | | | | | | | | | | | | | | |

| r | θ 75 | 80 | 85 | 90 | 95 | 100 | 105 | 110 | 115 | 120 | (deg) |
|---|---|---|---|---|---|---|---|---|---|---|---|
| 60 | 52.58 | 54.07 | 55.08 | 55.40 | | | | | | | |
| | 40.85 | 42.83 | 44.90 | 47.25 | | | | | | | |
| 70 | 54.39 | 55.09 | | | | | | | | | |
| | 44.96 | 47.33 | | | | | | | | | |
| 80 | 56.67 | 57.27 | | | | | | | | | |
| | 47.80 | 50.19 | | | | | | | | | |
| 90 | 59.73 | 60.76 | | | | | | | | | |
| | 50.49 | 52.89 | | | | | | | | | |
| 100 | 63.22 | 64.93 | 65.76 | | | | | | | | |
| | 53.29 | 55.78 | 58.46 | | | | | | | | |
| 110 | 66.56 | 68.85 | 70.51 | | | | | | | | |
| | 56.10 | 58.77 | 61.48 | | | | | | | | |

TABLE 115-continued

| EMBODIMENT 33 | | | | | | | | | | |
|---|---|---|---|---|---|---|---|---|---|---|
| 120 | 69.48 | 72.27 | 74.60 | 76.22 | | | | | | |
| | 58.84 | 61.70 | 64.52 | 67.41 | | | | | | |
| 130 | 72.01 | 75.17 | 78.05 | 80.45 | 82.07 | | | | | |
| | 61.70 | 64.64 | 67.52 | 70.39 | 73.42 | | | | | |
| 140 | 74.38 | 77.79 | 81.00 | 83.95 | 86.42 | 88.12 | | | | |
| | 64.84 | 67.82 | 70.68 | 73.50 | 76.32 | 79.39 | | | | |
| 150 | 77.14 | 80.70 | 84.09 | 87.19 | 90.05 | 92.50 | 94.28 | | | |
| | 68.03 | 71.32 | 74.34 | 77.03 | 79.65 | 82.32 | 85.23 | | | |
| 160 | 80.20 | 83.99 | 87.45 | 90.71 | 93.83 | 96.50 | 98.67 | 100.40 | | |
| | 71.18 | 74.66 | 77.82 | 80.83 | 83.72 | 86.10 | 88.36 | 90.92 | | |
| 170 | 83.15 | 87.27 | 91.01 | 94.32 | 97.29 | 100.13 | 102.75 | 104.97 | 106.49 | |
| | 74.16 | 77.98 | 81.42 | 84.46 | 87.17 | 89.80 | 92.26 | 94.47 | 96.55 | |
| 180 | 85.74 | 90.22 | 94.25 | 97.82 | 100.94 | 103.66 | 106.12 | 108.38 | 110.26 | 111.62 |
| | 76.65 | 80.90 | 84.67 | 87.99 | 90.88 | 93.38 | 95.67 | 97.86 | 99.83 | 101.64 |
| 190 | 87.95 | 92.63 | 97.00 | 100.81 | 104.10 | 106.95 | 109.38 | 111.42 | 113.18 | 114.53 |
| | 79.03 | 83.47 | 87.61 | 91.20 | 94.28 | 96.96 | 99.27 | 101.27 | 103.19 | 104.98 |
| (mm) | | | | | | | | | | |

DIAMETER D = 400
HEIGHT h = 112 (eu = 112, ed = 106.4, fu = 3, fd = 0)
EXPANSION ANGLE λ = 120
BOSS RATIO ν = 0.275

Embodiment 34

Propeller fan 1 having the diameter D=316 mm, the height in the axial direction (z direction) h=100 mm, the number of blades n=3, the expansion angle of a blade λ=120 deg, the boss ratio ν=0.272 (boss diameter νD=86 mm) was formed to have a curved surface formed by transforming the curved surface defined by non-dimensionally expressed three-dimensional coordinates specified by Table 102 using a transformation formula 127 below, i.e. a three-dimensional curved surface specified by Table 116.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{20}{29}D(1-\nu) = \frac{20}{29} \times 316 \times (1-0.272) = 158.6\\
&b = -\frac{20}{29}D(1-\nu) \times 0.275 + \frac{\nu D}{2}\\
&\quad = -\frac{20}{29} \times 316 \times (1-0.272) \times 0.275 + \frac{0.272 \times 316}{2}\\
&\quad = -0.62\\
&c = \lambda = \frac{360}{n} = \frac{360}{3} = 120\\
&d = 0\\
&e_u = e_d = h = 100\\
&f_u = f_d = 0
\end{aligned}\right\} \quad (127)$$

TABLE 116

| EMBODIMENT 34 | | | | | | | | | | | | | |
|---|---|---|---|---|---|---|---|---|---|---|---|---|---|
| | θ | | | | | | | | | | | | |
| r | 5 | 10 | 15 | 20 | 25 | 30 | 35 | 40 | 45 | 50 | 55 | 60 | 65 |
| 46.97 | | | 19.01 | 21.50 | 23.85 | 26.14 | 28.42 | 30.67 | 32.87 | 34.99 | 37.05 | 39.04 | 40.92 |
| | | | 16.78 | 18.42 | 20.09 | 21.77 | 23.45 | 25.17 | 26.97 | 28.84 | 30.77 | 32.71 | 34.64 |

TABLE 116-continued

EMBODIMENT 34

| | | | | | | | | | | | | | |
|---|---|---|---|---|---|---|---|---|---|---|---|---|---|
| 54.9 | | 14.64 | 17.96 | 20.98 | 23.84 | 26.59 | 29.24 | 31.75 | 34.17 | 36.49 | 38.73 | 40.86 | 42.85 |
| | | 12.63 | 15.03 | 17.38 | 19.69 | 22.00 | 24.32 | 26.68 | 29.04 | 31.39 | 33.69 | 35.92 | 38.07 |
| 62.83 | 8.73 | 13.17 | 16.98 | 20.51 | 23.83 | 26.99 | 29.97 | 32.78 | 35.46 | 38.02 | 40.46 | 42.77 | 44.87 |
| | 7.59 | 11.00 | 14.20 | 17.22 | 20.11 | 22.92 | 25.68 | 28.39 | 31.04 | 33.62 | 36.09 | 38.44 | 40.67 |
| 70.76 | 6.94 | 11.64 | 15.99 | 20.05 | 23.85 | 27.40 | 30.74 | 33.88 | 36.84 | 39.65 | 42.30 | 44.79 | 47.08 |
| | 5.49 | 9.79 | 13.70 | 17.32 | 20.70 | 23.90 | 26.96 | 29.92 | 32.78 | 35.54 | 38.18 | 40.68 | 43.03 |
| 78.69 | 4.15 | 9.85 | 14.96 | 19.59 | 23.87 | 27.84 | 31.54 | 35.00 | 38.24 | 41.30 | 44.18 | 46.90 | 49.45 |
| | 3.32 | 8.42 | 13.10 | 17.33 | 21.16 | 24.71 | 28.05 | 31.24 | 34.30 | 37.26 | 40.09 | 42.78 | 45.33 |
| 86.62 | 1.04 | 7.89 | 13.79 | 19.02 | 23.79 | 28.17 | 29.24 | 36.01 | 39.53 | 42.82 | 45.94 | 48.89 | 51.69 |
| | 0.59 | 6.68 | 12.14 | 16.98 | 21.30 | 25.24 | 28.89 | 32.33 | 35.60 | 38.74 | 41.77 | 44.68 | 47.48 |
| 94.55 | | 5.59 | 12.22 | 18.05 | 23.31 | 28.13 | 32.58 | 36.69 | 40.52 | 44.09 | 47.46 | 50.66 | 53.70 |
| | | 4.64 | 10.72 | 16.18 | 21.11 | 25.57 | 29.63 | 33.39 | 36.91 | 40.26 | 43.48 | 46.59 | 49.60 |
| 102.5 | | 2.86 | 10.16 | 16.72 | 22.58 | 27.83 | 32.61 | 37.02 | 41.14 | 45.02 | 48.69 | 52.18 | 55.49 |
| | | 2.31 | 9.29 | 15.68 | 21.37 | 26.42 | 30.94 | 35.07 | 38.89 | 42.48 | 45.87 | 49.10 | 52.17 |
| 110.4 | | | 8.20 | 15.63 | 22.10 | 27.81 | 32.91 | 37.56 | 41.89 | 45.99 | 49.88 | 53.55 | 57.10 |
| | | | 7.44 | 14.68 | 21.02 | 26.61 | 31.60 | 36.13 | 40.35 | 44.31 | 48.03 | 51.49 | 54.82 |
| 118.3 | | | 5.79 | 13.93 | 21.16 | 27.60 | 33.33 | 38.46 | 43.10 | 47.39 | 51.47 | 55.41 | 59.20 |
| | | | 5.12 | 13.01 | 20.07 | 26.34 | 31.92 | 36.90 | 41.43 | 45.63 | 49.64 | 53.49 | 57.18 |
| 126.3 | | | | 12.31 | 20.39 | 27.49 | 33.78 | 39.37 | 44.42 | 49.05 | 53.37 | 57.45 | 61.41 |
| | | | | 11.37 | 19.19 | 26.06 | 32.16 | 37.63 | 42.61 | 47.21 | 51.51 | 55.59 | 59.54 |
| 134.2 | | | | 10.75 | 19.65 | 27.37 | 34.12 | 40.08 | 45.47 | 50.42 | 55.02 | 59.38 | 63.56 |
| | | | | 9.84 | 22.10 | 25.80 | 32.35 | 38.22 | 43.55 | 48.46 | 53.06 | 57.43 | 61.66 |
| 142.1 | | | | 8.69 | 18.74 | 27.12 | 34.33 | 40.65 | 46.32 | 51.54 | 56.42 | 61.03 | 65.43 |
| | | | | 8.07 | 17.58 | 25.58 | 32.60 | 38.81 | 44.42 | 49.59 | 54.45 | 59.08 | 63.51 |
| 150.1 | | | | | 17.49 | 26.85 | 34.62 | 41.27 | 47.19 | 52.62 | 57.68 | 62.48 | 67.10 |
| | | | | | 16.65 | 25.61 | 33.10 | 39.58 | 45.43 | 50.82 | 55.87 | 60.72 | 65.44 |
| (mm) | | | | | | | | | | | | | |

| | θ | | | | | | | | | | | |
|---|---|---|---|---|---|---|---|---|---|---|---|---|
| r | 70 | 75 | 80 | 85 | 90 | 95 | 100 | 105 | 110 | 115 | 120 | (deg) |
| 46.97 | 42.69 | 44.27 | 45.60 | 46.50 | 46.78 | | | | | | | |
| | 36.53 | 38.40 | 40.25 | 42.20 | 44.41 | | | | | | | |
| 54.9 | 44.58 | 45.88 | 46.51 | | | | | | | | | |
| | 40.16 | 42.26 | 44.49 | | | | | | | | | |
| 62.83 | 46.64 | 47.92 | 48.45 | | | | | | | | | |
| | 42.81 | 44.93 | 47.17 | | | | | | | | | |
| 70.76 | 49.07 | 50.65 | 51.57 | | | | | | | | | |
| | 45.26 | 47.45 | 49.71 | | | | | | | | | |
| 78.69 | 51.77 | 53.77 | 55.30 | 56.04 | | | | | | | | |
| | 47.75 | 50.09 | 52.42 | 54.94 | | | | | | | | |
| 86.62 | 54.34 | 56.75 | 58.80 | 60.28 | | | | | | | | |
| | 50.16 | 52.73 | 55.24 | 57.78 | | | | | | | | |
| 94.55 | 56.61 | 59.36 | 61.85 | 63.93 | 65.37 | | | | | | | |
| | 52.50 | 55.30 | 57.99 | 60.64 | 63.35 | | | | | | | |
| 102.5 | 58.63 | 61.61 | 64.44 | 67.01 | 69.16 | 70.60 | | | | | | |
| | 55.13 | 57.99 | 60.76 | 63.46 | 66.15 | 69.00 | | | | | | |
| 110.4 | 60.50 | 63.73 | 66.77 | 69.65 | 72.27 | 74.48 | 76.00 | | | | | |
| | 57.98 | 60.94 | 63.74 | 66.43 | 69.08 | 71.73 | 74.62 | | | | | |
| 118.3 | 62.82 | 66.19 | 69.38 | 72.40 | 75.17 | 77.73 | 79.91 | 81.50 | | | | |
| | 60.68 | 63.94 | 67.03 | 69.87 | 72.40 | 74.86 | 77.37 | 80.11 | | | | |
| 126.3 | 65.26 | 68.93 | 72.31 | 75.40 | 78.31 | 81.10 | 83.48 | 85.42 | 86.96 | | | |
| | 63.33 | 66.90 | 70.17 | 73.14 | 75.97 | 78.68 | 80.92 | 83.04 | 85.45 | | | |
| 134.2 | 67.62 | 71.56 | 75.24 | 78.58 | 81.54 | 84.19 | 86.73 | 89.06 | 91.04 | 92.41 | | |
| | 65.79 | 69.70 | 73.29 | 76.53 | 79.38 | 81.93 | 84.40 | 86.71 | 88.79 | 90.75 | | |
| 142.1 | 69.70 | 73.88 | 77.87 | 81.48 | 84.66 | 87.45 | 89.88 | 92.07 | 94.09 | 95.77 | 96.98 | |
| | 67.80 | 72.04 | 76.03 | 79.58 | 82.70 | 85.41 | 87.76 | 89.92 | 91.97 | 93.82 | 95.53 | |
| 150.1 | 71.55 | 75.85 | 80.02 | 83.93 | 87.33 | 90.27 | 92.81 | 94.98 | 96.80 | 98.38 | 99.58 | |
| | 69.96 | 74.28 | 78.45 | 82.34 | 85.71 | 88.61 | 91.13 | 93.30 | 95.18 | 96.98 | 98.67 | |
| (mm) | | | | | | | | | | | | |

DIAMETER D = 316
HEIGHT h = 100
EXPANSION ANGLE λ = 120
BOSS RATIO ν = 0.272

Embodiment 35

Propeller fan 1 having the diameter D=316 mm, the height in the axial direction (z direction) h=100 mm, the number of blades n=4, the expansion angle of a blade λ=90 deg, the boss ratio ν=0.272 (boss diameter νD=86 mm) was formed to have a curved surface formed by transforming the curved surface defined by non-dimensionally expressed three-dimensional coordinates specified by Table 102 using a transformation formula 128 below, i.e. a three-dimensional curved surface specified by Table 117.

$$
\left.\begin{aligned}
&r_1 = a \times r + b \ \text{(mm)}\\
&\theta_1 = c \times \theta + d \ \text{(deg)}\\
&z_{1u} = e_u \times z_u + f_u \ \text{(mm)}\\
&z_{1d} = e_d \times z_d + f_d \ \text{(mm)}\\
&(a,\ c,\ e_u,\ e_d\text{: factor of proportionality, } b,\ d,\ f_u,\ f_d\text{: constant})\\
&\text{wherein}\\
&a = \frac{20}{29}D(1-\nu) = \frac{20}{29}\times 316\times(1-0.272) = 158.6\\
&b = -\frac{20}{29}D(1-\nu)\times 0.275 + \frac{\nu D}{2}\\
&\quad = -\frac{20}{29}\times 316\times(1-0.272)\times 0.275 + \frac{0.272\times 316}{2}\\
&\quad = -0.62\\
&c = \lambda = \frac{360}{n} = \frac{360}{4} = 90\\
&d = 0\\
&e_u = e_d = h = 100\\
&f_u = f_d = 0
\end{aligned}\right\} \quad (128)
$$

TABLE 117

EMBODIMENT 35

| r | θ 3.75 | 7.5 | 11.25 | 15 | 18.75 | 22.5 | 26.25 | 30 | 33.75 | 37.5 | 41.25 | 45 | 48.75 |
|---|---|---|---|---|---|---|---|---|---|---|---|---|---|
| 46.97 | | | 19.01 | 21.50 | 23.85 | 26.14 | 28.42 | 30.67 | 32.87 | 34.99 | 37.05 | 39.04 | 40.92 |
| | | | 16.78 | 18.42 | 20.09 | 21.77 | 23.45 | 25.17 | 26.97 | 28.84 | 30.77 | 32.71 | 34.64 |
| 54.9 | | 14.64 | 17.96 | 20.98 | 23.84 | 26.59 | 29.24 | 31.75 | 34.17 | 36.49 | 38.73 | 40.86 | 42.85 |
| | | 12.63 | 15.03 | 17.38 | 19.69 | 22.00 | 24.32 | 26.68 | 29.04 | 31.39 | 33.69 | 35.92 | 38.07 |
| 62.83 | 8.73 | 13.17 | 16.98 | 20.51 | 23.83 | 26.99 | 29.97 | 32.78 | 35.46 | 38.02 | 40.46 | 42.77 | 44.87 |
| | 7.59 | 11.00 | 14.20 | 17.22 | 20.11 | 22.92 | 25.68 | 28.39 | 31.04 | 33.62 | 36.09 | 38.44 | 40.67 |
| 70.76 | 6.94 | 11.64 | 15.99 | 20.05 | 23.85 | 27.40 | 30.74 | 33.88 | 36.84 | 39.65 | 42.30 | 44.79 | 47.08 |
| | 5.49 | 9.79 | 13.70 | 17.32 | 20.70 | 23.90 | 26.96 | 29.92 | 32.78 | 35.54 | 38.18 | 40.68 | 43.03 |
| 78.69 | 4.15 | 9.85 | 14.96 | 19.59 | 23.87 | 27.84 | 31.54 | 35.00 | 38.24 | 41.30 | 44.18 | 46.90 | 49.45 |
| | 3.32 | 8.42 | 13.10 | 17.33 | 21.16 | 24.71 | 28.05 | 31.24 | 34.30 | 37.26 | 40.09 | 42.78 | 45.33 |
| 86.62 | 1.04 | 7.89 | 13.79 | 19.02 | 23.79 | 28.17 | 29.24 | 36.01 | 39.53 | 42.82 | 45.94 | 48.89 | 51.69 |
| | 0.59 | 6.68 | 12.14 | 16.98 | 21.30 | 25.24 | 28.89 | 32.33 | 35.60 | 38.74 | 41.77 | 44.68 | 47.48 |
| 94.55 | | 5.59 | 12.22 | 18.05 | 23.31 | 28.13 | 32.58 | 36.69 | 40.52 | 44.09 | 47.46 | 50.66 | 53.70 |
| | | 4.64 | 10.72 | 16.18 | 21.11 | 25.57 | 29.63 | 33.39 | 36.91 | 40.26 | 43.48 | 46.59 | 49.60 |
| 102.5 | | 2.86 | 10.16 | 16.72 | 22.58 | 27.83 | 32.61 | 37.02 | 41.14 | 45.02 | 48.69 | 52.18 | 55.49 |
| | | 2.31 | 9.29 | 15.68 | 21.37 | 26.42 | 30.94 | 35.07 | 38.89 | 42.48 | 45.87 | 49.10 | 52.17 |
| 110.4 | | | 8.20 | 15.63 | 22.10 | 27.81 | 32.91 | 37.56 | 41.89 | 45.99 | 49.88 | 53.55 | 57.10 |
| | | | 7.44 | 14.68 | 21.02 | 26.61 | 31.60 | 36.13 | 40.35 | 44.31 | 48.03 | 51.49 | 54.82 |
| 118.3 | | | 5.79 | 13.93 | 21.16 | 27.60 | 33.33 | 38.46 | 43.10 | 47.39 | 51.47 | 55.41 | 59.20 |
| | | | 5.12 | 13.01 | 20.07 | 26.34 | 31.92 | 36.90 | 41.43 | 45.63 | 49.64 | 53.49 | 57.18 |
| 126.3 | | | | 12.31 | 20.39 | 27.49 | 33.78 | 39.37 | 44.42 | 49.05 | 53.37 | 57.45 | 61.41 |
| | | | | 11.37 | 19.19 | 26.06 | 32.16 | 37.63 | 42.61 | 47.21 | 51.51 | 55.59 | 59.54 |
| 134.2 | | | | 10.75 | 19.65 | 27.37 | 34.12 | 40.08 | 45.47 | 50.42 | 55.02 | 59.38 | 63.56 |
| | | | | 9.84 | 22.10 | 25.80 | 32.35 | 38.22 | 43.55 | 48.46 | 53.06 | 57.43 | 61.66 |
| 142.1 | | | | 8.69 | 18.74 | 27.12 | 34.33 | 40.65 | 46.32 | 51.54 | 56.42 | 61.03 | 65.43 |
| | | | | 8.07 | 17.58 | 25.58 | 32.60 | 38.81 | 44.42 | 49.59 | 54.45 | 59.08 | 63.51 |
| 150.1 | | | | | 17.49 | 26.85 | 34.62 | 41.27 | 47.19 | 52.62 | 57.68 | 62.48 | 67.10 |
| | | | | | 16.65 | 25.61 | 33.10 | 39.58 | 45.43 | 50.82 | 55.87 | 60.72 | 65.44 |
| (mm) | | | | | | | | | | | | | |

| r | θ 52.5 | 56.25 | 60 | 63.75 | 67.5 | 71.25 | 75 | 78.75 | 82.5 | 86.25 | 90 | (deg) |
|---|---|---|---|---|---|---|---|---|---|---|---|---|
| 46.97 | 42.69 | 44.27 | 45.60 | 46.50 | 46.78 | | | | | | | |
| | 36.53 | 38.40 | 40.25 | 42.20 | 44.41 | | | | | | | |
| 54.9 | 44.58 | 45.88 | 46.51 | | | | | | | | | |
| | 40.16 | 42.26 | 44.49 | | | | | | | | | |
| 62.83 | 46.64 | 47.92 | 48.45 | | | | | | | | | |
| | 42.81 | 44.93 | 47.17 | | | | | | | | | |
| 70.76 | 49.07 | 50.65 | 51.57 | | | | | | | | | |
| | 45.26 | 47.45 | 49.71 | | | | | | | | | |
| 78.69 | 51.77 | 53.77 | 55.30 | 56.04 | | | | | | | | |
| | 47.75 | 50.09 | 52.42 | 54.94 | | | | | | | | |

TABLE 117-continued

| EMBODIMENT 35 | | | | | | | | | | | |
|---|---|---|---|---|---|---|---|---|---|---|---|
| 86.62 | 54.34 | 56.75 | 58.80 | 60.28 | | | | | | | |
| | 50.16 | 52.73 | 55.24 | 57.78 | | | | | | | |
| 94.55 | 56.61 | 59.36 | 61.85 | 63.93 | 65.37 | | | | | | |
| | 52.50 | 55.30 | 57.99 | 60.64 | 63.35 | | | | | | |
| 102.5 | 58.63 | 61.61 | 64.44 | 67.01 | 69.16 | 70.60 | | | | | |
| | 55.13 | 57.99 | 60.76 | 63.46 | 66.15 | 69.00 | | | | | |
| 110.4 | 60.50 | 63.73 | 66.77 | 69.65 | 72.27 | 74.48 | 76.00 | | | | |
| | 57.98 | 60.94 | 63.74 | 66.43 | 69.08 | 71.73 | 74.62 | | | | |
| 118.3 | 62.82 | 66.19 | 69.38 | 72.40 | 75.17 | 77.73 | 79.91 | 81.50 | | | |
| | 60.68 | 63.94 | 67.03 | 69.87 | 72.40 | 74.86 | 77.37 | 80.11 | | | |
| 126.3 | 65.26 | 68.93 | 72.31 | 75.40 | 78.31 | 81.10 | 83.48 | 85.42 | 86.96 | | |
| | 63.33 | 66.90 | 70.17 | 73.14 | 75.97 | 78.68 | 80.92 | 83.04 | 85.45 | | |
| 134.2 | 67.62 | 71.56 | 75.24 | 78.58 | 81.54 | 84.19 | 86.73 | 89.06 | 91.04 | 92.41 | |
| | 65.79 | 69.70 | 73.29 | 76.53 | 79.38 | 81.93 | 84.40 | 86.71 | 88.79 | 90.75 | |
| 142.1 | 69.70 | 73.88 | 77.87 | 81.48 | 84.66 | 87.45 | 89.88 | 92.07 | 94.09 | 95.77 | 96.98 |
| | 67.80 | 72.04 | 76.03 | 79.58 | 82.70 | 85.41 | 87.76 | 89.92 | 91.97 | 93.82 | 95.53 |
| 150.1 | 71.55 | 75.85 | 80.02 | 83.93 | 87.33 | 90.27 | 92.81 | 94.98 | 96.80 | 98.38 | 99.58 |
| | 69.96 | 74.28 | 78.45 | 82.34 | 85.71 | 88.61 | 91.13 | 93.30 | 95.18 | 96.98 | 98.67 |
| (mm) | | | | | | | | | | | |

DIAMETER D = 316
HEIGHT h = 100
EXPANSION ANGLE λ = 90
BOSS RATIO ν = 0.272

Embodiment 36

Propeller fan 1 having the diameter D=316 mm, the height in the axial direction (z direction) h=100 mm, the number of blades n=5, the expansion angle of a blade λ=72 deg, the boss ratio ν=0.272 (boss diameter νD=86 mm) was formed to have a curved surface formed by transforming the curved surface defined by non-dimensionally expressed three-dimensional coordinates specified by Table 102 using a transformation formula 129 below, i.e. a three-dimensional curved surface specified by Table 118.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality; } b, d, f_u, f_d\text{: constant})\\
&\text{wherein}\\
&a = \frac{20}{29}D(1-\nu) = \frac{20}{29}\times 316\times(1-0.272) = 158.6\\
&b = -\frac{20}{29}D(1-\nu)\times 0.275 + \frac{\nu D}{2}\\
&\quad = -\frac{20}{29}\times 316\times(1-0.272)\times 0.275 + \frac{0.272\times 316}{2}\\
&\quad = -0.62\\
&c = \lambda = \frac{360}{n} = \frac{360}{5} = 72\\
&d = 0\\
&e_u = e_d = h = 100\\
&f_u = f_d = 0
\end{aligned}\right\}\quad (129)$$

TABLE 118

| EMBODIMENT 36 | | | | | | | | | | | | | |
|---|---|---|---|---|---|---|---|---|---|---|---|---|---|
| | θ | | | | | | | | | | | | |
| r | 3 | 6 | 9 | 12 | 15 | 18 | 21 | 24 | 27 | 30 | 33 | 36 | 39 |
| 46.97 | | | 19.01 | 21.50 | 23.85 | 26.14 | 28.42 | 30.67 | 32.87 | 34.99 | 37.05 | 39.04 | 40.92 |
| | | | 16.78 | 18.42 | 20.09 | 21.77 | 23.45 | 25.17 | 26.97 | 28.84 | 30.77 | 32.71 | 34.64 |
| 54.9 | | 14.64 | 17.96 | 20.98 | 23.84 | 26.59 | 29.24 | 31.75 | 34.17 | 36.49 | 38.73 | 40.86 | 42.85 |
| | | 12.63 | 15.03 | 17.38 | 19.69 | 22.00 | 24.32 | 26.68 | 29.04 | 31.39 | 33.69 | 35.92 | 38.07 |
| 62.83 | 8.73 | 13.17 | 16.98 | 20.51 | 23.83 | 26.99 | 29.97 | 32.78 | 35.46 | 38.02 | 40.46 | 42.77 | 44.87 |
| | 7.59 | 11.00 | 14.20 | 17.22 | 20.11 | 22.92 | 25.68 | 28.39 | 31.04 | 33.62 | 36.09 | 38.44 | 40.67 |
| 70.76 | 6.94 | 11.64 | 15.99 | 20.05 | 23.85 | 27.40 | 30.74 | 33.88 | 36.84 | 39.65 | 42.30 | 44.79 | 47.08 |
| | 5.49 | 9.79 | 13.70 | 17.32 | 20.70 | 23.90 | 26.96 | 29.92 | 32.78 | 35.54 | 38.18 | 40.68 | 43.03 |

TABLE 118-continued

| EMBODIMENT 36 | | | | | | | | | | | | | |
|---|---|---|---|---|---|---|---|---|---|---|---|---|---|
| 78.69 | 4.15 | 9.85 | 14.96 | 19.59 | 23.87 | 27.84 | 31.54 | 35.00 | 38.24 | 41.30 | 44.18 | 46.90 | 49.45 |
| | 3.32 | 8.42 | 13.10 | 17.33 | 21.16 | 24.71 | 28.05 | 31.24 | 34.30 | 37.26 | 40.09 | 42.78 | 45.33 |
| 86.62 | 1.04 | 7.89 | 13.79 | 19.02 | 23.79 | 28.17 | 29.24 | 36.01 | 39.53 | 42.82 | 45.94 | 48.89 | 51.69 |
| | 0.59 | 6.68 | 12.14 | 16.98 | 21.30 | 25.24 | 28.89 | 32.33 | 35.60 | 38.74 | 41.77 | 44.68 | 47.48 |
| 94.55 | | 5.59 | 12.22 | 18.05 | 23.31 | 28.13 | 32.58 | 36.69 | 40.52 | 44.09 | 47.46 | 50.66 | 53.70 |
| | | 4.64 | 10.72 | 16.18 | 21.11 | 25.57 | 29.63 | 33.39 | 36.91 | 40.26 | 43.48 | 46.59 | 49.60 |
| 102.5 | | 2.86 | 10.16 | 16.72 | 22.58 | 27.83 | 32.61 | 37.02 | 41.14 | 45.02 | 48.69 | 52.18 | 55.49 |
| | | 2.31 | 9.29 | 15.68 | 21.37 | 26.42 | 30.94 | 35.07 | 38.89 | 42.48 | 45.87 | 49.10 | 52.17 |
| 110.4 | | | 8.20 | 15.63 | 22.10 | 27.81 | 32.91 | 37.56 | 41.89 | 45.99 | 49.88 | 53.55 | 57.10 |
| | | | 7.44 | 14.68 | 21.02 | 26.61 | 31.60 | 36.13 | 40.35 | 44.31 | 48.03 | 51.49 | 54.82 |
| 118.3 | | | 5.79 | 13.93 | 21.16 | 27.60 | 33.33 | 38.46 | 43.10 | 47.39 | 51.47 | 55.41 | 59.20 |
| | | | 5.12 | 13.01 | 20.07 | 26.34 | 31.92 | 36.90 | 41.43 | 45.63 | 49.64 | 53.49 | 57.18 |
| 126.3 | | | | 12.31 | 20.39 | 27.49 | 33.78 | 39.37 | 44.42 | 49.05 | 53.37 | 57.45 | 61.41 |
| | | | | 11.37 | 19.19 | 26.06 | 32.16 | 37.63 | 42.61 | 47.21 | 51.51 | 55.59 | 59.54 |
| 134.2 | | | | 10.75 | 19.65 | 27.37 | 34.12 | 40.08 | 45.47 | 50.42 | 55.02 | 59.38 | 63.56 |
| | | | | 9.84 | 22.10 | 25.80 | 32.35 | 38.22 | 43.55 | 48.46 | 53.06 | 57.43 | 61.66 |
| 142.1 | | | | 8.69 | 18.74 | 27.12 | 34.33 | 40.65 | 46.32 | 51.54 | 56.42 | 61.03 | 65.43 |
| | | | | 8.07 | 17.58 | 25.58 | 32.60 | 38.81 | 44.42 | 49.59 | 54.45 | 59.08 | 63.51 |
| 150.1 | | | | | 17.49 | 26.85 | 34.62 | 41.27 | 47.19 | 52.62 | 57.68 | 62.48 | 67.10 |
| | | | | | 16.65 | 25.61 | 33.10 | 39.58 | 45.43 | 50.82 | 55.87 | 60.72 | 65.44 |
| (mm) | | | | | | | | | | | | | |

| | θ | | | | | | | | | | | |
|---|---|---|---|---|---|---|---|---|---|---|---|---|
| r | 42 | 45 | 48 | 51 | 54 | 57 | 60 | 63 | 66 | 69 | 72 | (deg) |
| 46.97 | 42.69 | 44.27 | 45.60 | 46.50 | 46.78 | | | | | | | |
| | 36.53 | 38.40 | 40.25 | 42.20 | 44.41 | | | | | | | |
| 54.9 | 44.58 | 45.88 | 46.51 | | | | | | | | | |
| | 40.16 | 42.26 | 44.49 | | | | | | | | | |
| 62.83 | 46.64 | 47.92 | 48.45 | | | | | | | | | |
| | 42.81 | 44.93 | 47.17 | | | | | | | | | |
| 70.76 | 49.07 | 50.65 | 51.57 | | | | | | | | | |
| | 45.26 | 47.45 | 49.71 | | | | | | | | | |
| 78.69 | 51.77 | 53.77 | 55.30 | 56.04 | | | | | | | | |
| | 47.75 | 50.09 | 52.42 | 54.94 | | | | | | | | |
| 86.62 | 54.34 | 56.75 | 58.80 | 60.28 | | | | | | | | |
| | 50.16 | 52.73 | 55.24 | 57.78 | | | | | | | | |
| 94.55 | 56.61 | 59.36 | 61.85 | 63.93 | 65.37 | | | | | | | |
| | 52.50 | 55.30 | 57.99 | 60.64 | 63.35 | | | | | | | |
| 102.5 | 58.63 | 61.61 | 64.44 | 67.01 | 69.16 | 70.60 | | | | | | |
| | 55.13 | 57.99 | 60.76 | 63.46 | 66.15 | 69.00 | | | | | | |
| 110.4 | 60.50 | 63.73 | 66.77 | 69.65 | 72.27 | 74.48 | 76.00 | | | | | |
| | 57.98 | 60.94 | 63.74 | 66.43 | 69.08 | 71.73 | 74.62 | | | | | |
| 118.3 | 62.82 | 66.19 | 69.38 | 72.40 | 75.17 | 77.73 | 79.91 | 81.50 | | | | |
| | 60.68 | 63.94 | 67.03 | 69.87 | 72.40 | 74.86 | 77.37 | 80.11 | | | | |
| 126.3 | 65.26 | 68.93 | 72.31 | 75.40 | 78.31 | 81.10 | 83.48 | 85.42 | 86.96 | | | |
| | 63.33 | 66.90 | 70.17 | 73.14 | 75.97 | 78.68 | 80.92 | 83.04 | 85.45 | | | |
| 134.2 | 67.62 | 71.56 | 75.24 | 78.58 | 81.54 | 84.19 | 86.73 | 89.06 | 91.04 | 92.41 | | |
| | 65.79 | 69.70 | 73.29 | 76.53 | 79.38 | 81.93 | 84.40 | 86.71 | 88.79 | 90.75 | | |
| 142.1 | 69.70 | 73.88 | 77.87 | 81.48 | 84.66 | 87.45 | 89.88 | 92.07 | 94.09 | 95.77 | 96.98 | |
| | 67.80 | 72.04 | 76.03 | 79.58 | 82.70 | 85.41 | 87.76 | 89.92 | 91.97 | 93.82 | 95.53 | |
| 150.1 | 71.55 | 75.85 | 80.02 | 83.93 | 87.33 | 90.27 | 92.81 | 94.98 | 96.80 | 98.38 | 99.58 | |
| | 69.96 | 74.28 | 78.45 | 82.34 | 85.71 | 88.61 | 91.13 | 93.30 | 95.18 | 96.98 | 98.67 | |
| (mm) | | | | | | | | | | | | |

DIAMETER D = 316
HEIGHT h = 100
EXPANSION ANGLE λ = 72
BOSS RATIO ν = 0.272

Embodiment 37

Propeller fan 1 having the diameter D=316 mm, the height in the axial direction (z direction) h=100 mm, the number of blades n=5, the expansion angle of a blade λ=108.5 deg, the boss ratio ν=0.272 (boss diameter νD=86 mm) was formed to have a curved surface formed by transforming the curved surface defined by non-dimensionally expressed three-dimensional coordinates specified by Table 102 using a transformation formula 130 below, i.e. a three-dimensional curved surface specified by Table 119.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{20}{29}D(1-v) = \frac{20}{29} \times 316 \times (1-0.272) = 158.6\\
&b = -\frac{20}{29}D(1-v) \times 0.275 + \frac{vD}{2}\\
&\quad = -\frac{20}{29} \times 316 \times (1-0.272) \times 0.275 + \frac{0.272 \times 316}{2}\\
&\quad = -0.62\\
&c = \lambda = \frac{2400}{7} \times \frac{h}{D} = \frac{2400}{7} \times \frac{140}{400} = 108.5\\
&d = 0\\
&e_u = e_d = h = 100\\
&f_u = f_d = 0
\end{aligned}\right\} \quad (130)$$

TABLE 119

EMBODIMENT 37

| r | θ | | | | | | | | | | | | |
|---|---|---|---|---|---|---|---|---|---|---|---|---|---|
| | 4.521 | 9.042 | 13.56 | 18.08 | 22.6 | 27.13 | 31.65 | 36.17 | 40.69 | 45.21 | 49.73 | 54.25 | 58.77 |
| 46.97 | | | 19.01 | 21.50 | 23.85 | 26.14 | 28.42 | 30.67 | 32.87 | 34.99 | 37.05 | 39.04 | 40.92 |
| | | | 16.78 | 18.42 | 20.09 | 21.77 | 23.45 | 25.17 | 26.97 | 28.84 | 30.77 | 32.71 | 34.64 |
| 54.9 | | 14.64 | 17.96 | 20.98 | 23.84 | 26.59 | 29.24 | 31.75 | 34.17 | 36.49 | 38.73 | 40.86 | 42.85 |
| | | 12.63 | 15.03 | 17.38 | 19.69 | 22.00 | 24.32 | 26.68 | 29.04 | 31.39 | 33.69 | 35.92 | 38.07 |
| 62.83 | 8.73 | 13.17 | 16.98 | 20.51 | 23.83 | 26.99 | 29.97 | 32.78 | 35.46 | 38.02 | 40.46 | 42.77 | 44.87 |
| | 7.59 | 11.00 | 14.20 | 17.22 | 20.11 | 22.92 | 25.68 | 28.39 | 31.04 | 33.62 | 36.09 | 38.44 | 40.67 |
| 70.76 | 6.94 | 11.64 | 15.99 | 20.05 | 23.85 | 27.40 | 30.74 | 33.88 | 36.84 | 39.65 | 42.30 | 44.79 | 47.08 |
| | 5.49 | 9.79 | 13.70 | 17.32 | 20.70 | 23.90 | 26.96 | 29.92 | 32.78 | 35.54 | 38.18 | 40.68 | 43.03 |
| 78.69 | 4.15 | 9.85 | 14.96 | 19.59 | 23.87 | 27.84 | 31.54 | 35.00 | 38.24 | 41.30 | 44.18 | 46.90 | 49.45 |
| | 3.32 | 8.42 | 13.10 | 17.33 | 21.16 | 24.71 | 28.05 | 31.24 | 4.30 | 37.26 | 40.09 | 42.78 | 45.33 |
| 86.62 | 1.04 | 7.89 | 13.79 | 19.02 | 23.79 | 28.17 | 29.24 | 36.01 | 39.53 | 42.82 | 45.94 | 48.89 | 51.69 |
| | 0.59 | 6.68 | 12.14 | 16.98 | 21.30 | 25.24 | 28.89 | 32.33 | 35.60 | 38.74 | 41.77 | 44.68 | 47.48 |
| 94.55 | | 5.59 | 12.22 | 18.05 | 23.31 | 28.13 | 32.58 | 36.69 | 40.52 | 44.09 | 47.46 | 50.66 | 53.70 |
| | | 4.64 | 10.72 | 16.18 | 21.11 | 25.57 | 29.63 | 33.39 | 36.91 | 40.26 | 43.48 | 46.59 | 49.60 |
| 102.5 | | 2.86 | 10.16 | 16.72 | 22.58 | 27.83 | 32.61 | 37.02 | 41.14 | 45.02 | 48.69 | 52.18 | 55.49 |
| | | 2.31 | 9.29 | 15.68 | 21.37 | 26.42 | 30.94 | 35.07 | 38.89 | 42.48 | 45.87 | 49.10 | 52.17 |
| 110.4 | | | 8.20 | 15.63 | 22.10 | 27.81 | 32.91 | 37.56 | 41.89 | 45.99 | 49.88 | 53.55 | 57.10 |
| | | | 7.44 | 14.68 | 21.02 | 26.61 | 31.60 | 36.13 | 40.35 | 44.31 | 48.03 | 51.49 | 54.82 |
| 118.3 | | | 5.79 | 13.93 | 21.16 | 27.60 | 33.33 | 38.46 | 43.10 | 47.39 | 51.47 | 55.41 | 59.20 |
| | | | 5.12 | 13.01 | 20.07 | 26.34 | 31.92 | 36.90 | 41.43 | 45.63 | 49.64 | 53.49 | 57.18 |
| 126.3 | | | | 12.31 | 20.39 | 27.49 | 33.78 | 39.37 | 44.42 | 49.05 | 53.37 | 57.45 | 61.41 |
| | | | | 11.37 | 19.19 | 26.06 | 32.16 | 37.63 | 42.61 | 47.21 | 51.51 | 55.59 | 59.54 |
| 134.2 | | | | 10.75 | 19.65 | 27.37 | 34.12 | 40.08 | 45.47 | 50.42 | 55.02 | 59.38 | 63.56 |
| | | | | 9.84 | 22.10 | 25.80 | 32.35 | 38.22 | 43.55 | 48.46 | 53.06 | 57.43 | 61.66 |
| 142.1 | | | | 8.69 | 18.74 | 27.12 | 34.33 | 40.65 | 46.32 | 51.54 | 56.42 | 61.03 | 65.43 |
| | | | | 8.07 | 17.58 | 25.58 | 32.60 | 38.81 | 44.42 | 49.59 | 54.45 | 59.08 | 63.51 |
| 150.1 | | | | | 17.49 | 26.85 | 34.62 | 41.27 | 47.19 | 52.62 | 57.68 | 62.48 | 67.10 |
| | | | | | 16.65 | 25.61 | 33.10 | 39.58 | 45.43 | 50.82 | 55.87 | 60.72 | 65.44 |
| (mm) | | | | | | | | | | | | | |

| r | θ | | | | | | | | | | | |
|---|---|---|---|---|---|---|---|---|---|---|---|---|
| | 63.29 | 67.81 | 72.33 | 76.85 | 81.38 | 85.9 | 90.42 | 94.94 | 99.46 | 104 | 108.5 | (deg) |
| 46.97 | 42.69 | 44.27 | 45.60 | 46.50 | 46.78 | | | | | | | |
| | 36.53 | 38.40 | 40.25 | 42.20 | 44.41 | | | | | | | |
| 54.9 | 44.58 | 45.88 | 46.51 | | | | | | | | | |
| | 40.16 | 42.26 | 44.49 | | | | | | | | | |
| 62.83 | 46.64 | 47.92 | 48.45 | | | | | | | | | |
| | 42.81 | 44.93 | 47.17 | | | | | | | | | |
| 70.76 | 49.07 | 50.65 | 51.57 | | | | | | | | | |
| | 45.26 | 47.45 | 49.71 | | | | | | | | | |
| 78.69 | 51.77 | 53.77 | 55.30 | 56.04 | | | | | | | | |
| | 47.75 | 50.09 | 52.42 | 54.94 | | | | | | | | |

TABLE 119-continued

| EMBODIMENT 37 | | | | | | | | | | | |
|---|---|---|---|---|---|---|---|---|---|---|---|
| 86.62 | 54.34 | 56.75 | 58.80 | 60.28 | | | | | | | |
| | 50.16 | 52.73 | 55.24 | 57.78 | | | | | | | |
| 94.55 | 56.61 | 59.36 | 61.85 | 63.93 | 65.37 | | | | | | |
| | 52.50 | 55.30 | 57.99 | 60.64 | 63.35 | | | | | | |
| 102.5 | 58.63 | 61.61 | 64.44 | 67.01 | 69.16 | 70.60 | | | | | |
| | 55.13 | 57.99 | 60.76 | 63.46 | 66.15 | 69.00 | | | | | |
| 110.4 | 60.50 | 63.73 | 66.77 | 69.65 | 72.27 | 74.48 | 76.00 | | | | |
| | 57.98 | 60.94 | 63.74 | 66.43 | 69.08 | 71.73 | 74.62 | | | | |
| 118.3 | 62.82 | 66.19 | 69.38 | 72.40 | 75.17 | 77.73 | 79.91 | 81.50 | | | |
| | 60.68 | 63.94 | 67.03 | 69.87 | 72.40 | 74.86 | 77.37 | 80.11 | | | |
| 126.3 | 65.26 | 68.93 | 72.31 | 75.40 | 78.31 | 81.10 | 83.48 | 85.42 | 86.96 | | |
| | 63.33 | 66.90 | 70.17 | 73.14 | 75.97 | 78.68 | 80.92 | 83.04 | 85.45 | | |
| 134.2 | 67.62 | 71.56 | 75.24 | 78.58 | 81.54 | 84.19 | 86.73 | 89.06 | 91.04 | 92.41 | |
| | 65.79 | 69.70 | 73.29 | 76.53 | 79.38 | 81.93 | 84.40 | 86.71 | 88.79 | 90.75 | |
| 142.1 | 69.70 | 73.88 | 77.87 | 81.48 | 84.66 | 87.45 | 89.88 | 92.07 | 94.09 | 95.77 | 96.98 |
| | 67.80 | 72.04 | 76.03 | 79.58 | 82.70 | 85.41 | 87.76 | 89.92 | 91.97 | 93.82 | 95.53 |
| 150.1 | 71.55 | 75.85 | 80.02 | 83.93 | 87.33 | 90.27 | 92.81 | 94.98 | 96.80 | 98.38 | 99.58 |
| | 69.96 | 74.28 | 78.45 | 82.34 | 85.71 | 88.61 | 91.13 | 93.30 | 95.18 | 96.98 | 98.67 |
| (mm) | | | | | | | | | | | |

DIAMETER D = 316
HEIGHT h = 100
EXPANSION ANGLE λ = 108.5
BOSS RATIO ν = 0.272

Embodiment 38

Propeller fan 1 having the diameter D=460 mm, the height in the axial direction (z direction) h=161 mm, the number of blades n=3, the expansion angle of a blade λ=120 deg, the boss ratio ν=0.326 (boss diameter νD=150 mm) was formed to have a curved surface formed by transforming the curved surface defined by non-dimensionally expressed three-dimensional coordinates specified by Table 102 using a transformation formula 131 below, i.e. a three-dimensional curved surface specified by Table 120.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{20}{29}D(1-\nu) = \frac{20}{29}\times 460\times(1-0.326) = 213.8\\
&b = -\frac{20}{29}D(1-\nu)\times 0.275 + \frac{\nu D}{2}\\
&\quad = -\frac{20}{29}\times 460\times(1-0.326)\times 0.275 + \frac{0.326\times 460}{2}\\
&\quad = 16.21\\
&c = \lambda = \frac{360}{n} = \frac{2400}{7}\times\frac{h}{D} = \frac{2400}{7}\times\frac{161}{460} = 120\\
&d = 0\\
&e_u = e_d = h = 161\\
&f_u = f_d = 0
\end{aligned}\right\} \quad (131)$$

TABLE 120

| EMBODIMENT 38 | | | | | | | | | | | | | | |
|---|---|---|---|---|---|---|---|---|---|---|---|---|---|---|
| | θ | | | | | | | | | | | | | |
| r | 5 | 10 | 15 | 20 | 25 | 30 | 35 | 40 | 45 | 50 | 55 | 60 | 65 | 70 |
| 80.34 | | | 30.61 | 34.62 | 38.39 | 42.09 | 45.76 | 49.38 | 52.91 | 56.34 | 59.66 | 62.85 | 65.88 | 68.73 |
| | | | 27.01 | 29.65 | 32.35 | 35.05 | 37.75 | 40.53 | 43.42 | 46.44 | 49.53 | 52.67 | 55.77 | 58.82 |
| 91.03 | | 23.57 | 28.92 | 33.77 | 38.38 | 42.81 | 47.07 | 51.13 | 55.01 | 58.75 | 62.35 | 65.78 | 68.99 | 71.77 |
| | | 20.33 | 24.20 | 27.98 | 31.70 | 35.42 | 39.16 | 42.95 | 46.76 | 50.53 | 54.24 | 57.83 | 61.29 | 64.66 |
| 101.7 | 14.06 | 21.20 | 27.35 | 33.02 | 38.37 | 43.45 | 48.25 | 52.78 | 57.09 | 61.21 | 65.14 | 68.86 | 72.24 | 75.09 |
| | 12.22 | 17.71 | 22.85 | 27.72 | 32.37 | 36.90 | 41.35 | 45.71 | 49.98 | 54.12 | 58.11 | 61.89 | 65.48 | 68.92 |
| 112.4 | 11.17 | 18.75 | 25.74 | 32.29 | 38.40 | 44.12 | 49.49 | 54.54 | 59.31 | 63.83 | 68.10 | 72.11 | 75.79 | 79.00 |
| | 8.84 | 15.76 | 22.05 | 27.89 | 33.33 | 38.48 | 43.41 | 48.17 | 52.78 | 57.22 | 61.47 | 65.49 | 69.27 | 72.87 |
| 123.1 | 6.68 | 15.87 | 24.08 | 31.55 | 38.43 | 44.83 | 50.78 | 56.35 | 61.57 | 66.49 | 71.13 | 75.51 | 79.61 | 83.35 |
| | 5.35 | 13.56 | 21.09 | 27.90 | 34.07 | 39.78 | 45.16 | 50.29 | 55.23 | 59.99 | 64.54 | 68.88 | 72.98 | 76.87 |

TABLE 120-continued

EMBODIMENT 38

| | | | | | | | | | | | | | | |
|---|---|---|---|---|---|---|---|---|---|---|---|---|---|---|
| 133.8 | 1.67 | 12.71 | 22.20 | 30.63 | 38.29 | 45.35 | 47.07 | 57.97 | 63.64 | 68.95 | 73.96 | 78.71 | 83.22 | 87.49 |
| | 0.95 | 10.76 | 19.55 | 27.33 | 34.29 | 40.63 | 46.51 | 52.04 | 57.32 | 62.38 | 67.25 | 71.94 | 76.44 | 80.75 |
| 144.5 | | 8.99 | 19.68 | 29.05 | 37.53 | 45.30 | 52.45 | 59.07 | 65.23 | 70.99 | 76.41 | 81.56 | 86.46 | 91.14 |
| | | 7.47 | 17.27 | 26.05 | 33.99 | 41.17 | 47.71 | 53.75 | 59.42 | 64.82 | 70.00 | 75.01 | 79.85 | 84.53 |
| 155.2 | | 4.61 | 16.36 | 26.92 | 36.36 | 44.81 | 52.50 | 59.60 | 66.23 | 72.48 | 78.40 | 84.01 | 89.33 | 94.39 |
| | | 3.73 | 14.95 | 25.24 | 34.40 | 42.54 | 49.82 | 56.46 | 62.62 | 68.40 | 73.86 | 79.04 | 84.00 | 88.76 |
| 165.9 | | | 13.20 | 25.16 | 35.58 | 44.78 | 52.99 | 60.48 | 67.45 | 74.05 | 80.31 | 86.21 | 91.92 | 97.40 |
| | | | 11.98 | 23.64 | 33.85 | 42.84 | 50.87 | 58.17 | 64.96 | 71.34 | 77.32 | 82.90 | 88.25 | 93.34 |
| 176.6 | | | 9.33 | 22.43 | 34.07 | 44.43 | 53.66 | 61.91 | 69.39 | 76.30 | 82.86 | 89.20 | 95.31 | 101.13 |
| | | | 8.24 | 20.94 | 32.31 | 42.41 | 51.38 | 59.41 | 66.70 | 73.47 | 79.92 | 86.11 | 92.07 | 97.70 |
| 187.2 | | | | 19.81 | 32.82 | 44.26 | 54.38 | 63.39 | 71.52 | 78.98 | 85.92 | 92.50 | 98.88 | 105.07 |
| | | | | 18.31 | 30.90 | 41.96 | 51.77 | 60.59 | 68.61 | 76.01 | 82.92 | 89.51 | 95.86 | 101.96 |
| 197.9 | | | | 17.30 | 31.64 | 44.07 | 54.93 | 64.53 | 73.21 | 81.17 | 88.59 | 95.61 | 102.33 | 108.87 |
| | | | | 15.84 | 35.58 | 41.54 | 52.09 | 61.53 | 70.11 | 78.02 | 85.43 | 92.46 | 99.28 | 105.92 |
| 208.6 | | | | 13.99 | 30.18 | 43.67 | 55.28 | 65.44 | 74.58 | 82.98 | 90.83 | 98.25 | 105.35 | 112.21 |
| | | | | 12.99 | 28.30 | 41.19 | 52.48 | 62.49 | 71.52 | 79.85 | 87.67 | 95.12 | 102.25 | 109.16 |
| 219.3 | | | | | 28.16 | 43.23 | 55.74 | 66.45 | 75.97 | 84.72 | 92.87 | 100.59 | 108.03 | 115.20 |
| | | | | | 26.80 | 41.23 | 53.28 | 63.73 | 73.15 | 81.81 | 89.95 | 97.76 | 105.35 | 112.64 |
| (mm) | | | | | | | | | | | | | | |

| | θ | | | | | | | | | |
|---|---|---|---|---|---|---|---|---|---|---|
| r | 75 | 80 | 85 | 90 | 95 | 100 | 105 | 110 | 115 | 120 | (deg) |
| 80.34 | 71.28 | 73.41 | 74.87 | 75.32 | | | | | | | |
| | 61.82 | 64.81 | 67.95 | 71.50 | | | | | | | |
| 91.03 | 73.87 | 74.88 | | | | | | | | | |
| | 68.03 | 71.62 | | | | | | | | | |
| 101.7 | 77.16 | 78.01 | | | | | | | | | |
| | 72.33 | 75.95 | | | | | | | | | |
| 112.4 | 81.55 | 83.03 | | | | | | | | | |
| | 76.39 | 80.04 | | | | | | | | | |
| 123.1 | 86.57 | 89.03 | 90.22 | | | | | | | | |
| | 80.64 | 84.40 | 88.45 | | | | | | | | |
| 133.8 | 91.37 | 94.66 | 97.05 | | | | | | | | |
| | 84.89 | 88.93 | 93.03 | | | | | | | | |
| 144.5 | 95.57 | 99.57 | 102.93 | 105.25 | | | | | | | |
| | 89.03 | 93.36 | 97.62 | 102.00 | | | | | | | |
| 155.2 | 99.20 | 103.75 | 107.88 | 111.34 | 113.67 | | | | | | |
| | 93.36 | 97.82 | 102.17 | 106.51 | 111.09 | | | | | | |
| 165.9 | 102.61 | 107.51 | 112.13 | 116.36 | 119.91 | 122.37 | | | | | |
| | 98.12 | 102.61 | 106.95 | 111.21 | 115.49 | 120.14 | | | | | |
| 176.6 | 106.57 | 111.70 | 116.56 | 121.02 | 125.14 | 128.65 | 131.22 | | | | |
| | 102.94 | 107.92 | 112.49 | 116.56 | 120.52 | 124.56 | 128.97 | | | | |
| 187.2 | 110.97 | 116.43 | 121.39 | 126.08 | 130.56 | 134.40 | 137.53 | 140.01 | | | |
| | 107.71 | 112.97 | 117.75 | 122.31 | 126.67 | 130.29 | 133.70 | 137.58 | | | |
| 197.9 | 115.21 | 121.14 | 126.52 | 131.28 | 135.54 | 139.63 | 143.39 | 146.58 | 148.77 | | |
| | 112.22 | 117.99 | 123.21 | 127.80 | 131.91 | 135.88 | 139.60 | 142.95 | 146.10 | | |
| 208.6 | 118.94 | 125.38 | 131.18 | 136.30 | 140.80 | 144.70 | 148.24 | 151.49 | 154.19 | 156.13 | |
| | 115.98 | 122.41 | 128.12 | 133.14 | 137.52 | 141.30 | 144.76 | 148.08 | 151.05 | 153.80 | |
| 219.3 | 122.12 | 128.84 | 135.12 | 140.60 | 145.33 | 149.43 | 152.92 | 155.85 | 158.39 | 160.32 | |
| | 119.59 | 126.30 | 132.56 | 137.99 | 142.66 | 146.72 | 150.21 | 153.23 | 156.14 | 158.86 | |
| (mm) | | | | | | | | | | | |

DIAMETER D = 460
HEIGHT h = 161
EXPANSION ANGLE λ = 120
BOSS RATIO ν = 0.326

Embodiment 39

Propeller fan 1 having the diameter D=460 mm, the height in the axial direction (z direction) h=168 mm, the number of blades n=3, the expansion angle of a blade λ=120 deg, the boss ratio ν=0.326 (boss diameter νD=150 mm) was formed to have a curved surface formed by transforming the curved surface defined by non-dimensionally expressed three-dimensional coordinates specified by Table 102 using a transformation formula 132 below, i.e. a three-dimensional curved surface specified by Table 121.

$$
\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{20}{29}D(1-\nu) = \frac{20}{29} \times 460 \times (1-0.326) = 213.8\\
&b = -\frac{20}{29}D(1-\nu) \times 0.275 + \frac{\nu D}{2}\\
&\quad = -\frac{20}{29} \times 460 \times (1-0.326) \times 0.275 + \frac{0.326 \times 460}{2}\\
&\quad = 16.21\\
&c = \lambda = \frac{2400}{7} \times \frac{h}{D} = \frac{2400}{7} \times \frac{168}{460} = 125.2\\
&d = 0\\
&e_u = e_d = h = 168\\
&f_u = f_d = 0
\end{aligned}\right\} \quad (132)
$$

TABLE 121

EMBODIMENT 39

| r | θ 5.217 | 10.43 | 15.65 | 20.87 | 26.08 | 31.3 | 36.52 | 41.73 | 46.95 | 52.17 | 57.38 | 62.6 | 67.82 | 73.03 |
|---|---|---|---|---|---|---|---|---|---|---|---|---|---|---|
| 80.34 | | | 31.94 | 36.12 | 40.06 | 43.92 | 47.75 | 51.53 | 55.21 | 58.79 | 62.25 | 65.58 | 68.75 | 71.71 |
| | | | 28.19 | 30.94 | 33.75 | 36.57 | 39.39 | 42.29 | 45.31 | 48.45 | 51.69 | 54.96 | 58.20 | 61.38 |
| 91.03 | | 24.59 | 30.18 | 35.24 | 40.05 | 44.68 | 49.12 | 53.35 | 57.40 | 61.31 | 65.06 | 68.64 | 71.99 | 74.89 |
| | | 21.22 | 25.25 | 29.20 | 33.08 | 36.96 | 40.86 | 44.82 | 48.79 | 52.73 | 56.60 | 60.35 | 63.96 | 67.47 |
| 101.7 | 14.67 | 22.13 | 28.53 | 34.46 | 40.04 | 45.34 | 50.35 | 55.08 | 59.57 | 63.87 | 67.98 | 71.85 | 75.38 | 78.35 |
| | 12.75 | 18.48 | 23.85 | 28.92 | 33.78 | 38.51 | 43.14 | 47.69 | 52.15 | 56.48 | 60.63 | 64.59 | 68.33 | 71.92 |
| 112.4 | 11.65 | 19.56 | 26.86 | 33.69 | 40.06 | 46.03 | 51.64 | 56.91 | 61.89 | 66.60 | 71.06 | 75.24 | 79.09 | 82.44 |
| | 9.22 | 16.44 | 23.01 | 29.11 | 34.78 | 40.15 | 45.30 | 50.26 | 55.07 | 59.71 | 64.15 | 68.34 | 72.29 | 76.04 |
| 123.1 | 6.97 | 16.56 | 25.13 | 32.92 | 40.10 | 46.77 | 52.99 | 58.80 | 64.25 | 69.38 | 74.23 | 78.79 | 83.07 | 86.98 |
| | 5.58 | 14.15 | 22.01 | 29.11 | 35.55 | 41.51 | 47.12 | 52.48 | 57.63 | 62.59 | 67.35 | 71.88 | 76.16 | 80.22 |
| 133.8 | 1.74 | 13.26 | 23.16 | 31.96 | 39.96 | 47.32 | 49.12 | 60.49 | 66.40 | 71.94 | 77.17 | 82.14 | 86.84 | 91.29 |
| | 0.99 | 11.23 | 20.40 | 28.52 | 35.78 | 42.40 | 48.53 | 54.31 | 59.81 | 65.09 | 70.18 | 75.07 | 79.77 | 84.26 |
| 144.5 | | 9.38 | 20.53 | 30.32 | 39.16 | 47.27 | 54.73 | 61.64 | 68.07 | 74.07 | 79.73 | 85.10 | 90.22 | 95.10 |
| | | 7.80 | 18.02 | 27.19 | 35.47 | 42.96 | 49.79 | 56.09 | 62.01 | 67.63 | 73.04 | 78.27 | 83.33 | 88.21 |
| 155.2 | | 4.81 | 17.07 | 28.09 | 37.94 | 46.76 | 54.78 | 62.19 | 69.11 | 75.63 | 81.81 | 87.66 | 93.22 | 98.50 |
| | | 3.89 | 15.60 | 26.34 | 35.90 | 44.39 | 51.98 | 58.91 | 65.34 | 71.37 | 77.07 | 82.48 | 87.65 | 92.62 |
| 165.9 | | | 13.77 | 26.25 | 37.13 | 46.72 | 55.29 | 63.10 | 70.38 | 77.26 | 83.80 | 89.96 | 95.92 | 101.64 |
| | | | 12.50 | 24.67 | 35.32 | 44.71 | 53.08 | 60.70 | 67.79 | 74.44 | 80.68 | 86.50 | 92.09 | 97.40 |
| 176.6 | | | 9.73 | 23.41 | 35.55 | 46.36 | 55.99 | 64.61 | 72.40 | 79.61 | 86.47 | 93.08 | 99.46 | 105.53 |
| | | | 8.60 | 21.85 | 33.71 | 44.26 | 53.62 | 62.00 | 69.60 | 76.66 | 83.39 | 89.86 | 96.07 | 101.94 |
| 187.2 | | | | 20.68 | 34.25 | 46.19 | 56.75 | 66.15 | 74.63 | 82.41 | 89.66 | 96.52 | 103.18 | 109.64 |
| | | | | 19.10 | 32.24 | 43.79 | 54.02 | 63.22 | 71.59 | 79.32 | 86.53 | 93.40 | 100.03 | 106.40 |
| 197.9 | | | | 18.05 | 33.01 | 45.99 | 57.31 | 67.34 | 76.39 | 84.70 | 92.44 | 99.76 | 106.78 | 113.60 |
| | | | | 16.53 | 37.13 | 43.35 | 54.35 | 64.21 | 73.16 | 81.41 | 89.15 | 96.48 | 103.59 | 110.53 |
| 208.6 | | | | 14.60 | 31.49 | 45.57 | 57.68 | 68.29 | 77.82 | 86.59 | 94.78 | 102.52 | 109.93 | 117.09 |
| | | | | 13.55 | 29.53 | 42.98 | 54.76 | 65.20 | 74.63 | 83.32 | 91.48 | 99.26 | 106.70 | 113.91 |
| 219.3 | | | | | 29.39 | 45.11 | 58.17 | 69.34 | 79.28 | 88.40 | 96.91 | 104.96 | 112.72 | 120.21 |
| | | | | | 27.96 | 43.02 | 55.60 | 66.50 | 76.33 | 85.37 | 93.86 | 102.01 | 109.93 | 117.54 |
| (mm) | | | | | | | | | | | | | | |

| r | θ 78.25 | 83.47 | 88.68 | 93.9 | 99.12 | 104.3 | 109.6 | 114.8 | 120 | 125.2 | (deg) |
|---|---|---|---|---|---|---|---|---|---|---|---|
| 80.34 | 74.38 | 76.60 | 78.12 | 78.59 | | | | | | | |
| | 64.51 | 67.63 | 70.90 | 74.61 | | | | | | | |
| 91.03 | 77.08 | 78.14 | | | | | | | | | |
| | 70.99 | 74.74 | | | | | | | | | |
| 101.7 | 80.51 | 81.40 | | | | | | | | | |
| | 75.47 | 79.25 | | | | | | | | | |
| 112.4 | 85.09 | 86.64 | | | | | | | | | |
| | 79.72 | 83.52 | | | | | | | | | |
| 123.1 | 90.34 | 92.90 | 94.14 | | | | | | | | |
| | 84.14 | 88.07 | 92.30 | | | | | | | | |

TABLE 121-continued

| EMBODIMENT 39 | | | | | | | | | | |
|---|---|---|---|---|---|---|---|---|---|---|
| 133.8 | 95.34 | 98.78 | 101.27 | | | | | | | |
| | 88.58 | 92.80 | 97.08 | | | | | | | |
| 144.5 | 99.72 | 103.90 | 107.40 | 109.82 | | | | | | |
| | 92.90 | 97.42 | 101.87 | 106.43 | | | | | | |
| 155.2 | 103.51 | 108.26 | 112.57 | 116.18 | 118.61 | | | | | |
| | 97.42 | 102.07 | 106.61 | 111.14 | 115.92 | | | | | |
| 165.9 | 107.07 | 112.18 | 117.01 | 121.42 | 125.13 | 127.69 | | | | |
| | 102.38 | 107.08 | 111.60 | 116.05 | 120.51 | 125.36 | | | | |
| 176.6 | 111.21 | 116.56 | 121.63 | 126.29 | 130.58 | 134.24 | 136.92 | | | |
| | 107.42 | 112.61 | 117.38 | 121.63 | 125.76 | 129.98 | 134.58 | | | |
| 187.2 | 115.79 | 121.49 | 126.67 | 131.56 | 136.24 | 140.24 | 143.51 | 146.09 | | |
| | 112.39 | 117.88 | 122.87 | 127.62 | 132.18 | 135.95 | 139.51 | 143.56 | | |
| 197.9 | 120.22 | 126.41 | 132.02 | 136.98 | 141.44 | 145.70 | 149.63 | 152.95 | 155.24 | |
| | 117.10 | 123.12 | 128.56 | 133.36 | 137.64 | 141.78 | 145.67 | 149.17 | 152.45 | |
| 208.6 | 124.11 | 130.83 | 136.88 | 142.23 | 146.92 | 150.99 | 154.68 | 158.08 | 160.90 | 162.92 |
| | 121.02 | 127.73 | 133.69 | 138.93 | 143.49 | 147.44 | 151.06 | 154.51 | 157.62 | 160.49 |
| 219.3 | 127.43 | 134.44 | 141.00 | 146.72 | 151.65 | 155.92 | 159.57 | 162.63 | 165.27 | 167.29 |
| | 124.79 | 131.80 | 138.32 | 143.99 | 148.86 | 153.09 | 156.74 | 159.90 | 162.93 | 165.76 |
| (mm) | | | | | | | | | | |

DIAMETER D = 460
HEIGHT h = 168
EXPANSION ANGLE λ = 125.2
BOSS RATIO ν = 0.326

Embodiment 40

Propeller fan 1 having the diameter D=460 mm, the height in the axial direction (z direction) h=140 mm, the number of blades n=3, the expansion angle of a blade λ=120 deg, the boss ratio ν=0.326 (boss diameter νD=150 mm) was formed to have a curved surface formed by transforming the curved surface defined by non-dimensionally expressed three-dimensional coordinates specified by Table 102 using a transformation formula 133 below, i.e. a three-dimensional curved surface specified by Table 122.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality; } b, d, f_u, f_d\text{: constant})\\
&\text{wherein}\\
&a = \frac{20}{29}D(1-\nu) = \frac{20}{29} \times 460 \times (1-0.326) = 213.8\\
&b = -\frac{20}{29}D(1-\nu) \times 0.275 + \frac{\nu D}{2}\\
&\quad = -\frac{20}{29} \times 460 \times (1-0.326) \times 0.275 + \frac{0.326 \times 460}{2}\\
&\quad = 16.21\\
&c = \lambda = \frac{2400}{7} \times \frac{h}{D} = \frac{2400}{7} \times \frac{140}{460} = 104.3\\
&d = 0\\
&e_u = e_d = h = 140\\
&f_u = f_d = 0
\end{aligned}\right\} \quad (133)$$

TABLE 122

| EMBODIMENT 40 | | | | | | | | | | | | | | |
|---|---|---|---|---|---|---|---|---|---|---|---|---|---|---|
| | θ | | | | | | | | | | | | | |
| r | 4.346 | 8.692 | 13.04 | 17.38 | 21.73 | 26.08 | 30.42 | 34.77 | 39.11 | 43.46 | 47.8 | 52.15 | 56.5 | 60.84 |
| 80.34 | | | 26.62 | 30.10 | 33.38 | 36.60 | 39.79 | 42.94 | 46.01 | 48.99 | 51.88 | 54.65 | 57.29 | 59.76 |
| | | | 23.49 | 25.79 | 28.13 | 30.48 | 32.83 | 35.24 | 37.75 | 40.38 | 43.07 | 45.80 | 48.50 | 51.15 |
| 91.03 | | 20.50 | 25.15 | 29.37 | 33.38 | 37.23 | 40.93 | 44.46 | 47.83 | 51.09 | 54.22 | 57.20 | 59.99 | 62.41 |
| | | 17.68 | 21.04 | 24.33 | 27.57 | 30.80 | 34.05 | 37.35 | 40.66 | 43.94 | 47.17 | 50.29 | 53.30 | 56.23 |
| 101.7 | 12.22 | 18.44 | 23.78 | 28.72 | 33.36 | 37.78 | 41.95 | 45.90 | 49.64 | 53.23 | 56.65 | 59.87 | 62.82 | 65.29 |
| | 10.63 | 15.40 | 19.87 | 24.10 | 28.15 | 32.09 | 35.95 | 39.74 | 43.46 | 47.06 | 50.53 | 53.82 | 56.94 | 59.93 |
| 112.4 | 9.71 | 16.30 | 22.39 | 28.07 | 33.39 | 38.36 | 43.03 | 47.43 | 51.58 | 55.50 | 59.22 | 62.70 | 65.91 | 68.70 |
| | 7.69 | 13.70 | 19.17 | 24.25 | 28.98 | 33.46 | 37.75 | 41.89 | 45.89 | 49.76 | 53.46 | 56.95 | 60.24 | 63.37 |
| 123.1 | 5.81 | 13.80 | 20.94 | 27.43 | 33.42 | 38.98 | 44.16 | 49.00 | 53.54 | 57.82 | 61.86 | 65.66 | 69.23 | 72.48 |
| | 4.65 | 11.79 | 18.34 | 24.26 | 29.63 | 34.59 | 39.27 | 43.73 | 48.03 | 52.16 | 56.13 | 59.90 | 63.46 | 66.85 |

TABLE 122-continued

| EMBODIMENT 40 | | | | | | | | | | | | | | |
|---|---|---|---|---|---|---|---|---|---|---|---|---|---|---|
| 133.8 | 1.45 | 11.05 | 19.30 | 26.63 | 33.30 | 39.44 | 40.93 | 50.41 | 55.34 | 59.95 | 64.31 | 68.45 | 72.37 | 76.07 |
| | 0.83 | 9.36 | 17.00 | 23.77 | 29.82 | 35.33 | 40.44 | 45.26 | 49.84 | 54.24 | 58.48 | 62.56 | 66.47 | 70.22 |
| 144.5 | | 7.82 | 17.11 | 25.26 | 32.64 | 39.39 | 45.61 | 51.37 | 56.72 | 61.73 | 66.44 | 70.92 | 75.18 | 79.25 |
| | | 6.50 | 15.01 | 22.66 | 29.55 | 35.80 | 41.49 | 46.74 | 51.67 | 56.36 | 60.87 | 65.22 | 69.44 | 73.51 |
| 155.2 | | 4.01 | 14.23 | 23.41 | 31.62 | 38.97 | 45.65 | 51.83 | 57.60 | 63.03 | 68.17 | 73.05 | 77.68 | 82.08 |
| | | 3.24 | 13.00 | 21.95 | 29.92 | 36.99 | 43.32 | 49.09 | 54.45 | 59.48 | 64.22 | 68.73 | 73.04 | 77.18 |
| 165.9 | | | 11.48 | 21.88 | 30.94 | 38.94 | 46.08 | 52.59 | 58.65 | 64.39 | 69.83 | 74.97 | 79.93 | 84.70 |
| | | | 10.41 | 20.56 | 29.43 | 37.25 | 44.23 | 50.59 | 56.49 | 62.04 | 67.24 | 72.09 | 76.74 | 81.17 |
| 176.6 | | | 8.11 | 19.51 | 29.62 | 38.63 | 46.66 | 53.84 | 60.34 | 66.35 | 72.06 | 77.57 | 82.88 | 87.94 |
| | | | 7.16 | 18.21 | 28.10 | 36.88 | 44.68 | 51.66 | 58.00 | 63.89 | 69.49 | 74.88 | 80.06 | 84.95 |
| 187.2 | | | | 17.23 | 28.54 | 38.49 | 47.29 | 55.12 | 62.19 | 68.67 | 74.71 | 80.44 | 85.98 | 91.37 |
| | | | | 15.92 | 26.87 | 36.49 | 45.02 | 52.68 | 59.66 | 66.10 | 72.11 | 77.83 | 83.36 | 88.66 |
| 197.9 | | | | 15.05 | 27.51 | 38.32 | 47.76 | 56.12 | 63.66 | 70.58 | 77.03 | 83.14 | 88.98 | 94.67 |
| | | | | 13.77 | 30.94 | 36.12 | 45.29 | 53.51 | 60.96 | 67.84 | 74.29 | 80.40 | 86.33 | 92.11 |
| 208.6 | | | | 12.17 | 26.24 | 37.97 | 48.07 | 56.91 | 64.85 | 72.16 | 78.98 | 85.44 | 91.61 | 97.58 |
| | | | | 11.29 | 24.61 | 35.82 | 45.63 | 54.34 | 62.19 | 69.43 | 76.23 | 82.71 | 88.91 | 94.92 |
| 219.3 | | | | | 24.49 | 37.59 | 48.47 | 57.78 | 66.06 | 73.67 | 80.76 | 87.47 | 93.94 | 100.17 |
| | | | | | 23.30 | 35.85 | 46.33 | 55.41 | 63.61 | 71.14 | 78.22 | 85.01 | 91.61 | 97.95 |
| (mm) | | | | | | | | | | | | | | |

| | θ | | | | | | | | | | |
|---|---|---|---|---|---|---|---|---|---|---|---|
| r | 65.19 | 69.53 | 73.88 | 78.23 | 82.57 | 86.92 | 91.26 | 95.61 | 99.95 | 104.3 | (deg) |
| 80.34 | 61.98 | 63.83 | 65.10 | 65.49 | | | | | | | |
| | 53.76 | 56.36 | 59.08 | 62.17 | | | | | | | |
| 91.03 | 64.24 | 65.12 | | | | | | | | | |
| | 59.16 | 62.28 | | | | | | | | | |
| 101.7 | 67.09 | 67.84 | | | | | | | | | |
| | 62.90 | 66.04 | | | | | | | | | |
| 112.4 | 70.91 | 72.20 | | | | | | | | | |
| | 66.43 | 69.60 | | | | | | | | | |
| 123.1 | 75.28 | 77.42 | 78.45 | | | | | | | | |
| | 70.12 | 73.39 | 76.92 | | | | | | | | |
| 133.8 | 79.45 | 82.31 | 84.39 | | | | | | | | |
| | 73.82 | 77.33 | 80.90 | | | | | | | | |
| 144.5 | 83.10 | 86.59 | 89.50 | 91.52 | | | | | | | |
| | 77.42 | 81.18 | 84.89 | 88.69 | | | | | | | |
| 155.2 | 86.26 | 90.21 | 93.81 | 96.82 | 98.84 | | | | | | |
| | 81.18 | 85.06 | 88.84 | 92.62 | 96.60 | | | | | | |
| 165.9 | 89.23 | 93.48 | 97.51 | 101.18 | 104.27 | 106.41 | | | | | |
| | 85.32 | 89.23 | 93.00 | 96.71 | 100.43 | 104.47 | | | | | |
| 176.6 | 92.67 | 97.13 | 101.36 | 105.24 | 108.82 | 111.87 | 114.10 | | | | |
| | 89.51 | 93.84 | 97.82 | 101.36 | 104.80 | 108.31 | 112.15 | | | | |
| 187.2 | 96.50 | 101.24 | 105.56 | 109.64 | 113.53 | 116.87 | 119.59 | 121.74 | | | |
| | 93.66 | 98.23 | 102.39 | 106.35 | 110.15 | 113.29 | 116.26 | 119.63 | | | |
| 197.9 | 100.19 | 105.34 | 110.01 | 114.15 | 117.87 | 121.42 | 124.69 | 127.46 | 129.37 | | |
| | 97.58 | 102.60 | 107.14 | 111.13 | 114.70 | 118.15 | 121.39 | 124.31 | 127.04 | | |
| 208.6 | 103.43 | 109.02 | 114.07 | 118.53 | 122.43 | 125.83 | 128.90 | 131.73 | 134.08 | 135.77 | |
| | 100.85 | 106.45 | 111.41 | 115.77 | 119.58 | 122.87 | 125.88 | 128.76 | 131.35 | 133.74 | |
| 219.3 | 106.19 | 112.03 | 117.50 | 122.26 | 126.37 | 129.94 | 132.98 | 135.53 | 137.73 | 139.41 | |
| | 103.99 | 109.83 | 115.27 | 120.00 | 124.05 | 127.58 | 130.62 | 133.25 | 135.77 | 138.14 | |
| (mm) | | | | | | | | | | | |

DIAMETER D = 460
HEIGHT h = 140
EXPANSION ANGLE λ = 104.3
BOSS RATIO ν = 0.326

Figure 14:
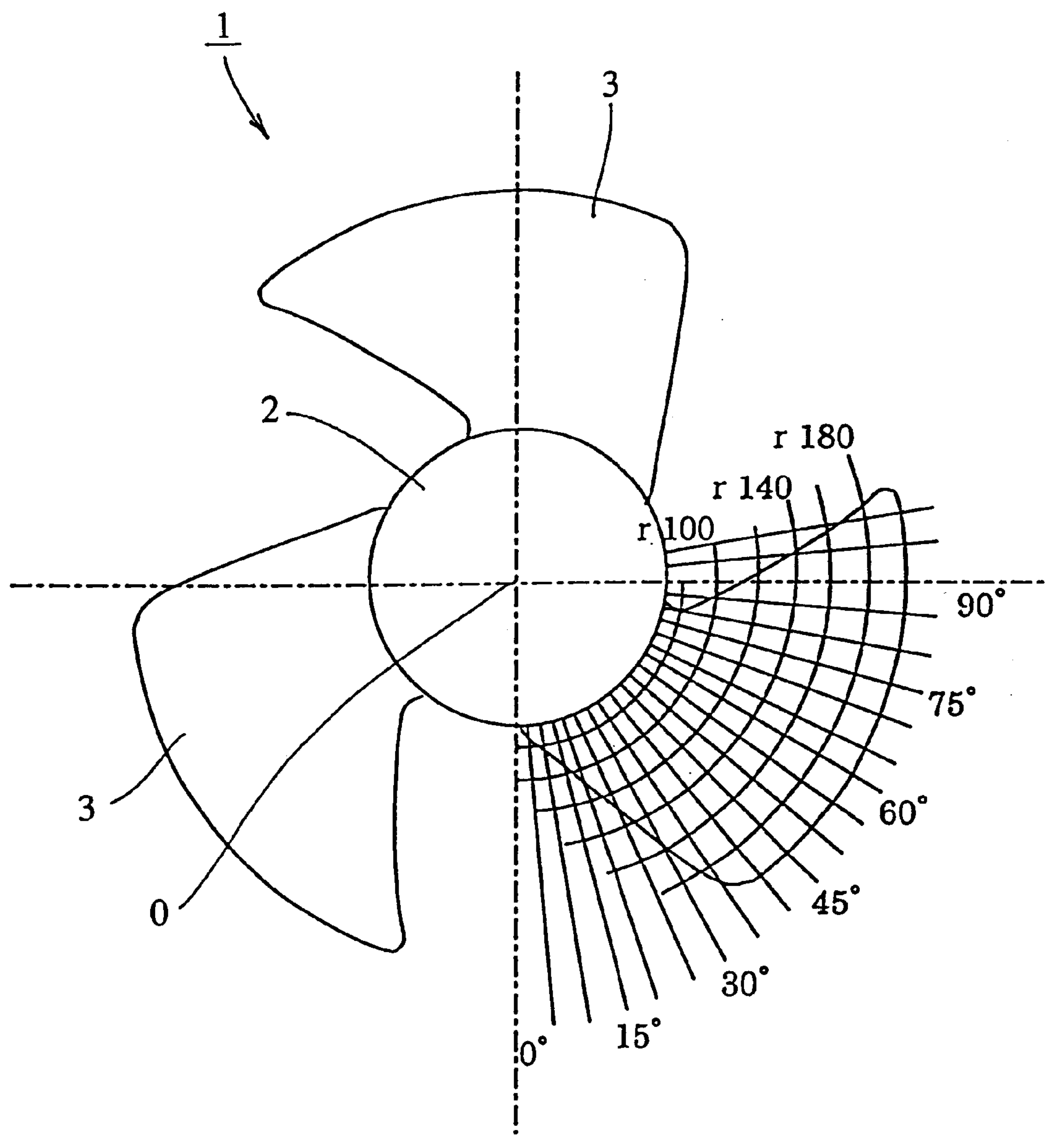
FIG. 14 is a front view of a propeller fan in Comparison Example 4.
Figure 15:
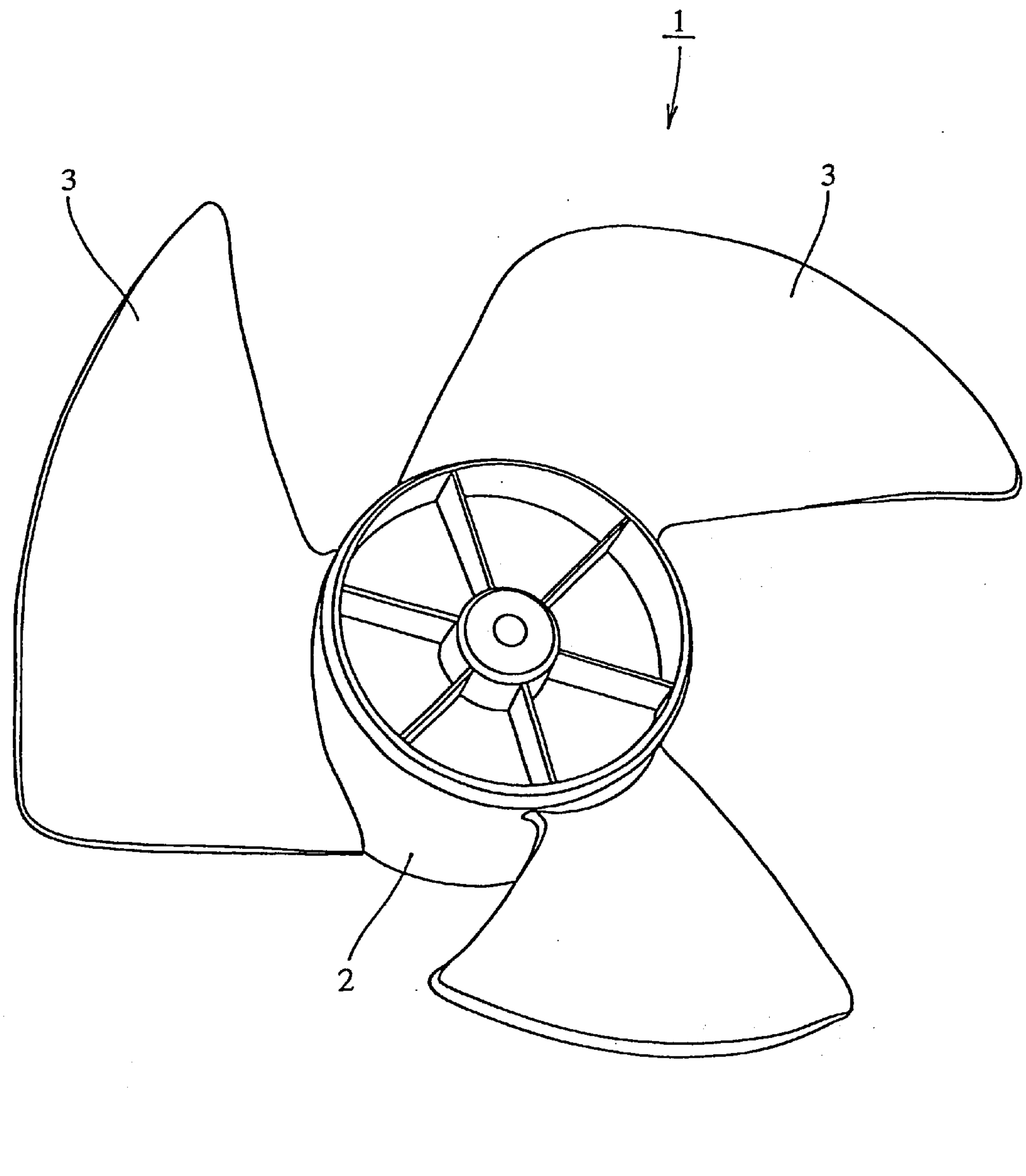
FIG. 15 is a perspective view of (the negative pressure surface side of) the propeller fan in Comparison Example 4.
Figure 16:
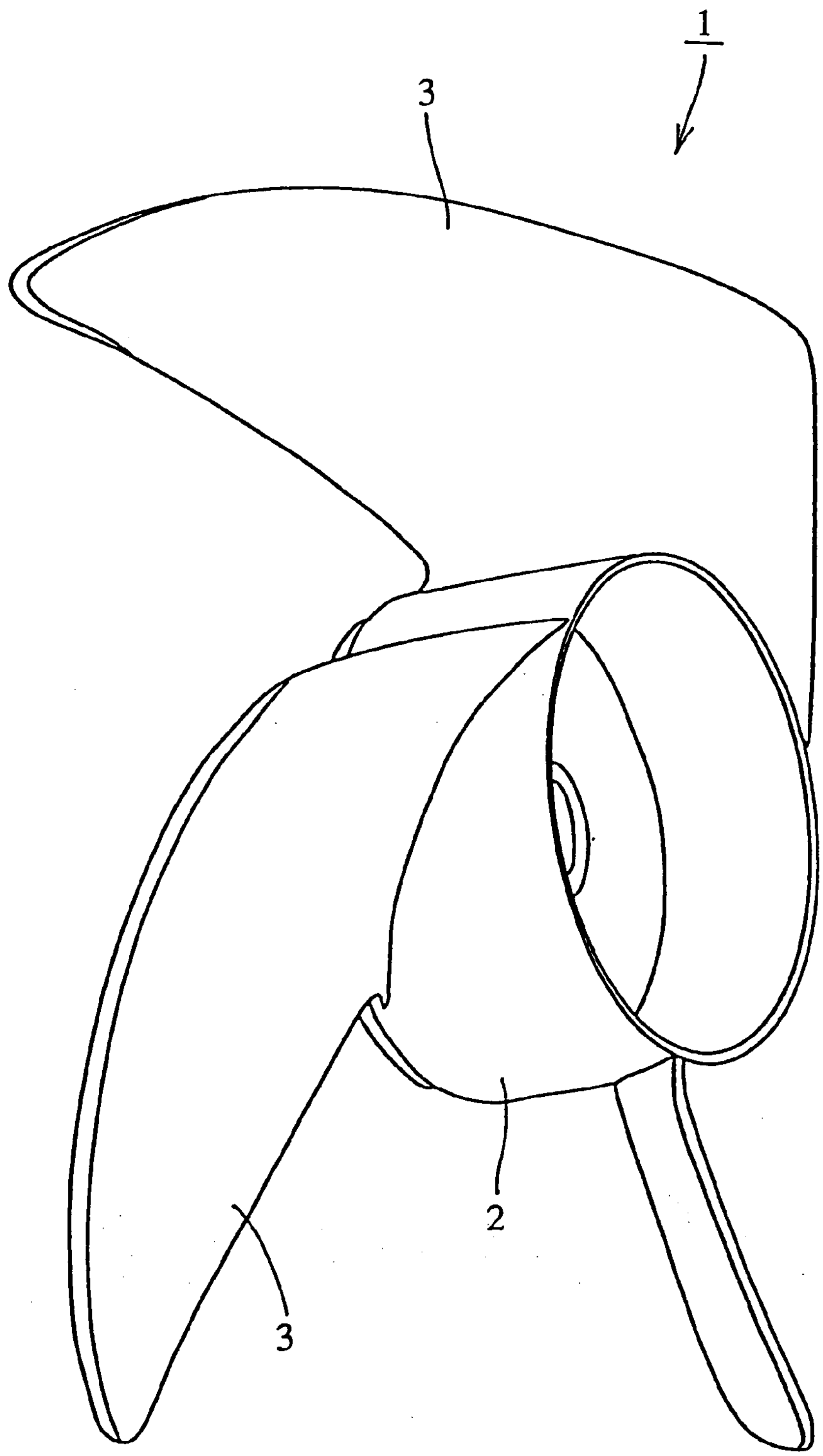
FIG. 16 is a perspective view of (the positive pressure surface side of) the propeller fan in Comparison Example 4.

Comparison examples of the present invention will be described below with reference to FIGS. 14 to 16. FIG. 14 is a front view of a propeller fan in Comparison Example 4, whereas FIGS. 15 and 16 are perspective views of the propeller fan in Comparison Example 4.

Comparison Example 4

Propeller fan 1 shown in FIG. 4 having the diameter D=400 mm, the height in the axial direction (z direction) h=140 mm, the number of blades n=3, the boss ratio ν=0.35 (boss diameter νD=140 mm) was formed such that the surface of blade 3 is a three-dimensional curved surface specified by Table 123 below. A boss portion is denoted by 2 in the drawings. Note that r, θ, z are set as in Embodiment 21.

TABLE 123

| COMPARISON EXAMPLE 4 | | | | | | | | | | | | |
|---|---|---|---|---|---|---|---|---|---|---|---|---|
| | θ | | | | | | | | | | | |
| r | 10° | 15° | 20° | 25° | 30° | 35° | 40° | 45° | 50° | 55° | 60° | 65° |
| r 80 | 11.73 | 19.10 | 25.44 | 30.60 | 35.31 | 39.90 | 44.45 | 48.84 | 53.00 | 56.91 | 60.54 | 63.79 |
| | 6.47 | 13.00 | 19.27 | 24.95 | 29.81 | 34.29 | 38.60 | 42.80 | 46.92 | 50.95 | 54.90 | 58.74 |
| r 90 | | 12.73 | 20.94 | 27.79 | 33.67 | 39.12 | 44.39 | 49.38 | 54.09 | 58.55 | 62.71 | 66.45 |
| | | 7.72 | 15.35 | 22.37 | 28.82 | 34.15 | 39.00 | 43.69 | 48.20 | 52.63 | 56.99 | 61.24 |
| r 100 | | | 16.09 | 24.55 | 31.82 | 38.32 | 44.30 | 50.03 | 55.39 | 60.47 | 65.25 | 69.55 |
| | | | 11.10 | 19.49 | 27.06 | 33.78 | 39.34 | 44.59 | 49.60 | 54.42 | 59.19 | 63.83 |
| r 110 | | | | 21.17 | 29.78 | 37.40 | 44.32 | 50.81 | 56.89 | 62.60 | 67.99 | 72.88 |
| | | | 6.47 | 16.35 | 25.27 | 32.95 | 39.56 | 45.48 | 51.16 | 56.38 | 61.52 | 66.48 |
| r 120 | | | | 16.62 | 27.71 | 36.46 | 44.43 | 51.73 | 58.63 | 65.02 | 70.96 | 76.44 |
| | | | | 12.48 | 23.19 | 32.11 | 39.60 | 46.35 | 52.75 | 58.54 | 64.01 | 69.27 |
| r 130 | | | | | 25.07 | 35.42 | 44.45 | 52.76 | 60.49 | 67.60 | 74.14 | 80.18 |
| | | | | | 20.47 | 30.82 | 39.57 | 47.10 | 54.26 | 60.75 | 66.61 | 72.15 |
| r 140 | | | | | 21.38 | 34.00 | 44.38 | 53.67 | 62.26 | 70.13 | 77.30 | 83.88 |
| | | | | | 16.83 | 29.05 | 39.13 | 47.59 | 55.60 | 62.95 | 69.35 | 75.17 |
| r 150 | | | | | 15.39 | 31.83 | 43.84 | 54.32 | 63.84 | 72.47 | 80.37 | 87.60 |
| | | | | | 12.94 | 26.57 | 38.27 | 47.91 | 56.81 | 64.97 | 72.10 | 78.38 |
| r 160 | | | | | | 29.55 | 43.21 | 54.64 | 65.14 | 74.33 | 82.96 | 90.49 |
| | | | | | | 23.69 | 37.38 | 48.40 | 57.93 | 66.86 | 74.86 | 81.82 |
| r 170 | | | | | | 27.10 | 42.68 | 55.44 | 66.28 | 75.62 | 84.39 | 92.42 |
| | | | | | | 21.19 | 36.26 | 48.76 | 59.06 | 68.53 | 77.20 | 85.22 |
| r 180 | | | | | | 21.52 | 42.14 | 56.11 | 67.43 | 77.37 | 86.87 | 95.58 |
| | | | | | | 19.14 | 35.30 | 49.17 | 60.36 | 70.38 | 79.63 | 88.20 |
| (mm) | | | | | | | | | | | | |

| | θ | | | | | | |
|---|---|---|---|---|---|---|---|
| r | 70° | 75° | 80° | 85° | 90° | 95° | 100° |
| r 80 | 66.69 | | | | | | |
| | 62.24 | 65.73 | | | | | |
| r 90 | 69.78 | 72.78 | | | | | |
| | 65.20 | 69.05 | 72.74 | | | | |
| r 100 | 73.43 | 76.96 | | | | | |
| | 68.22 | 72.41 | 76.43 | 79.97 | | | |
| r 110 | 77.34 | 81.37 | 84.91 | | | | |
| | 71.29 | 75.84 | 80.24 | 84.27 | | | |
| r 120 | 81.49 | 86.04 | 90.12 | 93.56 | | | |
| | 74.42 | 79.38 | 84.27 | 88.88 | 92.94 | | |
| r 130 | 85.76 | 90.79 | 95.43 | 99.34 | | | |
| | 77.63 | 83.00 | 88.46 | 93.70 | 98.22 | | |
| r 140 | 90.14 | 95.73 | 100.80 | 105.22 | 108.78 | | |
| | 80.99 | 86.79 | 92.74 | 98.44 | 103.48 | 107.80 | |
| r 150 | 94.28 | 100.52 | 106.07 | 110.94 | 114.95 | | |
| | 84.69 | 90.96 | 97.16 | 103.19 | 108.58 | 113.56 | |
| r 160 | 97.62 | 104.34 | 110.63 | 116.05 | 120.85 | 124.87 | |
| | 88.68 | 95.47 | 101.96 | 108.15 | 113.87 | 119.15 | 123.49 |
| r 170 | 100.19 | 107.31 | 114.13 | 120.38 | 126.11 | 130.86 | |
| | 92.83 | 99.88 | 106.68 | 113.09 | 119.02 | 124.38 | 128.87 |
| r 180 | 103.50 | 111.06 | 118.11 | 124.80 | 130.98 | 136.36 | 140.79 |
| | 96.29 | 103.91 | 110.87 | 117.74 | 123.88 | 129.55 | 134.46 |
| (mm) | | | | | | | |

Comparison Example 5

Propeller fan 1 having the diameter D=316 mm, the height in the axial direction (z direction) h=100 mm, the number of blades n=5, the boss ratio ν=0.253 (boss diameter νD=80 mm) was formed such that the surface of a blade is a three-dimensional curved surface specified by Table 124 below. Note that r, θ, z are set as in Embodiment 21.

TABLE 124

| COMPARISON EXAMPLE 5 | | | | | | | | | | | | |
|---|---|---|---|---|---|---|---|---|---|---|---|---|
| | θ | | | | | | | | | | | |
| r | 0° | 5° | 10° | 15° | 20° | 25° | 30° | 35° | 40° | 45° | 50° | 55° |
| r 45 | 31.80 | 33.99 | 36.21 | 38.47 | 40.72 | 42.84 | 44.86 | 46.79 | 48.62 | 50.36 | | |
| r 55 | | 21.58 | 25.42 | 29.09 | 32.62 | 36.02 | 39.20 | 42.17 | 44.94 | 47.51 | 49.89 | 52.12 |
| r 65 | | | | 18.45 | 23.54 | 28.39 | 32.91 | 37.05 | 40.87 | 44.39 | 47.64 | 50.63 |
| r 75 | | | | | 14.55 | 20.92 | 26.88 | 32.29 | 37.22 | 41.75 | 45.90 | 49.71 |
| r 85 | | | | | 5.55 | 13.74 | 21.12 | 27.82 | 33.89 | 39.42 | 44.49 | 49.13 |
| r 95 | | | | | | 7.05 | 15.69 | 23.59 | 30.77 | 37.25 | 43.20 | 48.63 |
| r 105 | | | | | | 0.87 | 10.64 | 19.57 | 27.73 | 35.11 | 41.84 | 47.98 |
| r 115 | | | | | | | 5.87 | 15.71 | 24.68 | 32.84 | 40.30 | 47.10 |
| r 125 | | | | | | | | 11.89 | 21.58 | 30.43 | 38.57 | 45.95 |
| r 135 | | | | | | | | 8.27 | 18.40 | 27.98 | 36.72 | 44.67 |
| r 145 | | | | | | | | | 15.14 | 25.50 | 34.77 | 43.28 |
| r 155 | | | | | | | | | | 22.91 | 32.82 | 41.86 |
| (mm) | | | | | | | | | | | | |

| | θ | | | | | | | | |
|---|---|---|---|---|---|---|---|---|---|
| r | 60° | 65° | 70° | 75° | 80° | 85° | 90° | 95° | 100° |
| r 45 | | | | | | | | | |
| r 55 | 54.19 | | | | | | | | |
| r 65 | 53.40 | 55.95 | 58.28 | | | | | | |
| r 75 | 53.21 | 56.42 | 59.35 | 62.01 | | | | | |
| r 85 | 53.38 | 57.26 | 60.82 | 64.05 | 66.97 | | | | |
| r 95 | 53.60 | 58.14 | 62.30 | 66.10 | 69.55 | 72.72 | | | |
| r 105 | 53.62 | 58.78 | 63.51 | 40.83 | 71.77 | 75.43 | | | |
| r 115 | 53.33 | 59.02 | 64.28 | 69.03 | 73.40 | 77.43 | 81.05 | | |
| r 125 | 52.70 | 58.91 | 64.59 | 69.71 | 74.39 | 78.67 | 82.62 | 86.11 | |
| r 135 | 51.94 | 58.58 | 64.65 | 70.17 | 75.14 | 79.63 | 83.70 | 87.39 | |
| r 145 | 51.06 | 58.04 | 64.45 | 70.43 | 75.63 | 80.43 | 84.74 | 88.67 | 92.17 |
| r 155 | 50.08 | 57.34 | 64.11 | 70.44 | 75.95 | 81.10 | 85.79 | 89.95 | 93.67 |
| (mm) | | | | | | | | | |

Comparison Example 6

Propeller fan 1 having the diameter D=460 mm, the height in the axial direction (z direction) h=168 mm, the number of blades n=3, the boss ratio ν=0.35 (boss diameter νD=161 mm) was formed such that the surface of a blade is a three-dimensional curved surface specified by Table 125 below. Note that r, θ, z are set as in Embodiment 21.

TABLE 125

| COMPARISON EXAMPLE 6 | | | | | | | | | | | | | |
|---|---|---|---|---|---|---|---|---|---|---|---|---|---|
| | θ | | | | | | | | | | | | |
| r | END POINT AT TRAILING EDGE SIDE | 5° | 10° | 15° | 20° | 25° | 30° | 35° | 40° | 45° | 50° | 55° | 60° |
| r 88.5 | 0.00 | 6.00 | 12.54 | 19.50 | 25.83 | 31.51 | 37.02 | 42.04 | 46.64 | 51.26 | 55.75 | 60.17 | 64.51 |
| r 95 | | 5.78 | 12.77 | 20.55 | 27.94 | 34.52 | 40.58 | 46.17 | 51.36 | 56.45 | 61.43 | 66.35 | 71.14 |
| | 1.15 | 2.38 | 9.19 | 16.80 | 24.01 | 30.41 | 36.30 | 41.71 | 46.72 | 51.63 | 56.44 | 61.18 | 65.79 |
| r 105 | | | 7.06 | 15.24 | 23.89 | 31.71 | 38.60 | 44.82 | 50.57 | 56.08 | 61.49 | 66.82 | 71.97 |
| | 2.75 | | 4.46 | 12.50 | 21.01 | 28.69 | 35.45 | 41.53 | 47.14 | 52.51 | 57.78 | 62.97 | 67.99 |
| r 115 | | | | 10.57 | 20.43 | 29.72 | 37.80 | 44.75 | 51.05 | 57.01 | 62.82 | 68.52 | 74.06 |
| | 4.21 | | | 8.02 | 17.76 | 26.94 | 34.90 | 41.73 | 47.92 | 53.76 | 59.45 | 65.04 | 70.46 |
| r 125 | | | | | 16.59 | 27.30 | 37.02 | 44.95 | 51.87 | 58.29 | 64.48 | 70.52 | 76.37 |
| | 5.57 | | | | 14.09 | 24.70 | 34.31 | 42.14 | 48.95 | 55.27 | 61.35 | 67.29 | 73.04 |
| r 135 | | | | | 12.44 | 24.47 | 35.74 | 45.14 | 52.86 | 59.74 | 66.31 | 72.68 | 78.87 |
| | 6.83 | | | | 9.94 | 21.89 | 33.09 | 42.41 | 50.05 | 56.86 | 63.35 | 69.64 | 75.75 |
| r 145 | | | | | | 21.11 | 33.79 | 44.82 | 53.72 | 61.26 | 68.23 | 74.93 | 81.42 |
| | 8.02 | | | | | 18.66 | 31.28 | 42.24 | 51.08 | 58.55 | 65.46 | 72.10 | 78.52 |
| r 155 | | | | | | 17.35 | 31.43 | 44.01 | 54.51 | 62.82 | 70.23 | 77.27 | 84.05 |
| | 9.15 | | | | | 14.95 | 28.98 | 41.52 | 51.97 | 60.24 | 67.60 | 74.59 | 81.33 |
| r 165 | | | | | | 13.24 | 28.66 | 42.69 | 54.86 | 64.35 | 72.28 | 79.71 | 86.81 |
| | 10.21 | | | | | 10.84 | 26.23 | 40.23 | 52.37 | 61.83 | 69.72 | 77.12 | 84.19 |

TABLE 125-continued

| COMPARISON EXAMPLE 6 | | | | | | | | |
|---|---|---|---|---|---|---|---|---|
| r 175 | | 25.49 | 40.94 | 54.68 | 65.61 | 74.21 | 82.07 | 89.53 |
| | 11.21 | 23.09 | 38.52 | 52.25 | 63.16 | 71.74 | 79.59 | 87.03 |
| r 185 | | 22.17 | 38.89 | 53.89 | 66.48 | 75.97 | 84.38 | 92.23 |
| | 12.16 | 19.77 | 36.48 | 51.47 | 64.05 | 73.53 | 81.94 | 89.78 |
| r 195 | | 18.66 | 36.55 | 52.61 | 66.83 | 77.52 | 86.56 | 94.90 |
| | 13.06 | 16.26 | 34.15 | 50.21 | 64.43 | 75.12 | 84.16 | 92.50 |
| r 205 | | | 33.78 | 51.15 | 66.92 | 78.89 | 88.62 | 97.59 |
| | 13.91 | | 31.38 | 48.75 | 64.52 | 76.49 | 86.22 | 95.19 |
| r 215 | | | 30.90 | 49.52 | 66.71 | 80.05 | 90.51 | 100.20 |
| | 14.71 | | 28.50 | 47.12 | 64.31 | 77.65 | 88.11 | 97.80 |
| r 225 | | | 28.01 | 47.58 | 66.09 | 80.91 | 92.25 | 102.71 |
| | 15.47 | | 25.61 | 45.18 | 63.69 | 78.51 | 89.85 | 100.31 |
| r 230 | | | 26.46 | 46.67 | 65.62 | 81.23 | 93.06 | 103.93 |
| | 15.82 | | 24.06 | 44.27 | 63.22 | 78.83 | 90.66 | 101.53 |
| (mm) | | | | | | | | |

| | θ | | | | | | | | | |
|---|---|---|---|---|---|---|---|---|---|---|
| r | 65° | 70° | 75° | 80° | 85° | 90° | 95° | 100° | 102.5° | END POINT AT LEADING EDGE SIDE |
| r 88.5 | 68.67 | 72.48 | | | | | | | | 72.48 |
| r 95 | 75.75 | 80.17 | | | | | | | | |
| | 70.23 | 74.47 | | | | | | | | 77.09 |
| r 105 | 76.95 | 81.75 | 86.34 | | | | | | | |
| | 72.83 | 77.49 | 81.94 | | | | | | | 84.02 |
| r 115 | 79.40 | 84.48 | 89.39 | 94.10 | | | | | | |
| | 75.68 | 80.65 | 85.44 | 90.03 | | | | | | 90.83 |
| r 125 | 82.01 | 87.39 | 92.61 | 97.65 | | | | | | |
| | 78.57 | 83.85 | 88.96 | 93.90 | | | | | | 97.58 |
| r 135 | 84.80 | 90.45 | 95.95 | 100.97 | 106.23 | | | | | |
| | 81.61 | 87.18 | 92.60 | 97.55 | 102.73 | | | | | 104.29 |
| r 145 | 87.63 | 93.61 | 99.36 | 104.90 | 110.30 | | | | | |
| | 84.67 | 90.59 | 96.27 | 101.75 | 107.08 | | | | | 110.99 |
| r 155 | 90.56 | 96.87 | 102.90 | 108.74 | 114.38 | 119.80 | | | | |
| | 87.79 | 94.05 | 100.04 | 105.83 | 111.43 | 116.80 | | | | 117.70 |
| r 165 | 93.62 | 100.28 | 106.59 | 112.67 | 118.62 | 124.26 | | | | |
| | 90.97 | 97.60 | 103.88 | 109.93 | 115.85 | 121.46 | | | | 124.41 |
| r 175 | 96.68 | 103.71 | 110.32 | 116.69 | 122.88 | 128.76 | | | | |
| | 94.16 | 101.18 | 107.77 | 114.12 | 120.30 | 126.16 | | | | 131.15 |
| r 185 | 99.77 | 107.13 | 114.13 | 120.81 | 127.30 | 133.42 | 139.16 | | | |
| | 97.31 | 104.66 | 111.65 | 118.32 | 124.80 | 130.91 | 136.64 | | | 137.92 |
| r 195 | 102.97 | 110.57 | 117.93 | 124.92 | 131.63 | 137.97 | 144.00 | | | |
| | 100.57 | 108.17 | 115.53 | 122.52 | 129.23 | 135.57 | 141.60 | | | 144.71 |
| r 205 | 106.19 | 114.31 | 122.06 | 129.26 | 136.03 | 142.66 | 148.92 | | | |
| | 103.79 | 111.91 | 119.66 | 126.86 | 133.63 | 140.26 | 146.52 | | | 151.53 |
| r 215 | 109.51 | 118.09 | 126.39 | 133.95 | 140.62 | 147.40 | 153.94 | 160.13 | | |
| | 107.11 | 115.69 | 123.99 | 131.55 | 138.22 | 145.00 | 151.54 | 157.73 | | 158.39 |
| r 225 | 112.71 | 121.82 | 130.66 | 138.70 | 145.51 | 152.30 | 159.09 | 165.48 | | |
| | 110.31 | 119.42 | 128.26 | 136.30 | 143.11 | 149.90 | 156.69 | 163.08 | | 165.27 |
| r 230 | 114.27 | 123.67 | 132.77 | 141.10 | 148.07 | 154.81 | 161.74 | 168.14 | 171.12 | |
| | 111.87 | 121.27 | 130.37 | 138.70 | 145.67 | 152.41 | 159.34 | 165.74 | 168.72 | 168.72 |
| (mm) | | | | | | | | | | |

Each of the propeller fans as in Embodiments 21 to 40 and those in Comparison Examples 4 to 6 is attached to an outdoor unit of an air conditioner, and airflow, power consumption and noise are measured.

First, each fan in Embodiments 21 to 33 and in Comparison Example 4 having the fan diameter of ϕ400 was driven by a DC motor using an outdoor unit with a refrigeration capacity of a 28 kW class. The results are shown in Table 126 below.

TABLE 126

| | FAN DIAMETER | HEIGHT | NUMBER OF BLADES | BOSS DIAMETER | BOSS RATIO | a | b | c |
|---|---|---|---|---|---|---|---|---|
| ENBODIMENT 21 | 400 | 140 | 3 | 110 | 0.275 | 200 | 0 | 120 |
| ENBODIMENT 22 | 400 | 154 | 3 | 110 | 0.275 | 200 | 0 | 120 |
| ENBODIMENT 23 | 400 | 147 | 3 | 110 | 0.275 | 200 | 0 | 120 |
| ENBODIMENT 24 | 400 | 133 | 3 | 110 | 0.275 | 200 | 0 | 120 |
| ENBODIMENT 25 | 400 | 126 | 3 | 110 | 0.275 | 200 | 0 | 120 |
| ENBODIMENT 26 | 400 | 112 | 3 | 110 | 0.275 | 200 | 0 | 120 |
| ENBODIMENT 27 | 400 | 126 | 3 | 110 | 0.275 | 200 | 0 | 108 |
| ENBODIMENT 28 | 400 | 140 | 3 | 110 | 0.275 | 200 | 0 | 90 |
| ENBODIMENT 29 | 400 | 140 | 3 | 110 | 0.275 | 200 | 0 | 132 |
| ENBODIMENT 30 | 400 | 140 | 3 | 140 | 0.35 | 179.3 | 20.7 | 120 |
| ENBODIMENT 31 | 400 | 112 | 3 | 110 | 0.275 | 200 | 0 | 120 |
| ENBODIMENT 32 | 400 | 112 | 3 | 110 | 0.275 | 200 | 0 | 120 |
| ENBODIMENT 33 | 400 | 112 | 3 | 110 | 0.275 | 200 | 0 | 120 |
| COMPARISON EXAMPLE 4 | 400 | 140 | 3 | 140 | 0.35 | — | — | — |

| | d | eu | ed | fu | fd | AIRFLOW | POWER CONSUMPTION | NOISE |
|---|---|---|---|---|---|---|---|---|
| ENBODIMENT 21 | 0 | 140 | 140 | 0 | 0 | 25 m3/min | 21 W | 40 dB |
| ENBODIMENT 22 | 0 | 154 | 154 | 0 | 0 | 25 m3/min | 23 W | 40 dB |
| ENBODIMENT 23 | 0 | 147 | 147 | 0 | 0 | 25 m3/min | 22 W | 40 dB |
| ENBODIMENT 24 | 0 | 133 | 133 | 0 | 0 | 25 m3/min | 21 W | 41 dB |
| ENBODIMENT 25 | 0 | 126 | 126 | 0 | 0 | 25 m3/min | 22 W | 41 dB |
| ENBODIMENT 26 | 0 | 112 | 112 | 0 | 0 | 25 m3/min | 24 W | 43 dB |
| ENBODIMENT 27 | 0 | 126 | 126 | 0 | 0 | 25 m3/min | 21 W | 40 dB |
| ENBODIMENT 28 | 0 | 140 | 140 | 0 | 0 | 25 m3/min | 25 W | 43 dB |
| ENBODIMENT 29 | 0 | 140 | 140 | 0 | 0 | 25 m3/min | 22 W | 42 dB |
| ENBODIMENT 30 | 0 | 140 | 140 | 0 | 0 | 25 m3/min | 21 W | 40 dB |
| ENBODIMENT 31 | 0 | 112 | 106.4 | 0 | 0 | 25 m3/min | 22 W | 41 dB |
| ENBODIMENT 32 | 0 | 112 | 112 | 3 | 0 | 25 m3/min | 22 W | 42 dB |
| ENBODIMENT 33 | 0 | 112 | 106.4 | 3 | 0 | 25 m3/min | 22 W | 41 dB |
| COMPARISON EXAMPLE 4 | — | — | — | — | — | 25 m3/min | 40 W | 47 dB |

Next, each fan in Embodiments 34 to 37 and in Comparison Example 5 having the fan diameter of φ316 was driven by an AC motor using an outdoor unit of a built-in type. The results are shown in Table 127 below.

TABLE 127

| | FAN DIAMETER | HEIGHT | NUMBER OF BLADES | BOSS DIAMETER | BOSS RATIO | a | b | c |
|---|---|---|---|---|---|---|---|---|
| ENBODIMENT 34 | 316 | 100 | 3 | 86 | 0.272 | 158.6 | −0.6 | 120 |
| ENBODIMENT 35 | 316 | 100 | 4 | 86 | 0.272 | 158.6 | −0.6 | 90 |
| ENBODIMENT 36 | 316 | 100 | 5 | 86 | 0.272 | 158.6 | −0.6 | 72 |
| ENBODIMENT 37 | 316 | 100 | 5 | 86 | 0.272 | 158.6 | −0.6 | 108.5 |
| COMPARISON EXAMPLE 5 | 316 | 100 | 5 | 80 | 0.253 | — | — | — |

| | d | eu | ed | fu | fd | AIRFLOW | POWER CONSUMPTION | NOISE |
|---|---|---|---|---|---|---|---|---|
| ENBODIMENT 34 | 0 | 100 | 100 | 0 | 0 | 14 m3/min | 85 W | 59 dB |
| ENBODIMENT 35 | 0 | 100 | 100 | 0 | 0 | 14 m3/min | 94 W | 60 dB |
| ENBODIMENT 36 | 0 | 100 | 100 | 0 | 0 | 14 m3/min | 109 W | 59 dB |
| ENBODIMENT 37 | 0 | 100 | 100 | 0 | 0 | 14 m3/min | 89 W | 58 dB |
| COMPARISON EXAMPLE 5 | — | — | — | — | — | 14 m3/min | 128 W | 64 dB |

Next, each fan in Embodiments 38 to 40 and in Comparison Example 6 having the fan diameter of φ460 was driven by an AC motor using a multiple-type large outdoor unit. The results are shown in Table 128 below.

TABLE 128

| | FAN DIAMETER | HEIGHT | NUMBER OF BLADES | BOSS DIAMETER | BOSS RATIO | a | b | c |
|---|---|---|---|---|---|---|---|---|
| ENBODIMENT 38 | 460 | 161 | 3 | 150 | 0.326 | 213.8 | 16.2 | 120 |
| ENBODIMENT 39 | 460 | 168 | 3 | 150 | 0.326 | 213.8 | 16.2 | 125.2 |
| ENBODIMENT 40 | 460 | 140 | 3 | 150 | 0.326 | 213.8 | 16.2 | 104.3 |
| COMPARISON EXAMPLE 6 | 460 | 168 | 3 | 161 | 0.35 | — | — | — |

| | d | eu | ed | fu | fd | AIRFLOW | POWER CONSUMPTION | NOISE |
|---|---|---|---|---|---|---|---|---|
| ENBODIMENT 38 | 0 | 161 | 161 | 0 | 0 | 32 m3/min | 65 W | 45 dB |
| ENBODIMENT 39 | 0 | 168 | 168 | 0 | 0 | 32 m3/min | 69 W | 47 dB |
| ENBODIMENT 40 | 0 | 140 | 140 | 0 | 0 | 32 m3/min | 71 W | 46 dB |
| COMPARISON EXAMPLE 6 | — | — | — | — | — | 32 m3/min | 122 W | 51 dB |

As can be seen from Table 126 above, it has become clear that the power consumption at the same air flow is reduced by 40% and also the noise is reduced by 4–7 dB in the propeller fan shown in Embodiments 21 to 33, compared to the case with Comparison Example 1 with the propeller fan having the same diameter. It is noted that no separation noise occurred, which is a problem common to a thin blade, and thus there was no increase of noise.

Moreover, weight was reduced by approximately 25% for each propeller fan shown in Embodiments 21 to 33 compared to Comparison Example 4, without degradation of its performance, and thus the cost was also reduced. In addition, the 25% of weight saving can realize reduction of startup torque occurred at startup of the blower and also reduction of cost for the drive motor. It is noted that the deformation of a blade, which is a problem common to a thin blade, was approximately equal to that in Comparison Example 4.

Moreover, as can be seen from Table 127 above, it has become clear that the power consumption at the same air flow is reduced by 15–30% and also the noise can be reduced by 4–6 dB in the propeller fan shown in Embodiments 34 to 37, compared to the case with Comparison Example 5 for the propeller fan having the same diameter. It is noted that no separation noise occurred that is a problem common to a thin blade, and thus there was no increase of noise.

Moreover, weight was reduced by 20% for each propeller fan shown in Embodiments 34 to 37 compared to Comparison Example 5, without degradation of its performance, and thus the cost was also reduced. In addition, the 20% of weight saving can realize reduction of startup torque occurred at startup of the blower and also reduction of cost for the drive motor. It is noted that the deformation of a blade, which is a problem common to a thin blade, was approximately equal to that in Comparison Example 5.

Furthermore, as can be seen from Table 128 above, it has become clear that the power consumption at the same air flow is reduced by 42–47% and also the noise is reduced by 4–6 dB in the propeller fan shown in Embodiments 38 to 40, compared to the case with Comparison Example 6 with the propeller fan having the same diameter. It is noted that no separation noise occurred that is a problem common to a thin blade, and thus there was no increase of noise.

Moreover, weight was reduced by 20% for each propeller fan shown in Embodiments 38 to 40 compared to Comparison Example 6, without degradation of its performance, and thus the cost was also reduced. In addition, the 20% of weight saving can realize reduction of startup torque at startup of the blower and also reduction of cost for the drive motor. It is noted that the deformation of a blade that is a problem common to a thin blade was approximately equal to that in Comparison Example 6.

Moreover, as for Embodiments 21 to 26 in Table 126 above, when the same diameter D=400 mm and the same expansion angle λ=120 deg, Embodiment 21 where height h satisfies an equation 134 below, i.e. h=140, had the highest superiority in efficiency and noise.

$$c = \lambda = \frac{360}{n} = \frac{2400}{7} \times \frac{h}{D} \tag{134}$$

Moreover, as for Embodiments 21, 28 and 29 in Table 126 above, when the same diameter D=400 mm and the same height h=140 mm, Embodiment 21 where blade expansion angle λ satisfies an equation 135 below, i.e. λ=120, had the highest superiority in efficiency and noise.

$$c = \lambda = \frac{360}{n} = \frac{2400}{7} \times \frac{h}{D} \tag{135}$$

Furthermore, as for Embodiments 25 and 27 in Table 126 above, blade expansion angle λ where the same diameter D=400 mm and the same height h=126 mm was superior in Embodiment 27 to that in Embodiment 25. Therefore, when the former is not the same as the latter in an equation 136 below, the latter showed a superiority.

$$\left.\begin{array}{l} c = \lambda = 360/n \\ c = \lambda = \dfrac{2400}{7} \times \dfrac{h}{D} \end{array}\right\} \tag{136}$$

Moreover, in Embodiments 21 and 30 in Table 126 above, as for boss ratio ν where the same diameter D=400 mm, the same height h=140 mm and the same blade expansion angle λ=120 deg, Embodiment 30 showed a superiority in efficiency and noise as in Embodiment 21, since, in Embodiment 30, transformation is performed for Embodiment 21 to satisfy an equation 137 below.

$$a = \frac{20}{29}D(1-v), \quad b = -\frac{20}{29}D(1-v)\times 0.275 + \frac{vD}{2} \tag{137}$$

Further, in Embodiments 21, 36, and 31 to 33 in Table 126, the way of assigning eu, ed, fu, fd in the case that the same diameter D=400 mm, the same height h=112 mm and the same blade expansion angle λ=120 deg will be described.

In Embodiment 26, the ratio of h/D is smaller, i.e., the thickness of a wing is thinner, than that in Embodiment 21. Thus, the wing is largely deformed at rotation of the fan due to the centrifugal force applied on the wing (blade), reducing the height of the wing, and therefore degradation occurs in terms of efficiency and noise.

To prevent this, relation among $e_u$, $e_d$, $f_u$ and $f_d$ is set according to the following transformation formula 38 to increase the thickness of the wing, resulting in Embodiments 31 to 33 being superior to Embodiment 26.

$$\left.\begin{array}{l} z_{1u} = e_u \times z_u + f_u \\ z_{1d} = e_d \times z_d + f_d \\ \text{wherein} \\ \begin{cases} e_u = e_d \\ f_u > f_d \end{cases} \text{or} \begin{cases} e_u > e_d \\ f_u = f_d \end{cases} \text{or} \begin{cases} e_u > e_d \\ f_u > f_d \end{cases} \\ \text{therefore,} \\ \begin{cases} e_u \geqq e_d \\ f_u \geqq f_d \end{cases} \end{array}\right\} \tag{138}$$

It is noted that, when $e_u<e_d$ and $f_u>f_d$, the shape of the wing is largely deformed, which induces deterioration in efficiency and increase in noise, and when $e_u=e_d$ and $f_u<f_d$, or $e_u>e_d$ and $f_u<f_d$, or $e_u<e_d$ and $f_u<f_d$, or when $e_u<e_d$ and $f_u=f_d$, the shape of the wing cannot be formed.

Moreover, as for Embodiments 34 to 36 in Table 127, Embodiment 34 in which the number of blades n in the case of the same diameter D=316 mm, the same height h=100 mm and blade expansion angle λ=360/n assumes a value closest to the value indicated by an equation 139 below, i.e., n=3, had the highest superiority in efficiency and noise.

$$\frac{2400}{7}\times\frac{h}{D} = \frac{2400}{7}\times\frac{100}{316} = 108.5 \tag{139}$$

Moreover, when Embodiments 36 and 37 in Table 127 above are compared with each other, Embodiment 37 was superior to Embodiment 36. The comparison was made for blade expansion angle λ where the same diameter D=316 mm, the same height h=100 mm and the same number of blades n=5. Therefore, when the former is not the same as the latter in an equation 140 below, the latter showed a superiority.

$$\left.\begin{array}{l} c = \lambda = 360/n \\ c = \lambda = \dfrac{2400}{7}\times\dfrac{h}{D} \end{array}\right\} \tag{140}$$

Moreover, as for Embodiments 38 to 40 in Table 128, Embodiment 38 was superior to Embodiments 39 and 40. The comparison was made for blade expansion angle λ and height h where the same diameter D=460 mm and the same number of blades n=3. Thus, when blade expansion angle λ and height h are selected, selection is made not only for λ to satisfy the first equation (the top equation) in an equation 141 below, but also for the number of blades n, blade expansion angle λ and height h to satisfy the second equation (the middle equation) in equation 141, to achieve a higher superiority. That is, in respect to the propeller fan according to the present invention, the third equation (the bottom equation) in equation 141 below is important to determine a design manual.

$$\left.\begin{array}{l} c = \lambda = \dfrac{2400}{7}\times\dfrac{h}{D} \\ c = \lambda = 360/n = \dfrac{2400}{7}\times\dfrac{h}{D} \\ 360/n = \dfrac{2400}{7}\times\dfrac{h}{D} \end{array}\right\} \tag{141}$$

Next, a fluid feeding device according to the present invention will be described. A fluid feeding device 7 shown in FIG. 18 includes a blower 9 constituted by propeller fan 1 in Embodiment 21 and a drive motor 8, and fluid is fed out by blower 9.

Examples of the fluid feeding device having such a configuration include an air conditioner, an air cleaner, a humidifier, a dehumidifier, an electric fan, a fan heater, a cooling device, and a ventilator. Fluid feeding device 7 in the present embodiment is an outdoor unit 10 of an air conditioner.

Figure 19:
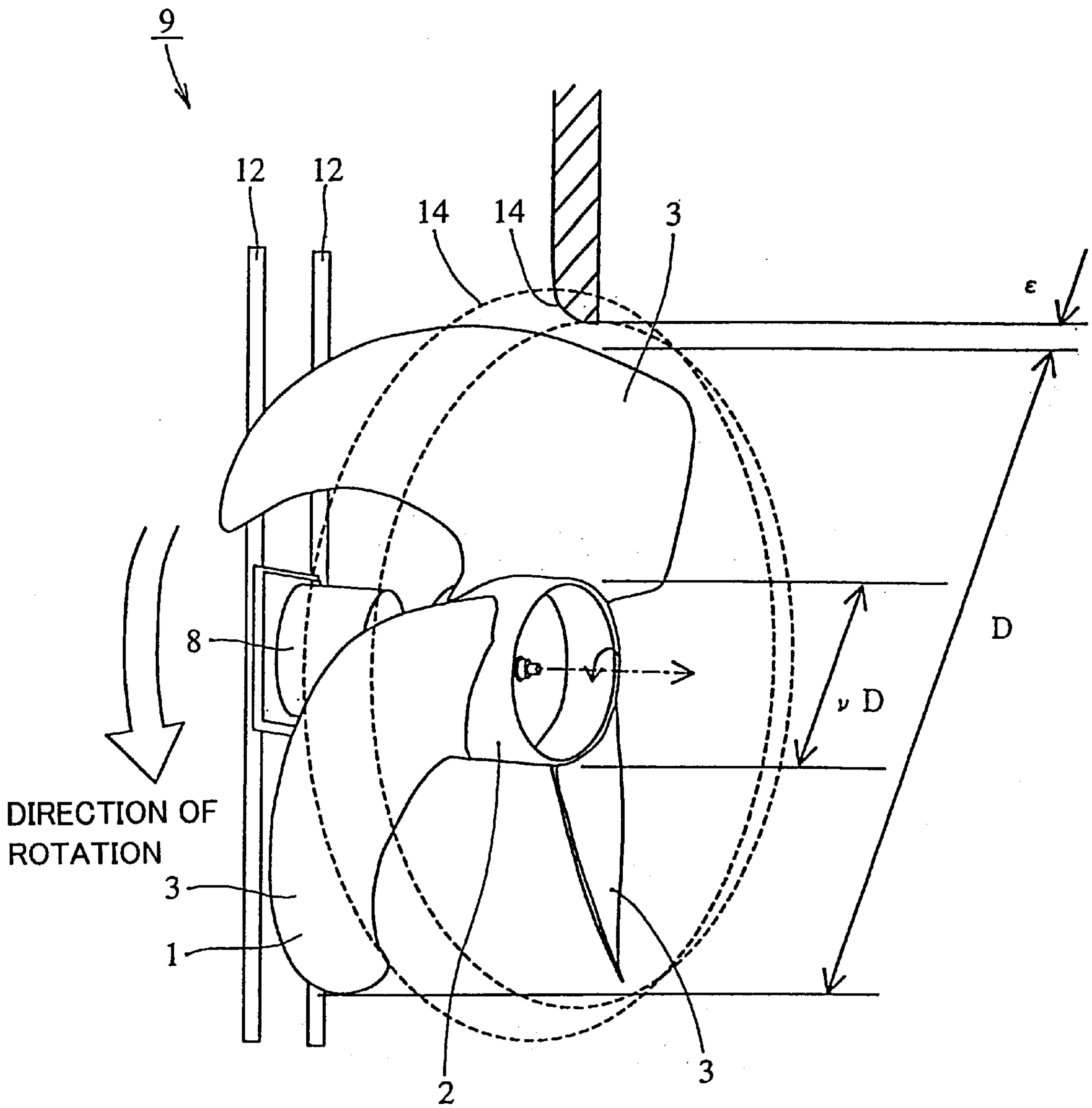
FIG. 19 is a perspective view of another embodiment of the blower of the fluid feeding device of the present invention.

Outdoor unit 10 includes an outdoor heat exchanger 11, and efficiently exchanges heat by blower 9 described above. Here, blower 9 is installed in outdoor unit 10 by a motor angle 12, and a supply opening 13 of outdoor unit 10 is formed to be a bell mouth 14 as shown in FIG. 19.

Figure 20:
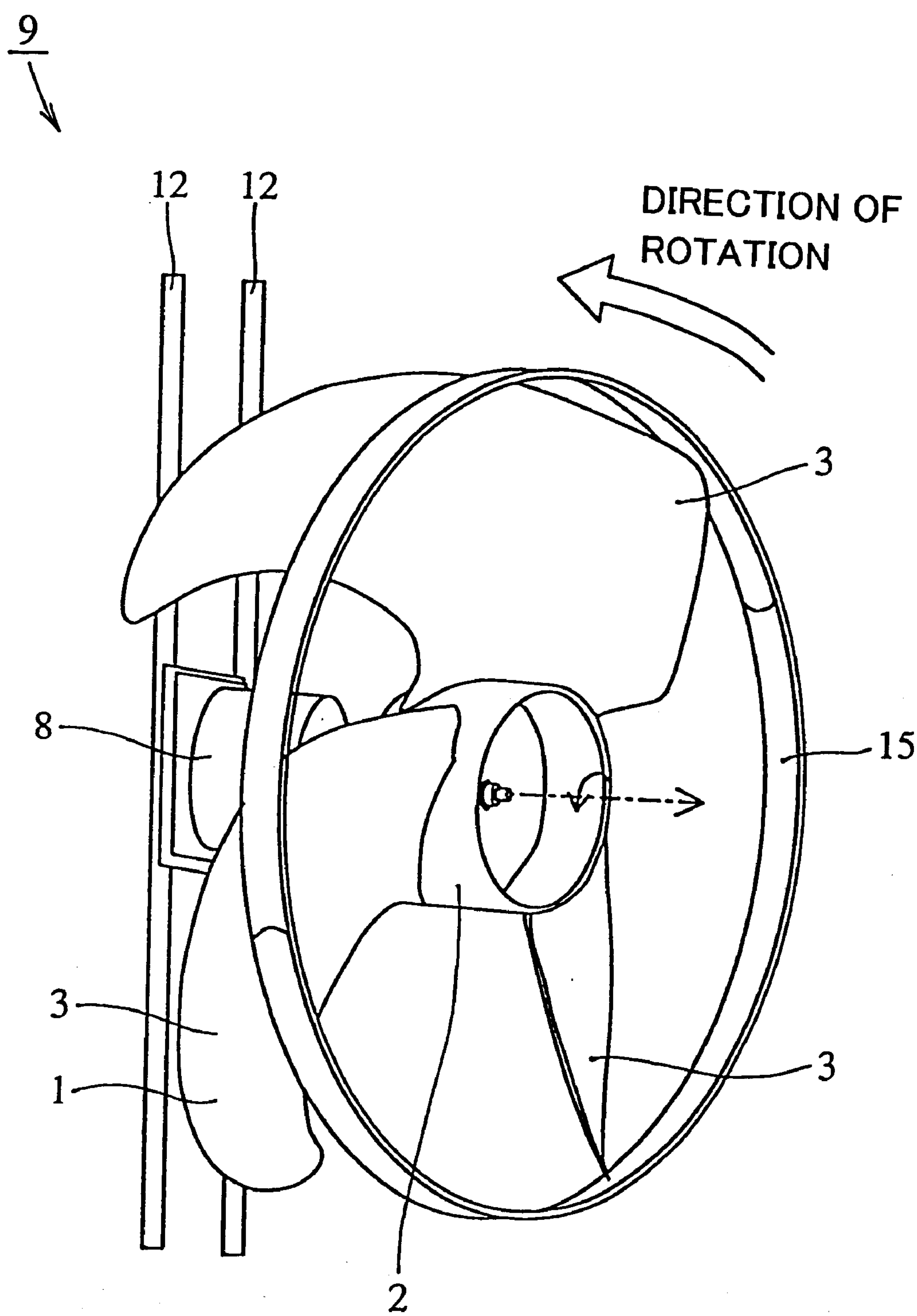
FIG. 20 is a perspective view of yet another embodiment of the blower of the fluid feeding device of the present invention.

Moreover, blower 9 having a ring splasher 15 installed on the periphery of propeller fan 1, as shown in FIG. 20, may also be provided at fluid feeding device 7. Here, in an air conditioner of a type having an indoor unit and an outdoor unit formed in one piece to be attached to a window or the like, drain water may be splashed up and sprayed on outdoor heat exchanger 11, to further increase the efficiency.

Outdoor unit 10 in the present embodiment is a quiet outdoor unit with reduced noise, since propeller fan 1 in Embodiment 21 is included therein. Moreover, propeller fan 1 has an increased fan efficiency, so that an efficient outdoor unit realizing energy-saving can be attained. Furthermore, propeller fan 1 can be reduced in weight so that outdoor unit 10 can also achieve weight saving. It is presumed that propeller fans in other embodiments may also attain similar results.

Further embodiments of a propeller fan, a die for molding the propeller fan, and a fluid feeding device according to the present invention will be described below with reference to FIGS. 21 to 30.

Figure 21:
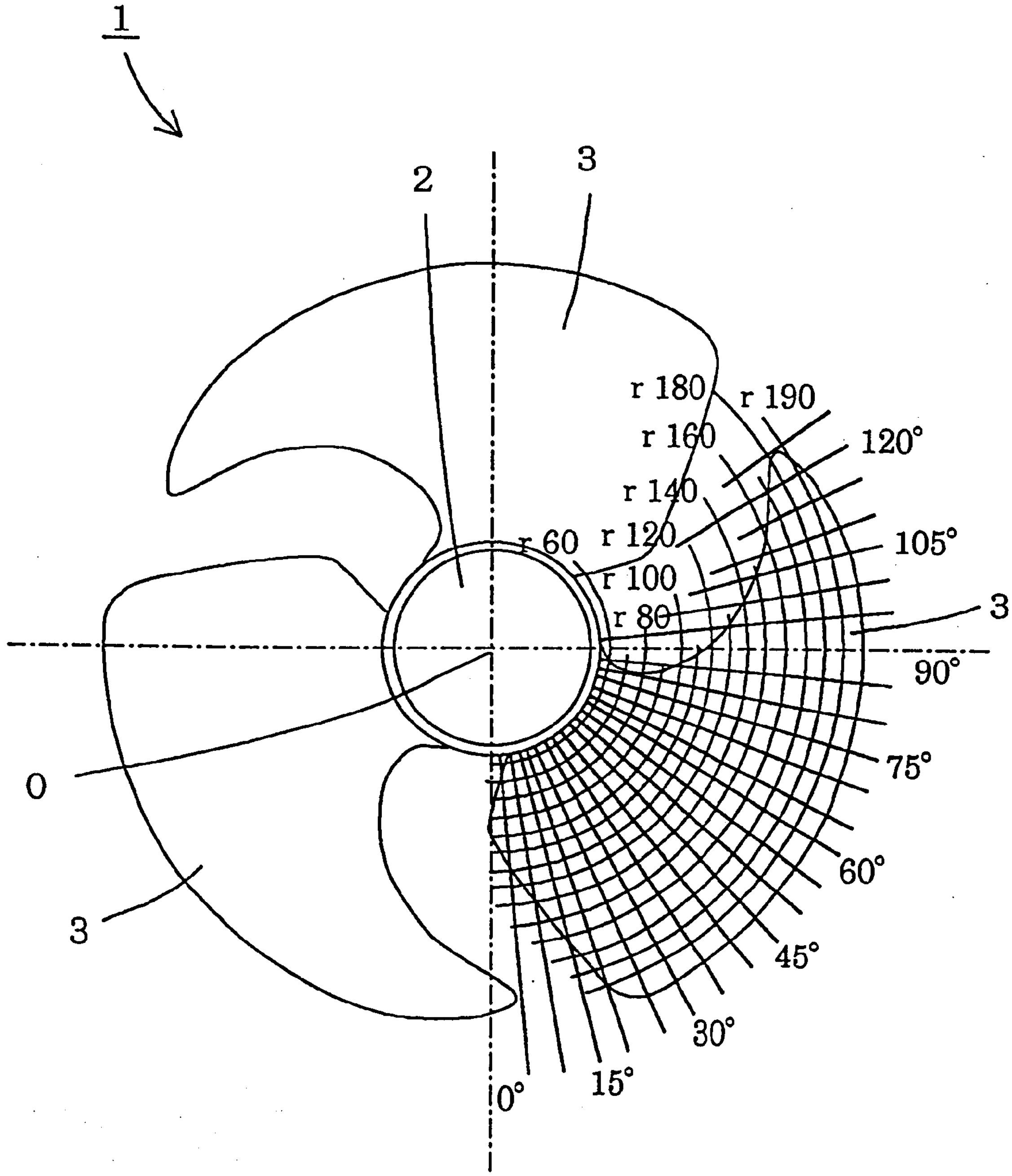
FIG. 21 is a front view of a propeller fan according to Embodiment 41 of the present invention.
Figure 22:
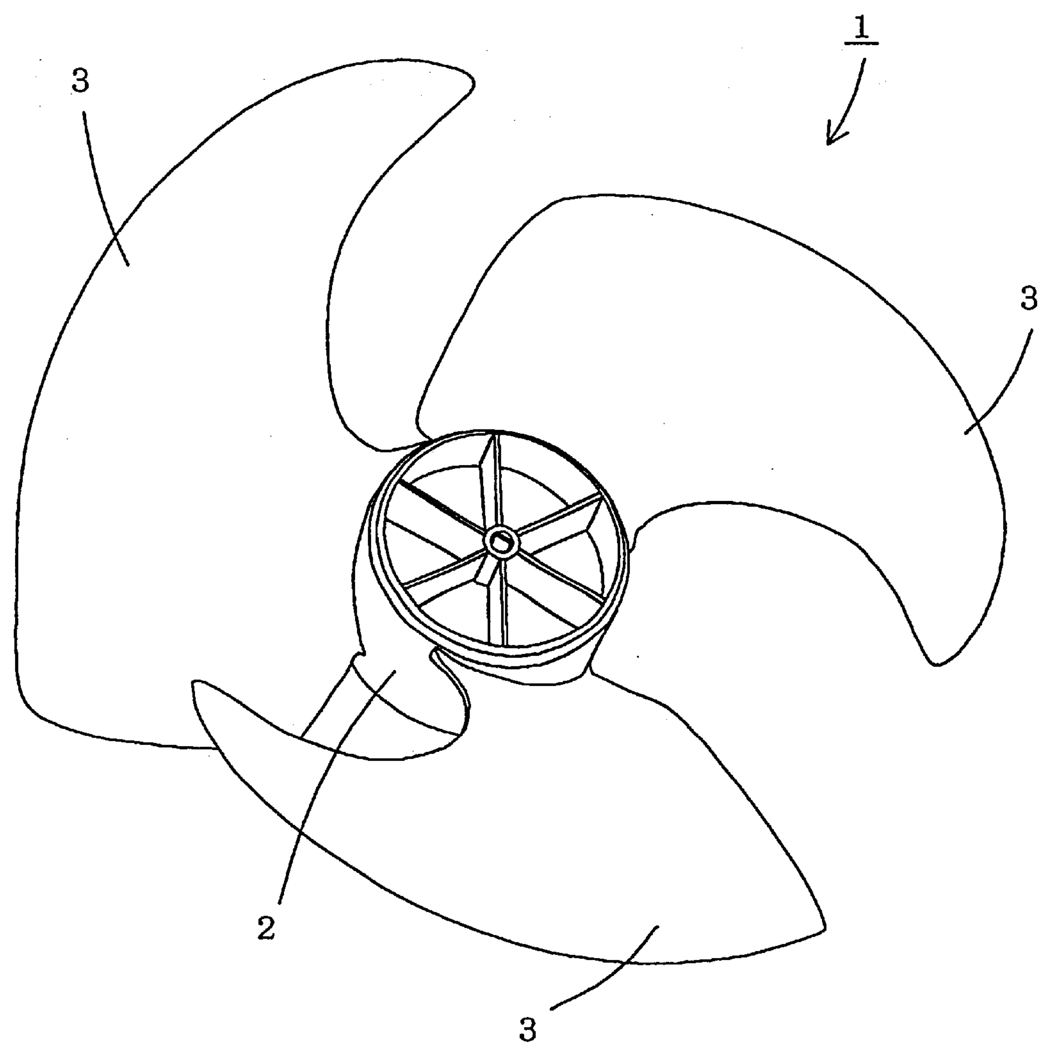
FIG. 22 is a perspective view of (the negative pressure surface side of) the propeller fan in Embodiment 41 of the present invention.
Figure 23:
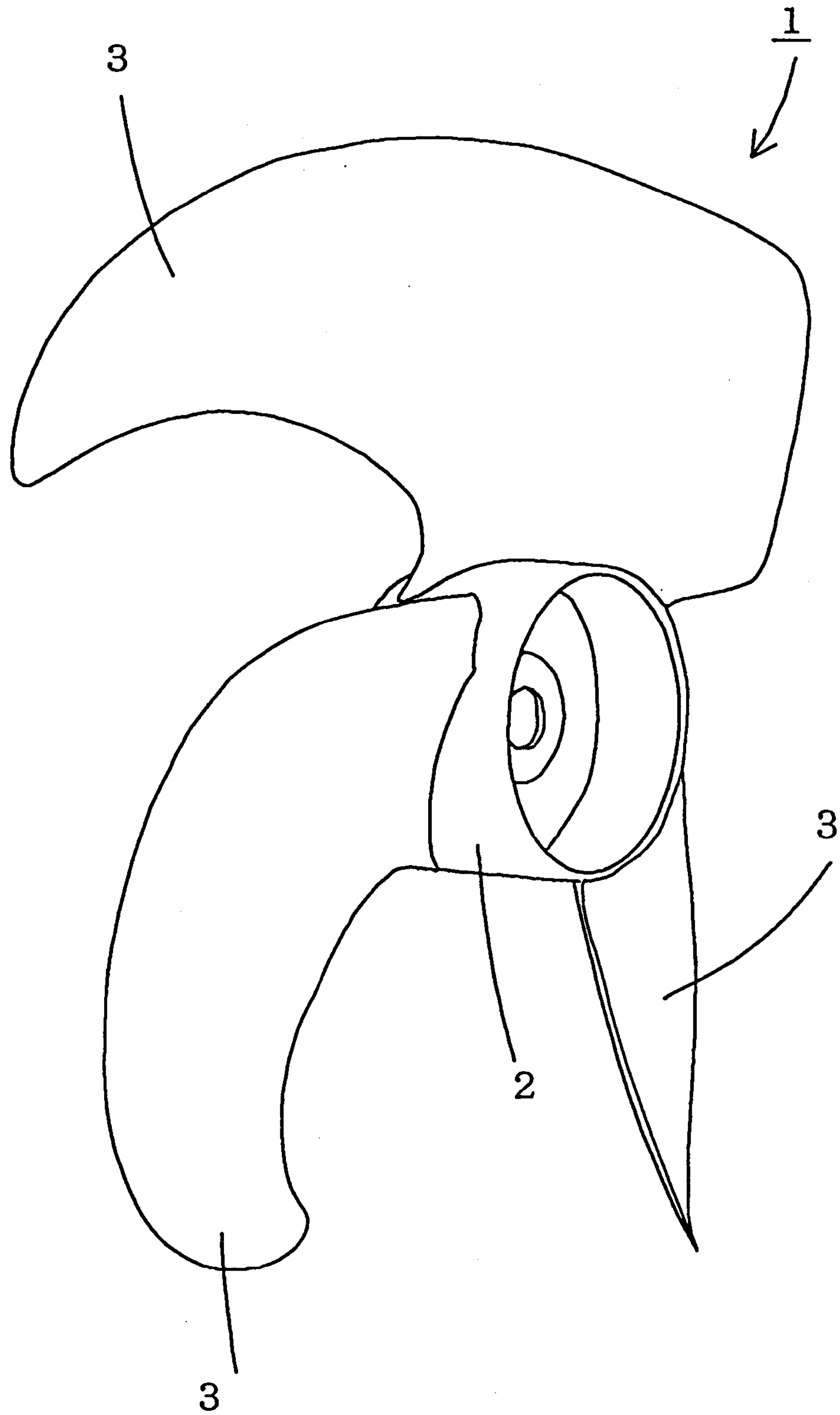
FIG. 23 is a perspective view of (the positive pressure surface side of) the propeller fan in Embodiment 41 of the present invention.

FIG. 21 shows a front view of propeller fan 1 according to the present invention. Propeller fan 1 of the present invention is molded in one piece by synthetic resin such as, for example, AS resin with glass fiber. For propeller fan 1, the diameter D=400 mm, the height in the axial direction (z direction) h=140 mm, the number of blades n=3, the expansion angle of a blade λ=120 degrees (deg) and a boss ratio ν=0.275 (boss diameter νD=110 mm), and three blades 3 are radially and integrally provided on the periphery of boss portion 2.

It is an important feature of the present invention that the shape of the surface of blade 3 of propeller fan 1 is obtained based on a base shape defined by specific coordinate values. Thus, the shape of a curved surface, which is defined by coordinate values obtained by transforming the coordinate values in the base shape in the r, θ and z directions using prescribed transformation formulas respectively, is determined as the shape of the surface of blade 3 of propeller fan 1.

The base shape of the present invention is typically defined by the coordinate values indicated in Table 202 described earlier. However, the shape, which is defined by coordinate values obtained by uniformly transforming the coordinate values indicated in Table 202 by e.g. multiplying the coordinate values with prescribed coefficients, should also be interpreted as equivalent to the base shape of the present invention.

When expressed by a cylindrical coordinate system in which the z axis is set as a rotation axis of propeller fan 1, coordinates ($r_1$, $\theta_1$, $z_{1u}$) of a surface on a negative pressure side of blade 3 and coordinates ($r_1$, $\theta_1$, $z_{1d}$) of a surface on a positive pressure side of blade 3 are coordinate values obtained by transforming non-dimensionally expressed three-dimensional coordinate values indicated in Table 202 using a transformation formula 213 below, and the surface on the negative pressure side and the surface on the positive pressure side are configured by curved surfaces defined by the obtained coordinate values, i.e. a curved surface specified by coordinate values indicated in Table 203.

It is noted that the curved surface may also be specified by coordinate values within the range of ±5% of each coordinate value. Moreover, it may be possible to obtain coordinate values indicated in Table 203 using coordinate values obtained by uniformly transforming the coordinate values indicated in Table 202 described earlier. However, this should be interpreted as a modification within the range of equivalent to the present invention, since it can be applied only by slightly modifying transformation formula 213.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = D/2 = 400/2 = 200\\
&b = 0\\
&c = \lambda = 360/n = \frac{2400}{7} \times \frac{h}{D} = \frac{2400}{7} \times \frac{140}{400} = 120\\
&d = 0\\
&e_u = e_d = h = 140\\
&f_u = f_d = 0
\end{aligned}\right\} \quad (213)$$

TABLE 203

| | θ | | | | | | | | | | | | | | |
|---|---|---|---|---|---|---|---|---|---|---|---|---|---|---|---|
| r | 5 | 10 | 15 | 20 | 25 | 30 | 35 | 40 | 45 | 50 | 55 | 60 | 65 | 70 | (deg) |
| 60 | | | 26.73 | 30.33 | 33.72 | 37.03 | 40.30 | 43.53 | 46.66 | 49.68 | 52.58 | 55.37 | 58.00 | 60.46 | |
| | | | 23.50 | 25.75 | 28.03 | 30.30 | 32.56 | 34.90 | 37.35 | 39.94 | 42.60 | 45.32 | 48.02 | 50.68 | |
| 70 | | 20.62 | 25.40 | 29.74 | 33.84 | 37.77 | 41.53 | 45.09 | 48.48 | 51.74 | 54.87 | 57.84 | 60.61 | 62.95 | |
| | | 17.73 | 21.07 | 24.27 | 27.42 | 30.56 | 33.74 | 36.97 | 40.24 | 43.50 | 46.71 | 49.82 | 52.84 | 55.83 | |
| 80 | 12.30 | 18.62 | 24.08 | 29.11 | 33.83 | 38.32 | 42.53 | 46.50 | 50.27 | 53.86 | 57.28 | 60.49 | 63.40 | 65.81 | |
| | 10.63 | 15.41 | 19.80 | 23.93 | 27.88 | 31.72 | 35.51 | 39.25 | 42.92 | 46.51 | 49.96 | 53.24 | 56.38 | 59.43 | |
| 90 | 9.83 | 16.50 | 22.67 | 28.43 | 33.81 | 38.84 | 43.57 | 48.00 | 52.16 | 56.10 | 59.81 | 63.30 | 66.51 | 69.27 | |
| | 7.77 | 13.61 | 19.00 | 23.98 | 28.61 | 33.00 | 37.22 | 41.31 | 45.29 | 49.14 | 52.83 | 56.33 | 59.61 | 62.78 | |
| 100 | 5.90 | 13.96 | 21.16 | 27.71 | 33.76 | 39.39 | 44.64 | 49.53 | 54.10 | 58.39 | 62.43 | 66.24 | 69.81 | 73.05 | |
| | 4.58 | 11.65 | 18.13 | 23.96 | 29.25 | 34.14 | 38.76 | 43.18 | 47.45 | 51.57 | 55.53 | 59.30 | 62.87 | 66.26 | |
| 110 | 1.39 | 11.11 | 19.43 | 26.84 | 33.57 | 39.79 | 45.55 | 50.89 | 55.87 | 60.51 | 64.89 | 69.03 | 72.95 | 76.65 | |
| | 0.92 | 9.28 | 16.83 | 23.52 | 29.51 | 34.96 | 40.00 | 44.76 | 49.31 | 53.69 | 57.91 | 61.98 | 65.90 | 69.65 | |
| 120 | | 7.80 | 17.20 | 25.43 | 32.87 | 39.68 | 45.97 | 51.79 | 57.20 | 62.25 | 66.99 | 71.48 | 75.74 | 79.81 | |
| | | 6.45 | 14.90 | 22.49 | 29.33 | 35.51 | 41.14 | 46.33 | 51.20 | 55.85 | 60.33 | 64.67 | 68.88 | 72.95 | |
| 130 | | 3.98 | 14.27 | 23.49 | 31.72 | 39.10 | 45.82 | 52.04 | 57.85 | 63.33 | 68.52 | 73.44 | 78.11 | 82.55 | |
| | | 3.28 | 12.97 | 21.88 | 29.83 | 36.87 | 43.16 | 48.88 | 54.19 | 59.17 | 63.87 | 68.33 | 72.61 | 76.72 | |
| 140 | | | 11.47 | 21.90 | 31.00 | 39.01 | 46.18 | 52.71 | 58.80 | 64.56 | 70.03 | 75.21 | 80.21 | 85.01 | |
| | | | 10.41 | 20.52 | 29.37 | 37.17 | 44.13 | 50.46 | 56.34 | 61.86 | 67.04 | 71.85 | 76.47 | 80.86 | |
| 150 | | | 8.10 | 19.54 | 29.69 | 38.73 | 46.78 | 53.98 | 60.50 | 66.52 | 72.25 | 77.78 | 83.11 | 88.18 | |
| | | | 7.17 | 18.17 | 28.03 | 36.78 | 44.56 | 51.52 | 57.83 | 63.70 | 69.29 | 74.67 | 79.83 | 84.71 | |
| 160 | | | | 17.27 | 28.63 | 38.62 | 47.45 | 55.30 | 62.39 | 68.87 | 74.92 | 80.64 | 86.20 | 91.59 | |
| | | | | 15.88 | 26.78 | 36.36 | 44.86 | 52.50 | 59.47 | 65.90 | 71.91 | 77.62 | 83.14 | 88.44 | |
| 170 | | | | 15.08 | 27.61 | 38.48 | 47.95 | 56.32 | 63.87 | 70.80 | 77.25 | 83.34 | 89.19 | 94.88 | |
| | | | | 13.74 | 25.66 | 35.97 | 45.11 | 53.30 | 60.75 | 67.63 | 74.08 | 80.19 | 86.11 | 91.90 | |
| 180 | | | | 12.19 | 26.33 | 38.11 | 48.24 | 57.10 | 65.07 | 72.38 | 79.20 | 85.65 | 91.82 | 97.78 | |
| | | | | 11.29 | 24.52 | 35.68 | 45.46 | 54.14 | 61.98 | 69.21 | 76.01 | 82.50 | 88.70 | 94.72 | |
| 190 | | | | | 24.56 | 37.70 | 48.62 | 57.95 | 66.25 | 73.86 | 80.95 | 87.65 | 94.11 | 100.33 | |
| | | | | | 23.24 | 35.74 | 46.19 | 55.25 | 63.42 | 70.96 | 78.03 | 84.82 | 91.44 | 97.79 | |
| (mm) | | | | | | | | | | | | | | | |

| | θ | | | | | | | | | |
|---|---|---|---|---|---|---|---|---|---|---|
| r | 75 | 80 | 85 | 90 | 95 | 100 | 105 | 110 | 115 | 120 | (deg.) |
| 60 | 62.63 | 64.38 | 65.45 | 65.50 | | | | | | | |
| | 53.33 | 56.03 | 58.92 | 62.32 | | | | | | | |
| 70 | 64.60 | 65.12 | | | | | | | | | |
| | 58.92 | 62.36 | | | | | | | | | |
| 80 | 67.46 | 67.91 | | | | | | | | | |
| | 62.53 | 65.97 | | | | | | | | | |

TABLE 203-continued

| | | | | | | | | | | |
|---|---|---|---|---|---|---|---|---|---|---|
| 90 | 71.39 | 72.44 | | | | | | | | |
| | 65.93 | 69.31 | | | | | | | | |
| 100 | 75.80 | 77.79 | 78.50 | | | | | | | |
| | 69.59 | 73.00 | 76.83 | | | | | | | |
| 110 | 79.99 | 82.76 | 84.65 | | | | | | | |
| | 73.28 | 76.89 | 80.65 | | | | | | | |
| 120 | 83.65 | 87.09 | 89.90 | 91.70 | | | | | | |
| | 76.87 | 80.67 | 84.48 | 88.52 | | | | | | |
| 130 | 86.75 | 90.71 | 94.28 | 97.19 | 98.97 | | | | | |
| | 80.69 | 84.56 | 88.37 | 92.24 | 96.48 | | | | | |
| 140 | 89.57 | 93.88 | 97.94 | 101.62 | 104.63 | 106.51 | | | | |
| | 84.96 | 88.83 | 92.57 | 96.28 | 100.08 | 104.36 | | | | |
| 150 | 92.93 | 97.42 | 101.68 | 105.60 | 109.20 | 112.20 | 114.22 | | | |
| | 89.26 | 93.56 | 97.50 | 101.00 | 104.43 | 107.99 | 112.04 | | | |
| 160 | 96.73 | 101.49 | 105.83 | 109.92 | 113.83 | 117.20 | 119.90 | 121.89 | | |
| | 93.42 | 97.99 | 102.13 | 106.08 | 109.86 | 112.97 | 115.97 | 119.49 | | |
| 170 | 100.41 | 105.57 | 110.25 | 114.40 | 118.13 | 121.70 | 124.98 | 127.73 | 129.54 | |
| | 97.36 | 102.38 | 106.90 | 110.88 | 114.44 | 117.87 | 121.10 | 124.04 | 126.88 | |
| 180 | 103.63 | 109.23 | 114.28 | 118.75 | 122.66 | 126.07 | 129.15 | 131.98 | 134.30 | 135.90 |
| | 100.65 | 106.24 | 111.20 | 115.55 | 119.35 | 122.62 | 125.63 | 128.52 | 131.13 | 133.61 |
| 190 | 106.35 | 112.19 | 117.65 | 122.43 | 126.54 | 130.11 | 133.15 | 135.68 | 137.85 | 139.45 |
| | 103.84 | 109.68 | 115.12 | 119.84 | 123.88 | 127.41 | 130.45 | 133.09 | 135.65 | 138.10 |
| (mm) | | | | | | | | | | |

DIAMETER D = 400
HEIGHT h = 140
EXPANSION ANGLE λ = 120
BOSS RATIO ν = 0.275

FIG. 21 shows a cylindrical coordinate system of r and θ by dashed lines. It is noted that, though the z axis is not shown in FIG. 21, the z axis is a line passing the center of rotation 0 of boss portion 2 of propeller fan 1 in FIG. 21 and perpendicular to the plane of the drawing (that is, a line overlapping with a core of the rotation axis of propeller fan 1).

In FIG. 21, for blade 3 of propeller fan 1, lines are drawn in the r direction that divide the blade at intervals of every 10 mm in the range between 60 mm and 190 mm, and lines are drawn that divide the blade in the θ direction at intervals of every 5 deg in the range between 0 deg and 125 deg, a coordinate value of z at each crossing point being indicated in Table 203. Here, the top of each column indicates a value on the negative pressure surface side (suction side) of the propeller fan, whereas the bottom of each column indicates a value on the positive pressure surface side (blowing side) thereof.

It is noted that blade 3 may be made thicker at a root portion of blade 3. Moreover, a rim of blade 3 is extremely thin for weight saving, so that the thickness may be partially increased compared to that defined by Table 203 in the case that a problem occurs in resin flowage at the time of molding. Moreover, the shape of the surface of blade 3 may be smooth, or may be provided with concavities and convexities in a form of grooves, protrusions or dimples. Furthermore, the trailing edge of blade 3 may have a shape of saw teeth. Not that, in each transformation formula, d and $f_u$=$f_d$ are indicated as optional because the shape of the propeller fan can be the same irrespective of a value selected for d and $f_u$=$f_d$.

Moreover, propeller fan 1 of the present invention may be molded in one piece by synthetic resin such as ABS (acrylonitrile-butadiene-styrene) resin or polypropylene (PP), or may be integrally molded in one piece by synthetic resin having an increased intensity by including mica or the like, or may be non-integrally molded.

Figure 27:
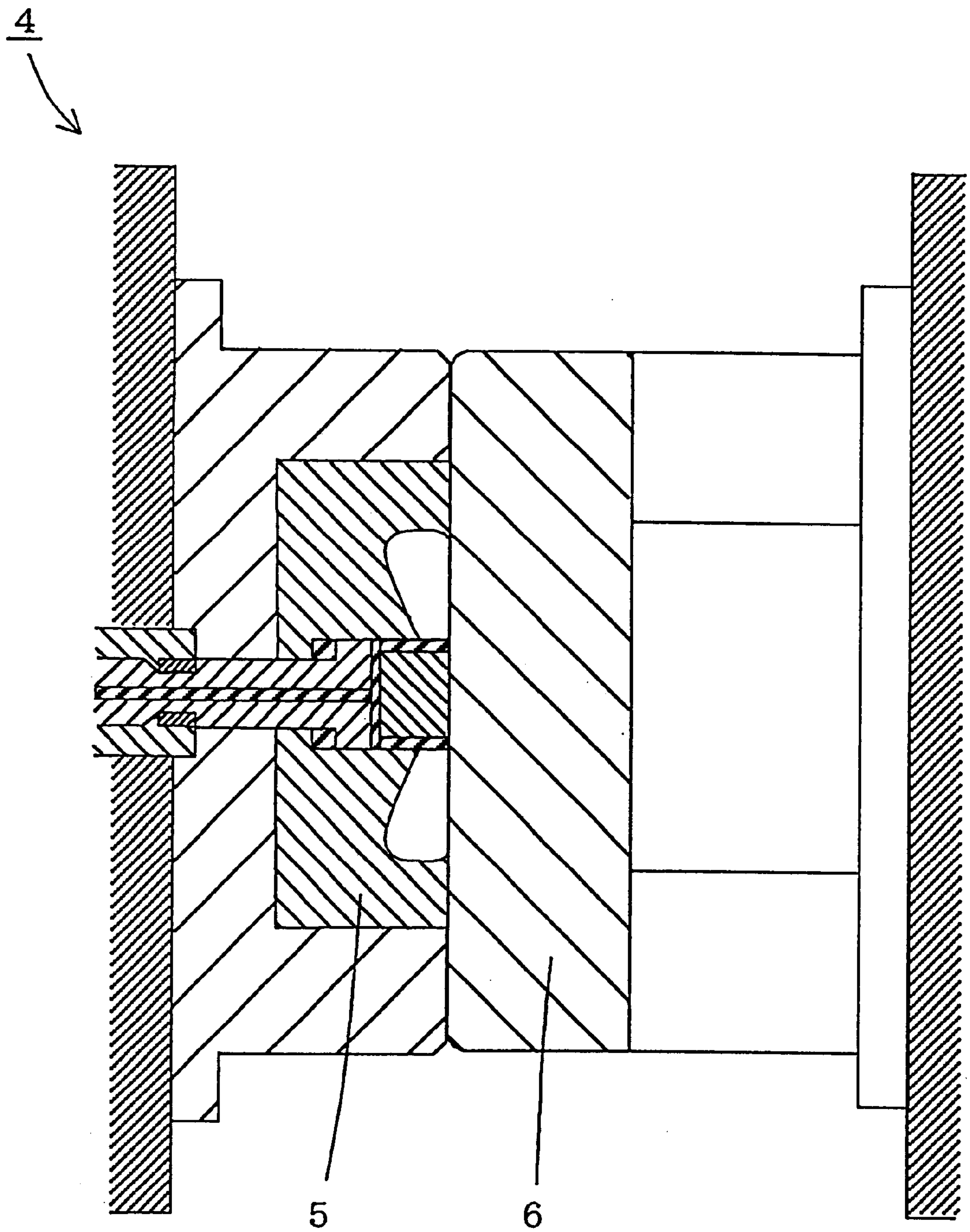
FIG. 27 is a partial side section view of a die for molding the propeller fan of the present invention.
Figure 28A:
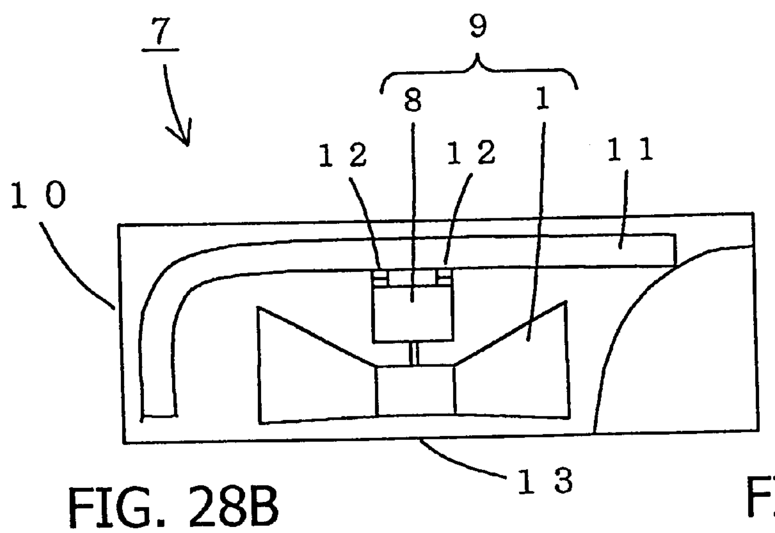
Figure 28B:
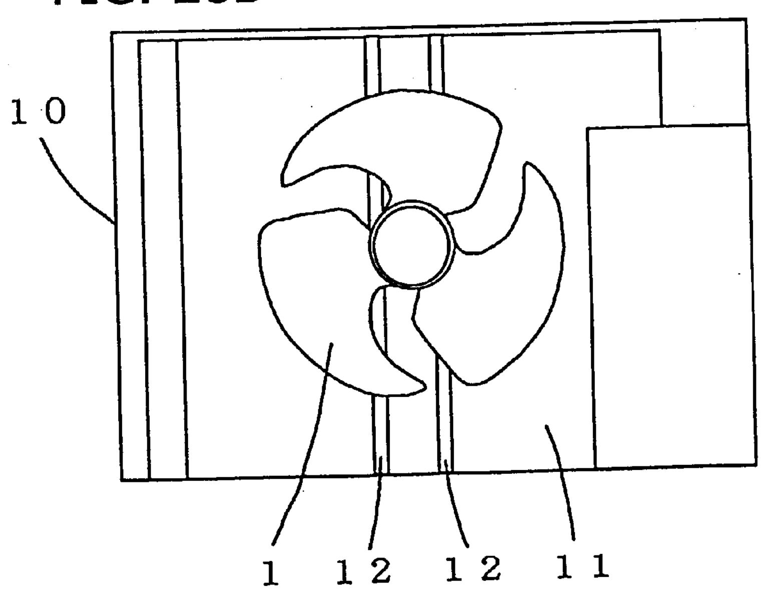
FIG. 28B is a front configuration view of the fluid feeding device of the present invention.
Figure 28C:
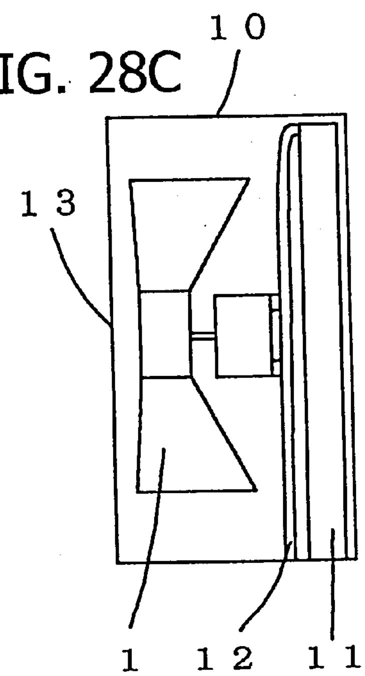

FIG. 27 shows an example of a propeller-fan-molding die 4 for forming propeller fan 1 shown in FIG. 21. Die 4 is for molding propeller fan 1 by synthetic resin, and has a fixed-side die 5 and a movable-side die 6, as shown in FIG. 27.

Then, the shape of a cavity defined by the both dies 5 and 6 is made approximately the same as the shape of propeller fan 1. Coordinates ($r_1$, $\theta_1$, $z_{1u}$) on the die surface of a portion forming the surface of blade 3 in fixed-side die 5 described above and coordinates ($r_1$, $\theta_1$, $z_{1d}$) on the die surface of a portion forming the surface of blade 3 in movable-side die 6 are obtained by transforming non-dimensionally expressed three-dimensional coordinate values indicated in Table 202 using a transformation formula 214 below.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = D/2 = 400/2 = 200 \\ b = 0 \\ c = \lambda = 360/n = \dfrac{2400}{7} \times \dfrac{h}{D} = \dfrac{2400}{7} \times \dfrac{140}{400} = 120 \\ d = 0 \\ e_u = e_d = h = 140 \\ f_u = f_d = 0 \end{array}\right\} \quad (214)$$

That is, fixed-side die 5 and movable-side die 6 have curved portions respectively specified by coordinate values indicated in Table 203. It is noted that, in this case also, each curved surface may be specified by coordinate values within the range of ±5% of each coordinate value.

Here, the dimension of the curved surface of the die may be determined in consideration of mold shrinkage. In this case, the coordinate data above may be corrected in consideration of the mold shrinkage, warping and deformation, to form molding die 4, such that propeller fan 1 having blade 3 with a three-dimensional curved surface specified by coordinate values within the range of ±5% of three-dimensional coordinate values indicated in Table 203 above is formed after the mold shrinkage, and these are encompassed by the molding die of the present invention.

Moreover, though die 4 for molding the propeller fan in the present embodiment includes the negative pressure side surface of propeller fan 1 formed by fixed-side die 5 and a positive pressure side surface of propeller fan formed by movable-side die 6 as shown in FIG. 27, it may be possible to form the positive pressure side surface of propeller fan 1 by fixed-side die 5 and the negative pressure side surface of propeller fan 1 by movable-side die 6.

Other embodiments and comparison examples of the present invention will be described below in detail.

Embodiment 41

Propeller fan 1 shown in FIG. 21 having the diameter D=400 mm, the height in the axial direction (z direction) h=140 mm, the number of blades n=3, the expansion angle of a blade λ=120 deg, the boss ratio ν=0.275 (boss diameter νD=110 mm) was formed such that the surface of the blade is a three-dimensional curved surface as indicated in Table 203. Note that FIGS. 22 and 23 each shows a perspective view of propeller fan 1 in the present Embodiment 41.

Embodiment 42

Propeller fan 1 having the diameter D=400 mm, the height in the axial direction (z direction) h=154 mm, the number of blades n=3, the expansion angle of a blade λ=120 deg, the boss ratio ν=0.275 (boss diameter νD=110 mm) was formed such that the surface of the blade is a curved surface formed by transforming the curved surface defined by non-dimensionally expressed three-dimensional coordinates specified by Table 202 using a transformation formula 215 below, i.e. a three-dimensional curved surface specified by Table 204.

$$
\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a,\, c,\, e_u,\, e_d\text{: factor of proportionality, } b,\, d,\, f_u,\, f_d\text{: constant})\\
&\text{wherein}\\
&a = D/2 = 400/2 = 200\\
&b = 0\\
&c = \lambda = 360/n = 120\\
&d = 0\\
&e_u = e_d = h = 154\\
&f_u = f_d = 0
\end{aligned}\right\} \quad (215)
$$

TABLE 204

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 60 | | | 29.41 | 33.36 | 37.09 | 40.73 | 44.34 | 47.88 | 51.33 | 54.65 | 57.84 | 60.90 | 63.80 | 66.50 |
| | | | 25.85 | 28.33 | 30.83 | 33.32 | 35.82 | 38.39 | 41.09 | 43.93 | 46.86 | 49.85 | 52.82 | 55.75 |
| 70 | | 22.68 | 27.94 | 32.71 | 37.23 | 41.55 | 45.68 | 49.60 | 53.33 | 56.92 | 60.35 | 63.63 | 66.67 | 69.24 |
| | | 19.50 | 23.17 | 26.70 | 30.16 | 33.61 | 37.11 | 40.67 | 44.27 | 47.85 | 51.38 | 54.80 | 58.12 | 61.41 |
| 80 | 13.53 | 20.48 | 26.49 | 32.02 | 37.22 | 42.15 | 46.79 | 51.15 | 55.30 | 59.25 | 63.00 | 66.54 | 69.74 | 72.39 |
| | 11.70 | 16.95 | 21.78 | 26.32 | 30.66 | 34.90 | 39.06 | 43.17 | 47.22 | 51.16 | 54.95 | 58.57 | 62.02 | 65.37 |
| 90 | 10.81 | 18.15 | 24.93 | 31.27 | 37.19 | 42.73 | 47.92 | 52.80 | 57.38 | 61.71 | 65.79 | 69.63 | 73.16 | 76.19 |
| | 8.54 | 14.97 | 20.90 | 26.38 | 31.47 | 36.30 | 40.94 | 45.44 | 49.82 | 54.06 | 58.12 | 61.96 | 65.57 | 69.05 |
| 100 | 6.49 | 15.36 | 23.27 | 30.48 | 37.14 | 43.33 | 49.10 | 54.48 | 59.51 | 64.23 | 68.68 | 72.87 | 76.79 | 80.36 |
| | 5.04 | 12.82 | 19.94 | 26.36 | 32.17 | 37.55 | 42.63 | 47.50 | 52.19 | 56.73 | 61.08 | 65.23 | 69.15 | 72.89 |
| 110 | 1.53 | 12.22 | 21.38 | 29.52 | 36.93 | 43.77 | 50.10 | 55.98 | 61.46 | 66.56 | 71.37 | 75.93 | 80.24 | 84.31 |
| | 1.01 | 10.20 | 18.52 | 25.88 | 32.46 | 38.45 | 44.00 | 49.24 | 54.24 | 59.05 | 63.70 | 68.18 | 72.48 | 76.62 |
| 120 | | 8.58 | 18.92 | 27.98 | 36.15 | 43.65 | 50.56 | 56.97 | 62.92 | 68.47 | 73.69 | 78.62 | 83.32 | 87.79 |
| | | 7.09 | 16.39 | 24.74 | 32.26 | 39.06 | 45.25 | 50.96 | 56.32 | 61.43 | 66.36 | 71.14 | 75.77 | 80.24 |
| 130 | | 4.38 | 15.70 | 25.84 | 34.89 | 43.01 | 50.40 | 57.25 | 63.64 | 69.66 | 75.37 | 80.78 | 85.92 | 90.80 |
| | | 3.61 | 14.26 | 24.07 | 32.81 | 40.55 | 47.47 | 53.77 | 59.61 | 65.08 | 70.25 | 75.17 | 79.87 | 84.39 |
| 140 | | | 12.62 | 24.09 | 34.10 | 42.92 | 50.80 | 57.98 | 64.68 | 71.01 | 77.04 | 82.73 | 88.23 | 93.51 |
| | | | 11.46 | 22.57 | 32.31 | 40.89 | 48.54 | 55.51 | 61.97 | 68.05 | 73.74 | 79.03 | 84.12 | 88.94 |
| 150 | | | 8.91 | 21.50 | 32.66 | 42.60 | 51.45 | 59.38 | 66.55 | 73.18 | 79.48 | 85.55 | 91.42 | 97.00 |
| | | | 7.88 | 19.99 | 30.83 | 40.46 | 49.01 | 56.67 | 63.62 | 70.07 | 76.22 | 82.14 | 87.82 | 93.19 |
| 160 | | | | 19.00 | 31.49 | 42.48 | 52.19 | 60.83 | 68.62 | 75.76 | 82.41 | 88.71 | 94.82 | 100.75 |
| | | | | 17.46 | 29.46 | 40.00 | 49.35 | 57.75 | 65.42 | 72.49 | 79.10 | 85.39 | 91.46 | 97.28 |
| 170 | | | | 16.59 | 30.37 | 42.32 | 52.74 | 61.95 | 70.26 | 77.88 | 84.97 | 91.68 | 98.11 | 104.37 |
| | | | | 15.12 | 28.22 | 39.57 | 49.62 | 58.63 | 66.83 | 74.39 | 81.48 | 88.21 | 94.72 | 101.08 |
| 180 | | | | 13.41 | 28.96 | 41.93 | 53.07 | 62.81 | 71.57 | 79.62 | 87.12 | 94.21 | 101.00 | 107.56 |
| | | | | 12.42 | 26.97 | 39.24 | 50.01 | 59.55 | 68.18 | 76.13 | 83.61 | 90.74 | 97.57 | 104.19 |
| 190 | | | | | 27.01 | 41.47 | 53.48 | 63.74 | 72.87 | 81.24 | 89.04 | 96.42 | 103.52 | 110.36 |
| | | | | | 25.56 | 39.31 | 50.81 | 60.77 | 69.77 | 78.05 | 85.83 | 93.30 | 100.59 | 107.57 |
| (mm) | | | | | | | | | | | | | | |

| r | θ 75 | 80 | 85 | 90 | 95 | 100 | 105 | 110 | 115 | 120 (deg) |
|---|---|---|---|---|---|---|---|---|---|---|
| 60 | 68.89 | 70.82 | 72.00 | 72.05 | | | | | | |
| | 58.66 | 61.63 | 64.81 | 68.55 | | | | | | |
| 70 | 71.06 | 71.63 | | | | | | | | |
| | 64.81 | 68.60 | | | | | | | | |
| 80 | 74.21 | 74.70 | | | | | | | | |
| | 68.78 | 72.56 | | | | | | | | |
| 90 | 78.53 | 79.68 | | | | | | | | |
| | 72.52 | 76.24 | | | | | | | | |
| 100 | 83.38 | 85.57 | 86.35 | | | | | | | |
| | 76.55 | 80.30 | 84.51 | | | | | | | |

TABLE 204-continued

| | | | | | | | | | | |
|---|---|---|---|---|---|---|---|---|---|---|
| 110 | 87.99 | 91.04 | 93.12 | | | | | | | |
| | 80.61 | 84.57 | 88.71 | | | | | | | |
| 120 | 92.01 | 95.80 | 98.89 | 100.87 | | | | | | |
| | 84.55 | 88.73 | 92.93 | 97.38 | | | | | | |
| 130 | 95.42 | 99.78 | 103.71 | 106.91 | 108.86 | | | | | |
| | 88.76 | 93.02 | 97.21 | 101.46 | 106.12 | | | | | |
| 140 | 98.53 | 103.26 | 107.73 | 111.78 | 115.09 | 117.16 | | | | |
| | 93.46 | 97.71 | 101.83 | 105.91 | 110.09 | 114.80 | | | | |
| 150 | 102.22 | 107.16 | 111.84 | 116.16 | 120.12 | 123.42 | 125.65 | | | |
| | 98.18 | 102.91 | 107.25 | 111.10 | 114.87 | 118.79 | 123.24 | | | |
| 160 | 106.40 | 111.64 | 116.41 | 120.91 | 125.21 | 128.92 | 131.89 | 134.08 | | |
| | 102.76 | 107.79 | 112.35 | 116.68 | 120.84 | 124.26 | 127.56 | 131.44 | | |
| 170 | 110.45 | 116.12 | 121.28 | 125.84 | 129.94 | 133.87 | 137.47 | 140.51 | 142.49 | |
| | 107.10 | 112.61 | 117.59 | 121.97 | 125.88 | 129.66 | 133.21 | 136.44 | 139.56 | |
| 180 | 114.00 | 120.15 | 125.71 | 130.62 | 134.93 | 138.68 | 142.07 | 145.17 | 147.73 | 149.49 |
| | 110.71 | 116.86 | 122.32 | 127.11 | 131.29 | 134.89 | 138.19 | 141.37 | 144.25 | 146.97 |
| 190 | 116.98 | 123.40 | 129.41 | 134.67 | 139.19 | 143.12 | 146.46 | 149.25 | 151.63 | 153.39 |
| | 114.22 | 120.65 | 126.63 | 131.82 | 136.27 | 140.15 | 143.49 | 146.39 | 149.22 | 151.91 |
| (mm) | | | | | | | | | | |

DIAMETER D = 400
HEIGHT h = 154
EXPANSION ANGLE λ = 120
BOSS RATIO ν = 0.275

Embodiment 43

Propeller fan 1 having the diameter D=400 mm, the height in the axial direction (z direction) h=147 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 216 below, i.e. a three-dimensional curved surface specified by Table 205.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = D/2 = 400/2 = 200\\
&b = 0\\
&c = \lambda = 360/n = 120\\
&d = 0\\
&e_u = e_d = h = 147\\
&f_u = f_d = 0
\end{aligned}\right\} \quad (216)$$

TABLE 205

| | θ | | | | | | | | | | | | | |
|---|---|---|---|---|---|---|---|---|---|---|---|---|---|---|
| r | 5 | 10 | 15 | 20 | 25 | 30 | 35 | 40 | 45 | 50 | 55 | 60 | 65 | 70 |
| 60 | | | 28.07 | 31.84 | 35.40 | 38.88 | 42.32 | 45.71 | 48.99 | 52.16 | 55.21 | 58.13 | 60.90 | 63.48 |
| | | | 24.67 | 27.04 | 29.43 | 31.81 | 34.19 | 36.65 | 39.22 | 41.93 | 44.73 | 47.58 | 50.42 | 53.22 |
| 70 | | 21.65 | 26.67 | 31.23 | 35.53 | 39.66 | 43.60 | 47.34 | 50.91 | 54.33 | 57.61 | 60.74 | 63.64 | 66.09 |
| | | 18.62 | 22.12 | 25.49 | 28.79 | 32.09 | 35.42 | 38.82 | 42.26 | 45.68 | 49.04 | 52.31 | 55.48 | 58.62 |
| 80 | 12.91 | 19.55 | 25.28 | 30.57 | 35.53 | 40.23 | 44.66 | 48.83 | 52.78 | 56.55 | 60.14 | 63.51 | 66.57 | 69.10 |
| | 11.17 | 16.18 | 20.79 | 25.13 | 29.27 | 33.31 | 37.29 | 41.21 | 45.07 | 48.83 | 52.45 | 55.91 | 59.20 | 62.40 |
| 90 | 10.32 | 17.32 | 23.80 | 29.85 | 35.50 | 40.79 | 45.75 | 50.40 | 54.77 | 58.90 | 62.80 | 66.47 | 69.83 | 72.73 |
| | 8.16 | 14.29 | 19.95 | 25.18 | 30.04 | 34.65 | 39.08 | 43.38 | 47.56 | 51.60 | 55.48 | 59.14 | 62.59 | 65.91 |
| 100 | 6.19 | 14.66 | 22.22 | 29.09 | 35.45 | 41.36 | 46.87 | 52.00 | 56.80 | 61.31 | 65.55 | 69.56 | 73.30 | 76.70 |
| | 4.81 | 12.24 | 19.04 | 25.16 | 30.71 | 35.84 | 40.69 | 45.34 | 49.82 | 54.15 | 58.31 | 62.27 | 66.01 | 69.58 |

TABLE 205-continued

| | | | | | | | | | | | | | | |
|---|---|---|---|---|---|---|---|---|---|---|---|---|---|---|
| 110 | 1.46 | 11.66 | 20.40 | 28.18 | 35.25 | 41.78 | 47.82 | 53.44 | 58.66 | 63.54 | 68.13 | 72.48 | 76.59 | 80.48 |
| | 0.96 | 9.74 | 17.68 | 24.70 | 30.99 | 36.71 | 42.00 | 47.00 | 51.77 | 56.37 | 60.80 | 65.08 | 69.19 | 73.13 |
| 120 | | 8.19 | 18.06 | 26.70 | 34.51 | 41.66 | 48.27 | 54.38 | 60.06 | 65.36 | 70.34 | 75.05 | 79.53 | 83.80 |
| | | 6.77 | 15.64 | 23.61 | 30.80 | 37.28 | 43.19 | 48.64 | 53.76 | 58.64 | 63.35 | 67.90 | 72.32 | 76.59 |
| 130 | | 4.18 | 14.98 | 24.66 | 33.30 | 41.05 | 48.11 | 54.64 | 60.75 | 66.50 | 71.94 | 77.11 | 82.02 | 86.67 |
| | | 3.45 | 13.62 | 22.98 | 31.32 | 38.71 | 45.31 | 51.32 | 56.90 | 62.12 | 67.06 | 71.75 | 76.24 | 80.55 |
| 140 | | | 12.05 | 23.00 | 32.55 | 40.96 | 48.49 | 55.35 | 61.74 | 67.79 | 73.54 | 78.97 | 84.22 | 89.26 |
| | | | 10.94 | 21.54 | 30.84 | 39.03 | 46.34 | 52.99 | 59.16 | 64.96 | 70.39 | 75.44 | 80.29 | 84.90 |
| 150 | | | 8.50 | 20.52 | 31.17 | 40.67 | 49.12 | 56.68 | 63.52 | 69.85 | 75.86 | 81.67 | 87.27 | 92.59 |
| | | | 7.52 | 19.08 | 29.43 | 38.62 | 46.79 | 54.09 | 60.73 | 66.89 | 72.76 | 78.40 | 83.83 | 88.95 |
| 160 | | | | 18.14 | 30.06 | 40.55 | 49.82 | 58.07 | 65.51 | 72.31 | 78.66 | 84.67 | 90.51 | 96.17 |
| | | | | 16.67 | 28.12 | 38.18 | 47.11 | 55.13 | 62.44 | 69.20 | 75.50 | 81.51 | 87.30 | 92.86 |
| 170 | | | | 15.84 | 28.99 | 40.40 | 50.35 | 59.14 | 67.07 | 74.34 | 81.11 | 87.51 | 93.65 | 99.63 |
| | | | | 14.43 | 26.94 | 37.77 | 47.36 | 55.97 | 63.79 | 71.01 | 77.78 | 84.20 | 90.42 | 96.49 |
| 180 | | | | 12.80 | 27.64 | 40.02 | 50.66 | 59.96 | 68.32 | 76.00 | 83.16 | 89.93 | 96.41 | 102.67 |
| | | | | 11.85 | 25.75 | 37.46 | 47.73 | 56.84 | 65.08 | 72.67 | 79.81 | 86.62 | 93.14 | 99.46 |
| 190 | | | | | 25.78 | 39.59 | 51.05 | 60.85 | 69.56 | 77.55 | 84.99 | 92.04 | 98.81 | 105.35 |
| | | | | | 24.40 | 37.52 | 48.50 | 58.01 | 66.59 | 74.50 | 81.93 | 89.06 | 96.02 | 102.68 |
| (mm) | | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 60 | 65.76 | 67.60 | 68.73 | 68.77 | | | | | | | |
| | 56.00 | 58.83 | 61.78 | 65.44 | | | | | | | |
| 70 | 67.83 | 68.38 | | | | | | | | | |
| | 61.86 | 65.48 | | | | | | | | | |
| 80 | 70.83 | 71.31 | | | | | | | | | |
| | 65.65 | 69.26 | | | | | | | | | |
| 90 | 74.96 | 76.06 | | | | | | | | | |
| | 69.22 | 72.77 | | | | | | | | | |
| 100 | 79.59 | 81.68 | 82.43 | | | | | | | | |
| | 73.07 | 76.65 | 80.67 | | | | | | | | |
| 110 | 83.99 | 86.90 | 88.89 | | | | | | | | |
| | 76.95 | 80.73 | 84.68 | | | | | | | | |
| 120 | 87.83 | 91.44 | 94.39 | 96.28 | | | | | | | |
| | 80.71 | 84.70 | 88.71 | 92.95 | | | | | | | |
| 130 | 91.09 | 95.25 | 98.99 | 102.05 | 103.91 | | | | | | |
| | 84.73 | 88.79 | 92.79 | 96.85 | 101.30 | | | | | | |
| 140 | 94.05 | 98.57 | 102.83 | 106.70 | 109.86 | 111.84 | | | | | |
| | 89.21 | 93.27 | 97.20 | 101.09 | 105.09 | 109.58 | | | | | |
| 150 | 97.58 | 102.29 | 106.76 | 110.88 | 114.66 | 117.81 | 119.94 | | | | |
| | 93.72 | 98.23 | 102.37 | 106.05 | 109.65 | 113.39 | 117.64 | | | | |
| 160 | 101.57 | 106.56 | 111.12 | 115.41 | 119.52 | 123.06 | 125.89 | 127.98 | | | |
| | 98.09 | 102.89 | 107.24 | 111.38 | 115.35 | 118.61 | 121.77 | 125.47 | | | |
| 170 | 105.43 | 110.85 | 115.76 | 120.12 | 124.04 | 127.78 | 131.23 | 134.12 | 136.01 | | |
| | 102.23 | 107.49 | 112.24 | 116.43 | 120.16 | 123.77 | 127.16 | 130.24 | 133.22 | | |
| 180 | 108.81 | 114.69 | 119.99 | 124.69 | 128.80 | 132.37 | 135.61 | 138.58 | 141.01 | 142.69 | |
| | 105.68 | 111.55 | 116.76 | 121.33 | 125.32 | 128.76 | 131.91 | 134.94 | 137.69 | 140.29 | |
| 190 | 111.66 | 117.80 | 123.53 | 128.55 | 132.86 | 136.61 | 139.81 | 142.47 | 144.74 | 146.42 | |
| | 109.03 | 115.16 | 120.88 | 125.83 | 130.08 | 133.78 | 139.97 | 139.74 | 142.43 | 145.01 | |
| (mm) | | | | | | | | | | | |

DIAMETER D = 400
HEIGHT h = 147
EXPANSION ANGLE λ = 120
BOSS RATIO ν = 0.275

Embodiment 44

Propeller fan 1 having the diameter D=400 mm, the height in the axial direction (z direction) h=133 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 217 below, i.e. a three-dimensional curved surface specified by Table 206.

$$
\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{D}{2} = \frac{400}{2} = 200\\
&b = 0\\
&c = \lambda = \frac{360}{n} = 120\\
&d = 0\\
&e_u = e_d = h = 133\\
&f_u = f_d = 0
\end{aligned}\right\} \quad (217)
$$

TABLE 206

| r | θ 5 | 10 | 15 | 20 | 25 | 30 | 35 | 40 | 45 | 50 | 55 | 60 | 65 | 70 | 75 |
|---|---|---|---|---|---|---|---|---|---|---|---|---|---|---|---|
| 60 | | | 25.40 | 28.81 | 32.03 | 35.17 | 38.29 | 41.35 | 44.33 | 47.20 | 49.95 | 52.60 | 55.10 | 57.44 | 59.49 |
| | | | 22.32 | 24.47 | 26.63 | 28.78 | 30.94 | 33.16 | 35.48 | 37.94 | 40.47 | 43.05 | 45.62 | 48.15 | 50.67 |
| 70 | | 19.58 | 24.13 | 28.25 | 32.15 | 35.88 | 39.45 | 42.83 | 46.06 | 49.16 | 52.12 | 54.95 | 57.58 | 59.80 | 61.37 |
| | | 16.84 | 20.01 | 23.06 | 26.05 | 29.03 | 32.05 | 35.12 | 38.23 | 41.33 | 44.37 | 47.33 | 50.20 | 53.04 | 55.97 |
| 80 | 11.68 | 17.69 | 22.88 | 27.65 | 32.14 | 36.40 | 40.41 | 44.18 | 47.76 | 51.17 | 54.41 | 57.47 | 60.23 | 62.52 | 64.09 |
| | 10.10 | 14.64 | 18.81 | 22.73 | 26.48 | 30.14 | 33.74 | 37.29 | 40.78 | 44.18 | 47.46 | 50.58 | 53.56 | 56.46 | 59.40 |
| 90 | 9.34 | 15.67 | 21.53 | 27.00 | 32.12 | 36.90 | 41.39 | 45.60 | 49.55 | 53.29 | 56.82 | 60.14 | 63.18 | 65.80 | 67.82 |
| | 7.38 | 12.93 | 18.05 | 22.78 | 27.18 | 31.35 | 35.36 | 39.24 | 43.03 | 46.69 | 50.19 | 53.51 | 56.63 | 59.64 | 62.63 |
| 100 | 5.60 | 13.26 | 20.10 | 26.32 | 32.08 | 37.42 | 42.40 | 47.05 | 51.39 | 55.47 | 59.31 | 62.93 | 66.32 | 69.40 | 72.01 |
| | 4.35 | 11.07 | 17.22 | 22.76 | 27.79 | 32.43 | 36.82 | 41.02 | 45.08 | 48.99 | 52.75 | 56.34 | 59.72 | 62.95 | 66.11 |
| 110 | 1.32 | 10.55 | 18.46 | 25.49 | 31.89 | 37.80 | 43.27 | 48.35 | 53.07 | 57.49 | 61.64 | 65.57 | 69.30 | 72.81 | 75.99 |
| | 0.87 | 8.81 | 15.99 | 22.35 | 28.03 | 33.21 | 38.00 | 42.53 | 46.84 | 51.00 | 55.01 | 58.88 | 62.60 | 66.17 | 69.62 |
| 120 | | 7.41 | 16.34 | 24.16 | 31.22 | 37.70 | 43.67 | 49.20 | 54.34 | 59.13 | 63.64 | 67.90 | 71.96 | 75.82 | 79.46 |
| | | 6.12 | 14.15 | 21.36 | 27.86 | 33.73 | 39.08 | 44.01 | 48.64 | 53.06 | 57.31 | 61.44 | 65.43 | 69.30 | 73.02 |
| 130 | | 3.79 | 13.56 | 22.31 | 30.13 | 37.14 | 43.53 | 49.44 | 54.96 | 60.16 | 65.09 | 69.76 | 74.20 | 78.42 | 82.41 |
| | | 3.12 | 12.32 | 20.79 | 28.34 | 35.02 | 41.00 | 46.44 | 51.48 | 56.21 | 60.67 | 64.92 | 68.98 | 72.88 | 76.66 |
| 140 | | | 10.90 | 20.81 | 29.45 | 37.06 | 43.87 | 50.08 | 55.86 | 61.33 | 66.53 | 71.45 | 76.20 | 80.76 | 85.10 |
| | | | 9.89 | 19.49 | 27.91 | 35.31 | 41.92 | 47.94 | 53.52 | 58.77 | 63.68 | 68.26 | 72.65 | 76.81 | 80.72 |
| 150 | | | 7.69 | 18.56 | 28.20 | 36.79 | 44.44 | 51.28 | 57.47 | 63.20 | 68.64 | 73.89 | 78.95 | 83.77 | 88.28 |
| | | | 6.81 | 17.26 | 26.62 | 34.94 | 42.33 | 48.94 | 54.94 | 60.52 | 65.83 | 70.94 | 75.84 | 80.48 | 84.79 |
| 160 | | | | 16.41 | 27.19 | 36.69 | 45.07 | 52.54 | 59.27 | 65.43 | 71.17 | 76.61 | 81.89 | 87.01 | 91.89 |
| | | | | 15.08 | 25.44 | 34.54 | 42.62 | 49.88 | 56.50 | 62.61 | 68.31 | 73.74 | 78.99 | 84.02 | 88.75 |
| 170 | | | | 14.33 | 26.23 | 36.55 | 45.55 | 53.50 | 60.68 | 67.26 | 73.38 | 79.18 | 84.73 | 90.14 | 95.39 |
| | | | | 13.06 | 24.38 | 34.17 | 42.85 | 50.64 | 57.71 | 64.25 | 70.37 | 76.18 | 81.81 | 87.30 | 92.49 |
| 180 | | | | 11.58 | 25.01 | 36.21 | 45.83 | 54.25 | 61.81 | 68.76 | 75.24 | 81.37 | 87.22 | 92.89 | 98.45 |
| | | | | 10.72 | 23.30 | 33.89 | 43.19 | 51.43 | 58.88 | 65.75 | 72.21 | 78.37 | 84.27 | 89.98 | 95.61 |
| 190 | | | | | 23.33 | 35.82 | 46.19 | 55.05 | 62.93 | 70.16 | 76.90 | 83.27 | 89.40 | 95.31 | 101.03 |
| | | | | | 22.07 | 33.95 | 43.88 | 52.48 | 60.25 | 67.41 | 74.13 | 80.58 | 86.87 | 92.90 | 98.64 |
| (mm) | | | | | | | | | | | | | | | |

| r | θ 80 | 85 | 90 | 95 | 100 | 105 | 110 | 115 | 120 (deg) |
|---|---|---|---|---|---|---|---|---|---|
| 60 | 61.16 | 62.18 | 62.22 | | | | | | |
| | 53.23 | 55.98 | 59.20 | | | | | | |
| 70 | 61.86 | | | | | | | | |
| | 59.24 | | | | | | | | |
| 80 | 64.51 | | | | | | | | |
| | 62.67 | | | | | | | | |
| 90 | 68.82 | | | | | | | | |
| | 65.84 | | | | | | | | |
| 100 | 73.90 | 74.58 | | | | | | | |
| | 69.35 | 72.99 | | | | | | | |
| 110 | 78.63 | 80.42 | | | | | | | |
| | 73.04 | 76.61 | | | | | | | |
| 120 | 82.74 | 85.40 | 87.11 | | | | | | |
| | 76.63 | 80.26 | 84.10 | | | | | | |
| 130 | 86.18 | 89.57 | 92.33 | 94.02 | | | | | |
| | 80.33 | 83.95 | 87.63 | 91.65 | | | | | |

TABLE 206-continued

| | | | | | | | | | |
|---|---|---|---|---|---|---|---|---|---|
| 140 | 89.18 | 93.04 | 96.54 | 99.40 | 101.19 | | | | |
| | 84.39 | 87.94 | 91.47 | 95.08 | 99.14 | | | | |
| 150 | 92.55 | 96.59 | 100.32 | 103.74 | 106.59 | 108.51 | | | |
| | 88.88 | 92.62 | 95.95 | 99.20 | 102.59 | 106.43 | | | |
| 160 | 96.41 | 100.53 | 104.42 | 108.14 | 111.34 | 113.90 | 115.80 | | |
| | 93.09 | 97.03 | 100.77 | 104.36 | 107.32 | 110.17 | 113.52 | | |
| 170 | 100.29 | 104.74 | 108.68 | 112.22 | 115.61 | 118.73 | 121.35 | 123.06 | |
| | 97.26 | 101.55 | 105.34 | 108.71 | 111.98 | 115.05 | 117.84 | 120.53 | |
| 180 | 103.76 | 108.57 | 112.81 | 116.53 | 119.77 | 122.70 | 125.38 | 127.58 | 129.10 |
| | 100.93 | 105.64 | 109.78 | 113.38 | 116.49 | 119.35 | 122.09 | 124.58 | 126.93 |
| 190 | 106.58 | 111.76 | 116.30 | 120.21 | 123.60 | 126.49 | 128.90 | 130.95 | 132.47 |
| | 104.20 | 109.36 | 113.84 | 117.69 | 121.04 | 123.92 | 126.43 | 128.87 | 131.20 |
| (mm) | | | | | | | | | |

DIAMETER D = 400
HEIGHT h = 133
EXPANSION ANGLE λ = 120
BOSS RATIO ν = 0.275

Embodiment 45

Propeller fan 1 having the diameter D=400 mm, the height in the axial direction (z direction) h=126 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 218 below, i.e. a three-dimensional curved surface specified by Table 207.

$$
\left.
\begin{array}{l}
r_1 = a \times r + b \text{ (mm)} \\
\theta_1 = c \times \theta + d \text{ (deg)} \\
z_{1u} = e_u \times z_u + f_u \text{ (mm)} \\
z_{1d} = e_d \times z_d + f_d \text{ (mm)} \\
(a,\ c,\ e_u,\ e_d\text{: factor of proportionality, } b,\ d,\ f_u,\ f_d\text{: constant}) \\
\text{wherein} \\
a = \dfrac{D}{2} = \dfrac{400}{2} = 200 \\
b = 0 \\
c = \lambda = \dfrac{360}{n} = 120 \\
d = 0 \\
e_u = e_d = h = 126 \\
f_u = f_d = 0
\end{array}
\right\} \quad (218)
$$

TABLE 207

| | θ | | | | | | | | | | | | | |
|---|---|---|---|---|---|---|---|---|---|---|---|---|---|---|
| r | 5 | 10 | 15 | 20 | 25 | 30 | 35 | 40 | 45 | 50 | 55 | 60 | 65 | 70 |
| 60 | | | 24.06 | 27.30 | 30.34 | 33.32 | 36.27 | 39.18 | 42.00 | 44.71 | 47.33 | 49.83 | 52.20 | 54.41 |
| | | | 21.15 | 23.18 | 25.23 | 27.27 | 29.31 | 31.41 | 33.62 | 35.94 | 38.34 | 40.79 | 43.22 | 45.61 |
| 70 | | 18.55 | 22.86 | 26.77 | 30.46 | 33.99 | 37.38 | 40.58 | 43.63 | 46.57 | 49.38 | 52.06 | 54.55 | 56.65 |
| | | 15.96 | 18.96 | 21.85 | 24.68 | 27.50 | 30.36 | 33.27 | 36.22 | 39.15 | 42.04 | 44.84 | 47.55 | 50.25 |
| 80 | 11.07 | 16.76 | 21.67 | 26.20 | 30.45 | 34.48 | 38.28 | 41.85 | 45.24 | 48.47 | 51.55 | 54.44 | 57.06 | 59.23 |
| | 9.57 | 13.87 | 17.82 | 21.54 | 25.09 | 28.55 | 31.96 | 35.32 | 38.63 | 41.86 | 44.96 | 47.92 | 50.74 | 53.49 |
| 90 | 8.85 | 14.85 | 20.40 | 25.58 | 30.43 | 34.96 | 39.21 | 43.20 | 46.95 | 50.49 | 53.83 | 56.97 | 59.86 | 62.34 |
| | 6.99 | 12.25 | 17.10 | 21.58 | 25.75 | 29.70 | 33.49 | 37.18 | 40.76 | 44.23 | 47.55 | 50.69 | 53.65 | 56.50 |
| 100 | 5.31 | 12.56 | 19.04 | 24.94 | 30.39 | 35.45 | 40.17 | 44.57 | 48.69 | 52.55 | 56.19 | 59.62 | 62.83 | 65.75 |
| | 4.12 | 10.49 | 16.32 | 21.57 | 26.32 | 30.72 | 34.88 | 38.86 | 42.70 | 46.42 | 49.98 | 53.37 | 56.58 | 59.64 |
| 110 | 1.25 | 10.00 | 17.49 | 24.15 | 30.22 | 35.81 | 40.99 | 45.81 | 50.28 | 54.46 | 58.40 | 62.12 | 65.65 | 68.98 |
| | 0.83 | 8.35 | 15.15 | 21.17 | 26.56 | 31.46 | 36.00 | 40.29 | 44.38 | 48.32 | 52.12 | 55.78 | 59.31 | 62.69 |
| 120 | | 7.02 | 15.48 | 22.89 | 29.58 | 35.71 | 41.37 | 46.61 | 51.48 | 56.02 | 60.29 | 64.33 | 68.17 | 71.83 |
| | | 5.80 | 13.41 | 20.24 | 26.40 | 31.96 | 37.02 | 41.69 | 46.08 | 50.26 | 54.30 | 58.20 | 61.99 | 65.65 |

TABLE 207-continued

| | | | | | | | | | | | | | |
|---|---|---|---|---|---|---|---|---|---|---|---|---|---|
| 130 | 3.59 | 12.84 | 21.14 | 28.54 | 35.19 | 41.24 | 46.84 | 52.07 | 57.00 | 61.66 | 66.09 | 70.30 | 74.29 |
| | 2.96 | 11.67 | 19.69 | 26.84 | 33.18 | 38.84 | 43.99 | 48.77 | 53.25 | 57.48 | 61.50 | 65.35 | 69.04 |
| 140 | | 10.33 | 19.71 | 27.90 | 35.11 | 41.56 | 47.44 | 52.92 | 58.10 | 63.03 | 67.69 | 72.19 | 76.50 |
| | | 9.37 | 18.47 | 26.44 | 33.46 | 39.72 | 45.42 | 50.71 | 55.68 | 60.33 | 64.66 | 68.82 | 72.77 |
| 150 | | 7.29 | 17.59 | 26.72 | 34.86 | 42.10 | 48.58 | 54.45 | 59.87 | 65.03 | 70.00 | 74.80 | 79.37 |
| | | 6.45 | 16.35 | 25.22 | 33.10 | 40.10 | 46.37 | 52.05 | 57.33 | 62.37 | 67.20 | 71.85 | 76.24 |
| 160 | | | 15.55 | 25.76 | 34.76 | 42.70 | 49.77 | 56.15 | 61.98 | 67.42 | 72.58 | 77.58 | 82.43 |
| | | | 14.29 | 24.10 | 32.73 | 40.38 | 47.25 | 53.52 | 59.31 | 64.71 | 69.86 | 74.83 | 79.59 |
| 170 | | | 13.57 | 24.85 | 34.63 | 43.15 | 50.69 | 57.49 | 63.72 | 69.52 | 75.01 | 80.27 | 85.39 |
| | | | 12.37 | 23.09 | 32.38 | 40.60 | 47.97 | 54.68 | 60.87 | 66.67 | 72.17 | 77.50 | 82.71 |
| 180 | | | 10.97 | 23.69 | 34.30 | 43.42 | 51.39 | 58.56 | 65.14 | 71.28 | 77.08 | 82.63 | 88.00 |
| | | | 10.16 | 22.07 | 32.11 | 40.91 | 48.72 | 55.78 | 62.29 | 68.41 | 74.25 | 79.83 | 85.25 |
| 190 | | | | 22.10 | 33.93 | 43.76 | 52.15 | 59.62 | 66.47 | 72.85 | 78.89 | 84.69 | 90.30 |
| | | | | 20.91 | 32.16 | 41.57 | 49.72 | 57.08 | 63.86 | 70.23 | 76.34 | 82.30 | 88.01 |
| (mm) | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 60 | 56.36 | 57.94 | 58.91 | 58.95 | | | | | | | |
| | 48.00 | 50.42 | 53.03 | 56.09 | | | | | | | |
| 70 | 58.14 | 58.61 | | | | | | | | | |
| | 53.03 | 56.13 | | | | | | | | | |
| 80 | 60.71 | 61.12 | | | | | | | | | |
| | 56.28 | 59.37 | | | | | | | | | |
| 90 | 64.25 | 65.20 | | | | | | | | | |
| | 59.33 | 62.38 | | | | | | | | | |
| 100 | 68.22 | 70.01 | 70.65 | | | | | | | | |
| | 62.63 | 65.70 | 69.15 | | | | | | | | |
| 110 | 71.99 | 74.49 | 76.19 | | | | | | | | |
| | 65.96 | 69.20 | 72.58 | | | | | | | | |
| 120 | 75.28 | 78.38 | 80.91 | 82.53 | | | | | | | |
| | 69.18 | 72.60 | 76.04 | 79.67 | | | | | | | |
| 130 | 78.07 | 81.64 | 84.85 | 87.47 | 89.07 | | | | | | |
| | 72.62 | 76.10 | 79.53 | 83.02 | 86.83 | | | | | | |
| 140 | 80.62 | 84.49 | 88.14 | 91.46 | 94.17 | 95.86 | | | | | |
| | 76.47 | 79.95 | 83.31 | 86.65 | 90.07 | 93.93 | | | | | |
| 150 | 83.64 | 87.67 | 91.51 | 95.04 | 98.28 | 100.98 | 102.80 | | | | |
| | 80.33 | 84.20 | 87.75 | 90.90 | 93.98 | 97.19 | 100.83 | | | | |
| 160 | 87.06 | 91.34 | 95.24 | 98.93 | 102.45 | 105.48 | 107.91 | 109.70 | | | |
| | 84.08 | 88.19 | 91.92 | 95.47 | 98.87 | 101.67 | 104.37 | 107.54 | | | |
| 170 | 90.37 | 95.01 | 99.23 | 102.96 | 106.32 | 109.53 | 112.48 | 114.96 | 116.58 | | |
| | 87.63 | 92.14 | 96.21 | 99.79 | 102.99 | 106.09 | 108.99 | 111.63 | 114.19 | | |
| 180 | 93.27 | 98.30 | 102.85 | 106.87 | 110.40 | 113.46 | 116.24 | 118.78 | 120.87 | 122.31 | |
| | 90.58 | 95.61 | 100.08 | 104.00 | 107.42 | 110.36 | 113.07 | 115.66 | 118.02 | 120.25 | |
| 190 | 95.71 | 100.97 | 105.88 | 110.18 | 113.88 | 117.10 | 119.83 | 122.12 | 124.06 | 125.50 | |
| | 93.45 | 98.71 | 103.61 | 107.85 | 111.50 | 114.67 | 117.40 | 119.78 | 122.09 | 124.29 | |
| (mm) | | | | | | | | | | | |

DIAMETER D = 400
HEIGHT h = 126
EXPANSION ANGLE λ = 120
BOSS RATIO ν = 0.275

Embodiment 46

Propeller fan 1 having the diameter D=400 mm, the height in the axial direction (z direction) h=112 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 219 below, i.e. a three-dimensional curved surface specified by Table 208.

$$
\left.
\begin{aligned}
& r_1 = a \times r + b \text{ (mm)} \\
& \theta_1 = c \times \theta + d \text{ (deg)} \\
& z_{1u} = e_u \times z_u + f_u \text{ (mm)} \\
& z_1 = e_d \times z_d + f_d \text{ (mm)} \\
& (a,\ c,\ e_u,\ e_d\text{: factor of proportionality, } b,\ d,\ f_u,\ f_d\text{: constant}) \\
& \text{wherein} \\
& a = \frac{D}{2} = \frac{400}{2} = 200 \\
& b = 0 \\
& c = \lambda = \frac{360}{n} = 120 \\
& d = 0 \\
& e_u = e_d = h = 112 \\
& f_u = f_d = 0
\end{aligned}
\right\} \quad (219)
$$

TABLE 208

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 60 | | | 21.39 | 24.26 | 26.97 | 29.62 | 32.24 | 34.82 | 37.33 | 39.74 | 42.07 | 44.29 | 46.40 | 48.37 |
| | | | 18.80 | 20.60 | 22.42 | 24.24 | 26.05 | 27.92 | 29.88 | 31.95 | 34.08 | 36.25 | 38.42 | 40.55 |
| 70 | | 16.49 | 20.32 | 23.79 | 27.07 | 30.22 | 33.22 | 36.07 | 38.78 | 41.39 | 43.89 | 46.28 | 48.49 | 50.36 |
| | | 14.18 | 16.85 | 19.42 | 21.93 | 24.45 | 26.99 | 29.58 | 32.19 | 34.80 | 37.37 | 39.86 | 42.27 | 44.67 |
| 80 | 9.84 | 14.90 | 19.26 | 23.29 | 27.07 | 30.65 | 34.03 | 37.20 | 40.22 | 43.09 | 45.82 | 48.39 | 50.72 | 52.65 |
| | 8.51 | 12.33 | 15.84 | 19.14 | 22.30 | 25.38 | 28.41 | 31.40 | 34.34 | 37.20 | 39.97 | 42.60 | 45.10 | 47.54 |
| 90 | 7.86 | 13.20 | 18.13 | 22.74 | 27.05 | 31.08 | 34.85 | 38.40 | 41.73 | 44.88 | 47.85 | 50.64 | 53.21 | 55.41 |
| | 6.21 | 10.88 | 15.20 | 19.18 | 22.89 | 26.40 | 29.77 | 33.05 | 36.23 | 39.32 | 42.27 | 45.06 | 47.69 | 50.22 |
| 100 | 4.72 | 11.17 | 16.93 | 22.17 | 27.01 | 31.51 | 35.71 | 39.62 | 43.28 | 46.71 | 49.95 | 52.99 | 55.85 | 58.44 |
| | 3.66 | 9.32 | 14.51 | 19.17 | 23.40 | 27.31 | 31.01 | 34.54 | 37.96 | 41.26 | 44.42 | 47.44 | 50.29 | 53.01 |
| 110 | 1.11 | 8.89 | 15.55 | 21.47 | 26.86 | 31.83 | 36.44 | 40.72 | 44.69 | 48.41 | 51.91 | 55.22 | 58.36 | 61.32 |
| | 0.73 | 7.42 | 13.47 | 18.82 | 23.61 | 27.97 | 32.00 | 35.81 | 39.45 | 42.95 | 46.33 | 49.58 | 52.72 | 55.72 |
| 120 | | 6.24 | 13.76 | 20.35 | 26.29 | 31.74 | 36.77 | 41.43 | 45.76 | 49.80 | 53.59 | 57.18 | 60.60 | 63.85 |
| | | 5.16 | 11.92 | 17.99 | 23.46 | 28.41 | 32.91 | 37.06 | 40.96 | 44.68 | 48.26 | 51.74 | 55.10 | 58.36 |
| 130 | | 3.19 | 11.42 | 18.79 | 25.37 | 31.28 | 36.66 | 41.63 | 46.28 | 50.66 | 54.81 | 58.75 | 62.49 | 66.04 |
| | | 2.63 | 10.37 | 17.51 | 23.86 | 29.49 | 34.52 | 39.10 | 43.35 | 47.33 | 51.09 | 54.67 | 58.09 | 61.37 |
| 140 | | | 9.18 | 17.52 | 24.80 | 31.21 | 36.94 | 42.17 | 47.04 | 51.65 | 56.03 | 60.17 | 64.16 | 68.00 |
| | | | 8.33 | 16.41 | 23.50 | 29.74 | 35.30 | 40.37 | 45.07 | 49.49 | 53.63 | 57.48 | 61.18 | 64.68 |
| 150 | | | 6.48 | 15.63 | 23.75 | 30.98 | 37.42 | 43.18 | 48.40 | 53.22 | 57.80 | 62.22 | 66.49 | 70.55 |
| | | | 5.73 | 14.54 | 22.42 | 29.42 | 35.65 | 41.21 | 46.27 | 50.96 | 55.44 | 59.74 | 63.87 | 67.77 |
| 160 | | | | 13.82 | 22.90 | 30.89 | 37.96 | 44.24 | 49.91 | 55.10 | 59.93 | 64.51 | 68.96 | 73.27 |
| | | | | 12.70 | 21.43 | 29.09 | 35.89 | 42.00 | 47.57 | 52.72 | 57.52 | 62.10 | 66.51 | 70.75 |
| 170 | | | | 12.07 | 22.09 | 30.78 | 38.36 | 45.06 | 51.10 | 56.64 | 61.80 | 66.68 | 71.35 | 75.91 |
| | | | | 11.00 | 20.53 | 28.78 | 36.09 | 42.64 | 48.60 | 54.10 | 59.26 | 64.15 | 68.89 | 73.52 |
| 180 | | | | 9.75 | 21.06 | 30.49 | 38.59 | 45.68 | 52.05 | 57.90 | 63.36 | 68.52 | 73.45 | 78.23 |
| | | | | 9.03 | 19.62 | 28.54 | 36.37 | 43.31 | 49.59 | 55.37 | 60.81 | 66.00 | 70.96 | 75.78 |
| 190 | | | | | 19.65 | 30.16 | 38.89 | 46.36 | 53.00 | 59.09 | 64.76 | 70.12 | 75.28 | 80.26 |
| | | | | | 18.59 | 28.59 | 36.95 | 44.20 | 50.74 | 56.76 | 62.42 | 67.86 | 73.15 | 78.23 |
| (mm) | | | | | | | | | | | | | | |

| r | θ 75 | 80 | 85 | 90 | 95 | 100 | 105 | 110 | 115 | 120 | (deg) |
|---|---|---|---|---|---|---|---|---|---|---|---|
| 60 | 50.10 | 51.51 | 52.36 | 52.40 | | | | | | | |
| | 40.55 | 42.67 | 44.82 | 47.14 | 49.86 | | | | | | |
| 70 | 51.68 | 52.10 | | | | | | | | | |
| | 44.67 | 47.13 | 49.89 | | | | | | | | |
| 80 | 53.97 | 54.33 | | | | | | | | | |
| | 47.54 | 50.02 | 52.77 | | | | | | | | |
| 90 | 57.11 | 57.95 | | | | | | | | | |
| | 50.22 | 52.74 | 55.45 | | | | | | | | |
| 100 | 60.64 | 62.23 | 62.80 | | | | | | | | |
| | 53.01 | 55.67 | 58.40 | 61.47 | | | | | | | |
| 110 | 63.99 | 66.21 | 67.72 | | | | | | | | |
| | 55.72 | 58.63 | 61.51 | 64.52 | | | | | | | |
| 120 | 66.92 | 69.67 | 71.92 | 73.36 | | | | | | | |
| | 58.36 | 61.49 | 64.53 | 67.59 | 70.82 | | | | | | |
| 130 | 69.40 | 72.57 | 75.42 | 77.75 | 79.17 | | | | | | |
| | 61.37 | 64.55 | 67.65 | 70.70 | 73.79 | 77.18 | | | | | |
| 140 | 71.66 | 75.10 | 78.35 | 81.30 | 83.70 | 85.21 | | | | | |
| | 64.68 | 67.97 | 71.06 | 74.06 | 77.02 | 80.06 | 83.49 | | | | |
| 150 | 74.34 | 77.93 | 81.34 | 84.48 | 87.36 | 89.76 | 91.38 | | | | |
| | 67.77 | 71.40 | 74.84 | 78.00 | 80.80 | 83.54 | 86.39 | 89.63 | | | |
| 160 | 77.38 | 81.19 | 84.66 | 87.93 | 91.06 | 93.76 | 95.92 | 97.51 | | | |
| | 70.75 | 74.74 | 78.39 | 81.71 | 84.86 | 87.88 | 90.37 | 92.77 | 95.60 | | |
| 170 | 80.32 | 84.45 | 88.20 | 91.52 | 94.50 | 97.36 | 99.98 | 102.19 | 103.63 | | |
| | 73.52 | 77.89 | 81.90 | 85.52 | 88.71 | 91.55 | 94.30 | 96.88 | 99.23 | 101.50 | |
| 180 | 82.91 | 87.38 | 91.42 | 95.00 | 98.13 | 100.86 | 103.32 | 105.58 | 107.44 | 108.72 | |
| | 75.78 | 80.52 | 84.99 | 88.96 | 92.44 | 95.48 | 98.10 | 100.50 | 102.81 | 104.91 | 106.89 |
| 190 | 85.08 | 89.75 | 94.12 | 97.94 | 101.23 | 104.08 | 106.52 | 108.55 | 110.28 | 111.56 | |
| | 78.23 | 83.07 | 87.74 | 92.10 | 95.87 | 99.11 | 101.93 | 104.36 | 106.47 | 108.52 | 110.48 |
| (mm) | | | | | | | | | | | |

DIAMETER D = 400
HEIGHT h = 112
EXPANSION ANGLE λ = 120
BOSS RATIO ν = 0.275

Embodiment 47

Propeller fan 1 having the diameter D=400 mm, the height in the axial direction (z direction) h=126 mm, the number of blades n=3, the expansion angle of a blade λ=108 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 220 below, i.e. a three-dimensional curved surface specified by Table 209.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = \frac{D}{2} = \frac{400}{2} = 200\\
&b = 0\\
&c = \frac{2400}{7} \times \frac{h}{D} = \frac{2400}{7} \times \frac{126}{400} = 108\\
&d = 0\\
&e_u = e_d = h = 126\\
&f_u = f_d = 0
\end{aligned}\right\} \quad (220)$$

TABLE 209

| r | θ 4.5 | 9 | 13.5 | 18 | 22.5 | 27 | 31.5 | 36 | 40.5 | 45 | 49.5 | 54 | 58.5 | 63 |
|---|---|---|---|---|---|---|---|---|---|---|---|---|---|---|
| 60 | | | 24.06 | 27.30 | 30.34 | 33.32 | 36.27 | 39.18 | 42.00 | 44.71 | 47.33 | 49.83 | 52.20 | 54.41 |
| | | | 21.15 | 23.18 | 25.23 | 27.27 | 29.31 | 31.41 | 33.62 | 35.94 | 38.34 | 40.79 | 43.22 | 45.61 |
| 70 | | 18.55 | 22.86 | 26.77 | 30.46 | 33.99 | 37.38 | 40.58 | 43.63 | 46.57 | 49.38 | 52.06 | 54.55 | 56.65 |
| | | 15.96 | 18.96 | 21.85 | 24.68 | 27.50 | 30.36 | 33.27 | 36.22 | 39.15 | 42.04 | 44.84 | 47.55 | 50.25 |
| 80 | 11.07 | 16.76 | 21.67 | 26.20 | 30.45 | 34.48 | 38.28 | 41.85 | 45.24 | 48.47 | 51.55 | 54.44 | 57.06 | 59.23 |
| | 9.57 | 13.87 | 17.82 | 21.54 | 25.09 | 28.55 | 31.96 | 35.32 | 38.63 | 41.86 | 44.96 | 47.92 | 50.74 | 53.49 |
| 90 | 8.85 | 14.85 | 20.40 | 25.58 | 30.43 | 34.96 | 39.21 | 43.20 | 46.95 | 50.49 | 53.83 | 56.97 | 59.86 | 62.34 |
| | 6.99 | 12.25 | 17.10 | 21.58 | 25.75 | 29.70 | 33.49 | 37.18 | 40.76 | 44.23 | 47.55 | 50.69 | 53.65 | 56.50 |
| 100 | 5.31 | 12.56 | 19.04 | 24.94 | 30.39 | 35.45 | 40.17 | 44.57 | 48.69 | 52.55 | 56.19 | 59.62 | 62.83 | 65.75 |
| | 4.12 | 10.49 | 16.32 | 21.57 | 26.32 | 30.72 | 34.88 | 38.86 | 42.70 | 46.42 | 49.98 | 53.37 | 56.58 | 59.64 |
| 110 | 1.25 | 10.00 | 17.49 | 24.15 | 30.22 | 35.81 | 40.99 | 45.81 | 50.28 | 54.46 | 58.40 | 62.12 | 65.65 | 68.98 |
| | 0.83 | 8.35 | 15.15 | 21.17 | 26.56 | 31.46 | 36.00 | 40.29 | 44.38 | 48.32 | 52.12 | 55.78 | 59.31 | 62.69 |
| 120 | | 7.02 | 15.48 | 22.89 | 29.58 | 35.71 | 41.37 | 46.61 | 51.48 | 56.02 | 60.29 | 64.33 | 68.17 | 71.83 |
| | | 5.80 | 13.41 | 20.24 | 26.40 | 31.96 | 37.02 | 41.69 | 46.08 | 50.26 | 54.30 | 58.20 | 61.99 | 65.65 |
| 130 | | 3.59 | 12.84 | 21.14 | 28.54 | 35.19 | 41.24 | 46.84 | 52.07 | 57.00 | 61.66 | 66.09 | 70.30 | 74.29 |
| | | 2.96 | 11.67 | 19.69 | 26.84 | 33.18 | 38.84 | 43.99 | 48.77 | 53.25 | 57.48 | 61.50 | 65.35 | 69.04 |
| 140 | | | 10.33 | 19.71 | 27.90 | 35.11 | 41.56 | 47.44 | 52.92 | 58.10 | 63.03 | 67.69 | 72.19 | 76.50 |
| | | | 9.37 | 18.47 | 26.44 | 33.46 | 39.72 | 45.42 | 50.71 | 55.68 | 60.33 | 64.66 | 68.82 | 72.77 |
| 150 | | | 7.29 | 17.59 | 26.72 | 34.86 | 42.10 | 48.58 | 54.45 | 59.87 | 65.03 | 70.00 | 74.80 | 79.37 |
| | | | 6.45 | 16.35 | 25.22 | 33.10 | 40.10 | 46.37 | 52.05 | 57.33 | 62.37 | 67.20 | 71.85 | 76.24 |
| 160 | | | | 15.55 | 25.76 | 34.76 | 42.70 | 49.77 | 56.15 | 61.98 | 67.42 | 72.58 | 77.58 | 82.43 |
| | | | | 14.29 | 24.10 | 32.73 | 40.38 | 47.25 | 53.52 | 59.31 | 64.71 | 69.86 | 74.83 | 79.59 |
| 170 | | | | 13.57 | 24.85 | 34.63 | 43.15 | 50.69 | 57.49 | 63.72 | 69.52 | 75.01 | 80.27 | 85.39 |
| | | | | 12.37 | 23.09 | 32.38 | 40.60 | 47.97 | 54.68 | 60.87 | 66.67 | 72.17 | 77.50 | 82.71 |
| 180 | | | | 10.97 | 23.69 | 34.30 | 43.42 | 51.39 | 58.56 | 65.14 | 71.28 | 77.08 | 82.63 | 88.00 |
| | | | | 10.16 | 22.07 | 32.11 | 40.91 | 48.72 | 55.78 | 62.29 | 68.41 | 74.25 | 79.83 | 85.25 |
| 190 | | | | | 22.10 | 33.93 | 43.76 | 52.15 | 59.62 | 66.47 | 72.85 | 78.89 | 84.69 | 90.30 |
| | | | | | 20.91 | 32.16 | 41.57 | 49.72 | 57.08 | 63.86 | 70.23 | 76.34 | 82.30 | 88.01 |
| (mm) | | | | | | | | | | | | | | |

| r | θ 67.5 | 72 | 76.5 | 81 | 85.5 | 90 | 94.5 | 99 | 103.5 | 108 | (deg) |
|---|---|---|---|---|---|---|---|---|---|---|---|
| 60 | 56.36 | 57.94 | 58.91 | 58.95 | | | | | | | |
| | 48.00 | 50.42 | 53.03 | 56.09 | | | | | | | |
| 70 | 58.14 | 58.61 | | | | | | | | | |
| | 53.03 | 56.13 | | | | | | | | | |
| 80 | 60.71 | 61.12 | | | | | | | | | |
| | 56.28 | 59.37 | | | | | | | | | |
| 90 | 64.25 | 65.20 | | | | | | | | | |
| | 59.33 | 62.38 | | | | | | | | | |
| 100 | 68.22 | 70.01 | 70.65 | | | | | | | | |
| | 62.63 | 65.70 | 69.15 | | | | | | | | |
| 110 | 71.99 | 74.49 | 76.19 | | | | | | | | |
| | 65.96 | 69.20 | 72.58 | | | | | | | | |
| 120 | 75.28 | 78.38 | 80.91 | 82.53 | | | | | | | |
| | 69.18 | 72.60 | 76.04 | 79.67 | | | | | | | |
| 130 | 78.07 | 81.64 | 84.85 | 87.47 | 89.07 | | | | | | |
| | 72.62 | 76.10 | 79.53 | 83.02 | 86.83 | | | | | | |

TABLE 209-continued

| | | | | | | | | | | |
|---|---|---|---|---|---|---|---|---|---|---|
| 140 | 80.62 | 84.49 | 88.14 | 91.46 | 94.17 | 95.86 | | | | |
| | 76.47 | 79.95 | 83.31 | 86.65 | 90.07 | 93.93 | | | | |
| 150 | 83.64 | 87.67 | 91.51 | 95.04 | 98.28 | 100.98 | 102.80 | | | |
| | 80.33 | 84.20 | 87.75 | 90.90 | 93.98 | 97.19 | 100.83 | | | |
| 160 | 87.06 | 91.34 | 95.24 | 98.93 | 102.45 | 105.48 | 107.91 | 109.70 | | |
| | 84.08 | 88.19 | 91.92 | 95.47 | 98.87 | 101.67 | 104.37 | 107.54 | | |
| 170 | 90.37 | 95.01 | 99.23 | 102.96 | 106.32 | 109.53 | 112.48 | 114.96 | 116.58 | |
| | 87.63 | 92.14 | 96.21 | 99.79 | 102.99 | 106.09 | 108.99 | 111.63 | 114.19 | |
| 180 | 93.27 | 98.30 | 102.85 | 106.87 | 110.40 | 113.46 | 116.24 | 118.78 | 120.87 | 122.31 |
| | 90.58 | 95.61 | 100.08 | 104.00 | 107.42 | 110.36 | 113.07 | 115.66 | 118.02 | 120.25 |
| 190 | 95.71 | 100.97 | 105.88 | 110.18 | 113.88 | 117.10 | 119.83 | 122.12 | 124.06 | 125.50 |
| | 93.45 | 98.71 | 103.61 | 107.85 | 111.50 | 114.67 | 117.40 | 119.78 | 122.09 | 124.29 |
| (mm) | | | | | | | | | | |

DIAMETER D = 400
HEIGHT h = 126
EXPANSION ANGLE λ = 108
BOSS RATIO ν = 0.275

Embodiment 48

Propeller fan 1 having the diameter D=400 mm, the height in the axial direction (z direction) h=140 mm, the number of blades n=3, the expansion angle of a blade λ=90 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 221 below, i.e. a three-dimensional curved surface specified by Table 210.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = \dfrac{D}{2} = \dfrac{400}{2} = 200 \\ b = 0 \\ c = \lambda = 90 \\ d = 0 \\ e_u = e_d = h = 140 \\ f_u = f_d = 0 \end{array}\right\} \quad (221)$$

TABLE 210

| | θ | | | | | | | | | | | | | |
|---|---|---|---|---|---|---|---|---|---|---|---|---|---|---|
| r | 3.75 | 7.5 | 11.25 | 15 | 18.75 | 22.5 | 26.25 | 30 | 33.75 | 37.5 | 41.25 | 45 | 48.75 | 52.5 |
| 60 | | | 26.73 | 30.33 | 33.72 | 37.03 | 40.30 | 43.53 | 46.66 | 49.68 | 52.58 | 55.37 | 58.00 | 60.46 |
| | | | 23.50 | 25.75 | 28.03 | 30.30 | 32.56 | 34.90 | 37.35 | 39.94 | 42.60 | 45.32 | 48.02 | 50.68 |
| 70 | | 20.62 | 25.40 | 29.74 | 33.84 | 37.77 | 41.53 | 45.09 | 48.48 | 51.74 | 54.87 | 57.84 | 60.61 | 62.95 |
| | | 17.73 | 21.07 | 24.27 | 27.42 | 30.56 | 33.74 | 36.97 | 40.24 | 43.50 | 46.71 | 49.82 | 52.84 | 55.83 |
| 80 | 12.30 | 18.62 | 24.08 | 29.11 | 33.83 | 38.32 | 42.53 | 46.50 | 50.27 | 53.86 | 57.28 | 60.49 | 63.40 | 65.81 |
| | 10.63 | 15.41 | 19.80 | 23.93 | 27.88 | 31.72 | 35.51 | 39.25 | 42.92 | 46.51 | 49.96 | 53.24 | 56.38 | 59.43 |
| 90 | 9.83 | 16.50 | 22.67 | 28.43 | 33.81 | 38.84 | 43.57 | 48.00 | 52.16 | 56.10 | 59.81 | 63.30 | 66.51 | 69.27 |
| | 7.77 | 13.61 | 19.00 | 23.98 | 28.61 | 33.00 | 37.22 | 41.31 | 45.29 | 49.14 | 52.83 | 56.33 | 59.61 | 62.78 |
| 100 | 5.90 | 13.96 | 21.16 | 27.71 | 33.76 | 39.39 | 44.64 | 49.53 | 54.10 | 58.39 | 62.43 | 66.24 | 69.81 | 73.05 |
| | 4.58 | 11.65 | 18.13 | 23.96 | 29.25 | 34.14 | 38.76 | 43.18 | 47.45 | 51.57 | 55.53 | 59.30 | 62.87 | 66.26 |
| 110 | 1.39 | 11.11 | 19.43 | 26.84 | 33.57 | 39.79 | 45.55 | 50.89 | 55.87 | 60.51 | 64.89 | 69.03 | 72.95 | 76.65 |
| | 0.92 | 9.28 | 16.83 | 23.52 | 29.51 | 34.96 | 40.00 | 44.76 | 49.31 | 53.69 | 57.91 | 61.98 | 65.90 | 69.65 |
| 120 | | 7.80 | 17.20 | 25.43 | 32.87 | 39.68 | 45.97 | 51.79 | 57.20 | 62.25 | 66.99 | 71.48 | 75.74 | 79.81 |
| | | 6.45 | 14.90 | 22.49 | 29.33 | 35.51 | 41.14 | 46.33 | 51.20 | 55.85 | 60.33 | 64.67 | 68.88 | 72.95 |
| 130 | | 3.98 | 14.27 | 23.49 | 31.72 | 39.10 | 45.82 | 52.04 | 57.85 | 63.33 | 68.52 | 73.44 | 78.11 | 82.55 |
| | | 3.28 | 12.97 | 21.88 | 29.83 | 36.87 | 43.16 | 48.88 | 54.19 | 59.17 | 63.87 | 68.33 | 72.61 | 76.72 |

TABLE 210-continued

| | | | | | | | | | | | | |
|---|---|---|---|---|---|---|---|---|---|---|---|---|
| 140 | 11.47 | 21.90 | 31.00 | 39.01 | 46.18 | 52.71 | 58.80 | 64.56 | 70.03 | 75.21 | 80.21 | 85.01 |
| | 10.41 | 20.52 | 29.37 | 37.17 | 44.13 | 50.46 | 56.34 | 61.86 | 67.04 | 71.85 | 76.47 | 80.86 |
| 150 | 8.10 | 19.54 | 29.69 | 38.73 | 46.78 | 53.98 | 60.50 | 66.52 | 72.25 | 77.78 | 83.11 | 88.18 |
| | 7.17 | 18.17 | 28.03 | 36.78 | 44.56 | 51.52 | 57.83 | 63.70 | 69.29 | 74.67 | 79.83 | 84.71 |
| 160 | | 17.27 | 28.63 | 38.62 | 47.45 | 55.30 | 62.39 | 68.87 | 74.92 | 80.64 | 86.20 | 91.59 |
| | | 15.88 | 26.78 | 36.36 | 44.86 | 52.50 | 59.47 | 65.90 | 71.91 | 77.62 | 83.14 | 88.44 |
| 170 | | 15.08 | 27.61 | 38.48 | 47.95 | 56.32 | 63.87 | 70.80 | 77.25 | 83.34 | 89.19 | 94.88 |
| | | 13.74 | 25.66 | 35.97 | 45.11 | 53.30 | 60.75 | 67.63 | 74.08 | 80.19 | 86.11 | 91.90 |
| 180 | | 12.19 | 26.33 | 38.11 | 48.24 | 57.10 | 65.07 | 72.38 | 79.20 | 85.65 | 91.82 | 97.78 |
| | | 11.29 | 24.52 | 35.68 | 45.46 | 54.14 | 61.98 | 69.21 | 76.01 | 82.50 | 88.70 | 94.72 |
| 190 | | | 24.56 | 37.70 | 48.62 | 57.95 | 66.25 | 73.86 | 80.95 | 87.65 | 94.11 | 100.33 |
| | | | 23.24 | 35.74 | 46.19 | 55.25 | 63.42 | 70.96 | 78.03 | 84.82 | 91.44 | 97.79 |
| (mm) | | | | | | | | | | | | |

| | θ | | | | | | | | | | |
|---|---|---|---|---|---|---|---|---|---|---|---|
| r | 56.25 | 60 | 63.75 | 67.5 | 71.25 | 75 | 78.75 | 82.5 | 86.25 | 90 | (deg) |
| 60 | 62.63 | 64.38 | 65.45 | 65.50 | | | | | | | |
| | 53.33 | 56.03 | 58.92 | 62.32 | | | | | | | |
| 70 | 64.60 | 65.12 | | | | | | | | | |
| | 58.92 | 62.36 | | | | | | | | | |
| 80 | 67.46 | 67.91 | | | | | | | | | |
| | 62.53 | 65.97 | | | | | | | | | |
| 90 | 71.39 | 72.44 | | | | | | | | | |
| | 65.93 | 69.31 | | | | | | | | | |
| 100 | 75.80 | 77.79 | 78.50 | | | | | | | | |
| | 69.59 | 73.00 | 76.83 | | | | | | | | |
| 110 | 79.99 | 82.76 | 84.65 | | | | | | | | |
| | 73.28 | 76.89 | 80.65 | | | | | | | | |
| 120 | 83.65 | 87.09 | 89.90 | 91.70 | | | | | | | |
| | 76.87 | 80.67 | 84.48 | 88.52 | | | | | | | |
| 130 | 86.75 | 90.71 | 94.28 | 97.19 | 98.97 | | | | | | |
| | 80.69 | 84.56 | 88.37 | 92.24 | 96.48 | | | | | | |
| 140 | 89.57 | 93.88 | 97.94 | 101.62 | 104.63 | 106.51 | | | | | |
| | 84.96 | 88.83 | 92.57 | 96.28 | 100.08 | 104.36 | | | | | |
| 150 | 92.93 | 97.42 | 101.68 | 105.60 | 109.20 | 112.20 | 114.22 | | | | |
| | 89.26 | 93.56 | 97.50 | 101.00 | 104.43 | 107.99 | 112.04 | | | | |
| 160 | 96.73 | 101.49 | 105.83 | 109.92 | 113.83 | 117.20 | 119.90 | 121.89 | | | |
| | 93.42 | 97.99 | 102.13 | 106.08 | 109.86 | 112.97 | 115.97 | 119.49 | | | |
| 170 | 100.41 | 105.57 | 110.25 | 114.40 | 118.13 | 121.70 | 124.98 | 127.73 | 129.54 | | |
| | 97.36 | 102.38 | 106.90 | 110.88 | 114.44 | 117.87 | 121.10 | 124.04 | 126.88 | | |
| 180 | 103.63 | 109.23 | 114.28 | 118.75 | 122.66 | 126.07 | 129.15 | 131.98 | 134.30 | 135.90 | |
| | 100.65 | 106.24 | 111.20 | 115.55 | 119.35 | 122.62 | 125.63 | 128.52 | 131.13 | 133.61 | |
| 190 | 106.35 | 112.19 | 117.65 | 122.43 | 126.54 | 130.11 | 130.15 | 135.68 | 137.85 | 139.45 | |
| | 103.84 | 109.68 | 115.12 | 119.84 | 123.88 | 127.41 | 130.45 | 133.09 | 135.65 | 138.10 | |
| (mm) | | | | | | | | | | | |

DIAMETER D = 400
HEIGHT h = 140
EXPANSION ANGLE λ = 90
BOSS RATIO ν = 0.275

Embodiment 49

Propeller fan 1 having the diameter D=400 mm, the height in the axial direction (z direction) h=140 mm, the number of blades n=3, the expansion angle of a blade λ=132 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 222 below, i.e. a three-dimensional curved surface specified by Table 211.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = \frac{D}{2} = \frac{400}{2} = 200 \\ b = 0 \\ c = \lambda = 132 \\ d = 0 \\ e_u = e_d = h = 140 \\ f_u = f_d = 0 \end{array}\right\} \quad (222)$$

TABLE 211

| r | θ 5.5 | 11 | 16.5 | 22 | 27.5 | 33 | 38.5 | 44 | 49.5 | 55 | 60.5 | 66 | 71.5 | 77 |
|---|---|---|---|---|---|---|---|---|---|---|---|---|---|---|
| 60 | | | 26.73 | 30.33 | 33.72 | 37.03 | 40.30 | 43.53 | 46.66 | 49.68 | 52.58 | 55.37 | 58.00 | 60.46 |
| | | | 23.50 | 25.75 | 28.03 | 30.30 | 32.56 | 34.90 | 37.35 | 39.94 | 42.60 | 45.32 | 48.02 | 50.68 |
| 70 | | 20.62 | 25.40 | 29.74 | 33.84 | 37.77 | 41.53 | 45.09 | 48.48 | 51.74 | 54.87 | 57.84 | 60.61 | 62.95 |
| | | 17.73 | 21.07 | 24.27 | 27.42 | 30.56 | 33.74 | 36.97 | 40.24 | 43.50 | 46.71 | 49.82 | 52.84 | 55.83 |
| 80 | 12.30 | 18.62 | 24.08 | 29.11 | 33.83 | 38.32 | 42.53 | 46.50 | 50.27 | 53.86 | 57.28 | 60.49 | 63.40 | 65.81 |
| | 10.63 | 15.41 | 19.80 | 23.93 | 27.88 | 31.72 | 35.51 | 39.25 | 42.92 | 46.51 | 49.96 | 53.24 | 56.38 | 59.43 |
| 90 | 9.83 | 16.50 | 22.67 | 28.43 | 33.81 | 38.84 | 43.57 | 48.00 | 52.16 | 56.10 | 59.81 | 63.30 | 66.51 | 69.27 |
| | 7.77 | 13.61 | 19.00 | 23.98 | 28.61 | 33.00 | 37.22 | 41.31 | 45.29 | 49.14 | 52.83 | 56.33 | 59.61 | 62.78 |
| 100 | 5.90 | 13.96 | 21.16 | 27.71 | 33.76 | 39.39 | 44.64 | 49.53 | 54.10 | 58.39 | 62.43 | 66.24 | 69.81 | 73.05 |
| | 4.58 | 11.65 | 18.13 | 23.96 | 29.25 | 34.14 | 38.76 | 43.18 | 47.45 | 51.57 | 55.53 | 59.30 | 62.87 | 66.26 |
| 110 | 1.39 | 11.11 | 19.43 | 26.84 | 33.57 | 39.79 | 45.55 | 50.89 | 55.87 | 60.51 | 64.89 | 69.03 | 72.95 | 76.65 |
| | 0.92 | 9.28 | 16.83 | 23.52 | 29.51 | 34.96 | 40.00 | 44.76 | 49.31 | 53.69 | 57.91 | 61.98 | 65.90 | 69.65 |
| 120 | | 7.80 | 17.20 | 25.43 | 32.87 | 39.68 | 45.97 | 51.79 | 57.20 | 62.25 | 66.99 | 71.48 | 75.74 | 79.81 |
| | | 6.45 | 14.90 | 22.49 | 29.33 | 35.51 | 41.14 | 46.33 | 51.20 | 55.85 | 60.33 | 64.67 | 68.88 | 72.95 |
| 130 | | 3.98 | 14.27 | 23.49 | 31.72 | 39.10 | 45.82 | 52.04 | 57.85 | 63.33 | 68.52 | 73.44 | 78.11 | 82.55 |
| | | 3.28 | 12.97 | 21.88 | 29.83 | 36.87 | 43.16 | 48.88 | 54.19 | 59.17 | 63.87 | 68.33 | 72.61 | 76.72 |
| 140 | | | 11.47 | 21.90 | 31.00 | 39.01 | 46.18 | 52.71 | 58.80 | 64.56 | 70.03 | 75.21 | 80.21 | 85.01 |
| | | | 10.41 | 20.52 | 29.37 | 37.17 | 44.13 | 50.46 | 56.34 | 61.86 | 67.04 | 71.85 | 76.47 | 80.86 |
| 150 | | | 8.10 | 19.54 | 29.69 | 38.73 | 46.78 | 53.98 | 60.50 | 66.52 | 72.25 | 77.78 | 83.11 | 88.18 |
| | | | 7.17 | 18.17 | 28.03 | 36.78 | 44.56 | 51.52 | 57.83 | 63.70 | 69.29 | 74.67 | 79.83 | 84.71 |
| 160 | | | | 17.27 | 28.63 | 38.62 | 47.45 | 55.30 | 62.39 | 68.87 | 74.92 | 80.64 | 86.20 | 91.59 |
| | | | | 15.88 | 26.78 | 36.36 | 44.86 | 52.50 | 59.47 | 65.90 | 71.91 | 77.62 | 83.14 | 88.44 |
| 170 | | | | 15.08 | 27.61 | 38.48 | 47.95 | 56.32 | 63.87 | 70.80 | 77.25 | 83.34 | 89.19 | 94.88 |
| | | | | 13.74 | 25.66 | 35.97 | 45.11 | 53.30 | 60.75 | 67.63 | 74.08 | 80.19 | 86.11 | 91.90 |
| 180 | | | | 12.19 | 26.33 | 38.11 | 48.24 | 57.10 | 65.07 | 72.38 | 79.20 | 85.65 | 91.82 | 97.78 |
| | | | | 11.29 | 24.52 | 35.68 | 45.46 | 54.14 | 61.98 | 69.21 | 76.01 | 82.50 | 88.70 | 94.72 |
| 190 | | | | | 24.56 | 37.70 | 48.62 | 57.95 | 66.25 | 73.86 | 80.95 | 87.65 | 94.11 | 100.33 |
| | | | | | 23.24 | 35.74 | 46.19 | 55.25 | 63.42 | 70.96 | 78.03 | 84.82 | 91.44 | 97.79 |
| (mm) | | | | | | | | | | | | | | |

| r | θ 82.5 | 88 | 93.5 | 99 | 104.5 | 110 | 115.5 | 121 | 126.5 | 132 (deg) |
|---|---|---|---|---|---|---|---|---|---|---|
| 60 | 62.63 | 64.38 | 65.45 | 65.50 | | | | | | |
| | 53.33 | 56.03 | 58.92 | 62.32 | | | | | | |
| 70 | 64.60 | 65.12 | | | | | | | | |
| | 58.92 | 62.36 | | | | | | | | |
| 80 | 67.46 | 67.91 | | | | | | | | |
| | 62.53 | 65.97 | | | | | | | | |
| 90 | 71.39 | 72.44 | | | | | | | | |
| | 65.93 | 69.31 | | | | | | | | |
| 100 | 75.80 | 77.79 | 78.50 | | | | | | | |
| | 69.59 | 73.00 | 76.83 | | | | | | | |
| 110 | 79.99 | 82.76 | 84.65 | | | | | | | |
| | 73.28 | 76.89 | 80.65 | | | | | | | |
| 120 | 83.65 | 87.09 | 89.90 | 91.70 | | | | | | |
| | 76.87 | 80.67 | 84.48 | 88.52 | | | | | | |
| 130 | 86.75 | 90.71 | 94.28 | 97.19 | 98.97 | | | | | |
| | 80.69 | 84.56 | 88.37 | 92.24 | 96.48 | | | | | |
| 140 | 89.57 | 93.88 | 97.94 | 101.62 | 104.63 | 106.51 | | | | |
| | 84.96 | 88.83 | 92.57 | 96.28 | 100.08 | 104.36 | | | | |
| 150 | 92.93 | 97.42 | 101.68 | 105.60 | 109.20 | 112.20 | 114.22 | | | |
| | 89.26 | 93.56 | 97.50 | 101.00 | 104.43 | 107.99 | 112.04 | | | |
| 160 | 96.73 | 101.49 | 105.83 | 109.92 | 113.83 | 117.20 | 119.90 | 121.89 | | |
| | 93.42 | 97.99 | 102.13 | 106.08 | 109.86 | 112.97 | 115.97 | 119.49 | | |
| 170 | 100.41 | 105.57 | 110.25 | 114.40 | 118.13 | 121.70 | 124.98 | 127.73 | 129.54 | |
| | 97.36 | 102.38 | 106.90 | 110.88 | 114.44 | 117.87 | 121.10 | 124.04 | 126.88 | |
| 180 | 103.63 | 109.23 | 114.28 | 118.75 | 122.66 | 126.07 | 129.15 | 131.98 | 134.30 | 135.90 |
| | 100.65 | 106.24 | 111.20 | 115.55 | 119.35 | 122.62 | 125.63 | 128.52 | 131.13 | 133.61 |
| 190 | 106.35 | 112.19 | 117.65 | 122.43 | 126.54 | 130.11 | 133.15 | 135.68 | 137.85 | 139.45 |
| | 103.84 | 109.68 | 115.12 | 119.84 | 123.88 | 127.41 | 130.45 | 133.09 | 135.65 | 138.10 |
| (mm) | | | | | | | | | | |

DIAMETER D = 400
HEIGHT h = 140
EXPANSION ANGLE λ = 132
BOSS RATIO ν = 0.275

Embodiment 50

Propeller fan 1 having the diameter d=400 mm, the height in the axial direction (z direction) h=140 mm, the number of blades n=3, the expansion angle of a blade λ=120 deg, the boss ratio ν=0.35 (boss diameter νD=140 mm) was formed to have a curved surface formed by transforming the curved surface defined by non-dimensionally expressed three-dimensional coordinates specified by Table 202 using a transformation formula 223 below, i.e. a three-dimensional curved surface specified by Table 212.

$$
\left.
\begin{aligned}
r_1 &= a \times r + b \text{ (mm)}\\
\theta_1 &= c \times \theta + d \text{ (deg)}\\
z_{1u} &= e_u \times z_u + f_u \text{ (mm)}\\
z_{1d} &= e_d \times z_d + f_d \text{ (mm)}\\
&(a, c, e_u, e_d\text{: factor of proportionality, } b, d, f_u, f_d\text{: constant})\\
&\text{wherein}\\
a &= \frac{20}{29} D(1-\nu) = \frac{20}{29} \times 400 \times (1-0.35) = 179.3\\
b &= -\frac{20}{29} D(1-\nu) \times 0.275 + \frac{\nu D}{2}\\
&= -\frac{20}{29} \times 400 \times (1-0.35) \times 0.275 + \frac{0.35 \times 400}{2}\\
&= 20.69\\
c &= \lambda = \frac{360}{n} = \frac{2400}{7} \times \frac{h}{D} = \frac{2400}{7} \times \frac{140}{400} = 120\\
d &= 0\\
e_u &= e_d = h = 140\\
f_u &= f_d = 0
\end{aligned}
\right\} \quad (223)
$$

TABLE 212

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 74.48 | | | 26.73 | 30.33 | 33.72 | 37.03 | 40.30 | 43.53 | 46.66 | 49.68 | 52.58 | 55.37 | 58.00 | 60.46 |
| | | | 23.50 | 25.75 | 28.03 | 30.30 | 32.56 | 34.90 | 37.35 | 39.94 | 42.60 | 45.32 | 48.02 | 50.68 |
| 83.45 | | 20.62 | 25.40 | 29.74 | 33.84 | 37.77 | 41.53 | 45.09 | 48.48 | 51.74 | 54.87 | 57.84 | 60.61 | 62.95 |
| | | 17.73 | 21.07 | 24.27 | 27.42 | 30.56 | 33.74 | 36.97 | 40.24 | 43.50 | 46.71 | 49.82 | 52.84 | 55.83 |
| 92.41 | 12.30 | 18.62 | 24.08 | 29.11 | 33.83 | 38.32 | 42.53 | 46.50 | 50.27 | 53.86 | 57.28 | 60.49 | 63.40 | 65.81 |
| | 10.63 | 15.41 | 19.80 | 23.93 | 27.88 | 31.72 | 35.51 | 39.25 | 42.92 | 46.51 | 49.96 | 53.24 | 56.38 | 59.43 |
| 101.4 | 9.83 | 16.50 | 22.67 | 28.43 | 33.81 | 38.84 | 43.57 | 48.00 | 52.16 | 56.10 | 59.81 | 63.30 | 66.51 | 69.27 |
| | 7.77 | 13.61 | 19.00 | 23.98 | 28.61 | 33.00 | 37.22 | 41.31 | 45.29 | 49.14 | 52.83 | 56.33 | 59.61 | 62.78 |
| 110.3 | 5.90 | 13.96 | 21.16 | 27.71 | 33.76 | 39.39 | 44.64 | 49.53 | 54.10 | 58.39 | 62.43 | 66.24 | 69.81 | 73.05 |
| | 4.58 | 11.65 | 18.13 | 23.96 | 29.25 | 34.14 | 38.76 | 43.18 | 47.45 | 51.57 | 55.53 | 59.30 | 62.87 | 66.26 |
| 119.3 | 1.39 | 11.11 | 19.43 | 26.84 | 33.57 | 39.79 | 45.55 | 50.89 | 55.87 | 60.51 | 64.89 | 69.03 | 72.95 | 76.65 |
| | 0.92 | 9.28 | 16.83 | 23.52 | 29.51 | 34.96 | 40.00 | 44.76 | 49.31 | 53.69 | 57.91 | 61.98 | 65.90 | 69.65 |
| 128.3 | | 7.80 | 17.20 | 25.43 | 32.87 | 39.68 | 45.97 | 51.79 | 57.20 | 62.25 | 66.99 | 71.48 | 75.74 | 79.81 |
| | | 6.45 | 14.90 | 22.49 | 29.33 | 35.51 | 41.14 | 46.33 | 51.20 | 55.85 | 60.33 | 64.67 | 68.88 | 72.95 |
| 137.2 | | 3.98 | 14.27 | 23.49 | 31.72 | 39.10 | 45.82 | 52.04 | 57.85 | 63.33 | 68.52 | 73.44 | 78.11 | 82.55 |
| | | 3.28 | 12.97 | 21.88 | 29.83 | 36.87 | 43.16 | 48.88 | 54.19 | 59.17 | 63.87 | 68.33 | 72.61 | 76.72 |
| 146.2 | | | 11.47 | 21.90 | 31.00 | 39.01 | 46.18 | 52.71 | 58.80 | 64.56 | 70.03 | 75.21 | 80.21 | 85.01 |
| | | | 10.41 | 20.52 | 29.37 | 37.17 | 44.13 | 50.46 | 56.34 | 61.86 | 67.04 | 71.85 | 76.47 | 80.86 |
| 155.2 | | | 8.10 | 19.54 | 29.69 | 38.73 | 46.78 | 53.98 | 60.50 | 66.52 | 72.25 | 77.78 | 83.11 | 88.18 |
| | | | 7.17 | 18.17 | 28.03 | 36.78 | 44.56 | 51.52 | 57.83 | 63.70 | 69.29 | 74.67 | 79.83 | 84.71 |
| 164.1 | | | | 17.27 | 28.63 | 38.62 | 47.45 | 55.30 | 62.39 | 68.87 | 74.92 | 80.64 | 86.20 | 91.59 |
| | | | | 15.88 | 26.78 | 36.36 | 44.86 | 52.50 | 59.47 | 65.90 | 71.91 | 77.62 | 83.14 | 88.44 |
| 173.1 | | | | 15.08 | 27.61 | 38.48 | 47.95 | 56.32 | 63.87 | 70.80 | 77.25 | 83.34 | 89.19 | 94.88 |
| | | | | 13.74 | 25.66 | 35.97 | 45.11 | 53.30 | 60.75 | 67.63 | 74.08 | 80.19 | 86.11 | 91.90 |
| 182.1 | | | | 12.19 | 26.33 | 38.11 | 48.24 | 57.10 | 65.07 | 72.38 | 79.20 | 85.65 | 91.82 | 97.78 |
| | | | | 11.29 | 24.52 | 35.68 | 45.46 | 54.14 | 61.98 | 69.21 | 76.01 | 82.50 | 88.70 | 94.72 |
| 191 | | | | | 24.56 | 37.70 | 48.62 | 57.95 | 66.26 | 73.86 | 80.95 | 87.65 | 94.11 | 100.33 |
| | | | | | 23.24 | 35.74 | 46.19 | 55.25 | 63.42 | 70.96 | 78.03 | 84.82 | 91.44 | 97.79 |
| (mm) | | | | | | | | | | | | | | |

| r | θ 75 | 80 | 85 | 90 | 95 | 100 | 105 | 110 | 115 | 120 | (deg) |
|---|---|---|---|---|---|---|---|---|---|---|---|
| 74.48 | 62.63 | 64.38 | 65.45 | 65.50 | | | | | | | |
| | 53.33 | 56.03 | 58.92 | 62.32 | | | | | | | |
| 83.45 | 64.60 | 65.12 | | | | | | | | | |
| | 58.92 | 62.36 | | | | | | | | | |
| 92.41 | 67.46 | 67.91 | | | | | | | | | |
| | 62.53 | 65.97 | | | | | | | | | |
| 101.4 | 71.39 | 72.44 | | | | | | | | | |
| | 65.93 | 69.31 | | | | | | | | | |
| 110.3 | 75.80 | 77.79 | 78.50 | | | | | | | | |
| | 69.59 | 73.00 | 76.83 | | | | | | | | |
| 119.3 | 79.99 | 82.76 | 84.65 | | | | | | | | |
| | 73.28 | 76.89 | 80.65 | | | | | | | | |

TABLE 212-continued

| | | | | | | | | | | |
|---|---|---|---|---|---|---|---|---|---|---|
| 128.3 | 83.65 | 87.09 | 89.90 | 91.70 | | | | | | |
| | 76.87 | 80.67 | 84.48 | 88.52 | | | | | | |
| 137.2 | 86.75 | 90.71 | 94.28 | 97.19 | 98.97 | | | | | |
| | 80.69 | 84.56 | 88.37 | 92.24 | 96.48 | | | | | |
| 146.2 | 89.57 | 93.88 | 97.94 | 101.62 | 104.63 | 106.51 | | | | |
| | 84.96 | 88.83 | 92.57 | 96.28 | 100.08 | 104.36 | | | | |
| 155.2 | 92.93 | 97.42 | 101.68 | 105.60 | 109.20 | 112.20 | 114.22 | | | |
| | 89.26 | 93.56 | 97.50 | 101.00 | 104.43 | 107.99 | 112.04 | | | |
| 164.1 | 96.73 | 101.49 | 105.83 | 109.92 | 113.83 | 117.20 | 119.90 | 121.89 | | |
| | 93.42 | 97.99 | 102.13 | 106.08 | 109.86 | 112.97 | 115.97 | 119.49 | | |
| 173.1 | 100.41 | 105.57 | 110.25 | 114.40 | 118.13 | 121.70 | 124.98 | 127.73 | 129.54 | |
| | 97.36 | 102.38 | 106.90 | 110.88 | 114.44 | 117.87 | 121.10 | 124.04 | 126.88 | |
| 182.1 | 103.63 | 109.23 | 114.28 | 118.75 | 122.66 | 126.07 | 129.15 | 131.98 | 134.30 | 135.90 |
| | 100.65 | 106.24 | 111.20 | 115.55 | 119.35 | 122.62 | 125.63 | 128.52 | 131.13 | 133.61 |
| 191 | 106.35 | 112.19 | 117.65 | 122.43 | 126.54 | 130.11 | 133.15 | 135.68 | 137.85 | 139.45 |
| | 103.84 | 109.68 | 115.12 | 119.84 | 123.88 | 127.41 | 130.45 | 133.09 | 135.65 | 138.10 |
| (mm) | | | | | | | | | | |

DIAMETER D = 400
HEIGHT h = 140
EXPANSION ANGLE λ = 120
BOSS RATIO ν = 0.35

Embodiment 51

Propeller fan 1 having the diameter D=400 mm, the height in the axial direction (z direction) h=112 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 224 below, i.e. a three-dimensional curved surface specified by Table 213.

$$\left.\begin{aligned} &r_1 = a\times r + b \text{ (mm)}\\ &\theta_1 = c\times\theta + d \text{ (deg)}\\ &z_{1u} = e_u\times z_u + f_u \text{ (mm)}\\ &z_{1d} = e_d\times z_d + f_d \text{ (mm)}\\ &(a,\ c,\ e_u,\ e_d\text{: factor of proportionality, } b,\ d,\ f_u,\ f_d\text{: constant})\\ &\text{wherein}\\ &a = \frac{D}{2} = \frac{400}{2} = 200\\ &b = 0\\ &c = \lambda = \frac{360}{n} = 120\\ &d = 0\\ &e_u = h = 112\\ &e_d = 106.4\\ &f_u = f_d = 0 \end{aligned}\right\} \quad (224)$$

TABLE 208

| | θ | | | | | | | | | | | | | |
|---|---|---|---|---|---|---|---|---|---|---|---|---|---|---|
| r | 5 | 10 | 15 | 20 | 25 | 30 | 35 | 40 | 45 | 50 | 55 | 60 | 65 | 70 |
| 60 | | | 21.39 | 24.26 | 26.97 | 29.62 | 32.24 | 34.82 | 37.33 | 39.74 | 42.07 | 44.29 | 46.40 | 48.37 |
| | | | 17.86 | 19.57 | 21.30 | 23.02 | 24.75 | 26.53 | 28.39 | 30.35 | 32.38 | 34.44 | 36.49 | 38.52 |
| 70 | | 16.49 | 20.32 | 23.79 | 27.07 | 30.22 | 33.22 | 36.07 | 38.78 | 41.39 | 43.89 | 46.28 | 48.49 | 50.36 |
| | | 13.47 | 16.01 | 18.45 | 20.84 | 23.22 | 25.64 | 28.10 | 30.58 | 33.06 | 35.50 | 37.86 | 40.16 | 42.43 |
| 80 | 9.84 | 14.90 | 19.26 | 23.29 | 27.07 | 30.65 | 34.03 | 37.20 | 40.22 | 43.09 | 45.82 | 48.39 | 50.72 | 52.65 |
| | 8.08 | 11.71 | 15.05 | 18.19 | 21.19 | 24.11 | 26.99 | 29.83 | 32.62 | 35.34 | 37.97 | 40.47 | 42.85 | 45.17 |
| 90 | 7.86 | 13.20 | 18.13 | 22.74 | 27.05 | 31.08 | 34.85 | 38.40 | 41.73 | 44.88 | 47.85 | 50.64 | 53.21 | 55.41 |
| | 5.90 | 10.34 | 14.44 | 18.23 | 21.74 | 25.08 | 28.28 | 31.40 | 34.42 | 37.35 | 40.15 | 42.81 | 45.31 | 47.71 |

TABLE 208-continued

| | | | | | | | | | | | | | | |
|---|---|---|---|---|---|---|---|---|---|---|---|---|---|---|
| 100 | 4.72 | 11.17 | 16.93 | 22.17 | 27.01 | 31.51 | 35.71 | 39.62 | 43.28 | 46.71 | 49.95 | 52.99 | 55.85 | 58.44 |
| | 3.48 | 8.86 | 13.78 | 18.21 | 22.23 | 25.94 | 29.46 | 32.82 | 36.06 | 39.20 | 42.20 | 45.07 | 47.78 | 50.36 |
| 110 | 1.11 | 8.89 | 15.55 | 21.47 | 26.86 | 31.83 | 36.44 | 40.72 | 44.69 | 48.41 | 51.91 | 55.22 | 58.36 | 61.32 |
| | 0.70 | 7.05 | 12.79 | 17.88 | 22.43 | 26.57 | 30.40 | 34.02 | 37.47 | 40.80 | 44.01 | 47.11 | 50.08 | 52.93 |
| 120 | | 6.24 | 13.76 | 20.35 | 26.29 | 31.74 | 36.77 | 41.43 | 45.76 | 49.80 | 53.59 | 57.18 | 60.60 | 63.85 |
| | | 4.90 | 11.32 | 17.09 | 22.29 | 26.99 | 31.26 | 35.21 | 38.91 | 42.45 | 45.85 | 49.15 | 52.35 | 55.44 |
| 130 | | 3.19 | 11.42 | 18.79 | 25.37 | 31.28 | 36.66 | 41.63 | 46.28 | 50.66 | 54.81 | 58.75 | 62.49 | 66.04 |
| | | 2.50 | 9.86 | 16.63 | 22.67 | 28.02 | 32.80 | 37.15 | 41.18 | 44.97 | 48.54 | 51.93 | 55.18 | 58.30 |
| 140 | | | 9.18 | 17.52 | 24.80 | 31.21 | 36.94 | 42.17 | 47.04 | 51.65 | 56.03 | 60.17 | 64.16 | 68.00 |
| | | | 7.91 | 15.59 | 22.32 | 28.25 | 33.54 | 38.35 | 42.82 | 47.02 | 50.95 | 54.61 | 58.12 | 61.45 |
| 150 | | | 6.48 | 15.63 | 23.75 | 30.98 | 37.42 | 43.18 | 48.40 | 53.22 | 57.80 | 62.22 | 66.49 | 70.55 |
| | | | 5.45 | 13.81 | 21.30 | 27.95 | 33.86 | 39.15 | 43.95 | 48.41 | 52.66 | 56.75 | 60.67 | 64.38 |
| 160 | | | | 13.82 | 22.90 | 30.89 | 37.96 | 44.24 | 49.91 | 55.10 | 59.93 | 64.51 | 68.96 | 73.27 |
| | | | | 12.07 | 20.36 | 27.64 | 34.10 | 39.90 | 45.20 | 50.08 | 54.65 | 58.99 | 63.19 | 67.21 |
| 170 | | | | 12.07 | 22.09 | 30.78 | 38.36 | 45.06 | 51.10 | 56.64 | 61.80 | 66.68 | 71.35 | 75.91 |
| | | | | 10.45 | 19.50 | 27.34 | 34.28 | 40.51 | 46.17 | 51.40 | 56.30 | 60.95 | 65.45 | 69.84 |
| 180 | | | | 9.75 | 21.06 | 30.49 | 38.59 | 45.68 | 52.05 | 57.90 | 63.36 | 68.52 | 73.45 | 78.23 |
| | | | | 8.58 | 18.64 | 27.11 | 34.55 | 41.14 | 47.11 | 52.60 | 57.77 | 62.70 | 67.42 | 71.99 |
| 190 | | | | | 19.65 | 30.16 | 38.89 | 46.36 | 53.00 | 59.09 | 64.76 | 70.12 | 75.28 | 80.26 |
| | | | | | 17.66 | 27.16 | 35.10 | 41.99 | 48.20 | 53.93 | 59.30 | 64.47 | 69.50 | 74.32 |
| (mm) | | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 60 | 50.10 | 51.51 | 52.36 | 52.40 | | | | | | | |
| | 40.53 | 42.58 | 44.78 | 47.36 | | | | | | | |
| 70 | 51.68 | 52.10 | | | | | | | | | |
| | 44.78 | 47.39 | | | | | | | | | |
| 80 | 53.97 | 54.33 | | | | | | | | | |
| | 47.52 | 50.13 | | | | | | | | | |
| 90 | 57.11 | 57.95 | | | | | | | | | |
| | 50.10 | 52.67 | | | | | | | | | |
| 100 | 60.64 | 62.23 | 62.80 | | | | | | | | |
| | 52.89 | 55.48 | 58.39 | | | | | | | | |
| 110 | 63.99 | 66.21 | 67.72 | | | | | | | | |
| | 55.70 | 58.43 | 61.29 | | | | | | | | |
| 120 | 66.92 | 69.67 | 71.92 | 73.36 | | | | | | | |
| | 58.42 | 61.31 | 64.21 | 67.28 | | | | | | | |
| 130 | 69.40 | 72.57 | 75.42 | 77.75 | 79.17 | | | | | | |
| | 61.33 | 64.26 | 67.16 | 70.10 | 73.32 | | | | | | |
| 140 | 71.66 | 75.10 | 78.35 | 81.30 | 83.70 | 85.21 | | | | | |
| | 64.57 | 67.51 | 70.35 | 73.17 | 76.06 | 79.32 | | | | | |
| 150 | 74.34 | 77.93 | 81.34 | 84.48 | 87.36 | 89.76 | 91.38 | | | | |
| | 67.83 | 71.10 | 74.10 | 76.76 | 79.36 | 82.07 | 85.15 | | | | |
| 160 | 77.38 | 81.19 | 84.66 | 87.93 | 91.06 | 93.76 | 95.92 | 97.51 | | | |
| | 71.00 | 74.47 | 77.62 | 80.62 | 83.49 | 85.85 | 88.13 | 90.82 | | | |
| 170 | 80.32 | 84.45 | 88.20 | 91.52 | 94.50 | 97.36 | 99.98 | 102.19 | 103.63 | | |
| | 74.00 | 77.81 | 81.24 | 84.27 | 86.97 | 89.58 | 92.04 | 94.27 | 96.43 | | |
| 180 | 82.91 | 87.38 | 91.42 | 95.00 | 98.13 | 100.86 | 103.32 | 105.58 | 107.44 | 108.72 | |
| | 76.49 | 80.74 | 84.51 | 87.82 | 90.71 | 93.19 | 95.48 | 97.67 | 99.66 | 101.55 | |
| 190 | 85.08 | 89.75 | 94.12 | 97.94 | 101.23 | 104.08 | 106.52 | 108.55 | 110.28 | 111.56 | |
| | 78.92 | 83.36 | 87.49 | 91.08 | 94.15 | 96.83 | 99.14 | 101.15 | 103.09 | 104.96 | |
| (mm) | | | | | | | | | | | |

DIAMETER D = 400
HEIGHT h = 112 (eu = 112, ed = 106.4, fu = fd = 0)
EXPANSION ANGLE λ = 120
BOSS RATIO ν = 0.275

Embodiment 52

Propeller fan 1 having the diameter D=400 mm, the height in the, axial direction (z direction) h=112 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 225 below, i.e. a three-dimensional curved surface specified by Table 214.

$$
\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = \frac{D}{2} = \frac{400}{2} = 200\\
&b = 0\\
&c = \lambda = \frac{360}{n} = 120\\
&d = 0\\
&e_u = e_d = h = 112\\
&f_u = 3\\
&f_d = 0
\end{aligned}\right\} \quad (225)
$$

TABLE 214

| r | θ 5 | 10 | 15 | 20 | 25 | 30 | 35 | 40 | 45 | 50 | 55 | 60 | 65 | 70 |
|---|---|---|---|---|---|---|---|---|---|---|---|---|---|---|
| 60 | | | 24.39 | 27.26 | 29.97 | 32.62 | 35.24 | 37.82 | 40.33 | 42.74 | 45.07 | 47.29 | 49.40 | 51.37 |
| | | | 18.80 | 20.60 | 22.42 | 24.24 | 26.05 | 27.92 | 29.88 | 31.95 | 34.08 | 36.25 | 38.42 | 40.55 |
| 70 | | 19.49 | 23.32 | 26.79 | 30.07 | 33.22 | 36.22 | 39.07 | 41.78 | 44.39 | 46.89 | 49.28 | 51.49 | 53.36 |
| | | 14.18 | 16.85 | 19.42 | 21.93 | 24.45 | 26.99 | 29.58 | 32.19 | 34.80 | 37.37 | 39.86 | 42.27 | 44.67 |
| 80 | 12.84 | 17.90 | 22.26 | 26.29 | 30.07 | 33.65 | 37.03 | 40.20 | 43.22 | 46.09 | 48.82 | 51.39 | 53.72 | 55.65 |
| | 8.51 | 12.33 | 15.84 | 19.14 | 22.30 | 25.38 | 28.41 | 31.40 | 34.34 | 37.20 | 39.97 | 42.60 | 45.10 | 47.54 |
| 90 | 10.86 | 16.20 | 21.13 | 25.74 | 30.05 | 34.08 | 37.85 | 41.40 | 44.73 | 47.88 | 50.85 | 53.64 | 56.21 | 58.41 |
| | 6.21 | 10.88 | 15.20 | 19.18 | 22.89 | 26.40 | 29.77 | 33.05 | 36.23 | 39.32 | 42.27 | 45.06 | 47.69 | 50.22 |
| 100 | 7.72 | 14.17 | 19.93 | 25.17 | 30.01 | 34.51 | 38.71 | 42.62 | 46.28 | 49.71 | 52.95 | 55.99 | 58.85 | 61.44 |
| | 3.66 | 9.32 | 14.51 | 19.17 | 23.40 | 27.31 | 31.01 | 34.54 | 37.96 | 41.26 | 44.42 | 47.44 | 50.29 | 53.01 |
| 110 | 4.11 | 11.89 | 18.55 | 24.47 | 29.86 | 34.83 | 39.44 | 43.72 | 47.69 | 51.41 | 54.91 | 58.22 | 61.36 | 64.32 |
| | 0.73 | 7.42 | 13.47 | 18.82 | 23.61 | 27.97 | 32.00 | 35.81 | 39.45 | 42.95 | 46.33 | 49.58 | 52.72 | 55.72 |
| 120 | | 9.24 | 16.76 | 23.35 | 29.29 | 34.74 | 39.77 | 44.43 | 48.76 | 52.80 | 56.59 | 60.18 | 63.60 | 66.85 |
| | | 5.16 | 11.92 | 17.99 | 23.46 | 28.41 | 32.91 | 37.06 | 40.96 | 44.68 | 48.26 | 51.74 | 55.10 | 58.36 |
| 130 | | 6.19 | 14.42 | 21.79 | 28.37 | 34.28 | 39.66 | 44.63 | 49.28 | 53.66 | 57.81 | 61.75 | 65.49 | 69.04 |
| | | 2.63 | 10.37 | 17.51 | 23.86 | 29.49 | 34.52 | 39.10 | 43.35 | 47.33 | 51.09 | 54.67 | 58.09 | 61.37 |
| 140 | | | 12.18 | 20.52 | 27.80 | 34.21 | 39.94 | 45.17 | 50.04 | 54.65 | 59.03 | 63.17 | 67.16 | 71.00 |
| | | | 8.33 | 16.41 | 23.50 | 29.74 | 35.30 | 40.37 | 45.07 | 49.49 | 53.63 | 57.48 | 61.18 | 64.68 |
| 150 | | | 9.48 | 18.63 | 26.75 | 33.98 | 40.42 | 46.18 | 51.40 | 56.22 | 60.80 | 65.22 | 69.49 | 73.55 |
| | | | 5.73 | 14.54 | 22.42 | 29.42 | 35.65 | 41.21 | 46.27 | 50.96 | 55.44 | 59.74 | 63.87 | 67.77 |
| 160 | | | | 16.82 | 25.90 | 33.89 | 40.96 | 47.24 | 52.91 | 58.10 | 62.93 | 67.51 | 71.96 | 76.27 |
| | | | | 12.70 | 21.43 | 29.09 | 35.89 | 42.00 | 47.57 | 52.72 | 57.52 | 62.10 | 66.51 | 70.75 |
| 170 | | | | 15.07 | 25.09 | 33.78 | 41.36 | 48.06 | 54.10 | 59.64 | 64.80 | 69.68 | 74.35 | 78.91 |
| | | | | 11.00 | 20.53 | 28.78 | 36.09 | 42.64 | 48.60 | 54.10 | 59.26 | 64.15 | 68.89 | 73.52 |
| 180 | | | | 12.75 | 24.06 | 33.49 | 41.59 | 48.68 | 55.05 | 60.90 | 66.36 | 71.52 | 76.45 | 81.23 |
| | | | | 9.03 | 19.62 | 28.54 | 36.37 | 43.31 | 49.59 | 55.37 | 60.81 | 66.00 | 70.96 | 75.78 |
| 190 | | | | | 22.65 | 33.16 | 41.89 | 49.36 | 56.00 | 62.09 | 67.76 | 73.12 | 78.28 | 83.26 |
| | | | | | 18.59 | 28.59 | 36.95 | 44.20 | 50.74 | 56.76 | 62.42 | 67.86 | 73.15 | 78.23 |
| (mm) | | | | | | | | | | | | | | |

| r | θ 75 | 80 | 85 | 90 | 95 | 100 | 105 | 110 | 115 | 120 | (deg) |
|---|---|---|---|---|---|---|---|---|---|---|---|
| 60 | 53.10 | 54.51 | 55.36 | 55.40 | | | | | | | |
| | 42.67 | 44.82 | 47.14 | 49.86 | | | | | | | |
| 70 | 54.68 | 55.10 | | | | | | | | | |
| | 47.13 | 49.89 | | | | | | | | | |
| 80 | 56.97 | 57.33 | | | | | | | | | |
| | 50.02 | 52.77 | | | | | | | | | |
| 90 | 60.11 | 60.95 | | | | | | | | | |
| | 52.74 | 55.45 | | | | | | | | | |
| 100 | 63.64 | 65.23 | 65.80 | | | | | | | | |
| | 55.67 | 58.40 | 61.47 | | | | | | | | |
| 110 | 66.99 | 69.21 | 70.72 | | | | | | | | |
| | 58.63 | 61.51 | 64.52 | | | | | | | | |
| 120 | 69.92 | 72.67 | 74.92 | 76.36 | | | | | | | |
| | 61.49 | 64.53 | 67.59 | 70.82 | | | | | | | |

TABLE 214-continued

| | | | | | | | | | | |
|---|---|---|---|---|---|---|---|---|---|---|
| 130 | 72.40 | 75.57 | 78.42 | 80.75 | 82.17 | | | | | |
| | 64.55 | 67.65 | 70.70 | 73.79 | 77.18 | | | | | |
| 140 | 74.66 | 78.10 | 81.35 | 84.30 | 86.70 | 88.21 | | | | |
| | 67.97 | 71.06 | 74.06 | 77.02 | 80.06 | 83.49 | | | | |
| 150 | 77.34 | 80.93 | 84.34 | 87.48 | 90.36 | 92.76 | 94.38 | | | |
| | 71.40 | 74.84 | 78.00 | 80.80 | 83.54 | 86.39 | 89.63 | | | |
| 160 | 80.38 | 84.19 | 87.66 | 90.93 | 94.06 | 96.76 | 98.92 | 100.51 | | |
| | 74.74 | 78.39 | 81.71 | 84.86 | 87.88 | 90.37 | 92.77 | 95.60 | | |
| 170 | 83.32 | 87.45 | 91.20 | 94.52 | 97.50 | 100.36 | 102.98 | 105.19 | 106.63 | |
| | 77.89 | 81.90 | 85.52 | 88.71 | 91.55 | 94.30 | 96.88 | 99.23 | 101.50 | |
| 180 | 85.91 | 90.38 | 94.42 | 98.00 | 101.13 | 103.86 | 106.32 | 108.58 | 110.44 | 111.72 |
| | 80.52 | 84.99 | 88.96 | 92.44 | 95.48 | 98.10 | 100.50 | 102.81 | 104.91 | 106.89 |
| 190 | 88.08 | 92.75 | 97.12 | 100.94 | 104.23 | 107.08 | 109.52 | 111.55 | 113.28 | 114.56 |
| | 83.07 | 87.74 | 92.10 | 95.87 | 99.11 | 101.93 | 104.36 | 106.47 | 108.52 | 110.48 |
| (mm) | | | | | | | | | | |

DIAMETER D = 400
HEIGHT h = 112 (eu = 112, ed = 112, fu = 3, fd = 0)
EXPANSION ANGLE λ = 120
BOSS RATIO ν = 0.275

Embodiment 53

Propeller fan 1 having the diameter d=400 mm, the height in the axial direction (z direction) h=112 mm, the number of blades n=3, the expansion angle of a blade λ=120 deg, the boss ratio ν=0.275 (boss diameter νD=110 mm) was formed to have a curved surface formed by transforming the curved surface defined by non-dimensionally expressed three-dimensional coordinates specified by Table 202 using a transformation formula 226 below, i.e. a three-dimensional curved surface specified by Table 215.

$$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = \dfrac{D}{2} = \dfrac{400}{2} = 200 \\ b = 0 \\ c = \lambda = \dfrac{360}{n} = 120 \\ d = 0 \\ e_u = h = 112 \\ e_d = 106.4 \\ f_u = 3 \\ f_d = 0 \end{array}\right\} \quad (226)$$

TABLE 215

| r | θ | | | | | | | | | | | | | |
|---|---|---|---|---|---|---|---|---|---|---|---|---|---|---|
| | 5 | 10 | 15 | 20 | 25 | 30 | 35 | 40 | 45 | 50 | 55 | 60 | 65 | 70 |
| 60 | | | 24.39 | 27.26 | 29.97 | 32.62 | 35.24 | 37.82 | 40.33 | 42.74 | 45.07 | 47.29 | 49.40 | 51.37 |
| | | | 17.86 | 19.57 | 21.30 | 23.02 | 24.75 | 26.53 | 28.39 | 30.35 | 32.38 | 34.44 | 36.49 | 38.52 |
| 70 | | 19.49 | 23.32 | 26.79 | 30.07 | 33.22 | 36.22 | 39.07 | 41.78 | 44.39 | 46.89 | 49.28 | 51.49 | 53.36 |
| | | 13.47 | 16.01 | 18.45 | 20.84 | 23.22 | 25.64 | 28.10 | 30.58 | 33.06 | 35.50 | 37.86 | 40.16 | 42.43 |
| 80 | 12.84 | 17.90 | 22.26 | 26.29 | 30.07 | 33.65 | 37.03 | 40.20 | 43.22 | 46.09 | 48.82 | 51.39 | 53.72 | 55.65 |
| | 8.08 | 11.71 | 15.05 | 18.19 | 21.19 | 24.11 | 26.99 | 29.83 | 32.62 | 35.34 | 37.97 | 40.47 | 42.85 | 45.17 |
| 90 | 10.86 | 16.20 | 21.13 | 25.74 | 30.05 | 34.08 | 37.85 | 41.40 | 44.73 | 47.88 | 50.85 | 53.64 | 56.21 | 58.41 |
| | 5.90 | 10.34 | 14.44 | 18.23 | 21.74 | 25.08 | 28.28 | 31.40 | 34.42 | 37.35 | 40.15 | 42.81 | 45.31 | 47.71 |
| 100 | 7.72 | 14.17 | 19.93 | 25.17 | 30.01 | 34.51 | 38.71 | 42.62 | 46.28 | 49.71 | 52.95 | 55.99 | 58.85 | 61.44 |
| | 3.48 | 8.86 | 13.78 | 18.21 | 22.23 | 25.94 | 29.46 | 32.82 | 36.06 | 39.20 | 42.20 | 45.07 | 47.78 | 50.36 |

TABLE 215-continued

| | | | | | | | | | | | | | | |
|---|---|---|---|---|---|---|---|---|---|---|---|---|---|---|
| 110 | 4.11 | 11.89 | 18.55 | 24.47 | 29.86 | 34.83 | 39.44 | 43.72 | 47.69 | 51.41 | 54.91 | 58.22 | 61.36 | 64.32 |
| | 0.70 | 7.05 | 12.79 | 17.88 | 22.43 | 26.57 | 30.40 | 34.02 | 37.47 | 40.80 | 44.01 | 47.11 | 50.08 | 52.93 |
| 120 | | 9.24 | 16.76 | 23.35 | 29.29 | 34.74 | 39.77 | 44.43 | 48.76 | 52.80 | 56.59 | 60.18 | 63.60 | 66.85 |
| | | 4.90 | 11.32 | 17.09 | 22.29 | 26.99 | 31.26 | 35.21 | 38.91 | 42.45 | 45.85 | 49.15 | 52.35 | 55.44 |
| 130 | | 6.19 | 14.42 | 21.79 | 28.37 | 34.28 | 39.66 | 44.63 | 49.28 | 53.66 | 57.81 | 61.75 | 65.49 | 69.04 |
| | | 2.50 | 9.86 | 16.63 | 22.67 | 28.02 | 32.80 | 37.15 | 41.18 | 44.97 | 48.54 | 51.93 | 55.18 | 58.30 |
| 140 | | | 12.18 | 20.52 | 27.80 | 34.21 | 39.94 | 45.17 | 50.04 | 54.65 | 59.03 | 63.17 | 67.16 | 71.00 |
| | | | 7.91 | 15.59 | 22.32 | 28.25 | 33.54 | 38.35 | 42.82 | 47.02 | 50.95 | 54.61 | 58.12 | 61.45 |
| 150 | | | 9.48 | 18.63 | 26.75 | 33.98 | 40.42 | 46.18 | 51.40 | 56.22 | 60.80 | 65.22 | 69.49 | 73.55 |
| | | | 5.45 | 13.81 | 21.30 | 27.95 | 33.86 | 39.15 | 43.95 | 48.41 | 52.66 | 56.75 | 60.67 | 64.38 |
| 160 | | | | 16.82 | 25.90 | 33.89 | 40.96 | 47.24 | 52.91 | 58.10 | 62.93 | 67.51 | 71.96 | 76.27 |
| | | | | 12.07 | 20.36 | 27.64 | 34.10 | 39.90 | 45.20 | 50.08 | 54.65 | 58.99 | 63.19 | 67.21 |
| 170 | | | | 15.07 | 25.09 | 33.78 | 41.36 | 48.06 | 54.10 | 59.64 | 64.80 | 69.68 | 74.35 | 78.91 |
| | | | | 10.45 | 19.50 | 27.34 | 34.28 | 40.51 | 46.17 | 51.40 | 56.30 | 60.95 | 65.45 | 69.84 |
| 180 | | | | 12.75 | 24.06 | 33.49 | 41.59 | 48.68 | 55.05 | 60.90 | 66.36 | 71.52 | 76.45 | 81.23 |
| | | | | 8.58 | 18.64 | 27.11 | 34.55 | 41.14 | 47.11 | 52.60 | 57.77 | 62.70 | 67.42 | 71.99 |
| 190 | | | | | 22.65 | 33.16 | 41.89 | 49.36 | 56.00 | 62.09 | 67.76 | 73.12 | 78.28 | 83.26 |
| | | | | | 17.66 | 27.16 | 35.10 | 41.99 | 48.20 | 53.93 | 59.30 | 64.47 | 69.50 | 74.32 |
| (mm) | | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 60 | 53.10 | 54.51 | 55.36 | 55.40 | | | | | | | |
| | 40.53 | 42.58 | 44.78 | 47.36 | | | | | | | |
| 70 | 54.68 | 55.10 | | | | | | | | | |
| | 44.78 | 47.39 | | | | | | | | | |
| 80 | 56.97 | 57.33 | | | | | | | | | |
| | 47.52 | 50.13 | | | | | | | | | |
| 90 | 60.11 | 60.95 | | | | | | | | | |
| | 50.10 | 52.67 | | | | | | | | | |
| 100 | 63.64 | 65.23 | 65.80 | | | | | | | | |
| | 52.89 | 55.48 | 58.39 | | | | | | | | |
| 110 | 66.99 | 69.21 | 70.72 | | | | | | | | |
| | 55.70 | 58.43 | 61.29 | | | | | | | | |
| 120 | 69.92 | 72.67 | 74.92 | 76.36 | | | | | | | |
| | 58.42 | 61.31 | 64.21 | 67.28 | | | | | | | |
| 130 | 72.40 | 75.57 | 78.42 | 80.75 | 82.17 | | | | | | |
| | 61.33 | 64.26 | 67.16 | 70.10 | 73.32 | | | | | | |
| 140 | 74.66 | 78.10 | 81.35 | 84.30 | 86.70 | 88.21 | | | | | |
| | 64.57 | 67.51 | 70.35 | 73.17 | 76.06 | 79.32 | | | | | |
| 150 | 77.34 | 80.93 | 84.34 | 87.48 | 90.36 | 92.76 | 94.38 | | | | |
| | 67.83 | 71.10 | 74.10 | 76.76 | 79.36 | 82.07 | 82.15 | | | | |
| 160 | 80.38 | 84.19 | 87.66 | 90.93 | 94.06 | 96.76 | 98.92 | 100.51 | | | |
| | 71.00 | 74.47 | 77.62 | 80.62 | 83.49 | 85.85 | 88.13 | 90.82 | | | |
| 170 | 83.32 | 87.45 | 91.20 | 94.52 | 97.50 | 100.36 | 102.98 | 105.19 | 106.63 | | |
| | 74.00 | 77.81 | 81.24 | 84.27 | 86.97 | 89.58 | 92.04 | 94.27 | 96.43 | | |
| 180 | 85.91 | 90.38 | 94.42 | 98.00 | 101.13 | 103.86 | 106.32 | 108.58 | 110.44 | 111.72 | |
| | 76.49 | 80.74 | 84.51 | 87.82 | 90.71 | 93.19 | 95.48 | 97.67 | 99.66 | 101.55 | |
| 190 | 88.08 | 92.75 | 97.12 | 100.94 | 104.23 | 107.08 | 109.52 | 111.55 | 113.28 | 114.56 | |
| | 78.92 | 83.36 | 87.49 | 91.08 | 94.15 | 96.83 | 99.14 | 101.15 | 103.09 | 104.96 | |
| (mm) | | | | | | | | | | | |

DIAMETER D = 400
HEIGHT h = 112 (eu = 112, ed = 106.4, fu = 3, fd = 0)
EXPANSION ANGLE λ = 120
BOSS RATIO ν = 0.275

Embodiment 54

Propeller fan 1 having the diameter D=316 mm, the height in the axial direction (z direction) h=100 mm, the number of blades n=3, the expansion angle of a blade λ=120 deg, the boss ratio ν=0.272 (boss diameter νD=86 mm) was formed to have a curved surface formed by transforming the curved surface defined by non-dimensionally expressed three-dimensional coordinates specified by Table 202 using a transformation formula 227 below, i.e. a three-dimensional curved surface specified by Table 216.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{20}{29}D(1-\nu) = \frac{20}{29} \times 316 \times (1-0.272) = 158.6\\
&b = -\frac{20}{29}D(1-\nu) \times 0.275 + \frac{\nu D}{2}\\
&\quad = -\frac{20}{29} \times 316 \times (1-0.272) \times 0.275 + \frac{0.272 \times 316}{2}\\
&\quad = -0.62\\
&c = \lambda = \frac{360}{n} = \frac{360}{3} = 120\\
&d = 0\\
&e_u = e_d = h = 100\\
&f_u = f_d = 0
\end{aligned}\right\} \quad (227)$$

TABLE 216

| | θ | | | | | | | | | | | | |
|---|---|---|---|---|---|---|---|---|---|---|---|---|---|
| r | 5 | 10 | 15 | 20 | 25 | 30 | 35 | 40 | 45 | 50 | 55 | 60 | 65 |
| 46.97 | | | 19.09 | 21.66 | 24.08 | 26.45 | 28.79 | 31.09 | 33.33 | 35.49 | 37.56 | 39.55 | 41.43 |
| | | | 16.78 | 18.40 | 20.02 | 21.64 | 23.26 | 24.93 | 26.68 | 28.53 | 30.43 | 32.37 | 34.30 |
| 54.9 | | 14.73 | 18.14 | 21.24 | 24.17 | 26.98 | 29.66 | 32.21 | 34.63 | 36.96 | 39.19 | 41.32 | 43.29 |
| | | 12.66 | 15.05 | 17.34 | 19.58 | 21.83 | 24.10 | 26.41 | 28.75 | 31.07 | 33.36 | 35.59 | 37.74 |
| 62.83 | 8.78 | 13.30 | 17.20 | 20.79 | 24.17 | 27.37 | 30.38 | 33.22 | 35.91 | 38.47 | 40.91 | 43.21 | 45.29 |
| | 7.60 | 11.01 | 14.14 | 17.09 | 19.91 | 22.66 | 25.37 | 28.03 | 30.66 | 33.22 | 35.68 | 38.03 | 40.27 |
| 70.76 | 7.02 | 11.78 | 16.19 | 20.30 | 24.15 | 27.75 | 31.12 | 34.28 | 37.26 | 40.07 | 42.72 | 45.21 | 47.50 |
| | 5.55 | 9.72 | 13.57 | 17.13 | 20.44 | 23.57 | 26.58 | 29.51 | 32.35 | 35.10 | 37.74 | 40.23 | 42.58 |
| 78.69 | 4.21 | 9.97 | 15.11 | 19.79 | 24.12 | 28.14 | 31.88 | 35.38 | 38.64 | 41.71 | 44.59 | 47.32 | 49.86 |
| | 3.27 | 8.32 | 12.95 | 17.12 | 20.89 | 24.38 | 27.68 | 30.84 | 33.89 | 36.84 | 39.66 | 42.36 | 44.90 |
| 86.62 | 0.99 | 7.94 | 13.88 | 19.17 | 23.98 | 28.42 | 32.53 | 36.35 | 39.91 | 43.22 | 46.35 | 49.30 | 52.11 |
| | 0.65 | 6.63 | 12.02 | 16.80 | 21.08 | 24.97 | 28.57 | 31.97 | 35.22 | 38.35 | 41.36 | 44.27 | 47.07 |
| 94.55 | | 5.57 | 12.29 | 18.17 | 23.48 | 28.34 | 32.83 | 36.99 | 40.86 | 44.46 | 47.85 | 51.05 | 54.10 |
| | | 4.60 | 10.64 | 16.06 | 20.95 | 25.36 | 29.38 | 33.09 | 36.57 | 39.89 | 43.09 | 46.19 | 49.20 |
| 102.5 | | 2.85 | 10.19 | 16.78 | 22.65 | 27.93 | 32.73 | 37.17 | 41.32 | 45.24 | 48.94 | 52.45 | 55.79 |
| | | 2.35 | 9.26 | 15.63 | 21.30 | 26.33 | 30.83 | 34.91 | 38.71 | 42.26 | 45.62 | 48.81 | 51.86 |
| 110.4 | | | 8.19 | 15.64 | 22.14 | 27.87 | 32.99 | 37.65 | 42.00 | 46.11 | 50.02 | 53.72 | 57.29 |
| | | | 7.44 | 14.66 | 20.98 | 26.55 | 31.52 | 36.04 | 40.24 | 44.19 | 47.88 | 51.32 | 54.62 |
| 118.3 | | | 5.78 | 13.96 | 21.21 | 27.66 | 33.41 | 38.56 | 43.21 | 47.52 | 51.61 | 55.56 | 59.36 |
| | | | 5.12 | 12.98 | 20.02 | 26.27 | 31.83 | 36.80 | 41.31 | 45.50 | 49.50 | 53.33 | 57.02 |
| 126.3 | | | | 12.34 | 20.45 | 27.58 | 33.89 | 39.50 | 44.56 | 49.19 | 53.51 | 57.60 | 61.57 |
| | | | | 11.34 | 19.13 | 25.97 | 32.04 | 37.50 | 42.48 | 47.07 | 51.36 | 55.45 | 59.39 |
| 134.2 | | | | 10.77 | 19.72 | 27.48 | 34.25 | 40.23 | 45.62 | 50.57 | 55.18 | 59.53 | 63.71 |
| | | | | 9.82 | 18.33 | 25.69 | 32.22 | 38.07 | 43.39 | 48.31 | 52.91 | 57.28 | 61.51 |
| 142.1 | | | | 8.71 | 18.81 | 27.22 | 34.46 | 40.79 | 46.48 | 51.70 | 56.57 | 61.18 | 65.58 |
| | | | | 8.06 | 17.52 | 25.48 | 32.47 | 38.67 | 44.27 | 49.44 | 54.29 | 58.93 | 63.36 |
| 150.1 | | | | | 17.54 | 26.93 | 34.73 | 41.39 | 47.32 | 52.76 | 57.82 | 62.61 | 67.22 |
| | | | | | 16.60 | 25.53 | 32.99 | 39.46 | 45.30 | 50.68 | 55.74 | 60.59 | 65.32 |
| (mm) | | | | | | | | | | | | | |

| | θ | | | | | | | | | | | |
|---|---|---|---|---|---|---|---|---|---|---|---|---|
| r | 70 | 75 | 80 | 85 | 90 | 95 | 100 | 105 | 110 | 115 | 120 | (deg) |
| 46.97 | 43.18 | 44.73 | 45.99 | 46.75 | 46.78 | | | | | | | |
| | 36.20 | 38.09 | 40.02 | 42.09 | 44.51 | | | | | | | |
| 54.9 | 44.96 | 46.14 | 46.51 | | | | | | | | | |
| | 39.88 | 42.08 | 44.54 | | | | | | | | | |
| 62.83 | 47.01 | 48.19 | 48.51 | | | | | | | | | |
| | 42.45 | 44.66 | 47.12 | | | | | | | | | |
| 70.76 | 49.48 | 50.99 | 51.74 | | | | | | | | | |
| | 44.84 | 47.09 | 49.51 | | | | | | | | | |
| 78.69 | 52.18 | 54.14 | 55.56 | 56.07 | | | | | | | | |
| | 47.33 | 49.71 | 52.14 | 54.88 | | | | | | | | |
| 86.62 | 54.75 | 57.14 | 59.12 | 60.47 | | | | | | | | |
| | 49.75 | 52.35 | 54.92 | 57.60 | | | | | | | | |

TABLE 216-continued

| | | | | | | | | | | | |
|---|---|---|---|---|---|---|---|---|---|---|---|
| 94.55 | 57.01 | 59.75 | 62.21 | 64.21 | 65.50 | | | | | | |
| | 52.10 | 54.90 | 57.62 | 60.35 | 63.23 | | | | | | |
| 102.5 | 58.96 | 61.96 | 64.79 | 67.34 | 69.42 | 70.69 | | | | | |
| | 54.80 | 57.64 | 60.40 | 63.12 | 65.89 | 68.91 | | | | | |
| 110.4 | 60.72 | 63.98 | 67.06 | 69.96 | 72.59 | 74.74 | 76.08 | | | | |
| | 57.75 | 60.69 | 63.45 | 66.12 | 68.77 | 71.49 | 74.54 | | | | |
| 118.3 | 62.99 | 66.38 | 69.58 | 72.63 | 75.43 | 78.00 | 80.15 | 81.59 | | | |
| | 60.51 | 63.75 | 66.83 | 69.64 | 72.14 | 74.59 | 77.14 | 80.03 | | | |
| 126.3 | 65.42 | 69.09 | 72.49 | 75.59 | 78.51 | 81.31 | 83.71 | 85.64 | 87.06 | | |
| | 63.17 | 66.73 | 69.99 | 72.95 | 75.77 | 78.47 | 80.69 | 82.83 | 85.35 | | |
| 134.2 | 67.77 | 71.72 | 75.41 | 78.75 | 81.72 | 84.38 | 86.93 | 89.27 | 91.24 | 92.53 | |
| | 65.64 | 69.54 | 73.13 | 76.36 | 79.20 | 81.74 | 84.20 | 86.50 | 88.60 | 90.63 | |
| 142.1 | 69.84 | 74.02 | 78.02 | 81.63 | 84.82 | 87.62 | 90.05 | 92.25 | 94.27 | 95.93 | 97.07 |
| | 67.66 | 71.89 | 75.88 | 79.43 | 82.54 | 85.25 | 87.59 | 89.74 | 91.80 | 93.67 | 95.44 |
| 150.1 | 71.67 | 75.96 | 80.13 | 84.03 | 87.45 | 90.38 | 92.93 | 95.11 | 96.92 | 98.46 | 99.60 |
| | 69.85 | 74.17 | 78.34 | 82.23 | 85.60 | 88.49 | 91.01 | 93.18 | 95.06 | 96.89 | 98.64 |
| (mm) | | | | | | | | | | | |

DIAMETER D = 316
HEIGHT h = 100
EXPANSION ANGLE λ = 120
BOSS RATIO ν = 0.272

Embodiment 55

Propeller fan 1 having the diameter D=316 mm, the height in the axial direction (z direction) h=100 mm, the number of blades n=4, the expansion angle of a blade λ=90 deg, the boss ratio ν=0.272 (boss diameter νD=86 mm) was formed to have a curved surface formed by transforming the curved surface defined by non-dimensionally expressed three-dimensional coordinates specified by Table 202 using a transformation formula 228 below, i.e. a three-dimensional curved surface specified by Table 217.

$$\left.\begin{array}{l}
r_1 = a \times r + b \text{ (mm)} \\
\theta_1 = c \times \theta + d \text{ (deg)} \\
z_{1u} = e_u \times z_u + f_u \text{ (mm)} \\
z_{1d} = e_d \times z_d + f_d \text{ (mm)} \\
(a,\ c,\ e_u,\ e_d\text{: factor of proportionality, } b,\ d,\ f_u,\ f_d\text{: constant}) \\
\text{wherein} \\
a = \frac{20}{29} D(1-\nu) = \frac{20}{29} \times 316 \times (1-0.272) = 158.6 \\
b = -\frac{20}{29} D(1-\nu) \times 0.275 + \frac{\nu D}{2} \\
\quad = -\frac{20}{29} \times 316 \times (1-0.272) \times 0.275 + \frac{0.272 \times 316}{2} \\
\quad = -0.62 \\
c = \lambda = \frac{360}{n} = \frac{360}{4} = 90 \\
d = 0 \\
e_u = e_d = h = 100 \\
f_u = f_d = 0
\end{array}\right\} \quad (228)$$

TABLE 217

| | θ | | | | | | | | | | | | |
|---|---|---|---|---|---|---|---|---|---|---|---|---|---|
| r | 3.75 | 7.5 | 11.25 | 1.5 | 18.75 | 22.5 | 26.25 | 30 | 33.75 | 37.5 | 41.25 | 45 | 48.75 |
| 46.97 | | | 19.09 | 21.66 | 24.08 | 26.45 | 28.79 | 31.09 | 33.33 | 35.49 | 37.56 | 39.55 | 41.43 |
| | | | 16.78 | 18.40 | 20.02 | 21.64 | 23.26 | 24.93 | 26.68 | 28.53 | 30.43 | 32.37 | 34.30 |
| 54.9 | | 14.73 | 18.14 | 21.24 | 24.17 | 26.98 | 29.66 | 32.21 | 34.63 | 36.96 | 39.19 | 41.32 | 43.29 |
| | | 12.66 | 15.05 | 17.34 | 19.58 | 21.83 | 24.10 | 26.41 | 28.75 | 31.07 | 33.36 | 35.59 | 37.74 |
| 62.83 | 8.78 | 13.30 | 17.20 | 20.79 | 24.17 | 27.37 | 30.38 | 33.22 | 35.91 | 38.47 | 40.91 | 43.21 | 45.29 |
| | 7.60 | 11.01 | 14.14 | 17.09 | 19.91 | 22.66 | 25.37 | 28.03 | 30.66 | 33.22 | 35.68 | 38.03 | 40.27 |
| 70.76 | 7.02 | 11.78 | 16.19 | 20.30 | 24.15 | 27.75 | 31.12 | 34.28 | 37.26 | 40.07 | 42.72 | 45.21 | 47.50 |
| | 5.55 | 9.72 | 13.57 | 17.13 | 20.44 | 23.57 | 26.58 | 29.51 | 32.35 | 35.10 | 37.74 | 40.23 | 42.58 |
| 78.69 | 4.21 | 9.97 | 15.11 | 19.79 | 24.12 | 28.14 | 31.88 | 35.38 | 38.64 | 41.71 | 44.59 | 47.32 | 49.86 |
| | 3.27 | 8.32 | 12.95 | 17.12 | 20.89 | 24.38 | 27.68 | 30.84 | 33.89 | 36.84 | 39.66 | 42.36 | 44.90 |
| 86.62 | 0.99 | 7.94 | 13.88 | 19.17 | 23.98 | 28.42 | 32.53 | 36.35 | 39.91 | 43.22 | 46.35 | 49.30 | 52.11 |
| | 0.65 | 6.63 | 12.02 | 16.80 | 21.08 | 24.97 | 28.57 | 31.97 | 35.22 | 38.35 | 41.36 | 44.27 | 47.07 |
| 94.55 | | 5.57 | 12.29 | 18.17 | 23.48 | 28.34 | 32.83 | 36.99 | 40.86 | 44.46 | 47.85 | 51.05 | 54.10 |
| | | 4.60 | 10.64 | 16.06 | 20.95 | 25.36 | 29.38 | 33.09 | 36.57 | 39.89 | 43.09 | 46.19 | 49.20 |
| 102.5 | | 2.85 | 10.19 | 16.78 | 22.65 | 27.93 | 32.73 | 37.17 | 41.32 | 45.24 | 48.94 | 52.45 | 55.79 |
| | | 2.35 | 9.26 | 15.63 | 21.30 | 26.33 | 30.83 | 34.91 | 38.71 | 42.26 | 45.62 | 48.81 | 51.86 |
| 110.4 | | | 8.19 | 15.64 | 22.14 | 27.87 | 32.99 | 37.65 | 42.00 | 46.11 | 50.02 | 53.72 | 57.29 |
| | | | 7.44 | 14.66 | 20.98 | 26.55 | 31.52 | 36.04 | 40.24 | 44.19 | 47.88 | 51.32 | 54.62 |

TABLE 217-continued

| | | | | | | | | | | | | |
|---|---|---|---|---|---|---|---|---|---|---|---|---|
| 118.3 | | | 5.78 | 13.96 | 21.21 | 27.66 | 33.41 | 38.56 | 43.21 | 47.52 | 51.61 | 55.56 | 59.36 |
| | | | 5.12 | 12.98 | 20.02 | 26.27 | 31.83 | 36.80 | 41.31 | 45.50 | 49.50 | 53.33 | 57.02 |
| 126.3 | | | | 12.34 | 20.45 | 27.58 | 33.89 | 39.50 | 44.56 | 49.19 | 53.51 | 57.60 | 61.57 |
| | | | | 11.34 | 19.13 | 25.97 | 32.04 | 37.50 | 42.48 | 47.07 | 51.36 | 55.45 | 59.39 |
| 134.2 | | | | 10.77 | 19.72 | 27.48 | 34.25 | 40.23 | 45.62 | 50.57 | 55.18 | 59.53 | 63.71 |
| | | | | 9.82 | 18.33 | 25.69 | 32.22 | 38.07 | 43.39 | 48.31 | 52.91 | 57.28 | 61.51 |
| 142.1 | | | | 8.71 | 18.81 | 27.22 | 34.46 | 40.79 | 46.48 | 51.70 | 56.57 | 61.18 | 65.58 |
| | | | | 8.06 | 17.52 | 25.48 | 32.47 | 38.67 | 44.27 | 49.44 | 54.29 | 58.93 | 63.36 |
| 150.1 | | | | | 17.54 | 26.93 | 34.73 | 41.39 | 47.32 | 52.76 | 57.82 | 62.61 | 67.22 |
| | | | | | 16.60 | 25.53 | 32.99 | 39.46 | 45.30 | 50.68 | 55.74 | 60.59 | 65.32 |
| (mm) | | | | | | | | | | | | | |

| | θ | | | | | | | | | | | |
|---|---|---|---|---|---|---|---|---|---|---|---|---|
| r | 52.5 | 56.25 | 60 | 63.75 | 67.5 | 71.25 | 75 | 78.75 | 82.5 | 86.25 | 90 | (deg) |
| 46.97 | 43.18 | 44.73 | 45.99 | 46.75 | 46.78 | | | | | | | |
| | 36.20 | 38.09 | 40.02 | 42.09 | 44.51 | | | | | | | |
| 54.9 | 44.96 | 46.14 | 46.51 | | | | | | | | | |
| | 39.88 | 42.08 | 44.54 | | | | | | | | | |
| 62.83 | 47.01 | 48.19 | 48.51 | | | | | | | | | |
| | 42.45 | 44.66 | 47.12 | | | | | | | | | |
| 70.76 | 49.48 | 50.99 | 51.74 | | | | | | | | | |
| | 44.84 | 47.09 | 49.51 | | | | | | | | | |
| 78.69 | 52.18 | 54.14 | 55.56 | 56.07 | | | | | | | | |
| | 47.33 | 49.71 | 52.14 | 54.88 | | | | | | | | |
| 86.62 | 54.75 | 57.14 | 59.12 | 60.47 | | | | | | | | |
| | 49.75 | 52.35 | 54.92 | 57.60 | | | | | | | | |
| 94.55 | 57.01 | 59.75 | 62.21 | 64.21 | 65.50 | | | | | | | |
| | 52.10 | 54.90 | 57.62 | 60.35 | 63.23 | | | | | | | |
| 102.5 | 58.96 | 61.96 | 64.79 | 67.34 | 69.42 | 70.69 | | | | | | |
| | 54.80 | 57.64 | 60.40 | 63.12 | 65.89 | 68.91 | | | | | | |
| 110.4 | 60.72 | 63.98 | 67.06 | 69.96 | 72.59 | 74.74 | 76.08 | | | | | |
| | 57.75 | 60.69 | 63.45 | 66.12 | 68.77 | 71.49 | 74.54 | | | | | |
| 118.3 | 62.99 | 66.38 | 69.58 | 72.63 | 75.43 | 78.00 | 80.15 | 81.59 | | | | |
| | 60.51 | 63.75 | 66.83 | 69.64 | 72.14 | 74.59 | 77.14 | 80.03 | | | | |
| 126.3 | 65.42 | 69.09 | 72.49 | 75.59 | 78.51 | 81.31 | 83.71 | 85.64 | 87.06 | | | |
| | 63.17 | 66.73 | 69.99 | 72.95 | 75.77 | 78.47 | 80.69 | 82.83 | 85.35 | | | |
| 134.2 | 67.77 | 71.72 | 75.41 | 78.75 | 81.72 | 84.38 | 86.93 | 89.27 | 91.24 | 92.53 | | |
| | 65.64 | 69.54 | 73.13 | 76.36 | 79.20 | 81.74 | 84.20 | 86.50 | 88.60 | 90.63 | | |
| 142.1 | 69.84 | 74.02 | 78.02 | 81.63 | 84.82 | 87.62 | 90.05 | 92.25 | 94.27 | 95.93 | 97.07 | |
| | 67.66 | 71.89 | 75.88 | 79.43 | 82.54 | 85.25 | 87.59 | 89.74 | 91.80 | 93.67 | 95.44 | |
| 150.1 | 71.67 | 75.96 | 80.13 | 84.03 | 87.45 | 90.38 | 92.93 | 95.11 | 96.92 | 98.46 | 99.60 | |
| | 69.85 | 74.17 | 78.34 | 82.23 | 85.60 | 88.49 | 91.01 | 93.18 | 95.06 | 96.89 | 98.64 | |
| (mm) | | | | | | | | | | | | |

DIAMETER D = 316
HEIGHT h = 100
EXPANSION ANGLE λ = 90
BOSS RATIO ν = 0.272

Embodiment 56

Propeller fan 1 having the diameter D=316 mm, the height in the axial direction (z direction) h=100 mm, the number of blades n=5, the expansion angle of a blade λ=72 deg, the boss ratio ν=0.272 (boss diameter νD=86 mm) was formed to have a curved surface formed by transforming the curved surface defined by non-dimensionally expressed three-dimensional coordinates specified by Table 202 using a transformation formula 229 below, i.e. a three-dimensional curved surface specified by Table 218.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = \frac{20}{29}D(1-\nu) = \frac{20}{29}\times 316\times(1-0.272) = 158.6\\
&b = -\frac{20}{29}D(1-\nu)\times 0.275 + \frac{\nu D}{2}\\
&\quad = -\frac{20}{29}\times 316\times(1-0.272)\times 0.275 + \frac{0.272\times 316}{2}\\
&\quad = -0.62\\
&c = \lambda = \frac{360}{n} = \frac{360}{5} = 72\\
&d = 0\\
&e_u = e_d = h = 100\\
&f_u = f_d = 0
\end{aligned}\right\} \quad (229)$$

TABLE 218

| r | θ 3 | 6 | 9 | 12 | 15 | 18 | 21 | 24 | 27 | 30 | 33 | 36 | 39 |
|---|---|---|---|---|---|---|---|---|---|---|---|---|---|
| 46.97 | | | 19.09 | 21.66 | 24.08 | 26.45 | 28.79 | 31.09 | 33.33 | 35.49 | 37.56 | 39.55 | 41.43 |
| | | | 16.78 | 18.40 | 20.02 | 21.64 | 23.26 | 24.93 | 26.68 | 28.53 | 30.43 | 32.37 | 34.30 |
| 54.9 | | 14.73 | 18.14 | 21.24 | 24.17 | 26.98 | 29.66 | 32.21 | 34.63 | 36.96 | 39.19 | 41.32 | 43.29 |
| | | 12.66 | 15.05 | 17.34 | 19.58 | 21.83 | 24.10 | 26.41 | 28.75 | 31.07 | 33.36 | 35.59 | 37.74 |
| 62.83 | 8.78 | 13.30 | 17.20 | 20.79 | 24.17 | 27.37 | 30.38 | 33.22 | 35.91 | 38.47 | 40.91 | 43.21 | 45.29 |
| | 7.60 | 11.01 | 14.14 | 17.09 | 19.91 | 22.66 | 25.37 | 28.03 | 30.66 | 33.22 | 35.68 | 38.03 | 40.27 |
| 70.76 | 7.02 | 11.78 | 16.19 | 20.30 | 24.15 | 27.75 | 31.12 | 34.28 | 37.26 | 40.07 | 42.72 | 45.21 | 47.50 |
| | 5.55 | 9.72 | 13.57 | 17.13 | 20.44 | 23.57 | 26.58 | 29.51 | 32.35 | 35.10 | 37.74 | 40.23 | 42.58 |
| 78.69 | 4.21 | 9.97 | 15.11 | 19.79 | 24.12 | 28.14 | 31.88 | 35.38 | 38.64 | 41.71 | 44.59 | 47.32 | 49.86 |
| | 3.27 | 8.32 | 12.95 | 17.12 | 20.89 | 24.38 | 27.68 | 30.84 | 33.89 | 36.84 | 39.66 | 42.36 | 44.90 |
| 86.62 | 0.99 | 7.94 | 13.88 | 19.17 | 23.98 | 28.42 | 32.53 | 36.35 | 39.91 | 43.22 | 46.35 | 49.30 | 52.11 |
| | 0.65 | 6.63 | 12.02 | 16.80 | 21.08 | 24.97 | 28.57 | 31.97 | 35.22 | 38.35 | 41.36 | 44.27 | 47.07 |
| 94.55 | | 5.57 | 12.29 | 18.17 | 23.48 | 28.34 | 32.83 | 36.99 | 40.86 | 44.46 | 47.85 | 51.05 | 54.10 |
| | | 4.60 | 10.64 | 16.06 | 20.95 | 25.36 | 29.38 | 33.09 | 36.57 | 39.89 | 43.09 | 46.19 | 49.20 |
| 102.5 | | 2.85 | 10.19 | 16.78 | 22.65 | 27.93 | 32.73 | 37.17 | 41.32 | 45.24 | 48.94 | 52.45 | 55.79 |
| | | 2.35 | 9.26 | 15.63 | 21.30 | 26.33 | 30.83 | 34.91 | 38.71 | 42.26 | 45.62 | 48.81 | 51.86 |
| 110.4 | | | 8.19 | 15.64 | 22.14 | 27.87 | 32.99 | 37.65 | 42.00 | 46.11 | 50.02 | 53.72 | 57.29 |
| | | | 7.44 | 14.66 | 20.98 | 26.55 | 31.52 | 36.04 | 40.24 | 44.19 | 47.88 | 51.32 | 54.62 |
| 118.3 | | | 5.78 | 13.96 | 21.21 | 27.66 | 33.41 | 38.56 | 43.21 | 47.52 | 51.61 | 55.56 | 59.36 |
| | | | 5.12 | 12.98 | 20.02 | 26.27 | 31.83 | 36.80 | 41.31 | 45.50 | 49.50 | 53.33 | 57.02 |
| 126.3 | | | | 12.34 | 20.45 | 27.58 | 33.89 | 39.50 | 44.56 | 49.19 | 53.51 | 57.60 | 61.57 |
| | | | | 11.34 | 19.13 | 25.97 | 32.04 | 37.50 | 42.48 | 47.07 | 51.36 | 55.45 | 59.39 |
| 134.2 | | | | 10.77 | 19.72 | 27.48 | 34.25 | 40.23 | 45.62 | 50.57 | 55.18 | 59.53 | 63.71 |
| | | | | 9.82 | 18.33 | 25.69 | 32.22 | 38.07 | 43.39 | 48.31 | 52.91 | 57.28 | 61.51 |
| 142.1 | | | | 8.71 | 18.81 | 27.22 | 34.46 | 40.79 | 46.48 | 51.70 | 56.57 | 61.18 | 65.58 |
| | | | | 8.06 | 17.52 | 25.48 | 32.47 | 38.67 | 44.27 | 49.44 | 54.29 | 58.93 | 63.36 |
| 150.1 | | | | | 17.54 | 26.93 | 34.73 | 41.39 | 47.32 | 52.76 | 57.82 | 62.61 | 67.22 |
| | | | | | 16.60 | 25.53 | 32.99 | 39.46 | 45.30 | 50.68 | 55.74 | 60.59 | 65.32 |
| (mm) | | | | | | | | | | | | | |

| r | θ 42 | 45 | 48 | 51 | 54 | 57 | 60 | 63 | 66 | 69 | 72 | (deg) |
|---|---|---|---|---|---|---|---|---|---|---|---|---|
| 46.97 | 43.18 | 44.73 | 45.99 | 46.75 | 46.78 | | | | | | | |
| | 36.20 | 38.09 | 40.02 | 42.09 | 44.51 | | | | | | | |
| 54.9 | 44.96 | 46.14 | 46.51 | | | | | | | | | |
| | 39.88 | 42.08 | 44.54 | | | | | | | | | |
| 62.83 | 47.01 | 48.19 | 48.51 | | | | | | | | | |
| | 42.45 | 44.66 | 47.12 | | | | | | | | | |
| 70.76 | 49.48 | 50.99 | 51.74 | | | | | | | | | |
| | 44.84 | 47.09 | 49.51 | | | | | | | | | |
| 78.69 | 52.18 | 54.14 | 55.56 | 56.07 | | | | | | | | |
| | 47.33 | 49.71 | 52.14 | 54.88 | | | | | | | | |
| 86.62 | 54.75 | 57.14 | 59.12 | 60.47 | | | | | | | | |
| | 49.75 | 52.35 | 54.92 | 57.60 | | | | | | | | |
| 94.55 | 57.01 | 59.75 | 62.21 | 64.21 | 65.50 | | | | | | | |
| | 52.10 | 54.90 | 57.62 | 60.35 | 63.23 | | | | | | | |
| 102.5 | 58.96 | 61.96 | 64.79 | 67.34 | 69.42 | 70.69 | | | | | | |
| | 54.80 | 57.64 | 60.40 | 63.12 | 65.89 | 68.91 | | | | | | |
| 110.4 | 60.72 | 63.98 | 67.06 | 69.96 | 72.59 | 74.74 | 76.08 | | | | | |
| | 57.75 | 60.69 | 63.45 | 66.12 | 68.77 | 71.49 | 74.54 | | | | | |
| 118.3 | 62.99 | 66.38 | 69.58 | 72.63 | 75.43 | 78.00 | 80.15 | 81.59 | | | | |
| | 60.51 | 63.75 | 66.83 | 69.64 | 72.14 | 74.59 | 77.14 | 80.03 | | | | |
| 126.3 | 65.42 | 69.09 | 72.49 | 75.59 | 78.51 | 81.31 | 83.71 | 85.64 | 87.06 | | | |
| | 63.17 | 66.73 | 69.99 | 72.95 | 75.77 | 78.47 | 80.69 | 82.83 | 85.35 | | | |
| 134.2 | 67.77 | 71.72 | 75.41 | 78.75 | 81.72 | 84.38 | 86.93 | 89.27 | 91.24 | 92.53 | | |
| | 65.64 | 69.54 | 73.13 | 76.36 | 79.20 | 81.74 | 84.20 | 86.50 | 88.60 | 90.63 | | |
| 142.1 | 69.84 | 74.02 | 78.02 | 81.63 | 84.82 | 87.62 | 90.05 | 92.25 | 94.27 | 95.93 | 97.07 | |
| | 67.66 | 71.89 | 75.88 | 79.43 | 82.54 | 85.25 | 87.59 | 89.74 | 91.80 | 93.67 | 95.44 | |
| 150.1 | 71.67 | 75.96 | 80.13 | 84.03 | 87.45 | 90.38 | 92.93 | 95.11 | 96.92 | 98.46 | 99.60 | |
| | 69.85 | 74.17 | 78.34 | 82.23 | 85.60 | 88.49 | 91.01 | 93.18 | 95.06 | 96.89 | 98.64 | |
| (mm) | | | | | | | | | | | | |

DIAMETER D = 316
HEIGHT h = 100
EXPANSION ANGLE λ = 72
BOSS RATIO ν = 0.272

Embodiment 57

Propeller fan 1 having the diameter D=316 mm, the height in the axial direction (z direction) h=100 mm, the number of blades n=5, the expansion angle of a blade λ=108.5 deg, the boss ratio ν=0.272 (boss diameter νD=86 mm) was formed to have a curved surface formed by transforming the curved surface defined by non-dimensionally expressed three-dimensional coordinates specified by Table 202 using a transformation formula 230 below, i.e. a three-dimensional curved surface specified by Table 219.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{20}{29}D(1-\nu) = \frac{20}{29} \times 316 \times (1-0.272) = 158.6\\
&b = -\frac{20}{29}D(1-\nu) \times 0.275 + \frac{\nu D}{2}\\
&\quad = -\frac{20}{29} \times 316 \times (1-0.272) \times 0.275 + \frac{0.272 \times 316}{2}\\
&\quad = -0.62\\
&c = \lambda = \frac{2400}{7} \times \frac{h}{D} = \frac{2400}{7} \times \frac{140}{400} = 108.5\\
&d = 0\\
&e_u = e_d = h = 100\\
&f_u = f_d = 0
\end{aligned}\right\} \quad (230)$$

TABLE 219

| | θ | | | | | | | | | | | | |
|---|---|---|---|---|---|---|---|---|---|---|---|---|---|
| r | 4.521 | 9.042 | 13.56 | 18.08 | 22.6 | 27.13 | 31.65 | 36.17 | 40.69 | 45.21 | 49.73 | 54.25 | 58.77 |
| 46.97 | | | 19.09 | 21.66 | 24.08 | 26.45 | 28.79 | 31.09 | 33.33 | 35.49 | 37.56 | 39.55 | 41.43 |
| | | | 16.78 | 18.40 | 20.02 | 21.64 | 23.26 | 24.93 | 26.68 | 28.53 | 30.43 | 32.37 | 34.30 |
| 54.9 | | 14.73 | 18.14 | 21.24 | 24.17 | 26.98 | 29.66 | 32.21 | 34.63 | 36.96 | 39.19 | 41.32 | 43.29 |
| | | 12.66 | 15.05 | 17.34 | 19.58 | 21.83 | 24.10 | 26.41 | 28.75 | 31.07 | 33.36 | 35.59 | 37.74 |
| 62.83 | 8.78 | 13.30 | 17.20 | 20.79 | 24.17 | 27.37 | 30.38 | 33.22 | 35.91 | 38.47 | 40.91 | 43.21 | 45.29 |
| | 7.60 | 11.01 | 14.14 | 17.09 | 19.91 | 22.66 | 25.37 | 28.03 | 30.66 | 33.22 | 35.68 | 38.03 | 40.27 |
| 70.76 | 7.02 | 11.78 | 16.19 | 20.30 | 24.15 | 27.75 | 31.12 | 34.28 | 37.26 | 40.07 | 42.72 | 45.21 | 47.50 |
| | 5.55 | 9.72 | 13.57 | 17.13 | 20.44 | 23.57 | 26.58 | 29.51 | 32.35 | 35.10 | 37.74 | 40.23 | 42.58 |
| 78.69 | 4.21 | 9.97 | 15.11 | 19.79 | 24.12 | 28.14 | 31.88 | 35.38 | 38.64 | 41.71 | 44.59 | 47.32 | 49.86 |
| | 3.27 | 8.32 | 12.95 | 17.12 | 20.89 | 24.38 | 27.68 | 30.84 | 33.89 | 36.84 | 39.66 | 42.36 | 44.90 |
| 86.62 | 0.99 | 7.94 | 13.88 | 19.17 | 23.98 | 28.42 | 32.53 | 36.35 | 39.91 | 43.22 | 46.35 | 49.30 | 52.11 |
| | 0.65 | 6.63 | 12.02 | 16.80 | 21.08 | 24.97 | 28.57 | 31.97 | 35.22 | 38.35 | 41.36 | 44.27 | 47.07 |
| 94.55 | | 5.57 | 12.29 | 18.17 | 23.48 | 28.34 | 32.83 | 36.99 | 40.86 | 44.46 | 47.85 | 51.05 | 54.10 |
| | | 4.60 | 10.64 | 16.06 | 20.95 | 25.36 | 29.38 | 33.09 | 36.57 | 39.89 | 43.09 | 46.19 | 49.20 |
| 102.5 | | 2.85 | 10.19 | 16.78 | 22.65 | 27.93 | 32.73 | 37.17 | 41.32 | 45.24 | 48.94 | 52.45 | 55.79 |
| | | 2.35 | 9.26 | 15.63 | 21.30 | 26.33 | 30.83 | 34.91 | 38.71 | 42.26 | 45.62 | 48.81 | 51.86 |
| 110.4 | | | 8.19 | 15.64 | 22.14 | 27.87 | 32.99 | 37.65 | 42.00 | 46.11 | 50.02 | 53.72 | 57.29 |
| | | | 7.44 | 14.66 | 20.98 | 26.55 | 31.52 | 36.04 | 40.24 | 44.19 | 47.88 | 51.32 | 54.62 |
| 118.3 | | | 5.78 | 13.96 | 21.21 | 27.66 | 33.41 | 38.56 | 43.21 | 47.52 | 51.61 | 55.56 | 59.36 |
| | | | 5.12 | 12.98 | 20.02 | 26.27 | 31.83 | 36.80 | 41.31 | 45.50 | 49.50 | 53.33 | 57.02 |
| 126.3 | | | | 12.34 | 20.45 | 27.58 | 33.89 | 39.50 | 44.56 | 49.19 | 53.51 | 57.60 | 61.57 |
| | | | | 11.34 | 19.13 | 25.97 | 32.04 | 37.50 | 42.48 | 47.07 | 51.36 | 55.45 | 59.39 |
| 134.2 | | | | 10.77 | 19.72 | 27.48 | 34.25 | 40.23 | 45.62 | 50.57 | 55.18 | 59.53 | 63.71 |
| | | | | 9.82 | 18.33 | 25.69 | 32.22 | 38.07 | 43.39 | 48.31 | 52.91 | 57.28 | 61.51 |
| 142.1 | | | | 8.71 | 18.81 | 27.22 | 34.46 | 40.79 | 46.48 | 51.70 | 56.57 | 61.18 | 65.58 |
| | | | | 8.06 | 17.52 | 25.48 | 32.47 | 38.67 | 44.27 | 49.44 | 54.29 | 58.93 | 63.36 |
| 150.1 | | | | | 17.54 | 26.93 | 34.73 | 41.39 | 47.32 | 52.76 | 57.82 | 62.61 | 67.22 |
| | | | | | 16.60 | 25.53 | 32.99 | 39.46 | 45.30 | 50.68 | 55.74 | 60.59 | 65.32 |
| (mm) | | | | | | | | | | | | | |

| | θ | | | | | | | | | | | |
|---|---|---|---|---|---|---|---|---|---|---|---|---|
| r | 63.29 | 67.81 | 72.33 | 76.85 | 81.38 | 85.9 | 90.42 | 94.94 | 99.46 | 104 | 108.5 | (deg) |
| 46.97 | 43.18 | 44.73 | 45.99 | 46.75 | 46.78 | | | | | | | |
| | 36.20 | 38.09 | 40.02 | 42.09 | 44.51 | | | | | | | |
| 54.9 | 44.96 | 46.14 | 46.51 | | | | | | | | | |
| | 39.88 | 42.08 | 44.54 | | | | | | | | | |
| 62.83 | 47.01 | 48.19 | 48.51 | | | | | | | | | |
| | 42.45 | 44.66 | 47.12 | | | | | | | | | |
| 70.76 | 49.48 | 50.99 | 51.74 | | | | | | | | | |
| | 44.84 | 47.09 | 49.51 | | | | | | | | | |
| 78.69 | 52.18 | 54.14 | 55.56 | 56.07 | | | | | | | | |
| | 47.33 | 49.71 | 52.14 | 54.88 | | | | | | | | |
| 86.62 | 54.75 | 57.14 | 59.12 | 60.47 | | | | | | | | |
| | 49.75 | 52.35 | 54.92 | 57.60 | | | | | | | | |

TABLE 219-continued

| | θ | | | | | | | | | | |
|---|---|---|---|---|---|---|---|---|---|---|---|
| 94.55 | 57.01 | 59.75 | 62.21 | 64.21 | 65.50 | | | | | | |
| | 52.10 | 54.90 | 57.62 | 60.35 | 63.23 | | | | | | |
| 102.5 | 58.96 | 61.96 | 64.79 | 67.34 | 69.42 | 70.69 | | | | | |
| | 54.80 | 57.64 | 60.40 | 63.12 | 65.89 | 68.91 | | | | | |
| 110.4 | 60.72 | 63.98 | 67.06 | 69.96 | 72.59 | 74.74 | 76.08 | | | | |
| | 57.75 | 60.69 | 63.45 | 66.12 | 68.77 | 71.49 | 74.54 | | | | |
| 118.3 | 62.99 | 66.38 | 69.58 | 72.63 | 75.43 | 78.00 | 80.15 | 81.59 | | | |
| | 60.51 | 63.75 | 66.83 | 69.64 | 72.14 | 74.59 | 77.14 | 80.03 | | | |
| 126.3 | 65.42 | 69.09 | 72.49 | 75.59 | 78.51 | 81.31 | 83.71 | 85.64 | 87.06 | | |
| | 63.17 | 66.73 | 69.99 | 72.95 | 75.77 | 78.47 | 80.69 | 82.83 | 85.35 | | |
| 134.2 | 67.77 | 71.72 | 75.41 | 78.75 | 81.72 | 84.38 | 86.93 | 89.27 | 91.24 | 92.53 | |
| | 65.64 | 69.54 | 73.13 | 76.36 | 79.20 | 81.74 | 84.20 | 86.50 | 88.60 | 90.63 | |
| 142.1 | 69.84 | 74.02 | 78.02 | 81.63 | 84.82 | 87.62 | 90.05 | 92.25 | 94.27 | 95.93 | 97.07 |
| | 67.66 | 71.89 | 75.88 | 79.43 | 82.54 | 85.25 | 87.59 | 89.74 | 91.80 | 93.67 | 95.44 |
| 150.1 | 71.67 | 75.96 | 80.13 | 84.03 | 87.45 | 90.38 | 92.93 | 95.11 | 96.92 | 98.46 | 99.60 |
| | 69.85 | 74.17 | 78.34 | 82.23 | 85.60 | 88.49 | 91.01 | 93.18 | 95.06 | 96.89 | 98.64 |
| (mm) | | | | | | | | | | | |

DIAMETER D = 316
HEIGHT h = 100
EXPANSION ANGLE λ = 108.5
BOSS RATIO ν = 0.272

Embodiment 58

Propeller fan 1 having the diameter D=460 mm, the height in the axial direction (z direction) h=161 mm, the number of blades n=3, the expansion angle of a blade λ=120 deg, the boss ratio ν=0.326 (boss diameter νD=150 mm) was formed to have a curved surface formed by transforming the curved surface defined by non-dimensionally expressed three-dimensional coordinates specified by Table 202 using a transformation formula 231 below, i.e. a three-dimensional curved surface specified by Table 220.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a,\ c,\ e_u,\ e_d\text{: factor of proportionality, } b,\ d,\ f_u,\ f_d\text{: constant})\\
&\text{wherein}\\
&a = \frac{20}{29}D(1-\nu) = \frac{20}{29}\times 460\times(1-0.326) = 213.8\\
&b = -\frac{20}{29}D(1-\nu)\times 0.275 + \frac{\nu D}{2}\\
&\quad = -\frac{20}{29}\times 460\times(1-0.326)\times 0.275 + \frac{0.326\times 460}{2}\\
&\quad = 16.21\\
&c = \lambda = \frac{360}{n} = \frac{2400}{7}\times\frac{h}{D} = \frac{2400}{7}\times\frac{161}{460} = 120\\
&d = 0\\
&e_u = e_d = h = 161\\
&f_u = f_d = 0
\end{aligned}\right\} \quad (231)$$

TABLE 220

| | θ | | | | | | | | | | | | | |
|---|---|---|---|---|---|---|---|---|---|---|---|---|---|---|
| r | 5 | 10 | 15 | 20 | 25 | 30 | 35 | 40 | 45 | 50 | 55 | 60 | 65 | 70 |
| 80.34 | | | 30.74 | 34.88 | 38.77 | 42.58 | 46.35 | 50.06 | 53.66 | 57.13 | 60.47 | 63.67 | 66.70 | 69.53 |
| | | | 27.02 | 29.62 | 32.23 | 34.84 | 37.45 | 40.14 | 42.95 | 45.93 | 48.99 | 52.12 | 55.22 | 58.28 |
| 91.03 | | 23.71 | 29.21 | 34.20 | 38.92 | 43.44 | 47.76 | 51.85 | 55.75 | 59.50 | 63.10 | 66.52 | 69.70 | 72.39 |
| | | 20.39 | 24.23 | 27.92 | 31.53 | 35.14 | 38.80 | 42.52 | 46.28 | 50.03 | 53.71 | 57.29 | 60.76 | 64.21 |

TABLE 220-continued

| | θ | | | | | | | | | | | | | |
|---|---|---|---|---|---|---|---|---|---|---|---|---|---|---|
| 101.7 | 14.14 | 21.41 | 27.69 | 33.48 | 38.91 | 44.06 | 48.91 | 53.48 | 57.81 | 61.94 | 65.87 | 69.56 | 72.91 | 75.68 |
| | 12.23 | 17.72 | 22.77 | 27.52 | 32.06 | 36.48 | 40.84 | 45.14 | 49.36 | 53.48 | 57.45 | 61.23 | 64.84 | 68.34 |
| 112.4 | 11.30 | 18.97 | 26.07 | 32.69 | 38.88 | 44.67 | 50.10 | 55.20 | 59.99 | 64.51 | 68.79 | 72.80 | 76.48 | 79.66 |
| | 8.93 | 15.65 | 21.85 | 27.58 | 32.90 | 37.95 | 42.80 | 47.51 | 52.09 | 56.52 | 60.76 | 64.77 | 68.56 | 72.19 |
| 123.1 | 6.78 | 16.05 | 24.33 | 31.87 | 38.83 | 45.30 | 51.33 | 56.95 | 62.21 | 67.15 | 71.80 | 76.18 | 80.28 | 84.01 |
| | 5.26 | 13.40 | 20.85 | 27.56 | 33.64 | 39.26 | 44.57 | 49.66 | 54.57 | 59.31 | 63.86 | 68.20 | 72.29 | 76.20 |
| 133.8 | 1.60 | 12.78 | 22.35 | 30.86 | 38.61 | 45.75 | 52.38 | 58.53 | 64.25 | 69.59 | 74.62 | 79.38 | 83.89 | 88.14 |
| | 1.05 | 10.67 | 19.36 | 27.05 | 33.94 | 40.20 | 46.00 | 51.48 | 56.70 | 61.74 | 66.60 | 71.28 | 75.78 | 80.10 |
| 144.5 | | 8.97 | 19.78 | 29.25 | 37.80 | 45.63 | 52.86 | 59.56 | 65.78 | 71.58 | 77.03 | 82.20 | 87.11 | 91.78 |
| | | 7.41 | 17.13 | 25.86 | 33.73 | 40.83 | 47.31 | 53.27 | 58.88 | 64.23 | 69.38 | 74.37 | 79.21 | 83.89 |
| 155.2 | | 4.58 | 16.41 | 27.01 | 36.47 | 44.96 | 52.70 | 59.85 | 66.53 | 72.83 | 78.79 | 84.45 | 89.83 | 94.93 |
| | | 3.78 | 14.91 | 25.16 | 34.30 | 42.39 | 49.63 | 56.21 | 62.32 | 68.04 | 73.45 | 78.59 | 83.50 | 88.22 |
| 165.9 | | | 13.19 | 25.19 | 35.65 | 44.87 | 53.11 | 60.62 | 67.62 | 74.24 | 80.54 | 86.49 | 92.24 | 97.76 |
| | | | 11.98 | 23.60 | 33.78 | 42.75 | 50.75 | 58.03 | 64.79 | 71.14 | 77.09 | 82.63 | 87.94 | 92.98 |
| 176.6 | | | 9.31 | 22.47 | 34.14 | 44.54 | 53.79 | 62.08 | 69.57 | 76.50 | 83.09 | 89.44 | 95.58 | 101.41 |
| | | | 8.24 | 20.90 | 32.23 | 42.30 | 51.24 | 59.25 | 66.51 | 73.26 | 79.69 | 85.87 | 91.81 | 97.42 |
| 187.2 | | | | 19.87 | 32.92 | 44.41 | 54.56 | 63.60 | 71.74 | 79.20 | 86.15 | 92.74 | 99.13 | 105.33 |
| | | | | 18.26 | 30.80 | 41.82 | 51.59 | 60.38 | 68.39 | 75.79 | 82.69 | 89.27 | 95.62 | 101.70 |
| 197.9 | | | | 17.35 | 31.75 | 44.25 | 55.14 | 64.77 | 73.45 | 81.42 | 88.83 | 95.85 | 102.57 | 109.12 |
| | | | | 15.81 | 29.51 | 41.37 | 51.87 | 61.30 | 69.86 | 77.77 | 85.19 | 92.22 | 99.03 | 105.68 |
| 208.6 | | | | 14.02 | 30.28 | 43.83 | 55.48 | 65.67 | 74.83 | 83.24 | 91.08 | 98.50 | 105.59 | 112.45 |
| | | | | 12.98 | 28.20 | 41.03 | 52.28 | 62.26 | 71.28 | 79.60 | 87.41 | 94.87 | 102.01 | 108.93 |
| 219.3 | | | | | 28.24 | 43.36 | 55.91 | 66.64 | 76.18 | 84.94 | 93.09 | 100.80 | 108.22 | 115.38 |
| | | | | | 26.72 | 41.10 | 53.12 | 63.53 | 72.94 | 81.60 | 89.73 | 97.55 | 105.16 | 112.46 |
| (mm) | | | | | | | | | | | | | | |

| | θ | | | | | | | | | | |
|---|---|---|---|---|---|---|---|---|---|---|---|
| r | 75 | 80 | 85 | 90 | 95 | 100 | 105 | 110 | 115 | 120 | (deg) |
| 80.34 | 72.02 | 74.04 | 75.27 | 75.32 | | | | | | | |
| | 61.33 | 64.43 | 67.76 | 71.67 | | | | | | | |
| 91.03 | 74.29 | 74.89 | | | | | | | | | |
| | 67.76 | 71.72 | | | | | | | | | |
| 101.7 | 77.58 | 78.10 | | | | | | | | | |
| | 71.91 | 75.86 | | | | | | | | | |
| 112.4 | 82.09 | 83.31 | | | | | | | | | |
| | 75.82 | 79.70 | | | | | | | | | |
| 123.1 | 87.17 | 89.46 | 90.28 | | | | | | | | |
| | 80.03 | 83.95 | 88.36 | | | | | | | | |
| 133.8 | 91.99 | 95.18 | 97.35 | | | | | | | | |
| | 84.28 | 88.42 | 92.74 | | | | | | | | |
| 144.5 | 96.19 | 100.15 | 103.38 | 105.45 | | | | | | | |
| | 88.40 | 92.77 | 97.16 | 101.80 | | | | | | | |
| 155.2 | 99.76 | 104.32 | 108.42 | 111.77 | 113.81 | | | | | | |
| | 92.80 | 97.24 | 101.63 | 106.08 | 110.95 | | | | | | |
| 165.9 | 103.01 | 107.96 | 112.63 | 116.86 | 120.32 | 122.49 | | | | | |
| | 97.71 | 102.15 | 106.46 | 110.72 | 115.09 | 120.02 | | | | | |
| 176.6 | 106.87 | 112.03 | 116.93 | 121.44 | 125.58 | 129.03 | 131.36 | | | | |
| | 102.64 | 107.59 | 112.12 | 116.15 | 120.09 | 124.19 | 128.84 | | | | |
| 187.2 | 111.24 | 116.71 | 121.70 | 126.40 | 130.91 | 134.78 | 137.88 | 140.17 | | | |
| | 107.44 | 112.69 | 117.45 | 121.99 | 126.33 | 129.91 | 133.36 | 137.42 | | | |
| 197.9 | 115.47 | 121.40 | 126.79 | 131.56 | 135.85 | 139.95 | 143.72 | 146.89 | 148.97 | | |
| | 111.97 | 117.73 | 122.93 | 127.51 | 131.60 | 135.56 | 139.27 | 142.64 | 145.91 | | |
| 208.6 | 119.18 | 125.61 | 131.42 | 136.56 | 141.06 | 144.98 | 148.53 | 151.77 | 154.44 | 156.28 | |
| | 115.74 | 122.17 | 127.88 | 132.89 | 137.25 | 141.02 | 144.48 | 147.79 | 150.80 | 153.65 | |
| 219.3 | 122.30 | 129.01 | 135.29 | 140.79 | 145.52 | 149.62 | 153.12 | 156.04 | 158.52 | 160.36 | |
| | 119.41 | 126.13 | 132.39 | 137.81 | 142.47 | 146.52 | 150.01 | 153.05 | 156.00 | 158.82 | |
| (mm) | | | | | | | | | | | |

DIAMETER D = 460
HEIGHT h = 161
EXPANSION ANGLE λ = 120
BOSS RATIO ν = 0.326

Embodiment 59

Propeller fan 1 having the diameter D=460 mm, the height in the axial direction (z direction) h=168 mm, the number of blades n=3, the expansion angle of a blade λ=120 deg, the boss ratio ν=0.326 (boss diameter νD=150 mm) was formed to have a curved surface formed by transforming the curved surface defined by non-dimensionally expressed three-dimensional coordinates specified by Table 202 using a transformation formula 232 below, i.e. a three-dimensional curved surface specified by Table 221.

$$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = \frac{20}{29}D(1-\nu) = \frac{20}{29} \times 460 \times (1 - 0.326) = 213.8\\
&b = -\frac{20}{29}D(1-\nu) \times 0.275 + \frac{\nu D}{2}\\
&\quad = -\frac{20}{29} \times 460 \times (1 - 0.326) \times 0.275 + \frac{0.326 \times 460}{2}\\
&\quad = 16.21\\
&c = \lambda = \frac{2400}{7} \times \frac{h}{D} = \frac{2400}{7} \times \frac{168}{460} = 125.2\\
&d = 0\\
&e_u = e_d = h = 168\\
&f_u = f_d = 0
\end{aligned}\right\} \quad (232)$$

TABLE 221

| | θ | | | | | | | | | | | | | |
|---|---|---|---|---|---|---|---|---|---|---|---|---|---|---|
| r | 5.217 | 10.43 | 15.65 | 20.87 | 26.08 | 31.3 | 36.52 | 41.73 | 46.95 | 52.17 | 57.38 | 62.6 | 67.82 | 73.03 |
| 80.34 | | | 32.08 | 36.39 | 40.46 | 44.43 | 48.37 | 52.24 | 55.99 | 59.62 | 63.10 | 66.44 | 69.60 | 72.55 |
| | | | 28.20 | 30.91 | 33.63 | 36.35 | 39.08 | 41.88 | 44.82 | 47.92 | 51.12 | 54.38 | 57.62 | 60.82 |
| 91.03 | | 24.74 | 30.47 | 35.69 | 40.61 | 45.33 | 49.83 | 54.11 | 58.18 | 62.09 | 65.84 | 69.41 | 72.73 | 75.53 |
| | | 21.28 | 25.28 | 29.13 | 32.90 | 36.67 | 40.48 | 44.37 | 48.29 | 52.20 | 56.05 | 59.78 | 63.40 | 67.00 |
| 101.7 | 14.76 | 22.34 | 28.90 | 34.93 | 40.60 | 45.98 | 51.04 | 55.80 | 60.32 | 64.63 | 68.73 | 72.59 | 76.08 | 78.97 |
| | 12.76 | 18.49 | 23.76 | 28.72 | 33.45 | 38.07 | 42.61 | 47.10 | 51.51 | 55.81 | 59.95 | 63.89 | 67.66 | 71.32 |
| 112.4 | 11.80 | 19.80 | 27.20 | 34.11 | 40.57 | 46.61 | 52.28 | 57.60 | 62.59 | 67.32 | 71.78 | 75.96 | 79.81 | 83.12 |
| | 9.32 | 16.33 | 22.80 | 28.78 | 34.33 | 39.60 | 44.66 | 49.57 | 54.35 | 58.97 | 63.40 | 67.59 | 71.54 | 75.33 |
| 123.1 | 7.08 | 16.75 | 25.39 | 33.25 | 40.52 | 47.27 | 53.56 | 59.43 | 64.91 | 70.07 | 74.92 | 79.49 | 83.77 | 87.66 |
| | 5.49 | 13.98 | 21.76 | 28.76 | 35.10 | 40.96 | 46.51 | 51.81 | 56.94 | 61.89 | 66.64 | 71.16 | 75.44 | 79.52 |
| 133.8 | 1.67 | 13.33 | 23.32 | 32.20 | 40.29 | 47.74 | 54.66 | 61.07 | 67.04 | 72.62 | 77.86 | 82.83 | 87.54 | 91.97 |
| | 1.10 | 11.13 | 20.20 | 28.23 | 35.41 | 41.95 | 48.00 | 53.72 | 59.17 | 64.42 | 69.49 | 74.38 | 79.07 | 83.58 |
| 144.5 | | 9.36 | 20.64 | 30.52 | 39.44 | 47.62 | 55.16 | 62.15 | 68.64 | 74.70 | 80.38 | 85.77 | 90.89 | 95.77 |
| | | 7.73 | 17.87 | 26.99 | 35.19 | 42.61 | 49.36 | 55.59 | 61.44 | 67.02 | 72.40 | 77.61 | 82.65 | 87.54 |
| 155.2 | | 4.78 | 17.13 | 28.18 | 38.06 | 46.92 | 54.99 | 62.45 | 69.42 | 76.00 | 82.22 | 88.12 | 93.73 | 99.05 |
| | | 3.94 | 15.56 | 26.26 | 35.79 | 44.24 | 51.79 | 58.66 | 65.03 | 71.00 | 76.64 | 82.00 | 87.13 | 92.06 |
| 165.9 | | | 13.77 | 26.28 | 37.20 | 46.82 | 55.42 | 63.25 | 70.56 | 77.47 | 84.04 | 90.25 | 96.25 | 102.01 |
| | | | 12.50 | 24.62 | 35.25 | 44.61 | 52.96 | 60.56 | 67.61 | 74.24 | 80.44 | 86.22 | 91.76 | 97.03 |
| 176.6 | | | 9.72 | 23.45 | 35.63 | 46.47 | 56.13 | 64.78 | 72.60 | 79.83 | 86.70 | 93.33 | 99.73 | 105.82 |
| | | | 8.60 | 21.80 | 33.63 | 44.14 | 53.47 | 61.82 | 69.40 | 76.44 | 83.15 | 89.60 | 95.80 | 101.66 |
| 187.2 | | | | 20.73 | 34.35 | 46.34 | 56.93 | 66.36 | 74.86 | 82.64 | 89.90 | 96.77 | 103.44 | 109.91 |
| | | | | 19.05 | 32.14 | 43.64 | 53.84 | 63.00 | 71.36 | 79.08 | 86.29 | 93.15 | 99.77 | 106.13 |
| 197.9 | | | | 18.10 | 33.13 | 46.17 | 57.54 | 67.58 | 76.65 | 84.96 | 92.70 | 100.01 | 107.03 | 113.86 |
| | | | | 16.49 | 30.79 | 43.17 | 54.13 | 63.96 | 72.90 | 81.16 | 88.89 | 96.23 | 103.33 | 110.27 |
| 208.6 | | | | 14.63 | 31.59 | 45.74 | 57.89 | 68.53 | 78.08 | 86.86 | 95.04 | 102.78 | 110.18 | 117.34 |
| | | | | 13.55 | 29.43 | 42.81 | 54.55 | 64.96 | 74.38 | 83.06 | 91.22 | 98.99 | 106.45 | 113.67 |
| 219.3 | | | | | 29.47 | 45.25 | 58.34 | 69.54 | 79.50 | 88.63 | 97.14 | 105.18 | 112.93 | 120.40 |
| | | | | | 27.88 | 42.88 | 55.43 | 66.30 | 76.11 | 85.15 | 93.64 | 101.79 | 109.73 | 117.35 |
| (mm) | | | | | | | | | | | | | | |

| | θ | | | | | | | | | | |
|---|---|---|---|---|---|---|---|---|---|---|---|
| r | 78.25 | 83.47 | 88.68 | 93.9 | 99.12 | 104.3 | 109.6 | 114.8 | 120 | 125.2 | (deg) |
| 80.34 | 75.15 | 77.26 | 78.55 | 78.60 | | | | | | | |
| | 64.00 | 67.23 | 70.71 | 74.78 | | | | | | | |
| 91.03 | 77.52 | 78.14 | | | | | | | | | |
| | 70.70 | 74.83 | | | | | | | | | |
| 101.7 | 80.95 | 81.49 | | | | | | | | | |
| | 75.03 | 79.16 | | | | | | | | | |
| 112.4 | 85.66 | 86.93 | | | | | | | | | |
| | 79.11 | 83.17 | | | | | | | | | |
| 123.1 | 90.96 | 93.35 | 94.20 | | | | | | | | |
| | 83.51 | 87.60 | 92.20 | | | | | | | | |
| 133.8 | 95.99 | 99.32 | 101.58 | | | | | | | | |
| | 87.94 | 92.26 | 96.77 | | | | | | | | |

TABLE 221-continued

| | θ | | | | | | | | | |
|---|---|---|---|---|---|---|---|---|---|---|
| 144.5 | 100.37 | 104.51 | 107.88 | 110.04 | | | | | | |
| | 92.24 | 96.80 | 101.38 | 106.23 | | | | | | |
| 155.2 | 104.10 | 108.85 | 113.14 | 116.63 | 118.76 | | | | | |
| | 96.83 | 101.47 | 106.04 | 110.69 | 115.77 | | | | | |
| 165.9 | 107.49 | 112.65 | 117.52 | 121.94 | 125.56 | 127.82 | | | | |
| | 101.96 | 106.60 | 111.09 | 115.54 | 120.10 | 125.23 | | | | |
| 176.6 | 111.52 | 116.90 | 122.01 | 126.72 | 131.04 | 134.64 | 137.07 | | | |
| | 107.11 | 112.27 | 117.00 | 121.20 | 125.31 | 129.59 | 134.44 | | | |
| 187.2 | 116.08 | 121.78 | 126.99 | 131.90 | 136.60 | 140.64 | 143.88 | 146.27 | | |
| | 112.11 | 117.58 | 122.56 | 127.29 | 131.83 | 135.56 | 139.16 | 143.39 | | |
| 197.9 | 120.49 | 126.68 | 132.30 | 137.28 | 141.76 | 146.04 | 149.97 | 153.28 | 155.44 | |
| | 116.83 | 122.85 | 128.28 | 133.06 | 137.32 | 141.45 | 145.32 | 148.84 | 152.25 | |
| 208.6 | 124.36 | 131.07 | 137.13 | 142.50 | 147.20 | 151.29 | 154.98 | 158.37 | 161.16 | 163.08 |
| | 120.78 | 127.48 | 133.44 | 138.66 | 143.22 | 147.15 | 150.76 | 154.22 | 157.36 | 160.33 |
| 219.3 | 127.61 | 134.62 | 141.18 | 146.91 | 151.85 | 156.13 | 159.78 | 162.82 | 165.42 | 167.33 |
| | 124.60 | 131.61 | 138.14 | 143.80 | 148.66 | 152.89 | 156.54 | 159.70 | 162.78 | 165.72 |
| (mm) | | | | | | | | | | |

DIAMETER D = 460
HEIGHT h = 168
EXPANISON ANGLE λ = 125.2
BOSS RATIO ν = 0.326

Embodiment 60

Propeller fan 1 having the diameter D=460 mm, the height in the axial direction (z direction) h=140 mm, the number of blades n=3, the expansion angle of a blade λ=120 deg, the boss ratio ν=0.326 (boss diameter νD=150 mm) was formed to have a curved surface formed by transforming the curved surface defined by non-dimensionally expressed three-dimensional coordinates specified by Table 202 using a transformation formula 233 below, i.e. a three-dimensional curved surface specified by Table 222.

$$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = \frac{20}{29}D(1-\nu) = \frac{20}{29}\times 460\times(1-0.326) = 213.8\\
&b = -\frac{20}{29}D(1-\nu)\times 0.275 + \frac{\nu D}{2}\\
&\quad = -\frac{20}{29}\times 460\times(1-0.326)\times 0.275 + \frac{0.326\times 460}{2}\\
&\quad = 16.21\\
&c = \lambda = \frac{2400}{7}\times\frac{h}{D} = \frac{2400}{7}\times\frac{140}{460} = 104.3\\
&d = 0\\
&e_u = e_d = h = 140\\
&f_u = f_d = 0
\end{aligned}\right\}\quad (233)$$

TABLE 222

| | θ | | | | | | | | | | | | | |
|---|---|---|---|---|---|---|---|---|---|---|---|---|---|---|
| r | 4.346 | 8.692 | 13.04 | 17.38 | 21.73 | 26.08 | 30.42 | 34.77 | 39.11 | 43.46 | 47.8 | 52.15 | 56.5 | 60.84 |
| 80.34 | | | 26.73 | 30.33 | 33.72 | 37.03 | 40.30 | 43.53 | 46.66 | 49.68 | 52.58 | 55.37 | 58.00 | 60.46 |
| | | | 23.50 | 25.75 | 28.03 | 30.30 | 32.56 | 34.90 | 37.35 | 39.94 | 42.60 | 45.32 | 48.02 | 50.68 |
| 91.03 | | 20.62 | 25.40 | 29.74 | 33.84 | 37.77 | 41.53 | 45.09 | 48.48 | 51.74 | 54.87 | 57.84 | 60.61 | 62.95 |
| | | 17.73 | 21.07 | 24.27 | 27.42 | 30.56 | 33.74 | 36.97 | 40.24 | 43.50 | 46.71 | 49.82 | 52.84 | 55.83 |

TABLE 222-continued

| | θ | | | | | | | | | | | | | |
|---|---|---|---|---|---|---|---|---|---|---|---|---|---|---|
| 101.7 | 12.30 | 18.62 | 24.08 | 29.11 | 33.83 | 38.32 | 42.53 | 46.50 | 50.27 | 53.86 | 57.28 | 60.49 | 63.40 | 65.81 |
| | 10.63 | 15.41 | 19.80 | 23.93 | 27.88 | 31.72 | 35.51 | 39.25 | 42.92 | 46.51 | 49.96 | 53.24 | 56.38 | 59.43 |
| 112.4 | 9.83 | 16.50 | 22.67 | 28.43 | 33.81 | 38.84 | 43.57 | 48.00 | 52.16 | 56.10 | 59.81 | 63.30 | 66.51 | 69.27 |
| | 7.77 | 13.61 | 19.00 | 23.98 | 28.61 | 33.00 | 37.22 | 41.31 | 45.29 | 49.14 | 52.83 | 56.33 | 59.61 | 62.78 |
| 123.1 | 5.90 | 13.96 | 21.16 | 27.71 | 33.76 | 39.39 | 44.64 | 49.53 | 54.10 | 58.39 | 62.43 | 66.24 | 69.81 | 73.05 |
| | 4.58 | 11.65 | 18.13 | 23.96 | 29.25 | 34.14 | 38.76 | 43.18 | 47.45 | 51.57 | 55.53 | 59.30 | 62.87 | 66.26 |
| 133.8 | 1.39 | 11.11 | 19.43 | 26.84 | 33.57 | 36.79 | 45.55 | 50.89 | 55.87 | 60.51 | 64.89 | 69.03 | 72.95 | 76.65 |
| | 0.92 | 9.28 | 16.83 | 23.52 | 29.51 | 34.96 | 40.00 | 44.76 | 49.31 | 53.69 | 57.91 | 61.98 | 65.90 | 69.65 |
| 144.5 | | 7.80 | 17.20 | 25.43 | 32.87 | 39.68 | 45.97 | 51.79 | 57.20 | 62.25 | 66.99 | 71.48 | 75.74 | 79.81 |
| | | 6.45 | 14.90 | 22.49 | 29.33 | 35.51 | 41.14 | 46.33 | 51.20 | 55.85 | 60.33 | 64.67 | 68.88 | 72.95 |
| 155.2 | | 3.98 | 14.27 | 23.49 | 31.72 | 39.10 | 45.82 | 52.04 | 57.85 | 63.33 | 68.52 | 73.44 | 78.11 | 82.55 |
| | | 3.28 | 12.97 | 21.88 | 29.83 | 36.87 | 43.16 | 48.88 | 54.19 | 59.17 | 63.87 | 68.33 | 72.61 | 76.72 |
| 165.9 | | | 11.47 | 21.90 | 31.00 | 39.01 | 46.18 | 52.71 | 58.80 | 64.56 | 70.03 | 75.21 | 80.21 | 85.01 |
| | | | 10.41 | 20.52 | 29.37 | 37.17 | 44.13 | 50.46 | 56.34 | 61.86 | 67.04 | 71.85 | 76.47 | 80.86 |
| 176.6 | | | 8.10 | 19.54 | 29.69 | 38.73 | 46.78 | 53.98 | 60.50 | 66.52 | 72.25 | 77.78 | 83.11 | 88.18 |
| | | | 7.17 | 18.17 | 28.03 | 36.78 | 44.56 | 51.52 | 57.83 | 63.70 | 69.29 | 74.67 | 79.83 | 84.71 |
| 187.2 | | | | 17.27 | 28.63 | 38.62 | 47.45 | 55.30 | 62.39 | 68.87 | 74.92 | 80.64 | 86.20 | 91.59 |
| | | | | 15.88 | 26.78 | 36.36 | 44.86 | 52.50 | 59.47 | 65.90 | 71.91 | 77.62 | 83.14 | 88.44 |
| 197.9 | | | | 15.08 | 27.61 | 38.48 | 47.95 | 56.32 | 63.87 | 70.80 | 77.25 | 83.34 | 89.19 | 94.88 |
| | | | | 13.74 | 25.66 | 35.97 | 45.11 | 53.30 | 60.75 | 67.63 | 74.08 | 80.19 | 86.11 | 91.90 |
| 208.6 | | | | 12.19 | 26.33 | 38.11 | 48.24 | 57.10 | 65.07 | 72.38 | 79.20 | 85.65 | 91.82 | 97.78 |
| | | | | 11.29 | 24.52 | 35.68 | 45.46 | 54.14 | 61.98 | 69.21 | 76.01 | 82.50 | 88.70 | 94.72 |
| 219.3 | | | | | 24.56 | 37.70 | 48.62 | 57.95 | 66.25 | 73.86 | 80.95 | 87.65 | 94.11 | 100.33 |
| | | | | | 23.24 | 35.74 | 46.19 | 55.25 | 63.42 | 70.96 | 78.03 | 84.82 | 91.44 | 97.79 |
| (mm) | | | | | | | | | | | | | | |

| | θ | | | | | | | | | | |
|---|---|---|---|---|---|---|---|---|---|---|---|
| r | 65.19 | 69.53 | 73.88 | 78.23 | 82.57 | 86.92 | 91.26 | 95.61 | 99.95 | 104.3 | (deg) |
| 80.34 | 62.63 | 64.38 | 65.45 | 65.50 | | | | | | | |
| | 53.33 | 56.03 | 58.92 | 62.32 | | | | | | | |
| 91.03 | 64.60 | 65.12 | | | | | | | | | |
| | 58.92 | 62.36 | | | | | | | | | |
| 101.7 | 67.46 | 67.91 | | | | | | | | | |
| | 62.53 | 65.97 | | | | | | | | | |
| 112.4 | 71.39 | 72.44 | | | | | | | | | |
| | 65.93 | 69.31 | | | | | | | | | |
| 123.1 | 75.80 | 77.79 | 78.50 | | | | | | | | |
| | 69.59 | 73.00 | 76.83 | | | | | | | | |
| 133.8 | 79.99 | 82.76 | 84.65 | | | | | | | | |
| | 73.28 | 76.89 | 80.65 | | | | | | | | |
| 144.5 | 83.65 | 87.09 | 89.90 | 91.70 | | | | | | | |
| | 76.87 | 80.67 | 84.48 | 88.52 | | | | | | | |
| 155.2 | 86.75 | 90.71 | 94.28 | 97.19 | 98.97 | | | | | | |
| | 80.69 | 84.56 | 88.37 | 92.24 | 96.48 | | | | | | |
| 165.9 | 89.57 | 93.88 | 97.94 | 101.62 | 104.63 | 106.51 | | | | | |
| | 84.96 | 88.83 | 92.57 | 96.28 | 100.08 | 104.36 | | | | | |
| 176.6 | 92.93 | 97.42 | 101.68 | 105.60 | 109.20 | 112.20 | 114.22 | | | | |
| | 89.26 | 93.56 | 97.50 | 101.00 | 104.43 | 107.99 | 112.04 | | | | |
| 187.2 | 96.73 | 101.49 | 105.83 | 109.92 | 113.83 | 117.20 | 119.90 | 121.89 | | | |
| | 93.42 | 97.99 | 102.13 | 106.08 | 109.86 | 112.97 | 115.97 | 119.49 | | | |
| 197.9 | 100.41 | 105.57 | 110.25 | 114.40 | 118.13 | 121.70 | 124.98 | 127.73 | 129.54 | | |
| | 97.36 | 102.38 | 106.90 | 110.88 | 114.44 | 117.87 | 121.10 | 124.04 | 126.88 | | |
| 208.6 | 103.63 | 109.23 | 114.28 | 118.75 | 122.66 | 126.07 | 129.15 | 131.98 | 134.30 | 135.90 | |
| | 100.65 | 106.24 | 111.20 | 115.55 | 119.35 | 122.62 | 125.63 | 128.52 | 131.13 | 133.61 | |
| 219.3 | 106.35 | 112.19 | 117.65 | 122.43 | 126.54 | 130.11 | 133.15 | 135.68 | 137.85 | 139.45 | |
| | 103.84 | 109.68 | 115.12 | 119.84 | 123.88 | 127.41 | 130.45 | 133.09 | 135.65 | 138.10 | |
| (mm) | | | | | | | | | | | |

DIAMETER D = 460
HEIGHT h = 140
EXPANSION ANGLE λ = 104.3
BOSS RATIO ν = 0.326

Figure 24:
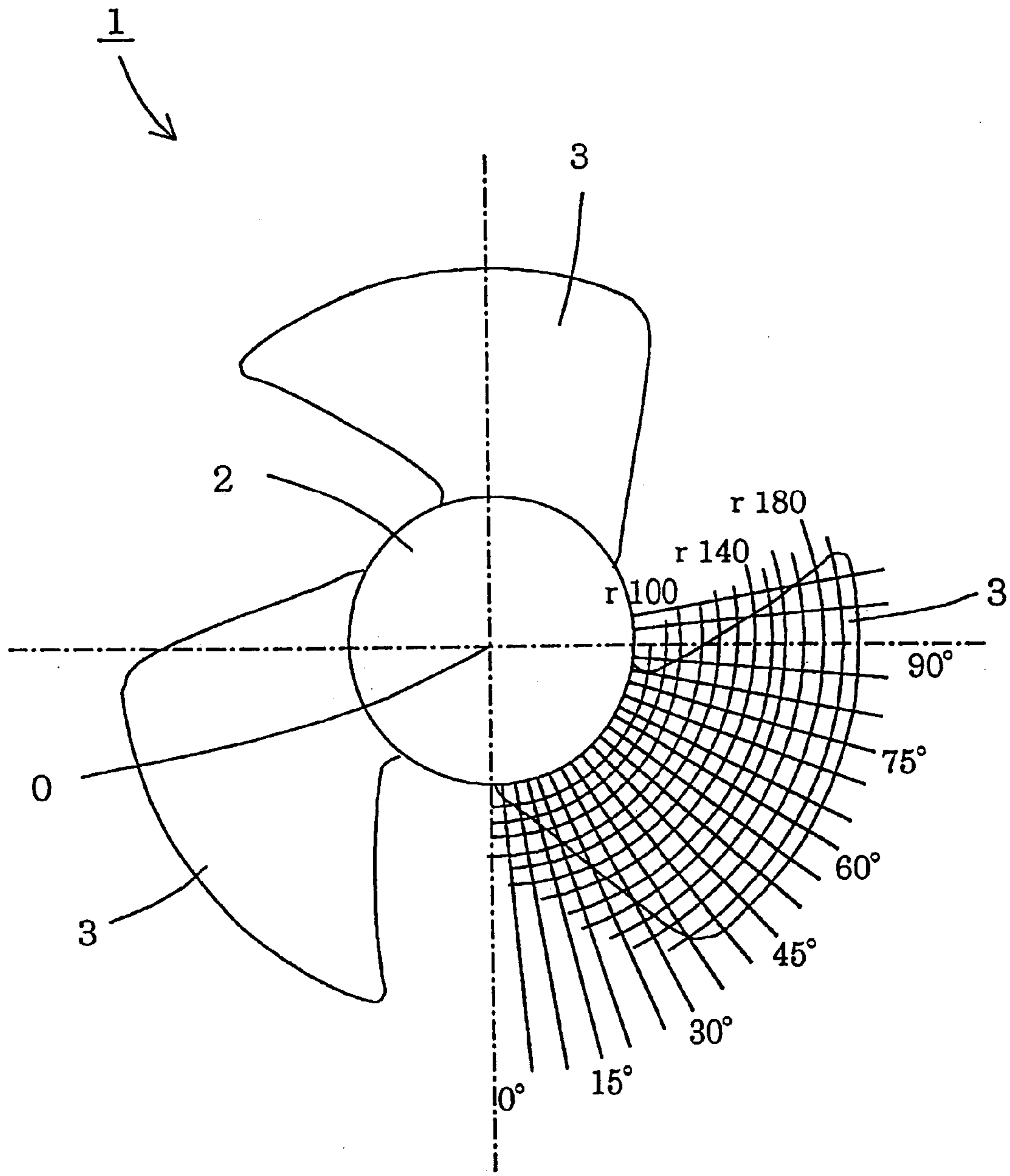
FIG. 24 is a front view of a propeller fan in Comparison Example 7.
Figure 25:
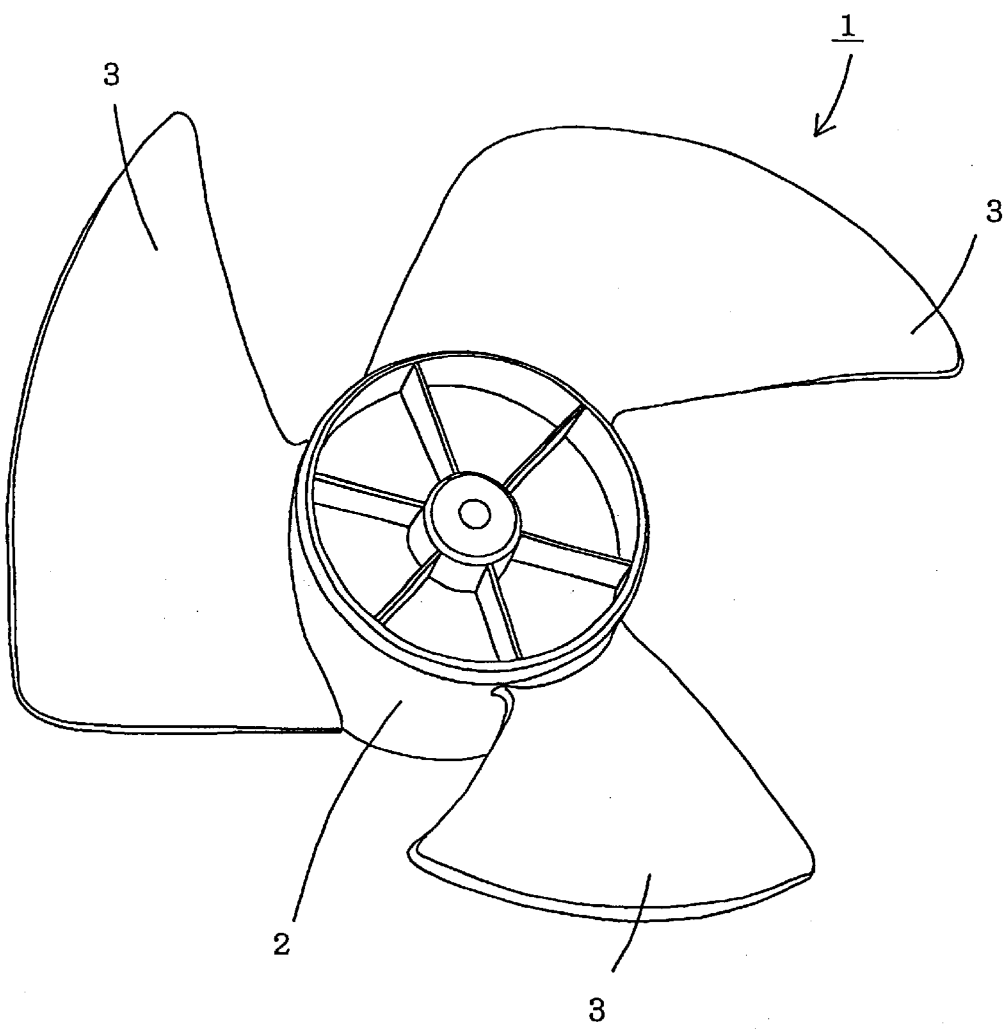
FIG. 25 is a perspective view of (the negative pressure surface side of) the propeller fan in Comparison Example 7.
Figure 26:
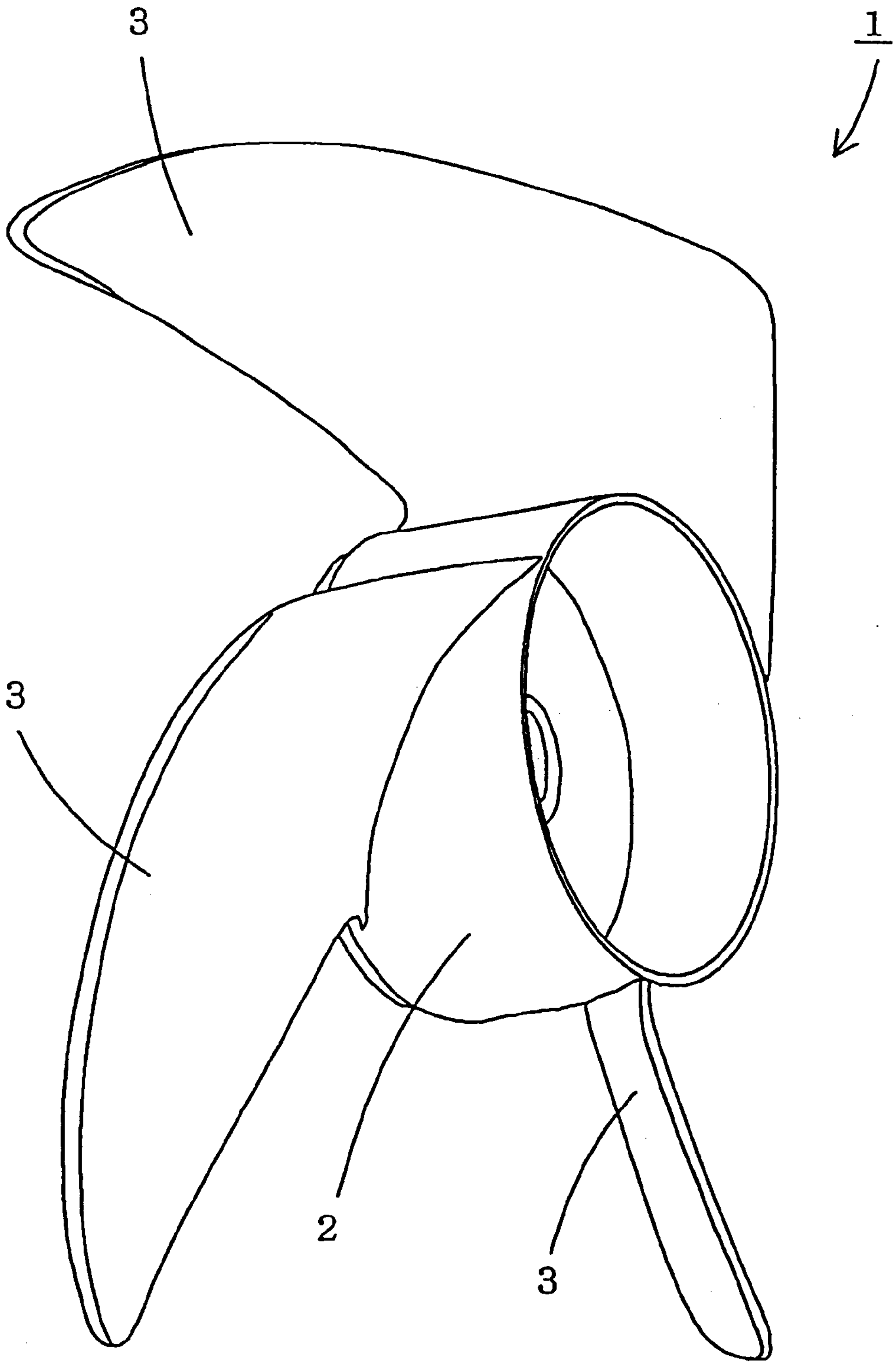
FIG. 26 is a perspective view of (the positive pressure surface side of) the propeller fan in Comparison Example 7.

Comparison examples of the present invention will be described below with reference to FIGS. 24 to 26. FIG. 24 is a front view of a propeller fan in Comparison Example 7, whereas FIGS. 25 and 26 are perspective views of the propeller fan in Comparison Example 7.

Comparison Example 7

Propeller fan 1 shown in FIG. 24 having the diameter D=400 mm, the height in the axial direction (z direction) h=140 mm, the number of blades n=3, the boss ratio ν=0.35 (boss diameter νD=140 mm) was formed such that the surface of blade 3 is a three-dimensional curved surface specified by Table 223 below. A boss portion is denoted by 2 in the drawings. Note that r, θ, z are set as in Embodiment 41.

TABLE 223

COMPARISON EXAMPLE 7

| r | θ 10° | 15° | 20° | 25° | 30° | 35° | 40° | 45° | 50° | 55° | 60° | 65° |
|---|---|---|---|---|---|---|---|---|---|---|---|---|
| r 80 | 11.73 | 19.10 | 25.44 | 30.60 | 35.31 | 39.90 | 44.45 | 48.84 | 53.00 | 56.91 | 60.54 | 63.79 |
| | 6.47 | 13.00 | 19.27 | 24.95 | 29.81 | 34.29 | 38.60 | 42.80 | 46.92 | 50.95 | 54.90 | 58.74 |
| r 90 | | 12.73 | 20.94 | 27.79 | 33.67 | 39.12 | 44.39 | 49.38 | 54.09 | 58.55 | 62.71 | 66.45 |
| | | 7.72 | 15.35 | 22.37 | 28.82 | 34.15 | 39.00 | 43.69 | 48.20 | 52.63 | 56.99 | 61.24 |
| r 100 | | | 16.09 | 24.55 | 31.82 | 38.32 | 44.30 | 50.03 | 55.39 | 60.47 | 65.25 | 69.55 |
| | | | 11.10 | 19.49 | 27.06 | 33.78 | 39.34 | 44.59 | 49.60 | 54.42 | 59.19 | 63.83 |
| r 110 | | | | 21.17 | 29.78 | 37.40 | 44.32 | 50.81 | 56.89 | 62.60 | 67.99 | 72.88 |
| | | | 6.47 | 16.35 | 25.27 | 32.95 | 39.56 | 45.48 | 51.16 | 56.38 | 61.52 | 66.48 |
| r 120 | | | | 16.62 | 27.71 | 36.46 | 44.43 | 51.73 | 58.63 | 65.02 | 70.96 | 76.44 |
| | | | | 12.48 | 23.19 | 32.11 | 39.60 | 46.35 | 52.75 | 58.54 | 64.01 | 69.27 |
| r 130 | | | | | 25.07 | 35.42 | 44.45 | 52.76 | 60.49 | 67.60 | 74.14 | 80.18 |
| | | | | | 20.47 | 30.82 | 39.57 | 47.10 | 54.26 | 60.75 | 66.61 | 72.15 |
| r 140 | | | | | 21.38 | 34.00 | 44.38 | 53.67 | 62.26 | 70.13 | 77.30 | 83.88 |
| | | | | | 16.83 | 29.05 | 39.13 | 47.59 | 55.60 | 62.95 | 69.35 | 75.17 |
| r 150 | | | | | 15.39 | 31.83 | 43.84 | 54.32 | 63.84 | 72.47 | 80.37 | 87.60 |
| | | | | | 12.94 | 26.57 | 38.27 | 47.91 | 56.81 | 64.97 | 72.10 | 78.38 |
| r 160 | | | | | | 29.55 | 43.21 | 54.64 | 65.14 | 74.33 | 82.96 | 90.49 |
| | | | | | | 23.69 | 37.38 | 48.40 | 57.93 | 66.86 | 74.86 | 81.82 |
| r 170 | | | | | | 27.10 | 42.68 | 55.44 | 66.28 | 75.62 | 84.39 | 92.42 |
| | | | | | | 21.19 | 36.26 | 48.76 | 59.06 | 68.53 | 77.20 | 85.22 |
| r 180 | | | | | | 21.52 | 42.14 | 56.11 | 67.43 | 77.37 | 86.87 | 95.58 |
| | | | | | | 19.14 | 35.30 | 49.17 | 60.36 | 70.38 | 79.63 | 88.20 |
| (mm) | | | | | | | | | | | | |

| r | θ 70° | 75° | 80° | 85° | 90° | 95° | 100° |
|---|---|---|---|---|---|---|---|
| r 80 | 66.69 | | | | | | |
| | 62.24 | 65.73 | | | | | |
| r 90 | 69.78 | 72.78 | | | | | |
| | 65.20 | 69.05 | 72.74 | | | | |
| r 100 | 73.43 | 76.96 | | | | | |
| | 68.22 | 72.41 | 76.43 | 79.97 | | | |
| r 110 | 77.34 | 81.37 | 84.91 | | | | |
| | 71.29 | 75.84 | 80.24 | 84.27 | | | |
| r 120 | 81.49 | 86.04 | 90.12 | 93.56 | | | |
| | 74.42 | 79.38 | 84.27 | 88.88 | 92.94 | | |
| r 130 | 85.76 | 90.79 | 95.43 | 99.34 | | | |
| | 77.63 | 83.00 | 88.46 | 93.70 | 98.22 | | |
| r 140 | 90.14 | 95.73 | 100.80 | 105.22 | 108.78 | | |
| | 80.99 | 86.79 | 92.74 | 98.44 | 103.48 | 107.80 | |
| r 150 | 94.28 | 100.52 | 106.07 | 110.94 | 114.95 | | |
| | 84.69 | 90.96 | 97.16 | 103.19 | 108.58 | 113.56 | |
| r 160 | 97.62 | 104.34 | 110.63 | 116.05 | 120.85 | 124.87 | |
| | 88.68 | 95.47 | 101.96 | 108.15 | 113.87 | 119.15 | 123.49 |
| r 170 | 100.19 | 107.31 | 114.13 | 120.38 | 126.11 | 130.86 | |
| | 92.83 | 99.88 | 106.68 | 113.09 | 119.02 | 124.38 | 128.87 |
| r 180 | 103.50 | 111.06 | 118.11 | 124.80 | 130.98 | 136.36 | 140.79 |
| | 96.29 | 103.91 | 110.87 | 117.74 | 123.88 | 129.55 | 134.46 |
| (mm) | | | | | | | |

Comparison Example 8

Propeller fan 1 having the diameter D=316 mm, the height in the axial direction (z direction) h=100 mm, the number of blades n=5, the boss ratio ν=0.253 (boss diameter νD=80 mm) was formed such that the surface of a blade is a three-dimensional curved surface specified by Table 224 below. Note that r, θ, z are set as in Embodiment 41.

TABLE 224

COMPARISON EXAMPLE 8

| r | θ 0° | 5° | 10° | 15° | 20° | 25° | 30° | 35° | 40° | 45° | 50° | 55° |
|---|---|---|---|---|---|---|---|---|---|---|---|---|
| r 45 | 31.80 | 33.99 | 36.21 | 38.47 | 40.72 | 42.84 | 44.86 | 46.79 | 48.62 | 50.36 | | |
| r 55 | | 21.58 | 25.42 | 29.09 | 32.62 | 36.02 | 39.20 | 42.17 | 44.94 | 47.51 | 49.89 | 52.12 |
| r 65 | | | | 18.45 | 23.54 | 28.39 | 32.91 | 37.05 | 40.87 | 44.39 | 47.64 | 50.63 |
| r 75 | | | | | 14.55 | 20.92 | 26.88 | 32.29 | 37.22 | 41.75 | 45.90 | 49.71 |
| r 85 | | | | | 5.55 | 13.74 | 21.12 | 27.82 | 33.89 | 39.42 | 44.49 | 49.13 |
| r 95 | | | | | | 7.05 | 15.69 | 23.59 | 30.77 | 37.25 | 43.20 | 48.63 |
| r 105 | | | | | | 0.87 | 10.64 | 19.57 | 27.73 | 35.11 | 41.84 | 47.98 |
| r 115 | | | | | | | 5.87 | 15.71 | 24.68 | 32.84 | 40.30 | 47.10 |
| r 125 | | | | | | | | 11.89 | 21.58 | 30.43 | 38.57 | 45.95 |
| r 135 | | | | | | | | 8.27 | 18.40 | 27.98 | 36.72 | 44.67 |
| r 145 | | | | | | | | | 15.14 | 25.50 | 34.77 | 43.28 |
| r 155 | | | | | | | | | | 22.91 | 32.82 | 41.86 |
| (mm) | | | | | | | | | | | | |

| r | θ 60° | 65° | 70° | 75° | 80° | 85° | 90° | 95° | 100° |
|---|---|---|---|---|---|---|---|---|---|
| r 45 | | | | | | | | | |
| r 55 | 54.19 | | | | | | | | |
| r 65 | 53.40 | 55.95 | 58.28 | | | | | | |
| r 75 | 53.21 | 56.42 | 59.35 | 62.01 | | | | | |
| r 85 | 53.38 | 57.26 | 60.82 | 64.05 | 66.97 | | | | |
| r 95 | 53.60 | 58.14 | 62.30 | 66.10 | 69.55 | 72.72 | | | |
| r 105 | 53.62 | 58.78 | 63.51 | 40.83 | 71.77 | 75.43 | | | |
| r 115 | 53.33 | 59.02 | 64.28 | 69.03 | 73.40 | 77.43 | 81.05 | | |
| r 125 | 52.70 | 58.91 | 64.59 | 69.71 | 74.39 | 78.67 | 82.62 | 86.11 | |
| r 135 | 51.94 | 58.58 | 64.65 | 70.17 | 75.14 | 79.63 | 83.70 | 87.39 | |
| r 145 | 51.06 | 58.04 | 64.45 | 70.43 | 75.63 | 80.43 | 84.74 | 88.67 | 92.17 |
| r 155 | 50.08 | 57.34 | 64.11 | 70.44 | 75.95 | 81.10 | 85.79 | 89.95 | 93.67 |
| (mm) | | | | | | | | | |

Comparison Example 9

Propeller fan 1 having the diameter D=460 mm, the height in the axial direction (z direction) h=168 mm, the number of blades n=3, the boss ratio ν=0.35 (boss diameter νD=161 mm) was formed such that the surface of a blade is a three-dimensional curved surface specified by Table 225 below. Note that r, θ, z are set as in Embodiment 41.

TABLE 225

COMPARISON EXAMPLE 9

| r | END POINT AT TRAILING EDGE SIDE | θ 5° | 10° | 15° | 20° | 25° | 30° | 35° | 40° | 45° | 50° | 55° | 60° |
|---|---|---|---|---|---|---|---|---|---|---|---|---|---|
| r 88.5 | 0.00 | 6.00 | 12.54 | 19.50 | 25.83 | 31.51 | 37.02 | 42.04 | 46.64 | 51.26 | 55.75 | 60.17 | 64.51 |
| r 95 | | 5.78 | 12.77 | 20.55 | 27.94 | 34.52 | 40.58 | 46.17 | 51.36 | 56.45 | 61.43 | 66.35 | 71.14 |
| | 1.15 | 2.38 | 9.19 | 16.80 | 24.01 | 30.41 | 36.30 | 41.71 | 46.72 | 51.63 | 56.44 | 61.18 | 65.79 |
| r 105 | | | 7.06 | 15.24 | 23.89 | 31.71 | 38.60 | 44.82 | 50.57 | 56.08 | 61.49 | 66.82 | 71.97 |
| | 2.75 | | 4.46 | 12.50 | 21.01 | 28.69 | 35.45 | 41.53 | 47.14 | 52.51 | 57.78 | 62.97 | 67.99 |
| r 115 | | | | 10.57 | 20.43 | 29.72 | 37.80 | 44.75 | 51.05 | 57.01 | 62.82 | 68.52 | 74.06 |
| | 4.21 | | | 8.02 | 17.76 | 26.94 | 34.90 | 41.73 | 47.92 | 53.76 | 59.45 | 65.04 | 70.46 |
| r 125 | | | | | 16.59 | 27.30 | 37.02 | 44.95 | 51.87 | 58.29 | 64.48 | 70.52 | 76.37 |
| | 5.57 | | | | 14.09 | 24.70 | 34.31 | 42.14 | 48.95 | 55.27 | 61.35 | 67.29 | 73.04 |
| r 135 | | | | | 12.44 | 24.47 | 35.74 | 45.14 | 52.86 | 59.74 | 66.31 | 72.68 | 78.87 |
| | 6.83 | | | | 9.94 | 21.89 | 33.09 | 42.41 | 50.05 | 56.86 | 63.35 | 69.64 | 75.75 |
| r 145 | | | | | | 21.11 | 33.79 | 44.82 | 53.72 | 61.26 | 68.23 | 74.93 | 81.42 |
| | 8.02 | | | | | 18.66 | 31.28 | 42.24 | 51.08 | 58.55 | 65.46 | 72.10 | 78.52 |
| r 155 | | | | | | 17.35 | 31.43 | 44.01 | 54.51 | 62.82 | 70.23 | 77.27 | 84.05 |
| | 9.15 | | | | | 14.95 | 28.98 | 41.52 | 51.97 | 60.24 | 67.60 | 74.59 | 81.33 |
| r 165 | | | | | | 13.24 | 28.66 | 42.69 | 54.86 | 64.35 | 72.28 | 79.71 | 86.81 |
| | 10.21 | | | | | 10.84 | 26.23 | 40.23 | 52.37 | 61.83 | 69.72 | 77.12 | 84.19 |
| r 175 | | | | | | | 25.49 | 40.94 | 54.68 | 65.61 | 74.21 | 82.07 | 89.53 |
| | 11.21 | | | | | | 23.09 | 38.52 | 52.25 | 63.16 | 71.74 | 79.59 | 87.03 |
| r 185 | | | | | | | 22.17 | 38.89 | 53.89 | 66.48 | 75.97 | 84.38 | 92.23 |
| | 12.16 | | | | | | 19.77 | 36.48 | 51.47 | 64.05 | 73.53 | 81.94 | 89.78 |

TABLE 225-continued

| COMPARISON EXAMPLE 9 | | | | | | | | |
|---|---|---|---|---|---|---|---|---|
| r 195 | | 18.66 | 36.55 | 52.61 | 66.83 | 77.52 | 86.56 | 94.90 |
| | 13.06 | 16.26 | 34.15 | 50.21 | 64.43 | 75.12 | 84.16 | 92.50 |
| r 205 | | | 33.78 | 51.15 | 66.92 | 78.89 | 88.62 | 97.59 |
| | 13.91 | | 31.38 | 48.75 | 64.52 | 76.49 | 86.22 | 95.19 |
| r 215 | | | 30.90 | 49.52 | 66.71 | 80.05 | 90.51 | 100.20 |
| | 14.71 | | 28.50 | 47.12 | 64.31 | 77.65 | 88.11 | 97.80 |
| r 225 | | | 28.01 | 47.58 | 66.09 | 80.91 | 92.25 | 102.71 |
| | 15.47 | | 25.61 | 45.18 | 63.69 | 78.51 | 89.85 | 100.31 |
| r 230 | | | 26.46 | 46.67 | 65.62 | 81.23 | 93.06 | 103.93 |
| | 15.82 | | 24.06 | 44.27 | 63.22 | 78.83 | 90.66 | 101.53 |
| (mm) | | | | | | | | |

| | θ | | | | | | | | |
|---|---|---|---|---|---|---|---|---|---|
| r | 65° | 70° | 75° | 80° | 85° | 90° | 95° | 100° | 102.5° | END POINT AT LEADING EDGE SIDE |
| r 88.5 | 68.67 | 72.48 | | | | | | | | 72.48 |
| r 95 | 75.75 | 80.17 | | | | | | | | |
| | 70.23 | 74.47 | | | | | | | | 77.09 |
| r 105 | 76.95 | 81.75 | 86.34 | | | | | | | |
| | 72.83 | 77.49 | 81.94 | | | | | | | 84.02 |
| r 115 | 79.40 | 84.48 | 89.39 | 94.10 | | | | | | |
| | 75.68 | 80.65 | 85.44 | 90.03 | | | | | | 90.83 |
| r 125 | 82.01 | 87.39 | 92.61 | 97.65 | | | | | | |
| | 78.57 | 83.85 | 88.96 | 93.90 | | | | | | 97.58 |
| r 135 | 84.80 | 90.45 | 95.95 | 100.97 | 106.23 | | | | | |
| | 81.61 | 87.18 | 92.60 | 97.55 | 102.73 | | | | | 104.29 |
| r 145 | 87.63 | 93.61 | 99.36 | 104.90 | 110.30 | | | | | |
| | 84.67 | 90.59 | 96.27 | 101.75 | 107.08 | | | | | 110.99 |
| r 155 | 90.56 | 96.87 | 102.90 | 108.74 | 114.38 | 119.80 | | | | |
| | 87.79 | 94.05 | 100.04 | 105.83 | 111.43 | 116.80 | | | | 117.70 |
| r 165 | 93.62 | 100.28 | 106.59 | 112.67 | 118.62 | 124.26 | | | | |
| | 90.97 | 97.60 | 103.88 | 109.93 | 115.85 | 121.46 | | | | 124.41 |
| r 175 | 96.68 | 103.71 | 110.32 | 116.69 | 122.88 | 128.76 | | | | |
| | 94.16 | 101.18 | 107.77 | 114.12 | 120.30 | 126.16 | | | | 131.15 |
| r 185 | 99.77 | 107.13 | 114.13 | 120.81 | 127.30 | 133.42 | 139.16 | | | |
| | 97.31 | 104.66 | 111.65 | 118.32 | 124.80 | 130.91 | 136.64 | | | 137.92 |
| r 195 | 102.97 | 110.57 | 117.93 | 124.92 | 131.63 | 137.97 | 144.00 | | | |
| | 100.57 | 108.17 | 115.53 | 122.52 | 129.23 | 135.57 | 141.60 | | | 144.71 |
| r 205 | 106.19 | 114.31 | 122.06 | 129.26 | 136.03 | 142.66 | 148.92 | | | |
| | 103.79 | 111.91 | 119.66 | 126.86 | 133.63 | 140.26 | 146.52 | | | 151.53 |
| r 215 | 109.51 | 118.09 | 126.39 | 133.95 | 140.62 | 147.40 | 153.94 | 160.13 | | |
| | 107.11 | 115.69 | 123.99 | 131.55 | 138.22 | 145.00 | 151.54 | 157.73 | | 158.39 |
| r 225 | 112.71 | 121.82 | 130.66 | 138.70 | 145.51 | 152.30 | 159.09 | 165.48 | | |
| | 110.31 | 119.42 | 128.26 | 136.30 | 143.11 | 149.90 | 156.69 | 163.08 | | 165.27 |
| r 230 | 114.27 | 123.67 | 132.77 | 141.10 | 148.07 | 154.81 | 161.74 | 168.14 | 171.12 | |
| | 111.87 | 121.27 | 130.37 | 138.70 | 145.67 | 152.41 | 159.34 | 165.74 | 168.72 | 168.72 |
| (mm) | | | | | | | | | | |

Each of the propeller fans as in Embodiments 41 to 60 and those in Comparison Examples 7 to 9 is attached to an outdoor unit of an air conditioner, and airflow, power consumption and noise are measured.

First, each fan in Embodiments 41 to 53 and in Comparison Example 7 having the fan diameter of ϕ400 was driven by a DC motor using an outdoor unit with a refrigeration capacity of a 28 kW class. The results are shown in Table 226 below.

TABLE 226

| | FAN DIAMETER | HEIGHT | NUMBER OF BLADES | BOSS DIAMETER | BOSS RATIO | a | b | c |
|---|---|---|---|---|---|---|---|---|
| EMBODIMENT 41 | 400 | 140 | 3 | 110 | 0.275 | 200 | 0 | 120 |
| EMBODIMENT 42 | 400 | 154 | 3 | 110 | 0.275 | 200 | 0 | 120 |
| EMBODIMENT 43 | 400 | 147 | 3 | 110 | 0.275 | 200 | 0 | 120 |
| EMBODIMENT 44 | 400 | 133 | 3 | 110 | 0.275 | 200 | 0 | 120 |
| EMBODIMENT 45 | 400 | 126 | 3 | 110 | 0.275 | 200 | 0 | 120 |
| EMBODIMENT 46 | 400 | 112 | 3 | 110 | 0.275 | 200 | 0 | 120 |
| EMBODIMENT 47 | 400 | 126 | 3 | 110 | 0.275 | 200 | 0 | 108 |
| EMBODIMENT 48 | 400 | 140 | 3 | 110 | 0.275 | 200 | 0 | 90 |
| EMBODIMENT 49 | 400 | 140 | 3 | 110 | 0.275 | 200 | 0 | 132 |
| EMBODIMENT 50 | 400 | 140 | 3 | 140 | 0.35 | 179.3 | 20.7 | 120 |

TABLE 226-continued

| | | | | | | | | |
|---|---|---|---|---|---|---|---|---|
| EMBODIMENT 51 | 400 | 112 | 3 | 110 | 0.275 | 200 | 0 | 120 |
| EMBODIMENT 52 | 400 | 112 | 3 | 110 | 0.275 | 200 | 0 | 120 |
| EMBODIMENT 53 | 400 | 112 | 3 | 110 | 0.275 | 200 | 0 | 120 |
| COMPARISON EXAMPLE 7 | 400 | 140 | 3 | 140 | 0.35 | — | — | — |

| | d | eu | ed | fu | fd | AIRFLOW | POWER CONSUMPTION | NOISE |
|---|---|---|---|---|---|---|---|---|
| EMBODIMENT 41 | 0 | 140 | 140 | 0 | 0 | 25 m3/min | 21 W | 39.5 dB |
| EMBODIMENT 42 | 0 | 154 | 154 | 0 | 0 | 25 m3/min | 23 W | 39.5 dB |
| EMBODIMENT 43 | 0 | 147 | 147 | 0 | 0 | 25 m3/min | 22 W | 39.5 dB |
| EMBODIMENT 44 | 0 | 133 | 133 | 0 | 0 | 25 m3/min | 21 W | 40.5 dB |
| EMBODIMENT 45 | 0 | 126 | 126 | 0 | 0 | 25 m3/min | 22 W | 40.5 dB |
| EMBODIMENT 46 | 0 | 112 | 112 | 0 | 0 | 25 m3/min | 24 W | 42.5 dB |
| EMBODIMENT 47 | 0 | 126 | 126 | 0 | 0 | 25 m3/min | 21 W | 39.5 dB |
| EMBODIMENT 48 | 0 | 140 | 140 | 0 | 0 | 25 m3/min | 25 W | 42.5 dB |
| EMBODIMENT 49 | 0 | 140 | 140 | 0 | 0 | 25 m3/min | 22 W | 41.5 dB |
| EMBODIMENT 50 | 0 | 140 | 140 | 0 | 0 | 25 m3/min | 21 W | 39.5 dB |
| EMBODIMENT 51 | 0 | 112 | 106.4 | 0 | 0 | 25 m3/min | 22 W | 40.5 dB |
| EMBODIMENT 52 | 0 | 112 | 112 | 3 | 0 | 25 m3/min | 22 W | 41.5 dB |
| EMBODIMENT 53 | 0 | 112 | 106.4 | 3 | 0 | 25 m3/min | 22 W | 40.5 dB |
| COMPARISON EXAMPLE 7 | — | — | — | — | — | 25 m3/min | 40 W | 47 dB |

Next, each fan in Embodiments 54 to 57 and in Comparison Example 8 having the fan diameter of ϕ316 was driven by an AC motor using an outdoor unit of a built-in type. The results are shown in Table 227 below.

TABLE 227

| | FAN DIAMETER | HEIGHT | NUMBER OF BLADES | BOSS DIAMETER | BOSS RATIO | a | b | c |
|---|---|---|---|---|---|---|---|---|
| EMBOIDMENT 55 | 316 | 100 | 4 | 86 | 0.272 | 158.6 | −0.6 | 90 |
| EMBOIDMENT 56 | 316 | 100 | 5 | 86 | 0.272 | 158.6 | −0.6 | 72 |
| EMBOIDMENT 57 | 316 | 100 | 5 | 86 | 0.272 | 158.6 | −0.6 | 108.5 |
| COMPARISON EXAMPLE 8 | 316 | 100 | 5 | 80 | 0.253 | — | — | — |

| EMBODIMENT 54 | d | eu | ed | fu | fd | AIRFLOW | POWER CONSUMPTION | NOISE |
|---|---|---|---|---|---|---|---|---|
| EMBOIDMENT 55 | 0 | 100 | 100 | 0 | 0 | 14 m3/min | 85 W | 58.5 dB |
| EMBOIDMENT 56 | 0 | 100 | 100 | 0 | 0 | 14 m3/min | 94 W | 59.5 dB |
| EMBOIDMENT 57 | 0 | 100 | 100 | 0 | 0 | 14 m3/min | 109 W | 58.5 dB |
| COMPARISON | 0 | 100 | 100 | 0 | 0 | 14 m3/min | 89 W | 57.5 dB |
| EXAMPLE 8 | — | — | — | — | — | 14 m3/min | 128 W | 64 dB |

Next, each fan in Embodiments 58 to 60 and in Comparison Example 9 having the fan diameter of ϕ460 was driven by an AC motor using a multiple-type large outdoor unit. The results are shown in Table 228 below.

TABLE 228

| | FAN DIAMETER | HEIGHT | NUMBER OF BLADES | BOSS DIAMETER | BOSS RATIO | a | b | c | d | eu | ed | fu | fd | AIRFLOW | POWER CONSUMPTION | NOISE |
|---|---|---|---|---|---|---|---|---|---|---|---|---|---|---|---|---|
| EMBODIMENT 58 | 460 | 161 | 3 | 150 | 0.326 | 213.8 | 16.2 | 120 | 0 | 161 | 161 | 0 | 0 | 32 m3/min | 65 W | 44.5 dB |
| EMBODIMENT 59 | 460 | 168 | 3 | 150 | 0.326 | 213.8 | 16.2 | 125.2 | 0 | 168 | 168 | 0 | 0 | 32 m3/min | 69 W | 46.5 dB |
| EMBODIMENT 60 | 460 | 140 | 3 | 150 | 0.326 | 213.8 | 16.2 | 104.3 | 0 | 140 | 140 | 0 | 0 | 32 m3/min | 71 W | 45.5 dB |

TABLE 228-continued

| | FAN DIA-METER | HEIGHT | NUMBER OF BLADES | BOSS DIA-METER | BOSS RATIO | a | b | c | d | eu | ed | fu | fd | AIR-FLOW | PO-WER CON-SUMP-TION | NOISE |
|---|---|---|---|---|---|---|---|---|---|---|---|---|---|---|---|---|
| COMPARISON EXAMPLE 9 | 460 | 168 | 3 | 161 | 0.35 | — | — | — | — | — | — | — | — | 32 m3/min | 122 W | 51 dB |

As can be seen from Table 226 above, it has become clear that the power consumption at the same air flow is reduced by 40% and also the noise can be reduced by 4.5–7.5 dB in the propeller fan shown in Embodiments 41 to 53, compared to the case with Comparison Example 7 with the propeller fan having the same diameter. It is noted that no separation noise occurred, which is a problem common to a thin blade, and thus there was no increase of noise.

Moreover, weight was reduced by approximately 20% for each propeller fan shown in Embodiments 41 to 53 compared to Comparison Example 7, without degradation of its performance, and thus the cost was also reduced. In addition, the 20% of weight saving can realize reduction of startup torque occurred at startup of the blower and also reduction of cost for the drive motor. It is noted that deformation of a blade, which is a problem common to a thin blade, was largely reduced compared to that in Comparison Example 7.

Furthermore, a breaking strength at rotation, i.e. the number of rotations at which a blade is damaged due to the centrifugal force was improved by 15% for each propeller fan shown in Embodiments 41 to 53, compared to that in Comparison Example 7.

Moreover, as can be seen from Table 227 above, it has become clear that the power consumption at the same air flow is reduced by 15–30% and also the noise can be reduced by 4.5–6.5 dB in the propeller fan shown in Embodiments 54 to 57, compared to the case with Comparison Example 8 for the propeller fan having the same diameter. It is noted that no separation noise occurred that is a problem common to a thin blade, and thus there was no increase of noise.

Moreover, weight was reduced by 15% for each propeller fan shown in Embodiments 54 to 57 compared to Comparison Example 8, without degradation of its performance, and thus the cost was also reduced. In addition, the 15% of weight saving can realize reduction of startup torque occurred at startup of the blower and also reduction of cost for the drive motor. It is noted that the deformation of a blade, which is a problem common to a thin blade, was largely reduced compared to that in Comparison Example 8

Moreover, a breaking strength at rotation, i.e. the number of rotations at which a blade is damaged due to the centrifugal force was improved by 13% for each propeller fan shown in Embodiments 54 to 57 of the present invention, compared to that in Comparison Example 7. It is noted that cooling time at manufacturing was reduced compared to that in Comparison Example 2.

Furthermore, as can be seen from Table 228 above, it has become clear that the power consumption at the same air flow is reduced by 40–45% and also the noise is reduced by 4.5–6.5 dB in the propeller fan shown in Embodiments 58 to 60, compared to the case with Comparison Example 9 with the propeller fan having the same diameter. It is noted that no separation noise occurred that is a problem common to a thin blade, and thus there was no increase of noise therefrom.

Moreover, weight was reduced by 17% for each propeller fan shown in Embodiments 58 to 60 compared to Comparison Example 9, without degradation of its performance, and thus the cost was also reduced. In addition, the 17% of weight saving can realize reduction of startup torque occurred at startup of the blower and also reduction of cost for the drive motor. It is noted that the deformation of a blade that is a problem common to a thin blade was largely reduced compared to that in Comparison Example 7.

Furthermore, a breaking strength at rotation, i.e. the number of rotations at which a blade is damaged due to the centrifugal force was improved by 17% for each propeller fan shown in Embodiments 58 to 60 of the present invention, compared to that in Comparison Example 9. It is noted that cooling time at manufacturing was reduced compared to that in Comparison Example 9.

Moreover, as for Embodiments 41 to 46 in Table 226 above, when the same diameter D=400 mm and the same expansion angle λ=120 deg, Embodiment 41 where height h satisfies an equation 234 below, i.e. h=140, had the highest superiority in efficiency and noise.

$$c = \lambda = \frac{360}{n} = \frac{2400}{7} \times \frac{h}{D} \tag{234}$$

Moreover, as for Embodiments 41, 48 and 49 in Table 226 above, when the same diameter D=400 mm and the same height h=140 mm, Embodiment 41 where blade expansion angle λ satisfies an equation 235 below, i.e. λ=120, had the highest superiority in efficiency and noise.

$$c = \lambda = \frac{360}{n} = \frac{2400}{7} \times \frac{h}{D} \tag{235}$$

Furthermore, as for Embodiments 45 and 47 in Table 226 above, blade expansion angle λ where the same diameter D=400 mm and the same height h=126 mm was superior in Embodiment 47 to that in Embodiment 45. Therefore, when the former is not the same as the latter in an equation 236 below, the latter showed a superiority.

$$\left.\begin{array}{l} c = \lambda = \dfrac{360}{n} \\ c = \lambda = \dfrac{2400}{7} \times \dfrac{h}{D} \end{array}\right\} \tag{236}$$

Moreover, in Embodiments 41 and 50 in Table 226 above, as for boss ratio ν where the same diameter D=400 mm, the same height h=140 mm and the same blade expansion angle λ=120 deg, Embodiment 50 showed a superiority in efficiency and noise as in Embodiment 41, since, in Embodiment 50, transformation is performed for Embodiment 41 to satisfy an equation 237 below.

$$\left.\begin{aligned} a &= \frac{20}{29}D(1-v) \\ b &= -\frac{20}{29}D(1-v)\times 0.275 + \frac{vD}{2} \end{aligned}\right\} \quad (237)$$

Further, in Embodiments 41, 46, and 51 to 53 in Table 226 above, the way of assigning eu, ed, fu, fd in the case that the same diameter D=400 mm, the same height h=112 mm and the same blade expansion angle λ=120 deg will be described.

In Embodiment 46, the ratio of h/D is smaller, i.e., the thickness of a wing is thinner, than that in Embodiment 41. Thus, the wing is largely deformed at rotation of the fan due to the centrifugal force applied on the wing (blade), reducing the height of the wing, and therefore degradation occurs in terms of efficiency and noise.

To prevent this, relation among $e_u$, $e_d$, $f_u$ and $f_d$ is set according to the following transformation formula 238 to increase the thickness of the wing, resulting in Embodiments 51 to 53 being superior to Embodiment 46.

$$\left.\begin{aligned} & z_{1u} = e_u \times z_u + f_u \\ & z_{1d} = e_d \times z_d + f_d \\ & \text{wherein} \\ & \begin{cases} e_u = e_d \\ f_u > f_d \end{cases} \text{ or } \begin{cases} e_u > e_d \\ f_u = f_d \end{cases} \text{ or } \begin{cases} e_u > e_d \\ f_u > f_d \end{cases} \\ & \text{Therefore,} \\ & \begin{cases} e_u \geqq e_d \\ f_u \geqq f_d \end{cases} \end{aligned}\right\} \quad (238)$$

It is noted that, when $e_u<e_d$ and $f_u>f_d$, the shape of the wing is largely deformed, which induces deterioration in efficiency and increase in noise, and when $e_u=e_d$ and $f_u<f_d$, or $e_u>e_d$ and $f_u<f_d$, or $e_u<e_d$ and $f_u<f_d$, or when $e_u<e_d$ and $f_u=f_d$, the shape of the wing cannot be formed.

Moreover, as for Embodiments 54 to 56 in Table 227, Embodiment 54 in which the number of blades n in the case of the same diameter D=316 mm, the same height h=100 mm and blade expansion angle λ=360/n assumes a value closest to the value indicated by an equation 239 below, i.e., n=3, had the highest superiority in efficiency and noise.

$$\frac{2400}{7}\times\frac{h}{D} = \frac{2400}{7}\times\frac{100}{316} = 108.5 \quad (239)$$

Moreover, when Embodiments 56 and 57 in Table 227 above are compared with each other, Embodiment 57 was superior to Embodiment 56. The comparison was made for blade expansion angle λ where the same diameter D=316 mm, the same height h=100 mm and the same number of blades n=5. Therefore, when the former is not the same as the latter in an equation 240 below, the latter showed a superiority.

$$\left.\begin{aligned} c = \lambda &= \frac{360}{n} \\ c = \lambda &= \frac{2400}{7}\times\frac{h}{D} \end{aligned}\right\} \quad (240)$$

Moreover, as for Embodiments 58 to 60 in Table 228, Embodiment 58 was superior to Embodiments 59 and 60. The comparison was made for blade expansion angle λ and height h where the same diameter D=460 mm and the same number of blades n=3. Thus, when blade expansion angle λ and height h are selected, selection is made not only for λ to satisfy the first equation (the top equation) in an equation 241 below, but also for the number of blades n, blade expansion angle λ and height h to satisfy the second equation (the middle equation) in equation 241, to achieve a higher superiority. That is, in respect to the propeller fan according to the present invention, the third equation (the bottom equation) in equation 241 below is important to determine a design manual.

$$\left.\begin{aligned} & c = \lambda = \frac{2400}{7}\times\frac{h}{D} \\ & c = \lambda = \frac{360}{n} = \frac{2400}{7}\times\frac{h}{D} \\ & \frac{360}{n} = \frac{2400}{7}\times\frac{h}{D} \end{aligned}\right\} \quad (241)$$

Next, a fluid feeding device according to the present invention will be described. A fluid feeding device 7 shown in FIG. 28 includes a blower 9 constituted by propeller fan 1 in Embodiment 41 and a drive motor 8, and fluid is fed out by blower 9.

Examples of the fluid feeding device having such a configuration include an air conditioner, an air cleaner, a humidifier, a dehumidifier, an electric fan, a fan heater, a cooling device, and a ventilator. Fluid feeding device 7 in the present embodiment is an outdoor unit 10 of an air conditioner.

Figure 29:
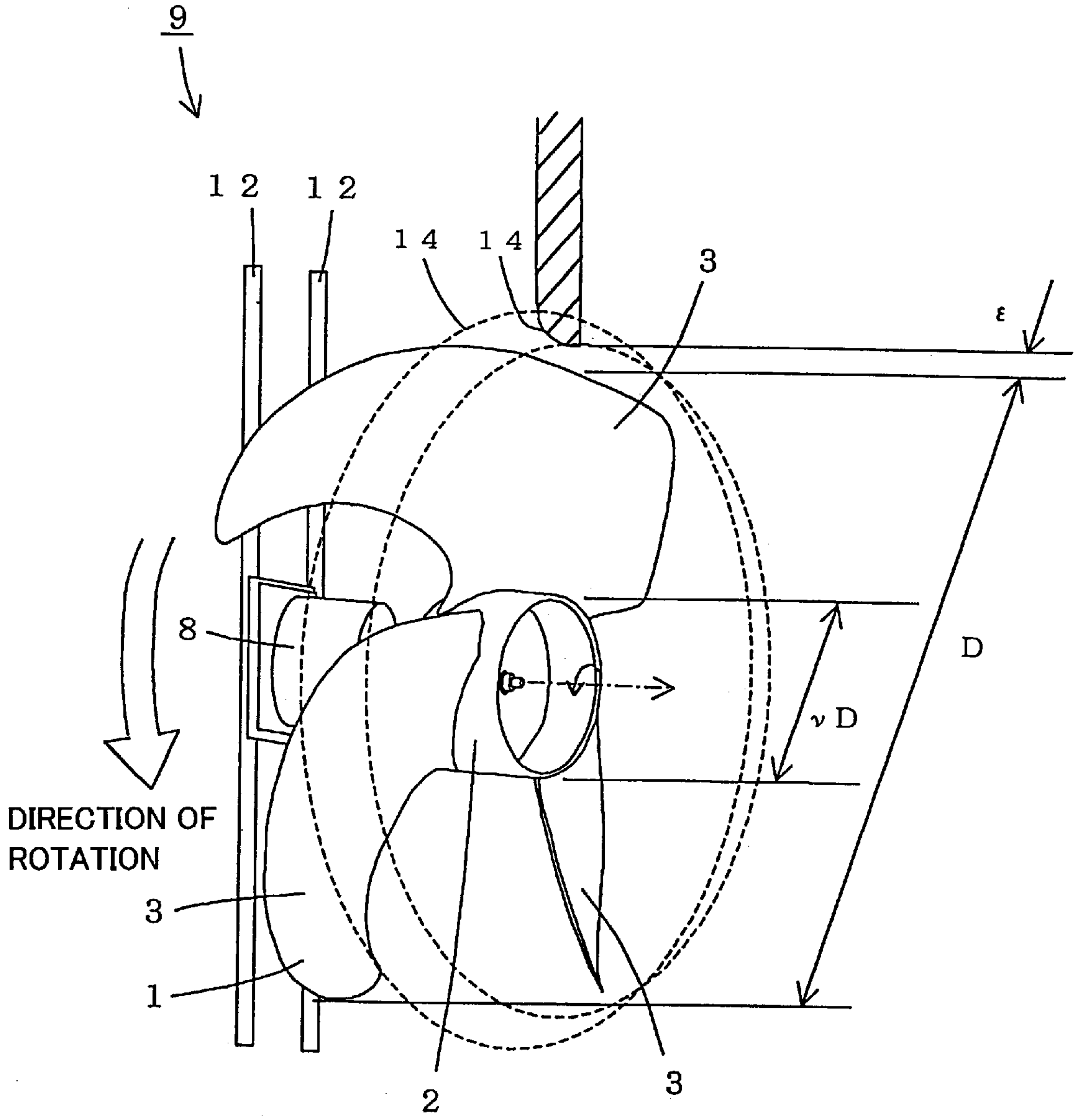
FIG. 29 is a perspective view of a further embodiment of the blower for the fluid feeding device of the present invention.

Outdoor unit 10 includes an outdoor heat exchanger 11, and efficiently exchanges heat by blower 9 described above. Here, blower 9 is installed in outdoor unit 10 by a motor angle 12, and a supply opening 13 of outdoor unit 10 is formed to be a bell mouth 14 as shown in FIG. 29.

Figure 30:
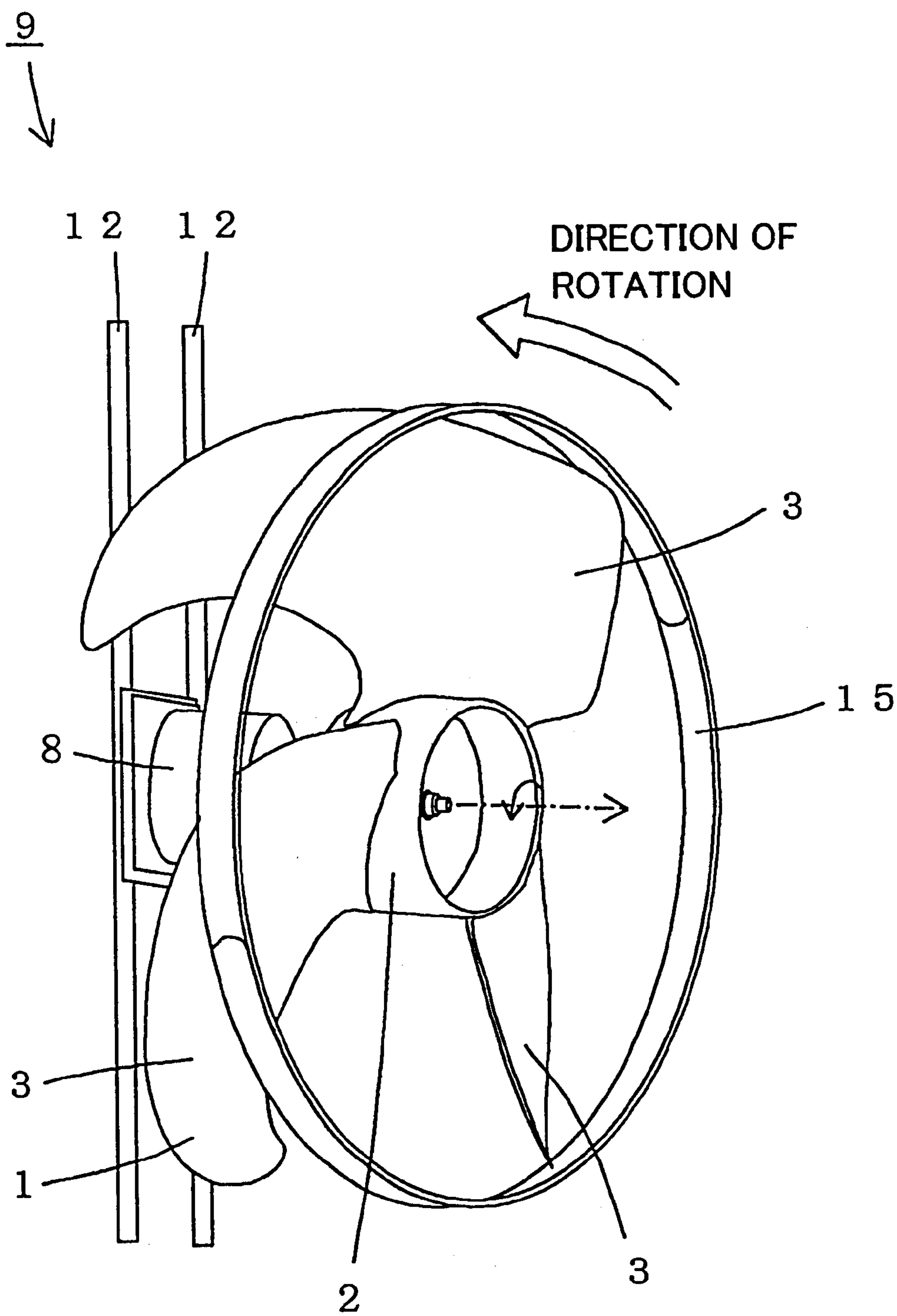
FIG. 30 is a perspective view of a yet further embodiment of the blower for the fluid feeding device of the present invention.

Moreover, blower 9 having a ring splasher 15 installed on the periphery of propeller fan 1, as shown in FIG. 30, may also be provided at fluid feeding device 7. Here, in an air conditioner of a type having an indoor unit and an outdoor unit formed in one piece to be attached to a window or the like, drain water may be splashed up and sprayed on outdoor heat exchanger 11, to further increase the efficiency.

Outdoor unit 10 in the present embodiment is a quiet outdoor unit with reduced noise, since propeller fan 1 in Embodiment 41 is included therein. Moreover, propeller fan 1 has an improved fan efficiency, so that an efficient outdoor unit realizing energy-saving can be attained. Furthermore, propeller fan 1 can be reduced in weight so that outdoor unit 10 can also achieve weight saving. In addition, propeller fan 1 has an increased breaking strength at rotation, so that the number of rotations of propeller fan 1 can be increased resulting in enhanced performance of outdoor unit 10. It is presumed that propeller fans in other embodiments may also attain similar results.

In a propeller fan according to the present invention, for example, a base shape defined by three-dimensional coordinate values indicated in Tables 1 and 2 are appropriately modified to obtain a shape of the surface of a blade. More specifically, a curved surface, which is defined by coordinate values obtained by transforming three-dimensional coordinate values indicated in Tables 1 and 2 in r, θ and z directions using prescribed transformation formulas, is determined as the shape of the surface of the blade of the propeller fan. By employing such a curved shape as the shape of the blade surface of the propeller fan, the propeller fan can be made higher in efficiency and lower in noise, independent of the diameter, height and the like of the propeller fan, as indicated in Tables 48 to 50. Therefore, according to the propeller fan in the present invention, a larger volume of air flow can be attained compared to the conventional example at the same power consumption and the same noise level.

In a die for molding a propeller fan according to one aspect of the present invention, the surface of a portion forming the surface of a blade is configured by a curved surface obtained by enlarging or reducing the base shape in at least one of r, θ and z directions, so that the propeller fan according to the present invention described above can be molded.

When the base shape defined by three-dimensional coordinate values indicated in Tables 1 and 2 is transformed by a transformation formula (1), a propeller fan can be improved in efficiency and can be reduced in noise, independent of the diameter, height and the like of the propeller fan, as indicated in Table 48 (e.g., see Embodiment 1). Therefore, any value may be selected for the diameter, height, number of blades and expansion angle of a blade, to obtain a propeller fan with high efficiency and low noise. It is noted that, by satisfying $h=e_u \geqq e_d$ and $f_u \geqq f_d$, problems can be solved in that the wing becomes extremely thinner and is largely deformed to be lower in height due to the centrifugal force at rotation of the fan, significantly degrading the performance, which may be caused when D assumes a large value whereas h assumes a small value. Moreover, the best effect can be attained in higher efficiency and lower noise without deterioration in performance due to the centrifugal force. Thus, increased efficiency and reduced noise can be achieved at the same time and a molding condition can optimally be selected without deterioration in performance due to the centrifugal force.

In a die for molding a propeller fan according to another aspect of the present invention, the surface of a portion forming the surface of a blade is configured by a curved surface defined by coordinate values obtained by transforming three-dimensional coordinate values indicated in Tables 1 and 2 using transformation formula (1), so that the propeller fan of the present invention described above can be molded.

When the base shape defined by three-dimensional coordinate values indicated in Tables 1 and 2 is transformed by a transformation formula (2), the propeller fan can be improved in efficiency and reduced in noise, independent of the diameter, height and the like of the propeller fan, as indicated in Table 48 (e.g., see Embodiment 2). Moreover, in addition to achievement of high efficiency and low noise, a propeller fan having n blades, which do not overlap with one another and thus can hold down the cost of a molding die, can easily be obtained.

In a die for molding a propeller fan according to a further aspect of the present invention, the surface of a portion forming the surface of the blade is configured by a curved surface defined by coordinate values obtained by transforming three-dimensional coordinate values indicated in Tables 1 and 2 using transformation formula (2), so that the propeller fan of the present invention described above can be molded.

When the base shape defined by three-dimensional coordinate values indicated in Tables 1 and 2 is transformed by a transformation formula (3), the propeller fan can be improved in efficiency and reduced in noise, independent of the diameter, height and the number of blades of the propeller fan, as indicated in Table 48 (e.g., see Embodiment 7).

In a die for molding a propeller fan according to a yet further aspect of the present invention, the surface of a portion forming the surface of the blade is configured by a curved surface defined by coordinate values obtained by transforming three-dimensional coordinate values indicated in Tables 1 and 2 using transformation formula (3), so that the propeller fan of the present invention described above can be molded.

When the base shape defined by three-dimensional coordinate values indicated in Tables 1 and 2 is transformed by a transformation formula (4), the propeller fan can be improved in efficiency and reduced in noise, independent of the diameter, height, number of blades, boss diameter and boss ratio of the propeller fan, as indicated in Table 48 (e.g., see Embodiment 10).

In a die for molding a propeller fan according to another aspect of the present invention, the surface of a portion forming the surface of the blade is configured by a curved surface defined by coordinate values obtained by transforming three-dimensional coordinate values indicated in Tables 1 and 2 using transformation formula (4), so that the propeller fan of the present invention described above can be molded.

When the base shape defined by three-dimensional coordinate values indicated in Tables 1 and 2 is transformed by a transformation formula (5), the propeller fan can be improved in efficiency and reduced in noise, independent of the diameter, height, number of blades, and boss ratio of the propeller fan, as indicated in Table 49 (e.g., see Embodiment 14).

In a die for molding a propeller fan according to yet another aspect of the present invention, the surface of a portion forming the surface of the blade is configured by a curved surface defined by coordinate values obtained by transforming three-dimensional coordinate values indicated in Tables 1 and 2 using transformation formula (5), so that the propeller fan of the present invention described above can be molded.

When the base shape defined by three-dimensional coordinate values indicated in Tables 1 and 2 is transformed by a transformation formula (6), the propeller fan can be improved in efficiency and reduced in noise, independent of the diameter, height, number of blades, and boss ratio of the propeller fan, as indicated in Table 49 (e.g., see Embodiment 17).

In a die for molding a propeller fan according to a further aspect of the present invention, the surface of a portion forming the surface of the blade is configured by a curved surface defined by coordinate values obtained by transforming three-dimensional coordinate values indicated in Tables 1 and 2 using transformation formula (6), so that the propeller fan of the present invention described above can be molded.

A fluid feeding device according to the present invention includes a blower having the propeller fan according to any one of the above, so that good efficiency and energy saving can be achieved, resulting in a device with low noise.

In another propeller fan according to the present invention, for example, the base shape defined by three-dimensional coordinate values indicated in Table 101 is appropriately modified to obtain the shape of the surface of the blade. More specifically, a curved surface, which is defined by coordinate values obtained by transforming three-dimensional coordinate values indicated in Table 101 in r, θ and z directions using prescribed transformation formulas respectively, is determined as the shape of the surface of the blade of the propeller fan. By employing such a curved shape as the shape of the blade surface of the propeller fan, the propeller fan can be made higher in efficiency and lower in noise, independent of the diameter, height and the like of the propeller fan, as indicated in Tables 126 to 128. Furthermore, the propeller fan can be made lighter in weight and thus the cost can be reduced. Therefore, according to the propeller fan in the present invention, a larger volume of air flow can be attained compared to the conventional example at the same power consumption and the same noise level, and weight and cost can be reduced.

In a die for molding a propeller fan according to the present invention, the surface of a portion forming the surface of a blade is configured by a curved surface obtained by enlarging or reducing the base shape in at least one of r, θ and z directions, so that the propeller fan according to the present invention described above can be molded.

When the base shape defined by three-dimensional coordinate values indicated in Table 101 is transformed by a transformation formula (101), a propeller fan can be improved in efficiency and can be reduced in noise, independent of the diameter, height and the like of the propeller fan, as indicated in Table 126 (e.g., see Embodiment 21). Further, the weight and cost can be reduced. Therefore, any value may be selected for the diameter, height, number of blades and expansion angle of a blade, to obtain a propeller fan with light weight, high efficiency and low noise at a low cost. It is noted that, by satisfying $h=e_u \geqq e_d$ and $f_u \geqq f_d$, problems can be solved in that the wing becomes extremely thinner and is largely deformed to be lower in height due to the centrifugal force at rotation of the fan, significantly degrading the performance, which may be caused when D assumes a large value whereas h assumes a small value. Moreover, the best effect can be attained in higher efficiency, lower noise, lighter weight and lower cost, without deterioration in performance due to the centrifugal force. Thus, improved efficiency, lowered noise, reduced weight and reduced cost can be achieved at the same time, and a molding condition can optimally be selected without deterioration in performance due to the centrifugal force.

In a die for molding a propeller fan according to another aspect of the present invention, the surface of a portion forming the surface of a blade is configured by a curved surface defined by coordinate values obtained by transforming three-dimensional coordinate values indicated in Table 101 using transformation formula (101), so that the propeller fan of the present invention described above can be molded.

When the base shape defined by three-dimensional coordinate values indicated in Table 101 is transformed by a transformation formula (102), the propeller fan can be improved in efficiency and reduced in noise, independent of the diameter, height and the like of the propeller fan, as indicated in Table 126 (e.g., see Embodiment 2). Moreover, in addition to achievement of high efficiency, low noise, light weight and low cost, a propeller fan having n blades, which do not overlap with one another and thus can hold down the cost of a molding die, can easily be obtained.

In a die for molding a propeller fan according to a further aspect of the present invention, the surface of a portion forming the surface of the blade is configured by a curved surface defined by coordinate values obtained by transforming three-dimensional coordinate values indicated in Table 101 using transformation formula (102), so that the propeller fan of the present invention described above can be molded.

When the base shape defined by three-dimensional coordinate values indicated in Table 101 is transformed by a transformation formula (103), the propeller fan can be improved in efficiency and can be reduced in weight and cost, and can also be reduced in noise, independent of the diameter, height and the number of blades of the propeller fan, as indicated in Table 126 (e.g., see Embodiment 27).

In a die for molding a propeller fan according to a yet further aspect of the present invention, the surface of a portion forming the surface of the blade is configured by a curved surface defined by coordinate values obtained by transforming three-dimensional coordinate values indicated in Table 101 using transformation formula (103), so that the propeller fan of the present invention described above can be molded.

When the base shape defined by three-dimensional coordinate values indicated in Table 101 is transformed by a transformation formula (104), the propeller fan can be improved in efficiency and reduced in weight and cost, and can also be reduced in noise, independent of the diameter, height, number of blades, and boss ratio of the propeller fan, as indicated in Table 126 (e.g., see Embodiment 30).

In a die for molding a propeller fan according to a further aspect of the present invention, the surface of a portion forming the surface of the blade is configured by a curved surface defined by coordinate values obtained by transforming three-dimensional coordinate values indicated in Table 101 using transformation formula (104), so that the propeller fan of the present invention described above can be molded.

When the base shape defined by three-dimensional coordinate values indicated in Table 101 is transformed by a transformation formula (105), the propeller fan can be improved in efficiency and reduced in weight and cost, and can also be reduced in noise, independent of the diameter, height, number of blades, and boss ratio of the propeller fan, as indicated in Table 127 (e.g., see Embodiment 34).

In a die for molding a propeller fan according to yet another aspect of the present invention, the surface of a portion forming the surface of the blade is configured by a curved surface defined by coordinate values obtained by transforming three-dimensional coordinate values indicated in Table 101 using transformation formula (105), so that the propeller fan of the present invention described above can be molded.

When the base shape defined by three-dimensional coordinate values indicated in Table 101 is transformed by a transformation formula (106), the propeller fan can be improved in efficiency and reduced in weight and cost, and can also be reduced in noise, independent of the diameter, height, number of blades, and boss ratio of the propeller fan, as indicated in Table 127 (e.g., see Embodiment 37).

In a die for molding a propeller fan according to a further aspect of the present invention, the surface of a portion forming the surface of the blade is configured by a curved surface defined by coordinate values obtained by transforming three-dimensional coordinate values indicated in Table 101 using transformation formula (106), so that the propeller fan of the present invention described above can be molded.

A fluid feeding device according to the present invention includes a blower having the propeller fan according to any one of the above, so that good efficiency and energy saving can be achieved, resulting in a device with low noise and reduced weight.

In a further propeller fan according to the present invention, for example, the base shape defined by three-dimensional coordinate values indicated in Table 201 is appropriately modified to obtain the shape of the surface of the blade. More specifically, a curved surface, which is defined by coordinate values obtained by transforming three-dimensional coordinate values indicated in Table 201 in r, θ and z directions using prescribed transformation formulas respectively, is determined as the shape of the surface of a blade of the propeller fan. By employing such a curved shape as the shape of the blade surface of the propeller fan, the propeller fan can be made higher in efficiency and lower in noise, independent of the diameter, height and the like of the propeller fan, as indicated in Tables 226 to 228. Moreover, the propeller fan can also be reduced in weight and thus the cost can be lowered. Therefore, according to the propeller fan in the present invention, a larger volume of air flow can be attained compared to the conventional example at the same power consumption and the same noise level, and also the weight and cost can be reduced. Furthermore, it is superior in terms of deformation due to the centrifugal force and in terms of strength against breaking at rotation, and thus there is no need to partially increase the thickness of a root of a blade portion.

In a die for molding a propeller fan according to the present invention, the surface of a portion forming the surface of a blade is configured by a curved surface obtained by enlarging or reducing the base shape in at least one of r, θ and z directions, so that the propeller fan according to the present invention described above can be molded.

When the base shape defined by three-dimensional coordinate values indicated in Table 201 is transformed by a transformation formula (201), a propeller fan can be improved in efficiency and can be reduced in noise, independent of the diameter, height and the like of the propeller fan, as indicated in Table 226 (e.g., see Embodiment 1). Further, the weight and cost can also be reduced. In addition, the strength of the propeller fan can be increased without the thickness of the root of the blade portion being partially increased. Therefore, any value may be selected for the diameter, height, number of blades and expansion angle of a blade, to obtain a propeller fan with light weight, high strength, high efficiency and low noise. It is noted that, by satisfying $h=e_u \geqq e_d$ and $f_u \geqq f_d$, problems can be solved in that the wing becomes extremely thinner and is largely deformed to be lower in height due to the centrifugal force at rotation of the fan, significantly degrading the performance, which may be caused when D assumes a large value whereas h assumes a small value. Moreover, the best effect can be attained in higher efficiency, lower noise, lighter weight and lower cost, without deterioration in performance due to the centrifugal force. Thus, increased efficiency, reduced noise, reduced weight, lowered cost and increased strength can be achieved at the same time, and a molding condition can optimally be selected, without deterioration in performance due to the centrifugal force.

In a die for molding a propeller fan according to another aspect of the present invention, the surface of a portion forming the surface of a blade is configured by a curved surface defined by coordinate values obtained by transforming three-dimensional coordinate values indicated in Table 201 using transformation formula (201), so that the propeller fan of the present invention described above can be molded.

When the base shape defined by three-dimensional coordinate values indicated in Table 201 is transformed by a transformation formula (202), the propeller fan can be improved in efficiency and reduced in noise, independent of the diameter, height and the like of the propeller fan, as indicated in Table 226 (e.g., see Embodiment 42). Moreover, in addition to achievement of high efficiency, low noise, light weight, low cost and increased strength, a propeller fan having n blades, which do not overlap with one another and thus can hold down the cost of the die, can easily be obtained.

In a die for molding a propeller fan according to a further aspect of the present invention, the surface of a portion forming the surface of the blade is configured by a curved surface defined by coordinate values obtained by transforming three-dimensional coordinate values indicated in Table 201 using transformation formula (202), so that the propeller fan of the present invention described above can be molded.

When the base shape defined by three-dimensional coordinate values indicated in Table 201 is transformed by a transformation formula (203), the propeller fan can be improved in efficiency, reduced in weight and cost, and increased in strength, and can also be reduced in noise, independent of the diameter, height and the number of blades of the propeller fan, as indicated in Table 226 (e.g., see Embodiment 47).

In a die for molding a propeller fan according to a yet further aspect of the present invention, the surface of a portion forming the surface of the blade is configured by a curved surface defined by coordinate values obtained by transforming three-dimensional coordinate values indicated in Table 201 using transformation formula (203), so that the propeller fan of the present invention described above can be molded.

When the base shape defined by three-dimensional coordinate values indicated in Table 201 is transformed by a transformation formula (204), the propeller fan can be improved in efficiency, reduced in weight and cost, and increased in strength, and can also be reduced in noise, independent of the diameter, height, number of blades, boss diameter and boss ratio of the propeller fan, as indicated in Table 226 (e.g., see Embodiment 50).

In a die for molding a propeller fan according to a further aspect of the present invention, the surface of a portion forming the surface of the blade is configured by a curved surface defined by coordinate values obtained by transforming three-dimensional coordinate values indicated in Table 201 using transformation formula (204), so that the propeller fan of the present invention described above can be molded.

When the base shape defined by three-dimensional coordinate values indicated in Table 201 is transformed by a transformation formula (205), the propeller fan can be improved in efficiency, reduced in weight and cost, and increased in strength, and can also be reduced in noise, independent of the diameter, height, number of blades, and boss ratio of the propeller fan, as indicated in Table 227 (e.g., see Embodiment 54).

In a die for molding a propeller fan according to yet another aspect of the present invention, the surface of a portion forming the surface of the blade is configured by a curved surface defined by coordinate values obtained by transforming three-dimensional coordinate values indicated in Table 201 using transformation formula (205), so that the propeller fan of the present invention described above can be molded.

When the base shape defined by three-dimensional coordinate values indicated in Table 201 is transformed by a transformation formula (206), the propeller fan can be improved in efficiency, reduced in weight and cost, and increased in strength, and can also be reduced in noise, independent of the diameter, height, number of blades, and boss ratio of the propeller fan, as indicated in Table 227 (e.g., see Embodiment 57).

In a die for molding a propeller fan according to a further aspect of the present invention, the surface of a portion forming the surface of the blade is configured by a curved surface defined by coordinate values obtained by transforming three-dimensional coordinate values indicated in Table 201 using transformation formula (206), so that the propeller fan of the present invention described above can be molded.

A fluid feeding device according to the present invention includes a blower having the propeller fan according to any one of the above, so that good efficiency and energy saving can be achieved, resulting in a device with low noise, light weight and increased strength.

Industrial Applicability

The present invention may be applied to a propeller fan, a die for molding the propeller fan and a fluid feeding device.

What is claimed is:

1. A propeller fan, characterized in that when coordinates in a cylindrical coordinate system having a z axis as a rotation axis of the propeller fan are (r, θ, z), a curved shape defined by a r coordinate value, a θ coordinate value and a z coordinate value indicated in tables 1 and 2 below is determined as a base shape of a surface of a blade of said propeller fan, the surface of the blade of said propeller fan being configured by a curved surface obtained by enlarging or reducing said base shape in at least one of r, θ and z directions, said tables 1 and 2 defined as follows:

TABLE 1

| | θ | | | | | | | | |
|---|---|---|---|---|---|---|---|---|---|
| r | 0.042 | 0.083 | 0.125 | 0.167 | 0.208 | 0.25 | 0.292 | 0.333 | 0.375 |
| 0.4 | | 0.145 | 0.181 | 0.214 | 0.246 | 0.276 | 0.304 | 0.329 | 0.353 |
| | | 0.137 | 0.164 | 0.190 | 0.214 | 0.237 | 0.261 | 0.284 | 0.307 |
| 0.45 | 0.085 | 0.134 | 0.176 | 0.215 | 0.249 | 0.280 | 0.310 | 0.337 | 0.363 |
| | 0.080 | 0.118 | 0.152 | 0.183 | 0.211 | 0.239 | 0.265 | 0.291 | 0.317 |
| 0.5 | 0.074 | 0.124 | 0.168 | 0.209 | 0.246 | 0.282 | 0.315 | 0.345 | 0.375 |
| | 0.061 | 0.105 | 0.144 | 0.179 | 0.211 | 0.242 | 0.271 | 0.300 | 0.328 |
| 0.55 | 0.044 | 0.102 | 0.153 | 0.200 | 0.242 | 0.282 | 0.319 | 0.354 | 0.386 |
| | 0.036 | 0.087 | 0.133 | 0.174 | 0.211 | 0.246 | 0.279 | 0.310 | 0.340 |
| 0.6 | | 0.077 | 0.137 | 0.190 | 0.238 | 0.283 | 0.325 | 0.364 | 0.399 |
| | | 0.065 | 0.120 | 0.168 | 0.211 | 0.250 | 0.286 | 0.320 | 0.352 |
| 0.65 | | 0.050 | 0.119 | 0.180 | 0.234 | 0.285 | 0.331 | 0.374 | 0.413 |
| | | 0.043 | 0.105 | 0.160 | 0.210 | 0.254 | 0.295 | 0.332 | 0.367 |
| 0.7 | | | 0.096 | 0.167 | 0.228 | 0.283 | 0.333 | 0.379 | 0.422 |
| | | | 0.087 | 0.152 | 0.210 | 0.261 | 0.307 | 0.349 | 0.387 |
| 0.75 | | | 0.072 | 0.152 | 0.222 | 0.284 | 0.339 | 0.389 | 0.435 |
| | | | 0.065 | 0.137 | 0.201 | 0.258 | 0.308 | 0.354 | 0.395 |
| 0.8 | | | 0.043 | 0.133 | 0.212 | 0.282 | 0.346 | 0.402 | 0.452 |
| | | | 0.040 | 0.119 | 0.191 | 0.255 | 0.311 | 0.361 | 0.408 |
| 0.85 | | | | 0.114 | 0.203 | 0.282 | 0.350 | 0.410 | 0.465 |
| | | | | 0.103 | 0.183 | 0.252 | 0.313 | 0.369 | 0.419 |
| 0.9 | | | | 0.093 | 0.193 | 0.278 | 0.351 | 0.415 | 0.473 |
| | | | | 0.086 | 0.174 | 0.250 | 0.317 | 0.376 | 0.431 |
| 0.95 | | | | | 0.180 | 0.274 | 0.352 | 0.420 | 0.480 |
| | | | | | 0.165 | 0.251 | 0.324 | 0.387 | 0.444 |

TABLE 1-continued

| | θ | | | | | | | | |
|---|---|---|---|---|---|---|---|---|---|
| r | 0.417 | 0.458 | 0.5 | 0.542 | 0.583 | 0.625 | 0.667 | 0.708 | 0.75 |
| 0.4 | 0.375 | 0.395 | 0.414 | 0.429 | 0.438 | | | | |
| | 0.329 | 0.350 | 0.371 | 0.392 | 0.414 | | | | |
| 0.45 | 0.388 | 0.412 | 0.433 | 0.452 | 0.466 | 0.474 | | | |
| | 0.341 | 0.365 | 0.387 | 0.409 | 0.430 | 0.453 | | | |
| 0.5 | 0.402 | 0.428 | 0.453 | 0.475 | 0.494 | 0.508 | 0.515 | | |
| | 0.355 | 0.381 | 0.405 | 0.428 | 0.450 | 0.473 | 0.498 | | |
| 0.55 | 0.417 | 0.445 | 0.473 | 0.498 | 0.521 | 0.540 | 0.554 | 0.559 | |
| | 0.369 | 0.397 | 0.424 | 0.449 | 0.473 | 0.497 | 0.522 | 0.549 | |
| 0.6 | 0.433 | 0.464 | 0.494 | 0.522 | 0.549 | 0.573 | 0.593 | 0.606 | |
| | 0.384 | 0.414 | 0.443 | 0.471 | 0.498 | 0.524 | 0.550 | 0.577 | |
| 0.65 | 0.450 | 0.484 | 0.517 | 0.547 | 0.577 | 0.605 | 0.630 | 0.650 | 0.663 |
| | 0.400 | 0.433 | 0.464 | 0.494 | 0.524 | 0.552 | 0.580 | 0.607 | 0.637 |
| 0.7 | 0.462 | 0.501 | 0.538 | 0.572 | 0.604 | 0.634 | 0.662 | 0.688 | 0.709 |
| | 0.423 | 0.457 | 0.489 | 0.521 | 0.551 | 0.580 | 0.608 | 0.636 | 0.664 |
| 0.75 | 0.478 | 0.519 | 0.558 | 0.595 | 0.629 | 0.662 | 0.692 | 0.720 | 0.746 |
| | 0.435 | 0.473 | 0.510 | 0.544 | 0.577 | 0.608 | 0.638 | 0.666 | 0.693 |
| 0.8 | 0.498 | 0.541 | 0.582 | 0.621 | 0.659 | 0.694 | 0.726 | 0.756 | 0.785 |
| | 0.450 | 0.490 | 0.529 | 0.567 | 0.604 | 0.638 | 0.670 | 0.700 | 0.729 |
| 0.85 | 0.514 | 0.560 | 0.604 | 0.646 | 0.686 | 0.725 | 0.761 | 0.793 | 0.821 |
| | 0.466 | 0.510 | 0.552 | 0.593 | 0.632 | 0.670 | 0.705 | 0.736 | 0.764 |
| 0.9 | 0.526 | 0.575 | 0.621 | 0.666 | 0.709 | 0.751 | 0.791 | 0.826 | 0.858 |
| | 0.481 | 0.528 | 0.572 | 0.615 | 0.657 | 0.699 | 0.737 | 0.772 | 0.802 |
| 0.95 | 0.535 | 0.586 | 0.635 | 0.681 | 0.726 | 0.769 | 0.811 | 0.850 | 0.884 |
| | 0.496 | 0.546 | 0.594 | 0.640 | 0.685 | 0.728 | 0.769 | 0.807 | 0.840 |

| | θ | | | | | |
|---|---|---|---|---|---|---|
| r | 0.792 | 0.833 | 0.875 | 0.917 | 0.958 | 1 |
| 0.7 | 0.723 | | | | | |
| | 0.696 | | | | | |
| 0.75 | 0.769 | 0.784 | | | | |
| | 0.722 | 0.753 | | | | |
| 0.8 | 0.809 | 0.829 | 0.845 | | | |
| | 0.754 | 0.779 | 0.809 | | | |
| 0.85 | 0.848 | 0.873 | 0.895 | 0.907 | 0.913 | |
| | 0.790 | 0.816 | 0.840 | 0.864 | 0.893 | |
| 0.9 | 0.885 | 0.908 | 0.930 | 0.949 | 0.963 | 0.969 |
| | 0.829 | 0.852 | 0.875 | 0.897 | 0.919 | 0.943 |
| 0.95 | 0.914 | 0.939 | 0.960 | 0.976 | 0.990 | 0.997 |
| | 0.869 | 0.894 | 0.916 | 0.936 | 0.957 | 0.979 |

BOSS RATIO ν = 0.35

TABLE 2

| r | θ | z |
|---|---|---|
| 0.383 | 0.641 | 0.453 |
| | | 0.446 |
| 0.466 | 0.660 | 0.487 |
| | | 0.480 |
| 0.569 | 0.724 | 0.577 |
| | | 0.571 |
| 0.697 | 0.814 | 0.721 |
| | | 0.714 |
| 0.859 | 0.984 | 0.923 |
| | | 0.916 |
| 0.924 | 1.034 | 0.984 |
| | | 0.978 |
| 0.972 | 0.981 | 0.998 |
| | | 0.991 |
| 0.993 | 0.910 | 0.985 |
| | | 0.977 |
| 1.000 | 0.838 | 0.953 |
| | | 0.946 |
| 1.000 | 0.757 | 0.900 |
| | | 0.893 |
| 1.000 | 0.678 | 0.829 |
| | | 0.823 |
| 1.000 | 0.539 | 0.680 |
| | | 0.674 |
| 1.000 | 0.403 | 0.515 |
| | | 0.509 |
| 1.000 | 0.334 | 0.415 |
| | | 0.411 |
| 1.000 | 0.260 | 0.279 |
| | | 0.275 |

TABLE 2-continued

| r | θ | z |
|---|---|---|
| 1.000 | 0.209 | 0.157 |
| | | 0.154 |
| 0.972 | 0.181 | 0.092 |
| | | 0.090 |
| 0.946 | 0.170 | 0.077 |
| | | 0.075 |
| 0.877 | 0.147 | 0.051 |
| | | 0.049 |
| 0.847 | 0.138 | 0.044 |
| | | 0.042 |
| 0.808 | 0.125 | 0.038 |
| | | 0.037 |
| 0.762 | 0.110 | 0.033 |
| | | 0.031 |
| 0.728 | 0.098 | 0.028 |
| | | 0.026 |
| 0.704 | 0.090 | 0.026 |
| | | 0.024 |
| 0.680 | 0.079 | 0.023 |
| | | 0.022 |
| 0.641 | 0.062 | 0.015 |
| | | 0.013 |
| 0.584 | 0.034 | 0.006 |
| | | 0.004 |
| 0.521 | 0.014 | 0.027 |
| | | 0.020 |

2. A die for molding a propeller fan, characterized in that a surface of a portion forming a surface of a blade of said propeller fan in the die is configured by a curved surface obtained by enlarging or reducing the base shape according to claim 1 in at least one of r, θ and z directions.

3. The propeller fan according to claim 1, characterized in that when a diameter of said propeller fan is D, a height in said z direction is h and an expansion angle of said blade is λ, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (1) below using three-dimensional coordinate values indicated in said tables 1 and 2, $$\left.\begin{aligned}
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = \frac{D}{2}\\
&b = 0\\
&c = \lambda\\
&d\text{: optional}\\
&h = e_u \geqq e_d\\
&f_u \geqq f_d\text{: optional}
\end{aligned}\right\} \quad (1)$$

the surface of the blade of said propeller fan being configured by a curved surface defined by said ($r_1$, $\theta_1$, $z_{1u}$) and said ($r_1$, $\theta_1$, $z_{1d}$).

4. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (1) recited in claim 3.

5. The propeller fan according to claim 1, characterized in that when a diameter of said propeller fan is D, a height in said z direction is h and the number of blades is n;

r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (2) below using three-dimensional coordinate values indicated in said tables 1 and 2, $$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = \frac{D}{2}\\
&b = 0\\
&c = \frac{360}{n}\\
&d\text{: optional}\\
&h = e_u \geqq e_d\\
&f_u \geqq f_d\text{: optional}
\end{aligned}\right\} \quad (2)$$

the surface of the blade of said propeller fan being configured by a curved surface defined by said ($r_1$, $\theta_1$, $z_{1u}$) and said ($r_1$, $\theta_1$, $z_{1d}$).

6. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (2) recited in claim 5.

7. The propeller fan according to claim 1, characterized in that when the diameter of said propeller fan is D and the height in said z direction is h, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (3) below using three-dimensional coordinate values indicated in said tables 1 and 2, $$\left.\begin{array}{l} r_1 = a\times r + b \text{ (mm)} \\ \theta_1 + c\times\theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = \dfrac{D}{2} \\ b = 0 \\ c = \dfrac{2400}{7}\times\dfrac{h}{D} \\ d\text{: optional} \\ h = e_u \geqq e_d \\ f_u \geqq f_d\text{: optional} \end{array}\right\} \quad (3)$$

the surface of the blade of said propeller fan being configured by a curved surface defined by said ($r_1$, $\theta_1$, $z_{1u}$) and said ($r_1$, $\theta_1$, $z_{1d}$).

8. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (3) recited in claim 7.

9. The propeller fan according to claim 1, characterized in that said propeller fan comprises a boss portion, and when a diameter of said propeller fan is D, a boss ratio which is a ratio of the diameter of said propeller fan to a diameter of said boss portion is ν, a height in said z direction is h, and an expansion angle of said blade is λ, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (4) below using three-dimensional coordinate values indicated in said tables 1 and 2, $$\left.\begin{array}{l} r_1 = a\times r + b \text{ (mm)} \\ \theta_1 = c\times\theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = \dfrac{10}{13}D(1-\nu) \\ b = -\dfrac{10}{13}D(1-\nu)\times 0.35 + \dfrac{\nu D}{2} \\ c = \lambda \\ d\text{: optional} \\ h = e_u \geqq e_d \\ f_u \geqq f_d\text{: optional} \end{array}\right\} \quad (4)$$

the surface of the blade of said propeller fan being configured by a curved surface defined by said ($r_1$, $\theta_1$, $z_{1u}$) and said ($r_1$, $\theta_1$, $z_{1d}$).

10. A die for molding the propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (4) recited in claim 9.

11. The propeller fan according to claim 1, characterized in that said propeller fan comprises a boss portion, and when a diameter of said propeller fan is D, a boss ratio which is a ratio of the diameter of said propeller fan to a diameter of said boss portion is ν, a height in said z direction is h, and the number of blades is n, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (5) below using three-dimensional coordinate values indicated in said tables 1 and 2, $$\left.\begin{array}{l} r_1 = a\times r + b \text{ (mm)} \\ \theta_1 = c\times\theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = \dfrac{10}{13}D(1-\nu) \\ b = -\dfrac{10}{13}D(1-\nu)\times 0.35 + \dfrac{\nu D}{2} \\ c = \dfrac{360}{n} \\ d\text{: optional} \\ h = e_u \geqq e_d \\ f_u \geqq f_d \end{array}\right\} \quad (5)$$

the surface of the blade of said propeller fan being configured by a curved surface defined by said ($r_1$, $\theta_1$, $z_{1u}$) and said ($r_1$, $\theta_1$, $z_{1d}$).

12. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (5) recited in claim 11.

13. The propeller fan according to claim 1, characterized in that said propeller fan comprises a boss portion, and when a diameter of said propeller fan is D, a boss ratio which is a ratio of the diameter of said propeller fan to a diameter of said boss portion is ν, and a height in said z direction is h, r, θ, z coordinates ($r_1$, $\theta_1$, $z_{1d}$) defining a surface on a suction side of said blade and r, θ, z coordinates ($r_1$, $\theta_1$, $z_{1d}$) defining a surface on a blowing side of said blade are obtained by a transformation formula (6) below using three-dimensional coordinate values indicated in said tables 1 and 2, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = \frac{10}{13} D(1 - v) \\ b = -\frac{10}{13} D(1 - v) \times 0.35 + \frac{vD}{2} \\ c = \frac{2400}{7} \times \frac{h}{D} \\ d\text{: optional} \\ h = e_u \geqq e_d \\ f_u \geqq f_d\text{: optional} \end{array}\right\} \quad (6)$$

the surface of the blade of said propeller fan being configured by a curved surface defined by said ($r_1$, $\theta_1$, $z_{1u}$) and said ($r_1$, $\theta_1$, $z_{1d}$).

14. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (6) recited in claim 13.

15. A fluid feeding device, comprising:

a blower having a propeller fan recited in any one of claims 1, 3, 5, 7, 9, 11 and 13, and a drive motor driving the propeller fan.

16. A propeller fan, characterized in that when coordinates in a cylindrical coordinate system having a z axis as a rotation axis of the propeller fan are (r, θ, z), a curved shape defined by a r coordinate value, a θ coordinate value and a z coordinate value indicated in table 101 below is determined as a base shape of a surface of a blade of said propeller fan, the surface of the blade of said propeller fan being configured by a curved surface obtained by enlarging or reducing said base shape in at lease one of r, θ and z directions, said table 101 defined as follows:

TABLE 101

| | θ | | | | | | | | | | | |
|---|---|---|---|---|---|---|---|---|---|---|---|---|
| r | 0.042 | 0.083 | 0.125 | 0.167 | 0.208 | 0.25 | 0.292 | 0.333 | 0.375 | 0.417 | 0.458 | 0.5 |
| 0.3 | | | 0.190 | 0.215 | 0.238 | 0.261 | 0.284 | 0.307 | 0.329 | 0.350 | 0.371 | 0.390 |
| | | | 0.168 | 0.184 | 0.201 | 0.218 | 0.234 | 0.252 | 0.270 | 0.288 | 0.308 | 0.327 |
| 0.35 | | 0.146 | 0.180 | 0.210 | 0.238 | 0.266 | 0.292 | 0.318 | 0.342 | 0.365 | 0.387 | 0.409 |
| | | 0.126 | 0.150 | 0.174 | 0.197 | 0.220 | 0.243 | 0.267 | 0.290 | 0.314 | 0.337 | 0.359 |
| 0.4 | 0.087 | 0.132 | 0.170 | 0.205 | 0.238 | 0.270 | 0.300 | 0.328 | 0.355 | 0.380 | 0.405 | 0.428 |
| | 0.076 | 0.110 | 0.142 | 0.172 | 0.201 | 0.229 | 0.257 | 0.284 | 0.310 | 0.336 | 0.361 | 0.384 |
| 0.45 | 0.069 | 0.116 | 0.160 | 0.201 | 0.238 | 0.274 | 0.307 | 0.339 | 0.368 | 0.396 | 0.423 | 0.448 |
| | 0.055 | 0.098 | 0.137 | 0.173 | 0.207 | 0.239 | 0.270 | 0.299 | 0.328 | 0.355 | 0.382 | 0.407 |
| 0.5 | 0.042 | 0.099 | 0.150 | 0.196 | 0.239 | 0.278 | 0.315 | 0.350 | 0.382 | 0.413 | 0.442 | 0.469 |
| | 0.033 | 0.084 | 0.131 | 0.173 | 0.212 | 0.247 | 0.280 | 0.312 | 0.343 | 0.373 | 0.401 | 0.428 |
| 0.55 | 0.010 | 0.079 | 0.138 | 0.190 | 0.238 | 0.282 | 0.292 | 0.360 | 0.395 | 0.428 | 0.459 | 0.489 |
| | 0.006 | 0.067 | 0.121 | 0.170 | 0.213 | 0.252 | 0.289 | 0.323 | 0.356 | 0.387 | 0.418 | 0.447 |
| 0.6 | | 0.056 | 0.122 | 0.180 | 0.233 | 0.281 | 0.326 | 0.367 | 0.405 | 0.441 | 0.475 | 0.507 |
| | | 0.046 | 0.107 | 0.162 | 0.211 | 0.256 | 0.296 | 0.334 | 0.369 | 0.403 | 0.435 | 0.466 |
| 0.65 | | 0.029 | 0.102 | 0.167 | 0.226 | 0.278 | 0.326 | 0.370 | 0.411 | 0.450 | 0.487 | 0.522 |
| | | 0.023 | 0.093 | 0.157 | 0.214 | 0.264 | 0.309 | 0.351 | 0.389 | 0.425 | 0.459 | 0.491 |
| 0.7 | | | 0.082 | 0.156 | 0.221 | 0.278 | 0.329 | 0.376 | 0.419 | 0.460 | 0.499 | 0.535 |
| | | | 0.074 | 0.147 | 0.210 | 0.266 | 0.316 | 0.361 | 0.403 | 0.443 | 0.480 | 0.515 |
| 0.75 | | | 0.058 | 0.139 | 0.212 | 0.276 | 0.333 | 0.385 | 0.431 | 0.474 | 0.515 | 0.554 |
| | | | 0.051 | 0.130 | 0.201 | 0.263 | 0.319 | 0.369 | 0.414 | 0.456 | 0.496 | 0.535 |
| 0.8 | | | | 0.123 | 0.204 | 0.275 | 0.338 | 0.394 | 0.444 | 0.491 | 0.534 | 0.575 |
| | | | | 0.114 | 0.192 | 0.261 | 0.322 | 0.376 | 0.426 | 0.472 | 0.515 | 0.556 |
| 0.85 | | | | 0.107 | 0.197 | 0.274 | 0.341 | 0.401 | 0.455 | 0.504 | 0.550 | 0.594 |
| | | | | 0.098 | 0.221 | 0.258 | 0.324 | 0.382 | 0.435 | 0.485 | 0.531 | 0.574 |
| 0.9 | | | | 0.087 | 0.187 | 0.271 | 0.343 | 0.406 | 0.463 | 0.515 | 0.564 | 0.610 |
| | | | | 0.081 | 0.176 | 0.256 | 0.326 | 0.388 | 0.444 | 0.496 | 0.545 | 0.591 |
| 0.95 | | | | | 0.175 | 0.268 | 0.346 | 0.413 | 0.472 | 0.526 | 0.577 | 0.625 |
| | | | | | 0.166 | 0.256 | 0.331 | 0.396 | 0.454 | 0.508 | 0.559 | 0.607 |

| | θ | | | | | | | | | | | |
|---|---|---|---|---|---|---|---|---|---|---|---|---|
| r | 0.542 | 0.583 | 0.625 | 0.667 | 0.708 | 0.75 | 0.792 | 0.833 | 0.875 | 0.917 | 0.958 | 1 |
| 0.3 | 0.409 | 0.427 | 0.443 | 0.456 | 0.465 | 0.468 | | | | | | |
| | 0.346 | 0.365 | 0.384 | 0.403 | 0.422 | 0.444 | | | | | | |
| 0.35 | 0.428 | 0.446 | 0.459 | 0.465 | | | | | | | | |
| | 0.381 | 0.402 | 0.423 | 0.445 | | | | | | | | |
| 0.4 | 0.449 | 0.466 | 0.479 | 0.485 | | | | | | | | |
| | 0.407 | 0.428 | 0.449 | 0.472 | | | | | | | | |
| 0.45 | 0.471 | 0.491 | 0.506 | 0.516 | | | | | | | | |
| | 0.430 | 0.453 | 0.475 | 0.497 | | | | | | | | |
| 0.5 | 0.494 | 0.518 | 0.538 | 0.553 | 0.560 | | | | | | | |
| | 0.453 | 0.477 | 0.501 | 0.524 | 0.549 | | | | | | | |
| 0.55 | 0.517 | 0.543 | 0.568 | 0.588 | 0.603 | | | | | | | |
| | 0.475 | 0.502 | 0.527 | 0.552 | 0.578 | | | | | | | |

TABLE 101-continued

| | | | | | | | | | | | | |
|---|---|---|---|---|---|---|---|---|---|---|---|---|
| 0.6 | 0.537 | 0.566 | 0.594 | 0.618 | 0.639 | 0.654 | | | | | | |
| | 0.496 | 0.525 | 0.553 | 0.580 | 0.606 | 0.634 | | | | | | |
| 0.65 | 0.555 | 0.586 | 0.616 | 0.644 | 0.670 | 0.692 | 0.706 | | | | | |
| | 0.522 | 0.551 | 0.580 | 0.608 | 0.635 | 0.662 | 0.690 | | | | | |
| 0.7 | 0.571 | 0.605 | 0.637 | 0.668 | 0.696 | 0.723 | 0.745 | 0.760 | | | | |
| | 0.548 | 0.580 | 0.609 | 0.637 | 0.664 | 0.691 | 0.717 | 0.746 | | | | |
| 0.75 | 0.592 | 0.628 | 0.662 | 0.694 | 0.724 | 0.752 | 0.777 | 0.799 | 0.815 | | | |
| | 0.572 | 0.607 | 0.639 | 0.670 | 0.699 | 0.724 | 0.749 | 0.774 | 0.801 | | | |
| 0.8 | 0.614 | 0.653 | 0.689 | 0.723 | 0.754 | 0.783 | 0.811 | 0.835 | 0.854 | 0.870 | | |
| | 0.595 | 0.633 | 0.669 | 0.702 | 0.731 | 0.760 | 0.787 | 0.809 | 0.830 | 0.855 | | |
| 0.85 | 0.636 | 0.676 | 0.716 | 0.752 | 0.786 | 0.815 | 0.842 | 0.867 | 0.891 | 0.910 | 0.924 | |
| | 0.617 | 0.658 | 0.697 | 0.733 | 0.765 | 0.794 | 0.819 | 0.844 | 0.867 | 0.888 | 0.907 | |
| 0.9 | 0.654 | 0.697 | 0.739 | 0.779 | 0.815 | 0.847 | 0.875 | 0.899 | 0.921 | 0.941 | 0.958 | 0.970 |
| | 0.635 | 0.678 | 0.720 | 0.760 | 0.796 | 0.827 | 0.854 | 0.878 | 0.899 | 0.920 | 0.938 | 0.955 |
| 0.95 | 0.671 | 0.716 | 0.759 | 0.800 | 0.839 | 0.873 | 0.903 | 0.928 | 0.950 | 0.968 | 0.984 | 0.996 |
| | 0.654 | 0.700 | 0.743 | 0.785 | 0.823 | 0.857 | 0.886 | 0.911 | 0.933 | 0.952 | 0.970 | 0.987 |

BOSS RATIO ν = 0.275

17. A die for molding a propeller fan, characterized in that a surface of a portion forming a surface of a blade of said propeller fan in the die is configured by a curved surface obtained by enlarging or reducing the base shape according to claim 16 in at least one of r, θ and z directions.

18. The propeller fan according to claim 16, characterized in that when a diameter of said propeller fan is D, a height in said z direction is h and an expansion angle of said blade is λ, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (101) below using three-dimensional coordinate values indicated in said table 101, $$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = D/2\\
&b = 0\\
&c = \lambda\\
&d\text{: optional}\\
&h = e_u \geqq e_d\\
&f_u \geqq f_d\text{: optional}
\end{aligned}\right\} \quad (101)$$

the surface of the blade of said propeller fan being configured by a curved surface defined by said ($r_1$, $\theta_1$, $z_{1u}$) and said ($r_1$, $\theta_1$, $z_{1d}$).

19. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (101) recited in claim 18.

20. The propeller fan according to claim 16, characterized in that when a diameter of said propeller fan is D, a height in said z direction is h, and the number of blades is n, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (102) below using three-dimensional coordinate values indicated in said table 101, $$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = D/2\\
&b = 0\\
&c = 360/n\\
&d\text{: optional}\\
&h = e_u \geqq e_d\\
&f_u \geqq f_d\text{: optional}
\end{aligned}\right\} \quad (102)$$

the surface of the blade of said propeller fan being configured by a curved surface defined by said ($r_1$, $\theta_1$, $z_{1u}$) and said ($r_1$, $\theta_1$, $z_{1d}$).

21. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (102) recited in claim 20.

22. The propeller fan according to claim 16, characterized in that when a diameter of said propeller fan is D and a height in said z direction is h, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (103) below using three-dimensional coordinate values indicated in said table 101, $$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = D/2\\
&b = 0\\
&c = \frac{2400}{7}\times\frac{h}{D}\\
&d\text{: optional}\\
&h = e_u \geqq e_d\\
&f_u \geqq f_d\text{: optional}
\end{aligned}\right\} \quad (103)$$

the surface of the blade of said propeller fan being configured by a curved surface defined by said ($r_1$, $\theta_1$, $z_{1u}$) and said ($r_1$, $\theta_1$, $z_{1d}$).

23. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (103) recited in claim 22.

24. The propeller fan according to claim 16, characterized in that said propeller fan comprises a boss portion, and when a diameter of said propeller fan is D, a boss ratio which is a ratio of the diameter of said propeller fan to a diameter of said boss portion is ν, a height in said z direction is h, and an expansion angle of said blade is λ, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (104) below using three-dimensional coordinate values indicated in said table 101, $$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = \frac{20}{29}D(1-v)\\
&b = -\frac{20}{29}D(1-v)\times 0.275 + \frac{vD}{2}\\
&c = \lambda\\
&d\text{: optional}\\
&h = e_u \geqq e_d\\
&f_u \geqq f_d\text{: optional}
\end{aligned}\right\} \quad (104)$$

the surface of the blade of said propeller fan being configured by a curved surface defined by said ($r_1$, $\theta_1$, $z_{1u}$) and said ($r_1$, $\theta_1$, $z_{1d}$).

25. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (104) recited in claim 24.

26. The propeller fan according to claim 16, characterized in that said propeller fan comprises a boss portion, and when a diameter of said propeller fan is D, a boss ratio which is a ratio of the diameter of said propeller fan to a diameter of said boss portion is ν, a height in said z direction is h, and the number of blades is n, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by the transformation formula (105) below using three-dimensional coordinate values indicated in said table 101, $$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = \frac{20}{29}D(1-v)\\
&b = -\frac{20}{29}D(1-v)\times 0.275 + \frac{vD}{2}\\
&c = 360/n\\
&d\text{: optional}\\
&h = e_u \geqq e_d\\
&f_u \geqq f_d\text{: optional}
\end{aligned}\right\} \quad (105)$$

the surface of the blade of said propeller fan being configured by a curved surface defined by said $r_1$, $\theta_1$, $z_{1u}$) and said ($r_1$, $\theta_1$, $z_{1d}$).

27. A die for molding a propeller fan, characterized in that a surface of the portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (105) recited in claim 26.

28. The propeller fan according to claim 16, characterized in that said propeller fan comprises a boss portion, when a diameter of said propeller fan is D, a boss ratio which is a ratio of the diameter of said propeller fan to a diameter of said boss portion is ν, and a height in said z direction is h, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (106) below using three-dimensional coordinate values indicated in said table 101, $$\left.\begin{aligned} r_1 &= a \times r + b \text{ (mm)} \\ \theta_1 &= c \times \theta + d \text{ (deg)} \\ z_{1u} &= e_u \times z_u + f_u \text{ (mm)} \\ z_{1d} &= e_d \times z_d + f_d \text{ (mm)} \\ &(a, c, e_u, e_d\text{: factor of proportionality, } b, d, f_u, f_d\text{: constant}) \\ &\text{wherein} \\ a &= \frac{20}{29} D(1 - v) \\ b &= -\frac{20}{29} D(1 - v) \times 0.275 + \frac{vD}{2} \\ c &= \frac{2400}{7} \times \frac{h}{D} \\ d&\text{: optional} \\ h &= e_u \geqq e_d \\ f_u &\geqq f_d\text{: optional} \end{aligned}\right\} \quad (106)$$

the surface of the blade of said propeller fan being configured by a curved surface defined by said ($r_1$, $\theta_1$, $z_{1u}$) and said ($r_1$, $\theta_1$, $z_{1d}$).

29. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (106) recited in claim 28.

30. A fluid feeding device, comprising:

a blower having a propeller fan recited in any one of claims 16, 18, 20, 22, 24, 26 and 28, and a drive motor driving the propeller fan.

31. A propeller fan, characterized in that when coordinates in a cylindrical coordinate system having a z axis as a rotation axis of the propeller fan are (r, θ, z), a curved shape defined by a r coordinate value, a θ coordinate value and a z coordinate value indicated in table 201 below is determined as a base shape of a surface of a blade of said propeller fan, the surface of the blade of said propeller fan being configured by a curved surface obtained by enlarging or reducing said base shape in at least one of r, θ and z directions, said table 201 defined as follows:

TABLE 201

| | θ | | | | | | | | | | | |
|---|---|---|---|---|---|---|---|---|---|---|---|---|
| r | 0.042 | 0.083 | 0.125 | 0.167 | 0.208 | 0.25 | 0.292 | 0.333 | 0.375 | 0.417 | 0.458 | 0.5 |
| 0.3 | | | 0.191 | 0.217 | 0.241 | 0.264 | 0.288 | 0.311 | 0.333 | 0.355 | 0.376 | 0.395 |
| | | | 0.168 | 0.184 | 0.200 | 0.216 | 0.233 | 0.249 | 0.267 | 0.285 | 0.304 | 0.324 |
| 0.35 | | 0.147 | 0.181 | 0.212 | 0.242 | 0.270 | 0.297 | 0.322 | 0.346 | 0.370 | 0.392 | 0.413 |
| | | 0.127 | 0.150 | 0.173 | 0.196 | 0.218 | 0.241 | 0.264 | 0.287 | 0.311 | 0.334 | 0.356 |
| 0.4 | 0.088 | 0.133 | 0.172 | 0.208 | 0.242 | 0.274 | 0.304 | 0.332 | 0.359 | 0.385 | 0.409 | 0.432 |
| | 0.076 | 0.110 | 0.141 | 0.171 | 0.199 | 0.227 | 0.254 | 0.280 | 0.307 | 0.332 | 0.357 | 0.380 |
| 0.45 | 0.070 | 0.118 | 0.162 | 0.203 | 0.241 | 0.277 | 0.311 | 0.343 | 0.373 | 0.401 | 0.427 | 0.452 |
| | 0.055 | 0.097 | 0.136 | 0.171 | 0.204 | 0.236 | 0.266 | 0.295 | 0.324 | 0.351 | 0.377 | 0.402 |
| 0.5 | 0.042 | 0.100 | 0.151 | 0.198 | 0.241 | 0.281 | 0.319 | 0.354 | 0.386 | 0.417 | 0.446 | 0.473 |
| | 0.033 | 0.083 | 0.130 | 0.171 | 0.209 | 0.244 | 0.277 | 0.308 | 0.339 | 0.368 | 0.397 | 0.424 |
| 0.55 | 0.010 | 0.079 | 0.139 | 0.192 | 0.240 | 0.284 | 0.325 | 0.364 | 0.399 | 0.432 | 0.463 | 0.493 |
| | 0.007 | 0.066 | 0.120 | 0.168 | 0.211 | 0.250 | 0.286 | 0.320 | 0.352 | 0.383 | 0.414 | 0.443 |
| 0.6 | | 0.056 | 0.123 | 0.182 | 0.235 | 0.283 | 0.328 | 0.370 | 0.409 | 0.445 | 0.478 | 0.511 |
| | | 0.046 | 0.106 | 0.161 | 0.209 | 0.254 | 0.294 | 0.331 | 0.366 | 0.399 | 0.431 | 0.462 |
| 0.65 | | 0.028 | 0.102 | 0.168 | 0.227 | 0.279 | 0.327 | 0.372 | 0.413 | 0.452 | 0.489 | 0.525 |
| | | 0.023 | 0.093 | 0.156 | 0.213 | 0.263 | 0.308 | 0.349 | 0.387 | 0.423 | 0.456 | 0.488 |
| 0.7 | | | 0.082 | 0.156 | 0.221 | 0.279 | 0.330 | 0.377 | 0.420 | 0.461 | 0.500 | 0.537 |
| | | | 0.074 | 0.147 | 0.210 | 0.266 | 0.315 | 0.360 | 0.402 | 0.442 | 0.479 | 0.513 |
| 0.75 | | | 0.058 | 0.140 | 0.212 | 0.277 | 0.334 | 0.386 | 0.432 | 0.475 | 0.516 | 0.556 |
| | | | 0.051 | 0.130 | 0.200 | 0.263 | 0.318 | 0.368 | 0.413 | 0.455 | 0.495 | 0.533 |
| 0.8 | | | | 0.123 | 0.204 | 0.276 | 0.339 | 0.395 | 0.446 | 0.492 | 0.535 | 0.576 |
| | | | | 0.113 | 0.191 | 0.260 | 0.320 | 0.375 | 0.425 | 0.471 | 0.514 | 0.554 |
| 0.85 | | | | 0.108 | 0.197 | 0.275 | 0.342 | 0.402 | 0.456 | 0.506 | 0.552 | 0.595 |
| | | | | 0.098 | 0.183 | 0.257 | 0.322 | 0.381 | 0.434 | 0.483 | 0.529 | 0.573 |
| 0.9 | | | | 0.087 | 0.188 | 0.272 | 0.345 | 0.408 | 0.465 | 0.517 | 0.566 | 0.612 |
| | | | | 0.081 | 0.175 | 0.255 | 0.325 | 0.387 | 0.443 | 0.494 | 0.543 | 0.589 |
| 0.95 | | | | | 0.175 | 0.269 | 0.347 | 0.414 | 0.473 | 0.528 | 0.578 | 0.626 |
| | | | | | 0.166 | 0.255 | 0.330 | 0.395 | 0.453 | 0.507 | 0.557 | 0.606 |

| | θ | | | | | | | | | | | |
|---|---|---|---|---|---|---|---|---|---|---|---|---|
| r | 0.542 | 0.583 | 0.625 | 0.667 | 0.708 | 0.75 | 0.792 | 0.833 | 0.875 | 0.917 | 0.958 | 1 |
| 0.3 | 0.414 | 0.432 | 0.447 | 0.460 | 0.468 | 0.468 | | | | | | |
| | 0.343 | 0.362 | 0.381 | 0.400 | 0.421 | 0.445 | | | | | | |
| 0.35 | 0.433 | 0.450 | 0.461 | 0.465 | | | | | | | | |
| | 0.377 | 0.399 | 0.421 | 0.445 | | | | | | | | |
| 0.4 | 0.453 | 0.470 | 0.482 | 0.485 | | | | | | | | |
| | 0.403 | 0.424 | 0.447 | 0.471 | | | | | | | | |
| 0.45 | 0.475 | 0.495 | 0.510 | 0.517 | | | | | | | | |
| | 0.426 | 0.448 | 0.471 | 0.495 | | | | | | | | |
| 0.5 | 0.499 | 0.522 | 0.541 | 0.556 | 0.561 | | | | | | | |
| | 0.449 | 0.473 | 0.497 | 0.521 | 0.549 | | | | | | | |
| 0.55 | 0.521 | 0.547 | 0.571 | 0.591 | 0.605 | | | | | | | |
| | 0.471 | 0.498 | 0.523 | 0.549 | 0.576 | | | | | | | |

TABLE 201-continued

| | | | | | | | | | | | | |
|---|---|---|---|---|---|---|---|---|---|---|---|---|
| 0.6 | 0.541 | 0.570 | 0.597 | 0.622 | 0.642 | 0.655 | | | | | | |
| | 0.492 | 0.521 | 0.549 | 0.576 | 0.603 | 0.632 | | | | | | |
| 0.65 | 0.558 | 0.590 | 0.620 | 0.648 | 0.673 | 0.694 | 0.707 | | | | | |
| | 0.519 | 0.548 | 0.576 | 0.604 | 0.631 | 0.659 | 0.689 | | | | | |
| 0.7 | 0.573 | 0.607 | 0.640 | 0.671 | 0.700 | 0.726 | 0.747 | 0.761 | | | | |
| | 0.546 | 0.578 | 0.607 | 0.634 | 0.661 | 0.688 | 0.715 | 0.745 | | | | |
| 0.75 | 0.594 | 0.630 | 0.664 | 0.696 | 0.726 | 0.754 | 0.780 | 0.801 | 0.816 | | | |
| | 0.570 | 0.605 | 0.638 | 0.668 | 0.696 | 0.721 | 0.746 | 0.771 | 0.800 | | | |
| 0.8 | 0.616 | 0.654 | 0.691 | 0.725 | 0.756 | 0.785 | 0.813 | 0.837 | 0.856 | 0.871 | | |
| | 0.594 | 0.632 | 0.667 | 0.700 | 0.730 | 0.758 | 0.785 | 0.807 | 0.828 | 0.854 | | |
| 0.85 | 0.637 | 0.678 | 0.717 | 0.754 | 0.788 | 0.817 | 0.844 | 0.869 | 0.893 | 0.912 | 0.925 | |
| | 0.615 | 0.656 | 0.695 | 0.731 | 0.764 | 0.792 | 0.817 | 0.842 | 0.865 | 0.886 | 0.906 | |
| 0.9 | 0.656 | 0.698 | 0.740 | 0.780 | 0.816 | 0.848 | 0.876 | 0.901 | 0.923 | 0.943 | 0.959 | 0.971 |
| | 0.634 | 0.677 | 0.719 | 0.759 | 0.794 | 0.825 | 0.853 | 0.876 | 0.897 | 0.918 | 0.937 | 0.954 |
| 0.95 | 0.672 | 0.717 | 0.760 | 0.801 | 0.840 | 0.874 | 0.904 | 0.929 | 0.951 | 0.969 | 0.985 | 0.996 |
| | 0.653 | 0.698 | 0.742 | 0.783 | 0.822 | 0.856 | 0.885 | 0.910 | 0.932 | 0.951 | 0.969 | 0.986 |

BOSS RATIO ν = 0.275

32. A die for molding a propeller fan, characterized in that a surface of a portion forming a surface of a blade of said propeller fan in the die is configured by a curved surface obtained by enlarging or reducing the base shape according to claim 31 in at least one of r, θ and z directions.

33. The propeller fan according to claim 31, characterized in that when a diameter of said propeller fan is D, a height in said z direction is h and an expansion angle of said blade is λ, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (201) below using three-dimensional coordinate values indicated in said table 201, $$\left.\begin{array}{l} r_1 = a\times r + b \text{ (mm)} \\ \theta_1 = c\times\theta + d \text{ (deg)} \\ z_{1u} = e_u\times z_u + f_u \text{ (mm)} \\ z_{1d} = e_d\times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = D/2 \\ b = 0 \\ c = \lambda \\ d\text{: optional} \\ h = e_u \geqq e_d \\ f_u \geqq f_d\text{: optional} \end{array}\right\} \quad (201)$$

the surface of the blade of said propeller fan being configured by a curved surface defined by said ($r_1$, $\theta_1$, $z_{1u}$) and said ($r_1$, $\theta_1$, $z_{1d}$).

34. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (201) recited in claim 33.

35. The propeller fan according to claim 31, characterized in that when a diameter of said propeller fan is D, a height in said z direction is h, and the number of blades is n, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (202) below using three-dimensional coordinate values indicated in said table 201, $$\left.\begin{array}{l} r_1 = a\times r + b \text{ (mm)} \\ \theta_1 = c\times\theta + d \text{ (deg)} \\ z_{1u} = e_u\times z_u + f_u \text{ (mm)} \\ z_{1d} = e_d\times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = D/2 \\ b = 0 \\ c = 360/n \\ d\text{: optional} \\ h = e_u \geqq e_d \\ f_u \geqq f_d\text{: optional} \end{array}\right\} \quad (202)$$

the surface of the blade of said propeller fan being configured by a curved surface defined by said ($r_1$, $\theta_1$, $z_{1u}$) and said ($r_1$, $\theta_1$, $z_{1d}$).

36. A die for molding a propeller fan, characterized in that a surface of a portion forming a surface of a blade of said propeller fan is configured by a curved surface defined by the ($r_1$, $\theta_1$, $z_{1u}$) and the ($r_1$, $\theta_1$, $z_{1d}$) obtained by the transformation formula (202) recited in claim 35.

37. The propeller fan according to claim 31, characterized in that when a diameter of said propeller fan is D and a height in said z direction is h, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (203) below using three-dimensional coordinate values indicated in said table 201, $$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = D/2\\
&b = 0\\
&c = \frac{2400}{7}\times\frac{h}{D}\\
&d\text{: optional}\\
&h = e_u \geqq e_d\\
&f_u \geqq f_d\text{: optional}
\end{aligned}\right\} \quad (203)$$

the surface of the blade of said propeller fan being configured by a curved surface defined by said ($r_1$, $\theta_1$, $z_{1u}$) and said ($r_1$, $\theta_1$, $z_{1d}$).

38. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (203) recited in claim 37.

39. The propeller fan according to claim 31, characterized in that said propeller fan comprises a boss portion, and when a diameter of said propeller fan is D, a boss ratio which is a ratio of the diameter of said propeller fan to a diameter of said boss portion is ν, a height in said z direction is h, and an expansion angle of said blade is λ, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (204) below using three-dimensional coordinate values indicated in said table 201, $$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = \frac{20}{29}D(1-\nu)\\
&b = -\frac{20}{29}D(1-\nu)\times 0.275 + \frac{\nu D}{2}\\
&c = \lambda\\
&d\text{: optional}\\
&h = e_u \geqq e_d\\
&f_u \geqq f_d\text{: optional}
\end{aligned}\right\} \quad (204)$$

the surface of the blade of said propeller fan being configured by a curved surface defined by said ($r_1$, $\theta_1$, $z_{1u}$) and said ($r_1$, $\theta_1$, $z_{1d}$).

40. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (204) recited in claim 39.

41. The propeller fan according to claim 31, characterized in that said propeller fan comprises a boss portion, and when a diameter of said propeller fan is D, a boss ratio which is a ratio of the diameter of said propeller fan to a diameter of said boss portion is ν, a height in said z direction is h, and the number of blades is n, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (205) below using three-dimensional coordinate values indicated in said table 201, $$\left.\begin{aligned}
&r_1 = a\times r + b \text{ (mm)}\\
&\theta_1 = c\times\theta + d \text{ (deg)}\\
&z_{1u} = e_u\times z_u + f_u \text{ (mm)}\\
&z_{1d} = e_d\times z_d + f_d \text{ (mm)}\\
&(a, c, e_u, e_d\text{: factor of proportionality, } b, d, f_u, f_d\text{: constant})\\
&\text{wherein}\\
&a = \frac{20}{29}D(1-\nu)\\
&b = -\frac{20}{29}D(1-\nu)\times 0.275 + \frac{\nu D}{2}\\
&c = 360/n\\
&d\text{: optional}\\
&h = e_u \geqq e_d\\
&f_u \geqq f_d\text{: optional}
\end{aligned}\right\} \quad (205)$$

the surface of the blade of said propeller fan being configured by a curved surface defined by said ($r_1$, $\theta_1$, $z_{1u}$) and said ($r_1$, $\theta_1$, $z_{1d}$).

42. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (205) recited in claim 41.

43. The propeller fan according to claim 31, characterized in that said propeller fan comprises a boss portion, and when a diameter of said propeller fan is D, a boss ratio which is a ratio of the diameter of said propeller fan to a diameter of said boss portion is ν, and a height in said z direction is, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (206) below using three-dimensional coordinate values indicated in said table 201, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = \frac{20}{29} D(1-v) \\ b = -\frac{20}{29} D(1-v) \times 0.275 + \frac{vD}{2} \\ c = \frac{2400}{7} \times \frac{h}{D} \\ d\text{: optional} \\ h = e_u \geqq e_d \\ f_u \geqq f_d\text{: optional} \end{array}\right\} \quad (206)$$

the surface of the blade of said propeller fan being configured by a curved surface defined by said ($r_1$, $\theta_1$, $z_{1u}$) and said ($r_1$, $\theta_1$, $z_{1d}$).

44. A die for molding a propeller fan, characterized in that a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (206) recited in claim 43.

45. A fluid feeding device, comprising:

a blower having a propeller fan recited in any one of claims 31, 33, 35, 37, 39, 41 and 43, and a drive motor driving the propeller fan.

* * * * *

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

<u>Columns 1-4</u>,
Replace Table 3 with the following:

| θ / r | 0.042 | 0.083 | 0.125 | 0.167 | 0.208 | 0.25 | 0.292 | 0.333 | 0.375 | 0.417 | 0.458 | 0.5 | 0.542 | 0.583 | 0.625 | 0.667 | 0.708 | 0.75 | 0.792 | 0.833 | 0.875 | 0.917 | 0.958 | 1 |
|---|---|---|---|---|---|---|---|---|---|---|---|---|---|---|---|---|---|---|---|---|---|---|---|---|
| 0.4 | | 0.145 | 0.181 | 0.214 | 0.246 | 0.276 | 0.304 | 0.329 | 0.353 | 0.375 | 0.395 | 0.414 | 0.429 | 0.438 | | | | | | | | | | |
| | | 0.137 | 0.164 | 0.190 | 0.214 | 0.237 | 0.261 | 0.284 | 0.307 | 0.329 | 0.350 | 0.371 | 0.392 | 0.414 | | | | | | | | | | |
| 0.45 | 0.085 | 0.134 | 0.176 | 0.215 | 0.249 | 0.280 | 0.310 | 0.337 | 0.363 | 0.388 | 0.412 | 0.433 | 0.452 | 0.466 | 0.474 | | | | | | | | | |
| | 0.080 | 0.118 | 0.152 | 0.183 | 0.211 | 0.239 | 0.265 | 0.291 | 0.317 | 0.341 | 0.365 | 0.387 | 0.409 | 0.430 | 0.453 | | | | | | | | | |
| 0.5 | 0.074 | 0.124 | 0.168 | 0.209 | 0.246 | 0.282 | 0.315 | 0.345 | 0.375 | 0.402 | 0.428 | 0.453 | 0.475 | 0.494 | 0.508 | 0.515 | | | | | | | | |
| | 0.061 | 0.105 | 0.144 | 0.179 | 0.211 | 0.242 | 0.271 | 0.300 | 0.328 | 0.355 | 0.381 | 0.405 | 0.428 | 0.450 | 0.473 | 0.498 | | | | | | | | |
| 0.55 | 0.044 | 0.102 | 0.153 | 0.200 | 0.242 | 0.282 | 0.319 | 0.354 | 0.386 | 0.417 | 0.445 | 0.473 | 0.498 | 0.521 | 0.540 | 0.554 | 0.559 | | | | | | | |
| | 0.036 | 0.087 | 0.133 | 0.174 | 0.211 | 0.246 | 0.279 | 0.310 | 0.340 | 0.369 | 0.397 | 0.424 | 0.449 | 0.473 | 0.497 | 0.522 | 0.549 | | | | | | | |
| 0.6 | | 0.077 | 0.137 | 0.190 | 0.238 | 0.283 | 0.325 | 0.364 | 0.399 | 0.433 | 0.464 | 0.494 | 0.522 | 0.549 | 0.573 | 0.593 | 0.606 | | | | | | | |
| | | 0.065 | 0.120 | 0.168 | 0.211 | 0.250 | 0.286 | 0.320 | 0.352 | 0.384 | 0.414 | 0.443 | 0.471 | 0.498 | 0.524 | 0.550 | 0.577 | | | | | | | |
| 0.65 | | 0.050 | 0.119 | 0.180 | 0.234 | 0.285 | 0.331 | 0.374 | 0.413 | 0.450 | 0.484 | 0.517 | 0.547 | 0.577 | 0.605 | 0.630 | 0.650 | 0.663 | | | | | | |
| | | 0.043 | 0.105 | 0.160 | 0.210 | 0.254 | 0.295 | 0.332 | 0.367 | 0.400 | 0.433 | 0.464 | 0.494 | 0.524 | 0.552 | 0.580 | 0.607 | 0.637 | | | | | | |
| 0.7 | | | 0.096 | 0.167 | 0.228 | 0.283 | 0.333 | 0.379 | 0.422 | 0.462 | 0.501 | 0.538 | 0.572 | 0.604 | 0.634 | 0.662 | 0.688 | 0.709 | 0.723 | | | | | |
| | | | 0.087 | 0.152 | 0.210 | 0.261 | 0.307 | 0.349 | 0.387 | 0.423 | 0.457 | 0.489 | 0.521 | 0.551 | 0.580 | 0.608 | 0.636 | 0.664 | 0.696 | | | | | |
| 0.75 | | | 0.072 | 0.152 | 0.222 | 0.284 | 0.339 | 0.389 | 0.435 | 0.478 | 0.519 | 0.558 | 0.595 | 0.629 | 0.662 | 0.692 | 0.720 | 0.746 | 0.769 | 0.784 | | | | |
| | | | 0.065 | 0.137 | 0.201 | 0.258 | 0.308 | 0.354 | 0.395 | 0.435 | 0.473 | 0.510 | 0.544 | 0.577 | 0.608 | 0.638 | 0.666 | 0.693 | 0.722 | 0.753 | | | | |
| 0.8 | | | 0.043 | 0.133 | 0.212 | 0.282 | 0.346 | 0.402 | 0.452 | 0.498 | 0.541 | 0.582 | 0.621 | 0.659 | 0.694 | 0.726 | 0.756 | 0.785 | 0.809 | 0.829 | 0.845 | | | |
| | | | 0.040 | 0.119 | 0.191 | 0.255 | 0.311 | 0.361 | 0.408 | 0.450 | 0.490 | 0.529 | 0.567 | 0.604 | 0.638 | 0.670 | 0.700 | 0.729 | 0.754 | 0.779 | 0.809 | | | |
| 0.85 | | | | 0.114 | 0.203 | 0.282 | 0.350 | 0.410 | 0.465 | 0.514 | 0.560 | 0.604 | 0.646 | 0.686 | 0.725 | 0.761 | 0.793 | 0.821 | 0.848 | 0.873 | 0.895 | 0.907 | 0.913 | |
| | | | | 0.103 | 0.183 | 0.252 | 0.313 | 0.369 | 0.419 | 0.466 | 0.510 | 0.552 | 0.593 | 0.632 | 0.670 | 0.705 | 0.736 | 0.764 | 0.790 | 0.816 | 0.840 | 0.864 | 0.893 | |
| 0.9 | | | | 0.093 | 0.193 | 0.278 | 0.351 | 0.415 | 0.473 | 0.526 | 0.575 | 0.621 | 0.666 | 0.709 | 0.751 | 0.791 | 0.826 | 0.858 | 0.885 | 0.908 | 0.930 | 0.949 | 0.963 | 0.969 |
| | | | | 0.086 | 0.174 | 0.250 | 0.317 | 0.376 | 0.431 | 0.481 | 0.528 | 0.572 | 0.615 | 0.657 | 0.699 | 0.737 | 0.772 | 0.802 | 0.829 | 0.852 | 0.875 | 0.897 | 0.919 | 0.943 |
| 0.95 | | | | | 0.180 | 0.274 | 0.352 | 0.420 | 0.480 | 0.535 | 0.586 | 0.635 | 0.681 | 0.726 | 0.769 | 0.811 | 0.850 | 0.884 | 0.914 | 0.939 | 0.960 | 0.976 | 0.990 | 0.997 |
| | | | | | 0.165 | 0.251 | 0.324 | 0.387 | 0.444 | 0.496 | 0.546 | 0.594 | 0.640 | 0.685 | 0.728 | 0.769 | 0.807 | 0.840 | 0.869 | 0.894 | 0.916 | 0.936 | 0.957 | 0.979 |

BOSS RATIO $\nu = 0.35$

TABLE 3

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 9-10,
Replace Table 102 with the following:

| θ / r | 0.042 | 0.083 | 0.125 | 0.167 | 0.208 | 0.25 | 0.292 | 0.333 | 0.375 | 0.417 | 0.458 | 0.5 | 0.542 | 0.583 | 0.625 | 0.667 | 0.708 | 0.75 | 0.792 | 0.833 | 0.875 | 0.917 | 0.958 | 1 |
|---|---|---|---|---|---|---|---|---|---|---|---|---|---|---|---|---|---|---|---|---|---|---|---|---|
| 0.3 | | | 0.190 | 0.215 | 0.238 | 0.261 | 0.284 | 0.307 | 0.329 | 0.350 | 0.371 | 0.390 | 0.409 | 0.427 | 0.443 | 0.456 | 0.465 | 0.468 | | | | | | |
| | | | 0.168 | 0.184 | 0.201 | 0.218 | 0.234 | 0.252 | 0.270 | 0.288 | 0.308 | 0.327 | 0.346 | 0.365 | 0.384 | 0.403 | 0.422 | 0.444 | | | | | | |
| 0.35 | | 0.146 | 0.180 | 0.210 | 0.238 | 0.266 | 0.292 | 0.318 | 0.342 | 0.365 | 0.387 | 0.409 | 0.428 | 0.446 | 0.459 | 0.465 | | | | | | | | |
| | | 0.126 | 0.150 | 0.174 | 0.197 | 0.220 | 0.243 | 0.267 | 0.290 | 0.314 | 0.337 | 0.359 | 0.381 | 0.402 | 0.423 | 0.445 | | | | | | | | |
| 0.4 | 0.087 | 0.132 | 0.170 | 0.205 | 0.238 | 0.270 | 0.300 | 0.328 | 0.355 | 0.380 | 0.405 | 0.428 | 0.449 | 0.466 | 0.479 | 0.485 | | | | | | | | |
| | 0.076 | 0.110 | 0.142 | 0.172 | 0.201 | 0.229 | 0.257 | 0.284 | 0.310 | 0.336 | 0.361 | 0.384 | 0.407 | 0.428 | 0.449 | 0.472 | | | | | | | | |
| 0.45 | 0.069 | 0.116 | 0.160 | 0.201 | 0.238 | 0.274 | 0.307 | 0.339 | 0.368 | 0.396 | 0.423 | 0.446 | 0.471 | 0.491 | 0.506 | 0.516 | | | | | | | | |
| | 0.055 | 0.098 | 0.137 | 0.173 | 0.207 | 0.239 | 0.270 | 0.299 | 0.328 | 0.355 | 0.382 | 0.407 | 0.430 | 0.453 | 0.475 | 0.497 | | | | | | | | |
| 0.5 | 0.042 | 0.099 | 0.150 | 0.196 | 0.239 | 0.278 | 0.315 | 0.350 | 0.382 | 0.413 | 0.442 | 0.469 | 0.494 | 0.518 | 0.538 | 0.553 | 0.560 | | | | | | | |
| | 0.033 | 0.084 | 0.131 | 0.173 | 0.212 | 0.247 | 0.280 | 0.312 | 0.343 | 0.373 | 0.401 | 0.428 | 0.453 | 0.477 | 0.501 | 0.524 | 0.549 | | | | | | | |
| 0.55 | 0.010 | 0.079 | 0.138 | 0.190 | 0.238 | 0.282 | 0.292 | 0.360 | 0.395 | 0.428 | 0.459 | 0.489 | 0.517 | 0.543 | 0.568 | 0.588 | 0.603 | | | | | | | |
| | 0.006 | 0.067 | 0.121 | 0.170 | 0.213 | 0.252 | 0.289 | 0.323 | 0.356 | 0.387 | 0.418 | 0.447 | 0.476 | 0.502 | 0.527 | 0.552 | 0.578 | | | | | | | |
| 0.6 | | 0.056 | 0.122 | 0.180 | 0.233 | 0.281 | 0.326 | 0.367 | 0.405 | 0.441 | 0.475 | 0.507 | 0.537 | 0.566 | 0.594 | 0.618 | 0.639 | 0.654 | | | | | | |
| | | 0.046 | 0.107 | 0.162 | 0.211 | 0.256 | 0.296 | 0.334 | 0.369 | 0.403 | 0.435 | 0.466 | 0.496 | 0.525 | 0.553 | 0.580 | 0.606 | 0.634 | | | | | | |
| 0.65 | | 0.029 | 0.102 | 0.167 | 0.226 | 0.278 | 0.326 | 0.370 | 0.411 | 0.450 | 0.487 | 0.522 | 0.555 | 0.586 | 0.616 | 0.644 | 0.670 | 0.692 | 0.708 | | | | | |
| | | 0.023 | 0.093 | 0.157 | 0.214 | 0.264 | 0.309 | 0.351 | 0.389 | 0.425 | 0.459 | 0.491 | 0.522 | 0.551 | 0.580 | 0.608 | 0.635 | 0.662 | 0.690 | | | | | |
| 0.7 | | | 0.082 | 0.156 | 0.221 | 0.278 | 0.329 | 0.376 | 0.419 | 0.460 | 0.499 | 0.535 | 0.571 | 0.605 | 0.637 | 0.668 | 0.696 | 0.723 | 0.745 | 0.760 | | | | |
| | | | 0.074 | 0.147 | 0.210 | 0.266 | 0.316 | 0.361 | 0.403 | 0.443 | 0.480 | 0.515 | 0.548 | 0.580 | 0.609 | 0.637 | 0.664 | 0.691 | 0.717 | 0.746 | | | | |
| 0.75 | | | 0.056 | 0.139 | 0.212 | 0.276 | 0.333 | 0.385 | 0.431 | 0.474 | 0.515 | 0.554 | 0.592 | 0.628 | 0.662 | 0.694 | 0.724 | 0.752 | 0.777 | 0.799 | 0.815 | | | |
| | | | 0.051 | 0.130 | 0.201 | 0.263 | 0.319 | 0.369 | 0.414 | 0.456 | 0.496 | 0.535 | 0.572 | 0.607 | 0.639 | 0.670 | 0.699 | 0.724 | 0.749 | 0.774 | 0.801 | | | |
| 0.8 | | | | 0.123 | 0.204 | 0.275 | 0.338 | 0.394 | 0.444 | 0.491 | 0.534 | 0.575 | 0.614 | 0.653 | 0.689 | 0.723 | 0.754 | 0.783 | 0.811 | 0.835 | 0.854 | 0.870 | | |
| | | | | 0.114 | 0.192 | 0.261 | 0.322 | 0.376 | 0.426 | 0.472 | 0.515 | 0.556 | 0.595 | 0.633 | 0.669 | 0.702 | 0.731 | 0.760 | 0.787 | 0.809 | 0.830 | 0.855 | | |
| 0.85 | | | | 0.107 | 0.197 | 0.274 | 0.341 | 0.401 | 0.455 | 0.504 | 0.550 | 0.594 | 0.636 | 0.676 | 0.716 | 0.752 | 0.786 | 0.815 | 0.842 | 0.867 | 0.891 | 0.910 | 0.924 | |
| | | | | 0.098 | 0.221 | 0.258 | 0.324 | 0.382 | 0.435 | 0.485 | 0.531 | 0.574 | 0.617 | 0.658 | 0.697 | 0.733 | 0.765 | 0.794 | 0.819 | 0.844 | 0.867 | 0.888 | 0.907 | |
| 0.9 | | | | 0.087 | 0.167 | 0.271 | 0.343 | 0.406 | 0.463 | 0.515 | 0.564 | 0.610 | 0.654 | 0.697 | 0.739 | 0.779 | 0.815 | 0.847 | 0.875 | 0.899 | 0.921 | 0.941 | 0.958 | 0.970 |
| | | | | 0.081 | 0.176 | 0.256 | 0.326 | 0.388 | 0.444 | 0.496 | 0.545 | 0.591 | 0.635 | 0.678 | 0.720 | 0.760 | 0.796 | 0.827 | 0.854 | 0.878 | 0.899 | 0.920 | 0.938 | 0.955 |
| 0.95 | | | | | 0.175 | 0.268 | 0.346 | 0.413 | 0.472 | 0.526 | 0.577 | 0.625 | 0.671 | 0.716 | 0.759 | 0.800 | 0.839 | 0.873 | 0.903 | 0.928 | 0.950 | 0.968 | 0.984 | 0.996 |
| | | | | | 0.166 | 0.256 | 0.331 | 0.396 | 0.454 | 0.508 | 0.559 | 0.607 | 0.654 | 0.700 | 0.743 | 0.785 | 0.823 | 0.857 | 0.886 | 0.911 | 0.933 | 0.952 | 0.970 | 0.987 |

BOSS RATIO $\nu =$ 0.275

TABLE 102

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 15-16,
Replace Table 202 with the following:

| θ / r | 0.042 | 0.083 | 0.125 | 0.167 | 0.208 | 0.25 | 0.292 | 0.333 | 0.375 | 0.417 | 0.458 | 0.5 | 0.542 | 0.583 | 0.625 | 0.667 | 0.708 | 0.75 | 0.792 | 0.833 | 0.875 | 0.917 | 0.958 | 1 |
|---|---|---|---|---|---|---|---|---|---|---|---|---|---|---|---|---|---|---|---|---|---|---|---|---|
| 0.3 | | | 0.191 | 0.217 | 0.241 | 0.264 | 0.288 | 0.311 | 0.333 | 0.355 | 0.376 | 0.395 | 0.414 | 0.432 | 0.447 | 0.460 | 0.468 | 0.468 | | | | | | |
| | | | 0.168 | 0.184 | 0.200 | 0.216 | 0.233 | 0.249 | 0.267 | 0.285 | 0.304 | 0.324 | 0.343 | 0.362 | 0.381 | 0.400 | 0.421 | 0.445 | | | | | | |
| 0.35 | | 0.147 | 0.181 | 0.212 | 0.242 | 0.270 | 0.297 | 0.322 | 0.346 | 0.370 | 0.392 | 0.413 | 0.433 | 0.450 | 0.461 | 0.465 | | | | | | | | |
| | | 0.127 | 0.150 | 0.173 | 0.196 | 0.218 | 0.241 | 0.264 | 0.287 | 0.311 | 0.334 | 0.356 | 0.377 | 0.399 | 0.421 | 0.445 | | | | | | | | |
| 0.4 | 0.088 | 0.133 | 0.172 | 0.208 | 0.242 | 0.274 | 0.304 | 0.332 | 0.359 | 0.385 | 0.409 | 0.432 | 0.453 | 0.470 | 0.482 | 0.485 | | | | | | | | |
| | 0.076 | 0.110 | 0.141 | 0.171 | 0.199 | 0.227 | 0.254 | 0.280 | 0.307 | 0.332 | 0.357 | 0.380 | 0.403 | 0.424 | 0.447 | 0.471 | | | | | | | | |
| 0.45 | 0.070 | 0.118 | 0.162 | 0.203 | 0.241 | 0.277 | 0.311 | 0.343 | 0.373 | 0.401 | 0.427 | 0.452 | 0.475 | 0.495 | 0.510 | 0.517 | | | | | | | | |
| | 0.055 | 0.097 | 0.136 | 0.171 | 0.204 | 0.236 | 0.266 | 0.295 | 0.324 | 0.351 | 0.377 | 0.402 | 0.426 | 0.448 | 0.471 | 0.495 | | | | | | | | |
| 0.5 | 0.042 | 0.100 | 0.151 | 0.198 | 0.241 | 0.281 | 0.319 | 0.354 | 0.386 | 0.417 | 0.446 | 0.473 | 0.499 | 0.522 | 0.541 | 0.556 | 0.561 | | | | | | | |
| | 0.033 | 0.083 | 0.130 | 0.171 | 0.209 | 0.244 | 0.277 | 0.308 | 0.339 | 0.368 | 0.397 | 0.424 | 0.449 | 0.473 | 0.497 | 0.521 | 0.549 | | | | | | | |
| 0.55 | 0.010 | 0.079 | 0.139 | 0.192 | 0.240 | 0.284 | 0.325 | 0.364 | 0.399 | 0.432 | 0.463 | 0.493 | 0.521 | 0.547 | 0.571 | 0.591 | 0.605 | | | | | | | |
| | 0.007 | 0.066 | 0.120 | 0.168 | 0.211 | 0.250 | 0.286 | 0.320 | 0.352 | 0.383 | 0.414 | 0.443 | 0.471 | 0.498 | 0.523 | 0.549 | 0.576 | | | | | | | |
| 0.6 | | 0.056 | 0.123 | 0.182 | 0.235 | 0.283 | 0.328 | 0.370 | 0.409 | 0.445 | 0.478 | 0.511 | 0.541 | 0.570 | 0.597 | 0.622 | 0.642 | 0.655 | | | | | | |
| | | 0.046 | 0.106 | 0.161 | 0.209 | 0.254 | 0.294 | 0.331 | 0.366 | 0.399 | 0.431 | 0.462 | 0.492 | 0.521 | 0.549 | 0.576 | 0.603 | 0.632 | | | | | | |
| 0.65 | | 0.028 | 0.102 | 0.168 | 0.227 | 0.279 | 0.327 | 0.372 | 0.413 | 0.452 | 0.489 | 0.525 | 0.558 | 0.590 | 0.620 | 0.648 | 0.673 | 0.694 | 0.707 | | | | | |
| | | 0.023 | 0.093 | 0.156 | 0.213 | 0.263 | 0.308 | 0.349 | 0.387 | 0.423 | 0.456 | 0.488 | 0.519 | 0.548 | 0.576 | 0.604 | 0.631 | 0.659 | 0.689 | | | | | |
| 0.7 | | | 0.082 | 0.156 | 0.221 | 0.279 | 0.330 | 0.377 | 0.420 | 0.461 | 0.500 | 0.537 | 0.573 | 0.607 | 0.640 | 0.671 | 0.700 | 0.726 | 0.747 | 0.761 | | | | |
| | | | 0.074 | 0.147 | 0.210 | 0.266 | 0.315 | 0.360 | 0.402 | 0.442 | 0.479 | 0.513 | 0.546 | 0.578 | 0.607 | 0.634 | 0.661 | 0.688 | 0.715 | 0.745 | | | | |
| 0.75 | | | 0.058 | 0.140 | 0.212 | 0.277 | 0.334 | 0.386 | 0.432 | 0.475 | 0.516 | 0.556 | 0.594 | 0.630 | 0.664 | 0.696 | 0.726 | 0.754 | 0.780 | 0.801 | 0.816 | | | |
| | | | 0.051 | 0.130 | 0.200 | 0.263 | 0.318 | 0.368 | 0.413 | 0.455 | 0.495 | 0.533 | 0.570 | 0.605 | 0.638 | 0.668 | 0.696 | 0.721 | 0.746 | 0.771 | 0.800 | | | |
| 0.8 | | | | 0.123 | 0.204 | 0.276 | 0.339 | 0.395 | 0.446 | 0.492 | 0.535 | 0.576 | 0.616 | 0.654 | 0.691 | 0.725 | 0.756 | 0.785 | 0.813 | 0.837 | 0.856 | 0.871 | | |
| | | | | 0.113 | 0.191 | 0.260 | 0.320 | 0.375 | 0.425 | 0.471 | 0.514 | 0.554 | 0.594 | 0.632 | 0.667 | 0.700 | 0.730 | 0.758 | 0.785 | 0.807 | 0.828 | 0.854 | | |
| 0.85 | | | | 0.108 | 0.197 | 0.275 | 0.342 | 0.402 | 0.456 | 0.506 | 0.552 | 0.595 | 0.637 | 0.678 | 0.717 | 0.754 | 0.788 | 0.817 | 0.844 | 0.869 | 0.893 | 0.912 | 0.925 | |
| | | | | 0.098 | 0.183 | 0.257 | 0.322 | 0.381 | 0.434 | 0.483 | 0.529 | 0.573 | 0.615 | 0.656 | 0.695 | 0.731 | 0.764 | 0.792 | 0.817 | 0.842 | 0.865 | 0.886 | 0.906 | |
| 0.9 | | | | 0.087 | 0.188 | 0.272 | 0.345 | 0.408 | 0.465 | 0.517 | 0.566 | 0.612 | 0.656 | 0.698 | 0.740 | 0.780 | 0.816 | 0.848 | 0.876 | 0.901 | 0.923 | 0.943 | 0.959 | 0.971 |
| | | | | 0.081 | 0.175 | 0.255 | 0.325 | 0.387 | 0.443 | 0.494 | 0.543 | 0.589 | 0.634 | 0.677 | 0.719 | 0.759 | 0.794 | 0.825 | 0.853 | 0.876 | 0.897 | 0.918 | 0.937 | 0.954 |
| 0.95 | | | | | 0.175 | 0.269 | 0.347 | 0.414 | 0.473 | 0.528 | 0.578 | 0.626 | 0.672 | 0.717 | 0.760 | 0.801 | 0.840 | 0.874 | 0.904 | 0.929 | 0.951 | 0.969 | 0.985 | 0.996 |
| | | | | | 0.166 | 0.255 | 0.330 | 0.395 | 0.453 | 0.507 | 0.557 | 0.606 | 0.653 | 0.698 | 0.742 | 0.783 | 0.822 | 0.856 | 0.885 | 0.910 | 0.932 | 0.951 | 0.969 | 0.986 |

BOSS RATIO $\nu = 0.275$

TABLE 202

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

<u>Columns 23-26,</u>
Replace Table 5 with the following:

EMBODIMENT 1

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 |
|---|---|---|---|---|---|---|---|---|---|---|---|---|---|---|---|---|---|---|---|---|---|---|---|---|
| 80 | | 20.36 | 25.34 | 30.00 | 34.46 | 38.65 | 42.52 | 46.08 | 49.39 | 52.49 | 55.36 | 57.96 | 60.02 | 61.27 | | | | | | | | | | |
| | | 19.19 | 22.97 | 26.56 | 29.91 | 33.18 | 36.47 | 39.76 | 42.98 | 46.07 | 49.03 | 51.96 | 54.89 | 57.99 | | | | | | | | | | |
| 90 | 11.84 | 18.75 | 24.70 | 30.07 | 34.89 | 39.26 | 43.36 | 47.22 | 50.87 | 54.35 | 57.64 | 60.68 | 63.30 | 65.30 | 66.35 | | | | | | | | | |
| | 11.18 | 16.51 | 21.33 | 25.59 | 29.56 | 33.39 | 37.14 | 40.80 | 44.35 | 47.78 | 51.07 | 54.21 | 57.22 | 60.21 | 63.39 | | | | | | | | | |
| 100 | 10.33 | 17.37 | 23.51 | 29.19 | 34.48 | 39.42 | 44.03 | 48.36 | 52.43 | 56.29 | 59.94 | 63.36 | 66.49 | 69.17 | 71.18 | 72.05 | | | | | | | | |
| | 8.52 | 14.71 | 20.11 | 25.01 | 29.55 | 33.86 | 38.00 | 42.01 | 45.91 | 49.67 | 53.27 | 56.68 | 59.91 | 63.05 | 66.22 | 69.66 | | | | | | | | |
| 110 | 6.21 | 14.29 | 21.44 | 27.93 | 33.92 | 39.48 | 44.66 | 49.50 | 54.04 | 58.32 | 62.35 | 66.15 | 69.69 | 72.92 | 75.65 | 77.62 | 78.26 | | | | | | | |
| | 4.97 | 12.16 | 18.60 | 24.37 | 29.60 | 34.42 | 38.99 | 43.36 | 47.58 | 51.67 | 55.59 | 59.33 | 62.88 | 66.25 | 69.58 | 73.01 | 76.90 | | | | | | | |
| 120 | | 10.71 | 19.11 | 26.57 | 33.37 | 39.65 | 45.48 | 50.89 | 55.92 | 60.59 | 64.98 | 69.13 | 73.07 | 76.81 | 80.18 | 82.95 | 84.78 | | | | | | | |
| | | 9.11 | 16.73 | 23.49 | 29.51 | 34.97 | 40.02 | 44.78 | 49.32 | 53.70 | 57.93 | 62.01 | 65.94 | 69.71 | 73.39 | 77.01 | 80.82 | | | | | | | |
| 130 | | 7.02 | 15.69 | 25.16 | 32.82 | 39.83 | 46.30 | 52.29 | 57.83 | 62.98 | 67.78 | 72.31 | 76.61 | 80.73 | 84.63 | 88.15 | 91.01 | 92.76 | | | | | | |
| | | 6.08 | 14.72 | 22.44 | 29.37 | 35.62 | 41.29 | 46.50 | 51.40 | 56.06 | 60.56 | 64.94 | 69.19 | 73.31 | 77.29 | 81.15 | 85.02 | 89.15 | | | | | | |
| 140 | | | 13.47 | 23.32 | 31.95 | 39.64 | 46.60 | 53.03 | 59.05 | 64.74 | 70.19 | 75.25 | 80.05 | 84.52 | 88.69 | 92.63 | 96.25 | 99.29 | 101.19 | | | | | |
| | | | 12.22 | 21.33 | 29.40 | 36.56 | 42.98 | 48.79 | 54.14 | 59.16 | 63.93 | 68.50 | 72.88 | 77.08 | 81.14 | 85.10 | 89.03 | 93.02 | 97.44 | | | | | |
| 150 | | | 10.05 | 21.25 | 31.04 | 39.74 | 47.51 | 54.51 | 60.93 | 66.94 | 72.66 | 78.12 | 83.24 | 87.99 | 92.62 | 96.90 | 100.83 | 104.48 | 107.63 | 109.73 | | | | |
| | | | 9.05 | 19.18 | 28.19 | 36.14 | 43.17 | 49.51 | 55.35 | 60.89 | 66.21 | 71.33 | 76.16 | 80.73 | 85.13 | 89.25 | 93.19 | 97.08 | 101.03 | 105.47 | | | | |
| 160 | | | 5.96 | 18.57 | 29.65 | 39.54 | 48.37 | 56.24 | 63.30 | 69.74 | 75.72 | 81.43 | 86.95 | 92.22 | 97.14 | 101.64 | 105.86 | 109.91 | 113.19 | 116.11 | 118.25 | | | |
| | | | 5.58 | 16.69 | 26.79 | 35.67 | 43.53 | 50.60 | 57.05 | 63.02 | 68.64 | 74.09 | 79.40 | 84.50 | 89.30 | 93.73 | 97.98 | 102.08 | 105.56 | 109.11 | 113.20 | | | |
| 170 | | | | 15.93 | 28.44 | 39.41 | 48.98 | 57.43 | 65.03 | 71.96 | 78.42 | 84.51 | 90.37 | 96.06 | 101.50 | 106.51 | 111.00 | 114.93 | 118.65 | 122.20 | 125.26 | 126.99 | 127.75 | |
| | | | | 14.36 | 25.56 | 35.24 | 43.84 | 51.60 | 58.70 | 65.28 | 71.45 | 77.31 | 83.00 | 88.53 | 93.77 | 98.64 | 103.00 | 106.90 | 110.64 | 114.28 | 117.65 | 120.94 | 125.07 | |
| 180 | | | | 12.98 | 27.05 | 38.97 | 49.19 | 58.15 | 66.20 | 73.58 | 80.46 | 86.96 | 93.19 | 99.21 | 105.12 | 110.69 | 115.67 | 120.05 | 123.85 | 127.09 | 130.15 | 132.82 | 134.80 | 135.62 |
| | | | | 11.97 | 24.41 | 34.96 | 44.34 | 52.70 | 60.29 | 67.30 | 73.88 | 80.13 | 86.13 | 92.01 | 97.79 | 103.20 | 108.03 | 112.33 | 116.02 | 119.27 | 122.50 | 125.62 | 128.68 | 131.96 |
| 190 | | | | | 25.14 | 38.38 | 49.32 | 58.78 | 67.22 | 74.94 | 82.10 | 88.85 | 95.35 | 101.59 | 107.62 | 113.53 | 119.04 | 123.81 | 127.91 | 131.40 | 134.34 | 136.68 | 138.54 | 139.54 |
| | | | | | 23.04 | 35.12 | 45.33 | 54.17 | 62.13 | 69.50 | 76.45 | 83.12 | 89.61 | 95.86 | 101.86 | 107.64 | 112.97 | 117.62 | 121.64 | 125.20 | 128.24 | 131.03 | 134.02 | 137.11 |

(deg)

(mm)

DIAMETER $D = 400$
HEIGHT $h = 140$
EXPANSION ANGLE $\lambda = 120$
BOSS RATIO $\nu = 0.35$

TABLE 5

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 27-30,
Replace Table 7 with the following:

EMBODIMENT 7

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80 | | 22.40 | 27.87 | 33.00 | 37.91 | 42.52 | 46.77 | 50.69 | 54.33 | 57.74 | 60.90 | 63.76 | 66.02 | 67.40 | | | | | | | | | | |
| | | 21.11 | 25.27 | 29.22 | 32.90 | 36.50 | 40.12 | 43.74 | 47.28 | 50.68 | 53.93 | 57.16 | 60.38 | 63.79 | | | | | | | | | | |
| 90 | 13.02 | 20.63 | 27.17 | 33.08 | 38.38 | 43.19 | 47.70 | 51.94 | 55.96 | 59.79 | 63.40 | 66.75 | 69.63 | 71.83 | 72.99 | | | | | | | | | |
| | 12.30 | 18.16 | 23.46 | 28.15 | 32.51 | 36.73 | 40.85 | 44.88 | 48.79 | 52.56 | 56.18 | 59.63 | 62.94 | 66.23 | 69.73 | | | | | | | | | |
| 100 | 11.36 | 19.11 | 25.86 | 32.11 | 37.93 | 43.36 | 48.43 | 53.20 | 57.67 | 61.92 | 65.93 | 69.70 | 73.14 | 76.09 | 78.30 | 79.26 | | | | | | | | |
| | 9.37 | 16.18 | 22.12 | 27.51 | 32.51 | 37.25 | 41.80 | 46.21 | 50.50 | 54.64 | 58.60 | 62.35 | 65.90 | 69.36 | 72.84 | 76.63 | | | | | | | | |
| 110 | 6.83 | 15.72 | 23.58 | 30.72 | 37.31 | 43.43 | 49.13 | 54.45 | 59.44 | 64.15 | 68.59 | 72.77 | 76.66 | 80.21 | 83.22 | 85.38 | 86.09 | | | | | | | |
| | 5.47 | 13.38 | 20.46 | 26.81 | 32.56 | 37.86 | 42.89 | 47.70 | 52.34 | 56.84 | 61.15 | 65.26 | 69.17 | 72.88 | 76.54 | 80.31 | 84.59 | | | | | | | |
| 120 | | 11.78 | 21.02 | 29.23 | 36.71 | 43.62 | 50.03 | 55.98 | 61.51 | 66.65 | 71.48 | 76.04 | 80.38 | 84.49 | 88.20 | 91.25 | 93.26 | | | | | | | |
| | | 10.02 | 18.40 | 25.84 | 32.46 | 38.47 | 44.02 | 49.26 | 54.25 | 59.07 | 63.72 | 68.21 | 72.53 | 76.68 | 80.73 | 84.71 | 88.90 | | | | | | | |
| 130 | | 7.72 | 18.36 | 27.68 | 36.10 | 43.81 | 50.93 | 57.52 | 63.61 | 69.28 | 74.56 | 79.54 | 84.27 | 88.80 | 93.09 | 96.97 | 100.11 | 102.04 | | | | | | |
| | | 6.69 | 16.19 | 24.68 | 32.31 | 39.18 | 45.42 | 51.15 | 56.54 | 61.67 | 66.62 | 71.43 | 76.11 | 80.64 | 85.02 | 89.27 | 93.52 | 98.07 | | | | | | |
| 140 | | | 14.82 | 25.65 | 35.15 | 43.60 | 51.26 | 58.33 | 64.96 | 71.21 | 77.21 | 82.78 | 88.06 | 92.97 | 97.56 | 101.89 | 105.88 | 109.22 | 111.31 | | | | | |
| | | | 13.44 | 23.46 | 32.34 | 40.22 | 47.28 | 53.67 | 59.55 | 65.08 | 70.32 | 75.35 | 80.17 | 84.79 | 89.25 | 93.61 | 97.93 | 102.32 | 107.18 | | | | | |
| 150 | | | 11.06 | 23.38 | 34.14 | 43.71 | 52.26 | 59.96 | 67.02 | 73.63 | 79.93 | 85.93 | 91.56 | 96.79 | 101.88 | 106.59 | 110.91 | 114.93 | 118.39 | 120.70 | | | | |
| | | | 9.96 | 21.10 | 31.01 | 39.75 | 47.49 | 54.46 | 60.89 | 66.98 | 72.83 | 78.46 | 83.78 | 88.80 | 93.64 | 98.18 | 102.51 | 106.79 | 111.13 | 116.02 | | | | |
| 160 | | | 6.56 | 20.43 | 32.62 | 43.49 | 53.21 | 61.86 | 69.63 | 76.71 | 83.29 | 89.57 | 95.65 | 101.44 | 106.85 | 111.80 | 116.45 | 120.90 | 124.51 | 127.72 | 130.08 | | | |
| | | | 6.14 | 18.36 | 29.47 | 39.24 | 47.88 | 55.66 | 62.76 | 69.32 | 75.50 | 81.50 | 87.34 | 92.95 | 98.23 | 103.10 | 107.78 | 112.29 | 116.12 | 120.02 | 124.52 | | | |
| 170 | | | | 17.52 | 31.28 | 43.35 | 53.88 | 63.17 | 71.53 | 79.16 | 86.26 | 92.96 | 99.41 | 105.67 | 111.65 | 117.16 | 122.10 | 126.42 | 130.52 | 134.42 | 137.79 | 139.69 | 140.53 | |
| | | | | 15.80 | 28.12 | 38.76 | 48.22 | 56.76 | 64.57 | 71.81 | 78.60 | 85.04 | 91.30 | 97.38 | 103.15 | 108.50 | 113.30 | 117.59 | 121.70 | 125.71 | 129.42 | 133.03 | 137.58 | |
| 180 | | | | 14.28 | 29.76 | 42.87 | 54.11 | 63.97 | 72.82 | 80.94 | 88.51 | 95.66 | 102.51 | 109.13 | 115.63 | 121.76 | 127.24 | 132.06 | 136.24 | 139.80 | 143.17 | 146.10 | 148.28 | 149.18 |
| | | | | 13.17 | 26.85 | 38.46 | 48.77 | 57.97 | 66.32 | 74.03 | 81.27 | 88.14 | 94.74 | 101.21 | 107.57 | 113.52 | 118.83 | 123.56 | 127.62 | 131.20 | 134.75 | 138.18 | 141.55 | 145.16 |
| 190 | | | | | 27.65 | 42.22 | 54.25 | 64.66 | 73.94 | 82.43 | 90.31 | 97.74 | 104.89 | 111.75 | 118.38 | 124.88 | 130.94 | 136.19 | 140.70 | 144.54 | 147.77 | 150.35 | 152.39 | 153.49 |
| | | | | | 25.34 | 38.63 | 49.86 | 59.59 | 68.34 | 76.45 | 84.10 | 91.43 | 98.57 | 105.45 | 112.05 | 118.40 | 124.27 | 129.38 | 133.80 | 137.72 | 141.06 | 144.13 | 147.42 | 150.82 |

(mm)

DIAMETER D= 400
HEIGHT h= 154
EXPANSION ANGLE $\lambda$ = 120
BOSS RATIO $\nu$ = 0.35

TABLE 7

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

<u>Columns 31-34,</u>
Replace Table 9 with the following:

EMBODIMENT 3

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80 | | 21.38 | 26.61 | 31.50 | 36.18 | 40.58 | 44.65 | 48.38 | 51.86 | 55.11 | 58.13 | 60.86 | 63.02 | 64.33 | | | | | | | | | | |
| | | 20.15 | 24.12 | 27.89 | 31.41 | 34.84 | 38.29 | 41.75 | 45.13 | 48.37 | 51.48 | 54.56 | 57.63 | 60.89 | | | | | | | | | | |
| 90 | 12.43 | 19.69 | 25.94 | 31.57 | 36.63 | 41.22 | 45.53 | 49.58 | 53.41 | 57.07 | 60.52 | 63.71 | 66.47 | 68.57 | 69.67 | | | | | | | | | |
| | 11.74 | 17.34 | 22.40 | 26.87 | 31.03 | 35.06 | 39.00 | 42.84 | 46.57 | 50.17 | 53.62 | 56.92 | 60.08 | 63.22 | 66.56 | | | | | | | | | |
| 100 | 10.85 | 18.24 | 24.69 | 30.65 | 36.20 | 41.39 | 46.23 | 50.78 | 55.05 | 59.10 | 62.94 | 66.53 | 69.81 | 72.63 | 74.74 | 75.65 | | | | | | | | |
| | 8.95 | 15.45 | 21.12 | 26.26 | 31.03 | 35.55 | 39.90 | 44.11 | 48.21 | 52.15 | 55.93 | 59.51 | 62.91 | 66.20 | 69.53 | 73.14 | | | | | | | | |
| 110 | 6.52 | 15.00 | 22.51 | 29.33 | 35.62 | 41.45 | 46.89 | 51.98 | 56.74 | 61.24 | 65.47 | 69.46 | 73.17 | 76.57 | 79.43 | 81.50 | 82.17 | | | | | | | |
| | 5.22 | 12.77 | 19.53 | 25.59 | 31.08 | 36.14 | 40.94 | 45.53 | 49.98 | 54.25 | 58.37 | 62.30 | 66.02 | 69.56 | 73.06 | 76.66 | 80.75 | | | | | | | |
| 120 | | 11.25 | 20.07 | 27.90 | 35.04 | 41.63 | 47.75 | 53.43 | 58.72 | 63.62 | 68.23 | 72.59 | 76.72 | 80.65 | 84.19 | 87.10 | 89.02 | | | | | | | |
| | | 9.57 | 17.57 | 24.66 | 30.99 | 36.72 | 42.02 | 47.02 | 51.79 | 56.39 | 60.83 | 65.11 | 69.24 | 73.20 | 77.06 | 80.86 | 84.86 | | | | | | | |
| 130 | | 7.37 | 17.52 | 26.42 | 34.46 | 41.82 | 48.62 | 54.90 | 60.72 | 66.13 | 71.17 | 75.93 | 80.44 | 84.77 | 88.86 | 92.56 | 95.56 | 97.40 | | | | | | |
| | | 6.38 | 15.46 | 23.56 | 30.84 | 37.40 | 43.35 | 48.83 | 53.97 | 58.86 | 63.59 | 68.19 | 72.65 | 76.98 | 81.15 | 85.21 | 89.27 | 93.61 | | | | | | |
| 140 | | | 14.14 | 24.49 | 33.55 | 41.62 | 48.93 | 55.68 | 62.00 | 67.98 | 73.70 | 79.01 | 84.05 | 88.75 | 93.12 | 97.26 | 101.06 | 104.25 | 106.25 | | | | | |
| | | | 12.83 | 22.40 | 30.87 | 38.39 | 45.13 | 51.23 | 56.85 | 62.12 | 67.13 | 71.93 | 76.52 | 80.93 | 85.20 | 89.36 | 93.48 | 97.67 | 102.31 | | | | | |
| 150 | | | 10.55 | 22.31 | 32.59 | 41.73 | 49.89 | 57.24 | 63.98 | 70.29 | 76.29 | 82.03 | 87.40 | 92.39 | 97.25 | 101.75 | 105.87 | 109.70 | 113.01 | 115.22 | | | | |
| | | | 9.50 | 20.14 | 29.60 | 37.95 | 45.33 | 51.99 | 58.12 | 63.93 | 69.52 | 74.90 | 79.97 | 84.77 | 89.39 | 93.71 | 97.85 | 101.93 | 106.08 | 110.74 | | | | |
| 160 | | | 6.26 | 19.50 | 31.13 | 41.52 | 50.79 | 59.05 | 66.47 | 73.23 | 79.51 | 85.50 | 91.30 | 96.83 | 102.00 | 106.72 | 111.15 | 115.41 | 118.85 | 121.92 | 124.16 | | | |
| | | | 5.86 | 17.52 | 28.13 | 37.45 | 45.71 | 53.13 | 59.90 | 66.17 | 72.07 | 77.79 | 83.37 | 88.73 | 93.77 | 98.42 | 102.88 | 107.18 | 110.84 | 114.57 | 118.86 | | | |
| 170 | | | | 16.73 | 29.86 | 41.38 | 51.43 | 60.30 | 68.28 | 75.56 | 82.34 | 88.74 | 94.89 | 100.86 | 106.58 | 111.84 | 116.55 | 120.68 | 124.58 | 128.31 | 131.52 | 133.34 | 134.14 | |
| | | | | 15.08 | 26.84 | 37.00 | 46.03 | 54.18 | 61.64 | 68.54 | 75.02 | 81.18 | 87.15 | 92.96 | 98.46 | 103.57 | 108.15 | 112.25 | 116.17 | 119.99 | 123.53 | 126.99 | 131.32 | |
| 180 | | | | 13.63 | 28.40 | 40.92 | 51.65 | 61.06 | 69.51 | 77.26 | 84.48 | 91.31 | 97.85 | 104.17 | 110.38 | 116.22 | 121.45 | 126.05 | 130.04 | 133.44 | 136.66 | 139.46 | 141.54 | 142.40 |
| | | | | 12.57 | 25.63 | 36.71 | 48.56 | 55.34 | 63.30 | 70.67 | 77.57 | 84.14 | 90.44 | 96.61 | 102.68 | 108.36 | 113.43 | 117.95 | 121.82 | 125.23 | 128.63 | 131.90 | 135.11 | 138.56 |
| 190 | | | | | 26.40 | 40.30 | 51.79 | 61.72 | 70.58 | 78.69 | 86.21 | 93.29 | 100.12 | 106.67 | 113.00 | 119.21 | 124.99 | 130.00 | 134.31 | 137.97 | 141.06 | 143.51 | 145.47 | 146.52 |
| | | | | | 24.19 | 36.88 | 47.60 | 56.88 | 65.24 | 72.98 | 80.27 | 87.28 | 94.09 | 100.65 | 106.95 | 113.02 | 118.62 | 123.50 | 127.72 | 131.46 | 134.65 | 137.58 | 140.72 | 143.97 |

(mm)

DIAMETER $D = 400$
HEIGHT $h = 147$
EXPANSION ANGLE $\lambda = 120$
BOSS RATIO $\nu = 0.35$

TABLE 9

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 33-36,
Replace Table 11 with the following:

EMBODIMENT 4

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80 | | 19.34 | 24.07 | 28.50 | 32.74 | 36.72 | 40.39 | 43.78 | 46.92 | 49.87 | 52.59 | 55.06 | 57.02 | 58.21 | | | | | | | | | | |
| | | 18.23 | 21.82 | 25.23 | 28.41 | 31.52 | 34.65 | 37.77 | 40.83 | 43.77 | 46.58 | 49.36 | 52.15 | 55.09 | | | | | | | | | | |
| 90 | 11.25 | 17.81 | 23.47 | 28.57 | 33.15 | 37.30 | 41.19 | 44.86 | 48.33 | 51.63 | 54.76 | 57.65 | 60.14 | 62.04 | 63.03 | | | | | | | | | |
| | 10.62 | 15.68 | 20.26 | 24.31 | 28.07 | 31.72 | 35.28 | 38.76 | 42.13 | 45.39 | 48.52 | 51.50 | 54.36 | 57.20 | 60.22 | | | | | | | | | |
| 100 | 9.81 | 16.50 | 22.33 | 27.73 | 32.76 | 37.45 | 41.83 | 45.94 | 49.81 | 53.48 | 56.94 | 60.19 | 63.17 | 65.71 | 67.62 | 68.45 | | | | | | | | |
| | 8.09 | 13.97 | 19.10 | 23.76 | 28.07 | 32.17 | 36.10 | 39.91 | 43.61 | 47.19 | 50.61 | 53.85 | 56.91 | 59.90 | 62.91 | 66.18 | | | | | | | | |
| 110 | 5.90 | 13.58 | 20.37 | 26.53 | 32.22 | 37.51 | 42.43 | 47.03 | 51.34 | 55.40 | 59.23 | 62.84 | 66.21 | 69.27 | 71.87 | 73.74 | 74.35 | | | | | | | |
| | 4.72 | 11.55 | 17.67 | 23.15 | 28.12 | 32.70 | 37.04 | 41.19 | 45.20 | 49.09 | 52.81 | 56.36 | 59.74 | 62.94 | 66.10 | 69.36 | 73.06 | | | | | | | |
| 120 | | 10.17 | 18.15 | 25.24 | 31.70 | 37.67 | 43.21 | 48.35 | 53.12 | 57.56 | 61.73 | 65.67 | 69.42 | 72.97 | 76.17 | 78.80 | 80.54 | | | | | | | |
| | | 8.65 | 15.89 | 22.32 | 28.03 | 33.22 | 38.02 | 42.54 | 46.85 | 51.02 | 55.03 | 58.91 | 62.64 | 66.22 | 69.72 | 73.16 | 76.78 | | | | | | | |
| 130 | | 6.67 | 15.86 | 23.90 | 31.18 | 37.84 | 43.99 | 49.68 | 54.94 | 59.83 | 64.39 | 68.69 | 72.78 | 76.69 | 80.40 | 83.74 | 86.46 | 88.12 | | | | | | |
| | | 5.78 | 13.98 | 21.32 | 27.90 | 33.84 | 39.23 | 44.18 | 48.83 | 53.26 | 57.53 | 61.69 | 65.73 | 69.64 | 73.43 | 77.09 | 80.77 | 84.69 | | | | | | |
| 140 | | | 12.80 | 22.15 | 30.35 | 37.66 | 44.27 | 50.38 | 56.10 | 61.50 | 66.68 | 71.49 | 76.05 | 80.29 | 84.26 | 88.00 | 91.44 | 94.33 | 96.13 | | | | | |
| | | | 11.61 | 20.26 | 27.93 | 34.73 | 40.83 | 46.35 | 51.43 | 56.20 | 60.73 | 65.08 | 69.24 | 73.23 | 77.08 | 80.85 | 84.58 | 88.37 | 92.57 | | | | | |
| 150 | | | 9.55 | 20.19 | 29.49 | 37.75 | 45.13 | 51.78 | 57.88 | 63.59 | 69.03 | 74.21 | 79.08 | 83.59 | 87.99 | 92.06 | 95.79 | 99.26 | 102.25 | 104.24 | | | | |
| | | | 8.60 | 18.22 | 26.78 | 34.33 | 41.01 | 47.03 | 52.58 | 57.85 | 62.90 | 67.76 | 72.35 | 76.69 | 80.87 | 84.79 | 88.53 | 92.23 | 95.98 | 100.20 | | | | |
| 160 | | | 5.66 | 17.64 | 28.17 | 37.56 | 45.95 | 53.43 | 60.14 | 66.25 | 71.93 | 77.36 | 82.60 | 87.61 | 92.28 | 96.56 | 100.57 | 104.41 | 107.53 | 110.30 | 112.34 | | | |
| | | | 5.30 | 15.86 | 25.45 | 33.89 | 41.35 | 48.07 | 54.20 | 59.87 | 65.21 | 70.39 | 75.43 | 80.28 | 84.84 | 89.04 | 93.08 | 96.98 | 100.28 | 103.65 | 107.54 | | | |
| 170 | | | | 15.13 | 27.02 | 37.44 | 46.53 | 54.56 | 61.78 | 68.36 | 74.50 | 80.28 | 85.85 | 91.26 | 96.43 | 101.18 | 105.45 | 109.18 | 112.72 | 116.09 | 119.00 | 120.64 | 121.36 | |
| | | | | 13.64 | 24.28 | 33.48 | 41.65 | 49.02 | 55.77 | 62.02 | 67.88 | 73.44 | 78.85 | 84.10 | 89.08 | 93.71 | 97.85 | 101.56 | 105.11 | 108.57 | 111.77 | 114.89 | 118.82 | |
| 180 | | | | 12.33 | 25.70 | 37.02 | 46.73 | 55.24 | 62.89 | 69.90 | 76.44 | 82.61 | 88.53 | 94.25 | 99.86 | 105.16 | 109.89 | 114.05 | 117.66 | 120.74 | 123.64 | 126.18 | 128.06 | 128.84 |
| | | | | 11.37 | 23.19 | 33.21 | 42.12 | 50.07 | 57.28 | 63.94 | 70.19 | 76.12 | 81.82 | 87.41 | 92.90 | 98.04 | 102.63 | 106.71 | 110.22 | 113.31 | 116.38 | 119.34 | 122.25 | 125.36 |
| 190 | | | | | 23.88 | 36.46 | 46.85 | 55.84 | 63.86 | 71.19 | 78.00 | 84.41 | 90.58 | 96.51 | 102.24 | 107.85 | 113.09 | 117.62 | 121.51 | 124.83 | 127.62 | 129.85 | 131.61 | 132.56 |
| | | | | | 21.89 | 33.36 | 43.06 | 51.46 | 59.02 | 66.03 | 72.63 | 78.96 | 85.13 | 91.07 | 96.77 | 102.26 | 107.32 | 111.74 | 115.56 | 118.94 | 121.83 | 124.48 | 127.32 | 130.25 |

(mm)

DIAMETER $D = 400$
HEIGHT $h = 133$
EXPANSION ANGLE $\lambda = 120$
BOSS RATIO $\nu = 0.35$

TABLE 11

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 37-40,
Replace Table 13 with the following:

EMBODIMENT 5

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80 | | 18.32 | 22.81 | 27.00 | 31.01 | 34.79 | 38.27 | 41.47 | 44.45 | 47.24 | 49.82 | 52.16 | 54.02 | 55.14 | | | | | | | | | | |
| | | 17.27 | 20.67 | 23.90 | 26.92 | 29.86 | 32.82 | 35.78 | 38.68 | 41.46 | 44.13 | 46.76 | 49.40 | 52.19 | | | | | | | | | | |
| 90 | 10.66 | 16.88 | 22.23 | 27.06 | 31.40 | 35.33 | 39.02 | 42.50 | 45.78 | 48.92 | 51.88 | 54.61 | 56.97 | 58.77 | 59.72 | | | | | | | | | |
| | 10.06 | 14.86 | 19.20 | 23.03 | 26.60 | 30.05 | 33.43 | 36.72 | 39.92 | 43.00 | 45.96 | 48.79 | 51.50 | 54.19 | 57.05 | | | | | | | | | |
| 100 | 9.30 | 15.63 | 21.16 | 26.27 | 31.03 | 35.48 | 39.63 | 43.52 | 47.19 | 50.66 | 53.95 | 57.02 | 59.84 | 62.25 | 64.06 | 64.85 | | | | | | | | |
| | 7.67 | 13.24 | 18.10 | 22.51 | 26.60 | 30.47 | 34.20 | 37.81 | 41.32 | 44.70 | 47.94 | 51.01 | 53.92 | 56.75 | 59.60 | 62.69 | | | | | | | | |
| 110 | 5.59 | 12.86 | 19.30 | 25.14 | 30.53 | 35.53 | 40.19 | 44.55 | 48.64 | 52.49 | 56.12 | 59.54 | 62.72 | 65.63 | 68.09 | 69.86 | 70.43 | | | | | | | |
| | 4.47 | 10.94 | 16.74 | 21.93 | 26.64 | 30.98 | 35.09 | 39.02 | 42.82 | 46.50 | 50.03 | 53.40 | 56.59 | 59.63 | 62.62 | 65.71 | 69.21 | | | | | | | |
| 120 | | 9.64 | 17.20 | 23.91 | 30.03 | 35.69 | 40.93 | 45.80 | 50.33 | 54.53 | 58.48 | 62.22 | 65.76 | 69.13 | 72.16 | 74.66 | 76.30 | | | | | | | |
| | | 8.20 | 15.06 | 21.14 | 26.56 | 31.47 | 36.02 | 40.30 | 44.39 | 48.33 | 52.14 | 55.81 | 59.35 | 62.74 | 66.05 | 69.31 | 72.74 | | | | | | | |
| 130 | | 6.32 | 15.02 | 22.64 | 29.54 | 35.85 | 41.67 | 47.06 | 52.05 | 56.68 | 61.00 | 65.08 | 68.95 | 72.66 | 76.17 | 79.34 | 81.91 | 83.48 | | | | | | |
| | | 5.47 | 13.25 | 20.20 | 26.43 | 32.06 | 37.16 | 41.85 | 46.26 | 50.45 | 54.50 | 58.45 | 62.27 | 65.98 | 69.56 | 73.04 | 76.52 | 80.24 | | | | | | |
| 140 | | | 12.12 | 20.99 | 28.76 | 35.68 | 41.94 | 47.73 | 53.15 | 58.27 | 63.17 | 67.73 | 72.05 | 76.07 | 79.82 | 83.37 | 86.63 | 89.36 | 91.07 | | | | | |
| | | | 11.00 | 19.20 | 26.46 | 32.90 | 38.68 | 43.91 | 48.73 | 53.24 | 57.54 | 61.65 | 65.59 | 69.37 | 73.03 | 76.59 | 80.13 | 83.72 | 87.70 | | | | | |
| 150 | | | 9.05 | 19.13 | 27.94 | 35.77 | 42.76 | 49.06 | 54.84 | 60.25 | 65.39 | 70.31 | 74.92 | 79.19 | 83.36 | 87.21 | 90.75 | 94.03 | 96.87 | 98.76 | | | | |
| | | | 8.15 | 17.26 | 25.37 | 32.53 | 38.85 | 44.56 | 49.82 | 54.80 | 59.59 | 64.20 | 68.54 | 72.66 | 76.62 | 80.33 | 83.87 | 87.37 | 90.93 | 94.92 | | | | |
| 160 | | | 5.36 | 16.71 | 26.69 | 35.59 | 43.53 | 50.62 | 56.97 | 62.77 | 68.15 | 73.29 | 78.26 | 83.00 | 87.43 | 91.48 | 95.27 | 98.92 | 101.87 | 104.50 | 106.43 | | | |
| | | | 5.02 | 15.02 | 24.11 | 32.10 | 39.18 | 45.54 | 51.35 | 56.72 | 61.78 | 66.68 | 71.46 | 76.05 | 80.37 | 84.36 | 88.18 | 91.87 | 95.00 | 98.20 | 101.88 | | | |
| 170 | | | | 14.34 | 25.60 | 35.47 | 44.08 | 51.69 | 58.53 | 64.76 | 70.58 | 76.06 | 81.33 | 86.45 | 91.35 | 95.86 | 99.90 | 103.44 | 106.79 | 109.98 | 112.73 | 114.29 | 114.98 | |
| | | | | 12.92 | 23.00 | 31.72 | 39.46 | 46.44 | 52.83 | 58.75 | 64.31 | 69.56 | 74.70 | 79.68 | 84.39 | 88.78 | 92.70 | 96.21 | 99.56 | 102.85 | 105.89 | 108.85 | 112.56 | |
| 180 | | | | 11.68 | 24.35 | 35.07 | 44.27 | 52.34 | 59.58 | 66.22 | 72.41 | 78.26 | 83.87 | 89.29 | 94.61 | 99.62 | 104.10 | 108.05 | 111.47 | 114.38 | 117.14 | 119.54 | 121.32 | 122.06 |
| | | | | 10.77 | 21.97 | 31.46 | 39.91 | 47.43 | 54.26 | 60.57 | 66.49 | 72.12 | 77.52 | 82.81 | 88.01 | 92.88 | 97.23 | 101.10 | 104.42 | 107.34 | 110.25 | 113.06 | 115.81 | 118.76 |
| 190 | | | | | 22.63 | 34.54 | 44.39 | 52.90 | 60.50 | 67.45 | 73.89 | 79.97 | 85.82 | 91.43 | 96.86 | 102.18 | 107.14 | 111.43 | 115.12 | 118.26 | 120.91 | 123.01 | 124.69 | 125.59 |
| | | | | | 20.74 | 31.61 | 40.80 | 48.75 | 55.92 | 62.55 | 68.81 | 74.81 | 80.65 | 86.27 | 91.67 | 96.88 | 101.67 | 105.86 | 109.48 | 112.68 | 115.42 | 117.93 | 120.62 | 123.40 |

(mm)

DIAMETER $D = 400$
HEIGHT $h = 126$
EXPANSION ANGLE $\lambda = 120$
BOSS RATIO $\nu = 0.35$

TABLE 13

CERTIFICATE OF CORRECTION

PATENT NO. : 6,688,848 B2

DATED : February 10, 2004

INVENTOR(S) : M. Ohtsuka

It is certified that error appears in the above-identified patent and that said Letters Patent is hereby corrected as shown below:

Columns 41-44,
Replace Table 15 with the following:

EMBODIMENT 6

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80 | | 16.29 | 20.27 | 24.00 | 27.57 | 30.92 | 34.02 | 36.86 | 39.51 | 41.99 | 44.29 | 46.37 | 48.02 | 49.02 | | | | | | | | | | |
| | | 15.35 | 18.38 | 21.25 | 23.93 | 26.54 | 29.18 | 31.81 | 34.38 | 36.86 | 39.22 | 41.57 | 43.91 | 46.39 | | | | | | | | | | |
| 90 | 9.47 | 15.00 | 19.76 | 24.06 | 27.91 | 31.41 | 34.69 | 37.78 | 40.70 | 43.48 | 46.11 | 48.54 | 50.64 | 52.24 | 53.08 | | | | | | | | | |
| | 8.94 | 13.21 | 17.06 | 20.47 | 23.64 | 26.71 | 29.71 | 32.64 | 35.48 | 38.22 | 40.86 | 43.37 | 45.78 | 48.17 | 50.71 | | | | | | | | | |
| 100 | 8.26 | 13.90 | 18.81 | 23.35 | 27.58 | 31.54 | 35.22 | 38.69 | 41.94 | 45.03 | 47.95 | 50.69 | 53.19 | 55.34 | 56.94 | 57.64 | | | | | | | | |
| | 6.82 | 11.77 | 16.09 | 20.01 | 23.64 | 27.09 | 30.40 | 33.61 | 36.73 | 39.74 | 42.62 | 45.34 | 47.93 | 50.44 | 52.98 | 55.73 | | | | | | | | |
| 110 | 4.97 | 11.43 | 17.15 | 22.34 | 27.14 | 31.58 | 35.73 | 39.60 | 43.23 | 46.66 | 49.88 | 52.92 | 55.75 | 58.34 | 60.52 | 62.10 | 62.61 | | | | | | | |
| | 3.98 | 9.73 | 14.88 | 19.50 | 23.68 | 27.54 | 31.19 | 34.69 | 38.06 | 41.34 | 44.47 | 47.46 | 50.30 | 53.00 | 55.66 | 58.41 | 61.52 | | | | | | | |
| 120 | | 8.57 | 15.29 | 21.26 | 26.70 | 31.72 | 36.38 | 40.71 | 44.74 | 48.47 | 51.98 | 55.30 | 58.46 | 61.45 | 64.14 | 66.36 | 67.82 | | | | | | | |
| | | 7.29 | 13.38 | 18.79 | 23.61 | 27.98 | 32.02 | 35.82 | 39.46 | 42.96 | 46.34 | 49.61 | 52.75 | 55.77 | 58.71 | 61.61 | 64.66 | | | | | | | |
| 130 | | 5.62 | 13.35 | 20.13 | 26.26 | 31.86 | 37.04 | 41.83 | 46.26 | 50.38 | 54.22 | 57.85 | 61.29 | 64.58 | 67.70 | 70.52 | 72.81 | 74.21 | | | | | | |
| | | 4.86 | 11.78 | 17.95 | 23.50 | 28.50 | 33.03 | 37.20 | 41.12 | 44.85 | 48.45 | 51.95 | 55.35 | 58.65 | 61.83 | 64.92 | 68.02 | 71.32 | | | | | | |
| 140 | | | 10.78 | 18.66 | 25.56 | 31.71 | 37.28 | 42.42 | 47.24 | 51.79 | 56.15 | 60.20 | 64.04 | 67.62 | 70.95 | 74.10 | 77.00 | 79.43 | 80.95 | | | | | |
| | | | 9.78 | 17.06 | 23.52 | 29.25 | 34.38 | 39.03 | 43.31 | 47.33 | 51.14 | 54.80 | 58.30 | 61.66 | 64.91 | 68.08 | 71.22 | 74.42 | 77.95 | | | | | |
| 150 | | | 8.04 | 17.00 | 24.83 | 31.79 | 38.01 | 43.61 | 48.74 | 53.55 | 58.13 | 62.50 | 66.59 | 70.39 | 74.10 | 77.52 | 80.66 | 83.58 | 86.10 | 87.78 | | | | |
| | | | 7.24 | 15.34 | 22.55 | 28.91 | 34.54 | 39.61 | 44.28 | 48.71 | 52.97 | 57.06 | 60.93 | 64.58 | 68.10 | 71.40 | 74.55 | 77.66 | 80.82 | 84.38 | | | | |
| 160 | | | 4.77 | 14.86 | 23.72 | 31.63 | 38.70 | 44.99 | 50.64 | 55.79 | 60.58 | 65.14 | 69.56 | 73.78 | 77.71 | 81.31 | 84.69 | 87.93 | 90.55 | 92.89 | 94.60 | | | |
| | | | 4.46 | 13.35 | 21.43 | 28.54 | 34.82 | 40.48 | 45.64 | 50.42 | 54.91 | 59.27 | 63.52 | 67.60 | 71.44 | 74.98 | 78.38 | 81.66 | 84.45 | 87.29 | 90.56 | | | |
| 170 | | | | 12.74 | 22.75 | 31.53 | 39.18 | 45.94 | 52.02 | 57.57 | 62.74 | 67.61 | 72.30 | 76.85 | 81.20 | 85.21 | 88.80 | 91.94 | 94.92 | 97.76 | 100.21 | 101.59 | 102.20 | |
| | | | | 11.49 | 20.45 | 28.19 | 35.07 | 41.28 | 46.96 | 52.22 | 57.16 | 61.85 | 66.40 | 70.82 | 75.02 | 78.91 | 82.40 | 85.52 | 88.51 | 91.42 | 94.12 | 96.75 | 100.06 | |
| 180 | | | | 10.38 | 21.64 | 31.18 | 39.35 | 46.52 | 52.96 | 58.86 | 64.37 | 69.57 | 74.55 | 79.37 | 84.10 | 88.55 | 92.54 | 96.04 | 99.08 | 101.67 | 104.12 | 106.26 | 107.84 | 108.50 |
| | | | | 9.58 | 19.53 | 27.97 | 35.47 | 42.16 | 48.23 | 53.84 | 59.10 | 64.10 | 68.90 | 73.61 | 78.23 | 82.56 | 86.42 | 89.86 | 92.82 | 95.42 | 98.00 | 100.50 | 102.94 | 105.57 |
| 190 | | | | | 20.11 | 30.70 | 39.46 | 47.02 | 53.78 | 59.95 | 65.68 | 71.08 | 76.28 | 81.27 | 86.10 | 90.82 | 95.23 | 99.05 | 102.33 | 105.12 | 107.47 | 109.34 | 110.83 | 111.63 |
| | | | | | 18.43 | 28.10 | 36.26 | 43.34 | 49.70 | 55.60 | 61.16 | 66.50 | 71.69 | 76.69 | 81.49 | 86.11 | 90.38 | 94.10 | 97.31 | 100.16 | 102.59 | 104.82 | 107.22 | 109.69 |

(mm)

DIAMETER $D = 400$
HEIGHT $h = 112$
EXPANSION ANGLE $\lambda = 120$
BOSS RATIO $\nu = 0.35$

TABLE 15

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

<u>Columns 43-46,</u>
Replace Table 17 with the following:

EMBODIMENT 7

| r \ θ | 4.5 | 9 | 13.5 | 18 | 22.5 | 27 | 31.5 | 36 | 40.5 | 45 | 49.5 | 54 | 58.5 | 63 | 67.5 | 72 | 76.5 | 81 | 85.5 | 90 | 94.5 | 99 | 103.5 | 108 (deg) |
|---|---|---|---|---|---|---|---|---|---|---|---|---|---|---|---|---|---|---|---|---|---|---|---|---|
| 80 | | 18.32 | 22.81 | 27.00 | 31.01 | 34.79 | 38.27 | 41.47 | 44.45 | 47.24 | 49.82 | 52.16 | 54.02 | 55.14 | | | | | | | | | | |
| | | 17.27 | 20.67 | 23.90 | 26.92 | 29.86 | 32.82 | 35.78 | 38.68 | 41.46 | 44.13 | 46.76 | 49.40 | 52.19 | | | | | | | | | | |
| 90 | 10.66 | 16.88 | 22.23 | 27.06 | 31.40 | 35.33 | 39.02 | 42.50 | 45.78 | 48.92 | 51.88 | 54.61 | 56.97 | 58.77 | 59.72 | | | | | | | | | |
| | 10.05 | 14.86 | 19.20 | 23.03 | 26.60 | 30.05 | 33.43 | 36.72 | 39.92 | 43.00 | 45.96 | 48.79 | 51.50 | 54.19 | 57.05 | | | | | | | | | |
| 100 | 9.30 | 15.63 | 21.16 | 26.27 | 31.03 | 35.48 | 39.63 | 43.52 | 47.19 | 50.66 | 53.95 | 57.02 | 59.84 | 62.25 | 64.06 | 64.85 | | | | | | | | |
| | 7.67 | 13.24 | 18.10 | 22.51 | 26.60 | 30.47 | 34.20 | 37.81 | 41.32 | 44.70 | 47.94 | 51.01 | 53.92 | 56.75 | 59.60 | 62.69 | | | | | | | | |
| 110 | 5.59 | 12.86 | 19.30 | 25.14 | 30.53 | 35.53 | 40.19 | 44.55 | 48.64 | 52.49 | 56.12 | 59.54 | 62.72 | 65.63 | 68.09 | 69.86 | 70.43 | | | | | | | |
| | 4.47 | 10.94 | 16.74 | 21.93 | 26.64 | 30.98 | 35.09 | 39.02 | 42.82 | 46.60 | 50.03 | 53.40 | 56.59 | 59.63 | 62.62 | 65.71 | 69.21 | | | | | | | |
| 120 | | 9.64 | 17.20 | 23.91 | 30.03 | 35.69 | 40.93 | 45.80 | 50.33 | 54.53 | 58.48 | 62.22 | 65.76 | 69.13 | 72.16 | 74.66 | 76.30 | | | | | | | |
| | | 8.20 | 15.06 | 21.14 | 26.56 | 31.47 | 36.02 | 40.30 | 44.39 | 48.33 | 52.14 | 55.81 | 59.35 | 62.74 | 66.05 | 69.31 | 72.74 | | | | | | | |
| 130 | | 6.32 | 15.02 | 22.64 | 29.54 | 35.85 | 41.67 | 47.06 | 52.05 | 56.68 | 61.00 | 65.08 | 68.95 | 72.66 | 76.17 | 79.34 | 81.91 | 83.48 | | | | | | |
| | | 5.47 | 13.25 | 20.20 | 26.43 | 32.06 | 37.16 | 41.85 | 46.26 | 50.45 | 54.50 | 58.45 | 62.27 | 65.98 | 69.56 | 73.04 | 76.52 | 80.24 | | | | | | |
| 140 | | | 12.12 | 20.99 | 28.76 | 35.68 | 41.94 | 47.73 | 53.15 | 58.27 | 63.17 | 67.73 | 72.05 | 76.07 | 79.82 | 83.37 | 86.63 | 89.36 | 91.07 | | | | | |
| | | | 11.00 | 19.20 | 26.46 | 32.90 | 38.68 | 43.91 | 48.73 | 53.24 | 57.54 | 61.65 | 65.59 | 69.37 | 73.03 | 76.69 | 80.13 | 83.72 | 87.70 | | | | | |
| 150 | | | 9.05 | 19.13 | 27.94 | 35.77 | 42.76 | 49.06 | 54.84 | 60.25 | 65.39 | 70.31 | 74.92 | 79.19 | 83.36 | 87.21 | 90.75 | 94.03 | 96.87 | 98.76 | | | | |
| | | | 8.15 | 17.26 | 25.37 | 32.53 | 38.85 | 44.56 | 49.82 | 54.80 | 59.59 | 64.20 | 68.54 | 72.66 | 76.62 | 80.33 | 83.87 | 87.37 | 90.93 | 94.92 | | | | |
| 160 | | | 5.36 | 16.71 | 26.69 | 35.59 | 43.53 | 50.62 | 56.97 | 62.77 | 68.15 | 73.29 | 78.26 | 83.00 | 87.43 | 91.48 | 95.27 | 98.92 | 101.87 | 104.50 | 106.43 | | | |
| | | | 5.02 | 15.02 | 24.11 | 32.10 | 39.18 | 45.54 | 51.35 | 56.72 | 61.78 | 66.68 | 71.46 | 76.05 | 80.37 | 84.36 | 88.18 | 91.87 | 95.00 | 98.20 | 101.88 | | | |
| 170 | | | | 14.34 | 25.60 | 35.47 | 44.08 | 51.69 | 58.53 | 64.76 | 70.58 | 76.06 | 81.33 | 86.45 | 91.35 | 95.86 | 99.90 | 103.44 | 106.79 | 109.98 | 112.73 | 114.29 | 114.98 | |
| | | | | 12.92 | 23.00 | 31.72 | 39.46 | 46.44 | 52.83 | 58.75 | 64.31 | 69.58 | 74.70 | 79.68 | 84.39 | 88.78 | 92.70 | 96.21 | 99.58 | 102.85 | 105.89 | 108.85 | 112.56 | |
| 180 | | | | 11.68 | 24.35 | 35.07 | 44.27 | 52.34 | 59.58 | 66.22 | 72.41 | 78.26 | 83.87 | 89.29 | 94.61 | 99.62 | 104.10 | 108.05 | 111.47 | 114.38 | 117.14 | 119.54 | 121.32 | 122.06 |
| | | | | 10.77 | 21.97 | 31.46 | 39.91 | 47.43 | 54.26 | 60.57 | 66.49 | 72.12 | 77.52 | 82.81 | 88.01 | 92.88 | 97.23 | 101.10 | 104.42 | 107.34 | 110.25 | 113.06 | 115.81 | 118.76 |
| 190 | | | | | 22.63 | 34.54 | 44.39 | 52.90 | 60.50 | 67.45 | 73.89 | 79.97 | 85.82 | 91.43 | 96.86 | 102.18 | 107.14 | 111.43 | 115.12 | 118.26 | 120.91 | 123.01 | 124.69 | 125.59 |
| | | | | | 20.74 | 31.61 | 40.80 | 48.75 | 55.92 | 62.55 | 68.81 | 74.81 | 80.65 | 86.27 | 91.67 | 96.88 | 101.67 | 105.86 | 109.48 | 112.68 | 115.42 | 117.93 | 120.62 | 123.40 |

(mm)

DIAMETER $D = 400$
HEIGHT $h = 126$
EXPANSION ANGLE $\lambda = 108$
BOSS RATIO $\nu = 0.35$

TABLE 17

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 47-50,
Replace Table 19 with the following:

EMBODIMENT 8

| r (mm) \ θ (deg) | 3.75 | 7.5 | 11.25 | 15 | 18.75 | 22.5 | 26.25 | 30 | 33.75 | 37.5 | 41.25 | 45 | 48.75 | 52.5 | 56.25 | 60 | 63.75 | 67.5 | 71.25 | 75 | 78.75 | 82.5 | 86.25 | 90 |
|---|---|---|---|---|---|---|---|---|---|---|---|---|---|---|---|---|---|---|---|---|---|---|---|---|
| 80 | | 20.36 | 25.34 | 30.00 | 34.46 | 38.65 | 42.52 | 46.08 | 49.39 | 52.49 | 55.36 | 57.96 | 60.02 | 61.27 | | | | | | | | | | |
| | | 19.19 | 22.97 | 26.56 | 29.91 | 33.18 | 36.47 | 39.76 | 42.98 | 46.07 | 49.03 | 51.96 | 54.89 | 57.99 | | | | | | | | | | |
| 90 | 11.84 | 18.75 | 24.70 | 30.07 | 34.89 | 39.26 | 43.36 | 47.22 | 50.87 | 54.35 | 57.64 | 60.68 | 63.30 | 65.30 | 66.35 | | | | | | | | | |
| | 11.18 | 16.51 | 21.33 | 25.59 | 29.55 | 33.39 | 37.14 | 40.80 | 44.35 | 47.78 | 51.07 | 54.21 | 57.22 | 60.21 | 63.39 | | | | | | | | | |
| 100 | 10.33 | 17.37 | 23.51 | 29.19 | 34.48 | 39.42 | 44.03 | 48.36 | 52.43 | 56.29 | 59.94 | 63.36 | 66.49 | 69.17 | 71.18 | 72.05 | | | | | | | | |
| | 8.52 | 14.71 | 20.11 | 25.01 | 29.55 | 33.86 | 38.00 | 42.01 | 45.91 | 49.67 | 53.27 | 56.68 | 59.91 | 63.05 | 66.22 | 69.66 | | | | | | | | |
| 110 | 6.21 | 14.29 | 21.44 | 27.93 | 33.92 | 39.48 | 44.66 | 49.50 | 54.04 | 58.32 | 62.35 | 66.15 | 69.69 | 72.92 | 75.65 | 77.62 | 78.26 | | | | | | | |
| | 4.97 | 12.16 | 18.60 | 24.37 | 29.60 | 34.42 | 38.99 | 43.36 | 47.58 | 51.67 | 55.59 | 59.33 | 62.88 | 66.25 | 69.58 | 73.01 | 76.90 | | | | | | | |
| 120 | | 10.71 | 19.11 | 26.57 | 33.37 | 39.65 | 45.48 | 50.89 | 55.92 | 60.59 | 64.98 | 69.13 | 73.07 | 76.81 | 80.18 | 82.95 | 84.78 | | | | | | | |
| | | 9.11 | 16.73 | 23.49 | 29.51 | 34.97 | 40.02 | 44.78 | 49.32 | 53.70 | 57.93 | 62.01 | 65.94 | 69.71 | 73.39 | 77.01 | 80.82 | | | | | | | |
| 130 | | 7.02 | 16.69 | 25.16 | 32.82 | 39.83 | 46.30 | 52.29 | 57.83 | 62.98 | 67.78 | 72.31 | 76.61 | 80.73 | 84.63 | 88.15 | 91.01 | 92.76 | | | | | | |
| | | 6.08 | 14.72 | 22.44 | 29.37 | 35.62 | 41.29 | 46.50 | 51.40 | 56.06 | 60.56 | 64.94 | 69.19 | 73.31 | 77.29 | 81.15 | 85.02 | 89.15 | | | | | | |
| 140 | | | 13.47 | 23.32 | 31.95 | 39.64 | 46.60 | 53.03 | 59.05 | 64.74 | 70.19 | 75.25 | 80.05 | 84.52 | 88.69 | 92.63 | 96.25 | 99.29 | 101.19 | | | | | |
| | | | 12.22 | 21.33 | 29.40 | 36.56 | 42.98 | 48.79 | 54.14 | 59.16 | 63.93 | 68.50 | 72.88 | 77.08 | 81.14 | 85.10 | 89.03 | 93.02 | 97.44 | | | | | |
| 150 | | | 10.05 | 21.25 | 31.04 | 39.74 | 47.51 | 54.51 | 60.93 | 66.94 | 72.66 | 78.12 | 83.24 | 87.99 | 92.62 | 96.90 | 100.83 | 104.48 | 107.63 | 109.73 | | | | |
| | | | 9.05 | 19.18 | 28.19 | 36.14 | 43.17 | 49.51 | 55.35 | 60.89 | 66.21 | 71.33 | 76.16 | 80.73 | 85.13 | 89.25 | 93.19 | 97.08 | 101.03 | 105.47 | | | | |
| 160 | | | 5.96 | 18.57 | 29.65 | 39.54 | 48.37 | 56.24 | 63.30 | 69.74 | 75.72 | 81.43 | 86.95 | 92.22 | 97.14 | 101.64 | 105.86 | 109.91 | 113.19 | 116.11 | 118.25 | | | |
| | | | 5.58 | 16.69 | 26.79 | 35.67 | 43.53 | 50.60 | 57.05 | 63.02 | 68.64 | 74.09 | 79.40 | 84.50 | 89.30 | 93.73 | 97.98 | 102.08 | 105.56 | 109.11 | 113.20 | | | |
| 170 | | | | 15.93 | 28.44 | 39.41 | 48.98 | 57.43 | 65.03 | 71.96 | 78.42 | 84.51 | 90.37 | 96.06 | 101.50 | 106.51 | 111.00 | 114.93 | 118.65 | 122.20 | 125.26 | 126.99 | 127.75 | |
| | | | | 14.36 | 25.56 | 35.24 | 43.84 | 51.60 | 58.70 | 65.28 | 71.45 | 77.31 | 83.00 | 88.53 | 93.77 | 98.64 | 103.00 | 106.90 | 110.64 | 114.28 | 117.65 | 120.94 | 125.07 | |
| 180 | | | | 12.98 | 27.05 | 38.97 | 49.19 | 58.15 | 66.20 | 73.58 | 80.46 | 86.96 | 93.19 | 99.21 | 105.12 | 110.69 | 115.67 | 120.05 | 123.85 | 127.09 | 130.15 | 132.82 | 134.80 | 135.62 |
| | | | | 11.97 | 24.41 | 34.96 | 44.34 | 52.70 | 60.29 | 67.30 | 73.88 | 80.13 | 86.13 | 92.01 | 97.79 | 103.20 | 108.03 | 112.33 | 116.02 | 119.27 | 122.50 | 125.62 | 128.68 | 131.96 |
| 190 | | | | | 25.14 | 38.38 | 49.32 | 58.78 | 67.22 | 74.94 | 82.10 | 88.85 | 95.35 | 101.59 | 107.62 | 113.53 | 119.04 | 123.81 | 127.91 | 131.40 | 134.34 | 136.68 | 138.54 | 139.54 |
| | | | | | 23.04 | 35.12 | 45.33 | 54.17 | 62.13 | 69.50 | 76.45 | 83.12 | 89.61 | 95.86 | 101.86 | 107.64 | 112.97 | 117.62 | 121.64 | 125.20 | 128.24 | 131.03 | 134.02 | 137.11 |

DIAMETER $D = 400$
HEIGHT $h = 140$
EXPANSION ANGLE $\lambda = 90$
BOSS RATIO $\nu = 0.35$

TABLE 19

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 51-54,
Replace Table 21 with the following:

EMBODIMENT 9

| θ / r | 5.5 | 11 | 16.5 | 22 | 27.5 | 33 | 38.5 | 44 | 49.5 | 55 | 60.5 | 66 | 71.5 | 77 | 82.5 | 88 | 93.5 | 99 | 104.5 | 110 | 115.5 | 121 | 126.5 | 132 (deg) |
|---|---|---|---|---|---|---|---|---|---|---|---|---|---|---|---|---|---|---|---|---|---|---|---|---|
| 80 | | 20.36 | 25.34 | 30.00 | 34.46 | 38.65 | 42.52 | 46.08 | 49.39 | 52.49 | 55.36 | 57.96 | 60.02 | 61.27 | | | | | | | | | | |
| | | 19.19 | 22.97 | 26.56 | 29.91 | 33.18 | 36.47 | 39.76 | 42.98 | 46.07 | 49.03 | 51.96 | 54.89 | 57.99 | | | | | | | | | | |
| 90 | 11.84 | 18.75 | 24.70 | 30.07 | 34.89 | 39.26 | 43.36 | 47.22 | 50.87 | 54.35 | 57.64 | 60.68 | 63.30 | 65.30 | 66.35 | | | | | | | | | |
| | 11.18 | 16.51 | 21.33 | 25.59 | 29.55 | 33.39 | 37.14 | 40.80 | 44.35 | 47.78 | 51.07 | 54.21 | 57.22 | 60.21 | 63.39 | | | | | | | | | |
| 100 | 10.33 | 17.37 | 23.51 | 29.19 | 34.48 | 39.42 | 44.03 | 48.36 | 52.43 | 56.29 | 59.94 | 63.36 | 66.49 | 69.17 | 71.18 | 72.05 | | | | | | | | |
| | 8.52 | 14.71 | 20.11 | 25.01 | 29.55 | 33.86 | 38.00 | 42.01 | 45.91 | 49.67 | 53.27 | 56.88 | 59.91 | 63.05 | 66.22 | 69.66 | | | | | | | | |
| 110 | 6.21 | 14.29 | 21.44 | 27.93 | 33.92 | 39.48 | 44.66 | 49.50 | 54.04 | 58.32 | 62.35 | 66.15 | 69.69 | 72.92 | 75.65 | 77.62 | 78.26 | | | | | | | |
| | 4.97 | 12.16 | 18.60 | 24.37 | 29.60 | 34.42 | 38.99 | 43.36 | 47.58 | 51.67 | 55.59 | 59.33 | 62.88 | 66.25 | 69.58 | 73.01 | 76.90 | | | | | | | |
| 120 | | 10.71 | 19.11 | 26.57 | 33.37 | 39.65 | 45.48 | 50.89 | 55.92 | 60.59 | 64.98 | 69.13 | 73.07 | 76.81 | 80.18 | 82.95 | 84.78 | | | | | | | |
| | | 9.11 | 16.73 | 23.49 | 29.51 | 34.97 | 40.02 | 44.78 | 49.32 | 53.70 | 57.93 | 62.01 | 65.94 | 69.71 | 73.39 | 77.01 | 80.82 | | | | | | | |
| 130 | | 7.02 | 16.69 | 25.16 | 32.82 | 39.83 | 46.30 | 52.29 | 57.83 | 62.98 | 67.78 | 72.31 | 76.61 | 80.73 | 84.63 | 88.15 | 91.01 | 92.76 | | | | | | |
| | | 6.08 | 14.72 | 22.44 | 29.37 | 35.62 | 41.29 | 46.50 | 51.40 | 56.06 | 60.56 | 64.94 | 69.19 | 73.31 | 77.29 | 81.15 | 85.02 | 89.15 | | | | | | |
| 140 | | | 13.47 | 23.32 | 31.95 | 39.64 | 46.60 | 53.03 | 59.05 | 64.74 | 70.19 | 75.25 | 80.05 | 84.52 | 88.69 | 92.63 | 96.25 | 99.29 | 101.19 | | | | | |
| | | | 12.22 | 21.33 | 29.40 | 36.56 | 42.98 | 48.79 | 54.14 | 59.16 | 63.93 | 68.50 | 72.88 | 77.08 | 81.14 | 85.10 | 89.03 | 93.02 | 97.44 | | | | | |
| 150 | | | 10.05 | 21.25 | 31.04 | 39.74 | 47.51 | 54.51 | 60.93 | 66.94 | 72.66 | 78.12 | 83.24 | 87.99 | 92.62 | 96.90 | 100.83 | 104.48 | 107.63 | 109.73 | | | | |
| | | | 9.05 | 19.18 | 28.19 | 36.14 | 43.17 | 49.51 | 55.35 | 60.89 | 66.21 | 71.33 | 76.16 | 80.73 | 85.13 | 89.25 | 93.19 | 97.08 | 101.03 | 105.47 | | | | |
| 160 | | | 5.96 | 18.57 | 29.65 | 39.54 | 48.37 | 56.24 | 63.30 | 69.74 | 75.72 | 81.43 | 86.95 | 92.22 | 97.14 | 101.64 | 105.86 | 109.91 | 113.19 | 116.11 | 118.25 | | | |
| | | | 5.58 | 16.69 | 26.79 | 35.67 | 43.53 | 50.60 | 57.05 | 63.02 | 68.64 | 74.09 | 79.40 | 84.50 | 89.30 | 93.73 | 97.98 | 102.08 | 105.56 | 109.11 | 113.20 | | | |
| 170 | | | | 15.93 | 28.44 | 39.41 | 48.98 | 57.43 | 65.03 | 71.96 | 78.42 | 84.51 | 90.37 | 96.06 | 101.50 | 106.51 | 111.00 | 114.93 | 118.65 | 122.20 | 125.26 | 126.99 | 127.75 | |
| | | | | 14.36 | 25.56 | 35.24 | 43.84 | 51.60 | 58.70 | 65.28 | 71.45 | 77.31 | 83.00 | 88.53 | 93.77 | 98.64 | 103.00 | 106.90 | 110.64 | 114.28 | 117.65 | 120.94 | 125.07 | |
| 180 | | | | 12.98 | 27.05 | 38.97 | 49.19 | 58.15 | 66.20 | 73.58 | 80.46 | 86.96 | 93.19 | 99.21 | 105.12 | 110.69 | 115.67 | 120.05 | 123.85 | 127.09 | 130.15 | 132.82 | 134.80 | 135.62 |
| | | | | 11.97 | 24.41 | 34.96 | 44.34 | 52.70 | 60.29 | 67.30 | 73.88 | 80.13 | 86.13 | 92.01 | 97.79 | 103.20 | 108.03 | 112.33 | 116.02 | 119.27 | 122.50 | 125.62 | 128.68 | 131.96 |
| 190 | | | | | 25.14 | 38.38 | 49.32 | 58.78 | 67.22 | 74.94 | 82.10 | 88.85 | 95.35 | 101.59 | 107.62 | 113.53 | 119.04 | 123.81 | 127.91 | 131.40 | 134.34 | 136.68 | 138.54 | 139.54 |
| | | | | | 23.04 | 35.12 | 45.33 | 54.17 | 62.13 | 69.50 | 76.45 | 83.12 | 89.61 | 95.86 | 101.86 | 107.64 | 112.97 | 117.62 | 121.64 | 125.20 | 128.24 | 131.03 | 134.02 | 137.11 |

(mm)

DIAMETER $D = 400$
HEIGHT $h = 140$
EXPANSION ANGLE $\lambda = 132$
BOSS RATIO $\nu = 0.35$

TABLE 21

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

<u>Columns 55-56,</u>
Replace Table 23 with the following:

EMBODIMENT 10

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 66.15 | | 20.36 | 25.34 | 30.00 | 34.46 | 38.65 | 42.52 | 46.08 | 49.39 | 52.49 | 55.36 | 57.96 | 60.02 | 61.27 | | | | | | | | | | |
| | | 19.19 | 22.97 | 26.56 | 29.91 | 33.18 | 36.47 | 39.76 | 42.98 | 46.07 | 49.03 | 51.96 | 54.89 | 57.99 | | | | | | | | | | |
| 77.31 | 11.84 | 18.75 | 24.70 | 30.07 | 34.89 | 39.26 | 43.36 | 47.22 | 50.87 | 54.35 | 57.64 | 60.68 | 63.30 | 65.30 | 66.35 | | | | | | | | | |
| | 11.18 | 16.51 | 21.33 | 25.59 | 29.55 | 33.39 | 37.14 | 40.80 | 44.35 | 47.78 | 51.07 | 54.21 | 57.22 | 60.21 | 63.39 | | | | | | | | | |
| 88.46 | 10.33 | 17.37 | 23.51 | 29.19 | 34.48 | 39.42 | 44.03 | 48.36 | 52.43 | 56.29 | 59.94 | 63.36 | 66.49 | 69.17 | 71.18 | 72.05 | | | | | | | | |
| | 8.52 | 14.71 | 20.11 | 25.01 | 29.55 | 33.86 | 38.00 | 42.01 | 45.91 | 49.67 | 53.27 | 56.68 | 59.91 | 63.05 | 66.22 | 69.66 | | | | | | | | |
| 99.62 | 6.21 | 14.29 | 21.44 | 27.93 | 33.92 | 39.48 | 44.66 | 49.50 | 54.04 | 58.32 | 62.35 | 66.15 | 69.69 | 72.92 | 75.65 | 77.62 | 78.26 | | | | | | | |
| | 4.97 | 12.16 | 18.60 | 24.37 | 29.60 | 34.42 | 38.99 | 43.36 | 47.58 | 51.67 | 55.59 | 59.33 | 62.88 | 66.25 | 69.58 | 73.01 | 76.90 | | | | | | | |
| 110.8 | | 10.71 | 19.11 | 26.57 | 33.37 | 39.65 | 45.48 | 50.89 | 55.92 | 60.59 | 64.98 | 69.13 | 73.07 | 76.81 | 80.18 | 82.95 | 84.78 | | | | | | | |
| | | 9.11 | 16.73 | 23.49 | 29.51 | 34.97 | 40.02 | 44.78 | 49.32 | 53.70 | 57.93 | 62.01 | 65.94 | 69.71 | 73.39 | 77.01 | 80.82 | | | | | | | |
| 121.9 | | 7.02 | 16.69 | 25.16 | 32.82 | 39.83 | 46.30 | 52.29 | 57.83 | 62.98 | 67.78 | 72.31 | 76.61 | 80.73 | 84.63 | 88.15 | 91.01 | 92.76 | | | | | | |
| | | 6.08 | 14.72 | 22.44 | 29.37 | 35.62 | 41.29 | 46.50 | 51.40 | 56.06 | 60.56 | 64.94 | 69.19 | 73.31 | 77.29 | 81.15 | 85.02 | 89.15 | | | | | | |
| 133.1 | | | 13.47 | 23.32 | 31.95 | 39.64 | 46.60 | 53.03 | 59.05 | 64.74 | 70.19 | 75.25 | 80.05 | 84.52 | 88.69 | 92.63 | 96.25 | 99.29 | 101.19 | | | | | |
| | | | 12.22 | 21.33 | 29.40 | 36.56 | 42.98 | 48.79 | 54.14 | 59.16 | 63.93 | 68.50 | 72.88 | 77.08 | 81.14 | 85.10 | 89.03 | 93.02 | 97.44 | | | | | |
| 144.2 | | | 10.05 | 21.25 | 31.04 | 39.74 | 47.51 | 54.51 | 60.93 | 66.94 | 72.66 | 78.12 | 83.24 | 87.99 | 92.62 | 96.90 | 100.83 | 104.48 | 107.63 | 109.73 | | | | |
| | | | 9.05 | 19.18 | 28.19 | 36.14 | 43.17 | 49.51 | 55.35 | 60.89 | 66.21 | 71.33 | 76.16 | 80.73 | 85.13 | 89.25 | 93.19 | 97.08 | 101.03 | 105.47 | | | | |
| 155.4 | | | 5.96 | 18.57 | 29.65 | 39.54 | 48.37 | 56.24 | 63.30 | 69.74 | 75.72 | 81.43 | 86.95 | 92.22 | 97.14 | 101.64 | 105.86 | 109.91 | 113.19 | 116.11 | 118.25 | | | |
| | | | 5.58 | 16.69 | 26.79 | 35.67 | 43.53 | 50.60 | 57.05 | 63.02 | 68.64 | 74.09 | 79.40 | 84.50 | 89.30 | 93.73 | 97.98 | 102.08 | 105.56 | 109.11 | 113.20 | | | |
| 166.5 | | | | 15.93 | 28.44 | 39.41 | 48.98 | 57.43 | 65.03 | 71.96 | 78.42 | 84.51 | 90.37 | 96.06 | 101.50 | 106.51 | 111.00 | 114.93 | 118.65 | 122.20 | 125.26 | 126.99 | 127.75 | |
| | | | | 14.36 | 25.56 | 35.24 | 43.84 | 51.60 | 58.70 | 65.28 | 71.45 | 77.31 | 83.00 | 88.53 | 93.77 | 98.64 | 103.00 | 106.90 | 110.64 | 114.28 | 117.65 | 120.94 | 125.07 | |
| 177.7 | | | | 12.98 | 27.05 | 38.97 | 49.19 | 58.15 | 66.20 | 73.58 | 80.46 | 86.96 | 93.19 | 99.21 | 105.12 | 110.69 | 115.67 | 120.05 | 123.85 | 127.09 | 130.15 | 132.82 | 134.80 | 135.62 |
| | | | | 11.97 | 24.41 | 34.96 | 44.34 | 52.70 | 60.29 | 67.30 | 73.88 | 80.13 | 86.13 | 92.01 | 97.79 | 103.20 | 108.03 | 112.33 | 116.02 | 119.27 | 122.50 | 125.62 | 128.68 | 131.96 |
| 188.8 | | | | | 25.14 | 38.38 | 49.32 | 58.78 | 67.22 | 74.94 | 82.10 | 88.85 | 95.35 | 101.59 | 107.62 | 113.53 | 119.04 | 123.81 | 127.91 | 131.40 | 134.34 | 136.68 | 138.54 | 139.54 |
| | | | | | 23.04 | 35.12 | 45.33 | 54.17 | 62.13 | 69.50 | 76.45 | 83.12 | 89.61 | 95.86 | 101.86 | 107.64 | 112.97 | 117.62 | 121.64 | 125.20 | 128.24 | 131.03 | 134.02 | 137.11 |

(mm)

DIAMETER $D = 400$
HEIGHT $h = 140$
EXPANSION ANGLE $\lambda = 120$
BOSS RATIO $\nu = 0.275$

TABLE 23

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 57-60,
Replace Table 25 with the following:

EMBODIMENT 11

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80 | | 16.29 | 20.27 | 24.00 | 27.57 | 30.92 | 34.02 | 36.86 | 39.51 | 41.99 | 44.29 | 46.37 | 48.02 | 49.02 | | | | | | | | | | |
| | | 14.58 | 17.46 | 20.19 | 22.73 | 25.22 | 27.72 | 30.22 | 32.66 | 35.01 | 37.26 | 39.49 | 41.72 | 44.07 | | | | | | | | | | |
| 90 | 9.47 | 15.00 | 19.76 | 24.06 | 27.91 | 31.41 | 34.69 | 37.78 | 40.70 | 43.48 | 46.11 | 48.54 | 50.64 | 52.24 | 53.08 | | | | | | | | | |
| | 8.50 | 12.55 | 16.21 | 19.45 | 22.46 | 25.38 | 28.23 | 31.01 | 33.71 | 36.31 | 38.81 | 41.20 | 43.49 | 45.76 | 48.18 | | | | | | | | | |
| 100 | 8.26 | 13.90 | 18.81 | 23.35 | 27.58 | 31.54 | 35.22 | 38.69 | 41.94 | 45.03 | 47.95 | 50.69 | 53.19 | 55.34 | 56.94 | 57.64 | | | | | | | | |
| | 6.48 | 11.18 | 15.28 | 19.01 | 22.46 | 25.73 | 28.88 | 31.93 | 34.89 | 37.75 | 40.49 | 43.08 | 45.53 | 47.92 | 50.33 | 52.94 | | | | | | | | |
| 110 | 4.97 | 11.43 | 17.15 | 22.34 | 27.14 | 31.58 | 35.73 | 39.60 | 43.23 | 46.66 | 49.88 | 52.92 | 55.75 | 58.34 | 60.52 | 62.10 | 62.61 | | | | | | | |
| | 3.78 | 9.24 | 14.14 | 18.52 | 22.50 | 26.16 | 29.63 | 32.95 | 36.16 | 39.27 | 42.25 | 45.09 | 47.79 | 50.35 | 52.88 | 55.49 | 58.44 | | | | | | | |
| 120 | | 8.57 | 15.29 | 21.26 | 26.70 | 31.72 | 36.38 | 40.71 | 44.74 | 48.47 | 51.98 | 55.30 | 58.46 | 61.45 | 64.14 | 66.36 | 67.82 | | | | | | | |
| | | 6.92 | 12.71 | 17.85 | 22.43 | 26.58 | 30.42 | 34.03 | 37.48 | 40.81 | 44.03 | 47.13 | 50.11 | 52.98 | 55.78 | 58.53 | 61.42 | | | | | | | |
| 130 | | 5.62 | 13.35 | 20.13 | 26.26 | 31.86 | 37.04 | 41.83 | 46.26 | 50.38 | 54.22 | 57.85 | 61.29 | 64.58 | 67.70 | 70.52 | 72.81 | 74.21 | | | | | | |
| | | 4.62 | 11.19 | 17.05 | 22.32 | 27.07 | 31.38 | 35.34 | 39.06 | 42.61 | 46.03 | 49.35 | 52.58 | 55.72 | 58.74 | 61.67 | 64.62 | 67.75 | | | | | | |
| 140 | | | 10.78 | 18.66 | 25.56 | 31.71 | 37.28 | 42.42 | 47.24 | 51.79 | 56.15 | 60.20 | 64.04 | 67.62 | 70.95 | 74.10 | 77.00 | 79.43 | 80.95 | | | | | |
| | | | 9.29 | 16.21 | 22.34 | 27.79 | 32.66 | 37.08 | 41.15 | 44.96 | 48.59 | 52.06 | 55.39 | 58.58 | 61.67 | 64.68 | 67.66 | 70.70 | 74.05 | | | | | |
| 150 | | | 8.04 | 17.00 | 24.83 | 31.79 | 38.01 | 43.61 | 48.74 | 53.55 | 58.13 | 62.50 | 66.59 | 70.39 | 74.10 | 77.52 | 80.66 | 83.58 | 86.10 | 87.78 | | | | |
| | | | 6.88 | 14.58 | 21.42 | 27.47 | 32.81 | 37.63 | 42.07 | 46.28 | 50.32 | 54.21 | 57.88 | 61.35 | 64.70 | 67.83 | 70.82 | 73.78 | 76.78 | 80.16 | | | | |
| 160 | | | 4.77 | 14.86 | 23.72 | 31.63 | 38.70 | 44.99 | 50.64 | 55.79 | 60.58 | 65.14 | 69.56 | 73.78 | 77.71 | 81.31 | 84.69 | 87.93 | 90.55 | 92.89 | 94.60 | | | |
| | | | 4.24 | 12.68 | 20.36 | 27.11 | 33.08 | 38.46 | 43.36 | 47.90 | 52.17 | 56.31 | 60.34 | 64.22 | 67.87 | 71.23 | 74.46 | 77.58 | 80.23 | 82.92 | 86.03 | | | |
| 170 | | | | 12.74 | 22.75 | 31.53 | 39.18 | 45.94 | 52.02 | 57.57 | 62.74 | 67.61 | 72.30 | 76.85 | 81.20 | 85.21 | 88.80 | 91.94 | 94.92 | 97.76 | 100.21 | 101.59 | 102.20 | |
| | | | | 10.91 | 19.43 | 26.78 | 33.32 | 39.22 | 44.61 | 49.61 | 54.30 | 58.76 | 63.08 | 67.28 | 71.27 | 74.97 | 78.28 | 81.24 | 84.09 | 86.85 | 89.41 | 91.91 | 95.05 | |
| 180 | | | | 10.38 | 21.64 | 31.18 | 39.35 | 46.52 | 52.96 | 58.86 | 64.37 | 69.57 | 74.55 | 79.37 | 84.10 | 88.55 | 92.54 | 96.04 | 99.08 | 101.67 | 104.12 | 106.26 | 107.84 | 108.50 |
| | | | | 9.10 | 18.55 | 26.57 | 33.70 | 40.05 | 45.82 | 51.15 | 56.15 | 60.90 | 65.46 | 69.93 | 74.32 | 78.43 | 82.10 | 85.37 | 88.18 | 90.65 | 93.10 | 95.47 | 97.80 | 100.29 |
| 190 | | | | | 20.11 | 30.70 | 39.46 | 47.02 | 53.78 | 59.95 | 65.68 | 71.08 | 76.28 | 81.27 | 86.10 | 90.82 | 95.23 | 99.05 | 102.33 | 105.12 | 107.47 | 109.34 | 110.83 | 111.63 |
| | | | | | 17.51 | 26.69 | 34.45 | 41.17 | 47.22 | 52.82 | 58.10 | 63.17 | 68.10 | 72.85 | 77.41 | 81.81 | 85.86 | 89.39 | 92.45 | 95.15 | 97.46 | 99.58 | 101.86 | 104.20 |

(mm)

DIAMETER $D = 400$
HEIGHT $h = 112$ (eu=112, ed=106.4, fu=fd=0)
EXPANSION ANGLE $\lambda = 120$
BOSS RATIO $\nu = 0.35$

TABLE 25

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 61-64,
Replace Table 27 with the following:

EMBODIMENT 12

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80 | | 19.29 | 23.27 | 27.00 | 30.57 | 33.92 | 37.02 | 39.86 | 42.51 | 44.99 | 47.29 | 49.37 | 51.02 | 52.02 | | | | | | | | | | |
| | | 15.35 | 18.38 | 21.25 | 23.93 | 26.54 | 29.18 | 31.81 | 34.38 | 36.86 | 39.22 | 41.57 | 43.91 | 46.39 | | | | | | | | | | |
| 90 | 12.47 | 18.00 | 22.76 | 27.06 | 30.91 | 34.41 | 37.69 | 40.78 | 43.70 | 46.48 | 49.11 | 51.54 | 53.64 | 55.24 | 56.08 | | | | | | | | | |
| | 8.94 | 13.21 | 17.06 | 20.47 | 23.64 | 26.71 | 29.71 | 32.64 | 35.48 | 38.22 | 40.86 | 43.37 | 45.78 | 48.17 | 50.71 | | | | | | | | | |
| 100 | 11.26 | 16.90 | 21.81 | 26.35 | 30.58 | 34.54 | 38.22 | 41.69 | 44.94 | 48.03 | 50.95 | 53.69 | 56.19 | 58.34 | 59.94 | 60.64 | | | | | | | | |
| | 6.82 | 11.77 | 16.09 | 20.01 | 23.64 | 27.09 | 30.40 | 33.61 | 36.73 | 39.74 | 42.62 | 45.34 | 47.93 | 50.44 | 52.98 | 55.73 | | | | | | | | |
| 110 | 7.97 | 14.43 | 20.15 | 25.34 | 30.14 | 34.58 | 38.73 | 42.60 | 46.23 | 49.66 | 52.88 | 55.92 | 58.75 | 61.34 | 63.52 | 65.10 | 65.61 | | | | | | | |
| | 3.98 | 9.73 | 14.88 | 19.50 | 23.68 | 27.54 | 31.19 | 34.69 | 38.06 | 41.34 | 44.47 | 47.46 | 50.30 | 53.00 | 55.66 | 58.41 | 61.52 | | | | | | | |
| 120 | | 11.57 | 18.29 | 24.26 | 29.70 | 34.72 | 39.38 | 43.71 | 47.74 | 51.47 | 54.98 | 58.30 | 61.46 | 64.45 | 67.14 | 69.36 | 70.82 | | | | | | | |
| | | 7.29 | 13.38 | 18.79 | 23.61 | 27.98 | 32.02 | 35.82 | 39.46 | 42.96 | 46.34 | 49.61 | 52.75 | 55.77 | 58.71 | 61.61 | 64.66 | | | | | | | |
| 130 | | 8.62 | 16.35 | 23.13 | 29.26 | 34.86 | 40.04 | 44.83 | 49.26 | 53.38 | 57.22 | 60.85 | 64.29 | 67.58 | 70.70 | 73.52 | 75.81 | 77.21 | | | | | | |
| | | 4.86 | 11.78 | 17.95 | 23.50 | 28.50 | 33.03 | 37.20 | 41.12 | 44.85 | 48.45 | 51.95 | 55.35 | 58.65 | 61.83 | 64.92 | 68.02 | 71.32 | | | | | | |
| 140 | | | 13.78 | 21.66 | 28.56 | 34.71 | 40.28 | 45.42 | 50.24 | 54.79 | 59.15 | 63.20 | 67.04 | 70.62 | 73.95 | 77.10 | 80.00 | 82.43 | 83.95 | | | | | |
| | | | 9.78 | 17.06 | 23.52 | 29.25 | 34.38 | 39.03 | 43.31 | 47.33 | 51.14 | 54.80 | 58.30 | 61.66 | 64.91 | 68.08 | 71.22 | 74.42 | 77.95 | | | | | |
| 150 | | | 11.04 | 20.00 | 27.83 | 34.79 | 41.01 | 46.61 | 51.74 | 56.55 | 61.13 | 65.50 | 69.59 | 73.39 | 77.10 | 80.52 | 83.66 | 86.58 | 89.10 | 90.78 | | | | |
| | | | 7.24 | 15.34 | 22.55 | 28.91 | 34.54 | 39.61 | 44.28 | 48.71 | 52.97 | 57.06 | 60.93 | 64.58 | 68.10 | 71.40 | 74.55 | 77.66 | 80.82 | 84.38 | | | | |
| 160 | | | 7.77 | 17.86 | 26.72 | 34.63 | 41.70 | 47.99 | 53.64 | 58.79 | 63.58 | 68.14 | 72.56 | 76.78 | 80.71 | 84.31 | 87.69 | 90.93 | 93.55 | 95.89 | 97.60 | | | |
| | | | 4.46 | 13.35 | 21.43 | 28.54 | 34.82 | 40.48 | 45.64 | 50.42 | 54.91 | 59.27 | 63.52 | 67.60 | 71.44 | 74.98 | 78.38 | 81.66 | 84.45 | 87.29 | 90.56 | | | |
| 170 | | | | 15.74 | 25.75 | 34.53 | 42.18 | 48.94 | 55.02 | 60.57 | 65.74 | 70.61 | 75.30 | 79.85 | 84.20 | 88.21 | 91.80 | 94.94 | 97.92 | 100.76 | 103.21 | 104.59 | 105.20 | |
| | | | | 11.49 | 20.45 | 28.19 | 35.07 | 41.28 | 46.98 | 52.22 | 57.16 | 61.85 | 66.40 | 70.82 | 75.02 | 78.91 | 82.40 | 85.52 | 88.51 | 91.42 | 94.12 | 96.75 | 100.06 | |
| 180 | | | | 13.38 | 24.64 | 34.18 | 42.35 | 49.52 | 55.96 | 61.86 | 67.37 | 72.57 | 77.55 | 82.37 | 87.10 | 91.55 | 95.54 | 99.04 | 102.08 | 104.67 | 107.12 | 109.26 | 110.84 | 111.50 |
| | | | | 9.58 | 19.53 | 27.97 | 35.47 | 42.16 | 48.23 | 53.84 | 59.10 | 64.10 | 68.90 | 73.81 | 78.23 | 82.56 | 86.42 | 89.86 | 92.82 | 95.42 | 98.00 | 100.50 | 102.94 | 105.57 |
| 190 | | | | | 23.11 | 33.70 | 42.46 | 50.02 | 56.78 | 62.95 | 68.68 | 74.08 | 79.28 | 84.27 | 89.10 | 93.82 | 98.23 | 102.05 | 105.33 | 108.12 | 110.47 | 112.34 | 113.83 | 114.63 |
| | | | | | 18.43 | 28.10 | 36.26 | 43.34 | 49.70 | 55.60 | 61.16 | 66.50 | 71.69 | 76.89 | 81.49 | 86.11 | 90.38 | 94.10 | 97.31 | 100.16 | 102.59 | 104.82 | 107.22 | 109.69 |

(mm)

DIAMETER D= 400
HEIGHT h= 112 (eu=112, ed=112, fu=3, fd=0)
EXPANSION ANGLE $\lambda$ = 120
BOSS RATIO $\nu$ = 0.35

TABLE 27

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 65-68,
Replace Table 29 with the following:

EMBODIMENT 13

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80 | | 19.29 | 23.27 | 27.00 | 30.57 | 33.92 | 37.02 | 39.86 | 42.51 | 44.99 | 47.29 | 49.37 | 51.02 | 52.02 | | | | | | | | | | |
| | | 14.58 | 17.46 | 20.19 | 22.73 | 25.22 | 27.72 | 30.22 | 32.66 | 35.01 | 37.26 | 39.49 | 41.72 | 44.07 | | | | | | | | | | |
| 90 | 12.47 | 18.00 | 22.76 | 27.06 | 30.91 | 34.41 | 37.69 | 40.78 | 43.70 | 46.48 | 49.11 | 51.54 | 53.64 | 55.24 | 56.08 | | | | | | | | | |
| | 8.50 | 12.55 | 16.21 | 19.45 | 22.46 | 25.38 | 28.23 | 31.01 | 33.71 | 36.31 | 38.81 | 41.20 | 43.49 | 45.76 | 48.18 | | | | | | | | | |
| 100 | 11.26 | 16.90 | 21.81 | 26.35 | 30.58 | 34.54 | 38.22 | 41.69 | 44.94 | 48.03 | 50.95 | 53.69 | 56.19 | 58.34 | 59.94 | 60.64 | | | | | | | | |
| | 6.48 | 11.18 | 15.28 | 19.01 | 22.46 | 25.73 | 28.88 | 31.93 | 34.89 | 37.75 | 40.49 | 43.08 | 45.53 | 47.92 | 50.33 | 52.94 | | | | | | | | |
| 110 | 7.97 | 14.43 | 20.15 | 25.34 | 30.14 | 34.58 | 38.73 | 42.60 | 46.23 | 49.66 | 52.88 | 55.92 | 58.75 | 61.34 | 63.52 | 65.10 | 65.61 | | | | | | | |
| | 3.78 | 9.24 | 14.14 | 18.52 | 22.50 | 26.16 | 29.63 | 32.95 | 36.16 | 39.27 | 42.25 | 45.09 | 47.79 | 50.35 | 52.88 | 55.49 | 58.44 | | | | | | | |
| 120 | | 11.57 | 18.29 | 24.26 | 29.70 | 34.72 | 39.38 | 43.71 | 47.74 | 51.47 | 54.98 | 58.30 | 61.46 | 64.45 | 67.14 | 69.36 | 70.82 | | | | | | | |
| | | 6.92 | 12.71 | 17.85 | 22.43 | 26.58 | 30.42 | 34.03 | 37.48 | 40.81 | 44.03 | 47.13 | 50.11 | 52.98 | 55.78 | 58.53 | 61.42 | | | | | | | |
| 130 | | 8.62 | 16.35 | 23.13 | 29.26 | 34.86 | 40.04 | 44.83 | 49.26 | 53.38 | 57.22 | 60.85 | 64.29 | 67.58 | 70.70 | 73.52 | 75.81 | 77.21 | | | | | | |
| | | 4.62 | 11.19 | 17.05 | 22.32 | 27.07 | 31.38 | 35.34 | 39.06 | 42.61 | 46.03 | 49.35 | 52.58 | 55.72 | 58.74 | 61.67 | 64.62 | 67.75 | | | | | | |
| 140 | | | 13.78 | 21.66 | 28.56 | 34.71 | 40.28 | 45.42 | 50.24 | 54.79 | 59.15 | 63.20 | 67.04 | 70.62 | 73.95 | 77.10 | 80.00 | 82.43 | 83.95 | | | | | |
| | | | 9.29 | 16.21 | 22.34 | 27.79 | 32.66 | 37.08 | 41.15 | 44.96 | 48.59 | 52.06 | 55.39 | 58.58 | 61.67 | 64.68 | 67.66 | 70.70 | 74.05 | | | | | |
| 150 | | | 11.04 | 20.00 | 27.83 | 34.79 | 41.01 | 46.61 | 51.74 | 56.55 | 61.13 | 65.50 | 69.59 | 73.39 | 77.10 | 80.52 | 83.66 | 86.58 | 89.10 | 90.78 | | | | |
| | | | 6.88 | 14.58 | 21.42 | 27.47 | 32.81 | 37.63 | 42.07 | 46.28 | 50.32 | 54.21 | 57.88 | 61.35 | 64.70 | 67.83 | 70.82 | 73.78 | 76.78 | 80.16 | | | | |
| 160 | | | 7.77 | 17.86 | 26.72 | 34.63 | 41.70 | 47.99 | 53.64 | 58.79 | 63.58 | 68.14 | 72.56 | 76.78 | 80.71 | 84.31 | 87.69 | 90.93 | 93.55 | 95.89 | 97.60 | | | |
| | | | 4.24 | 12.68 | 20.38 | 27.11 | 33.08 | 38.46 | 43.36 | 47.90 | 52.17 | 56.31 | 60.34 | 64.22 | 67.87 | 71.23 | 74.46 | 77.58 | 80.23 | 82.92 | 86.03 | | | |
| 170 | | | | 15.74 | 25.75 | 34.53 | 42.18 | 48.94 | 55.02 | 60.57 | 65.74 | 70.61 | 75.30 | 79.85 | 84.20 | 88.21 | 91.80 | 94.94 | 97.92 | 100.76 | 103.21 | 104.59 | 105.20 | |
| | | | | 10.91 | 19.43 | 26.78 | 33.32 | 39.22 | 44.61 | 49.61 | 54.30 | 58.76 | 63.08 | 67.28 | 71.27 | 74.97 | 78.28 | 81.24 | 84.09 | 86.85 | 89.41 | 91.91 | 95.05 | |
| 180 | | | | 13.38 | 24.64 | 34.18 | 42.35 | 49.52 | 55.96 | 61.86 | 67.37 | 72.57 | 77.55 | 82.37 | 87.10 | 91.55 | 95.54 | 99.04 | 102.08 | 104.67 | 107.12 | 109.26 | 110.84 | 111.50 |
| | | | | 9.10 | 18.55 | 26.57 | 33.70 | 40.05 | 45.82 | 51.15 | 56.15 | 60.90 | 65.46 | 69.93 | 74.32 | 78.43 | 82.10 | 85.37 | 88.18 | 90.65 | 93.10 | 95.47 | 97.80 | 100.29 |
| 190 | | | | | 23.11 | 33.70 | 42.46 | 50.02 | 56.78 | 62.95 | 68.68 | 74.08 | 79.28 | 84.27 | 89.10 | 93.82 | 98.23 | 102.05 | 105.33 | 108.12 | 110.47 | 112.34 | 113.83 | 114.63 |
| | | | | | 17.51 | 26.69 | 34.45 | 41.17 | 47.22 | 52.82 | 58.10 | 63.17 | 68.10 | 72.85 | 77.41 | 81.81 | 85.86 | 89.39 | 92.45 | 95.15 | 97.46 | 99.58 | 101.86 | 104.20 |

(mm)

DIAMETER D= 400
HEIGHT h= 112 (eu=112, ed=106.4, fu=3, fd=0)
EXPANSION ANGLE $\lambda = 120$
BOSS RATIO $\nu = 0.35$

TABLE 29

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 69-70,
Replace Table 31 with the following:

EMBODIMENT 14

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 51.85 | | 14.54 | 18.10 | 21.43 | 24.61 | 27.61 | 30.37 | 32.91 | 35.28 | 37.49 | 39.54 | 41.40 | 42.87 | 43.76 | | | | | | | | | | |
| | | 13.71 | 16.41 | 18.97 | 21.36 | 23.70 | 26.05 | 28.40 | 30.70 | 32.91 | 35.02 | 37.11 | 39.21 | 41.42 | | | | | | | | | | |
| 60.69 | 8.46 | 13.39 | 17.64 | 21.48 | 24.92 | 28.04 | 30.97 | 33.73 | 36.34 | 38.82 | 41.17 | 43.34 | 45.21 | 46.64 | 47.39 | | | | | | | | | |
| | 7.99 | 11.79 | 15.24 | 18.28 | 21.11 | 23.85 | 26.53 | 29.14 | 31.68 | 34.13 | 36.48 | 38.72 | 40.87 | 43.01 | 45.28 | | | | | | | | | |
| 69.54 | 7.38 | 12.41 | 16.79 | 20.85 | 24.63 | 28.16 | 31.45 | 34.54 | 37.45 | 40.21 | 42.81 | 45.26 | 47.49 | 49.41 | 50.84 | 51.46 | | | | | | | | |
| | 6.09 | 10.51 | 14.36 | 17.86 | 21.11 | 24.19 | 27.14 | 30.01 | 32.79 | 35.48 | 38.05 | 40.49 | 42.79 | 45.04 | 47.30 | 49.76 | | | | | | | | |
| 78.38 | 4.44 | 10.21 | 15.31 | 19.95 | 24.23 | 28.20 | 31.90 | 35.36 | 38.60 | 41.66 | 44.54 | 47.25 | 49.78 | 52.09 | 54.04 | 55.44 | 55.90 | | | | | | | |
| | 3.55 | 8.69 | 13.29 | 17.41 | 21.14 | 24.59 | 27.85 | 30.97 | 33.99 | 36.91 | 39.71 | 42.38 | 44.91 | 47.32 | 49.70 | 52.15 | 54.93 | | | | | | | |
| 87.23 | | 7.65 | 13.65 | 18.98 | 23.84 | 28.32 | 32.49 | 36.35 | 39.94 | 43.28 | 46.41 | 49.38 | 52.19 | 54.86 | 57.27 | 59.25 | 60.56 | | | | | | | |
| | | 6.51 | 11.95 | 16.78 | 21.08 | 24.98 | 28.59 | 31.99 | 35.23 | 38.36 | 41.38 | 44.29 | 47.10 | 49.79 | 52.42 | 55.01 | 57.73 | | | | | | | |
| 96.08 | | 5.01 | 11.92 | 17.97 | 23.44 | 28.45 | 33.07 | 37.35 | 41.31 | 44.99 | 48.41 | 51.65 | 54.72 | 57.66 | 60.45 | 62.96 | 65.01 | 66.26 | | | | | | |
| | | 4.34 | 10.51 | 16.03 | 20.98 | 25.44 | 29.49 | 33.21 | 36.71 | 40.04 | 43.26 | 46.39 | 49.42 | 52.36 | 55.21 | 57.96 | 60.73 | 63.68 | | | | | | |
| 104.9 | | | 9.62 | 16.66 | 22.82 | 28.31 | 33.29 | 37.88 | 42.18 | 46.24 | 50.14 | 53.75 | 57.18 | 60.37 | 63.35 | 66.16 | 68.75 | 70.92 | 72.28 | | | | | |
| | | | 8.73 | 15.24 | 21.00 | 26.11 | 30.70 | 34.85 | 38.67 | 42.26 | 45.66 | 48.93 | 52.06 | 55.06 | 57.96 | 60.79 | 63.59 | 66.44 | 69.60 | | | | | |
| 113.8 | | | 7.18 | 15.18 | 22.17 | 28.39 | 33.94 | 38.94 | 43.52 | 47.81 | 51.90 | 55.80 | 59.46 | 62.85 | 66.16 | 69.21 | 72.02 | 74.63 | 76.88 | 78.38 | | | | |
| | | | 6.46 | 13.70 | 20.14 | 25.81 | 30.84 | 35.36 | 39.54 | 43.49 | 47.29 | 50.95 | 54.40 | 57.66 | 60.81 | 63.75 | 66.56 | 69.34 | 72.16 | 75.34 | | | | |
| 122.6 | | | 4.26 | 13.26 | 21.18 | 28.24 | 34.55 | 40.17 | 45.21 | 49.81 | 54.09 | 58.16 | 62.11 | 65.87 | 69.39 | 72.60 | 75.61 | 78.51 | 80.85 | 82.94 | 84.46 | | | |
| | | | 3.99 | 11.92 | 19.14 | 25.48 | 31.09 | 36.14 | 40.75 | 45.01 | 49.03 | 52.92 | 56.71 | 60.36 | 63.79 | 66.95 | 69.99 | 72.91 | 75.40 | 77.94 | 80.86 | | | |
| 131.5 | | | | 11.38 | 20.31 | 28.15 | 34.99 | 41.02 | 46.45 | 51.40 | 56.01 | 60.36 | 64.55 | 68.61 | 72.50 | 76.08 | 79.29 | 82.09 | 84.75 | 87.29 | 89.47 | 90.71 | 91.25 | |
| | | | | 10.26 | 18.26 | 25.17 | 31.31 | 36.86 | 41.93 | 46.63 | 51.04 | 55.22 | 59.29 | 63.24 | 66.98 | 70.46 | 73.57 | 76.36 | 79.03 | 81.63 | 84.04 | 86.39 | 89.34 | |
| 140.3 | | | | 9.27 | 19.32 | 27.84 | 35.14 | 41.54 | 47.29 | 52.56 | 57.47 | 62.11 | 66.56 | 70.86 | 75.09 | 79.06 | 82.62 | 85.75 | 88.46 | 90.78 | 92.98 | 94.87 | 96.29 | 96.87 |
| | | | | 8.55 | 17.44 | 24.97 | 31.67 | 37.64 | 43.06 | 48.07 | 52.77 | 57.24 | 61.52 | 65.72 | 69.85 | 73.71 | 77.16 | 80.24 | 82.87 | 85.19 | 87.50 | 89.73 | 91.91 | 94.26 |
| 149.2 | | | | | 17.96 | 27.41 | 35.23 | 41.99 | 48.01 | 53.53 | 58.64 | 63.46 | 68.11 | 72.56 | 76.87 | 81.09 | 85.03 | 88.44 | 91.36 | 93.86 | 95.96 | 97.63 | 98.96 | 99.67 |
| | | | | | 16.46 | 25.09 | 32.38 | 38.69 | 44.38 | 49.64 | 54.61 | 59.37 | 64.01 | 68.47 | 72.76 | 76.89 | 80.69 | 84.01 | 86.89 | 89.43 | 91.60 | 93.59 | 95.73 | 97.94 |

(mm)

DIAMETER D= 316
HEIGHT h= 100
EXPANSION ANGLE $\lambda$ = 120
BOSS RATIO $\nu$ = 0.272

TABLE 31

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 71-74,
Replace Table 33 with the following:

EMBODIMENT 15

| θ / r | 3.75 | 7.5 | 11.25 | 15 | 18.75 | 22.5 | 26.25 | 30 | 33.75 | 37.5 | 41.25 | 45 | 48.75 | 52.5 | 56.25 | 60 | 63.75 | 67.5 | 71.25 | 75 | 78.75 | 82.5 | 86.25 | 90 (deg) |
|---|---|---|---|---|---|---|---|---|---|---|---|---|---|---|---|---|---|---|---|---|---|---|---|---|
| 51.85 | | 14.54 | 18.10 | 21.43 | 24.61 | 27.61 | 30.37 | 32.91 | 35.28 | 37.49 | 39.54 | 41.40 | 42.87 | 43.76 | | | | | | | | | | |
| | | 13.71 | 16.41 | 18.97 | 21.36 | 23.70 | 26.05 | 28.40 | 30.70 | 32.91 | 35.02 | 37.11 | 39.21 | 41.42 | | | | | | | | | | |
| 60.69 | 8.46 | 13.39 | 17.64 | 21.48 | 24.92 | 28.04 | 30.97 | 33.73 | 36.34 | 38.82 | 41.17 | 43.34 | 45.21 | 46.64 | 47.39 | | | | | | | | | |
| | 7.99 | 11.79 | 15.24 | 18.28 | 21.11 | 23.85 | 26.53 | 29.14 | 31.68 | 34.13 | 36.48 | 38.72 | 40.87 | 43.01 | 45.28 | | | | | | | | | |
| 69.54 | 7.38 | 12.41 | 16.79 | 20.85 | 24.63 | 28.16 | 31.45 | 34.54 | 37.45 | 40.21 | 42.81 | 45.26 | 47.49 | 49.41 | 50.84 | 51.46 | | | | | | | | |
| | 6.09 | 10.51 | 14.36 | 17.86 | 21.11 | 24.19 | 27.14 | 30.01 | 32.79 | 35.48 | 38.05 | 40.49 | 42.79 | 45.04 | 47.30 | 49.76 | | | | | | | | |
| 78.38 | 4.44 | 10.21 | 15.31 | 19.95 | 24.23 | 28.20 | 31.90 | 35.36 | 38.60 | 41.66 | 44.54 | 47.25 | 49.78 | 52.09 | 54.04 | 55.44 | 55.90 | | | | | | | |
| | 3.55 | 8.69 | 13.29 | 17.41 | 21.14 | 24.59 | 27.85 | 30.97 | 33.99 | 38.91 | 39.71 | 42.38 | 44.91 | 47.32 | 49.70 | 52.15 | 54.93 | | | | | | | |
| 87.23 | | 7.65 | 13.65 | 18.98 | 23.84 | 28.32 | 32.49 | 36.35 | 39.94 | 43.28 | 46.41 | 49.38 | 52.19 | 54.86 | 57.27 | 59.25 | 60.56 | | | | | | | |
| | | 6.51 | 11.95 | 16.78 | 21.08 | 24.98 | 28.59 | 31.99 | 35.23 | 38.36 | 41.38 | 44.29 | 47.10 | 49.79 | 52.42 | 55.01 | 57.73 | | | | | | | |
| 96.08 | | 5.01 | 11.92 | 17.97 | 23.44 | 28.45 | 33.07 | 37.35 | 41.31 | 44.99 | 48.41 | 51.65 | 54.72 | 57.66 | 60.45 | 62.96 | 65.01 | 66.26 | | | | | | |
| | | 4.34 | 10.51 | 16.03 | 20.98 | 25.44 | 29.49 | 33.21 | 36.71 | 40.04 | 43.26 | 46.39 | 49.42 | 52.36 | 55.21 | 57.96 | 60.73 | 63.68 | | | | | | |
| 104.9 | | | 9.62 | 16.66 | 22.82 | 28.31 | 33.29 | 37.88 | 42.18 | 46.24 | 50.14 | 53.75 | 57.18 | 60.37 | 63.35 | 66.16 | 68.75 | 70.92 | 72.28 | | | | | |
| | | | 8.73 | 15.24 | 21.00 | 26.11 | 30.70 | 34.85 | 38.67 | 42.26 | 45.66 | 48.93 | 52.06 | 55.06 | 57.96 | 60.79 | 63.59 | 66.44 | 69.60 | | | | | |
| 113.8 | | | 7.18 | 15.18 | 22.17 | 28.39 | 33.94 | 38.94 | 43.52 | 47.81 | 51.90 | 55.80 | 59.46 | 62.85 | 66.16 | 69.21 | 72.02 | 74.63 | 76.88 | 78.38 | | | | |
| | | | 6.46 | 13.70 | 20.14 | 25.81 | 30.84 | 35.36 | 39.54 | 43.49 | 47.29 | 50.95 | 54.40 | 57.66 | 60.81 | 63.75 | 66.56 | 69.34 | 72.16 | 75.34 | | | | |
| 122.6 | | | 4.26 | 13.26 | 21.18 | 28.24 | 34.55 | 40.17 | 45.21 | 49.81 | 54.09 | 58.16 | 62.11 | 65.87 | 69.39 | 72.60 | 75.61 | 78.51 | 80.85 | 82.94 | 84.46 | | | |
| | | | 3.99 | 11.92 | 19.14 | 25.48 | 31.09 | 36.14 | 40.75 | 45.01 | 49.03 | 52.92 | 56.71 | 60.36 | 63.79 | 66.95 | 69.99 | 72.91 | 75.40 | 77.94 | 80.86 | | | |
| 131.5 | | | | 11.38 | 20.31 | 28.15 | 34.99 | 41.02 | 46.45 | 51.40 | 56.01 | 60.36 | 64.55 | 68.61 | 72.50 | 76.08 | 79.29 | 82.09 | 84.75 | 87.29 | 89.47 | 90.71 | 91.25 | |
| | | | | 10.26 | 18.26 | 25.17 | 31.31 | 36.86 | 41.93 | 46.63 | 51.04 | 55.22 | 59.29 | 63.24 | 66.98 | 70.46 | 73.57 | 76.36 | 79.03 | 81.63 | 84.04 | 86.39 | 89.34 | |
| 140.3 | | | | 9.27 | 19.32 | 27.84 | 35.14 | 41.54 | 47.29 | 52.56 | 57.47 | 62.11 | 66.56 | 70.86 | 75.09 | 79.06 | 82.62 | 85.75 | 88.46 | 90.78 | 92.96 | 94.87 | 96.29 | 96.87 |
| | | | | 8.55 | 17.44 | 24.97 | 31.67 | 37.64 | 43.06 | 48.07 | 52.77 | 57.24 | 61.52 | 65.72 | 69.85 | 73.71 | 77.16 | 80.24 | 82.87 | 85.19 | 87.50 | 89.73 | 91.91 | 94.26 |
| 149.2 | | | | | 17.96 | 27.41 | 35.23 | 41.99 | 48.01 | 53.53 | 58.64 | 63.46 | 68.11 | 72.56 | 76.87 | 81.09 | 85.03 | 88.44 | 91.36 | 93.86 | 95.96 | 97.63 | 98.96 | 99.67 |
| | | | | | 16.46 | 25.09 | 32.38 | 38.69 | 44.38 | 49.64 | 54.61 | 59.37 | 64.01 | 68.47 | 72.76 | 76.89 | 80.69 | 84.01 | 86.89 | 89.43 | 91.60 | 93.59 | 95.73 | 97.94 |

(mm)

DIAMETER $D = 316$
HEIGHT $h = 100$
EXPANSION ANGLE $\lambda = 90$
BOSS RATIO $\nu = 0.272$

TABLE 33

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 75-78,
Replace Table 35 with the following:

EMBODIMENT 16

| θ / r | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 (deg) |
|---|---|---|---|---|---|---|---|---|---|---|---|---|---|---|---|---|---|---|---|---|---|---|---|---|
| 51.85 | | 14.54 | 18.10 | 21.43 | 24.61 | 27.61 | 30.37 | 32.91 | 35.28 | 37.49 | 39.54 | 41.40 | 42.87 | 43.76 | | | | | | | | | | |
| | | 13.71 | 16.41 | 18.97 | 21.36 | 23.70 | 26.05 | 28.40 | 30.70 | 32.91 | 35.02 | 37.11 | 39.21 | 41.42 | | | | | | | | | | |
| 60.69 | 8.46 | 13.39 | 17.64 | 21.48 | 24.92 | 28.04 | 30.97 | 33.73 | 36.34 | 38.82 | 41.17 | 43.34 | 45.21 | 46.64 | 47.39 | | | | | | | | | |
| | 7.99 | 11.79 | 15.24 | 18.28 | 21.11 | 23.85 | 26.53 | 29.14 | 31.68 | 34.13 | 36.48 | 38.72 | 40.87 | 43.01 | 45.28 | | | | | | | | | |
| 69.54 | 7.38 | 12.41 | 16.79 | 20.85 | 24.63 | 28.16 | 31.45 | 34.54 | 37.45 | 40.21 | 42.81 | 45.26 | 47.49 | 49.41 | 50.84 | 51.46 | | | | | | | | |
| | 6.09 | 10.51 | 14.36 | 17.86 | 21.11 | 24.19 | 27.14 | 30.01 | 32.79 | 35.48 | 38.05 | 40.49 | 42.79 | 45.04 | 47.30 | 49.76 | | | | | | | | |
| 78.38 | 4.44 | 10.21 | 15.31 | 19.95 | 24.23 | 28.20 | 31.90 | 35.36 | 38.60 | 41.66 | 44.54 | 47.25 | 49.78 | 52.09 | 54.04 | 55.44 | 55.90 | | | | | | | |
| | 3.55 | 8.69 | 13.29 | 17.41 | 21.14 | 24.59 | 27.85 | 30.97 | 33.99 | 36.91 | 39.71 | 42.38 | 44.91 | 47.32 | 49.70 | 52.15 | 54.93 | | | | | | | |
| 87.23 | | 7.65 | 13.65 | 18.98 | 23.84 | 28.32 | 32.49 | 36.35 | 39.94 | 43.28 | 46.41 | 49.38 | 52.19 | 54.86 | 57.27 | 59.25 | 60.56 | | | | | | | |
| | | 6.51 | 11.95 | 16.78 | 21.08 | 24.98 | 28.59 | 31.99 | 35.23 | 38.36 | 41.38 | 44.29 | 47.10 | 49.79 | 52.42 | 55.01 | 57.73 | | | | | | | |
| 96.08 | | 5.01 | 11.92 | 17.97 | 23.44 | 28.45 | 33.07 | 37.35 | 41.31 | 44.99 | 48.41 | 51.65 | 54.72 | 57.66 | 60.45 | 62.96 | 65.01 | 66.26 | | | | | | |
| | | 4.34 | 10.51 | 16.03 | 20.98 | 25.44 | 29.49 | 33.21 | 36.71 | 40.04 | 43.26 | 46.39 | 49.42 | 52.36 | 55.21 | 57.96 | 60.73 | 63.68 | | | | | | |
| 104.9 | | | 9.62 | 16.66 | 22.82 | 28.31 | 33.29 | 37.88 | 42.18 | 46.24 | 50.14 | 53.75 | 57.18 | 60.37 | 63.35 | 66.16 | 68.75 | 70.92 | 72.28 | | | | | |
| | | | 8.73 | 15.24 | 21.00 | 26.11 | 30.70 | 34.85 | 38.67 | 42.26 | 45.66 | 48.93 | 52.06 | 55.06 | 57.96 | 60.79 | 63.59 | 66.44 | 69.60 | | | | | |
| 113.8 | | | 7.18 | 15.18 | 22.17 | 28.39 | 33.94 | 38.94 | 43.52 | 47.81 | 51.90 | 55.80 | 59.46 | 62.85 | 66.16 | 69.21 | 72.02 | 74.63 | 76.88 | 78.38 | | | | |
| | | | 6.46 | 13.70 | 20.14 | 25.81 | 30.84 | 35.36 | 39.54 | 43.49 | 47.29 | 50.95 | 54.40 | 57.66 | 60.81 | 63.75 | 66.56 | 69.34 | 72.16 | 75.34 | | | | |
| 122.6 | | | 4.26 | 13.26 | 21.18 | 28.24 | 34.55 | 40.17 | 45.21 | 49.81 | 54.09 | 58.16 | 62.11 | 65.87 | 69.39 | 72.60 | 75.81 | 78.51 | 80.85 | 82.94 | 84.46 | | | |
| | | | 3.99 | 11.92 | 19.14 | 25.48 | 31.09 | 36.14 | 40.75 | 45.01 | 49.03 | 52.92 | 56.71 | 60.36 | 63.79 | 66.95 | 69.99 | 72.91 | 75.40 | 77.94 | 80.86 | | | |
| 131.5 | | | | 11.38 | 20.31 | 28.15 | 34.99 | 41.02 | 46.45 | 51.40 | 56.01 | 60.36 | 64.55 | 68.61 | 72.50 | 76.08 | 79.29 | 82.09 | 84.75 | 87.29 | 89.47 | 90.71 | 91.25 | |
| | | | | 10.26 | 18.26 | 25.17 | 31.31 | 36.86 | 41.93 | 46.63 | 51.04 | 55.22 | 59.29 | 63.24 | 66.98 | 70.46 | 73.57 | 76.36 | 79.03 | 81.63 | 84.04 | 86.39 | 89.34 | |
| 140.3 | | | | 9.27 | 19.32 | 27.84 | 35.14 | 41.54 | 47.29 | 52.56 | 57.47 | 62.11 | 66.56 | 70.86 | 75.09 | 79.06 | 82.62 | 85.75 | 88.46 | 90.78 | 92.96 | 94.87 | 96.29 | 96.87 |
| | | | | 8.55 | 17.44 | 24.97 | 31.67 | 37.64 | 43.06 | 48.07 | 52.77 | 57.24 | 61.52 | 65.72 | 69.85 | 73.71 | 77.16 | 80.24 | 82.87 | 85.19 | 87.50 | 89.73 | 91.91 | 94.26 |
| 149.2 | | | | | 17.96 | 27.41 | 35.23 | 41.99 | 48.01 | 53.53 | 58.64 | 63.46 | 68.11 | 72.56 | 76.87 | 81.09 | 85.03 | 88.44 | 91.36 | 93.86 | 95.96 | 97.63 | 98.96 | 99.67 |
| | | | | | 16.46 | 25.09 | 32.38 | 38.69 | 44.38 | 49.64 | 54.61 | 59.37 | 64.01 | 68.47 | 72.78 | 76.89 | 80.69 | 84.01 | 86.89 | 89.43 | 91.60 | 93.59 | 95.73 | 97.94 |

(mm)

DIAMETER $D = 316$
HEIGHT $h = 100$
EXPANSION ANGLE $\lambda = 72$
BOSS RATIO $\nu = 0.272$

TABLE 35

CERTIFICATE OF CORRECTION

PATENT NO. : 6,688,848 B2

DATED : February 10, 2004

INVENTOR(S) : M. Ohtsuka

It is certified that error appears in the above-identified patent and that said Letters Patent is hereby corrected as shown below:

Columns 79-82,

Replace Table 37 with the following:

EMBODIMENT 17

| θ / r | 4.521 | 9.042 | 13.56 | 18.08 | 22.6 | 27.13 | 31.65 | 36.17 | 40.69 | 45.21 | 49.73 | 54.25 | 58.77 | 63.29 | 67.81 | 72.33 | 76.85 | 81.38 | 85.9 | 90.42 | 94.94 | 99.46 | 104 | 108.5 (deg) |
|---|---|---|---|---|---|---|---|---|---|---|---|---|---|---|---|---|---|---|---|---|---|---|---|---|
| 51.85 | | 14.54 | 18.10 | 21.43 | 24.61 | 27.61 | 30.37 | 32.91 | 35.28 | 37.49 | 39.54 | 41.40 | 42.87 | 43.76 | | | | | | | | | | |
| | | 13.71 | 16.41 | 18.97 | 21.36 | 23.70 | 26.05 | 28.40 | 30.70 | 32.91 | 35.02 | 37.11 | 39.21 | 41.42 | | | | | | | | | | |
| 60.69 | 8.46 | 13.39 | 17.64 | 21.48 | 24.92 | 28.04 | 30.97 | 33.73 | 36.34 | 38.82 | 41.17 | 43.34 | 45.21 | 46.64 | 47.39 | | | | | | | | | |
| | 7.99 | 11.79 | 15.24 | 18.28 | 21.11 | 23.85 | 26.53 | 29.14 | 31.68 | 34.13 | 36.48 | 38.72 | 40.87 | 43.01 | 45.28 | | | | | | | | | |
| 69.54 | 7.38 | 12.41 | 16.79 | 20.85 | 24.63 | 28.16 | 31.45 | 34.54 | 37.45 | 40.21 | 42.81 | 45.26 | 47.49 | 49.41 | 50.84 | 51.46 | | | | | | | | |
| | 6.09 | 10.51 | 14.36 | 17.86 | 21.11 | 24.19 | 27.14 | 30.01 | 32.79 | 35.48 | 38.05 | 40.49 | 42.79 | 45.04 | 47.30 | 49.76 | | | | | | | | |
| 78.38 | 4.44 | 10.21 | 15.31 | 19.95 | 24.23 | 28.20 | 31.90 | 35.36 | 38.60 | 41.66 | 44.54 | 47.25 | 49.78 | 52.09 | 54.04 | 55.44 | 55.90 | | | | | | | |
| | 3.55 | 8.69 | 13.29 | 17.41 | 21.14 | 24.59 | 27.85 | 30.97 | 33.99 | 36.91 | 39.71 | 42.38 | 44.91 | 47.32 | 49.70 | 52.15 | 54.93 | | | | | | | |
| 87.23 | | 7.65 | 13.65 | 18.98 | 23.84 | 28.32 | 32.49 | 36.35 | 39.94 | 43.28 | 46.41 | 49.38 | 52.19 | 54.86 | 57.27 | 59.25 | 60.56 | | | | | | | |
| | | 6.51 | 11.95 | 16.78 | 21.08 | 24.98 | 28.59 | 31.99 | 35.23 | 38.36 | 41.38 | 44.29 | 47.10 | 49.79 | 52.42 | 55.01 | 57.73 | | | | | | | |
| 96.08 | | 5.01 | 11.92 | 17.97 | 23.44 | 28.45 | 33.07 | 37.35 | 41.31 | 44.99 | 48.41 | 51.65 | 54.72 | 57.66 | 60.45 | 62.96 | 65.01 | 66.26 | | | | | | |
| | | 4.34 | 10.51 | 16.03 | 20.98 | 25.44 | 29.49 | 33.21 | 36.71 | 40.04 | 43.26 | 46.39 | 49.42 | 52.36 | 55.21 | 57.96 | 60.73 | 63.68 | | | | | | |
| 104.9 | | | 9.62 | 16.66 | 22.82 | 28.31 | 33.29 | 37.88 | 42.18 | 46.24 | 50.14 | 53.75 | 57.18 | 60.37 | 63.35 | 66.16 | 68.75 | 70.92 | 72.28 | | | | | |
| | | | 8.73 | 15.24 | 21.00 | 26.11 | 30.70 | 34.85 | 38.67 | 42.26 | 45.66 | 48.93 | 52.06 | 55.06 | 57.96 | 60.79 | 63.59 | 66.44 | 69.60 | | | | | |
| 113.8 | | | 7.18 | 15.18 | 22.17 | 28.39 | 33.94 | 38.94 | 43.52 | 47.81 | 51.90 | 55.80 | 59.46 | 62.85 | 66.16 | 69.21 | 72.02 | 74.63 | 76.88 | 78.38 | | | | |
| | | | 6.46 | 13.70 | 20.14 | 25.81 | 30.84 | 35.36 | 39.54 | 43.49 | 47.29 | 50.95 | 54.40 | 57.66 | 60.81 | 63.75 | 66.56 | 69.34 | 72.16 | 75.34 | | | | |
| 122.6 | | | 4.26 | 13.26 | 21.18 | 28.24 | 34.55 | 40.17 | 45.21 | 49.81 | 54.09 | 58.16 | 62.11 | 65.87 | 69.39 | 72.60 | 75.61 | 78.51 | 80.85 | 82.94 | 84.46 | | | |
| | | | 3.99 | 11.92 | 19.14 | 25.48 | 31.09 | 36.14 | 40.75 | 45.01 | 49.03 | 52.92 | 56.71 | 60.36 | 63.79 | 66.95 | 69.99 | 72.91 | 75.40 | 77.94 | 80.86 | | | |
| 131.5 | | | | 11.38 | 20.31 | 28.15 | 34.99 | 41.02 | 46.45 | 51.40 | 56.01 | 60.36 | 64.55 | 68.61 | 72.50 | 76.08 | 79.29 | 82.09 | 84.75 | 87.29 | 89.47 | 90.71 | 91.25 | |
| | | | | 10.26 | 18.26 | 25.17 | 31.31 | 36.86 | 41.93 | 46.83 | 51.04 | 55.22 | 59.29 | 63.24 | 66.98 | 70.46 | 73.57 | 76.36 | 79.03 | 81.63 | 84.04 | 86.39 | 89.34 | |
| 140.3 | | | | 9.27 | 19.32 | 27.84 | 35.14 | 41.54 | 47.29 | 52.56 | 57.47 | 62.11 | 66.56 | 70.86 | 75.09 | 79.06 | 82.62 | 85.75 | 88.46 | 90.78 | 92.96 | 94.87 | 96.29 | 96.87 |
| | | | | 8.55 | 17.44 | 24.97 | 31.67 | 37.64 | 43.06 | 48.07 | 52.77 | 57.24 | 61.52 | 65.72 | 69.85 | 73.71 | 77.16 | 80.24 | 82.87 | 85.19 | 87.50 | 89.73 | 91.91 | 94.26 |
| 149.2 | | | | | 17.96 | 27.41 | 35.23 | 41.99 | 48.01 | 53.53 | 58.64 | 63.46 | 68.11 | 72.56 | 76.87 | 81.09 | 85.03 | 88.44 | 91.36 | 93.86 | 95.96 | 97.63 | 98.96 | 99.67 |
| | | | | | 16.46 | 25.09 | 32.38 | 38.69 | 44.38 | 49.64 | 54.61 | 59.37 | 64.01 | 68.47 | 72.76 | 76.89 | 80.69 | 84.01 | 86.89 | 89.43 | 91.60 | 93.59 | 95.73 | 97.94 |

(mm)

DIAMETER D= 316

HEIGHT h= 100

EXPANSION ANGLE $\lambda$ = 108.5

BOSS RATIO $\nu$ = 0.272

TABLE 37

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 83-84,
Replace Table 39 with the following:

EMBODIMENT 18

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 86.92 | | 23.41 | 29.14 | 34.50 | 39.63 | 44.45 | 48.90 | 52.99 | 56.80 | 60.36 | 63.66 | 66.65 | 69.02 | 70.46 | | | | | | | | | | |
| | | 22.07 | 26.42 | 30.54 | 34.40 | 38.16 | 41.94 | 45.72 | 49.43 | 52.98 | 56.38 | 59.75 | 63.12 | 66.69 | | | | | | | | | | |
| 98.85 | 13.62 | 21.56 | 28.41 | 34.58 | 40.12 | 45.15 | 49.86 | 54.30 | 58.50 | 62.50 | 66.29 | 69.78 | 72.80 | 75.10 | 76.30 | | | | | | | | | |
| | 12.86 | 18.99 | 24.53 | 29.43 | 33.98 | 38.40 | 42.71 | 46.92 | 51.00 | 54.95 | 58.73 | 62.34 | 65.80 | 69.24 | 72.90 | | | | | | | | | |
| 110.8 | 11.88 | 19.98 | 27.04 | 33.57 | 39.65 | 45.33 | 50.63 | 55.61 | 60.29 | 64.73 | 68.93 | 72.86 | 76.48 | 79.55 | 81.86 | 82.86 | | | | | | | | |
| | 9.80 | 16.92 | 23.13 | 28.76 | 33.98 | 38.94 | 43.70 | 48.31 | 52.80 | 57.12 | 61.26 | 65.18 | 68.90 | 72.51 | 76.15 | 80.11 | | | | | | | | |
| 122.7 | 7.14 | 16.43 | 24.66 | 32.12 | 39.01 | 45.40 | 51.36 | 56.93 | 62.15 | 67.07 | 71.70 | 76.07 | 80.14 | 83.86 | 87.00 | 89.26 | 90.00 | | | | | | | |
| | 5.72 | 13.98 | 21.39 | 28.03 | 34.04 | 39.58 | 44.84 | 49.86 | 54.72 | 59.42 | 63.93 | 68.23 | 72.31 | 76.19 | 80.02 | 83.96 | 88.44 | | | | | | | |
| 134.6 | | 12.32 | 21.98 | 30.56 | 38.38 | 45.60 | 52.30 | 58.52 | 64.31 | 69.68 | 74.73 | 79.50 | 84.03 | 88.33 | 92.21 | 95.39 | 97.50 | | | | | | | |
| | | 10.48 | 19.24 | 27.01 | 33.94 | 40.22 | 46.02 | 51.50 | 56.72 | 61.76 | 66.62 | 71.31 | 75.83 | 80.17 | 84.40 | 88.56 | 92.94 | | | | | | | |
| 146.5 | | 8.07 | 19.19 | 28.93 | 37.74 | 45.80 | 53.25 | 60.13 | 66.50 | 72.43 | 77.95 | 83.16 | 88.10 | 92.84 | 97.32 | 101.37 | 104.66 | 106.67 | | | | | | |
| | | 6.99 | 16.93 | 25.81 | 33.78 | 40.96 | 47.48 | 53.48 | 59.11 | 64.47 | 69.64 | 74.68 | 79.57 | 84.31 | 88.88 | 93.32 | 97.77 | 102.52 | | | | | | |
| 158.5 | | | 15.49 | 26.82 | 36.74 | 45.59 | 53.59 | 60.98 | 67.91 | 74.45 | 80.72 | 86.54 | 92.06 | 97.20 | 101.99 | 106.52 | 110.69 | 114.18 | 116.37 | | | | | |
| | | | 14.05 | 24.53 | 33.81 | 42.04 | 49.43 | 56.11 | 62.26 | 68.03 | 73.52 | 78.78 | 83.81 | 88.64 | 93.31 | 97.87 | 102.38 | 106.97 | 112.06 | | | | | |
| 170.4 | | | 11.56 | 24.44 | 35.70 | 45.70 | 54.64 | 62.69 | 70.07 | 76.98 | 83.56 | 89.84 | 95.73 | 101.19 | 106.51 | 111.44 | 115.95 | 120.15 | 123.77 | 126.19 | | | | |
| | | | 10.41 | 22.06 | 32.42 | 41.56 | 49.65 | 56.94 | 63.65 | 70.02 | 78.14 | 82.03 | 87.56 | 92.84 | 97.90 | 102.64 | 107.17 | 111.64 | 116.18 | 121.29 | | | | |
| 182.3 | | | 6.85 | 21.36 | 34.10 | 45.47 | 55.63 | 64.68 | 72.80 | 80.20 | 87.08 | 93.64 | 99.99 | 106.05 | 111.71 | 116.89 | 121.74 | 126.40 | 130.17 | 133.53 | 135.99 | | | |
| | | | 6.42 | 19.19 | 30.81 | 41.02 | 50.06 | 58.19 | 65.61 | 72.47 | 78.94 | 85.20 | 91.31 | 97.18 | 102.70 | 107.79 | 112.68 | 117.39 | 121.39 | 125.48 | 130.18 | | | |
| 194.2 | | | | 18.32 | 32.71 | 45.32 | 56.33 | 66.04 | 74.78 | 82.75 | 90.18 | 97.19 | 103.93 | 110.47 | 116.73 | 122.49 | 127.65 | 132.17 | 136.45 | 140.53 | 144.05 | 146.04 | 146.91 | |
| | | | | 16.51 | 29.39 | 40.53 | 50.42 | 59.34 | 67.51 | 75.07 | 82.17 | 88.91 | 95.45 | 101.81 | 107.84 | 113.44 | 118.45 | 122.94 | 127.24 | 131.42 | 135.30 | 139.08 | 143.83 | |
| 206.2 | | | | 14.93 | 31.11 | 44.82 | 56.57 | 66.87 | 76.13 | 84.62 | 92.53 | 100.00 | 107.17 | 114.09 | 120.89 | 127.29 | 133.02 | 138.06 | 142.43 | 146.15 | 149.67 | 152.74 | 155.02 | 155.96 |
| | | | | 13.77 | 28.07 | 40.20 | 50.99 | 60.61 | 69.33 | 77.40 | 84.96 | 92.15 | 99.05 | 105.81 | 112.46 | 118.68 | 124.23 | 129.18 | 133.42 | 137.16 | 140.88 | 144.46 | 147.98 | 151.75 |
| 218.1 | | | | | 28.91 | 44.14 | 56.72 | 67.60 | 77.30 | 86.18 | 94.42 | 102.18 | 109.65 | 116.83 | 123.76 | 130.56 | 136.90 | 142.38 | 147.10 | 151.11 | 154.49 | 157.18 | 159.32 | 160.47 |
| | | | | | 26.50 | 40.39 | 52.13 | 62.30 | 71.45 | 79.93 | 87.92 | 95.59 | 103.05 | 110.24 | 117.14 | 123.79 | 129.92 | 135.26 | 139.89 | 143.98 | 147.48 | 150.68 | 154.12 | 157.68 |

(mm)

DIAMETER $D = 460$
HEIGHT $h = 161$
EXPANSION ANGLE $\lambda = 120$
BOSS RATIO $\nu = 0.326$

TABLE 39

UNITED STATES PATENT AND TRADEMARK OFFICE

CERTIFICATE OF CORRECTION

PATENT NO. : 6,688,848 B2

DATED : February 10, 2004

INVENTOR(S) : M. Ohtsuka

It is certified that error appears in the above-identified patent and that said Letters Patent is hereby corrected as shown below:

Columns 85-88,
Replace Table 41 with the following:

EMBODIMENT 19

| r \ θ | 5.217 | 10.43 | 15.65 | 20.87 | 26.08 | 31.3 | 36.52 | 41.73 | 46.95 | 52.17 | 57.38 | 62.6 | 67.82 | 73.03 | 78.25 | 83.47 | 88.68 | 93.9 | 99.12 | 104.3 | 109.6 | 114.8 | 120 | 125.2 (deg) |
|---|---|---|---|---|---|---|---|---|---|---|---|---|---|---|---|---|---|---|---|---|---|---|---|---|
| 86.92 | | 24.43 | 30.41 | 36.00 | 41.35 | 46.38 | 51.02 | 55.30 | 59.27 | 62.99 | 66.43 | 69.55 | 72.02 | 73.52 | | | | | | | | | | |
| | | 23.03 | 27.56 | 31.87 | 35.89 | 39.82 | 43.76 | 47.71 | 51.58 | 55.28 | 58.84 | 62.35 | 65.87 | 69.59 | | | | | | | | | | |
| 98.85 | 14.21 | 22.50 | 29.64 | 36.08 | 41.87 | 47.11 | 52.03 | 56.66 | 61.04 | 65.22 | 69.17 | 72.82 | 75.96 | 78.36 | 79.62 | | | | | | | | | |
| | 13.42 | 19.81 | 25.60 | 30.71 | 35.46 | 40.07 | 44.57 | 48.96 | 53.22 | 57.34 | 61.28 | 65.05 | 68.66 | 72.25 | 76.07 | | | | | | | | | |
| 110.8 | 12.40 | 20.84 | 28.21 | 35.03 | 41.38 | 47.30 | 52.84 | 58.03 | 62.92 | 67.55 | 71.93 | 76.03 | 79.79 | 83.00 | 85.42 | 86.46 | | | | | | | | |
| | 10.22 | 17.65 | 24.13 | 30.01 | 35.46 | 40.63 | 45.60 | 50.41 | 55.09 | 59.60 | 63.92 | 68.02 | 71.89 | 75.66 | 79.46 | 83.59 | | | | | | | | |
| 122.7 | 7.45 | 17.15 | 25.73 | 33.52 | 40.70 | 47.38 | 53.59 | 59.40 | 64.85 | 69.98 | 74.82 | 79.38 | 83.63 | 87.50 | 90.78 | 93.14 | 93.91 | | | | | | | |
| | 5.96 | 14.59 | 22.32 | 29.24 | 35.52 | 41.30 | 46.79 | 52.03 | 57.10 | 62.00 | 66.71 | 71.20 | 75.46 | 79.50 | 83.50 | 87.61 | 92.28 | | | | | | | |
| 134.6 | | 12.85 | 22.93 | 31.88 | 40.04 | 47.58 | 54.58 | 61.07 | 67.10 | 72.71 | 77.98 | 82.96 | 87.68 | 92.17 | 96.22 | 99.54 | 101.74 | | | | | | | |
| | | 10.93 | 20.08 | 28.19 | 35.41 | 41.96 | 48.02 | 53.74 | 59.18 | 64.44 | 69.52 | 74.41 | 79.13 | 83.65 | 88.07 | 92.41 | 96.98 | | | | | | | |
| 146.5 | | 8.42 | 20.03 | 30.19 | 39.38 | 47.80 | 55.56 | 62.75 | 69.40 | 75.58 | 81.34 | 86.77 | 91.93 | 96.88 | 101.56 | 105.78 | 109.21 | 111.31 | | | | | | |
| | | 7.30 | 17.66 | 26.93 | 35.24 | 42.74 | 49.55 | 55.80 | 61.68 | 67.27 | 72.67 | 77.93 | 83.03 | 87.97 | 92.75 | 97.38 | 102.02 | 106.98 | | | | | | |
| 158.5 | | | 16.16 | 27.98 | 38.34 | 47.57 | 55.92 | 63.64 | 70.86 | 77.69 | 84.23 | 90.30 | 96.06 | 101.42 | 106.43 | 111.16 | 115.50 | 119.15 | 121.43 | | | | | |
| | | | 14.66 | 25.60 | 35.28 | 43.87 | 51.58 | 58.55 | 64.97 | 70.99 | 76.72 | 82.20 | 87.46 | 92.50 | 97.37 | 102.12 | 106.84 | 111.62 | 116.93 | | | | | |
| 170.4 | | | 12.06 | 25.50 | 37.25 | 47.69 | 57.01 | 65.41 | 73.12 | 80.33 | 87.19 | 93.74 | 99.89 | 105.59 | 111.14 | 116.28 | 121.00 | 125.38 | 129.16 | 131.68 | | | | |
| | | | 10.86 | 23.02 | 33.83 | 43.37 | 51.80 | 59.41 | 66.42 | 73.07 | 79.45 | 85.60 | 91.39 | 96.88 | 102.16 | 107.10 | 111.83 | 116.50 | 121.24 | 126.56 | | | | |
| 182.3 | | | 7.15 | 22.28 | 35.58 | 47.45 | 58.04 | 67.49 | 75.96 | 83.69 | 90.86 | 97.72 | 104.34 | 110.66 | 116.57 | 121.97 | 127.03 | 131.89 | 135.83 | 139.33 | 141.90 | | | |
| | | | 6.70 | 20.03 | 32.15 | 42.80 | 52.24 | 60.72 | 68.46 | 75.62 | 82.37 | 88.91 | 95.28 | 101.40 | 107.16 | 112.48 | 117.58 | 122.50 | 126.67 | 130.93 | 135.84 | | | |
| 194.2 | | | | 19.12 | 34.13 | 47.29 | 58.78 | 68.92 | 78.04 | 86.35 | 94.10 | 101.41 | 108.44 | 115.27 | 121.80 | 127.81 | 133.20 | 137.92 | 142.38 | 146.64 | 150.31 | 152.39 | 153.30 | |
| | | | | 17.23 | 30.67 | 42.29 | 52.61 | 61.92 | 70.44 | 78.34 | 85.74 | 92.77 | 99.60 | 106.24 | 112.52 | 118.37 | 123.60 | 128.28 | 132.77 | 137.14 | 141.18 | 145.13 | 150.08 | |
| 206.2 | | | | 15.58 | 32.46 | 46.76 | 59.03 | 69.78 | 79.44 | 88.30 | 96.55 | 104.35 | 111.83 | 119.05 | 126.14 | 132.83 | 138.80 | 144.06 | 148.62 | 152.51 | 156.18 | 159.38 | 161.76 | 162.74 |
| | | | | 14.36 | 29.29 | 41.95 | 53.21 | 63.24 | 72.35 | 80.78 | 88.66 | 96.16 | 103.36 | 110.41 | 117.35 | 123.84 | 129.64 | 134.80 | 139.22 | 143.12 | 147.00 | 150.74 | 154.42 | 158.35 |
| 218.1 | | | | | 30.17 | 46.06 | 59.18 | 70.54 | 80.66 | 89.93 | 98.52 | 106.62 | 114.42 | 121.91 | 129.14 | 136.24 | 142.85 | 148.57 | 153.49 | 157.68 | 161.21 | 164.02 | 166.25 | 167.45 |
| | | | | | 27.65 | 42.14 | 54.40 | 65.00 | 74.56 | 83.40 | 91.74 | 99.74 | 107.53 | 115.03 | 122.23 | 129.17 | 135.56 | 141.14 | 145.97 | 150.24 | 153.89 | 157.24 | 160.82 | 164.53 |

(mm)

DIAMETER $D = 460$
HEIGHT $h = 168$
EXPANSION ANGLE $\lambda = 125.2$
BOSS RATIO $\nu = 0.326$

TABLE 41

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 89-92,
Replace Table 43 with the following:

EMBODIMENT 20

| $\theta$ / r | 4.346 | 8.692 | 13.04 | 17.38 | 21.73 | 26.08 | 30.42 | 34.77 | 39.11 | 43.46 | 47.8 | 52.15 | 56.5 | 60.84 | 65.19 | 69.53 | 73.88 | 78.23 | 82.57 | 86.92 | 91.26 | 95.61 | 99.95 | 104.3 (deg) |
|---|---|---|---|---|---|---|---|---|---|---|---|---|---|---|---|---|---|---|---|---|---|---|---|---|
| 86.92 | | 20.36 | 25.34 | 30.00 | 34.46 | 38.65 | 42.52 | 46.08 | 49.39 | 52.49 | 55.36 | 57.96 | 60.02 | 61.27 | | | | | | | | | | |
| | | 19.19 | 22.97 | 26.56 | 29.91 | 33.18 | 36.47 | 39.76 | 42.98 | 46.07 | 49.03 | 51.96 | 54.89 | 57.99 | | | | | | | | | | |
| 98.85 | 11.84 | 18.75 | 24.70 | 30.07 | 34.89 | 39.26 | 43.36 | 47.22 | 50.87 | 54.35 | 57.64 | 60.68 | 63.30 | 65.30 | 66.35 | | | | | | | | | |
| | 11.18 | 16.51 | 21.33 | 25.59 | 29.55 | 33.39 | 37.14 | 40.80 | 44.35 | 47.78 | 51.07 | 54.21 | 57.22 | 60.21 | 63.39 | | | | | | | | | |
| 110.8 | 10.33 | 17.37 | 23.51 | 29.19 | 34.48 | 39.42 | 44.03 | 48.36 | 52.43 | 56.29 | 59.94 | 63.36 | 66.49 | 69.17 | 71.18 | 72.05 | | | | | | | | |
| | 8.52 | 14.71 | 20.11 | 25.01 | 29.55 | 33.86 | 38.00 | 42.01 | 45.91 | 49.67 | 53.27 | 56.68 | 59.91 | 63.05 | 66.22 | 69.66 | | | | | | | | |
| 122.7 | 6.21 | 14.29 | 21.44 | 27.93 | 33.92 | 39.48 | 44.66 | 49.50 | 54.04 | 58.32 | 62.35 | 66.15 | 69.69 | 72.92 | 75.65 | 77.62 | 78.26 | | | | | | | |
| | 4.97 | 12.16 | 18.60 | 24.37 | 29.60 | 34.42 | 38.99 | 43.36 | 47.58 | 51.67 | 55.59 | 59.33 | 62.88 | 66.25 | 69.58 | 73.01 | 76.90 | | | | | | | |
| 134.6 | | 10.71 | 19.11 | 26.57 | 33.37 | 39.65 | 45.48 | 50.89 | 55.92 | 60.59 | 64.98 | 69.13 | 73.07 | 76.81 | 80.18 | 82.95 | 84.78 | | | | | | | |
| | | 9.11 | 16.73 | 23.49 | 29.51 | 34.97 | 40.02 | 44.78 | 49.32 | 53.70 | 57.93 | 62.01 | 65.94 | 69.71 | 73.39 | 77.01 | 80.82 | | | | | | | |
| 146.5 | | 7.02 | 16.69 | 25.16 | 32.82 | 39.83 | 46.30 | 52.29 | 57.83 | 62.98 | 67.78 | 72.31 | 76.61 | 80.73 | 84.63 | 88.15 | 91.01 | 92.76 | | | | | | |
| | | 6.08 | 14.72 | 22.44 | 29.37 | 35.62 | 41.29 | 46.50 | 51.40 | 56.06 | 60.56 | 64.94 | 69.19 | 73.31 | 77.29 | 81.15 | 85.02 | 89.15 | | | | | | |
| 158.5 | | | 13.47 | 23.32 | 31.95 | 39.64 | 46.60 | 53.03 | 59.05 | 64.74 | 70.19 | 75.25 | 80.05 | 84.52 | 88.69 | 92.63 | 96.25 | 99.29 | 101.19 | | | | | |
| | | | 12.22 | 21.33 | 29.40 | 36.56 | 42.98 | 48.79 | 54.14 | 59.16 | 63.93 | 68.50 | 72.88 | 77.08 | 81.14 | 85.10 | 89.03 | 93.02 | 97.44 | | | | | |
| 170.4 | | | 10.05 | 21.25 | 31.04 | 39.74 | 47.51 | 54.51 | 60.93 | 66.94 | 72.66 | 78.12 | 83.24 | 87.99 | 92.62 | 96.90 | 100.83 | 104.48 | 107.63 | 109.73 | | | | |
| | | | 9.05 | 19.18 | 28.19 | 36.14 | 43.17 | 49.51 | 55.35 | 60.89 | 66.21 | 71.33 | 76.16 | 80.73 | 85.13 | 89.25 | 93.19 | 97.08 | 101.03 | 105.47 | | | | |
| 182.3 | | | 5.96 | 18.57 | 29.65 | 39.54 | 48.37 | 56.24 | 63.30 | 69.74 | 75.72 | 81.43 | 86.95 | 92.22 | 97.14 | 101.64 | 105.86 | 109.91 | 113.19 | 116.11 | 118.25 | | | |
| | | | 5.58 | 16.69 | 26.79 | 35.67 | 43.53 | 50.60 | 57.05 | 63.02 | 68.64 | 74.09 | 79.40 | 84.50 | 89.30 | 93.73 | 97.98 | 102.08 | 105.56 | 109.11 | 113.20 | | | |
| 194.2 | | | | 15.93 | 28.44 | 39.41 | 48.98 | 57.43 | 65.03 | 71.98 | 78.42 | 84.51 | 90.37 | 96.06 | 101.50 | 106.51 | 111.00 | 114.93 | 118.65 | 122.20 | 125.26 | 126.99 | 127.75 | |
| | | | | 14.36 | 25.56 | 35.24 | 43.84 | 51.60 | 58.70 | 65.28 | 71.45 | 77.31 | 83.00 | 88.53 | 93.77 | 98.64 | 103.00 | 106.90 | 110.64 | 114.28 | 117.65 | 120.94 | 125.07 | |
| 206.2 | | | | 12.98 | 27.05 | 38.97 | 49.19 | 58.15 | 66.20 | 73.58 | 80.46 | 86.96 | 93.19 | 99.21 | 105.12 | 110.69 | 115.67 | 120.05 | 123.85 | 127.09 | 130.15 | 132.82 | 134.80 | 135.62 |
| | | | | 11.97 | 24.41 | 34.96 | 44.34 | 52.70 | 60.29 | 67.30 | 73.88 | 80.13 | 86.13 | 92.01 | 97.79 | 103.20 | 108.03 | 112.33 | 116.02 | 119.27 | 122.50 | 125.62 | 128.68 | 131.96 |
| 218.1 | | | | | 25.14 | 38.38 | 49.32 | 58.78 | 67.22 | 74.94 | 82.10 | 88.85 | 95.35 | 101.59 | 107.62 | 113.53 | 119.04 | 123.81 | 127.91 | 131.40 | 134.34 | 136.68 | 138.54 | 139.54 |
| | | | | | 23.04 | 35.12 | 45.33 | 54.17 | 62.13 | 69.50 | 76.45 | 83.12 | 89.61 | 95.86 | 101.86 | 107.64 | 112.97 | 117.62 | 121.64 | 125.20 | 128.24 | 131.03 | 134.02 | 137.11 |

(mm)

DIAMETER $D = 460$
HEIGHT $h = 140$
EXPANSION ANGLE $\lambda = 104.3$
BOSS RATIO $\nu = 0.326$

TABLE 43

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 91-94,
Replace Table 45 with the following:

COMPARISON EXAMPLE 1

| θ / r | 10° | 15° | 20° | 25° | 30° | 35° | 40° | 45° | 50° | 55° | 60° | 65° | 70° | 75° | 80° | 85° | 90° | 95° | 100° |
|---|---|---|---|---|---|---|---|---|---|---|---|---|---|---|---|---|---|---|---|
| r 80 | 11.73 | 19.10 | 25.44 | 30.60 | 35.31 | 39.90 | 44.45 | 48.84 | 53.00 | 56.91 | 60.54 | 63.79 | 66.69 | | | | | | |
| | 6.47 | 13.00 | 19.27 | 24.95 | 29.81 | 34.29 | 38.60 | 42.80 | 46.92 | 50.95 | 54.90 | 58.74 | 62.24 | 65.73 | | | | | |
| r 90 | | 12.73 | 20.94 | 27.79 | 33.67 | 39.12 | 44.39 | 49.38 | 54.09 | 58.55 | 62.71 | 66.45 | 69.78 | 72.78 | | | | | |
| | | 7.72 | 15.35 | 22.37 | 28.82 | 34.15 | 39.00 | 43.69 | 48.20 | 52.63 | 56.99 | 61.24 | 65.20 | 69.05 | 72.74 | | | | |
| r 100 | | | 16.09 | 24.55 | 31.82 | 38.32 | 44.30 | 50.03 | 55.39 | 60.47 | 65.25 | 69.55 | 73.43 | 76.96 | | | | | |
| | | | 11.10 | 19.49 | 27.06 | 33.78 | 39.34 | 44.59 | 49.60 | 54.42 | 59.19 | 63.83 | 68.22 | 72.41 | 76.43 | 79.97 | | | |
| r 110 | | | | 21.17 | 29.78 | 37.40 | 44.32 | 50.81 | 56.89 | 62.60 | 67.99 | 72.88 | 77.34 | 81.37 | 84.91 | | | | |
| | | | 6.47 | 16.35 | 25.27 | 32.95 | 39.56 | 45.48 | 51.16 | 56.38 | 61.52 | 66.48 | 71.29 | 75.84 | 80.24 | 84.27 | | | |
| r 120 | | | | 16.62 | 27.71 | 36.46 | 44.43 | 51.73 | 58.63 | 65.02 | 70.96 | 76.44 | 81.49 | 86.04 | 90.12 | 93.56 | | | |
| | | | | 12.48 | 23.19 | 32.11 | 39.60 | 46.35 | 52.75 | 58.54 | 64.01 | 69.27 | 74.42 | 79.38 | 84.27 | 88.88 | 92.94 | | |
| r 130 | | | | | 25.07 | 35.42 | 44.45 | 52.76 | 60.49 | 67.60 | 74.14 | 80.18 | 85.76 | 90.79 | 95.43 | 99.34 | | | |
| | | | | | 20.47 | 30.82 | 39.57 | 47.10 | 54.26 | 60.75 | 66.61 | 72.15 | 77.63 | 83.00 | 88.46 | 93.70 | 98.22 | | |
| r 140 | | | | | 21.38 | 34.00 | 44.38 | 53.67 | 62.26 | 70.13 | 77.30 | 83.88 | 90.14 | 95.73 | 100.80 | 105.22 | 108.78 | | |
| | | | | | 16.83 | 29.05 | 39.13 | 47.59 | 55.60 | 62.95 | 69.35 | 75.17 | 80.99 | 86.79 | 92.74 | 98.44 | 103.48 | 107.80 | |
| r 150 | | | | | 15.39 | 31.83 | 43.84 | 54.32 | 63.84 | 72.47 | 80.37 | 87.60 | 94.28 | 100.52 | 106.07 | 110.94 | 114.95 | | |
| | | | | | 12.94 | 26.57 | 38.27 | 47.91 | 56.81 | 64.97 | 72.10 | 78.38 | 84.69 | 90.96 | 97.16 | 103.19 | 108.58 | 113.56 | |
| r 160 | | | | | | 29.55 | 43.21 | 54.64 | 65.14 | 74.33 | 82.96 | 90.49 | 97.62 | 104.34 | 110.63 | 116.05 | 120.85 | 124.87 | |
| | | | | | | 23.69 | 37.38 | 48.40 | 57.93 | 66.86 | 74.86 | 81.82 | 88.68 | 95.47 | 101.96 | 108.15 | 113.87 | 119.15 | 123.49 |
| r 170 | | | | | | 27.10 | 42.68 | 55.44 | 66.28 | 75.62 | 84.39 | 92.42 | 100.19 | 107.31 | 114.13 | 120.38 | 126.11 | 130.86 | |
| | | | | | | 21.19 | 36.26 | 48.76 | 59.06 | 68.53 | 77.20 | 85.22 | 92.83 | 99.88 | 106.68 | 113.09 | 119.02 | 124.38 | 128.87 |
| r 180 | | | | | | 21.52 | 42.14 | 56.11 | 67.43 | 77.37 | 86.87 | 95.58 | 103.50 | 111.06 | 118.11 | 124.80 | 130.98 | 136.36 | 140.79 |
| | | | | | | 19.14 | 35.30 | 49.17 | 60.36 | 70.38 | 79.63 | 88.20 | 96.29 | 103.91 | 110.87 | 117.74 | 123.88 | 129.55 | 134.46 |

(mm)

TABLE 45

Columns 93-96,
Replace Table 46 with the following:

COMPARISON EXAMPLE 2

| θ / r | 0° | 5° | 10° | 15° | 20° | 25° | 30° | 35° | 40° | 45° | 50° | 55° | 60° | 65° | 70° | 75° | 80° | 85° | 90° | 95° | 100° |
|---|---|---|---|---|---|---|---|---|---|---|---|---|---|---|---|---|---|---|---|---|---|
| r 45 | 31.80 | 33.99 | 36.21 | 38.47 | 40.72 | 42.84 | 44.86 | 46.79 | 48.62 | 50.36 | | | | | | | | | | | |
| r 55 | | 21.58 | 25.42 | 29.09 | 32.62 | 36.02 | 39.20 | 42.17 | 44.94 | 47.51 | 49.89 | 52.12 | 54.19 | | | | | | | | |
| r 65 | | | | 18.45 | 23.54 | 28.39 | 32.91 | 37.05 | 40.87 | 44.39 | 47.64 | 50.63 | 53.40 | 55.95 | 58.28 | | | | | | |
| r 75 | | | | | 14.55 | 20.92 | 26.88 | 32.29 | 37.22 | 41.75 | 45.90 | 49.71 | 53.21 | 56.42 | 59.35 | 62.01 | | | | | |
| r 85 | | | | | 5.55 | 13.74 | 21.12 | 27.82 | 33.89 | 39.42 | 44.49 | 49.13 | 53.38 | 57.26 | 60.82 | 64.05 | 66.97 | | | | |
| r 95 | | | | | | 7.05 | 15.69 | 23.59 | 30.77 | 37.25 | 43.20 | 48.63 | 53.60 | 58.14 | 62.30 | 66.10 | 69.55 | 72.72 | | | |
| r 105 | | | | | | 0.87 | 10.64 | 19.57 | 27.73 | 35.11 | 41.84 | 47.98 | 53.62 | 58.78 | 63.51 | 40.83 | 71.77 | 75.43 | | | |
| r 115 | | | | | | | 5.87 | 15.71 | 24.68 | 32.84 | 40.30 | 47.10 | 53.33 | 59.02 | 64.28 | 69.03 | 73.40 | 77.43 | 81.05 | | |
| r 125 | | | | | | | | 11.89 | 21.58 | 30.43 | 38.57 | 45.95 | 52.70 | 58.91 | 64.59 | 69.71 | 74.39 | 78.67 | 82.62 | 86.11 | |
| r 135 | | | | | | | | 8.27 | 18.40 | 27.98 | 36.72 | 44.67 | 51.94 | 58.58 | 64.65 | 70.17 | 75.14 | 79.63 | 83.70 | 87.39 | |
| r 145 | | | | | | | | | 15.14 | 25.50 | 34.77 | 43.28 | 51.06 | 58.04 | 64.45 | 70.43 | 75.63 | 80.43 | 84.74 | 88.67 | 92.17 |
| r 155 | | | | | | | | | | 22.91 | 32.82 | 41.86 | 50.08 | 57.34 | 64.11 | 70.44 | 75.95 | 81.10 | 85.79 | 89.95 | 93.67 |

(mm)

TABLE 46

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 95-98,
Replace Table 47 with the following:

COMPARISON EXAMPLE 3

| θ / r | END POINT AT TRAILING EDGE SIDE | 5° | 10° | 15° | 20° | 25° | 30° | 35° | 40° | 45° | 50° | 55° | 60° | 65° | 70° | 75° | 80° | 85° | 90° | 95° | 100° | 102.5° | END POINT AT LEADING EDGE SIDE |
|---|---|---|---|---|---|---|---|---|---|---|---|---|---|---|---|---|---|---|---|---|---|---|---|
| r88.5 | | | | | | | | | | | | | | | | | | | | | | | |
| | 0.00 | 6.00 | 12.54 | 19.50 | 25.83 | 31.51 | 37.02 | 42.04 | 46.64 | 51.26 | 55.75 | 60.17 | 64.51 | 68.67 | 72.48 | | | | | | | | 72.48 |
| r95 | | 5.78 | 12.77 | 20.55 | 27.94 | 34.52 | 40.58 | 46.17 | 51.36 | 56.45 | 61.43 | 66.35 | 71.14 | 75.75 | 80.17 | | | | | | | | |
| | 1.15 | 2.38 | 9.19 | 16.80 | 24.01 | 30.41 | 36.30 | 41.71 | 46.72 | 51.63 | 56.44 | 61.18 | 65.79 | 70.23 | 74.47 | | | | | | | | 77.09 |
| r105 | | | 7.06 | 15.24 | 23.89 | 31.71 | 38.60 | 44.82 | 50.57 | 56.08 | 61.49 | 66.82 | 71.97 | 76.95 | 81.75 | 86.34 | | | | | | | |
| | 2.75 | | 4.46 | 12.50 | 21.01 | 28.69 | 35.45 | 41.53 | 47.14 | 52.51 | 57.78 | 62.97 | 67.99 | 72.83 | 77.49 | 81.94 | | | | | | | 84.02 |
| r115 | | | | 10.57 | 20.43 | 29.72 | 37.80 | 44.75 | 51.05 | 57.01 | 62.82 | 68.52 | 74.06 | 79.40 | 84.48 | 89.39 | 94.10 | | | | | | |
| | 4.21 | | | 8.02 | 17.76 | 26.94 | 34.90 | 41.73 | 47.92 | 53.76 | 59.45 | 65.04 | 70.46 | 75.68 | 80.65 | 85.44 | 90.03 | | | | | | 90.83 |
| r125 | | | | | 16.59 | 27.30 | 37.02 | 44.95 | 51.87 | 58.29 | 64.48 | 70.52 | 76.37 | 82.01 | 87.39 | 92.61 | 97.65 | | | | | | |
| | 5.57 | | | | 14.09 | 24.70 | 34.31 | 42.14 | 48.95 | 55.27 | 61.35 | 67.29 | 73.04 | 78.57 | 83.85 | 88.96 | 93.90 | | | | | | 97.58 |
| r135 | | | | | 12.44 | 24.47 | 35.74 | 45.14 | 52.86 | 59.74 | 66.31 | 72.68 | 78.87 | 84.80 | 90.45 | 95.95 | 100.97 | 106.23 | | | | | |
| | 6.83 | | | | 9.94 | 21.89 | 33.09 | 42.41 | 50.05 | 56.86 | 63.35 | 69.64 | 75.75 | 81.61 | 87.18 | 92.60 | 97.55 | 102.73 | | | | | 104.29 |
| r145 | | | | | | 21.11 | 33.79 | 44.82 | 53.72 | 61.26 | 68.23 | 74.93 | 81.42 | 87.63 | 93.61 | 99.36 | 104.90 | 110.30 | | | | | |
| | 8.02 | | | | | 18.66 | 31.28 | 42.24 | 51.08 | 58.55 | 65.46 | 72.10 | 78.52 | 84.67 | 90.59 | 96.27 | 101.75 | 107.08 | | | | | 110.99 |
| r155 | | | | | | 17.35 | 31.43 | 44.01 | 54.51 | 62.82 | 70.23 | 77.27 | 84.05 | 90.56 | 96.87 | 102.90 | 108.74 | 114.38 | 119.80 | | | | |
| | 9.15 | | | | | 14.95 | 28.98 | 41.52 | 51.97 | 60.24 | 67.60 | 74.59 | 81.33 | 87.79 | 94.05 | 100.04 | 105.83 | 111.43 | 116.80 | | | | 117.70 |
| r165 | | | | | | 13.24 | 28.66 | 42.69 | 54.86 | 64.35 | 72.28 | 79.71 | 86.81 | 93.62 | 100.28 | 106.59 | 112.67 | 118.62 | 124.26 | | | | |
| | 10.21 | | | | | 10.84 | 26.23 | 40.23 | 52.37 | 61.83 | 69.72 | 77.12 | 84.19 | 90.97 | 97.60 | 103.88 | 109.93 | 115.85 | 121.46 | | | | 124.41 |
| r175 | | | | | | | 25.49 | 40.94 | 54.68 | 65.61 | 74.21 | 82.07 | 89.53 | 96.68 | 103.71 | 110.32 | 116.69 | 122.88 | 128.76 | | | | |
| | 11.21 | | | | | | 23.09 | 38.52 | 52.25 | 63.16 | 71.74 | 79.59 | 87.03 | 94.16 | 101.18 | 107.77 | 114.12 | 120.30 | 126.16 | | | | 131.15 |
| r185 | | | | | | | 22.17 | 38.89 | 53.89 | 66.48 | 75.97 | 84.38 | 92.23 | 99.77 | 107.13 | 114.13 | 120.81 | 127.30 | 133.42 | 139.16 | | | |
| | 12.16 | | | | | | 19.77 | 36.48 | 51.47 | 64.05 | 73.53 | 81.94 | 89.78 | 97.31 | 104.66 | 111.65 | 118.32 | 124.80 | 130.91 | 136.64 | | | 137.92 |
| r195 | | | | | | | 18.66 | 36.55 | 52.61 | 66.83 | 77.52 | 86.56 | 94.90 | 102.97 | 110.57 | 117.93 | 124.92 | 131.63 | 137.97 | 144.00 | | | |
| | 13.06 | | | | | | 16.26 | 34.15 | 50.21 | 64.43 | 75.12 | 84.16 | 92.50 | 100.57 | 108.17 | 115.53 | 122.52 | 129.23 | 135.57 | 141.60 | | | 144.71 |
| r205 | | | | | | | | 33.78 | 51.15 | 66.92 | 78.89 | 88.62 | 97.59 | 106.19 | 114.31 | 122.06 | 129.26 | 136.03 | 142.66 | 148.92 | | | |
| | 13.91 | | | | | | | 31.38 | 48.75 | 64.52 | 76.49 | 86.22 | 95.19 | 103.79 | 111.91 | 119.66 | 126.86 | 133.63 | 140.26 | 146.52 | | | 151.53 |
| r215 | | | | | | | | 30.90 | 49.52 | 66.71 | 80.05 | 90.51 | 100.20 | 109.51 | 118.09 | 126.39 | 133.95 | 140.62 | 147.40 | 153.94 | 160.13 | | |
| | 14.71 | | | | | | | 28.50 | 47.12 | 64.31 | 77.65 | 88.11 | 97.80 | 107.11 | 115.69 | 123.99 | 131.55 | 138.22 | 145.00 | 151.54 | 157.73 | | 158.39 |
| r225 | | | | | | | | 28.01 | 47.58 | 66.09 | 80.91 | 92.25 | 102.71 | 112.71 | 121.82 | 130.66 | 138.70 | 145.51 | 152.30 | 159.09 | 165.48 | | |
| | 15.47 | | | | | | | 25.61 | 45.18 | 63.69 | 78.51 | 89.85 | 100.31 | 110.31 | 119.42 | 128.26 | 136.30 | 143.11 | 149.90 | 156.69 | 163.08 | | 165.27 |
| r230 | | | | | | | | 26.46 | 46.67 | 65.62 | 81.23 | 93.06 | 103.93 | 114.27 | 123.67 | 132.77 | 141.10 | 148.07 | 154.81 | 161.74 | 168.14 | 171.12 | |
| | 15.82 | | | | | | | 24.06 | 44.27 | 63.22 | 78.83 | 90.66 | 101.53 | 111.87 | 121.27 | 130.37 | 138.70 | 145.67 | 152.41 | 159.34 | 165.74 | 168.72 | 168.72 |

(mm)

TABLE 47

It is certified that error appears in the above-identified patent and that said Letters Patent is hereby corrected as shown below:

Columns 103-106,
Replace Table 103 with the following:

EMBODIMENT 21

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 26.62 | 30.10 | 33.38 | 36.60 | 39.79 | 42.94 | 46.01 | 48.99 | 51.88 | 54.65 | 57.29 | 59.76 | 61.98 | 63.83 | 65.10 | 65.49 | | | | | | |
| | | | 23.49 | 25.79 | 28.13 | 30.48 | 32.83 | 35.24 | 37.75 | 40.38 | 43.07 | 45.80 | 48.50 | 51.15 | 53.76 | 56.36 | 59.08 | 62.17 | | | | | | |
| 70 | | 20.50 | 25.15 | 29.37 | 33.38 | 37.23 | 40.93 | 44.46 | 47.83 | 51.09 | 54.22 | 57.20 | 59.99 | 62.41 | 64.24 | 65.12 | | | | | | | | |
| | | 17.68 | 21.04 | 24.33 | 27.57 | 30.80 | 34.05 | 37.35 | 40.66 | 43.94 | 47.17 | 50.29 | 53.30 | 56.23 | 59.16 | 62.28 | | | | | | | | |
| 80 | 12.22 | 18.44 | 23.78 | 28.72 | 33.36 | 37.78 | 41.95 | 45.90 | 49.64 | 53.23 | 56.65 | 59.87 | 62.82 | 65.29 | 67.09 | 67.84 | | | | | | | | |
| | 10.63 | 15.40 | 19.87 | 24.10 | 28.15 | 32.09 | 35.95 | 39.74 | 43.46 | 47.06 | 50.53 | 53.82 | 56.94 | 59.93 | 62.90 | 66.04 | | | | | | | | |
| 90 | 9.71 | 16.30 | 22.39 | 28.07 | 33.39 | 38.36 | 43.03 | 47.43 | 51.58 | 55.50 | 59.22 | 62.70 | 65.91 | 68.70 | 70.91 | 72.20 | | | | | | | | |
| | 7.69 | 13.70 | 19.17 | 24.25 | 28.98 | 33.46 | 37.75 | 41.89 | 45.89 | 49.76 | 53.46 | 56.95 | 60.24 | 63.37 | 66.43 | 69.60 | | | | | | | | |
| 100 | 5.81 | 13.80 | 20.94 | 27.43 | 33.42 | 38.98 | 44.16 | 49.00 | 53.54 | 57.82 | 61.86 | 65.66 | 69.23 | 72.48 | 75.28 | 77.42 | 78.45 | | | | | | | |
| | 4.65 | 11.79 | 18.34 | 24.26 | 29.63 | 34.59 | 39.27 | 43.73 | 48.03 | 52.16 | 56.13 | 59.90 | 63.46 | 66.85 | 70.12 | 73.39 | 76.92 | | | | | | | |
| 110 | 1.45 | 11.05 | 19.30 | 26.63 | 33.30 | 39.44 | 40.93 | 50.41 | 55.34 | 59.95 | 64.31 | 68.45 | 72.37 | 76.07 | 79.45 | 82.31 | 84.39 | | | | | | | |
| | 0.83 | 9.36 | 17.00 | 23.77 | 29.82 | 35.33 | 40.44 | 45.26 | 49.84 | 54.24 | 58.48 | 62.56 | 66.47 | 70.22 | 73.82 | 77.33 | 80.90 | | | | | | | |
| 120 | | 7.82 | 17.11 | 25.26 | 32.64 | 39.39 | 45.61 | 51.37 | 56.72 | 61.73 | 66.44 | 70.92 | 75.18 | 79.25 | 83.10 | 86.59 | 89.50 | 91.52 | | | | | | |
| | | 6.50 | 15.01 | 22.66 | 29.55 | 35.80 | 41.49 | 46.74 | 51.67 | 56.36 | 60.87 | 65.22 | 69.44 | 73.51 | 77.42 | 81.18 | 84.89 | 88.69 | | | | | | |
| 130 | | 4.01 | 14.23 | 23.41 | 31.62 | 38.97 | 45.65 | 51.83 | 57.60 | 63.03 | 68.17 | 73.05 | 77.68 | 82.08 | 86.26 | 90.21 | 93.81 | 96.82 | 98.84 | | | | | |
| | | 3.24 | 13.00 | 21.95 | 29.92 | 36.99 | 43.32 | 49.09 | 54.45 | 59.48 | 64.22 | 68.73 | 73.04 | 77.18 | 81.18 | 85.06 | 88.84 | 92.62 | 96.60 | | | | | |
| 140 | | | 11.48 | 21.88 | 30.94 | 38.94 | 46.08 | 52.59 | 58.65 | 64.39 | 69.83 | 74.97 | 79.93 | 84.70 | 89.23 | 93.48 | 97.51 | 101.18 | 104.27 | 106.41 | | | | |
| | | | 10.41 | 20.56 | 29.43 | 37.25 | 44.23 | 50.59 | 56.49 | 62.04 | 67.24 | 72.09 | 76.74 | 81.17 | 85.32 | 89.23 | 93.00 | 96.71 | 100.43 | 104.47 | | | | |
| 150 | | | 8.11 | 19.51 | 29.62 | 38.63 | 46.66 | 53.84 | 60.34 | 66.35 | 72.06 | 77.57 | 82.88 | 87.94 | 92.67 | 97.13 | 101.36 | 105.24 | 108.82 | 111.87 | 114.10 | | | |
| | | | 7.16 | 18.21 | 28.10 | 36.88 | 44.68 | 51.66 | 58.00 | 63.89 | 69.49 | 74.88 | 80.06 | 84.95 | 89.51 | 93.84 | 97.82 | 101.36 | 104.80 | 108.31 | 112.15 | | | |
| 160 | | | | 17.23 | 28.54 | 38.49 | 47.29 | 55.12 | 62.19 | 68.67 | 74.71 | 80.44 | 85.98 | 91.37 | 96.50 | 101.24 | 105.56 | 109.64 | 113.53 | 116.87 | 119.59 | 121.74 | | |
| | | | | 15.92 | 26.87 | 36.49 | 45.02 | 52.68 | 59.66 | 66.10 | 72.11 | 77.83 | 83.36 | 88.66 | 93.66 | 98.23 | 102.39 | 106.35 | 110.15 | 113.29 | 116.26 | 119.63 | | |
| 170 | | | | 15.05 | 27.51 | 38.32 | 47.76 | 56.12 | 63.66 | 70.58 | 77.03 | 83.14 | 88.98 | 94.67 | 100.19 | 105.34 | 110.01 | 114.15 | 117.87 | 121.42 | 124.69 | 127.46 | 129.37 | |
| | | | | 13.77 | 30.94 | 36.12 | 45.29 | 53.51 | 60.96 | 67.84 | 74.29 | 80.40 | 86.33 | 92.11 | 97.58 | 102.60 | 107.14 | 111.13 | 114.70 | 118.15 | 121.39 | 124.31 | 127.04 | |
| 180 | | | | 12.17 | 26.24 | 37.97 | 46.07 | 56.91 | 64.85 | 72.16 | 78.98 | 85.44 | 91.61 | 97.58 | 103.43 | 109.02 | 114.07 | 118.53 | 122.43 | 125.83 | 128.90 | 131.73 | 134.08 | 135.77 |
| | | | | 11.29 | 24.61 | 35.82 | 45.63 | 54.34 | 62.19 | 69.43 | 76.23 | 82.71 | 88.91 | 94.92 | 100.85 | 106.45 | 111.41 | 115.77 | 119.58 | 122.87 | 125.88 | 128.76 | 131.35 | 133.74 |
| 190 | | | | | 24.49 | 37.59 | 46.47 | 57.76 | 66.06 | 73.67 | 80.76 | 87.47 | 93.94 | 100.17 | 106.19 | 112.03 | 117.50 | 122.28 | 126.37 | 129.94 | 132.98 | 135.53 | 137.73 | 139.41 |
| | | | | | 23.30 | 35.85 | 46.33 | 55.41 | 63.61 | 71.14 | 78.22 | 85.01 | 91.61 | 97.95 | 103.99 | 109.83 | 115.27 | 120.00 | 124.05 | 127.58 | 130.62 | 133.25 | 135.77 | 138.14 |

(mm)

DIAMETER D= 400
HEIGHT h= 140
EXPANSION ANGLE $\lambda$ = 120
BOSS RATIO $\nu$ = 0.275

TABLE 103

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 107-110,
Replace Table 104 with the following:

EMBODIMENT 22

| r \ θ (deg) | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 |
|---|---|---|---|---|---|---|---|---|---|---|---|---|---|---|---|---|---|---|---|---|---|---|---|---|
| 60 | | | 29.28 | 33.11 | 36.72 | 40.26 | 43.77 | 47.23 | 50.61 | 53.89 | 57.06 | 60.12 | 63.02 | 65.74 | 68.18 | 70.22 | 71.61 | 72.04 | | | | | | |
| | | | 25.84 | 28.37 | 30.94 | 33.52 | 36.11 | 38.77 | 41.53 | 44.42 | 47.38 | 50.38 | 53.35 | 56.26 | 59.13 | 61.99 | 64.99 | 68.39 | | | | | | |
| 70 | | 22.55 | 27.67 | 32.31 | 36.71 | 40.95 | 45.02 | 48.90 | 52.62 | 56.20 | 59.64 | 62.92 | 65.99 | 68.65 | 70.66 | 71.63 | | | | | | | | |
| | | 19.45 | 23.15 | 26.76 | 30.33 | 33.88 | 37.46 | 41.08 | 44.72 | 48.34 | 51.88 | 55.32 | 58.63 | 61.85 | 65.07 | 68.51 | | | | | | | | |
| 80 | 13.45 | 20.28 | 26.16 | 31.59 | 36.70 | 41.56 | 46.15 | 50.49 | 54.61 | 58.55 | 62.31 | 65.86 | 69.10 | 71.82 | 73.80 | 74.62 | | | | | | | | |
| | 11.69 | 16.94 | 21.86 | 26.51 | 30.97 | 35.30 | 39.55 | 43.72 | 47.80 | 51.77 | 55.58 | 59.20 | 62.64 | 65.93 | 69.18 | 72.64 | | | | | | | | |
| 90 | 10.68 | 17.93 | 24.62 | 30.88 | 36.73 | 42.20 | 47.33 | 52.17 | 56.73 | 61.05 | 65.14 | 68.97 | 72.50 | 75.57 | 78.00 | 79.42 | | | | | | | | |
| | 8.45 | 15.07 | 21.09 | 26.68 | 31.88 | 36.81 | 41.52 | 46.08 | 50.48 | 54.74 | 58.80 | 62.65 | 66.26 | 69.71 | 73.07 | 76.56 | | | | | | | | |
| 100 | 6.39 | 15.18 | 23.03 | 30.18 | 36.76 | 42.88 | 48.57 | 53.90 | 58.90 | 63.60 | 68.04 | 72.23 | 76.15 | 79.73 | 82.81 | 85.16 | 86.29 | | | | | | | |
| | 5.12 | 12.97 | 20.17 | 26.68 | 32.59 | 38.05 | 43.20 | 48.10 | 52.83 | 57.38 | 61.74 | 65.89 | 69.81 | 73.53 | 77.13 | 80.73 | 84.61 | | | | | | | |
| 110 | 1.60 | 12.16 | 21.23 | 29.30 | 36.63 | 43.38 | 45.02 | 55.45 | 60.87 | 65.95 | 70.74 | 75.29 | 79.61 | 83.68 | 87.40 | 90.54 | 92.83 | | | | | | | |
| | 0.91 | 10.29 | 18.70 | 26.14 | 32.80 | 38.86 | 44.49 | 49.78 | 54.83 | 59.67 | 64.33 | 68.81 | 73.12 | 77.24 | 81.20 | 85.07 | 88.99 | | | | | | | |
| 120 | | 8.60 | 18.82 | 27.79 | 35.90 | 43.33 | 50.17 | 56.61 | 62.39 | 67.90 | 73.09 | 78.01 | 82.70 | 87.18 | 91.41 | 95.24 | 98.45 | 100.67 | | | | | | |
| | | 7.15 | 16.51 | 24.92 | 32.51 | 39.38 | 45.64 | 51.42 | 56.84 | 62.00 | 66.96 | 71.75 | 76.38 | 80.86 | 85.16 | 89.30 | 93.38 | 97.56 | | | | | | |
| 130 | | 4.41 | 15.65 | 25.75 | 34.78 | 42.86 | 50.22 | 57.01 | 63.35 | 69.33 | 74.99 | 80.36 | 85.45 | 90.29 | 94.89 | 99.24 | 103.19 | 106.50 | 108.73 | | | | | |
| | | 3.56 | 14.30 | 24.15 | 32.91 | 40.69 | 47.65 | 54.00 | 59.90 | 65.43 | 70.65 | 75.61 | 80.35 | 84.90 | 89.30 | 93.56 | 97.72 | 101.88 | 106.26 | | | | | |
| 140 | | | 12.62 | 24.06 | 34.04 | 42.83 | 50.68 | 57.85 | 64.51 | 70.83 | 76.81 | 82.47 | 87.93 | 93.17 | 98.15 | 102.83 | 107.26 | 111.30 | 114.70 | 117.05 | | | | |
| | | | 11.46 | 22.61 | 32.38 | 40.98 | 48.66 | 55.64 | 62.14 | 68.24 | 73.96 | 79.30 | 84.42 | 89.29 | 93.85 | 98.15 | 102.30 | 106.38 | 110.47 | 114.91 | | | | |
| 150 | | | 8.92 | 21.46 | 32.59 | 42.50 | 51.33 | 59.22 | 66.37 | 72.98 | 79.26 | 85.33 | 91.17 | 96.74 | 101.94 | 106.84 | 111.50 | 115.76 | 119.70 | 123.06 | 125.51 | | | |
| | | | 7.88 | 20.03 | 30.91 | 40.57 | 49.15 | 56.83 | 63.80 | 70.28 | 76.44 | 82.37 | 88.06 | 93.45 | 98.47 | 103.23 | 107.60 | 111.49 | 115.28 | 119.15 | 123.37 | | | |
| 160 | | | | 18.95 | 31.39 | 42.34 | 52.02 | 60.64 | 68.41 | 75.54 | 82.19 | 88.48 | 94.58 | 100.50 | 106.14 | 111.36 | 116.12 | 120.60 | 124.89 | 128.56 | 131.55 | 133.92 | | |
| | | | | 17.51 | 29.55 | 40.14 | 49.52 | 57.95 | 65.63 | 72.71 | 79.32 | 85.62 | 91.70 | 97.53 | 103.02 | 108.06 | 112.63 | 116.99 | 121.17 | 124.62 | 127.89 | 131.60 | | |
| 170 | | | | 16.55 | 30.26 | 42.16 | 52.54 | 61.73 | 70.03 | 77.64 | 84.74 | 91.45 | 97.88 | 104.14 | 110.20 | 115.88 | 121.02 | 125.57 | 129.65 | 133.56 | 137.16 | 140.20 | 142.30 | |
| | | | | 15.15 | 34.04 | 39.73 | 49.82 | 58.86 | 67.06 | 74.63 | 81.72 | 88.44 | 94.96 | 101.32 | 107.34 | 112.86 | 117.85 | 122.24 | 126.17 | 129.97 | 133.53 | 136.74 | 139.75 | |
| 180 | | | | 13.38 | 28.87 | 41.77 | 52.87 | 62.60 | 71.34 | 79.38 | 86.88 | 93.98 | 100.77 | 107.33 | 113.77 | 119.92 | 125.47 | 130.38 | 134.67 | 138.41 | 141.79 | 144.90 | 147.49 | 149.35 |
| | | | | 12.42 | 27.07 | 39.40 | 50.20 | 59.77 | 68.41 | 76.37 | 83.85 | 90.98 | 97.81 | 104.42 | 110.94 | 117.09 | 122.55 | 127.35 | 131.54 | 135.15 | 138.47 | 141.64 | 144.49 | 147.12 |
| 190 | | | | | 26.94 | 41.35 | 53.32 | 63.56 | 72.67 | 81.03 | 88.83 | 96.22 | 103.33 | 110.19 | 116.81 | 123.24 | 129.25 | 134.49 | 139.01 | 142.93 | 146.27 | 149.08 | 151.50 | 153.35 |
| | | | | | 25.63 | 39.44 | 50.97 | 60.96 | 69.97 | 78.26 | 86.04 | 93.51 | 100.77 | 107.74 | 114.39 | 120.81 | 126.80 | 131.99 | 136.45 | 140.34 | 143.58 | 146.57 | 149.35 | 151.95 |

(mm)

DIAMETER $D = 400$
HEIGHT $h = 154$
EXPANSION ANGLE $\lambda = 120$
BOSS RATIO $\nu = 0.275$

TABLE 104

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 111-114,
Replace Table 105 with the following:

EMBODIMENT 23

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 27.95 | 31.61 | 35.05 | 38.43 | 41.78 | 45.09 | 48.31 | 51.44 | 54.47 | 57.38 | 60.15 | 62.75 | 65.08 | 67.03 | 68.36 | 68.77 | | | | | | |
| | | | 24.67 | 27.08 | 29.54 | 32.00 | 34.47 | 37.00 | 39.64 | 42.40 | 45.23 | 48.09 | 50.92 | 53.71 | 56.44 | 59.17 | 62.04 | 65.28 | | | | | | |
| 70 | | 21.52 | 26.41 | 30.84 | 35.04 | 39.09 | 42.98 | 46.68 | 50.23 | 53.64 | 56.93 | 60.06 | 62.99 | 65.53 | 67.45 | 68.37 | | | | | | | | |
| | | 18.56 | 22.09 | 25.55 | 28.95 | 32.34 | 35.76 | 39.22 | 42.69 | 46.14 | 49.53 | 52.80 | 55.96 | 59.04 | 62.12 | 65.39 | | | | | | | | |
| 80 | 12.83 | 19.36 | 24.97 | 30.15 | 35.03 | 39.67 | 44.05 | 48.19 | 52.13 | 55.89 | 59.48 | 62.87 | 65.96 | 68.56 | 70.45 | 71.23 | | | | | | | | |
| | 11.16 | 16.17 | 20.87 | 25.31 | 29.56 | 33.70 | 37.75 | 41.73 | 45.63 | 49.42 | 53.06 | 56.51 | 59.79 | 62.93 | 66.04 | 69.34 | | | | | | | | |
| 90 | 10.20 | 17.12 | 23.51 | 29.48 | 35.06 | 40.28 | 45.18 | 49.80 | 54.15 | 58.28 | 62.18 | 65.84 | 69.20 | 72.13 | 74.45 | 75.81 | | | | | | | | |
| | 8.07 | 14.39 | 20.13 | 25.47 | 30.43 | 35.13 | 39.63 | 43.98 | 48.19 | 52.25 | 56.13 | 59.80 | 63.25 | 66.54 | 69.75 | 73.08 | | | | | | | | |
| 100 | 6.10 | 14.49 | 21.99 | 28.80 | 35.09 | 40.93 | 46.37 | 51.45 | 56.22 | 60.71 | 64.95 | 68.94 | 72.69 | 76.10 | 79.05 | 81.29 | 82.37 | | | | | | | |
| | 4.88 | 12.38 | 19.25 | 25.47 | 31.11 | 36.32 | 41.23 | 45.92 | 50.43 | 54.77 | 58.93 | 62.89 | 66.64 | 70.19 | 73.63 | 77.06 | 80.76 | | | | | | | |
| 110 | 1.53 | 11.60 | 20.27 | 27.97 | 34.96 | 41.41 | 42.98 | 52.93 | 58.10 | 62.95 | 67.53 | 71.87 | 75.99 | 79.88 | 83.43 | 86.43 | 88.61 | | | | | | | |
| | 0.87 | 9.82 | 17.85 | 24.95 | 31.31 | 37.10 | 42.46 | 47.52 | 52.33 | 56.95 | 61.40 | 65.68 | 69.79 | 73.73 | 77.51 | 81.20 | 84.94 | | | | | | | |
| 120 | | 8.21 | 17.96 | 26.53 | 34.27 | 41.36 | 47.89 | 53.94 | 59.56 | 64.81 | 69.77 | 74.47 | 78.94 | 83.21 | 87.26 | 90.91 | 93.98 | 96.10 | | | | | | |
| | | 6.82 | 15.76 | 23.79 | 31.03 | 37.59 | 43.56 | 49.08 | 54.26 | 59.18 | 63.91 | 68.49 | 72.91 | 77.18 | 81.29 | 85.24 | 89.13 | 93.13 | | | | | | |
| 130 | | 4.21 | 14.94 | 24.58 | 33.20 | 40.92 | 47.93 | 54.42 | 60.48 | 66.18 | 71.58 | 76.70 | 81.57 | 86.18 | 90.57 | 94.73 | 98.50 | 101.66 | 103.78 | | | | | |
| | | 3.40 | 13.65 | 23.05 | 31.41 | 38.84 | 45.49 | 51.55 | 57.17 | 62.45 | 67.43 | 72.17 | 76.69 | 81.04 | 85.24 | 89.31 | 93.28 | 97.25 | 101.43 | | | | | |
| 140 | | | 12.05 | 22.97 | 32.49 | 40.88 | 48.38 | 55.22 | 61.58 | 67.61 | 73.32 | 78.72 | 83.93 | 88.93 | 93.69 | 98.16 | 102.38 | 106.24 | 109.49 | 111.73 | | | | |
| | | | 10.94 | 21.58 | 30.90 | 39.12 | 46.45 | 53.12 | 59.31 | 65.14 | 70.60 | 75.69 | 80.58 | 85.23 | 89.59 | 93.69 | 97.65 | 101.54 | 105.45 | 109.69 | | | | |
| 150 | | | 8.52 | 20.48 | 31.11 | 40.57 | 48.99 | 56.53 | 63.35 | 69.66 | 75.66 | 81.45 | 87.03 | 92.34 | 97.30 | 101.99 | 106.43 | 110.50 | 114.26 | 117.46 | 119.81 | | | |
| | | | 7.52 | 19.12 | 29.50 | 38.72 | 46.92 | 54.25 | 60.90 | 67.08 | 72.97 | 78.63 | 84.06 | 89.20 | 93.99 | 98.53 | 102.71 | 106.43 | 110.04 | 113.73 | 117.76 | | | |
| 160 | | | | 18.09 | 29.97 | 40.42 | 49.65 | 57.88 | 65.30 | 72.11 | 78.45 | 84.46 | 90.28 | 95.94 | 101.32 | 106.30 | 110.84 | 115.12 | 119.21 | 122.71 | 125.57 | 127.83 | | |
| | | | | 16.71 | 28.21 | 38.31 | 47.27 | 55.32 | 62.64 | 69.40 | 75.71 | 81.72 | 87.53 | 93.10 | 98.34 | 103.14 | 107.51 | 111.67 | 115.66 | 118.96 | 122.08 | 125.61 | | |
| 170 | | | | 15.80 | 28.89 | 40.24 | 50.15 | 58.92 | 66.84 | 74.11 | 80.89 | 87.29 | 93.43 | 99.40 | 105.20 | 110.61 | 115.51 | 119.86 | 123.76 | 127.49 | 130.92 | 133.83 | 135.84 | |
| | | | | 14.46 | 32.49 | 37.93 | 47.56 | 56.18 | 64.01 | 71.24 | 78.00 | 84.42 | 90.64 | 96.71 | 102.46 | 107.73 | 112.49 | 116.69 | 120.44 | 124.06 | 127.46 | 130.52 | 133.40 | |
| 180 | | | | 12.77 | 27.55 | 39.87 | 50.47 | 59.75 | 68.10 | 75.77 | 82.93 | 89.71 | 96.19 | 102.46 | 108.60 | 114.47 | 119.77 | 124.45 | 128.55 | 132.12 | 135.35 | 138.32 | 140.78 | 142.56 |
| | | | | 11.86 | 25.84 | 37.61 | 47.92 | 57.05 | 65.30 | 72.90 | 80.04 | 86.85 | 93.36 | 99.67 | 105.89 | 111.77 | 116.98 | 121.56 | 125.56 | 129.01 | 132.18 | 135.20 | 137.92 | 140.43 |
| 190 | | | | | 25.71 | 39.47 | 50.90 | 60.67 | 69.37 | 77.35 | 84.79 | 91.84 | 98.83 | 105.18 | 111.50 | 117.64 | 123.37 | 128.38 | 132.69 | 136.43 | 139.62 | 142.30 | 144.62 | 146.38 |
| | | | | | 24.47 | 37.65 | 48.65 | 58.19 | 66.79 | 74.70 | 82.13 | 89.26 | 96.19 | 102.85 | 109.19 | 115.32 | 121.03 | 125.99 | 130.25 | 133.96 | 137.15 | 139.91 | 142.56 | 145.04 |

(mm)

DIAMETER D= 400
HEIGHT h= 147
EXPANSION ANGLE $\lambda$ = 120
BOSS RATIO $\nu$ = 0.275

TABLE 105

UNITED STATES PATENT AND TRADEMARK OFFICE
CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 113-116,
Replace Table 106 with the following:

EMBODIMENT 24

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 25.29 | 28.60 | 31.71 | 34.77 | 37.80 | 40.79 | 43.71 | 46.54 | 49.28 | 51.92 | 54.43 | 56.77 | 58.88 | 60.64 | 61.85 | 62.22 | | | | | | |
| | | | 22.32 | 24.50 | 26.72 | 28.95 | 31.19 | 33.48 | 35.87 | 38.36 | 40.92 | 43.51 | 46.07 | 48.59 | 51.07 | 53.54 | 56.13 | 59.07 | | | | | | |
| 70 | | 19.47 | 23.89 | 27.90 | 31.71 | 35.37 | 38.88 | 42.23 | 45.44 | 48.53 | 51.50 | 54.34 | 56.99 | 59.28 | 61.03 | 61.86 | | | | | | | | |
| | | 16.80 | 19.99 | 23.11 | 26.19 | 29.26 | 32.35 | 35.48 | 38.62 | 41.74 | 44.81 | 47.77 | 50.63 | 53.42 | 56.20 | 59.17 | | | | | | | | |
| 80 | 11.61 | 17.52 | 22.59 | 27.28 | 31.69 | 35.89 | 39.86 | 43.60 | 47.16 | 50.57 | 53.82 | 56.88 | 59.68 | 62.03 | 63.74 | 64.44 | | | | | | | | |
| | 10.09 | 14.63 | 18.88 | 22.90 | 26.74 | 30.49 | 34.15 | 37.76 | 41.28 | 44.71 | 48.00 | 51.13 | 54.10 | 56.94 | 59.75 | 62.74 | | | | | | | | |
| 90 | 9.23 | 15.49 | 21.27 | 26.67 | 31.72 | 36.44 | 40.88 | 45.06 | 49.00 | 52.73 | 56.26 | 59.57 | 62.61 | 65.26 | 67.36 | 68.59 | | | | | | | | |
| | 7.30 | 13.02 | 18.22 | 23.04 | 27.54 | 31.79 | 35.86 | 39.79 | 43.60 | 47.27 | 50.78 | 54.10 | 57.23 | 60.20 | 63.11 | 66.12 | | | | | | | | |
| 100 | 5.52 | 13.11 | 19.89 | 26.06 | 31.75 | 37.03 | 41.95 | 46.55 | 50.87 | 54.93 | 58.76 | 62.38 | 65.76 | 68.86 | 71.52 | 73.54 | 74.53 | | | | | | | |
| | 4.42 | 11.20 | 17.42 | 23.04 | 28.15 | 32.86 | 37.31 | 41.55 | 45.63 | 49.55 | 53.32 | 56.90 | 60.29 | 63.50 | 66.61 | 69.72 | 73.07 | | | | | | | |
| 110 | 1.38 | 10.50 | 18.34 | 25.30 | 31.63 | 37.46 | 38.88 | 47.89 | 52.57 | 56.96 | 61.10 | 65.02 | 68.75 | 72.27 | 75.48 | 78.20 | 80.17 | | | | | | | |
| | 0.78 | 8.89 | 16.15 | 22.58 | 28.33 | 33.56 | 38.42 | 42.99 | 47.35 | 51.53 | 55.56 | 59.43 | 63.15 | 66.71 | 70.13 | 73.47 | 76.85 | | | | | | | |
| 120 | | 7.43 | 16.25 | 24.00 | 31.00 | 37.42 | 43.33 | 48.80 | 53.89 | 58.64 | 63.12 | 67.37 | 71.43 | 75.29 | 78.95 | 82.26 | 85.03 | 86.94 | | | | | | |
| | | 6.17 | 14.26 | 21.52 | 28.08 | 34.01 | 39.41 | 44.41 | 49.09 | 53.54 | 57.83 | 61.96 | 65.97 | 69.83 | 73.54 | 77.12 | 80.65 | 84.26 | | | | | | |
| 130 | | 3.80 | 13.52 | 22.24 | 30.04 | 37.02 | 43.37 | 49.23 | 54.72 | 59.88 | 64.76 | 69.40 | 73.80 | 77.98 | 81.95 | 85.70 | 89.12 | 91.98 | 93.90 | | | | | |
| | | 3.08 | 12.35 | 20.85 | 28.42 | 35.14 | 41.15 | 46.64 | 51.73 | 56.50 | 61.01 | 65.30 | 69.39 | 73.32 | 77.12 | 80.80 | 84.40 | 87.99 | 91.77 | | | | | |
| 140 | | | 10.90 | 20.78 | 29.39 | 36.99 | 43.77 | 49.96 | 55.72 | 61.17 | 66.34 | 71.22 | 75.94 | 80.46 | 84.77 | 88.81 | 92.63 | 96.12 | 99.06 | 101.08 | | | | |
| | | | 9.89 | 19.53 | 27.96 | 35.39 | 42.02 | 48.06 | 53.66 | 58.93 | 63.87 | 68.48 | 72.91 | 77.11 | 81.05 | 84.77 | 88.35 | 91.87 | 95.40 | 99.24 | | | | |
| 150 | | | 7.71 | 18.53 | 28.14 | 36.70 | 44.33 | 51.15 | 57.32 | 63.03 | 68.45 | 73.69 | 78.74 | 83.55 | 88.04 | 92.27 | 96.29 | 99.98 | 103.38 | 106.28 | 108.40 | | | |
| | | | 6.81 | 17.30 | 26.69 | 35.04 | 42.45 | 49.08 | 55.10 | 60.69 | 66.02 | 71.14 | 76.06 | 80.71 | 85.04 | 89.15 | 92.93 | 96.29 | 99.56 | 102.90 | 106.54 | | | |
| 160 | | | | 16.37 | 27.11 | 36.57 | 44.92 | 52.37 | 59.08 | 65.24 | 70.98 | 76.41 | 81.68 | 86.80 | 91.67 | 96.18 | 100.28 | 104.16 | 107.86 | 111.03 | 113.61 | 115.66 | | |
| | | | | 15.12 | 25.52 | 34.66 | 42.77 | 50.05 | 56.68 | 62.79 | 68.50 | 73.94 | 79.19 | 84.23 | 88.97 | 93.32 | 97.27 | 101.04 | 104.64 | 107.63 | 110.45 | 113.65 | | |
| 170 | | | | 14.29 | 26.13 | 36.41 | 45.37 | 53.31 | 60.48 | 67.05 | 73.18 | 78.98 | 84.53 | 89.94 | 95.18 | 100.07 | 104.51 | 108.45 | 111.97 | 115.35 | 118.45 | 121.09 | 122.90 | |
| | | | | 13.09 | 29.39 | 34.32 | 43.03 | 50.83 | 57.92 | 64.45 | 70.57 | 76.38 | 82.01 | 87.50 | 92.70 | 97.47 | 101.78 | 105.57 | 108.97 | 112.25 | 115.32 | 118.09 | 120.69 | |
| 180 | | | | 11.56 | 24.93 | 36.07 | 45.66 | 54.06 | 61.61 | 68.55 | 75.03 | 81.16 | 87.03 | 92.70 | 98.26 | 103.57 | 108.36 | 112.80 | 116.31 | 119.54 | 122.46 | 125.14 | 127.38 | 128.98 |
| | | | | 10.73 | 23.38 | 34.03 | 43.35 | 51.62 | 59.08 | 65.96 | 72.42 | 78.58 | 84.47 | 90.18 | 95.81 | 101.12 | 105.84 | 109.98 | 113.60 | 116.72 | 119.59 | 122.32 | 124.78 | 127.05 |
| 190 | | | | | 23.26 | 35.71 | 46.05 | 54.89 | 62.76 | 69.98 | 76.72 | 83.10 | 89.24 | 95.17 | 100.88 | 106.43 | 111.62 | 116.15 | 120.05 | 123.44 | 126.33 | 128.75 | 130.84 | 132.44 |
| | | | | | 22.14 | 34.06 | 44.02 | 52.64 | 60.43 | 67.59 | 74.31 | 80.76 | 87.03 | 93.05 | 98.79 | 104.34 | 109.51 | 114.00 | 117.85 | 121.20 | 124.09 | 126.58 | 128.98 | 131.23 |

(mm)

DIAMETER D= 400
HEIGHT h= 133
EXPANSION ANGLE $\lambda$ = 120
BOSS RATIO $\nu$ = 0.275

TABLE 106

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 117-120,
Replace Table 107 with the following:

EMBODIMENT 25

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 23.95 | 27.09 | 30.05 | 32.94 | 35.81 | 38.64 | 41.41 | 44.09 | 46.69 | 49.19 | 51.56 | 53.79 | 55.78 | 57.45 | 58.59 | 58.94 | | | | | | |
| | | | 21.14 | 23.21 | 25.32 | 27.43 | 29.55 | 31.72 | 33.98 | 36.34 | 38.76 | 41.22 | 43.65 | 46.03 | 48.38 | 50.72 | 53.18 | 55.96 | | | | | | |
| 70 | | 18.45 | 22.64 | 26.43 | 30.04 | 33.51 | 36.84 | 40.01 | 43.05 | 45.98 | 48.79 | 51.48 | 53.99 | 56.16 | 57.81 | 58.60 | | | | | | | | |
| | | 15.91 | 18.94 | 21.90 | 24.81 | 27.72 | 30.65 | 33.61 | 36.59 | 39.55 | 42.45 | 45.26 | 47.97 | 50.60 | 53.24 | 56.05 | | | | | | | | |
| 80 | 11.00 | 16.59 | 21.40 | 25.84 | 30.03 | 34.01 | 37.76 | 41.31 | 44.68 | 47.91 | 50.98 | 53.89 | 56.54 | 58.76 | 60.38 | 61.05 | | | | | | | | |
| | 9.56 | 13.86 | 17.89 | 21.69 | 25.34 | 28.88 | 32.36 | 35.77 | 39.11 | 42.36 | 45.48 | 48.44 | 51.25 | 53.94 | 56.61 | 59.44 | | | | | | | | |
| 90 | 8.74 | 14.67 | 20.15 | 25.27 | 30.05 | 34.53 | 38.73 | 42.68 | 46.42 | 49.95 | 53.30 | 56.43 | 59.32 | 61.83 | 63.82 | 64.98 | | | | | | | | |
| | 6.92 | 12.33 | 17.26 | 21.83 | 26.09 | 30.11 | 33.97 | 37.70 | 41.31 | 44.78 | 48.11 | 51.26 | 54.21 | 57.03 | 59.79 | 62.64 | | | | | | | | |
| 100 | 5.23 | 12.42 | 18.85 | 24.69 | 30.08 | 35.08 | 39.74 | 44.10 | 48.19 | 52.04 | 55.67 | 59.10 | 62.30 | 65.23 | 67.75 | 69.67 | 70.60 | | | | | | | |
| | 4.19 | 10.61 | 16.50 | 21.83 | 26.67 | 31.13 | 35.34 | 39.36 | 43.22 | 46.95 | 50.51 | 53.91 | 57.12 | 60.16 | 63.11 | 66.05 | 69.22 | | | | | | | |
| 110 | 1.31 | 9.95 | 17.37 | 23.97 | 29.97 | 35.49 | 36.84 | 45.37 | 49.80 | 53.96 | 57.88 | 61.60 | 65.13 | 68.47 | 71.51 | 74.08 | 75.95 | | | | | | | |
| | 0.74 | 8.42 | 15.30 | 21.39 | 26.84 | 31.80 | 36.40 | 40.73 | 44.86 | 48.82 | 52.63 | 56.30 | 59.82 | 63.20 | 66.44 | 69.60 | 72.81 | | | | | | | |
| 120 | | 7.04 | 15.40 | 22.74 | 29.37 | 35.45 | 41.05 | 46.23 | 51.05 | 55.56 | 59.80 | 63.83 | 67.67 | 71.33 | 74.79 | 77.93 | 80.55 | 82.37 | | | | | | |
| | | 5.85 | 13.51 | 20.39 | 26.60 | 32.22 | 37.34 | 42.07 | 46.50 | 50.73 | 54.78 | 58.70 | 62.49 | 66.15 | 69.67 | 73.06 | 76.40 | 79.83 | | | | | | |
| 130 | | 3.60 | 12.80 | 21.07 | 28.46 | 35.07 | 41.09 | 46.64 | 51.84 | 56.73 | 61.35 | 65.75 | 69.91 | 73.87 | 77.63 | 81.19 | 84.43 | 87.14 | 88.96 | | | | | |
| | | 2.92 | 11.70 | 19.76 | 26.92 | 33.29 | 38.99 | 44.18 | 49.01 | 53.53 | 57.80 | 61.86 | 65.74 | 69.46 | 73.06 | 76.55 | 79.96 | 83.35 | 86.94 | | | | | |
| 140 | | | 10.33 | 19.69 | 27.85 | 35.04 | 41.47 | 47.33 | 52.78 | 57.95 | 62.85 | 67.47 | 71.94 | 76.23 | 80.30 | 84.14 | 87.76 | 91.07 | 93.85 | 95.76 | | | | |
| | | | 9.37 | 18.50 | 26.49 | 33.53 | 39.81 | 45.53 | 50.84 | 55.83 | 60.51 | 64.88 | 69.07 | 73.05 | 76.79 | 80.31 | 83.70 | 87.04 | 90.38 | 94.02 | | | | |
| 150 | | | 7.30 | 17.56 | 26.86 | 34.77 | 41.99 | 48.45 | 54.30 | 59.71 | 64.85 | 69.81 | 74.59 | 79.15 | 83.40 | 87.42 | 91.22 | 94.72 | 97.94 | 100.68 | 102.69 | | | |
| | | | 6.45 | 16.39 | 25.29 | 33.19 | 40.21 | 46.50 | 52.20 | 57.50 | 62.54 | 67.39 | 72.05 | 76.46 | 80.56 | 84.46 | 88.04 | 91.22 | 94.32 | 97.48 | 100.94 | | | |
| 160 | | | | 15.51 | 25.69 | 34.64 | 42.56 | 49.61 | 55.98 | 61.81 | 67.24 | 72.39 | 77.38 | 82.23 | 86.85 | 91.12 | 95.00 | 98.67 | 102.18 | 105.18 | 107.63 | 109.57 | | |
| | | | | 14.33 | 24.18 | 32.84 | 40.52 | 47.41 | 53.69 | 59.49 | 64.90 | 70.05 | 75.02 | 79.80 | 84.29 | 88.41 | 92.15 | 95.72 | 99.14 | 101.96 | 104.64 | 107.67 | | |
| 170 | | | | 13.54 | 24.76 | 34.49 | 42.99 | 50.50 | 57.29 | 63.52 | 69.33 | 74.82 | 80.09 | 85.20 | 90.17 | 94.81 | 99.01 | 102.74 | 106.08 | 109.28 | 112.22 | 114.71 | 116.43 | |
| | | | | 12.40 | 27.85 | 32.51 | 40.76 | 48.16 | 54.87 | 61.06 | 66.86 | 72.36 | 77.69 | 82.90 | 87.82 | 92.34 | 96.42 | 100.02 | 103.23 | 106.34 | 109.25 | 111.88 | 114.34 | |
| 180 | | | | 10.95 | 23.62 | 34.17 | 43.26 | 51.21 | 58.37 | 64.94 | 71.08 | 76.89 | 82.45 | 87.82 | 93.09 | 98.12 | 102.66 | 106.67 | 110.19 | 113.25 | 116.01 | 118.56 | 120.67 | 122.19 |
| | | | | 10.17 | 22.15 | 32.24 | 41.07 | 48.90 | 55.97 | 62.49 | 68.61 | 74.44 | 80.02 | 85.43 | 90.77 | 95.80 | 100.27 | 104.20 | 107.62 | 110.58 | 113.29 | 115.89 | 118.22 | 120.37 |
| 190 | | | | | 22.04 | 33.83 | 43.62 | 52.00 | 59.46 | 66.30 | 72.68 | 78.72 | 84.54 | 90.16 | 95.57 | 100.83 | 105.75 | 110.04 | 113.73 | 116.94 | 119.68 | 121.97 | 123.96 | 125.47 |
| | | | | | 20.97 | 32.27 | 41.70 | 49.87 | 57.25 | 64.03 | 70.39 | 76.51 | 82.45 | 88.15 | 93.59 | 98.85 | 103.74 | 108.00 | 111.64 | 114.82 | 117.55 | 119.92 | 122.20 | 124.32 |

(mm)

DIAMETER $D = 400$
HEIGHT $h = 126$
EXPANSION ANGLE $\lambda = 120$
BOSS RATIO $\nu = 0.275$

TABLE 107

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 119-122,
Replace Table 108 with the following:

EMBODIMENT 26

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 21.29 | 24.08 | 26.71 | 29.28 | 31.83 | 34.35 | 36.81 | 39.19 | 41.50 | 43.72 | 45.83 | 47.81 | 49.58 | 51.07 | 52.08 | 52.40 | | | | | | |
| | | | 18.79 | 20.63 | 22.50 | 24.38 | 26.26 | 28.19 | 30.20 | 32.30 | 34.46 | 36.64 | 38.80 | 40.92 | 43.00 | 45.09 | 47.27 | 49.74 | | | | | | |
| 70 | | 18.40 | 20.12 | 23.50 | 26.70 | 29.78 | 32.74 | 35.57 | 38.27 | 40.87 | 43.37 | 45.76 | 47.99 | 49.92 | 51.39 | 52.09 | | | | | | | | |
| | | 14.14 | 16.83 | 19.47 | 22.05 | 24.64 | 27.24 | 29.88 | 32.53 | 35.15 | 37.73 | 40.23 | 42.64 | 44.98 | 47.33 | 49.82 | | | | | | | | |
| 80 | 9.78 | 14.75 | 19.02 | 22.97 | 26.69 | 30.23 | 33.56 | 36.72 | 39.72 | 42.58 | 45.32 | 47.90 | 50.25 | 52.23 | 53.67 | 54.27 | | | | | | | | |
| | 8.50 | 12.32 | 15.90 | 19.28 | 22.52 | 25.67 | 28.76 | 31.80 | 34.77 | 37.65 | 40.42 | 43.06 | 45.55 | 47.95 | 50.32 | 52.83 | | | | | | | | |
| 90 | 7.77 | 13.04 | 17.91 | 22.46 | 26.71 | 30.69 | 34.43 | 37.94 | 41.26 | 44.40 | 47.37 | 50.16 | 52.73 | 54.96 | 56.73 | 57.76 | | | | | | | | |
| | 6.15 | 10.96 | 15.34 | 19.40 | 23.19 | 26.77 | 30.20 | 33.51 | 36.72 | 39.81 | 42.76 | 45.56 | 48.19 | 50.70 | 53.14 | 55.68 | | | | | | | | |
| 100 | 4.65 | 11.04 | 16.75 | 21.95 | 26.74 | 31.18 | 35.33 | 39.20 | 42.83 | 46.25 | 49.48 | 52.53 | 55.38 | 67.98 | 60.22 | 61.93 | 62.76 | | | | | | | |
| | 3.72 | 9.43 | 14.67 | 19.41 | 23.70 | 27.67 | 31.42 | 34.99 | 38.42 | 41.73 | 44.90 | 47.92 | 50.77 | 53.48 | 56.10 | 58.71 | 61.53 | | | | | | | |
| 110 | 1.16 | 8.84 | 15.44 | 21.31 | 26.64 | 31.55 | 32.74 | 40.33 | 44.27 | 47.96 | 51.45 | 54.76 | 57.90 | 60.86 | 63.56 | 65.85 | 67.51 | | | | | | | |
| | 0.66 | 7.49 | 13.60 | 19.01 | 23.86 | 28.26 | 32.35 | 36.20 | 39.87 | 43.39 | 46.78 | 50.05 | 53.18 | 56.18 | 59.06 | 61.87 | 64.72 | | | | | | | |
| 120 | | 6.26 | 13.69 | 20.21 | 26.11 | 31.51 | 36.49 | 41.09 | 45.38 | 49.38 | 53.15 | 56.74 | 60.15 | 63.40 | 66.48 | 69.27 | 71.60 | 73.22 | | | | | | |
| | | 5.20 | 12.01 | 18.12 | 23.64 | 28.64 | 33.19 | 37.39 | 41.34 | 45.09 | 48.70 | 52.18 | 55.55 | 58.80 | 61.93 | 64.95 | 67.91 | 70.96 | | | | | | |
| 130 | | 3.20 | 11.38 | 18.73 | 25.29 | 31.17 | 36.52 | 41.46 | 46.08 | 50.42 | 54.54 | 58.44 | 62.15 | 65.66 | 69.01 | 72.17 | 75.05 | 77.45 | 79.07 | | | | | |
| | | 2.59 | 10.40 | 17.56 | 23.93 | 29.59 | 34.66 | 39.27 | 43.56 | 47.58 | 51.38 | 54.99 | 58.43 | 61.75 | 64.95 | 68.05 | 71.07 | 74.09 | 77.28 | | | | | |
| 140 | | | 9.18 | 17.50 | 24.75 | 31.15 | 36.86 | 42.07 | 46.92 | 51.51 | 55.86 | 59.98 | 63.95 | 67.76 | 71.38 | 74.79 | 78.00 | 80.95 | 83.42 | 85.12 | | | | |
| | | | 8.33 | 16.44 | 23.55 | 29.80 | 35.39 | 40.47 | 45.19 | 49.63 | 53.79 | 57.67 | 61.39 | 64.93 | 68.26 | 71.38 | 74.40 | 77.37 | 80.34 | 83.57 | | | | |
| 150 | | | 6.49 | 15.61 | 23.70 | 30.91 | 37.33 | 43.07 | 48.27 | 53.08 | 57.64 | 62.05 | 66.31 | 70.35 | 74.14 | 77.70 | 81.09 | 84.19 | 87.05 | 89.50 | 91.28 | | | |
| | | | 5.73 | 14.57 | 22.48 | 29.50 | 35.75 | 41.33 | 46.40 | 51.11 | 55.59 | 59.91 | 64.05 | 67.96 | 71.61 | 75.07 | 78.26 | 81.09 | 83.84 | 86.65 | 89.72 | | | |
| 160 | | | | 13.78 | 22.83 | 30.79 | 37.83 | 44.10 | 49.76 | 54.94 | 59.77 | 64.35 | 68.78 | 73.09 | 77.20 | 80.99 | 84.45 | 87.71 | 90.83 | 93.50 | 95.67 | 97.40 | | |
| | | | | 12.73 | 21.49 | 29.19 | 36.02 | 42.15 | 47.73 | 52.88 | 57.69 | 62.27 | 66.69 | 70.93 | 74.93 | 78.59 | 81.91 | 85.08 | 88.12 | 90.63 | 93.01 | 95.71 | | |
| 170 | | | | 12.04 | 22.01 | 30.66 | 38.21 | 44.89 | 50.93 | 56.47 | 61.63 | 66.51 | 71.19 | 75.74 | 80.15 | 84.27 | 88.01 | 91.32 | 94.29 | 97.13 | 99.75 | 101.97 | 103.49 | |
| | | | | 11.02 | 24.75 | 28.90 | 36.24 | 42.80 | 48.77 | 54.28 | 59.43 | 64.32 | 69.06 | 73.69 | 78.06 | 82.08 | 85.71 | 88.90 | 91.76 | 94.52 | 97.11 | 99.45 | 101.64 | |
| 180 | | | | 9.73 | 20.99 | 30.38 | 38.45 | 45.52 | 51.88 | 57.73 | 63.19 | 68.35 | 73.29 | 78.06 | 82.74 | 87.22 | 91.25 | 94.82 | 97.94 | 100.66 | 103.12 | 105.38 | 107.26 | 108.62 |
| | | | | 9.04 | 19.69 | 28.65 | 36.51 | 43.47 | 49.75 | 55.54 | 60.99 | 66.17 | 71.13 | 75.94 | 80.68 | 85.16 | 89.13 | 92.62 | 95.66 | 98.29 | 100.71 | 103.01 | 105.08 | 106.99 |
| 190 | | | | | 19.59 | 30.07 | 38.78 | 46.23 | 52.85 | 58.93 | 64.61 | 69.98 | 75.15 | 80.14 | 84.95 | 89.63 | 94.00 | 97.81 | 101.10 | 103.95 | 106.38 | 108.42 | 110.18 | 111.53 |
| | | | | | 18.64 | 28.68 | 37.07 | 44.33 | 50.88 | 56.91 | 62.57 | 68.01 | 73.29 | 78.36 | 83.19 | 87.86 | 92.22 | 96.00 | 99.24 | 102.06 | 104.49 | 106.60 | 108.82 | 110.51 |

(mm)

DIAMETER D= 400
HEIGHT h= 112
EXPANSION ANGLE $\lambda$ = 120
BOSS RATIO $\nu$ = 0.275

TABLE 108

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 123-126,
Replace Table 109 with the following:

EMBODIMENT 27

| r \ θ | 4.5 | 9 | 13.5 | 18 | 22.5 | 27 | 31.5 | 36 | 40.5 | 45 | 49.5 | 54 | 58.5 | 63 | 67.5 | 72 | 76.5 | 81 | 85.5 | 90 | 94.5 | 99 | 103.5 | 108 (deg) |
|---|---|---|---|---|---|---|---|---|---|---|---|---|---|---|---|---|---|---|---|---|---|---|---|---|
| 60 | | | 23.95 | 27.09 | 30.05 | 32.94 | 35.81 | 38.64 | 41.41 | 44.09 | 46.69 | 49.19 | 51.56 | 53.79 | 55.78 | 57.45 | 58.59 | 58.94 | | | | | | |
| | | | 21.14 | 23.21 | 25.32 | 27.43 | 29.55 | 31.72 | 33.98 | 36.34 | 38.76 | 41.22 | 43.65 | 46.03 | 48.38 | 50.72 | 53.18 | 55.96 | | | | | | |
| 70 | | 18.45 | 22.64 | 26.43 | 30.04 | 33.51 | 36.84 | 40.01 | 43.05 | 45.98 | 48.79 | 51.48 | 53.99 | 56.16 | 57.81 | 58.60 | | | | | | | | |
| | | 15.91 | 18.94 | 21.90 | 24.81 | 27.72 | 30.65 | 33.61 | 36.59 | 39.55 | 42.45 | 45.26 | 47.97 | 50.60 | 53.24 | 56.05 | | | | | | | | |
| 80 | 11.00 | 16.59 | 21.40 | 25.84 | 30.03 | 34.01 | 37.76 | 41.31 | 44.68 | 47.91 | 50.98 | 53.89 | 56.54 | 58.76 | 60.38 | 61.05 | | | | | | | | |
| | 9.56 | 13.86 | 17.89 | 21.69 | 25.34 | 28.88 | 32.36 | 35.77 | 39.11 | 42.36 | 45.48 | 48.44 | 51.25 | 53.94 | 56.61 | 59.44 | | | | | | | | |
| 90 | 8.74 | 14.67 | 20.15 | 25.27 | 30.05 | 34.53 | 38.73 | 42.68 | 46.42 | 49.95 | 53.30 | 56.43 | 59.32 | 61.83 | 63.82 | 64.98 | | | | | | | | |
| | 6.92 | 12.33 | 17.26 | 21.83 | 26.09 | 30.11 | 33.97 | 37.70 | 41.31 | 44.78 | 48.11 | 51.26 | 54.21 | 57.03 | 59.79 | 62.64 | | | | | | | | |
| 100 | 5.23 | 12.42 | 18.85 | 24.69 | 30.08 | 35.08 | 39.74 | 44.10 | 48.19 | 52.04 | 55.67 | 59.10 | 62.30 | 65.23 | 67.75 | 69.67 | 70.60 | | | | | | | |
| | 4.19 | 10.61 | 16.50 | 21.83 | 26.67 | 31.13 | 35.34 | 39.36 | 43.22 | 46.95 | 50.51 | 53.91 | 57.12 | 60.16 | 63.11 | 66.05 | 69.22 | | | | | | | |
| 110 | 1.31 | 9.95 | 17.37 | 23.97 | 29.97 | 35.49 | 36.84 | 45.37 | 49.80 | 53.96 | 57.88 | 61.60 | 65.13 | 68.47 | 71.51 | 74.08 | 75.95 | | | | | | | |
| | 0.74 | 8.42 | 15.30 | 21.39 | 26.84 | 31.80 | 36.40 | 40.73 | 44.86 | 48.82 | 52.63 | 56.30 | 59.82 | 63.20 | 66.44 | 69.60 | 72.81 | | | | | | | |
| 120 | | 7.04 | 15.40 | 22.74 | 29.37 | 35.45 | 41.05 | 46.23 | 51.05 | 55.56 | 59.80 | 63.83 | 67.67 | 71.33 | 74.79 | 77.93 | 80.55 | 82.37 | | | | | | |
| | | 5.85 | 13.51 | 20.39 | 26.60 | 32.22 | 37.34 | 42.07 | 46.50 | 50.73 | 54.78 | 58.70 | 62.49 | 66.15 | 69.67 | 73.06 | 76.40 | 79.83 | | | | | | |
| 130 | | 3.60 | 12.80 | 21.07 | 28.46 | 35.07 | 41.09 | 46.64 | 51.84 | 56.73 | 61.35 | 65.75 | 69.91 | 73.87 | 77.63 | 81.19 | 84.43 | 87.14 | 88.96 | | | | | |
| | | 2.92 | 11.70 | 19.76 | 26.92 | 33.29 | 38.99 | 44.18 | 49.01 | 53.53 | 57.80 | 61.86 | 65.74 | 69.46 | 73.06 | 76.55 | 79.96 | 83.35 | 86.94 | | | | | |
| 140 | | | 10.33 | 19.69 | 27.85 | 35.04 | 41.47 | 47.33 | 52.78 | 57.95 | 62.85 | 67.47 | 71.94 | 76.23 | 80.30 | 84.14 | 87.76 | 91.07 | 93.85 | 95.76 | | | | |
| | | | 9.37 | 18.50 | 26.49 | 33.53 | 39.81 | 45.53 | 50.84 | 55.83 | 60.51 | 64.88 | 69.07 | 73.05 | 76.79 | 80.31 | 83.70 | 87.04 | 90.38 | 94.02 | | | | |
| 150 | | | 7.30 | 17.56 | 26.66 | 34.77 | 41.99 | 48.45 | 54.30 | 59.71 | 64.85 | 69.81 | 74.59 | 79.15 | 83.40 | 87.42 | 91.22 | 94.72 | 97.94 | 100.68 | 102.69 | | | |
| | | | 6.45 | 16.39 | 25.29 | 33.19 | 40.21 | 46.50 | 52.20 | 57.50 | 62.54 | 67.39 | 72.05 | 76.46 | 80.56 | 84.46 | 88.04 | 91.22 | 94.32 | 97.48 | 100.94 | | | |
| 160 | | | | 15.51 | 25.69 | 34.64 | 42.56 | 49.61 | 55.98 | 61.81 | 67.24 | 72.39 | 77.38 | 82.23 | 86.85 | 91.12 | 95.00 | 98.67 | 102.18 | 105.18 | 107.63 | 109.57 | | |
| | | | | 14.33 | 24.18 | 32.84 | 40.52 | 47.41 | 53.69 | 59.49 | 64.90 | 70.05 | 75.02 | 79.80 | 84.29 | 88.41 | 92.15 | 95.72 | 99.14 | 101.96 | 104.64 | 107.67 | | |
| 170 | | | | 13.54 | 24.76 | 34.49 | 42.99 | 50.50 | 57.29 | 63.52 | 69.33 | 74.82 | 80.09 | 85.20 | 90.17 | 94.81 | 99.01 | 102.74 | 106.08 | 109.28 | 112.22 | 114.71 | 116.43 | |
| | | | | 12.40 | 27.85 | 32.51 | 40.76 | 48.16 | 54.87 | 61.06 | 66.86 | 72.36 | 77.69 | 82.90 | 87.82 | 92.34 | 96.42 | 100.02 | 103.23 | 105.34 | 109.25 | 111.88 | 114.34 | |
| 180 | | | | 10.95 | 23.62 | 34.17 | 43.26 | 51.21 | 58.37 | 64.94 | 71.08 | 76.89 | 82.45 | 87.82 | 93.09 | 98.12 | 102.66 | 106.67 | 110.19 | 113.25 | 116.01 | 118.56 | 120.67 | 122.19 |
| | | | | 10.17 | 22.15 | 32.24 | 41.07 | 48.90 | 55.97 | 62.49 | 68.61 | 74.44 | 80.02 | 85.43 | 90.77 | 95.80 | 100.27 | 104.20 | 107.62 | 110.58 | 113.29 | 115.89 | 118.22 | 120.37 |
| 190 | | | | | 22.04 | 33.83 | 43.62 | 52.00 | 59.46 | 66.30 | 72.68 | 78.72 | 84.54 | 90.16 | 95.57 | 100.83 | 105.75 | 110.04 | 113.73 | 116.94 | 119.68 | 121.97 | 123.96 | 125.47 |
| | | | | | 20.97 | 32.27 | 41.70 | 49.87 | 57.25 | 64.03 | 70.39 | 76.51 | 82.45 | 88.15 | 93.59 | 98.85 | 103.74 | 108.00 | 111.64 | 114.82 | 117.55 | 119.92 | 122.20 | 124.32 |

(mm)

DIAMETER D= 400
HEIGHT h= 126
EXPANSION ANGLE $\lambda$ = 108
BOSS RATIO $\nu$ = 0.275

TABLE 109

CERTIFICATE OF CORRECTION

It is certified that error appears in the above-identified patent and that said Letters Patent is hereby corrected as shown below:

Columns 125-128,
Replace Table 110 with the following:

EMBODIMENT 28

| θ / r | 3.75 | 7.5 | 11.25 | 15 | 18.75 | 22.5 | 26.25 | 30 | 33.75 | 37.5 | 41.25 | 45 | 48.75 | 52.5 | 56.25 | 60 | 63.75 | 67.5 | 71.25 | 75 | 78.75 | 82.5 | 86.25 | 90 (deg) |
|---|---|---|---|---|---|---|---|---|---|---|---|---|---|---|---|---|---|---|---|---|---|---|---|---|
| 60 | | | 26.62 | 30.10 | 33.38 | 36.60 | 39.79 | 42.94 | 46.01 | 48.99 | 51.88 | 54.65 | 57.29 | 59.76 | 61.98 | 63.83 | 65.10 | 65.49 | | | | | | |
| | | | 23.49 | 25.79 | 28.13 | 30.48 | 32.83 | 35.24 | 37.75 | 40.38 | 43.07 | 45.80 | 48.50 | 51.15 | 53.76 | 56.36 | 59.08 | 62.17 | | | | | | |
| 70 | | 20.50 | 25.15 | 29.37 | 33.38 | 37.23 | 40.93 | 44.46 | 47.83 | 51.09 | 54.22 | 57.20 | 59.99 | 62.41 | 64.24 | 65.12 | | | | | | | | |
| | | 17.68 | 21.04 | 24.33 | 27.57 | 30.80 | 34.05 | 37.35 | 40.66 | 43.94 | 47.17 | 50.29 | 53.30 | 56.23 | 59.16 | 62.28 | | | | | | | | |
| 80 | 12.22 | 18.44 | 23.78 | 28.72 | 33.36 | 37.78 | 41.95 | 45.90 | 49.64 | 53.23 | 56.65 | 59.87 | 62.82 | 65.29 | 67.09 | 67.84 | | | | | | | | |
| | 10.63 | 15.40 | 19.87 | 24.10 | 28.15 | 32.09 | 35.95 | 39.74 | 43.46 | 47.06 | 50.53 | 53.82 | 56.94 | 59.93 | 62.90 | 66.04 | | | | | | | | |
| 90 | 9.71 | 16.30 | 22.39 | 28.07 | 33.39 | 38.36 | 43.03 | 47.43 | 51.58 | 55.50 | 59.22 | 62.70 | 65.91 | 68.70 | 70.91 | 72.20 | | | | | | | | |
| | 7.69 | 13.70 | 19.17 | 24.25 | 28.98 | 33.46 | 37.75 | 41.89 | 45.89 | 49.76 | 53.46 | 56.95 | 60.24 | 63.37 | 66.43 | 69.60 | | | | | | | | |
| 100 | 5.81 | 13.80 | 20.94 | 27.43 | 33.42 | 38.98 | 44.16 | 49.00 | 53.54 | 57.82 | 61.86 | 65.66 | 69.23 | 72.48 | 75.28 | 77.42 | 78.45 | | | | | | | |
| | 4.65 | 11.79 | 18.34 | 24.26 | 29.63 | 34.59 | 39.27 | 43.73 | 48.03 | 52.16 | 56.13 | 59.90 | 63.46 | 66.85 | 70.12 | 73.39 | 76.92 | | | | | | | |
| 110 | 1.45 | 11.05 | 19.30 | 26.63 | 33.30 | 39.44 | 40.93 | 50.41 | 55.34 | 59.95 | 64.31 | 68.45 | 72.37 | 76.07 | 79.45 | 82.31 | 84.39 | | | | | | | |
| | 0.83 | 9.36 | 17.00 | 23.77 | 29.82 | 35.33 | 40.44 | 45.26 | 49.84 | 54.24 | 58.48 | 62.56 | 66.47 | 70.22 | 73.82 | 77.33 | 80.90 | | | | | | | |
| 120 | | 7.82 | 17.11 | 25.26 | 32.64 | 39.39 | 45.61 | 51.37 | 56.72 | 61.73 | 66.44 | 70.92 | 75.18 | 79.25 | 83.10 | 86.59 | 89.50 | 91.52 | | | | | | |
| | | 6.50 | 15.01 | 22.66 | 29.55 | 35.80 | 41.49 | 46.74 | 51.67 | 56.36 | 60.87 | 65.22 | 69.44 | 73.51 | 77.42 | 81.18 | 84.89 | 88.69 | | | | | | |
| 130 | | 4.01 | 14.23 | 23.41 | 31.62 | 38.97 | 45.65 | 51.83 | 57.60 | 63.03 | 68.17 | 73.05 | 77.68 | 82.08 | 86.26 | 90.21 | 93.81 | 96.82 | 98.84 | | | | | |
| | | 3.24 | 13.00 | 21.95 | 29.92 | 36.99 | 43.32 | 49.09 | 54.45 | 59.48 | 64.22 | 68.73 | 73.04 | 77.18 | 81.18 | 85.06 | 88.84 | 92.62 | 96.60 | | | | | |
| 140 | | | 11.48 | 21.88 | 30.94 | 38.94 | 46.08 | 52.59 | 58.65 | 64.39 | 69.83 | 74.97 | 79.93 | 84.70 | 89.23 | 93.48 | 97.51 | 101.18 | 104.27 | 106.41 | | | | |
| | | | 10.41 | 20.56 | 29.43 | 37.25 | 44.23 | 50.59 | 56.49 | 62.04 | 67.24 | 72.09 | 76.74 | 81.17 | 85.32 | 89.23 | 93.00 | 96.71 | 100.43 | 104.47 | | | | |
| 150 | | | 8.11 | 19.51 | 29.62 | 38.63 | 46.66 | 53.84 | 60.34 | 66.35 | 72.06 | 77.57 | 82.88 | 87.94 | 92.67 | 97.13 | 101.36 | 105.24 | 108.82 | 111.87 | 114.10 | | | |
| | | | 7.16 | 18.21 | 28.10 | 36.88 | 44.68 | 51.66 | 58.00 | 63.89 | 69.49 | 74.88 | 80.06 | 84.95 | 89.51 | 93.84 | 97.82 | 101.36 | 104.80 | 108.31 | 112.15 | | | |
| 160 | | | | 17.23 | 28.54 | 38.49 | 47.29 | 55.12 | 62.19 | 68.67 | 74.71 | 80.44 | 85.98 | 91.37 | 96.50 | 101.24 | 105.56 | 109.64 | 113.53 | 116.87 | 119.59 | 121.74 | | |
| | | | | 15.92 | 26.87 | 36.49 | 45.02 | 52.68 | 59.66 | 66.10 | 72.11 | 77.83 | 83.36 | 88.66 | 93.66 | 98.23 | 102.39 | 106.35 | 110.15 | 113.29 | 116.26 | 119.63 | | |
| 170 | | | | 15.05 | 27.51 | 38.32 | 47.76 | 56.12 | 63.66 | 70.58 | 77.03 | 83.14 | 88.98 | 94.67 | 100.19 | 105.34 | 110.01 | 114.15 | 117.87 | 121.42 | 124.69 | 127.46 | 129.37 | |
| | | | | 13.77 | 30.94 | 36.12 | 45.29 | 53.51 | 60.96 | 67.84 | 74.29 | 80.40 | 86.33 | 92.11 | 97.58 | 102.60 | 107.14 | 111.13 | 114.70 | 118.15 | 121.39 | 124.31 | 127.04 | |
| 180 | | | | 12.17 | 26.24 | 37.97 | 48.07 | 56.91 | 64.85 | 72.16 | 78.98 | 85.44 | 91.61 | 97.58 | 103.43 | 109.02 | 114.07 | 118.53 | 122.43 | 125.83 | 128.90 | 131.73 | 134.08 | 135.77 |
| | | | | 11.29 | 24.61 | 35.82 | 45.63 | 54.34 | 62.19 | 69.43 | 76.23 | 82.71 | 88.91 | 94.92 | 100.85 | 106.45 | 111.41 | 115.77 | 119.58 | 122.87 | 125.88 | 128.76 | 131.35 | 133.74 |
| 190 | | | | | 24.49 | 37.59 | 48.47 | 57.78 | 66.06 | 73.67 | 80.76 | 87.47 | 93.94 | 100.17 | 106.19 | 112.03 | 117.50 | 122.26 | 126.37 | 129.94 | 132.98 | 135.53 | 137.73 | 139.41 |
| | | | | | 23.30 | 35.85 | 46.33 | 55.41 | 63.61 | 71.14 | 78.22 | 85.01 | 91.61 | 97.95 | 103.99 | 109.83 | 115.27 | 120.00 | 124.05 | 127.58 | 130.62 | 133.25 | 135.77 | 138.14 |

(mm)

DIAMETER D= 400
HEIGHT h= 140
EXPANSION ANGLE $\lambda$ = 90
BOSS RATIO $\nu$ = 0.275

TABLE 110

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 129-132,
Replace Table 111 with the following:

EMBODIMENT 29

| r (mm) \ θ (deg) | 5.5 | 11 | 16.5 | 22 | 27.5 | 33 | 38.5 | 44 | 49.5 | 55 | 60.5 | 66 | 71.5 | 77 | 82.5 | 88 | 93.5 | 99 | 104.5 | 110 | 115.5 | 121 | 126.5 | 132 |
|---|---|---|---|---|---|---|---|---|---|---|---|---|---|---|---|---|---|---|---|---|---|---|---|---|
| 60 | | | 26.62 | 30.10 | 33.38 | 36.60 | 39.79 | 42.94 | 46.01 | 48.99 | 51.88 | 54.65 | 57.29 | 59.76 | 61.98 | 63.83 | 65.10 | 65.49 | | | | | | |
| | | | 23.49 | 25.79 | 28.13 | 30.48 | 32.83 | 35.24 | 37.75 | 40.38 | 43.07 | 45.80 | 48.50 | 51.15 | 53.76 | 56.36 | 59.08 | 62.17 | | | | | | |
| 70 | | 20.50 | 25.15 | 29.37 | 33.38 | 37.23 | 40.93 | 44.46 | 47.83 | 51.09 | 54.22 | 57.20 | 59.99 | 62.41 | 64.24 | 65.12 | | | | | | | | |
| | | 17.68 | 21.04 | 24.33 | 27.57 | 30.80 | 34.05 | 37.35 | 40.66 | 43.94 | 47.17 | 50.29 | 53.30 | 56.23 | 59.16 | 62.28 | | | | | | | | |
| 80 | 12.22 | 18.44 | 23.78 | 28.72 | 33.36 | 37.78 | 41.95 | 45.90 | 49.64 | 53.23 | 56.65 | 59.87 | 62.82 | 65.29 | 67.09 | 67.84 | | | | | | | | |
| | 10.63 | 15.40 | 19.87 | 24.10 | 28.15 | 32.09 | 35.95 | 39.74 | 43.46 | 47.06 | 50.53 | 53.82 | 56.94 | 59.93 | 62.90 | 66.04 | | | | | | | | |
| 90 | 9.71 | 16.30 | 22.39 | 28.07 | 33.39 | 38.36 | 43.03 | 47.43 | 51.58 | 55.50 | 59.22 | 62.70 | 65.91 | 68.70 | 70.91 | 72.20 | | | | | | | | |
| | 7.69 | 13.70 | 19.17 | 24.25 | 28.98 | 33.46 | 37.75 | 41.89 | 45.89 | 49.76 | 53.46 | 56.95 | 60.24 | 63.37 | 66.43 | 69.60 | | | | | | | | |
| 100 | 5.81 | 13.80 | 20.94 | 27.43 | 33.42 | 38.98 | 44.16 | 49.00 | 53.54 | 57.82 | 61.86 | 65.66 | 69.23 | 72.48 | 75.28 | 77.42 | 78.45 | | | | | | | |
| | 4.65 | 11.79 | 18.34 | 24.26 | 29.63 | 34.59 | 39.27 | 43.73 | 48.03 | 52.16 | 56.13 | 59.90 | 63.46 | 66.85 | 70.12 | 73.39 | 76.92 | | | | | | | |
| 110 | 1.45 | 11.05 | 19.30 | 26.63 | 33.30 | 39.44 | 40.93 | 50.41 | 55.34 | 59.95 | 64.31 | 68.45 | 72.37 | 76.07 | 79.45 | 82.31 | 84.39 | | | | | | | |
| | 0.83 | 9.36 | 17.00 | 23.77 | 29.82 | 35.33 | 40.44 | 45.26 | 49.84 | 54.24 | 58.48 | 62.56 | 66.47 | 70.22 | 73.82 | 77.33 | 80.90 | | | | | | | |
| 120 | | 7.82 | 17.11 | 25.26 | 32.64 | 39.39 | 45.61 | 51.37 | 56.72 | 61.73 | 66.44 | 70.92 | 75.18 | 79.25 | 83.10 | 86.59 | 89.50 | 91.52 | | | | | | |
| | | 6.50 | 15.01 | 22.66 | 29.55 | 35.80 | 41.49 | 46.74 | 51.67 | 56.36 | 60.87 | 65.22 | 69.44 | 73.51 | 77.42 | 81.18 | 84.89 | 88.69 | | | | | | |
| 130 | | 4.01 | 14.23 | 23.41 | 31.62 | 38.97 | 45.65 | 51.83 | 57.60 | 63.03 | 68.17 | 73.05 | 77.68 | 82.08 | 86.26 | 90.21 | 93.81 | 96.82 | 98.84 | | | | | |
| | | 3.24 | 13.00 | 21.95 | 29.92 | 36.99 | 43.32 | 49.09 | 54.45 | 59.48 | 64.22 | 68.73 | 73.04 | 77.18 | 81.18 | 85.06 | 88.84 | 92.62 | 96.60 | | | | | |
| 140 | | | 11.48 | 21.88 | 30.94 | 38.94 | 46.08 | 52.59 | 58.65 | 64.39 | 69.83 | 74.97 | 79.93 | 84.70 | 89.23 | 93.48 | 97.51 | 101.18 | 104.27 | 106.41 | | | | |
| | | | 10.41 | 20.56 | 29.43 | 37.25 | 44.23 | 50.59 | 56.49 | 62.04 | 67.24 | 72.09 | 76.74 | 81.17 | 85.32 | 89.23 | 93.00 | 96.71 | 100.43 | 104.47 | | | | |
| 150 | | | 8.11 | 19.51 | 29.62 | 38.63 | 46.66 | 53.84 | 60.34 | 66.35 | 72.06 | 77.57 | 82.88 | 87.94 | 92.67 | 97.13 | 101.36 | 105.24 | 108.82 | 111.87 | 114.10 | | | |
| | | | 7.16 | 18.21 | 28.10 | 36.88 | 44.68 | 51.66 | 58.00 | 63.89 | 69.49 | 74.88 | 80.06 | 84.95 | 89.51 | 93.84 | 97.82 | 101.36 | 104.80 | 108.31 | 112.15 | | | |
| 160 | | | | 17.23 | 28.54 | 38.49 | 47.29 | 55.12 | 62.19 | 68.67 | 74.71 | 80.44 | 85.98 | 91.37 | 96.50 | 101.24 | 105.56 | 109.64 | 113.53 | 116.87 | 119.59 | 121.74 | | |
| | | | | 15.92 | 26.87 | 36.49 | 45.02 | 52.68 | 59.66 | 66.10 | 72.11 | 77.83 | 83.36 | 88.66 | 93.66 | 98.23 | 102.39 | 106.35 | 110.15 | 113.29 | 116.26 | 119.63 | | |
| 170 | | | | 15.05 | 27.51 | 38.32 | 47.76 | 56.12 | 63.66 | 70.58 | 77.03 | 83.14 | 88.98 | 94.67 | 100.19 | 105.34 | 110.01 | 114.15 | 117.87 | 121.42 | 124.69 | 127.46 | 129.37 | |
| | | | | 13.77 | 30.94 | 36.12 | 45.29 | 53.51 | 60.96 | 67.84 | 74.29 | 80.40 | 86.33 | 92.11 | 97.58 | 102.60 | 107.14 | 111.13 | 114.70 | 118.15 | 121.39 | 124.31 | 127.04 | |
| 180 | | | | 12.17 | 26.24 | 37.97 | 48.07 | 56.91 | 64.85 | 72.16 | 78.98 | 85.44 | 91.61 | 97.58 | 103.43 | 109.02 | 114.07 | 118.53 | 122.43 | 125.83 | 128.90 | 131.73 | 134.08 | 135.77 |
| | | | | 11.29 | 24.61 | 35.82 | 45.63 | 54.34 | 62.19 | 69.43 | 76.23 | 82.71 | 88.91 | 94.92 | 100.85 | 106.45 | 111.41 | 115.77 | 119.58 | 122.87 | 125.88 | 128.76 | 131.35 | 133.74 |
| 190 | | | | | 24.49 | 37.59 | 48.47 | 57.78 | 66.06 | 73.67 | 80.76 | 87.47 | 93.94 | 100.17 | 106.19 | 112.03 | 117.50 | 122.26 | 126.37 | 129.94 | 132.98 | 135.53 | 137.73 | 139.41 |
| | | | | | 23.30 | 35.85 | 46.33 | 55.41 | 63.61 | 71.14 | 78.22 | 85.01 | 91.61 | 97.95 | 103.99 | 109.83 | 115.27 | 120.00 | 124.05 | 127.58 | 130.62 | 133.25 | 135.77 | 138.14 |

(mm)

DIAMETER $D = 400$
HEIGHT $h = 140$
EXPANSION ANGLE $\lambda = 132$
BOSS RATIO $\nu = 0.275$

TABLE 111

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 131-134,
Replace Table 112 with the following:

EMBODIMENT 30

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 74.48 | | | 26.62 | 30.10 | 33.38 | 36.60 | 39.79 | 42.94 | 46.01 | 48.99 | 51.88 | 54.65 | 57.29 | 59.76 | 61.98 | 63.83 | 65.10 | 65.49 | | | | | | |
| | | | 23.49 | 25.79 | 28.13 | 30.48 | 32.83 | 35.24 | 37.75 | 40.38 | 43.07 | 45.80 | 48.50 | 51.15 | 53.76 | 56.36 | 59.08 | 62.17 | | | | | | |
| 83.45 | | 20.50 | 25.15 | 29.37 | 33.38 | 37.23 | 40.93 | 44.46 | 47.83 | 51.09 | 54.22 | 57.20 | 59.99 | 62.41 | 64.24 | 65.12 | | | | | | | | |
| | | 17.68 | 21.04 | 24.33 | 27.57 | 30.80 | 34.05 | 37.35 | 40.66 | 43.94 | 47.17 | 50.29 | 53.30 | 56.23 | 59.16 | 62.28 | | | | | | | | |
| 92.41 | 12.22 | 18.44 | 23.78 | 28.72 | 33.36 | 37.78 | 41.95 | 45.90 | 49.64 | 53.23 | 56.65 | 59.87 | 62.82 | 65.29 | 67.09 | 67.84 | | | | | | | | |
| | 10.63 | 15.40 | 19.87 | 24.10 | 28.15 | 32.09 | 35.95 | 39.74 | 43.46 | 47.06 | 50.53 | 53.82 | 56.94 | 59.93 | 62.90 | 66.04 | | | | | | | | |
| 101.4 | 9.71 | 16.30 | 22.39 | 28.07 | 33.39 | 38.36 | 43.03 | 47.43 | 51.58 | 55.50 | 59.22 | 62.70 | 65.91 | 68.70 | 70.91 | 72.20 | | | | | | | | |
| | 7.69 | 13.70 | 19.17 | 24.25 | 28.98 | 33.46 | 37.75 | 41.89 | 45.89 | 49.76 | 53.46 | 56.95 | 60.24 | 63.37 | 66.43 | 69.60 | | | | | | | | |
| 110.3 | 5.81 | 13.80 | 20.94 | 27.43 | 33.42 | 38.98 | 44.16 | 49.00 | 53.54 | 57.82 | 61.86 | 65.66 | 69.23 | 72.48 | 75.28 | 77.42 | 78.45 | | | | | | | |
| | 4.65 | 11.79 | 18.34 | 24.26 | 29.63 | 34.59 | 39.27 | 43.73 | 48.03 | 52.16 | 56.13 | 59.90 | 63.46 | 66.85 | 70.12 | 73.39 | 76.92 | | | | | | | |
| 119.3 | 1.45 | 11.05 | 19.30 | 26.63 | 33.30 | 39.44 | 40.93 | 50.41 | 55.34 | 59.95 | 64.31 | 68.45 | 72.37 | 76.07 | 79.45 | 82.31 | 84.39 | | | | | | | |
| | 0.83 | 9.36 | 17.00 | 23.77 | 29.82 | 35.33 | 40.44 | 45.26 | 49.84 | 54.24 | 58.48 | 62.56 | 66.47 | 70.22 | 73.82 | 77.33 | 80.90 | | | | | | | |
| 128.3 | | 7.82 | 17.11 | 25.26 | 32.64 | 39.39 | 45.61 | 51.37 | 56.72 | 61.73 | 66.44 | 70.92 | 75.18 | 79.25 | 83.10 | 86.59 | 89.50 | 91.52 | | | | | | |
| | | 6.50 | 15.01 | 22.66 | 29.55 | 35.80 | 41.49 | 46.74 | 51.67 | 56.36 | 60.87 | 65.22 | 69.44 | 73.51 | 77.42 | 81.18 | 84.89 | 88.69 | | | | | | |
| 137.2 | | 4.01 | 14.23 | 23.41 | 31.62 | 38.97 | 45.65 | 51.83 | 57.60 | 63.03 | 68.17 | 73.05 | 77.68 | 82.08 | 86.26 | 90.21 | 93.81 | 96.82 | 98.84 | | | | | |
| | | 3.24 | 13.00 | 21.95 | 29.92 | 36.99 | 43.32 | 49.09 | 54.45 | 59.48 | 64.22 | 68.73 | 73.04 | 77.18 | 81.18 | 85.06 | 88.84 | 92.62 | 96.60 | | | | | |
| 146.2 | | | 11.48 | 21.88 | 30.94 | 38.94 | 46.08 | 52.59 | 58.65 | 64.39 | 69.83 | 74.97 | 79.93 | 84.70 | 89.23 | 93.48 | 97.51 | 101.18 | 104.27 | 106.41 | | | | |
| | | | 10.41 | 20.56 | 29.43 | 37.25 | 44.23 | 50.59 | 56.49 | 62.04 | 67.24 | 72.09 | 76.74 | 81.17 | 85.32 | 89.23 | 93.00 | 96.71 | 100.43 | 104.47 | | | | |
| 155.2 | | | 8.11 | 19.51 | 29.62 | 38.63 | 46.66 | 53.84 | 60.34 | 66.35 | 72.06 | 77.57 | 82.88 | 87.94 | 92.67 | 97.13 | 101.36 | 105.24 | 108.82 | 111.87 | 114.10 | | | |
| | | | 7.16 | 18.21 | 28.10 | 36.88 | 44.68 | 51.66 | 58.00 | 63.89 | 69.49 | 74.88 | 80.06 | 84.95 | 89.51 | 93.84 | 97.82 | 101.36 | 104.80 | 108.31 | 112.15 | | | |
| 164.1 | | | | 17.23 | 28.54 | 38.49 | 47.29 | 55.12 | 62.19 | 68.67 | 74.71 | 80.44 | 85.98 | 91.37 | 96.50 | 101.24 | 105.56 | 109.64 | 113.53 | 116.87 | 119.59 | 121.74 | | |
| | | | | 15.92 | 26.87 | 36.49 | 45.02 | 52.68 | 59.66 | 66.10 | 72.11 | 77.83 | 83.36 | 88.66 | 93.66 | 98.23 | 102.39 | 106.35 | 110.15 | 113.29 | 116.26 | 119.63 | | |
| 173.1 | | | | 15.05 | 27.51 | 38.32 | 47.76 | 56.12 | 63.66 | 70.58 | 77.03 | 83.14 | 88.98 | 94.67 | 100.19 | 105.34 | 110.01 | 114.15 | 117.87 | 121.42 | 124.69 | 127.46 | 129.37 | |
| | | | | 13.77 | 30.94 | 36.12 | 45.29 | 53.51 | 60.96 | 67.84 | 74.29 | 80.40 | 86.33 | 92.11 | 97.58 | 102.60 | 107.14 | 111.13 | 114.70 | 118.15 | 121.39 | 124.31 | 127.04 | |
| 182.1 | | | | 12.17 | 26.24 | 37.97 | 48.07 | 56.91 | 64.85 | 72.16 | 78.98 | 85.44 | 91.81 | 97.58 | 103.43 | 109.02 | 114.07 | 118.53 | 122.43 | 125.83 | 128.90 | 131.73 | 134.08 | 135.77 |
| | | | | 11.29 | 24.61 | 35.82 | 45.63 | 54.34 | 62.19 | 69.43 | 76.23 | 82.71 | 88.91 | 94.92 | 100.85 | 106.45 | 111.41 | 115.77 | 119.58 | 122.87 | 125.88 | 128.76 | 131.35 | 133.74 |
| 191 | | | | | 24.49 | 37.59 | 48.47 | 57.78 | 66.06 | 73.67 | 80.76 | 87.47 | 93.94 | 100.17 | 106.19 | 112.03 | 117.50 | 122.26 | 126.37 | 129.94 | 132.98 | 135.53 | 137.73 | 139.41 |
| | | | | | 23.30 | 35.85 | 46.33 | 55.41 | 63.61 | 71.14 | 78.22 | 85.01 | 91.61 | 97.95 | 103.99 | 109.83 | 115.27 | 120.00 | 124.05 | 127.58 | 130.62 | 133.25 | 135.77 | 138.14 |

(mm)

DIAMETER D= 400
HEIGHT h= 140
EXPANSION ANGLE $\lambda$ = 120
BOSS RATIO $\nu$ = 0.35

TABLE 112

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 135-138,
Replace Table 113 with the following:

EMBODIMENT 31

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 21.29 | 24.08 | 26.71 | 29.28 | 31.83 | 34.35 | 36.81 | 39.19 | 41.50 | 43.72 | 45.83 | 47.81 | 49.58 | 51.07 | 52.08 | 52.40 | | | | | | |
| | | | 17.85 | 19.60 | 21.38 | 23.16 | 24.95 | 26.78 | 28.69 | 30.69 | 32.73 | 34.81 | 36.86 | 38.87 | 40.85 | 42.83 | 44.90 | 47.25 | | | | | | |
| 70 | | 16.40 | 20.12 | 23.50 | 26.70 | 29.78 | 32.74 | 35.57 | 38.27 | 40.87 | 43.37 | 45.76 | 47.99 | 49.92 | 51.39 | 52.09 | | | | | | | | |
| | | 13.44 | 15.99 | 18.49 | 20.95 | 23.41 | 25.88 | 28.38 | 30.90 | 33.40 | 35.85 | 38.22 | 40.50 | 42.73 | 44.96 | 47.33 | | | | | | | | |
| 80 | 9.78 | 14.75 | 19.02 | 22.97 | 26.69 | 30.23 | 33.56 | 36.72 | 39.72 | 42.58 | 45.32 | 47.90 | 50.25 | 52.23 | 53.67 | 54.27 | | | | | | | | |
| | 8.08 | 11.70 | 15.10 | 18.32 | 21.39 | 24.39 | 27.32 | 30.21 | 33.03 | 35.77 | 38.40 | 40.90 | 43.28 | 45.55 | 47.80 | 50.19 | | | | | | | | |
| 90 | 7.77 | 13.04 | 17.91 | 22.46 | 26.71 | 30.69 | 34.43 | 37.94 | 41.26 | 44.40 | 47.37 | 50.16 | 52.73 | 54.96 | 56.73 | 57.76 | | | | | | | | |
| | 5.84 | 10.41 | 14.57 | 18.43 | 22.03 | 25.43 | 28.69 | 31.83 | 34.88 | 37.82 | 40.63 | 43.28 | 45.78 | 48.16 | 50.49 | 52.89 | | | | | | | | |
| 100 | 4.65 | 11.04 | 16.75 | 21.95 | 26.74 | 31.18 | 35.33 | 39.20 | 42.83 | 46.25 | 49.48 | 52.53 | 55.38 | 57.98 | 60.22 | 61.93 | 62.76 | | | | | | | |
| | 3.53 | 8.96 | 13.94 | 18.44 | 22.52 | 26.29 | 29.84 | 33.24 | 36.50 | 39.64 | 42.66 | 45.52 | 48.23 | 50.80 | 53.29 | 55.78 | 58.46 | | | | | | | |
| 110 | 1.16 | 8.84 | 15.44 | 21.31 | 26.64 | 31.55 | 32.74 | 40.33 | 44.27 | 47.96 | 51.45 | 54.76 | 57.90 | 60.86 | 63.56 | 65.85 | 67.51 | | | | | | | |
| | 0.63 | 7.11 | 12.92 | 18.06 | 22.66 | 26.85 | 30.74 | 34.39 | 37.88 | 41.22 | 44.44 | 47.54 | 50.52 | 53.37 | 56.10 | 58.77 | 61.48 | | | | | | | |
| 120 | | 6.26 | 13.69 | 20.21 | 26.11 | 31.51 | 36.49 | 41.09 | 45.38 | 49.38 | 53.15 | 56.74 | 60.15 | 63.40 | 66.48 | 69.27 | 71.60 | 73.22 | | | | | | |
| | | 4.94 | 11.41 | 17.22 | 22.46 | 27.21 | 31.53 | 35.52 | 39.27 | 42.83 | 46.26 | 49.57 | 52.77 | 55.86 | 58.84 | 61.70 | 64.52 | 67.41 | | | | | | |
| 130 | | 3.20 | 11.38 | 18.73 | 25.29 | 31.17 | 36.52 | 41.46 | 46.08 | 50.42 | 54.54 | 58.44 | 62.15 | 65.66 | 69.01 | 72.17 | 75.05 | 77.45 | 79.07 | | | | | |
| | | 2.46 | 9.88 | 16.68 | 22.74 | 28.11 | 32.92 | 37.31 | 41.38 | 45.20 | 48.81 | 52.24 | 55.51 | 58.66 | 61.70 | 64.64 | 67.52 | 70.39 | 73.42 | | | | | |
| 140 | | | 9.18 | 17.50 | 24.75 | 31.15 | 36.86 | 42.07 | 46.92 | 51.51 | 55.86 | 59.98 | 63.95 | 67.76 | 71.38 | 74.79 | 78.00 | 80.95 | 83.42 | 85.12 | | | | |
| | | | 7.92 | 15.62 | 22.37 | 28.31 | 33.62 | 38.45 | 42.93 | 47.15 | 51.10 | 54.79 | 58.32 | 61.69 | 64.84 | 67.82 | 70.68 | 73.50 | 76.32 | 79.39 | | | | |
| 150 | | | 6.49 | 15.61 | 23.70 | 30.91 | 37.33 | 43.07 | 48.27 | 53.08 | 57.64 | 62.05 | 66.31 | 70.35 | 74.14 | 77.70 | 81.09 | 84.19 | 87.05 | 89.50 | 91.28 | | | |
| | | | 5.44 | 13.84 | 21.35 | 28.03 | 33.96 | 39.26 | 44.08 | 48.55 | 52.81 | 56.91 | 60.84 | 64.57 | 68.03 | 71.32 | 74.34 | 77.03 | 79.65 | 82.32 | 85.23 | | | |
| 160 | | | | 13.78 | 22.83 | 30.79 | 37.83 | 44.10 | 49.76 | 54.94 | 59.77 | 64.35 | 68.78 | 73.09 | 77.20 | 80.99 | 84.45 | 87.71 | 90.83 | 93.50 | 95.67 | 97.40 | | |
| | | | | 12.10 | 20.42 | 27.73 | 34.21 | 40.04 | 45.34 | 50.23 | 54.80 | 59.15 | 63.35 | 67.39 | 71.18 | 74.66 | 77.82 | 80.83 | 83.72 | 86.10 | 88.36 | 90.92 | | |
| 170 | | | | 12.04 | 22.01 | 30.66 | 38.21 | 44.89 | 50.93 | 56.47 | 61.63 | 66.51 | 71.19 | 75.74 | 80.15 | 84.27 | 88.01 | 91.32 | 94.29 | 97.13 | 99.75 | 101.97 | 103.49 | |
| | | | | 10.47 | 23.52 | 27.45 | 34.42 | 40.66 | 46.33 | 51.56 | 56.46 | 61.10 | 65.61 | 70.00 | 74.16 | 77.98 | 81.42 | 84.46 | 87.17 | 89.80 | 92.26 | 94.47 | 96.55 | |
| 180 | | | | 9.73 | 20.99 | 30.38 | 38.45 | 45.52 | 51.88 | 57.73 | 63.19 | 68.35 | 73.29 | 78.06 | 82.74 | 87.22 | 91.25 | 94.82 | 97.94 | 100.66 | 103.12 | 105.38 | 107.26 | 108.62 |
| | | | | 8.58 | 18.70 | 27.22 | 34.68 | 41.30 | 47.27 | 52.77 | 57.94 | 62.86 | 67.57 | 72.14 | 76.65 | 80.90 | 84.67 | 87.99 | 90.88 | 93.38 | 95.67 | 97.86 | 99.83 | 101.64 |
| 190 | | | | | 19.59 | 30.07 | 38.78 | 46.23 | 52.85 | 58.93 | 64.61 | 69.98 | 75.15 | 80.14 | 84.95 | 89.63 | 94.00 | 97.81 | 101.10 | 103.95 | 106.38 | 108.42 | 110.18 | 111.53 |
| | | | | | 17.71 | 27.25 | 35.21 | 42.12 | 48.34 | 54.07 | 59.44 | 64.61 | 69.63 | 74.44 | 79.03 | 83.47 | 87.61 | 91.20 | 94.28 | 96.96 | 99.27 | 101.27 | 103.19 | 104.98 |

(mm)

DIAMETER $D = 400$
HEIGHT $h = 112$ ($eu = 112$, $ed = 106.4$, $fu = fd = 0$)
EXPANSION ANGLE $\lambda = 120$
BOSS RATIO $\nu = 0.275$

TABLE 113

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 137-140,
Replace Table 114 with the following:

EMBODIMENT 32

| θ / r (mm) | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 24.29 | 27.08 | 29.71 | 32.28 | 34.83 | 37.35 | 39.81 | 42.19 | 44.50 | 46.72 | 48.83 | 50.81 | 52.58 | 54.07 | 55.08 | 55.40 | | | | | | |
| | | | 18.79 | 20.63 | 22.50 | 24.38 | 26.26 | 28.19 | 30.20 | 32.30 | 34.46 | 36.64 | 38.80 | 40.92 | 43.00 | 45.09 | 47.27 | 49.74 | | | | | | |
| 70 | | 19.40 | 23.12 | 26.50 | 29.70 | 32.78 | 35.74 | 38.57 | 41.27 | 43.87 | 46.37 | 48.76 | 50.99 | 52.92 | 54.39 | 55.09 | | | | | | | | |
| | | 14.14 | 16.83 | 19.47 | 22.05 | 24.64 | 27.24 | 29.88 | 32.53 | 35.15 | 37.73 | 40.23 | 42.64 | 44.98 | 47.33 | 49.82 | | | | | | | | |
| 80 | 12.78 | 17.75 | 22.02 | 25.97 | 29.69 | 33.23 | 36.56 | 39.72 | 42.72 | 45.58 | 48.32 | 50.90 | 53.25 | 55.23 | 56.67 | 57.27 | | | | | | | | |
| | 8.50 | 12.32 | 15.90 | 19.28 | 22.52 | 25.67 | 28.76 | 31.80 | 34.77 | 37.65 | 40.42 | 43.06 | 45.55 | 47.95 | 50.32 | 52.83 | | | | | | | | |
| 90 | 10.77 | 16.04 | 20.91 | 25.46 | 29.71 | 33.69 | 37.43 | 40.94 | 44.26 | 47.40 | 50.37 | 53.16 | 55.73 | 57.96 | 59.73 | 60.76 | | | | | | | | |
| | 6.15 | 10.96 | 15.34 | 19.40 | 23.19 | 26.77 | 30.20 | 33.51 | 36.72 | 39.81 | 42.76 | 45.56 | 48.19 | 50.70 | 53.14 | 55.68 | | | | | | | | |
| 100 | 7.65 | 14.04 | 19.75 | 24.95 | 29.74 | 34.18 | 38.33 | 42.20 | 45.83 | 49.25 | 52.48 | 55.53 | 58.38 | 60.98 | 63.22 | 64.93 | 65.76 | | | | | | | |
| | 3.72 | 9.43 | 14.67 | 19.41 | 23.70 | 27.67 | 31.42 | 34.99 | 38.42 | 41.73 | 44.90 | 47.92 | 50.77 | 53.48 | 56.10 | 58.71 | 61.53 | | | | | | | |
| 110 | 4.16 | 11.84 | 18.44 | 24.31 | 29.64 | 34.55 | 35.74 | 43.33 | 47.27 | 50.96 | 54.45 | 57.76 | 60.90 | 63.86 | 66.56 | 68.85 | 70.51 | | | | | | | |
| | 0.66 | 7.49 | 13.60 | 19.01 | 23.86 | 28.26 | 32.35 | 36.20 | 39.87 | 43.39 | 46.78 | 50.05 | 53.18 | 56.18 | 59.06 | 61.87 | 64.72 | | | | | | | |
| 120 | | 9.26 | 16.69 | 23.21 | 29.11 | 34.51 | 39.49 | 44.09 | 48.38 | 52.38 | 56.15 | 59.74 | 63.15 | 66.40 | 69.48 | 72.27 | 74.60 | 76.22 | | | | | | |
| | | 5.20 | 12.01 | 18.12 | 23.64 | 28.64 | 33.19 | 37.39 | 41.34 | 45.09 | 48.70 | 52.18 | 55.55 | 58.80 | 61.93 | 64.95 | 67.91 | 70.96 | | | | | | |
| 130 | | 6.20 | 14.38 | 21.73 | 28.29 | 34.17 | 39.52 | 44.46 | 49.08 | 53.42 | 57.54 | 61.44 | 65.15 | 68.66 | 72.01 | 75.17 | 78.05 | 80.45 | 82.07 | | | | | |
| | | 2.59 | 10.40 | 17.56 | 23.93 | 29.59 | 34.66 | 39.27 | 43.56 | 47.58 | 51.38 | 54.99 | 58.43 | 61.75 | 64.95 | 68.05 | 71.07 | 74.09 | 77.28 | | | | | |
| 140 | | | 12.18 | 20.50 | 27.75 | 34.15 | 39.86 | 45.07 | 49.92 | 54.51 | 58.86 | 62.98 | 66.95 | 70.76 | 74.38 | 77.79 | 81.00 | 83.95 | 86.42 | 88.12 | | | | |
| | | | 8.33 | 16.44 | 23.55 | 29.80 | 35.39 | 40.47 | 45.19 | 49.63 | 53.79 | 57.67 | 61.39 | 64.93 | 68.26 | 71.38 | 74.40 | 77.37 | 80.34 | 83.57 | | | | |
| 150 | | | 9.49 | 18.61 | 26.70 | 33.91 | 40.33 | 46.07 | 51.27 | 56.08 | 60.64 | 65.05 | 69.31 | 73.35 | 77.14 | 80.70 | 84.09 | 87.19 | 90.05 | 92.50 | 94.28 | | | |
| | | | 5.73 | 14.57 | 22.48 | 29.50 | 35.75 | 41.33 | 46.40 | 51.11 | 55.59 | 59.91 | 64.05 | 67.98 | 71.61 | 75.07 | 78.26 | 81.09 | 83.84 | 86.65 | 89.72 | | | |
| 160 | | | | 16.78 | 25.83 | 33.79 | 40.83 | 47.10 | 52.76 | 57.94 | 62.77 | 67.35 | 71.78 | 76.09 | 80.20 | 83.99 | 87.45 | 90.71 | 93.83 | 96.50 | 98.67 | 100.40 | | |
| | | | | 12.73 | 21.49 | 29.19 | 36.02 | 42.15 | 47.73 | 52.88 | 57.69 | 62.27 | 66.69 | 70.93 | 74.93 | 78.59 | 81.91 | 85.08 | 88.12 | 90.63 | 93.01 | 95.71 | | |
| 170 | | | | 15.04 | 25.01 | 33.66 | 41.21 | 47.89 | 53.93 | 59.47 | 64.63 | 69.51 | 74.19 | 78.74 | 83.15 | 87.27 | 91.01 | 94.32 | 97.29 | 100.13 | 102.75 | 104.97 | 106.49 | |
| | | | | 11.02 | 24.75 | 28.90 | 36.24 | 42.80 | 48.77 | 54.28 | 59.43 | 64.32 | 69.06 | 73.69 | 78.06 | 82.08 | 85.71 | 88.90 | 91.76 | 94.52 | 97.11 | 99.45 | 101.64 | |
| 180 | | | | 12.73 | 23.99 | 33.38 | 41.45 | 48.52 | 54.88 | 60.73 | 66.19 | 71.35 | 76.29 | 81.06 | 85.74 | 90.22 | 94.25 | 97.82 | 100.94 | 103.66 | 106.12 | 108.38 | 110.26 | 111.62 |
| | | | | 9.04 | 19.69 | 28.65 | 36.51 | 43.47 | 49.75 | 55.54 | 60.99 | 66.17 | 71.13 | 75.94 | 80.68 | 85.16 | 89.13 | 92.62 | 95.66 | 98.29 | 100.71 | 103.01 | 105.08 | 106.99 |
| 190 | | | | | 22.59 | 33.07 | 41.78 | 49.23 | 55.85 | 61.93 | 67.61 | 72.98 | 78.15 | 83.14 | 87.95 | 92.63 | 97.00 | 100.81 | 104.10 | 106.95 | 109.38 | 111.42 | 113.18 | 114.53 |
| | | | | | 18.64 | 28.68 | 37.07 | 44.33 | 50.88 | 56.91 | 62.57 | 68.01 | 73.29 | 78.36 | 83.19 | 87.86 | 92.22 | 96.00 | 99.24 | 102.06 | 104.49 | 106.60 | 108.62 | 110.51 |

DIAMETER $D = 400$
HEIGHT $h = 112$ ($eu=112$, $ed=112$, $fu=3$, $fd=0$)
EXPANSION ANGLE $\lambda = 120$
BOSS RATIO $\nu = 0.275$

TABLE 114

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 141-144,
Replace Table 115 with the following:

EMBODIMENT 33

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 24.29 | 27.08 | 29.71 | 32.28 | 34.83 | 37.35 | 39.81 | 42.19 | 44.50 | 46.72 | 48.83 | 50.81 | 52.58 | 54.07 | 55.08 | 55.40 | | | | | | |
| | | | 17.85 | 19.60 | 21.38 | 23.16 | 24.95 | 26.78 | 28.69 | 30.69 | 32.73 | 34.81 | 36.86 | 38.87 | 40.85 | 42.83 | 44.90 | 47.25 | | | | | | |
| 70 | | 19.40 | 23.12 | 26.50 | 29.70 | 32.78 | 35.74 | 38.57 | 41.27 | 43.87 | 46.37 | 48.76 | 50.99 | 52.92 | 54.39 | 55.09 | | | | | | | | |
| | | 13.44 | 15.99 | 18.49 | 20.95 | 23.41 | 25.88 | 28.38 | 30.90 | 33.40 | 35.85 | 38.22 | 40.50 | 42.73 | 44.96 | 47.33 | | | | | | | | |
| 80 | 12.78 | 17.75 | 22.02 | 25.97 | 29.69 | 33.23 | 36.56 | 39.72 | 42.72 | 45.58 | 48.32 | 50.90 | 53.25 | 55.23 | 56.67 | 57.27 | | | | | | | | |
| | 8.08 | 11.70 | 15.10 | 18.32 | 21.39 | 24.39 | 27.32 | 30.21 | 33.03 | 35.77 | 38.40 | 40.90 | 43.28 | 45.55 | 47.80 | 50.19 | | | | | | | | |
| 90 | 10.77 | 16.04 | 20.91 | 25.46 | 29.71 | 33.69 | 37.43 | 40.94 | 44.26 | 47.40 | 50.37 | 53.16 | 55.73 | 57.96 | 59.73 | 60.76 | | | | | | | | |
| | 5.84 | 10.41 | 14.57 | 18.43 | 22.03 | 25.43 | 28.69 | 31.83 | 34.88 | 37.82 | 40.63 | 43.28 | 45.78 | 48.16 | 50.49 | 52.89 | | | | | | | | |
| 100 | 7.65 | 14.04 | 19.75 | 24.95 | 29.74 | 34.18 | 38.33 | 42.20 | 45.83 | 49.25 | 52.48 | 55.53 | 58.38 | 60.98 | 63.22 | 64.93 | 65.76 | | | | | | | |
| | 3.53 | 8.96 | 13.94 | 18.44 | 22.52 | 26.29 | 29.84 | 33.24 | 36.50 | 39.64 | 42.66 | 45.52 | 48.23 | 50.80 | 53.29 | 55.78 | 58.46 | | | | | | | |
| 110 | 4.16 | 11.84 | 18.44 | 24.31 | 29.64 | 34.55 | 35.74 | 43.33 | 47.27 | 50.96 | 54.45 | 57.76 | 60.90 | 63.86 | 66.56 | 68.85 | 70.51 | | | | | | | |
| | 0.63 | 7.11 | 12.92 | 18.06 | 22.66 | 26.85 | 30.74 | 34.39 | 37.88 | 41.22 | 44.44 | 47.54 | 50.52 | 53.37 | 56.10 | 58.77 | 61.48 | | | | | | | |
| 120 | | 9.26 | 16.69 | 23.21 | 29.11 | 34.51 | 39.49 | 44.09 | 48.38 | 52.38 | 56.15 | 59.74 | 63.15 | 66.40 | 69.48 | 72.27 | 74.60 | 76.22 | | | | | | |
| | | 4.94 | 11.41 | 17.22 | 22.46 | 27.21 | 31.53 | 35.52 | 39.27 | 42.83 | 46.26 | 49.57 | 52.77 | 55.86 | 58.84 | 61.70 | 64.52 | 67.41 | | | | | | |
| 130 | | 6.20 | 14.38 | 21.73 | 28.29 | 34.17 | 39.52 | 44.46 | 49.08 | 53.42 | 57.54 | 61.44 | 65.15 | 68.66 | 72.01 | 75.17 | 78.05 | 80.45 | 82.07 | | | | | |
| | | 2.46 | 9.88 | 16.68 | 22.74 | 28.11 | 32.92 | 37.31 | 41.38 | 45.20 | 48.81 | 52.24 | 55.51 | 58.66 | 61.70 | 64.64 | 67.52 | 70.39 | 73.42 | | | | | |
| 140 | | | 12.18 | 20.50 | 27.75 | 34.15 | 39.86 | 45.07 | 49.92 | 54.51 | 58.86 | 62.98 | 66.95 | 70.76 | 74.38 | 77.79 | 81.00 | 83.95 | 86.42 | 88.12 | | | | |
| | | | 7.92 | 15.62 | 22.37 | 28.31 | 33.62 | 38.45 | 42.93 | 47.15 | 51.10 | 54.79 | 58.32 | 61.69 | 64.84 | 67.82 | 70.68 | 73.50 | 76.32 | 79.39 | | | | |
| 150 | | | 9.49 | 18.61 | 26.70 | 33.91 | 40.33 | 46.07 | 51.27 | 56.08 | 60.64 | 65.05 | 69.31 | 73.35 | 77.14 | 80.70 | 84.09 | 87.19 | 90.05 | 92.50 | 94.28 | | | |
| | | | 5.44 | 13.84 | 21.35 | 28.03 | 33.96 | 39.26 | 44.08 | 48.55 | 52.81 | 56.91 | 60.84 | 64.57 | 68.03 | 71.32 | 74.34 | 77.03 | 79.85 | 82.32 | 85.23 | | | |
| 160 | | | | 16.78 | 25.83 | 33.79 | 40.83 | 47.10 | 52.76 | 57.94 | 62.77 | 67.35 | 71.78 | 76.09 | 80.20 | 83.99 | 87.45 | 90.71 | 93.83 | 96.50 | 98.67 | 100.40 | | |
| | | | | 12.10 | 20.42 | 27.73 | 34.21 | 40.04 | 45.34 | 50.23 | 54.80 | 59.15 | 63.35 | 67.39 | 71.18 | 74.66 | 77.82 | 80.83 | 83.72 | 86.10 | 88.36 | 90.92 | | |
| 170 | | | | 15.04 | 25.01 | 33.66 | 41.21 | 47.89 | 53.93 | 59.47 | 64.63 | 69.51 | 74.19 | 78.74 | 83.15 | 87.27 | 91.01 | 94.32 | 97.29 | 100.13 | 102.75 | 104.97 | 106.49 | |
| | | | | 10.47 | 23.52 | 27.45 | 34.42 | 40.66 | 46.33 | 51.56 | 56.46 | 61.10 | 65.61 | 70.00 | 74.16 | 77.98 | 81.42 | 84.46 | 87.17 | 89.80 | 92.26 | 94.47 | 96.55 | |
| 180 | | | | 12.73 | 23.99 | 33.38 | 41.45 | 48.52 | 54.88 | 60.73 | 66.19 | 71.35 | 76.29 | 81.06 | 85.74 | 90.22 | 94.25 | 97.82 | 100.94 | 103.66 | 106.12 | 108.38 | 110.26 | 111.62 |
| | | | | 8.58 | 18.70 | 27.22 | 34.68 | 41.30 | 47.27 | 52.77 | 57.94 | 62.86 | 67.57 | 72.14 | 76.65 | 80.90 | 84.67 | 87.99 | 90.88 | 93.38 | 95.67 | 97.86 | 99.83 | 101.64 |
| 190 | | | | | 22.59 | 33.07 | 41.78 | 49.23 | 55.85 | 61.93 | 67.61 | 72.98 | 78.15 | 83.14 | 87.95 | 92.63 | 97.00 | 100.81 | 104.10 | 106.95 | 109.38 | 111.42 | 113.18 | 114.53 |
| | | | | | 17.71 | 27.25 | 35.21 | 42.12 | 48.34 | 54.07 | 59.44 | 64.61 | 69.63 | 74.44 | 79.03 | 83.47 | 87.61 | 91.20 | 94.28 | 96.96 | 99.27 | 101.27 | 103.19 | 104.98 |

(mm)

DIAMETER $D = 400$
HEIGHT $h = 112$ ($eu = 112$, $ed = 106.4$, $fu = 3$, $fd = 0$)
EXPANSION ANGLE $\lambda = 120$
BOSS RATIO $\nu = 0.275$

TABLE 115

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 143-146,
Replace Table 116 with the following:

EMBODIMENT 34

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 46.97 | | | 19.01 | 21.50 | 23.85 | 26.14 | 28.42 | 30.67 | 32.87 | 34.99 | 37.05 | 39.04 | 40.92 | 42.69 | 44.27 | 45.60 | 46.50 | 46.78 | | | | | | |
| | | | 16.78 | 18.42 | 20.09 | 21.77 | 23.45 | 25.17 | 26.97 | 28.84 | 30.77 | 32.71 | 34.64 | 36.53 | 38.40 | 40.25 | 42.20 | 44.41 | | | | | | |
| 54.9 | | 14.64 | 17.96 | 20.98 | 23.84 | 26.59 | 29.24 | 31.75 | 34.17 | 36.49 | 38.73 | 40.86 | 42.85 | 44.58 | 45.88 | 46.51 | | | | | | | | |
| | | 12.63 | 15.03 | 17.38 | 19.69 | 22.00 | 24.32 | 26.68 | 29.04 | 31.39 | 33.69 | 35.92 | 38.07 | 40.16 | 42.26 | 44.49 | | | | | | | | |
| 62.83 | 8.73 | 13.17 | 16.98 | 20.51 | 23.83 | 26.99 | 29.97 | 32.78 | 35.46 | 38.02 | 40.46 | 42.77 | 44.87 | 46.64 | 47.92 | 48.45 | | | | | | | | |
| | 7.59 | 11.00 | 14.20 | 17.22 | 20.11 | 22.92 | 25.68 | 28.39 | 31.04 | 33.62 | 36.09 | 38.44 | 40.67 | 42.81 | 44.93 | 47.17 | | | | | | | | |
| 70.76 | 6.94 | 11.64 | 15.99 | 20.05 | 23.85 | 27.40 | 30.74 | 33.88 | 36.84 | 39.65 | 42.30 | 44.79 | 47.08 | 49.07 | 50.65 | 51.57 | | | | | | | | |
| | 5.49 | 9.79 | 13.70 | 17.32 | 20.70 | 23.90 | 26.96 | 29.92 | 32.78 | 35.54 | 38.18 | 40.68 | 43.03 | 45.26 | 47.45 | 49.71 | | | | | | | | |
| 78.69 | 4.15 | 9.85 | 14.98 | 19.59 | 23.87 | 27.84 | 31.54 | 35.00 | 38.24 | 41.30 | 44.18 | 46.90 | 49.45 | 51.77 | 53.77 | 55.30 | 56.04 | | | | | | | |
| | 3.32 | 8.42 | 13.10 | 17.33 | 21.16 | 24.71 | 28.05 | 31.24 | 34.30 | 37.26 | 40.09 | 42.78 | 45.33 | 47.75 | 50.09 | 52.42 | 54.94 | | | | | | | |
| 86.62 | 1.04 | 7.89 | 13.79 | 19.02 | 23.79 | 28.17 | 29.24 | 36.01 | 39.53 | 42.82 | 45.94 | 48.89 | 51.69 | 54.34 | 56.75 | 58.80 | 60.28 | | | | | | | |
| | 0.59 | 6.68 | 12.14 | 16.98 | 21.30 | 25.24 | 28.89 | 32.33 | 35.60 | 38.74 | 41.77 | 44.68 | 47.48 | 50.16 | 52.73 | 55.24 | 57.78 | | | | | | | |
| 94.55 | | 5.59 | 12.22 | 18.05 | 23.31 | 28.13 | 32.58 | 36.69 | 40.52 | 44.09 | 47.46 | 50.66 | 53.70 | 56.61 | 59.36 | 61.85 | 63.93 | 65.37 | | | | | | |
| | | 4.64 | 10.72 | 16.18 | 21.11 | 25.57 | 29.63 | 33.39 | 36.91 | 40.26 | 43.48 | 46.59 | 49.60 | 52.50 | 55.30 | 57.99 | 60.64 | 63.35 | | | | | | |
| 102.5 | | 2.86 | 10.16 | 16.72 | 22.58 | 27.83 | 32.61 | 37.02 | 41.14 | 45.02 | 48.69 | 52.18 | 55.49 | 58.63 | 61.61 | 64.44 | 67.01 | 69.16 | 70.60 | | | | | |
| | | 2.31 | 9.29 | 15.68 | 21.37 | 26.42 | 30.94 | 35.07 | 38.89 | 42.48 | 45.87 | 49.10 | 52.17 | 55.13 | 57.99 | 60.76 | 63.46 | 66.15 | 69.00 | | | | | |
| 110.4 | | | 8.20 | 15.63 | 22.10 | 27.81 | 32.91 | 37.56 | 41.89 | 45.99 | 49.88 | 53.55 | 57.10 | 60.50 | 63.73 | 66.77 | 69.65 | 72.27 | 74.48 | 76.00 | | | | |
| | | | 7.44 | 14.68 | 21.02 | 26.61 | 31.60 | 36.13 | 40.35 | 44.31 | 48.03 | 51.49 | 54.82 | 57.98 | 60.94 | 63.74 | 66.43 | 69.08 | 71.73 | 74.62 | | | | |
| 118.3 | | | 5.79 | 13.93 | 21.16 | 27.60 | 33.33 | 38.46 | 43.10 | 47.39 | 51.47 | 55.41 | 59.20 | 62.82 | 66.19 | 69.38 | 72.40 | 75.17 | 77.73 | 79.91 | 81.50 | | | |
| | | | 5.12 | 13.01 | 20.07 | 26.34 | 31.92 | 36.90 | 41.43 | 45.63 | 49.64 | 53.49 | 57.18 | 60.68 | 63.94 | 67.03 | 69.87 | 72.40 | 74.86 | 77.37 | 80.11 | | | |
| 126.3 | | | | 12.31 | 20.39 | 27.49 | 33.78 | 39.37 | 44.42 | 49.05 | 53.37 | 57.45 | 61.41 | 65.26 | 68.93 | 72.31 | 75.40 | 78.31 | 81.10 | 83.48 | 85.42 | 86.96 | | |
| | | | | 11.37 | 19.19 | 26.06 | 32.16 | 37.63 | 42.61 | 47.21 | 51.51 | 55.59 | 59.54 | 63.33 | 66.90 | 70.17 | 73.14 | 75.97 | 78.68 | 80.92 | 83.04 | 85.45 | | |
| 134.2 | | | | 10.75 | 19.65 | 27.37 | 34.12 | 40.08 | 45.47 | 50.42 | 55.02 | 59.38 | 63.56 | 67.62 | 71.56 | 75.24 | 78.58 | 81.54 | 84.19 | 86.73 | 89.06 | 91.04 | 92.41 | |
| | | | | 9.84 | 22.10 | 25.80 | 32.35 | 38.22 | 43.55 | 48.46 | 53.06 | 57.43 | 61.66 | 65.79 | 69.70 | 73.29 | 76.53 | 79.38 | 81.93 | 84.40 | 86.71 | 88.79 | 90.75 | |
| 142.1 | | | | 8.69 | 18.74 | 27.12 | 34.33 | 40.65 | 46.32 | 51.54 | 56.42 | 61.03 | 65.43 | 69.70 | 73.88 | 77.87 | 81.48 | 84.66 | 87.45 | 89.88 | 92.07 | 94.09 | 95.77 | 96.98 |
| | | | | 8.07 | 17.58 | 25.58 | 32.60 | 38.81 | 44.42 | 49.59 | 54.45 | 59.08 | 63.51 | 67.80 | 72.04 | 76.03 | 79.58 | 82.70 | 85.41 | 87.76 | 89.92 | 91.97 | 93.82 | 95.53 |
| 150.1 | | | | | 17.49 | 26.85 | 34.62 | 41.27 | 47.19 | 52.62 | 57.68 | 62.48 | 67.10 | 71.55 | 75.85 | 80.02 | 83.93 | 87.33 | 90.27 | 92.81 | 94.98 | 96.80 | 98.38 | 99.58 |
| | | | | | 16.65 | 25.61 | 33.10 | 39.58 | 45.43 | 50.82 | 55.87 | 60.72 | 65.44 | 69.96 | 74.28 | 78.45 | 82.34 | 85.71 | 88.61 | 91.13 | 93.30 | 95.18 | 96.98 | 98.67 |

(mm)

DIAMETER D= 316
HEIGHT h= 100
EXPANSION ANGLE $\lambda$ = 120
BOSS RATIO $\nu$ = 0.272

TABLE 116

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

<u>Columns 147-150,</u>
Replace Table 117 with the following:

EMBODIMENT 35

| r (mm) \ θ (deg) | 3.75 | 7.5 | 11.25 | 15 | 18.75 | 22.5 | 26.25 | 30 | 33.75 | 37.5 | 41.25 | 45 | 48.75 | 52.5 | 56.25 | 60 | 63.75 | 67.5 | 71.25 | 75 | 78.75 | 82.5 | 86.25 | 90 |
|---|---|---|---|---|---|---|---|---|---|---|---|---|---|---|---|---|---|---|---|---|---|---|---|---|
| 46.97 | | | 19.01 | 21.50 | 23.85 | 26.14 | 28.42 | 30.67 | 32.87 | 34.99 | 37.05 | 39.04 | 40.92 | 42.69 | 44.27 | 45.60 | 46.50 | 46.78 | | | | | | |
| | | | 16.78 | 18.42 | 20.09 | 21.77 | 23.45 | 25.17 | 26.97 | 28.84 | 30.77 | 32.71 | 34.64 | 36.53 | 38.40 | 40.25 | 42.20 | 44.41 | | | | | | |
| 54.9 | | 14.64 | 17.96 | 20.98 | 23.84 | 26.59 | 29.24 | 31.75 | 34.17 | 36.49 | 38.73 | 40.86 | 42.85 | 44.58 | 45.88 | 46.51 | | | | | | | | |
| | | 12.63 | 15.03 | 17.38 | 19.69 | 22.00 | 24.32 | 26.68 | 29.04 | 31.39 | 33.69 | 35.92 | 38.07 | 40.16 | 42.26 | 44.49 | | | | | | | | |
| 62.83 | 8.73 | 13.17 | 16.98 | 20.51 | 23.83 | 26.99 | 29.97 | 32.78 | 35.46 | 38.02 | 40.46 | 42.77 | 44.87 | 46.64 | 47.92 | 48.45 | | | | | | | | |
| | 7.59 | 11.00 | 14.20 | 17.22 | 20.11 | 22.92 | 25.68 | 28.39 | 31.04 | 33.62 | 36.09 | 38.44 | 40.67 | 42.81 | 44.83 | 47.17 | | | | | | | | |
| 70.76 | 6.94 | 11.64 | 15.99 | 20.05 | 23.85 | 27.40 | 30.74 | 33.88 | 36.84 | 39.65 | 42.30 | 44.79 | 47.08 | 49.07 | 50.65 | 51.57 | | | | | | | | |
| | 5.49 | 9.79 | 13.70 | 17.32 | 20.70 | 23.90 | 26.96 | 29.92 | 32.78 | 35.54 | 38.18 | 40.68 | 43.03 | 45.26 | 47.45 | 49.71 | | | | | | | | |
| 78.69 | 4.15 | 9.85 | 14.96 | 19.59 | 23.87 | 27.84 | 31.54 | 35.00 | 38.24 | 41.30 | 44.18 | 46.90 | 49.45 | 51.77 | 53.77 | 55.30 | 56.04 | | | | | | | |
| | 3.32 | 8.42 | 13.10 | 17.33 | 21.16 | 24.71 | 28.05 | 31.24 | 34.30 | 37.26 | 40.09 | 42.78 | 45.33 | 47.75 | 50.09 | 52.42 | 54.94 | | | | | | | |
| 86.62 | 1.04 | 7.89 | 13.79 | 19.02 | 23.79 | 28.17 | 29.24 | 36.01 | 39.53 | 42.82 | 45.94 | 48.89 | 51.69 | 54.34 | 56.75 | 58.80 | 60.28 | | | | | | | |
| | 0.59 | 6.68 | 12.14 | 16.98 | 21.30 | 25.24 | 28.89 | 32.33 | 35.60 | 38.74 | 41.77 | 44.68 | 47.48 | 50.16 | 52.73 | 55.24 | 57.78 | | | | | | | |
| 94.55 | | 5.59 | 12.22 | 18.05 | 23.31 | 28.13 | 32.58 | 36.69 | 40.52 | 44.09 | 47.46 | 50.66 | 53.70 | 56.61 | 59.36 | 61.85 | 63.93 | 65.37 | | | | | | |
| | | 4.64 | 10.72 | 16.18 | 21.11 | 25.57 | 29.63 | 33.39 | 36.91 | 40.26 | 43.48 | 46.59 | 49.60 | 52.50 | 55.30 | 57.99 | 60.64 | 63.35 | | | | | | |
| 102.5 | | 2.86 | 10.16 | 16.72 | 22.58 | 27.83 | 32.61 | 37.02 | 41.14 | 45.02 | 48.69 | 52.18 | 55.49 | 58.63 | 61.61 | 64.44 | 67.01 | 69.16 | 70.60 | | | | | |
| | | 2.31 | 9.29 | 15.68 | 21.37 | 26.42 | 30.94 | 35.07 | 38.89 | 42.48 | 45.87 | 49.10 | 52.17 | 55.13 | 57.99 | 60.76 | 63.46 | 66.15 | 69.00 | | | | | |
| 110.4 | | | 8.20 | 15.63 | 22.10 | 27.81 | 32.91 | 37.56 | 41.89 | 45.99 | 49.88 | 53.55 | 57.10 | 60.50 | 63.73 | 66.77 | 69.65 | 72.27 | 74.48 | 76.00 | | | | |
| | | | 7.44 | 14.68 | 21.02 | 26.61 | 31.60 | 36.13 | 40.35 | 44.31 | 48.03 | 51.49 | 54.82 | 57.98 | 60.94 | 63.74 | 66.43 | 69.08 | 71.73 | 74.62 | | | | |
| 118.3 | | | 5.79 | 13.93 | 21.16 | 27.60 | 33.33 | 38.46 | 43.10 | 47.39 | 51.47 | 55.41 | 59.20 | 62.82 | 66.19 | 69.38 | 72.40 | 75.17 | 77.73 | 79.91 | 81.50 | | | |
| | | | 5.12 | 13.01 | 20.07 | 26.34 | 31.92 | 36.90 | 41.43 | 45.63 | 49.64 | 53.49 | 57.18 | 60.68 | 63.94 | 67.03 | 69.87 | 72.40 | 74.86 | 77.37 | 80.11 | | | |
| 126.3 | | | | 12.31 | 20.39 | 27.49 | 33.78 | 39.37 | 44.42 | 49.05 | 53.37 | 57.45 | 61.41 | 65.26 | 68.93 | 72.31 | 75.40 | 78.31 | 81.10 | 83.48 | 85.42 | 86.96 | | |
| | | | | 11.37 | 19.19 | 26.06 | 32.16 | 37.63 | 42.61 | 47.21 | 51.51 | 55.59 | 59.54 | 63.33 | 66.90 | 70.17 | 73.14 | 75.97 | 78.68 | 80.92 | 83.04 | 85.45 | | |
| 134.2 | | | | 10.75 | 19.65 | 27.37 | 34.12 | 40.08 | 45.47 | 50.42 | 55.02 | 59.38 | 63.56 | 67.62 | 71.56 | 75.24 | 78.58 | 81.54 | 84.19 | 86.73 | 89.06 | 91.04 | 92.41 | |
| | | | | 9.84 | 22.10 | 25.80 | 32.35 | 38.22 | 43.55 | 48.46 | 53.06 | 57.43 | 61.66 | 65.79 | 69.70 | 73.29 | 76.53 | 79.38 | 81.93 | 84.40 | 86.71 | 88.79 | 90.75 | |
| 142.1 | | | | 8.69 | 18.74 | 27.12 | 34.33 | 40.65 | 46.32 | 51.54 | 56.42 | 61.03 | 65.43 | 69.70 | 73.88 | 77.87 | 81.48 | 84.66 | 87.45 | 89.88 | 92.07 | 94.09 | 95.77 | 96.98 |
| | | | | 8.07 | 17.58 | 25.58 | 32.60 | 38.81 | 44.42 | 48.59 | 54.45 | 59.08 | 63.51 | 67.80 | 72.04 | 76.03 | 79.58 | 82.70 | 85.41 | 87.76 | 89.92 | 91.97 | 93.82 | 95.53 |
| 150.1 | | | | | 17.49 | 26.85 | 34.62 | 41.27 | 47.19 | 52.62 | 57.68 | 62.48 | 67.10 | 71.55 | 75.85 | 80.02 | 83.93 | 87.33 | 90.27 | 92.81 | 94.98 | 96.80 | 98.38 | 99.58 |
| | | | | | 16.65 | 25.61 | 33.10 | 39.58 | 45.43 | 50.82 | 55.87 | 60.72 | 65.44 | 69.96 | 74.28 | 78.45 | 82.34 | 85.71 | 88.61 | 91.13 | 93.30 | 95.18 | 96.98 | 96.67 |

DIAMETER D= 316
HEIGHT h= 100
EXPANSION ANGLE $\lambda$ = 90
BOSS RATIO $\nu$ = 0.272

TABLE 117

UNITED STATES PATENT AND TRADEMARK OFFICE
CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

<u>Columns 149-152,</u>
Replace Table 118 with the following:

EMBODIMENT 36

| θ (deg) / r (mm) | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 |
|---|---|---|---|---|---|---|---|---|---|---|---|---|---|---|---|---|---|---|---|---|---|---|---|---|
| 46.97 | | | 19.01 | 21.50 | 23.85 | 26.14 | 28.42 | 30.67 | 32.87 | 34.99 | 37.05 | 39.04 | 40.92 | 42.69 | 44.27 | 45.60 | 46.50 | 46.78 | | | | | | |
| | | | 16.78 | 18.42 | 20.09 | 21.77 | 23.45 | 25.17 | 26.97 | 28.84 | 30.77 | 32.71 | 34.64 | 36.53 | 38.40 | 40.25 | 42.20 | 44.41 | | | | | | |
| 54.9 | | 14.64 | 17.96 | 20.98 | 23.84 | 26.59 | 28.24 | 31.75 | 34.17 | 36.49 | 38.73 | 40.86 | 42.85 | 44.58 | 45.88 | 46.51 | | | | | | | | |
| | | 12.63 | 15.03 | 17.38 | 19.69 | 22.00 | 24.32 | 26.68 | 29.04 | 31.39 | 33.69 | 35.92 | 38.07 | 40.16 | 42.26 | 44.49 | | | | | | | | |
| 62.83 | 8.73 | 13.17 | 16.98 | 20.51 | 23.83 | 26.99 | 29.97 | 32.78 | 35.46 | 38.02 | 40.46 | 42.77 | 44.87 | 46.64 | 47.92 | 48.45 | | | | | | | | |
| | 7.59 | 11.00 | 14.20 | 17.22 | 20.11 | 22.92 | 25.68 | 28.39 | 31.04 | 33.62 | 36.09 | 38.44 | 40.67 | 42.81 | 44.93 | 47.17 | | | | | | | | |
| 70.76 | 6.94 | 11.64 | 15.99 | 20.05 | 23.85 | 27.40 | 30.74 | 33.88 | 36.84 | 39.65 | 42.30 | 44.79 | 47.08 | 49.07 | 50.65 | 51.57 | | | | | | | | |
| | 5.49 | 9.79 | 13.70 | 17.32 | 20.70 | 23.90 | 26.96 | 29.92 | 32.78 | 35.54 | 38.18 | 40.68 | 43.03 | 45.26 | 47.45 | 49.71 | | | | | | | | |
| 78.69 | 4.15 | 9.85 | 14.96 | 19.59 | 23.87 | 27.84 | 31.54 | 35.00 | 38.24 | 41.30 | 44.18 | 46.90 | 49.45 | 51.77 | 53.77 | 55.30 | 56.04 | | | | | | | |
| | 3.32 | 8.42 | 13.10 | 17.33 | 21.16 | 24.71 | 28.05 | 31.24 | 34.30 | 37.26 | 40.09 | 42.78 | 45.33 | 47.75 | 50.09 | 52.42 | 54.94 | | | | | | | |
| 86.62 | 1.04 | 7.89 | 13.79 | 19.02 | 23.79 | 28.17 | 29.24 | 36.01 | 39.53 | 42.82 | 45.94 | 48.89 | 51.69 | 54.34 | 56.75 | 58.80 | 60.28 | | | | | | | |
| | 0.59 | 6.68 | 12.14 | 16.98 | 21.30 | 25.24 | 28.89 | 32.33 | 35.60 | 38.74 | 41.77 | 44.68 | 47.48 | 50.16 | 52.73 | 55.24 | 57.78 | | | | | | | |
| 94.55 | | 5.59 | 12.22 | 18.05 | 23.31 | 28.13 | 32.58 | 36.69 | 40.52 | 44.09 | 47.46 | 50.66 | 53.70 | 56.61 | 59.36 | 61.85 | 63.93 | 65.37 | | | | | | |
| | | 4.64 | 10.72 | 16.18 | 21.11 | 25.57 | 29.63 | 33.39 | 36.91 | 40.26 | 43.48 | 46.59 | 49.60 | 52.50 | 55.30 | 57.99 | 60.64 | 63.35 | | | | | | |
| 102.5 | | 2.86 | 10.16 | 16.72 | 22.58 | 27.83 | 32.61 | 37.02 | 41.14 | 45.02 | 48.69 | 52.18 | 55.49 | 58.63 | 61.61 | 64.44 | 67.01 | 69.16 | 70.60 | | | | | |
| | | 2.31 | 9.29 | 15.68 | 21.37 | 26.42 | 30.94 | 35.07 | 38.89 | 42.48 | 45.87 | 49.10 | 52.17 | 55.13 | 57.99 | 60.76 | 63.46 | 66.15 | 69.00 | | | | | |
| 110.4 | | | 8.20 | 15.63 | 22.10 | 27.81 | 32.91 | 37.56 | 41.89 | 45.99 | 49.88 | 53.55 | 57.10 | 60.50 | 63.73 | 66.77 | 69.65 | 72.27 | 74.48 | 76.00 | | | | |
| | | | 7.44 | 14.68 | 21.02 | 26.61 | 31.60 | 36.13 | 40.35 | 44.31 | 48.03 | 51.49 | 54.82 | 57.98 | 60.94 | 63.74 | 66.43 | 69.08 | 71.73 | 74.62 | | | | |
| 118.3 | | | 5.79 | 13.93 | 21.16 | 27.60 | 33.33 | 38.46 | 43.10 | 47.39 | 51.47 | 55.41 | 59.20 | 62.82 | 66.19 | 69.38 | 72.40 | 75.17 | 77.73 | 79.91 | 81.50 | | | |
| | | | 5.12 | 13.01 | 20.07 | 26.34 | 31.92 | 36.90 | 41.43 | 45.63 | 49.64 | 53.49 | 57.18 | 60.68 | 63.94 | 67.03 | 69.87 | 72.40 | 74.86 | 77.37 | 80.11 | | | |
| 126.3 | | | | 12.31 | 20.39 | 27.49 | 33.78 | 39.37 | 44.42 | 49.05 | 53.37 | 57.45 | 61.41 | 65.26 | 68.93 | 72.31 | 75.40 | 78.31 | 81.10 | 83.48 | 85.42 | 86.96 | | |
| | | | | 11.37 | 19.19 | 26.06 | 32.16 | 37.63 | 42.61 | 47.21 | 51.51 | 55.59 | 59.54 | 63.33 | 66.90 | 70.17 | 73.14 | 75.97 | 78.68 | 80.92 | 83.04 | 85.45 | | |
| 134.2 | | | | 10.75 | 19.65 | 27.37 | 34.12 | 40.08 | 45.47 | 50.42 | 55.02 | 59.38 | 63.56 | 67.62 | 71.56 | 75.24 | 78.58 | 81.54 | 84.19 | 86.73 | 89.06 | 91.04 | 92.41 | |
| | | | | 9.84 | 22.10 | 25.80 | 32.35 | 38.22 | 43.55 | 48.46 | 53.06 | 57.43 | 61.66 | 65.79 | 69.70 | 73.29 | 76.53 | 79.38 | 81.93 | 84.40 | 86.71 | 88.79 | 90.75 | |
| 142.1 | | | | 8.69 | 18.74 | 27.12 | 34.33 | 40.65 | 46.32 | 51.54 | 56.42 | 61.03 | 65.43 | 69.70 | 73.88 | 77.87 | 81.48 | 84.66 | 87.45 | 89.88 | 92.07 | 94.09 | 95.77 | 96.98 |
| | | | | 8.07 | 17.58 | 25.58 | 32.80 | 38.81 | 44.42 | 49.59 | 54.45 | 59.08 | 63.51 | 67.80 | 72.04 | 76.03 | 79.58 | 82.70 | 85.41 | 87.76 | 89.92 | 91.97 | 93.82 | 95.53 |
| 150.1 | | | | | 17.49 | 26.85 | 34.62 | 41.27 | 47.19 | 52.62 | 57.68 | 62.48 | 67.10 | 71.55 | 75.85 | 80.02 | 83.93 | 87.33 | 90.27 | 92.81 | 94.98 | 96.80 | 98.38 | 99.58 |
| | | | | | 16.65 | 25.61 | 33.10 | 39.58 | 45.43 | 50.82 | 55.87 | 60.72 | 65.44 | 69.96 | 74.28 | 78.45 | 82.34 | 85.71 | 88.61 | 91.13 | 93.30 | 95.18 | 96.98 | 98.67 |

DIAMETER $D = 316$
HEIGHT $h = 100$
EXPANSION ANGLE $\lambda = 72$
BOSS RATIO $\nu = 0.272$

TABLE 118

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 153-156
Replace Table 119 with the following:

EMBODIMENT 37

| θ / r | 4.521 | 9.042 | 13.56 | 18.08 | 22.6 | 27.13 | 31.65 | 36.17 | 40.69 | 45.21 | 49.73 | 54.25 | 58.77 | 63.29 | 67.81 | 72.33 | 76.85 | 81.38 | 85.9 | 90.42 | 94.94 | 99.46 | 104 | 108.5 (deg) |
|---|---|---|---|---|---|---|---|---|---|---|---|---|---|---|---|---|---|---|---|---|---|---|---|---|
| 46.97 | | | 19.01 | 21.50 | 23.85 | 26.14 | 28.42 | 30.67 | 32.87 | 34.99 | 37.05 | 39.04 | 40.92 | 42.69 | 44.27 | 45.60 | 46.50 | 46.78 | | | | | | |
| | | | 16.78 | 18.42 | 20.09 | 21.77 | 23.45 | 25.17 | 26.97 | 28.84 | 30.77 | 32.71 | 34.64 | 36.53 | 38.40 | 40.25 | 42.20 | 44.41 | | | | | | |
| 54.9 | | 14.64 | 17.96 | 20.98 | 23.84 | 26.59 | 29.24 | 31.75 | 34.17 | 36.49 | 38.73 | 40.86 | 42.85 | 44.58 | 45.88 | 46.51 | | | | | | | | |
| | | 12.63 | 15.03 | 17.38 | 19.69 | 22.00 | 24.32 | 26.68 | 29.04 | 31.39 | 33.69 | 35.92 | 38.07 | 40.16 | 42.26 | 44.49 | | | | | | | | |
| 62.83 | 8.73 | 13.17 | 16.98 | 20.51 | 23.83 | 26.99 | 29.97 | 32.78 | 35.46 | 38.02 | 40.46 | 42.77 | 44.87 | 46.64 | 47.92 | 48.45 | | | | | | | | |
| | 7.59 | 11.00 | 14.20 | 17.22 | 20.11 | 22.92 | 25.68 | 28.39 | 31.04 | 33.62 | 36.09 | 38.44 | 40.67 | 42.81 | 44.93 | 47.17 | | | | | | | | |
| 70.76 | 6.94 | 11.64 | 15.99 | 20.05 | 23.85 | 27.40 | 30.74 | 33.88 | 36.84 | 39.65 | 42.30 | 44.79 | 47.08 | 49.07 | 50.85 | 51.57 | | | | | | | | |
| | 5.49 | 9.79 | 13.70 | 17.32 | 20.70 | 23.90 | 26.96 | 29.92 | 32.78 | 35.54 | 38.18 | 40.68 | 43.03 | 45.28 | 47.45 | 49.71 | | | | | | | | |
| 78.69 | 4.15 | 9.85 | 14.96 | 19.59 | 23.87 | 27.84 | 31.54 | 35.00 | 38.24 | 41.30 | 44.18 | 46.90 | 49.45 | 51.77 | 53.77 | 55.30 | 56.04 | | | | | | | |
| | 3.32 | 8.42 | 13.10 | 17.33 | 21.16 | 24.71 | 28.05 | 31.24 | 34.30 | 37.26 | 40.09 | 42.78 | 45.33 | 47.75 | 50.09 | 52.42 | 54.94 | | | | | | | |
| 86.62 | 1.04 | 7.89 | 13.79 | 19.02 | 23.79 | 28.17 | 29.24 | 36.01 | 39.53 | 42.82 | 45.94 | 48.89 | 51.69 | 54.34 | 56.75 | 58.80 | 60.28 | | | | | | | |
| | 0.59 | 6.68 | 12.14 | 16.98 | 21.30 | 25.24 | 28.89 | 32.33 | 35.60 | 38.74 | 41.77 | 44.68 | 47.48 | 50.16 | 52.73 | 55.24 | 57.78 | | | | | | | |
| 94.55 | | 5.59 | 12.22 | 18.05 | 23.31 | 28.13 | 32.58 | 36.69 | 40.52 | 44.09 | 47.46 | 50.66 | 53.70 | 56.81 | 59.36 | 61.85 | 63.93 | 65.37 | | | | | | |
| | | 4.64 | 10.72 | 16.18 | 21.11 | 25.57 | 29.63 | 33.39 | 36.91 | 40.26 | 43.48 | 46.59 | 49.60 | 52.50 | 55.30 | 57.99 | 60.64 | 63.35 | | | | | | |
| 102.5 | | 2.86 | 10.16 | 16.72 | 22.58 | 27.83 | 32.61 | 37.02 | 41.14 | 45.02 | 48.69 | 52.18 | 55.49 | 58.63 | 61.61 | 64.44 | 67.01 | 69.16 | 70.60 | | | | | |
| | | 2.31 | 9.29 | 15.68 | 21.37 | 26.42 | 30.94 | 35.07 | 38.89 | 42.48 | 45.87 | 49.10 | 52.17 | 55.13 | 57.99 | 60.76 | 63.46 | 66.15 | 69.00 | | | | | |
| 110.4 | | | 8.20 | 15.63 | 22.10 | 27.81 | 32.91 | 37.56 | 41.89 | 45.99 | 49.88 | 53.55 | 57.10 | 60.50 | 63.73 | 66.77 | 69.65 | 72.27 | 74.48 | 76.00 | | | | |
| | | | 7.44 | 14.68 | 21.02 | 26.61 | 31.80 | 36.13 | 40.35 | 44.31 | 48.03 | 51.49 | 54.82 | 57.98 | 60.94 | 63.74 | 66.43 | 69.08 | 71.73 | 74.82 | | | | |
| 118.3 | | | 5.79 | 13.93 | 21.16 | 27.60 | 33.33 | 38.46 | 43.10 | 47.39 | 51.47 | 55.41 | 59.20 | 62.82 | 66.19 | 69.38 | 72.40 | 75.17 | 77.73 | 79.91 | 81.50 | | | |
| | | | 5.12 | 13.01 | 20.07 | 26.34 | 31.92 | 36.90 | 41.43 | 45.63 | 49.64 | 53.49 | 57.18 | 60.68 | 63.94 | 67.03 | 69.87 | 72.40 | 74.86 | 77.37 | 80.11 | | | |
| 126.3 | | | | 12.31 | 20.39 | 27.49 | 33.78 | 39.37 | 44.42 | 49.05 | 53.37 | 57.45 | 61.41 | 65.26 | 68.93 | 72.31 | 75.40 | 78.31 | 81.10 | 83.48 | 85.42 | 86.96 | | |
| | | | | 11.37 | 19.19 | 26.06 | 32.16 | 37.63 | 42.61 | 47.21 | 51.51 | 55.59 | 59.54 | 63.33 | 66.90 | 70.17 | 73.14 | 75.97 | 78.68 | 80.92 | 83.04 | 85.45 | | |
| 134.2 | | | | 10.75 | 19.65 | 27.37 | 34.12 | 40.08 | 45.47 | 50.42 | 55.02 | 59.38 | 63.56 | 67.62 | 71.56 | 75.24 | 78.58 | 81.54 | 84.19 | 86.73 | 89.06 | 91.04 | 92.41 | |
| | | | | 9.84 | 22.10 | 25.80 | 32.35 | 38.22 | 43.55 | 48.46 | 53.06 | 57.43 | 61.68 | 65.79 | 69.70 | 73.29 | 76.53 | 79.38 | 81.93 | 84.40 | 86.71 | 88.79 | 90.75 | |
| 142.1 | | | | 8.69 | 18.74 | 27.12 | 34.33 | 40.65 | 46.32 | 51.54 | 56.42 | 61.03 | 65.43 | 69.70 | 73.88 | 77.87 | 81.48 | 84.66 | 87.45 | 89.88 | 92.07 | 94.09 | 95.77 | 96.98 |
| | | | | 8.07 | 17.58 | 25.58 | 32.60 | 38.81 | 44.42 | 49.59 | 54.45 | 59.08 | 63.51 | 67.80 | 72.04 | 76.03 | 79.58 | 82.70 | 85.41 | 87.76 | 89.92 | 91.97 | 93.82 | 95.53 |
| 150.1 | | | | | 17.49 | 26.85 | 34.62 | 41.27 | 47.19 | 52.62 | 57.68 | 62.48 | 67.10 | 71.55 | 75.85 | 80.02 | 83.93 | 87.33 | 90.27 | 92.81 | 94.98 | 96.80 | 98.38 | 99.58 |
| | | | | | 16.65 | 25.61 | 33.10 | 39.58 | 45.43 | 50.82 | 55.87 | 60.72 | 65.44 | 69.96 | 74.28 | 78.45 | 82.34 | 85.71 | 88.61 | 91.13 | 93.30 | 95.18 | 96.98 | 98.67 |

(mm)

DIAMETER D= 316
HEIGHT h= 100
EXPANSION ANGLE $\lambda$ = 108.5
BOSS RATIO $\nu$ = 0.272

TABLE 119

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 155-158,
Replace Table 120 with the following:

EMBODIMENT 38

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80.34 | | | 30.61 | 34.62 | 38.39 | 42.09 | 45.76 | 49.38 | 52.91 | 56.34 | 59.66 | 62.85 | 65.88 | 68.73 | 71.28 | 73.41 | 74.87 | 75.32 | | | | | | |
| | | | 27.01 | 29.65 | 32.35 | 35.05 | 37.75 | 40.53 | 43.42 | 46.44 | 49.53 | 52.67 | 55.77 | 58.82 | 61.82 | 64.81 | 67.95 | 71.50 | | | | | | |
| 91.03 | | 23.57 | 28.92 | 33.77 | 38.38 | 42.81 | 47.07 | 51.13 | 55.01 | 58.75 | 62.35 | 65.78 | 68.99 | 71.77 | 73.87 | 74.88 | | | | | | | | |
| | | 20.33 | 24.20 | 27.98 | 31.70 | 35.42 | 39.16 | 42.95 | 46.76 | 50.53 | 54.24 | 57.83 | 61.29 | 64.66 | 68.03 | 71.62 | | | | | | | | |
| 101.7 | 14.06 | 21.20 | 27.35 | 33.02 | 38.37 | 43.45 | 48.25 | 52.78 | 57.09 | 61.21 | 65.14 | 68.86 | 72.24 | 75.09 | 77.16 | 78.01 | | | | | | | | |
| | 12.22 | 17.71 | 22.85 | 27.72 | 32.37 | 36.90 | 41.35 | 45.71 | 49.98 | 54.12 | 58.11 | 61.89 | 65.48 | 68.92 | 72.33 | 75.95 | | | | | | | | |
| 112.4 | 11.17 | 18.75 | 25.74 | 32.29 | 38.40 | 44.12 | 49.49 | 54.54 | 59.31 | 63.83 | 68.10 | 72.11 | 75.79 | 79.00 | 81.55 | 83.03 | | | | | | | | |
| | 8.84 | 15.76 | 22.05 | 27.89 | 33.33 | 38.48 | 43.41 | 48.17 | 52.78 | 57.22 | 61.47 | 65.49 | 69.27 | 72.87 | 76.39 | 80.04 | | | | | | | | |
| 123.1 | 6.68 | 15.87 | 24.08 | 31.55 | 38.43 | 44.83 | 50.78 | 56.35 | 61.57 | 66.49 | 71.13 | 75.51 | 79.61 | 83.35 | 86.57 | 89.03 | 90.22 | | | | | | | |
| | 5.35 | 13.56 | 21.09 | 27.90 | 34.07 | 39.78 | 45.16 | 50.29 | 55.23 | 59.99 | 64.54 | 68.88 | 72.98 | 76.87 | 80.64 | 84.40 | 88.45 | | | | | | | |
| 133.8 | 1.67 | 12.71 | 22.20 | 30.63 | 38.29 | 45.35 | 47.07 | 57.97 | 63.64 | 68.95 | 73.96 | 78.71 | 83.22 | 87.49 | 91.37 | 94.66 | 97.05 | | | | | | | |
| | 0.95 | 10.76 | 19.55 | 27.33 | 34.29 | 40.63 | 46.51 | 52.04 | 57.32 | 62.38 | 67.25 | 71.94 | 76.44 | 80.75 | 84.89 | 88.93 | 93.03 | | | | | | | |
| 144.5 | | 8.99 | 19.68 | 29.05 | 37.53 | 45.30 | 52.45 | 59.07 | 65.23 | 70.99 | 76.41 | 81.56 | 86.46 | 91.14 | 95.57 | 99.57 | 102.93 | 105.25 | | | | | | |
| | | 7.47 | 17.27 | 26.05 | 33.99 | 41.17 | 47.71 | 53.75 | 59.42 | 64.82 | 70.00 | 75.01 | 79.85 | 84.53 | 89.03 | 93.36 | 97.62 | 102.00 | | | | | | |
| 155.2 | | 4.61 | 16.36 | 26.92 | 36.36 | 44.81 | 52.50 | 59.60 | 66.23 | 72.48 | 78.40 | 84.01 | 89.33 | 94.39 | 99.20 | 103.75 | 107.88 | 111.34 | 113.67 | | | | | |
| | | 3.73 | 14.95 | 25.24 | 34.40 | 42.54 | 49.82 | 56.46 | 62.62 | 68.40 | 73.86 | 79.04 | 84.00 | 88.76 | 93.36 | 97.82 | 102.17 | 106.51 | 111.09 | | | | | |
| 165.9 | | | 13.20 | 25.16 | 35.58 | 44.78 | 52.99 | 60.48 | 67.45 | 74.05 | 80.31 | 86.21 | 91.92 | 97.40 | 102.61 | 107.51 | 112.13 | 116.36 | 119.91 | 122.37 | | | | |
| | | | 11.98 | 23.64 | 33.85 | 42.84 | 50.87 | 58.17 | 64.96 | 71.34 | 77.32 | 82.90 | 88.25 | 93.34 | 98.12 | 102.61 | 106.95 | 111.21 | 115.49 | 120.14 | | | | |
| 176.6 | | | 9.33 | 22.43 | 34.07 | 44.43 | 53.66 | 61.91 | 69.39 | 76.30 | 82.86 | 89.20 | 95.31 | 101.13 | 106.57 | 111.70 | 116.56 | 121.02 | 125.14 | 128.65 | 131.22 | | | |
| | | | 8.24 | 20.94 | 32.31 | 42.41 | 51.38 | 59.41 | 66.70 | 73.47 | 79.92 | 86.11 | 92.07 | 97.70 | 102.94 | 107.92 | 112.49 | 116.56 | 120.52 | 124.56 | 128.97 | | | |
| 187.2 | | | | 19.81 | 32.82 | 44.26 | 54.38 | 63.39 | 71.52 | 78.98 | 85.92 | 92.60 | 98.88 | 105.07 | 110.97 | 116.43 | 121.39 | 126.08 | 130.56 | 134.40 | 137.53 | 140.01 | | |
| | | | | 18.31 | 30.90 | 41.96 | 51.77 | 60.59 | 68.61 | 76.01 | 82.92 | 89.51 | 95.86 | 101.96 | 107.71 | 112.97 | 117.75 | 122.31 | 126.87 | 130.29 | 133.70 | 137.58 | | |
| 197.9 | | | | 17.30 | 31.64 | 44.07 | 54.93 | 64.53 | 73.21 | 81.17 | 88.59 | 95.61 | 102.33 | 108.87 | 115.21 | 121.14 | 126.52 | 131.28 | 135.54 | 139.63 | 143.39 | 146.58 | 148.77 | |
| | | | | 15.84 | 35.58 | 41.54 | 52.09 | 61.53 | 70.11 | 78.02 | 85.43 | 92.46 | 99.28 | 105.92 | 112.22 | 117.99 | 123.21 | 127.80 | 131.91 | 135.88 | 139.60 | 142.95 | 146.10 | |
| 208.6 | | | | 13.99 | 30.18 | 43.67 | 55.28 | 65.44 | 74.58 | 82.98 | 90.83 | 98.25 | 105.35 | 112.21 | 118.94 | 125.38 | 131.18 | 136.30 | 140.80 | 144.70 | 148.24 | 151.49 | 154.19 | 156.13 |
| | | | | 12.99 | 28.30 | 41.19 | 52.48 | 62.49 | 71.52 | 79.85 | 87.67 | 95.12 | 102.25 | 109.16 | 115.98 | 122.41 | 128.12 | 133.14 | 137.52 | 141.30 | 144.76 | 148.08 | 151.05 | 153.80 |
| 219.3 | | | | | 28.16 | 43.23 | 55.74 | 66.45 | 75.97 | 84.72 | 92.87 | 100.59 | 108.03 | 115.20 | 122.12 | 128.84 | 135.12 | 140.60 | 145.33 | 149.43 | 152.92 | 155.85 | 158.39 | 160.32 |
| | | | | | 26.80 | 41.23 | 53.28 | 63.73 | 73.15 | 81.81 | 89.95 | 97.76 | 105.35 | 112.64 | 119.59 | 126.30 | 132.56 | 137.99 | 142.66 | 146.72 | 150.21 | 153.23 | 156.14 | 158.86 |

(mm)

DIAMETER D= 460
HEIGHT h= 161
EXPANSION ANGLE $\lambda$ = 120
BOSS RATIO $\nu$ = 0.326

TABLE 120

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 159-162,
Replace Table 121 with the following:

EMBODIMENT 39

| θ / r | 5.217 | 10.43 | 15.65 | 20.87 | 26.08 | 31.3 | 36.52 | 41.73 | 46.95 | 52.17 | 57.38 | 62.6 | 67.82 | 73.03 | 78.25 | 83.47 | 88.68 | 93.9 | 99.12 | 104.3 | 109.6 | 114.8 | 120 | 125.2 (deg) |
|---|---|---|---|---|---|---|---|---|---|---|---|---|---|---|---|---|---|---|---|---|---|---|---|---|
| 80.34 | | | 31.94 | 36.12 | 40.06 | 43.92 | 47.75 | 51.53 | 55.21 | 58.79 | 62.25 | 65.58 | 68.75 | 71.71 | 74.38 | 76.60 | 78.12 | 78.59 | | | | | | |
| | | | 28.19 | 30.94 | 33.75 | 36.57 | 39.39 | 42.29 | 45.31 | 48.45 | 51.69 | 54.96 | 58.20 | 61.38 | 64.51 | 67.63 | 70.90 | 74.61 | | | | | | |
| 91.03 | | 24.59 | 30.18 | 35.24 | 40.05 | 44.68 | 49.12 | 53.35 | 57.40 | 61.31 | 65.06 | 68.64 | 71.99 | 74.89 | 77.08 | 78.14 | | | | | | | | |
| | | 21.22 | 25.25 | 29.20 | 33.08 | 36.96 | 40.86 | 44.82 | 48.79 | 52.73 | 56.60 | 60.35 | 63.96 | 67.47 | 70.99 | 74.74 | | | | | | | | |
| 101.7 | 14.67 | 22.13 | 28.53 | 34.46 | 40.04 | 45.34 | 50.35 | 55.08 | 59.57 | 63.67 | 67.98 | 71.85 | 75.38 | 78.35 | 80.51 | 81.40 | | | | | | | | |
| | 12.75 | 18.48 | 23.85 | 28.92 | 33.78 | 38.51 | 43.14 | 47.69 | 52.15 | 56.48 | 60.63 | 64.59 | 68.33 | 71.92 | 75.47 | 79.25 | | | | | | | | |
| 112.4 | 11.65 | 19.56 | 26.86 | 33.69 | 40.06 | 46.03 | 51.64 | 56.91 | 61.89 | 66.60 | 71.06 | 75.24 | 79.09 | 82.44 | 85.09 | 86.64 | | | | | | | | |
| | 9.22 | 16.44 | 23.01 | 29.11 | 34.78 | 40.15 | 45.30 | 50.26 | 55.07 | 59.71 | 64.15 | 68.34 | 72.29 | 76.04 | 79.72 | 83.52 | | | | | | | | |
| 123.1 | 6.97 | 16.56 | 25.13 | 32.92 | 40.10 | 46.77 | 52.99 | 58.80 | 64.25 | 69.38 | 74.23 | 78.79 | 83.07 | 86.98 | 90.34 | 92.90 | 94.14 | | | | | | | |
| | 5.58 | 14.15 | 22.01 | 29.11 | 35.55 | 41.51 | 47.12 | 52.48 | 57.63 | 62.59 | 67.35 | 71.88 | 76.16 | 80.22 | 84.14 | 88.07 | 92.30 | | | | | | | |
| 133.8 | 1.74 | 13.26 | 23.16 | 31.96 | 39.96 | 47.32 | 49.12 | 60.49 | 66.40 | 71.94 | 77.17 | 82.14 | 86.84 | 91.29 | 95.34 | 98.78 | 101.27 | | | | | | | |
| | 0.99 | 11.23 | 20.40 | 28.52 | 35.78 | 42.40 | 48.53 | 54.31 | 59.81 | 65.09 | 70.18 | 75.07 | 79.77 | 84.26 | 88.58 | 92.80 | 97.08 | | | | | | | |
| 144.5 | | 9.38 | 20.53 | 30.32 | 39.16 | 47.27 | 54.73 | 61.64 | 68.07 | 74.07 | 79.73 | 85.10 | 90.22 | 95.10 | 99.72 | 103.90 | 107.40 | 109.82 | | | | | | |
| | | 7.80 | 18.02 | 27.19 | 35.47 | 42.96 | 49.79 | 56.09 | 62.01 | 67.63 | 73.04 | 78.27 | 83.33 | 88.21 | 92.90 | 97.42 | 101.87 | 106.43 | | | | | | |
| 155.2 | | 4.81 | 17.07 | 28.09 | 37.94 | 46.76 | 54.78 | 62.19 | 69.11 | 75.63 | 81.81 | 87.66 | 93.22 | 98.50 | 103.51 | 108.26 | 112.57 | 116.18 | 118.61 | | | | | |
| | | 3.89 | 15.60 | 26.34 | 35.90 | 44.39 | 51.98 | 58.91 | 65.34 | 71.37 | 77.07 | 82.48 | 87.65 | 92.62 | 97.42 | 102.07 | 106.61 | 111.14 | 115.92 | | | | | |
| 165.9 | | | 13.77 | 26.25 | 37.13 | 46.72 | 55.29 | 63.10 | 70.38 | 77.26 | 83.80 | 89.96 | 95.92 | 101.64 | 107.07 | 112.18 | 117.01 | 121.42 | 125.13 | 127.69 | | | | |
| | | | 12.50 | 24.67 | 35.32 | 44.71 | 53.08 | 60.70 | 67.79 | 74.44 | 80.68 | 86.50 | 92.09 | 97.40 | 102.38 | 107.08 | 111.60 | 116.05 | 120.51 | 125.36 | | | | |
| 176.6 | | | 9.73 | 23.41 | 35.55 | 46.36 | 55.99 | 64.61 | 72.40 | 79.61 | 86.47 | 93.08 | 99.46 | 105.53 | 111.21 | 116.56 | 121.63 | 126.29 | 130.58 | 134.24 | 136.92 | | | |
| | | | 8.60 | 21.85 | 33.71 | 44.26 | 53.62 | 62.00 | 69.60 | 76.66 | 83.39 | 89.86 | 96.07 | 101.94 | 107.42 | 112.61 | 117.38 | 121.63 | 125.76 | 129.98 | 134.58 | | | |
| 187.2 | | | | 20.68 | 34.25 | 46.19 | 56.75 | 66.15 | 74.63 | 82.41 | 89.66 | 96.52 | 103.18 | 109.64 | 115.79 | 121.49 | 126.67 | 131.56 | 136.24 | 140.24 | 143.51 | 146.09 | | |
| | | | | 19.10 | 32.24 | 43.79 | 54.02 | 63.22 | 71.59 | 79.32 | 86.53 | 93.40 | 100.03 | 106.40 | 112.39 | 117.86 | 122.87 | 127.62 | 132.18 | 135.95 | 139.51 | 143.56 | | |
| 197.9 | | | | 18.05 | 33.01 | 45.99 | 57.31 | 67.34 | 76.39 | 84.70 | 92.44 | 99.76 | 106.78 | 113.60 | 120.22 | 126.41 | 132.02 | 136.98 | 141.44 | 145.70 | 149.63 | 152.95 | 155.24 | |
| | | | | 16.53 | 37.13 | 43.35 | 54.35 | 64.21 | 73.16 | 81.41 | 89.15 | 96.48 | 103.59 | 110.53 | 117.10 | 123.12 | 128.56 | 133.36 | 137.64 | 141.78 | 145.67 | 149.17 | 152.45 | |
| 208.6 | | | | 14.60 | 31.49 | 45.57 | 57.68 | 68.29 | 77.82 | 86.59 | 94.78 | 102.52 | 109.93 | 117.09 | 124.11 | 130.83 | 136.88 | 142.23 | 146.92 | 150.99 | 154.68 | 158.08 | 160.90 | 162.92 |
| | | | | 13.55 | 29.53 | 42.98 | 54.76 | 65.20 | 74.63 | 83.32 | 91.48 | 99.26 | 106.70 | 113.91 | 121.02 | 127.73 | 133.69 | 138.93 | 143.49 | 147.44 | 151.06 | 154.51 | 157.62 | 160.49 |
| 219.3 | | | | | 29.39 | 45.11 | 58.17 | 69.34 | 79.28 | 88.40 | 96.91 | 104.98 | 112.72 | 120.21 | 127.43 | 134.44 | 141.00 | 146.72 | 151.65 | 155.92 | 159.57 | 162.63 | 165.27 | 167.29 |
| | | | | | 27.96 | 43.02 | 55.60 | 66.50 | 76.33 | 85.37 | 93.86 | 102.01 | 109.93 | 117.54 | 124.79 | 131.80 | 138.32 | 143.99 | 148.86 | 153.09 | 156.74 | 159.90 | 162.93 | 165.76 |

(mm)

DIAMETER D= 460
HEIGHT h= 168
EXPANSION ANGLE $\lambda$ = 125.2
BOSS RATIO $\nu$ = 0.326

TABLE 121

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 161-164,
Replace Table 122 with the following:

EMBODIMENT 40

| r \ θ | 4.346 | 8.692 | 13.04 | 17.38 | 21.73 | 26.08 | 30.42 | 34.77 | 39.11 | 43.46 | 47.8 | 52.15 | 56.5 | 60.84 | 65.19 | 69.53 | 73.88 | 78.23 | 82.57 | 86.92 | 91.26 | 95.61 | 99.95 | 104.3 (deg) |
|---|---|---|---|---|---|---|---|---|---|---|---|---|---|---|---|---|---|---|---|---|---|---|---|---|
| 80.34 | | | 26.62 | 30.10 | 33.38 | 36.60 | 39.79 | 42.94 | 46.01 | 48.99 | 51.88 | 54.65 | 57.29 | 59.76 | 61.98 | 63.83 | 65.10 | 65.49 | | | | | | |
| | | | 23.49 | 25.79 | 28.13 | 30.48 | 32.83 | 35.24 | 37.75 | 40.38 | 43.07 | 45.80 | 48.50 | 51.15 | 53.76 | 56.36 | 59.08 | 62.17 | | | | | | |
| 91.03 | | 20.50 | 25.15 | 29.37 | 33.38 | 37.23 | 40.93 | 44.46 | 47.83 | 51.09 | 54.22 | 57.20 | 59.99 | 62.41 | 64.24 | 65.12 | | | | | | | | |
| | | 17.68 | 21.04 | 24.33 | 27.57 | 30.80 | 34.05 | 37.35 | 40.86 | 43.94 | 47.17 | 50.29 | 53.30 | 56.23 | 59.16 | 62.28 | | | | | | | | |
| 101.7 | 12.22 | 18.44 | 23.78 | 28.72 | 33.36 | 37.78 | 41.95 | 45.90 | 49.64 | 53.23 | 56.65 | 59.87 | 62.82 | 65.29 | 67.09 | 67.84 | | | | | | | | |
| | 10.63 | 15.40 | 19.87 | 24.10 | 28.15 | 32.09 | 35.95 | 39.74 | 43.46 | 47.06 | 50.53 | 53.82 | 56.94 | 59.93 | 62.90 | 66.04 | | | | | | | | |
| 112.4 | 9.71 | 16.30 | 22.39 | 28.07 | 33.39 | 38.36 | 43.03 | 47.43 | 51.58 | 55.50 | 59.22 | 62.70 | 65.91 | 68.70 | 70.91 | 72.20 | | | | | | | | |
| | 7.69 | 13.70 | 19.17 | 24.25 | 28.98 | 33.46 | 37.75 | 41.89 | 45.89 | 49.76 | 53.46 | 56.95 | 60.24 | 63.37 | 66.43 | 69.60 | | | | | | | | |
| 123.1 | 5.81 | 13.80 | 20.94 | 27.43 | 33.42 | 38.98 | 44.16 | 49.00 | 53.54 | 57.82 | 61.86 | 65.66 | 69.23 | 72.48 | 75.28 | 77.42 | 78.45 | | | | | | | |
| | 4.65 | 11.79 | 18.34 | 24.26 | 29.63 | 34.59 | 39.27 | 43.73 | 48.03 | 52.16 | 56.13 | 59.90 | 63.46 | 66.85 | 70.12 | 73.39 | 76.92 | | | | | | | |
| 133.8 | 1.45 | 11.05 | 19.30 | 26.63 | 33.30 | 39.44 | 40.93 | 50.41 | 55.34 | 59.95 | 64.31 | 68.45 | 72.37 | 76.07 | 79.45 | 82.31 | 84.39 | | | | | | | |
| | 0.83 | 9.36 | 17.00 | 23.77 | 29.82 | 35.33 | 40.44 | 45.26 | 49.84 | 54.24 | 58.48 | 62.56 | 66.47 | 70.22 | 73.82 | 77.33 | 80.90 | | | | | | | |
| 144.5 | | 7.82 | 17.11 | 25.26 | 32.64 | 39.39 | 45.61 | 51.37 | 56.72 | 61.73 | 66.44 | 70.92 | 75.18 | 79.25 | 83.10 | 86.59 | 89.50 | 91.52 | | | | | | |
| | | 6.50 | 15.01 | 22.66 | 29.55 | 35.80 | 41.49 | 46.74 | 51.67 | 56.36 | 60.87 | 65.22 | 69.44 | 73.51 | 77.42 | 81.18 | 84.89 | 88.69 | | | | | | |
| 155.2 | | 4.01 | 14.23 | 23.41 | 31.62 | 38.97 | 45.65 | 51.83 | 57.60 | 63.03 | 68.17 | 73.05 | 77.68 | 82.08 | 86.26 | 90.21 | 93.81 | 96.82 | 98.84 | | | | | |
| | | 3.24 | 13.00 | 21.95 | 29.92 | 36.99 | 43.32 | 49.09 | 54.45 | 59.48 | 64.22 | 68.73 | 73.04 | 77.18 | 81.18 | 85.06 | 88.84 | 92.82 | 96.60 | | | | | |
| 165.9 | | | 11.48 | 21.88 | 30.94 | 38.94 | 46.08 | 52.59 | 58.65 | 64.39 | 69.83 | 74.97 | 79.93 | 84.70 | 89.23 | 93.48 | 97.51 | 101.18 | 104.27 | 106.41 | | | | |
| | | | 10.41 | 20.56 | 29.43 | 37.25 | 44.23 | 50.59 | 56.49 | 62.04 | 67.24 | 72.09 | 76.74 | 81.17 | 85.32 | 89.23 | 93.00 | 96.71 | 100.43 | 104.47 | | | | |
| 176.6 | | | 8.11 | 19.51 | 29.62 | 38.63 | 46.66 | 53.84 | 60.34 | 66.35 | 72.06 | 77.57 | 82.88 | 87.94 | 92.67 | 97.13 | 101.36 | 105.24 | 108.82 | 111.87 | 114.10 | | | |
| | | | 7.16 | 18.21 | 28.10 | 36.88 | 44.68 | 51.66 | 58.00 | 63.89 | 69.49 | 74.88 | 80.06 | 84.95 | 89.51 | 93.84 | 97.82 | 101.36 | 104.80 | 108.31 | 112.15 | | | |
| 187.2 | | | | 17.23 | 28.54 | 38.49 | 47.29 | 55.12 | 62.19 | 68.67 | 74.71 | 80.44 | 85.98 | 91.37 | 96.50 | 101.24 | 105.56 | 109.64 | 113.53 | 116.87 | 119.59 | 121.74 | | |
| | | | | 15.92 | 26.87 | 36.49 | 45.02 | 52.68 | 59.66 | 66.10 | 72.11 | 77.83 | 83.36 | 88.66 | 93.66 | 98.23 | 102.39 | 106.35 | 110.15 | 113.29 | 116.26 | 119.63 | | |
| 197.9 | | | | 15.05 | 27.51 | 38.32 | 47.76 | 56.12 | 63.66 | 70.58 | 77.03 | 83.14 | 88.98 | 94.67 | 100.19 | 105.34 | 110.01 | 114.15 | 117.87 | 121.42 | 124.69 | 127.46 | 129.37 | |
| | | | | 13.77 | 30.94 | 36.12 | 45.29 | 53.51 | 60.96 | 67.84 | 74.29 | 80.40 | 86.33 | 92.11 | 97.58 | 102.60 | 107.14 | 111.13 | 114.70 | 118.15 | 121.39 | 124.31 | 127.04 | |
| 208.6 | | | | 12.17 | 26.24 | 37.97 | 48.07 | 56.91 | 64.85 | 72.16 | 78.98 | 85.44 | 91.61 | 97.58 | 103.43 | 109.02 | 114.07 | 118.53 | 122.43 | 125.83 | 128.90 | 131.73 | 134.08 | 135.77 |
| | | | | 11.29 | 24.61 | 35.82 | 45.63 | 54.34 | 62.19 | 69.43 | 76.23 | 82.71 | 88.91 | 94.92 | 100.85 | 106.45 | 111.41 | 115.77 | 119.58 | 122.87 | 125.88 | 128.76 | 131.35 | 133.74 |
| 219.3 | | | | | 24.49 | 37.59 | 48.47 | 57.78 | 66.06 | 73.67 | 80.76 | 87.47 | 93.94 | 100.17 | 106.19 | 112.03 | 117.50 | 122.26 | 126.37 | 129.94 | 132.98 | 135.53 | 137.73 | 139.41 |
| | | | | | 23.30 | 35.85 | 46.33 | 55.41 | 63.61 | 71.14 | 78.22 | 85.01 | 91.61 | 97.95 | 103.99 | 109.83 | 115.27 | 120.00 | 124.05 | 127.58 | 130.62 | 133.25 | 135.77 | 138.14 |

(mm)

DIAMETER $D = 460$
HEIGHT $h = 140$
EXPANSION ANGLE $\lambda = 104.3$
BOSS RATIO $\nu = 0.326$

TABLE 122

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 165-166,
Replace Table 123 with the following:

COMPARISON EXAMPLE 4

| θ / r | 10° | 15° | 20° | 25° | 30° | 35° | 40° | 45° | 50° | 55° | 60° | 65° | 70° | 75° | 80° | 85° | 90° | 95° | 100° |
|---|---|---|---|---|---|---|---|---|---|---|---|---|---|---|---|---|---|---|---|
| r 80 | 11.73 | 19.10 | 25.44 | 30.60 | 35.31 | 39.90 | 44.45 | 48.84 | 53.00 | 56.91 | 60.54 | 63.79 | 66.69 | | | | | | |
| | 6.47 | 13.00 | 19.27 | 24.95 | 29.81 | 34.29 | 38.60 | 42.80 | 46.92 | 50.95 | 54.90 | 58.74 | 62.24 | 65.73 | | | | | |
| r 90 | | 12.73 | 20.94 | 27.79 | 33.67 | 39.12 | 44.39 | 49.38 | 54.09 | 58.55 | 62.71 | 66.45 | 69.78 | 72.78 | | | | | |
| | | 7.72 | 15.35 | 22.37 | 28.82 | 34.15 | 39.00 | 43.69 | 48.20 | 52.63 | 56.99 | 61.24 | 65.20 | 69.05 | 72.74 | | | | |
| r 100 | | | 16.09 | 24.55 | 31.82 | 38.32 | 44.30 | 50.03 | 55.39 | 60.47 | 65.25 | 69.55 | 73.43 | 76.96 | | | | | |
| | | | 11.10 | 19.49 | 27.06 | 33.78 | 39.34 | 44.59 | 49.60 | 54.42 | 59.19 | 63.83 | 68.22 | 72.41 | 76.43 | 79.97 | | | |
| r 110 | | | | 21.17 | 29.78 | 37.40 | 44.32 | 50.81 | 56.89 | 62.60 | 67.99 | 72.88 | 77.34 | 81.37 | 84.91 | | | | |
| | | | 6.47 | 16.35 | 25.27 | 32.95 | 39.56 | 45.48 | 51.16 | 56.38 | 61.52 | 66.48 | 71.29 | 75.84 | 80.24 | 84.27 | | | |
| r 120 | | | | 16.62 | 27.71 | 36.46 | 44.43 | 51.73 | 58.63 | 65.02 | 70.96 | 76.44 | 81.49 | 86.04 | 90.12 | 93.56 | | | |
| | | | | 12.48 | 23.19 | 32.11 | 39.60 | 46.35 | 52.75 | 58.54 | 64.01 | 69.27 | 74.42 | 79.38 | 84.27 | 88.88 | 92.94 | | |
| r 130 | | | | | 25.07 | 35.42 | 44.45 | 52.76 | 60.49 | 67.60 | 74.14 | 80.18 | 85.76 | 90.79 | 95.43 | 99.34 | | | |
| | | | | | 20.47 | 30.82 | 39.57 | 47.10 | 54.26 | 60.75 | 66.61 | 72.15 | 77.63 | 83.00 | 88.46 | 93.70 | 98.22 | | |
| r 140 | | | | | 21.38 | 34.00 | 44.38 | 53.67 | 62.26 | 70.13 | 77.30 | 83.88 | 90.14 | 95.73 | 100.80 | 105.22 | 108.78 | | |
| | | | | | 16.83 | 29.05 | 39.13 | 47.59 | 55.60 | 62.95 | 69.35 | 75.17 | 80.99 | 86.79 | 92.74 | 98.44 | 103.48 | 107.80 | |
| r 150 | | | | | 15.39 | 31.83 | 43.84 | 54.32 | 63.84 | 72.47 | 80.37 | 87.60 | 94.28 | 100.52 | 106.07 | 110.94 | 114.95 | | |
| | | | | | 12.94 | 26.57 | 38.27 | 47.91 | 56.81 | 64.97 | 72.10 | 78.38 | 84.69 | 90.96 | 97.16 | 103.19 | 108.58 | 113.56 | |
| r 160 | | | | | | 29.55 | 43.21 | 54.64 | 65.14 | 74.33 | 82.96 | 90.49 | 97.62 | 104.34 | 110.63 | 116.05 | 120.85 | 124.87 | |
| | | | | | | 23.69 | 37.38 | 48.40 | 57.93 | 66.86 | 74.86 | 81.82 | 88.68 | 95.47 | 101.96 | 108.15 | 113.87 | 119.15 | 123.49 |
| r 170 | | | | | | 27.10 | 42.68 | 55.44 | 66.28 | 75.62 | 84.39 | 92.42 | 100.19 | 107.31 | 114.13 | 120.38 | 126.11 | 130.86 | |
| | | | | | | 21.19 | 36.26 | 48.76 | 59.06 | 68.53 | 77.20 | 85.22 | 92.83 | 99.88 | 106.68 | 113.09 | 119.02 | 124.38 | 128.87 |
| r 180 | | | | | | 21.52 | 42.14 | 56.11 | 67.43 | 77.37 | 86.87 | 95.58 | 103.50 | 111.06 | 118.11 | 124.80 | 130.98 | 136.36 | 140.79 |
| | | | | | | 19.14 | 35.30 | 49.17 | 60.36 | 70.38 | 79.63 | 88.20 | 96.29 | 103.91 | 110.87 | 117.74 | 123.88 | 129.55 | 134.46 |

(mm)

TABLE 123

Column 167-168,
Replace Table 124 with the following:

COMPARISON EXAMPLE 5

| θ / r | 0° | 5° | 10° | 15° | 20° | 25° | 30° | 35° | 40° | 45° | 50° | 55° | 60° | 65° | 70° | 75° | 80° | 85° | 90° | 95° | 100° |
|---|---|---|---|---|---|---|---|---|---|---|---|---|---|---|---|---|---|---|---|---|---|
| r 45 | 31.80 | 33.99 | 36.21 | 38.47 | 40.72 | 42.84 | 44.86 | 46.79 | 48.62 | 50.36 | | | | | | | | | | | |
| r 55 | | 21.58 | 25.42 | 29.09 | 32.62 | 36.02 | 39.20 | 42.17 | 44.94 | 47.51 | 49.89 | 52.12 | 54.19 | | | | | | | | |
| r 65 | | | | 18.45 | 23.54 | 28.39 | 32.91 | 37.05 | 40.87 | 44.39 | 47.64 | 50.63 | 53.40 | 55.95 | 58.28 | | | | | | |
| r 75 | | | | | 14.55 | 20.92 | 26.88 | 32.29 | 37.22 | 41.75 | 45.90 | 49.71 | 53.21 | 56.42 | 59.35 | 62.01 | | | | | |
| r 85 | | | | | 5.55 | 13.74 | 21.12 | 27.82 | 33.89 | 39.42 | 44.49 | 49.13 | 53.38 | 57.26 | 60.82 | 64.05 | 66.97 | | | | |
| r 95 | | | | | | 7.05 | 15.69 | 23.59 | 30.77 | 37.25 | 43.20 | 48.63 | 53.60 | 58.14 | 62.30 | 66.10 | 69.55 | 72.72 | | | |
| r 105 | | | | | | 0.87 | 10.64 | 19.57 | 27.73 | 35.11 | 41.84 | 47.98 | 53.62 | 58.78 | 63.51 | 40.83 | 71.77 | 75.43 | | | |
| r 115 | | | | | | | 5.87 | 15.71 | 24.68 | 32.84 | 40.30 | 47.10 | 53.33 | 59.02 | 64.28 | 69.03 | 73.40 | 77.43 | 81.05 | | |
| r 125 | | | | | | | | 11.89 | 21.58 | 30.43 | 38.57 | 45.95 | 52.70 | 58.91 | 64.59 | 69.71 | 74.39 | 78.67 | 82.62 | 86.11 | |
| r 135 | | | | | | | | 8.27 | 18.40 | 27.98 | 36.72 | 44.67 | 51.94 | 58.58 | 64.65 | 70.17 | 75.14 | 79.63 | 83.70 | 87.39 | |
| r 145 | | | | | | | | | 15.14 | 25.50 | 34.77 | 43.28 | 51.06 | 58.04 | 64.45 | 70.43 | 75.63 | 80.43 | 84.74 | 88.67 | 92.17 |
| r 155 | | | | | | | | | | 22.91 | 32.82 | 41.86 | 50.08 | 57.34 | 64.11 | 70.44 | 75.95 | 81.10 | 85.79 | 89.95 | 93.67 |

(mm)

TABLE 124

UNITED STATES PATENT AND TRADEMARK OFFICE
CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 167-170,
Replace Table 125 with the following:

COMPARISON EXAMPLE 6

| θ / r | END POINT AT TRAILING EDGE SIDE | 5° | 10° | 15° | 20° | 25° | 30° | 35° | 40° | 45° | 50° | 55° | 60° | 65° | 70° | 75° | 80° | 85° | 90° | 95° | 100° | 102.5° | END POINT AT LEADING EDGE SIDE |
|---|---|---|---|---|---|---|---|---|---|---|---|---|---|---|---|---|---|---|---|---|---|---|---|
| r88.5 | | | | | | | | | | | | | | | | | | | | | | | |
| | 0.00 | 6.00 | 12.54 | 19.50 | 25.83 | 31.51 | 37.02 | 42.04 | 46.64 | 51.26 | 55.75 | 60.17 | 64.51 | 68.67 | 72.48 | | | | | | | | 72.48 |
| r95 | | 5.78 | 12.77 | 20.55 | 27.94 | 34.52 | 40.58 | 46.17 | 51.36 | 56.45 | 61.43 | 66.35 | 71.14 | 75.75 | 80.17 | | | | | | | | |
| | 1.15 | 2.38 | 9.19 | 16.80 | 24.01 | 30.41 | 36.30 | 41.71 | 46.72 | 51.63 | 56.44 | 61.18 | 65.79 | 70.23 | 74.47 | | | | | | | | 77.09 |
| r105 | | | 7.06 | 15.24 | 23.89 | 31.71 | 38.60 | 44.82 | 50.57 | 56.08 | 61.49 | 66.82 | 71.97 | 76.95 | 81.75 | 86.34 | | | | | | | |
| | 2.75 | | 4.46 | 12.50 | 21.01 | 28.69 | 35.45 | 41.53 | 47.14 | 52.51 | 57.78 | 62.97 | 67.99 | 72.83 | 77.49 | 81.94 | | | | | | | 84.02 |
| r115 | | | | 10.57 | 20.43 | 29.72 | 37.80 | 44.75 | 51.05 | 57.01 | 62.82 | 68.52 | 74.06 | 79.40 | 84.48 | 89.39 | 94.10 | | | | | | |
| | 4.21 | | | 8.02 | 17.76 | 26.94 | 34.90 | 41.73 | 47.92 | 53.76 | 59.45 | 65.04 | 70.46 | 75.68 | 80.65 | 85.44 | 90.03 | | | | | | 90.83 |
| r125 | | | | | 16.59 | 27.30 | 37.02 | 44.95 | 51.87 | 58.29 | 64.48 | 70.52 | 76.37 | 82.01 | 87.39 | 92.61 | 97.65 | | | | | | |
| | 5.57 | | | | 14.09 | 24.70 | 34.31 | 42.14 | 48.95 | 55.27 | 61.35 | 67.29 | 73.04 | 78.57 | 83.85 | 88.96 | 93.90 | | | | | | 97.58 |
| r135 | | | | | 12.44 | 24.47 | 35.74 | 45.14 | 52.86 | 59.74 | 66.31 | 72.68 | 78.87 | 84.80 | 90.45 | 95.95 | 100.97 | 106.23 | | | | | |
| | 6.83 | | | | 9.94 | 21.89 | 33.09 | 42.41 | 50.05 | 56.86 | 63.35 | 69.64 | 75.75 | 81.61 | 87.18 | 92.60 | 97.55 | 102.73 | | | | | 104.29 |
| r145 | | | | | | 21.11 | 33.79 | 44.82 | 53.72 | 61.26 | 68.23 | 74.93 | 81.42 | 87.63 | 93.61 | 99.36 | 104.90 | 110.30 | | | | | |
| | 8.02 | | | | | 18.66 | 31.28 | 42.24 | 51.08 | 58.55 | 65.46 | 72.10 | 78.52 | 84.67 | 90.59 | 96.27 | 101.75 | 107.08 | | | | | 110.99 |
| r155 | | | | | | 17.35 | 31.43 | 44.01 | 54.51 | 62.82 | 70.23 | 77.27 | 84.05 | 90.56 | 96.87 | 102.90 | 108.74 | 114.38 | 119.80 | | | | |
| | 9.15 | | | | | 14.95 | 28.98 | 41.52 | 51.97 | 60.24 | 67.60 | 74.59 | 81.33 | 87.79 | 94.05 | 100.04 | 105.83 | 111.43 | 116.80 | | | | 117.70 |
| r165 | | | | | | 13.24 | 28.66 | 42.69 | 54.86 | 64.35 | 72.28 | 79.71 | 86.81 | 93.62 | 100.28 | 106.59 | 112.67 | 118.62 | 124.26 | | | | |
| | 10.21 | | | | | 10.84 | 26.23 | 40.23 | 52.37 | 61.83 | 69.72 | 77.12 | 84.19 | 90.97 | 97.60 | 103.88 | 109.93 | 115.85 | 121.46 | | | | 124.41 |
| r175 | | | | | | | 25.49 | 40.94 | 54.68 | 65.61 | 74.21 | 82.07 | 89.53 | 96.68 | 103.71 | 110.32 | 116.69 | 122.88 | 128.76 | | | | |
| | 11.21 | | | | | | 23.09 | 38.52 | 52.25 | 63.16 | 71.74 | 79.59 | 87.03 | 94.16 | 101.18 | 107.77 | 114.12 | 120.30 | 126.16 | | | | 131.15 |
| r185 | | | | | | | 22.17 | 38.89 | 53.89 | 66.48 | 75.97 | 84.38 | 92.23 | 99.77 | 107.13 | 114.13 | 120.81 | 127.30 | 133.42 | 139.16 | | | |
| | 12.16 | | | | | | 19.77 | 36.48 | 51.47 | 64.05 | 73.53 | 81.94 | 89.78 | 97.31 | 104.66 | 111.65 | 118.32 | 124.80 | 130.91 | 136.64 | | | 137.92 |
| r195 | | | | | | | 18.66 | 36.55 | 52.61 | 66.83 | 77.52 | 86.56 | 94.90 | 102.97 | 110.57 | 117.93 | 124.92 | 131.63 | 137.97 | 144.00 | | | |
| | 13.06 | | | | | | 16.26 | 34.15 | 50.21 | 64.43 | 75.12 | 84.16 | 92.50 | 100.57 | 108.17 | 115.53 | 122.52 | 129.23 | 135.57 | 141.60 | | | 144.71 |
| r205 | | | | | | | | 33.78 | 51.15 | 66.92 | 78.89 | 88.62 | 97.59 | 106.19 | 114.31 | 122.06 | 129.26 | 136.03 | 142.66 | 148.92 | | | |
| | 13.91 | | | | | | | 31.38 | 48.75 | 64.52 | 76.49 | 86.22 | 95.19 | 103.79 | 111.91 | 119.66 | 126.86 | 133.63 | 140.26 | 146.52 | | | 151.53 |
| r215 | | | | | | | | 30.90 | 49.52 | 66.71 | 80.05 | 90.51 | 100.20 | 109.51 | 118.09 | 126.39 | 133.95 | 140.62 | 147.40 | 153.94 | 160.13 | | |
| | 14.71 | | | | | | | 28.50 | 47.12 | 64.31 | 77.65 | 88.11 | 97.80 | 107.11 | 115.69 | 123.99 | 131.55 | 138.22 | 145.00 | 151.54 | 157.73 | | 158.39 |
| r225 | | | | | | | | 28.01 | 47.58 | 66.09 | 80.91 | 92.25 | 102.71 | 112.71 | 121.82 | 130.66 | 138.70 | 145.51 | 152.30 | 159.09 | 165.48 | | |
| | 15.47 | | | | | | | 25.61 | 45.18 | 63.69 | 78.51 | 89.85 | 100.31 | 110.31 | 119.42 | 128.26 | 136.30 | 143.11 | 149.90 | 156.69 | 163.08 | | 165.27 |
| r230 | | | | | | | | 26.46 | 46.67 | 65.62 | 81.23 | 93.06 | 103.93 | 114.27 | 123.67 | 132.77 | 141.10 | 148.07 | 154.81 | 161.74 | 168.14 | 171.12 | |
| | 15.82 | | | | | | | 24.06 | 44.27 | 63.22 | 78.83 | 90.66 | 101.53 | 111.87 | 121.27 | 130.37 | 138.70 | 145.67 | 152.41 | 159.34 | 165.74 | 168.72 | 168.72 |

(mm)

TABLE 125

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 177-180,
Replace Table 203 with the following:

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 26.73 | 30.33 | 33.72 | 37.03 | 40.30 | 43.53 | 46.66 | 49.68 | 52.58 | 55.37 | 58.00 | 60.46 | 62.63 | 64.38 | 65.45 | 65.50 | | | | | | |
| | | | 23.50 | 25.75 | 28.03 | 30.30 | 32.56 | 34.90 | 37.35 | 39.94 | 42.60 | 45.32 | 48.02 | 50.68 | 53.33 | 56.03 | 58.92 | 62.32 | | | | | | |
| 70 | | 20.62 | 25.40 | 29.74 | 33.84 | 37.77 | 41.53 | 45.09 | 48.48 | 51.74 | 54.87 | 57.84 | 60.61 | 62.95 | 64.60 | 65.12 | | | | | | | | |
| | | 17.73 | 21.07 | 24.27 | 27.42 | 30.56 | 33.74 | 36.97 | 40.24 | 43.50 | 46.71 | 49.82 | 52.84 | 55.83 | 58.92 | 62.36 | | | | | | | | |
| 80 | 12.30 | 18.62 | 24.08 | 29.11 | 33.83 | 38.32 | 42.53 | 46.50 | 50.27 | 53.86 | 57.28 | 60.49 | 63.40 | 65.81 | 67.46 | 67.91 | | | | | | | | |
| | 10.63 | 15.41 | 19.80 | 23.93 | 27.88 | 31.72 | 35.51 | 39.25 | 42.92 | 46.51 | 49.96 | 53.24 | 56.38 | 59.43 | 62.53 | 65.97 | | | | | | | | |
| 90 | 9.83 | 16.50 | 22.67 | 28.43 | 33.81 | 38.84 | 43.57 | 48.00 | 52.16 | 56.10 | 59.81 | 63.30 | 66.51 | 69.27 | 71.39 | 72.44 | | | | | | | | |
| | 7.77 | 13.61 | 19.00 | 23.98 | 28.61 | 33.00 | 37.22 | 41.31 | 45.29 | 49.14 | 52.83 | 56.33 | 59.61 | 62.78 | 65.93 | 69.31 | | | | | | | | |
| 100 | 5.90 | 13.96 | 21.16 | 27.71 | 33.76 | 39.39 | 44.64 | 49.53 | 54.10 | 58.39 | 62.43 | 66.24 | 69.81 | 73.05 | 75.80 | 77.79 | 78.50 | | | | | | | |
| | 4.58 | 11.65 | 18.13 | 23.96 | 29.25 | 34.14 | 38.76 | 43.18 | 47.45 | 51.57 | 55.53 | 59.30 | 62.87 | 66.26 | 69.59 | 73.00 | 76.83 | | | | | | | |
| 110 | 1.39 | 11.11 | 19.43 | 26.84 | 33.57 | 39.79 | 45.55 | 50.89 | 55.87 | 60.51 | 64.89 | 69.03 | 72.95 | 76.65 | 79.99 | 82.76 | 84.65 | | | | | | | |
| | 0.92 | 9.28 | 16.83 | 23.52 | 29.51 | 34.96 | 40.00 | 44.76 | 49.31 | 53.69 | 57.91 | 61.98 | 65.90 | 69.65 | 73.28 | 76.89 | 80.65 | | | | | | | |
| 120 | | 7.80 | 17.20 | 25.43 | 32.87 | 39.68 | 45.97 | 51.79 | 57.20 | 62.25 | 66.99 | 71.48 | 75.74 | 79.81 | 83.65 | 87.09 | 89.90 | 91.70 | | | | | | |
| | | 6.45 | 14.90 | 22.49 | 29.33 | 35.51 | 41.14 | 46.33 | 51.20 | 55.85 | 60.33 | 64.67 | 68.88 | 72.95 | 76.87 | 80.67 | 84.48 | 88.52 | | | | | | |
| 130 | | 3.98 | 14.27 | 23.49 | 31.72 | 39.10 | 45.82 | 52.04 | 57.85 | 63.33 | 68.52 | 73.44 | 78.11 | 82.55 | 86.75 | 90.71 | 94.28 | 97.19 | 98.97 | | | | | |
| | | 3.28 | 12.97 | 21.88 | 29.83 | 36.87 | 43.16 | 48.88 | 54.19 | 59.17 | 63.87 | 68.33 | 72.61 | 76.72 | 80.69 | 84.56 | 88.37 | 92.24 | 96.48 | | | | | |
| 140 | | | 11.47 | 21.90 | 31.00 | 39.01 | 46.18 | 52.71 | 58.80 | 64.56 | 70.03 | 75.21 | 80.21 | 85.01 | 89.57 | 93.88 | 97.94 | 101.62 | 104.63 | 106.51 | | | | |
| | | | 10.41 | 20.52 | 29.37 | 37.17 | 44.13 | 50.46 | 56.34 | 61.86 | 67.04 | 71.85 | 76.47 | 80.86 | 84.96 | 88.83 | 92.57 | 96.28 | 100.08 | 104.36 | | | | |
| 150 | | | 8.10 | 19.54 | 29.69 | 38.73 | 46.78 | 53.98 | 60.50 | 66.52 | 72.25 | 77.78 | 83.11 | 88.18 | 92.93 | 97.42 | 101.68 | 105.60 | 109.20 | 112.20 | 114.22 | | | |
| | | | 7.17 | 18.17 | 28.03 | 36.78 | 44.56 | 51.52 | 57.83 | 63.70 | 69.29 | 74.67 | 79.83 | 84.71 | 89.26 | 93.56 | 97.50 | 101.00 | 104.43 | 107.99 | 112.04 | | | |
| 160 | | | | 17.27 | 28.63 | 38.62 | 47.45 | 55.30 | 62.39 | 68.87 | 74.92 | 80.64 | 86.20 | 91.59 | 96.73 | 101.49 | 105.83 | 109.92 | 113.83 | 117.20 | 119.90 | 121.89 | | |
| | | | | 15.88 | 26.78 | 36.36 | 44.86 | 52.50 | 59.47 | 65.90 | 71.91 | 77.62 | 83.14 | 88.44 | 93.42 | 97.99 | 102.13 | 106.08 | 109.86 | 112.97 | 115.97 | 119.49 | | |
| 170 | | | | 15.08 | 27.61 | 38.48 | 47.95 | 56.32 | 63.87 | 70.80 | 77.25 | 83.34 | 89.19 | 94.88 | 100.41 | 105.57 | 110.25 | 114.40 | 118.13 | 121.70 | 124.98 | 127.73 | 129.54 | |
| | | | | 13.74 | 25.66 | 35.97 | 45.11 | 53.30 | 60.75 | 67.63 | 74.08 | 80.19 | 86.11 | 91.90 | 97.36 | 102.38 | 106.90 | 110.88 | 114.44 | 117.87 | 121.10 | 124.04 | 126.88 | |
| 180 | | | | 12.19 | 26.33 | 38.11 | 48.24 | 57.10 | 65.07 | 72.38 | 79.20 | 85.65 | 91.82 | 97.78 | 103.63 | 109.23 | 114.28 | 118.75 | 122.66 | 126.07 | 129.15 | 131.98 | 134.30 | 135.90 |
| | | | | 11.29 | 24.52 | 35.68 | 45.46 | 54.14 | 61.98 | 69.21 | 76.01 | 82.50 | 88.70 | 94.72 | 100.65 | 106.24 | 111.20 | 115.55 | 119.35 | 122.62 | 125.63 | 128.52 | 131.13 | 133.61 |
| 190 | | | | | 24.56 | 37.70 | 48.62 | 57.95 | 66.25 | 73.86 | 80.95 | 87.65 | 94.11 | 100.33 | 106.35 | 112.19 | 117.65 | 122.43 | 126.54 | 130.11 | 133.15 | 135.68 | 137.85 | 139.45 |
| | | | | | 23.24 | 35.74 | 46.19 | 55.25 | 63.42 | 70.96 | 78.03 | 84.82 | 91.44 | 97.79 | 103.84 | 109.88 | 115.12 | 119.84 | 123.88 | 127.41 | 130.45 | 133.09 | 135.65 | 138.10 |

(mm)

DIAMETER D= 400
HEIGHT h= 140
EXPANSION ANGLE $\lambda$ = 120
BOSS RATIO $\nu$ = 0.275

TABLE 203

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

<u>Columns 181-184</u>,
Replace Table 204 with the following:

| θ \ r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 29.41 | 33.36 | 37.09 | 40.73 | 44.34 | 47.88 | 51.33 | 54.65 | 57.84 | 60.90 | 63.80 | 66.50 | 68.89 | 70.82 | 72.00 | 72.05 | | | | | | |
| | | | 25.85 | 28.33 | 30.83 | 33.32 | 35.82 | 38.39 | 41.09 | 43.93 | 46.86 | 49.85 | 52.82 | 55.75 | 58.66 | 61.63 | 64.81 | 68.55 | | | | | | |
| 70 | | 22.68 | 27.94 | 32.71 | 37.23 | 41.55 | 45.68 | 49.60 | 53.33 | 56.92 | 60.35 | 63.63 | 66.67 | 69.24 | 71.06 | 71.63 | | | | | | | | |
| | | 19.50 | 23.17 | 26.70 | 30.16 | 33.61 | 37.11 | 40.67 | 44.27 | 47.85 | 51.38 | 54.80 | 58.12 | 61.41 | 64.81 | 68.60 | | | | | | | | |
| 80 | 13.53 | 20.48 | 26.49 | 32.02 | 37.22 | 42.15 | 46.79 | 51.15 | 55.30 | 59.25 | 63.00 | 66.54 | 69.74 | 72.39 | 74.21 | 74.70 | | | | | | | | |
| | 11.70 | 16.95 | 21.78 | 26.32 | 30.66 | 34.90 | 39.06 | 43.17 | 47.22 | 51.16 | 54.95 | 58.57 | 62.02 | 65.37 | 68.78 | 72.56 | | | | | | | | |
| 90 | 10.81 | 18.15 | 24.93 | 31.27 | 37.19 | 42.73 | 47.92 | 52.80 | 57.38 | 61.71 | 65.79 | 69.63 | 73.16 | 76.19 | 78.53 | 79.68 | | | | | | | | |
| | 8.54 | 14.97 | 20.90 | 26.38 | 31.47 | 36.30 | 40.94 | 45.44 | 49.82 | 54.06 | 58.12 | 61.96 | 65.57 | 69.05 | 72.52 | 76.24 | | | | | | | | |
| 100 | 6.49 | 15.36 | 23.27 | 30.48 | 37.14 | 43.33 | 49.10 | 54.48 | 59.51 | 64.23 | 68.68 | 72.87 | 76.79 | 80.36 | 83.38 | 85.57 | 86.35 | | | | | | | |
| | 5.04 | 12.82 | 19.94 | 26.36 | 32.17 | 37.55 | 42.63 | 47.50 | 52.19 | 56.73 | 61.08 | 65.23 | 69.15 | 72.89 | 76.55 | 80.30 | 84.51 | | | | | | | |
| 110 | 1.53 | 12.22 | 21.38 | 29.52 | 36.93 | 43.77 | 50.10 | 55.98 | 61.48 | 66.56 | 71.37 | 75.93 | 80.24 | 84.31 | 87.99 | 91.04 | 93.12 | | | | | | | |
| | 1.01 | 10.20 | 18.52 | 25.88 | 32.46 | 38.45 | 44.00 | 49.24 | 54.24 | 59.05 | 63.70 | 68.18 | 72.48 | 76.62 | 80.61 | 84.57 | 88.71 | | | | | | | |
| 120 | | 8.58 | 18.92 | 27.98 | 36.15 | 43.65 | 50.56 | 56.97 | 62.92 | 68.47 | 73.69 | 78.82 | 83.32 | 87.79 | 92.01 | 95.80 | 98.89 | 100.87 | | | | | | |
| | | 7.09 | 16.39 | 24.74 | 32.26 | 39.06 | 45.25 | 50.96 | 56.32 | 61.43 | 66.36 | 71.14 | 75.77 | 80.24 | 84.55 | 88.73 | 92.93 | 97.38 | | | | | | |
| 130 | | 4.38 | 15.70 | 25.84 | 34.89 | 43.01 | 50.40 | 57.25 | 63.64 | 69.66 | 75.37 | 80.78 | 85.92 | 90.80 | 95.42 | 99.78 | 103.71 | 106.91 | 108.86 | | | | | |
| | | 3.61 | 14.26 | 24.07 | 32.81 | 40.55 | 47.47 | 53.77 | 59.61 | 65.08 | 70.25 | 76.17 | 79.87 | 84.39 | 88.76 | 93.02 | 97.21 | 101.46 | 106.12 | | | | | |
| 140 | | | 12.62 | 24.09 | 34.10 | 42.92 | 50.80 | 57.98 | 64.68 | 71.01 | 77.04 | 82.73 | 88.23 | 93.51 | 98.53 | 103.26 | 107.73 | 111.78 | 115.09 | 117.16 | | | | |
| | | | 11.46 | 22.57 | 32.31 | 40.89 | 48.54 | 55.51 | 61.97 | 68.05 | 73.74 | 79.03 | 84.12 | 88.94 | 93.46 | 97.71 | 101.83 | 105.91 | 110.09 | 114.80 | | | | |
| 150 | | | 8.91 | 21.50 | 32.66 | 42.60 | 51.45 | 59.38 | 66.55 | 73.18 | 79.48 | 85.55 | 91.42 | 97.00 | 102.22 | 107.16 | 111.84 | 116.16 | 120.12 | 123.42 | 125.65 | | | |
| | | | 7.88 | 19.99 | 30.83 | 40.46 | 49.01 | 56.67 | 63.62 | 70.07 | 76.22 | 82.14 | 87.82 | 93.19 | 98.18 | 102.91 | 107.25 | 111.10 | 114.87 | 118.79 | 123.24 | | | |
| 160 | | | | 19.00 | 31.49 | 42.48 | 52.19 | 60.83 | 68.62 | 75.76 | 82.41 | 88.71 | 94.82 | 100.75 | 106.40 | 111.64 | 116.41 | 120.91 | 125.21 | 128.92 | 131.89 | 134.08 | | |
| | | | | 17.46 | 29.48 | 40.00 | 49.35 | 57.75 | 65.42 | 72.49 | 79.10 | 85.39 | 91.46 | 97.28 | 102.76 | 107.79 | 112.35 | 116.68 | 120.84 | 124.26 | 127.56 | 131.44 | | |
| 170 | | | | 16.59 | 30.37 | 42.32 | 52.74 | 61.95 | 70.26 | 77.88 | 84.97 | 91.68 | 98.11 | 104.37 | 110.45 | 116.12 | 121.28 | 125.84 | 129.94 | 133.87 | 137.47 | 140.51 | 142.49 | |
| | | | | 15.12 | 28.22 | 39.57 | 49.62 | 58.63 | 66.83 | 74.39 | 81.48 | 88.21 | 94.72 | 101.08 | 107.10 | 112.61 | 117.59 | 121.97 | 125.88 | 129.66 | 133.21 | 136.44 | 139.56 | |
| 180 | | | | 13.41 | 28.96 | 41.93 | 53.07 | 62.81 | 71.57 | 79.62 | 87.12 | 94.21 | 101.00 | 107.56 | 114.00 | 120.15 | 125.71 | 130.62 | 134.93 | 138.68 | 142.07 | 145.17 | 147.73 | 149.49 |
| | | | | 12.42 | 26.97 | 39.24 | 50.01 | 59.55 | 68.18 | 76.13 | 83.61 | 90.74 | 97.57 | 104.19 | 110.71 | 116.86 | 122.32 | 127.11 | 131.29 | 134.89 | 138.19 | 141.37 | 144.25 | 146.97 |
| 190 | | | | | 27.01 | 41.47 | 53.48 | 63.74 | 72.87 | 81.24 | 89.04 | 96.42 | 103.52 | 110.36 | 116.98 | 123.40 | 129.41 | 134.67 | 139.19 | 143.12 | 146.46 | 149.25 | 151.63 | 153.39 |
| | | | | | 25.56 | 39.31 | 50.81 | 60.77 | 69.77 | 78.05 | 85.83 | 93.30 | 100.59 | 107.57 | 114.22 | 120.65 | 126.63 | 131.82 | 136.27 | 140.15 | 143.49 | 146.39 | 149.22 | 151.91 |

(mm)

DIAMETER D= 400
HEIGHT h= 154
EXPANSION ANGLE $\lambda$ = 120
BOSS RATIO $\nu$ = 0.275

TABLE 204

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 183-186,
Replace Table 205 with the following:

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 28.07 | 31.84 | 35.40 | 38.88 | 42.32 | 45.71 | 48.99 | 52.16 | 55.21 | 58.13 | 60.90 | 63.48 | 65.76 | 67.80 | 68.73 | 68.77 | | | | | | |
| | | | 24.67 | 27.04 | 29.43 | 31.81 | 34.19 | 36.65 | 39.22 | 41.93 | 44.73 | 47.58 | 50.42 | 53.22 | 56.00 | 58.83 | 61.87 | 65.44 | | | | | | |
| 70 | | 21.65 | 26.67 | 31.23 | 35.53 | 39.66 | 43.60 | 47.34 | 50.91 | 54.33 | 57.61 | 60.74 | 63.64 | 66.09 | 67.83 | 68.38 | | | | | | | | |
| | | 18.62 | 22.12 | 25.49 | 28.79 | 32.09 | 35.42 | 38.82 | 42.26 | 45.68 | 49.04 | 52.31 | 55.48 | 58.62 | 61.86 | 65.48 | | | | | | | | |
| 80 | 12.91 | 19.55 | 25.28 | 30.57 | 35.53 | 40.23 | 44.66 | 48.83 | 52.78 | 56.55 | 60.14 | 63.51 | 66.57 | 69.10 | 70.83 | 71.31 | | | | | | | | |
| | 11.17 | 16.18 | 20.79 | 25.13 | 29.27 | 33.31 | 37.29 | 41.21 | 45.07 | 48.83 | 52.45 | 55.91 | 59.20 | 62.40 | 65.65 | 69.26 | | | | | | | | |
| 90 | 10.32 | 17.32 | 23.80 | 29.85 | 35.50 | 40.79 | 45.75 | 50.40 | 54.77 | 58.90 | 62.80 | 66.47 | 69.83 | 72.73 | 74.96 | 76.06 | | | | | | | | |
| | 8.16 | 14.29 | 19.95 | 25.18 | 30.04 | 34.65 | 39.08 | 43.38 | 47.56 | 51.60 | 55.48 | 59.14 | 62.59 | 65.91 | 69.22 | 72.77 | | | | | | | | |
| 100 | 6.19 | 14.66 | 22.22 | 29.09 | 35.45 | 41.36 | 46.87 | 52.00 | 56.80 | 61.31 | 65.55 | 69.56 | 73.30 | 76.70 | 79.59 | 81.68 | 82.43 | | | | | | | |
| | 4.81 | 12.24 | 19.04 | 25.16 | 30.71 | 35.84 | 40.69 | 45.34 | 49.82 | 54.15 | 58.31 | 62.27 | 66.01 | 69.58 | 73.07 | 76.65 | 80.67 | | | | | | | |
| 110 | 1.46 | 11.66 | 20.40 | 28.18 | 35.25 | 41.78 | 47.82 | 53.44 | 58.66 | 63.54 | 68.13 | 72.48 | 76.59 | 80.48 | 83.99 | 86.90 | 88.89 | | | | | | | |
| | 0.96 | 9.74 | 17.68 | 24.70 | 30.99 | 36.71 | 42.00 | 47.00 | 51.77 | 56.37 | 60.80 | 65.08 | 69.19 | 73.13 | 76.95 | 80.73 | 84.68 | | | | | | | |
| 120 | | 8.19 | 18.06 | 26.70 | 34.51 | 41.66 | 48.27 | 54.38 | 60.06 | 65.36 | 70.34 | 75.05 | 79.53 | 83.80 | 87.83 | 91.44 | 94.39 | 96.28 | | | | | | |
| | | 6.77 | 15.64 | 23.61 | 30.80 | 37.28 | 43.19 | 48.64 | 53.76 | 58.64 | 63.35 | 67.90 | 72.32 | 76.59 | 80.71 | 84.70 | 88.71 | 92.95 | | | | | | |
| 130 | | 4.18 | 14.98 | 24.66 | 33.30 | 41.05 | 48.11 | 54.64 | 60.75 | 66.50 | 71.94 | 77.11 | 82.02 | 86.67 | 91.09 | 95.25 | 98.99 | 102.05 | 103.91 | | | | | |
| | | 3.45 | 13.62 | 22.98 | 31.32 | 38.71 | 45.31 | 51.32 | 56.90 | 62.12 | 67.06 | 71.75 | 76.24 | 80.55 | 84.73 | 88.79 | 92.79 | 96.85 | 101.30 | | | | | |
| 140 | | | 12.05 | 23.00 | 32.55 | 40.96 | 48.49 | 55.35 | 61.74 | 67.79 | 73.54 | 78.97 | 84.22 | 89.26 | 94.05 | 98.57 | 102.83 | 106.70 | 109.86 | 111.84 | | | | |
| | | | 10.94 | 21.54 | 30.84 | 39.03 | 46.34 | 52.99 | 59.16 | 64.96 | 70.39 | 75.44 | 80.29 | 84.90 | 89.21 | 93.27 | 97.20 | 101.09 | 105.09 | 109.58 | | | | |
| 150 | | | 8.50 | 20.52 | 31.17 | 40.67 | 49.12 | 56.68 | 63.52 | 69.85 | 75.86 | 81.67 | 87.27 | 92.59 | 97.58 | 102.29 | 106.76 | 110.88 | 114.66 | 117.81 | 119.94 | | | |
| | | | 7.52 | 19.08 | 29.43 | 38.62 | 46.79 | 54.09 | 60.73 | 66.89 | 72.76 | 78.40 | 83.83 | 88.95 | 93.72 | 98.23 | 102.37 | 106.05 | 109.65 | 113.39 | 117.64 | | | |
| 160 | | | | 18.14 | 30.06 | 40.55 | 49.82 | 58.07 | 65.51 | 72.31 | 78.66 | 84.67 | 90.51 | 96.17 | 101.57 | 106.56 | 111.12 | 115.41 | 119.52 | 123.06 | 125.89 | 127.98 | | |
| | | | | 16.67 | 28.12 | 38.18 | 47.11 | 55.13 | 62.44 | 69.20 | 75.50 | 81.51 | 87.30 | 92.86 | 98.09 | 102.89 | 107.24 | 111.38 | 115.35 | 118.61 | 121.77 | 125.47 | | |
| 170 | | | | 15.84 | 28.99 | 40.40 | 50.35 | 59.14 | 67.07 | 74.34 | 81.11 | 87.51 | 93.65 | 99.63 | 105.43 | 110.85 | 115.76 | 120.12 | 124.04 | 127.78 | 131.23 | 134.12 | 136.01 | |
| | | | | 14.43 | 26.94 | 37.77 | 47.36 | 55.97 | 63.79 | 71.01 | 77.78 | 84.20 | 90.42 | 96.49 | 102.23 | 107.49 | 112.24 | 116.43 | 120.16 | 123.77 | 127.16 | 130.24 | 133.22 | |
| 180 | | | | 12.80 | 27.64 | 40.02 | 50.66 | 59.96 | 68.32 | 76.00 | 83.16 | 89.93 | 96.41 | 102.67 | 108.81 | 114.69 | 119.99 | 124.69 | 128.80 | 132.37 | 135.61 | 138.58 | 141.01 | 142.69 |
| | | | | 11.85 | 25.75 | 37.46 | 47.73 | 56.84 | 65.08 | 72.67 | 79.81 | 86.62 | 93.14 | 99.46 | 105.68 | 111.55 | 116.76 | 121.33 | 125.32 | 128.76 | 131.91 | 134.94 | 137.69 | 140.29 |
| 190 | | | | | 25.78 | 39.59 | 51.05 | 60.85 | 69.56 | 77.55 | 84.99 | 92.04 | 98.81 | 105.35 | 111.66 | 117.80 | 123.53 | 128.55 | 132.86 | 136.61 | 139.81 | 142.47 | 144.74 | 146.42 |
| | | | | | 24.40 | 37.52 | 48.50 | 58.01 | 66.59 | 74.50 | 81.93 | 89.06 | 96.02 | 102.68 | 109.03 | 115.16 | 120.88 | 125.83 | 130.08 | 133.78 | 136.97 | 139.74 | 142.43 | 145.01 |

(mm)

DIAMETER D= 400
HEIGHT h= 147
EXPANSION ANGLE $\lambda$ = 120
BOSS RATIO $\nu$ = 0.275

TABLE 205

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 187-190,
Replace Table 206 with the following:

| θ \ r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 25.40 | 28.81 | 32.03 | 35.17 | 38.29 | 41.35 | 44.33 | 47.20 | 49.95 | 52.60 | 55.10 | 57.44 | 59.49 | 61.16 | 62.18 | 62.22 | | | | | | |
| | | | 22.32 | 24.47 | 26.63 | 28.78 | 30.94 | 33.16 | 35.48 | 37.94 | 40.47 | 43.05 | 45.62 | 48.15 | 50.67 | 53.23 | 55.98 | 59.20 | | | | | | |
| 70 | | 19.58 | 24.13 | 28.25 | 32.15 | 35.88 | 39.45 | 42.83 | 46.06 | 49.16 | 52.12 | 54.95 | 57.58 | 59.80 | 61.37 | 61.86 | | | | | | | | |
| | | 16.84 | 20.01 | 23.06 | 26.05 | 29.03 | 32.05 | 35.12 | 38.23 | 41.33 | 44.37 | 47.33 | 50.20 | 53.04 | 55.97 | 59.24 | | | | | | | | |
| 80 | 11.68 | 17.69 | 22.88 | 27.65 | 32.14 | 36.40 | 40.41 | 44.18 | 47.76 | 51.17 | 54.41 | 57.47 | 60.23 | 62.52 | 64.09 | 64.51 | | | | | | | | |
| | 10.10 | 14.64 | 18.81 | 22.73 | 26.48 | 30.14 | 33.74 | 37.29 | 40.78 | 44.18 | 47.46 | 50.58 | 53.56 | 56.46 | 59.40 | 62.67 | | | | | | | | |
| 90 | 9.34 | 15.67 | 21.53 | 27.00 | 32.12 | 36.90 | 41.39 | 45.60 | 49.55 | 53.29 | 56.82 | 60.14 | 63.18 | 65.80 | 67.82 | 68.82 | | | | | | | | |
| | 7.38 | 12.93 | 18.05 | 22.78 | 27.18 | 31.35 | 35.36 | 39.24 | 43.03 | 46.69 | 50.19 | 53.51 | 56.63 | 59.64 | 62.63 | 65.84 | | | | | | | | |
| 100 | 5.60 | 13.26 | 20.10 | 26.32 | 32.08 | 37.42 | 42.40 | 47.05 | 51.39 | 55.47 | 59.31 | 62.93 | 66.32 | 69.40 | 72.01 | 73.90 | 74.58 | | | | | | | |
| | 4.35 | 11.07 | 17.22 | 22.76 | 27.79 | 32.43 | 36.82 | 41.02 | 45.08 | 48.99 | 52.75 | 56.34 | 59.72 | 62.95 | 66.11 | 69.35 | 72.99 | | | | | | | |
| 110 | 1.32 | 10.55 | 18.46 | 25.49 | 31.89 | 37.80 | 43.27 | 48.35 | 53.07 | 57.49 | 61.64 | 65.57 | 69.30 | 72.81 | 75.99 | 78.63 | 80.42 | | | | | | | |
| | 0.87 | 8.81 | 15.99 | 22.35 | 28.03 | 33.21 | 38.00 | 42.53 | 46.84 | 51.00 | 55.01 | 58.88 | 62.60 | 66.17 | 69.62 | 73.04 | 76.61 | | | | | | | |
| 120 | | 7.41 | 16.34 | 24.16 | 31.22 | 37.70 | 43.67 | 49.20 | 54.34 | 59.13 | 63.64 | 67.90 | 71.96 | 75.82 | 79.46 | 82.74 | 85.40 | 87.11 | | | | | | |
| | | 6.12 | 14.15 | 21.36 | 27.86 | 33.73 | 39.08 | 44.01 | 48.64 | 53.06 | 57.31 | 61.44 | 65.43 | 69.30 | 73.02 | 76.63 | 80.26 | 84.10 | | | | | | |
| 130 | | 3.79 | 13.56 | 22.31 | 30.13 | 37.14 | 43.53 | 49.44 | 54.96 | 60.16 | 65.09 | 69.76 | 74.20 | 78.42 | 82.41 | 86.18 | 89.57 | 92.33 | 94.02 | | | | | |
| | | 3.12 | 12.32 | 20.79 | 28.34 | 35.02 | 41.00 | 46.44 | 51.48 | 56.21 | 60.67 | 64.92 | 68.98 | 72.88 | 76.66 | 80.33 | 83.95 | 87.63 | 91.65 | | | | | |
| 140 | | | 10.90 | 20.81 | 29.45 | 37.06 | 43.87 | 50.08 | 55.86 | 61.33 | 66.53 | 71.45 | 76.20 | 80.76 | 85.10 | 89.18 | 93.04 | 96.54 | 99.40 | 101.19 | | | | |
| | | | 9.89 | 19.49 | 27.91 | 35.31 | 41.92 | 47.94 | 53.52 | 58.77 | 63.68 | 68.26 | 72.65 | 76.81 | 80.72 | 84.39 | 87.94 | 91.47 | 95.08 | 99.14 | | | | |
| 150 | | | 7.69 | 18.56 | 28.20 | 36.79 | 44.44 | 51.28 | 57.47 | 63.20 | 68.64 | 73.89 | 78.95 | 83.77 | 88.28 | 92.55 | 96.59 | 100.32 | 103.74 | 106.59 | 108.51 | | | |
| | | | 6.81 | 17.26 | 26.62 | 34.94 | 42.33 | 48.94 | 54.94 | 60.52 | 65.83 | 70.94 | 75.84 | 80.48 | 84.79 | 88.88 | 92.62 | 95.95 | 99.20 | 102.59 | 106.43 | | | |
| 160 | | | | 16.41 | 27.19 | 36.69 | 45.07 | 52.54 | 59.27 | 65.43 | 71.17 | 76.61 | 81.89 | 87.01 | 91.89 | 96.41 | 100.53 | 104.42 | 108.14 | 111.34 | 113.90 | 115.80 | | |
| | | | | 15.08 | 25.44 | 34.54 | 42.62 | 49.88 | 56.50 | 62.61 | 68.31 | 73.74 | 78.99 | 84.02 | 88.75 | 93.09 | 97.03 | 100.77 | 104.36 | 107.32 | 110.17 | 113.52 | | |
| 170 | | | | 14.33 | 26.23 | 36.55 | 45.55 | 53.50 | 60.68 | 67.26 | 73.38 | 79.18 | 84.73 | 90.14 | 95.39 | 100.29 | 104.74 | 108.68 | 112.22 | 115.61 | 118.73 | 121.35 | 123.06 | |
| | | | | 13.06 | 24.38 | 34.17 | 42.85 | 50.64 | 57.71 | 64.25 | 70.37 | 76.18 | 81.81 | 87.30 | 92.49 | 97.26 | 101.55 | 105.34 | 108.71 | 111.98 | 115.05 | 117.84 | 120.53 | |
| 180 | | | | 11.58 | 25.01 | 36.21 | 45.83 | 54.25 | 61.81 | 68.76 | 75.24 | 81.37 | 87.22 | 92.89 | 98.45 | 103.76 | 108.57 | 112.81 | 116.53 | 119.77 | 122.70 | 125.36 | 127.58 | 129.10 |
| | | | | 10.72 | 23.30 | 33.89 | 43.19 | 51.43 | 58.88 | 65.75 | 72.21 | 78.37 | 84.27 | 89.98 | 95.61 | 100.93 | 105.64 | 109.78 | 113.38 | 116.49 | 119.35 | 122.09 | 124.58 | 126.93 |
| 190 | | | | | 23.33 | 35.82 | 46.19 | 55.05 | 62.93 | 70.16 | 76.90 | 83.27 | 89.40 | 95.31 | 101.03 | 106.58 | 111.76 | 116.30 | 120.21 | 123.60 | 126.49 | 128.90 | 130.95 | 132.47 |
| | | | | | 22.07 | 33.95 | 43.88 | 52.48 | 60.25 | 67.41 | 74.13 | 80.58 | 86.87 | 92.90 | 98.64 | 104.20 | 109.36 | 113.84 | 117.69 | 121.04 | 123.92 | 126.43 | 128.87 | 131.20 |

(mm)

DIAMETER D= 400
HEIGHT h= 133
EXPANSION ANGLE $\lambda$ = 120
BOSS RATIO $\nu$ = 0.275

TABLE 206

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 189-192,
Replace Table 207 with the following:

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 24.06 | 27.30 | 30.34 | 33.32 | 36.27 | 39.18 | 42.00 | 44.71 | 47.33 | 49.83 | 52.20 | 54.41 | 56.36 | 57.94 | 58.91 | 58.95 | | | | | | |
| | | | 21.15 | 23.18 | 25.23 | 27.27 | 29.31 | 31.41 | 33.62 | 35.94 | 38.34 | 40.79 | 43.22 | 45.61 | 48.00 | 50.42 | 53.03 | 56.09 | | | | | | |
| 70 | | 18.55 | 22.86 | 26.77 | 30.46 | 33.99 | 37.38 | 40.58 | 43.63 | 46.57 | 49.38 | 52.06 | 54.55 | 56.65 | 58.14 | 58.61 | | | | | | | | |
| | | 15.96 | 18.96 | 21.85 | 24.68 | 27.50 | 30.36 | 33.27 | 36.22 | 39.15 | 42.04 | 44.84 | 47.55 | 50.25 | 53.03 | 56.13 | | | | | | | | |
| 80 | 11.07 | 16.76 | 21.67 | 26.20 | 30.45 | 34.48 | 38.28 | 41.85 | 45.24 | 48.47 | 51.55 | 54.44 | 57.06 | 59.23 | 60.71 | 61.12 | | | | | | | | |
| | 9.57 | 13.67 | 17.82 | 21.54 | 25.09 | 28.55 | 31.96 | 35.32 | 38.63 | 41.86 | 44.96 | 47.92 | 50.74 | 53.49 | 56.28 | 59.37 | | | | | | | | |
| 90 | 8.85 | 14.85 | 20.40 | 25.58 | 30.43 | 34.96 | 39.21 | 43.20 | 46.95 | 50.49 | 53.83 | 56.97 | 59.86 | 62.34 | 64.25 | 65.20 | | | | | | | | |
| | 6.99 | 12.25 | 17.10 | 21.58 | 25.75 | 29.70 | 33.49 | 37.18 | 40.76 | 44.23 | 47.55 | 50.69 | 53.65 | 56.50 | 59.33 | 62.38 | | | | | | | | |
| 100 | 5.31 | 12.56 | 19.04 | 24.94 | 30.39 | 35.45 | 40.17 | 44.57 | 48.69 | 52.55 | 56.19 | 59.62 | 62.83 | 65.75 | 68.22 | 70.01 | 70.65 | | | | | | | |
| | 4.12 | 10.49 | 16.32 | 21.57 | 26.32 | 30.72 | 34.88 | 38.86 | 42.70 | 46.42 | 49.98 | 53.37 | 56.58 | 59.64 | 62.63 | 65.70 | 69.15 | | | | | | | |
| 110 | 1.25 | 10.00 | 17.49 | 24.15 | 30.22 | 35.81 | 40.99 | 45.81 | 50.28 | 54.46 | 58.40 | 62.12 | 65.65 | 68.98 | 71.99 | 74.49 | 76.19 | | | | | | | |
| | 0.83 | 8.35 | 15.15 | 21.17 | 26.56 | 31.46 | 36.00 | 40.29 | 44.38 | 48.32 | 52.12 | 55.78 | 59.31 | 62.69 | 65.96 | 69.20 | 72.58 | | | | | | | |
| 120 | | 7.02 | 15.48 | 22.89 | 29.58 | 35.71 | 41.37 | 46.61 | 51.48 | 56.02 | 60.29 | 64.33 | 68.17 | 71.83 | 75.28 | 78.38 | 80.91 | 82.53 | | | | | | |
| | | 5.80 | 13.41 | 20.24 | 26.40 | 31.96 | 37.02 | 41.69 | 46.08 | 50.26 | 54.30 | 58.20 | 61.99 | 65.65 | 69.18 | 72.60 | 76.04 | 79.67 | | | | | | |
| 130 | | 3.59 | 12.84 | 21.14 | 28.54 | 35.19 | 41.24 | 46.84 | 52.07 | 57.00 | 61.66 | 66.09 | 70.30 | 74.29 | 78.07 | 81.64 | 84.85 | 87.47 | 89.07 | | | | | |
| | | 2.96 | 11.67 | 19.69 | 26.84 | 33.18 | 38.84 | 43.99 | 48.77 | 53.25 | 57.48 | 61.50 | 65.35 | 69.04 | 72.62 | 76.10 | 79.53 | 83.02 | 86.83 | | | | | |
| 140 | | | 10.33 | 19.71 | 27.90 | 35.11 | 41.56 | 47.44 | 52.92 | 58.10 | 63.03 | 67.69 | 72.19 | 76.50 | 80.62 | 84.49 | 88.14 | 91.46 | 94.17 | 95.86 | | | | |
| | | | 9.37 | 18.47 | 26.44 | 33.46 | 39.72 | 45.42 | 50.71 | 55.68 | 60.33 | 64.66 | 68.82 | 72.77 | 76.47 | 79.95 | 83.31 | 86.65 | 90.07 | 93.93 | | | | |
| 150 | | | 7.29 | 17.59 | 26.72 | 34.86 | 42.10 | 48.58 | 54.45 | 59.87 | 65.03 | 70.00 | 74.80 | 79.37 | 83.64 | 87.67 | 91.51 | 95.04 | 98.28 | 100.98 | 102.80 | | | |
| | | | 6.45 | 16.35 | 25.22 | 33.10 | 40.10 | 46.37 | 52.05 | 57.33 | 62.37 | 67.20 | 71.85 | 76.24 | 80.33 | 84.20 | 87.75 | 90.90 | 93.98 | 97.19 | 100.83 | | | |
| 160 | | | | 15.55 | 25.76 | 34.76 | 42.70 | 49.77 | 56.15 | 61.98 | 67.42 | 72.58 | 77.58 | 82.43 | 87.06 | 91.34 | 95.24 | 98.93 | 102.45 | 105.48 | 107.91 | 109.70 | | |
| | | | | 14.29 | 24.10 | 32.73 | 40.38 | 47.25 | 53.52 | 59.31 | 64.71 | 69.86 | 74.83 | 79.59 | 84.08 | 88.19 | 91.92 | 95.47 | 98.87 | 101.67 | 104.37 | 107.54 | | |
| 170 | | | | 13.57 | 24.85 | 34.63 | 43.15 | 50.69 | 57.49 | 63.72 | 69.52 | 75.01 | 80.27 | 85.39 | 90.37 | 95.01 | 99.23 | 102.96 | 106.32 | 109.53 | 112.48 | 114.96 | 116.58 | |
| | | | | 12.37 | 23.09 | 32.38 | 40.60 | 47.97 | 54.68 | 60.87 | 66.67 | 72.17 | 77.50 | 82.71 | 87.63 | 92.14 | 96.21 | 99.79 | 102.99 | 106.09 | 108.99 | 111.63 | 114.19 | |
| 180 | | | | 10.97 | 23.69 | 34.30 | 43.42 | 51.39 | 58.56 | 65.14 | 71.28 | 77.08 | 82.63 | 88.00 | 93.27 | 98.30 | 102.85 | 106.87 | 110.40 | 113.46 | 116.24 | 118.78 | 120.87 | 122.31 |
| | | | | 10.16 | 22.07 | 32.11 | 40.91 | 48.72 | 55.78 | 62.29 | 68.41 | 74.25 | 79.83 | 85.25 | 90.58 | 95.61 | 100.08 | 104.00 | 107.42 | 110.38 | 113.07 | 115.88 | 118.02 | 120.25 |
| 190 | | | | | 22.10 | 33.93 | 43.76 | 52.15 | 59.62 | 66.47 | 72.85 | 78.89 | 84.69 | 90.30 | 95.71 | 100.97 | 105.88 | 110.18 | 113.88 | 117.10 | 119.83 | 122.12 | 124.06 | 125.50 |
| | | | | | 20.91 | 32.16 | 41.57 | 49.72 | 57.08 | 63.86 | 70.23 | 76.34 | 82.30 | 88.01 | 93.45 | 98.71 | 103.61 | 107.85 | 111.50 | 114.67 | 117.40 | 119.78 | 122.09 | 124.29 |

(mm)

DIAMETER $D = 400$
HEIGHT $h = 126$
EXPANSION ANGLE $\lambda = 120$
BOSS RATIO $\nu = 0.275$

TABLE 207

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 193-194,
Replace Table 208 with the following:

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 21.39 | 24.26 | 26.97 | 29.62 | 32.24 | 34.82 | 37.33 | 39.74 | 42.07 | 44.29 | 46.40 | 48.37 | 50.10 | 51.51 | 52.36 | 52.40 | | | | | | |
| | | | 18.80 | 20.60 | 22.42 | 24.24 | 26.05 | 27.92 | 29.88 | 31.95 | 34.08 | 36.25 | 38.42 | 40.55 | 42.67 | 44.82 | 47.14 | 49.86 | | | | | | |
| 70 | | 16.49 | 20.32 | 23.79 | 27.07 | 30.22 | 33.22 | 36.07 | 38.78 | 41.39 | 43.89 | 46.28 | 48.49 | 50.36 | 51.68 | 52.10 | | | | | | | | |
| | | 14.18 | 16.85 | 19.42 | 21.93 | 24.45 | 26.99 | 29.58 | 32.19 | 34.80 | 37.37 | 39.86 | 42.27 | 44.67 | 47.13 | 49.89 | | | | | | | | |
| 80 | 9.84 | 14.90 | 19.26 | 23.29 | 27.07 | 30.65 | 34.03 | 37.20 | 40.22 | 43.09 | 45.82 | 48.39 | 50.72 | 52.65 | 53.97 | 54.33 | | | | | | | | |
| | 8.51 | 12.33 | 15.84 | 19.14 | 22.30 | 25.38 | 28.41 | 31.40 | 34.34 | 37.20 | 39.97 | 42.60 | 45.10 | 47.54 | 50.02 | 52.77 | | | | | | | | |
| 90 | 7.86 | 13.20 | 18.13 | 22.74 | 27.05 | 31.08 | 34.85 | 38.40 | 41.73 | 44.88 | 47.85 | 50.64 | 53.21 | 55.41 | 57.11 | 57.95 | | | | | | | | |
| | 6.21 | 10.88 | 15.20 | 19.18 | 22.89 | 26.40 | 29.77 | 33.05 | 36.23 | 39.32 | 42.27 | 45.08 | 47.69 | 50.22 | 52.74 | 55.45 | | | | | | | | |
| 100 | 4.72 | 11.17 | 16.93 | 22.17 | 27.01 | 31.51 | 35.71 | 39.62 | 43.28 | 46.71 | 49.95 | 52.99 | 55.85 | 58.44 | 60.64 | 62.23 | 62.80 | | | | | | | |
| | 3.66 | 9.32 | 14.51 | 19.17 | 23.40 | 27.31 | 31.01 | 34.54 | 37.96 | 41.26 | 44.42 | 47.44 | 50.29 | 53.01 | 55.67 | 58.40 | 61.47 | | | | | | | |
| 110 | 1.11 | 8.89 | 15.55 | 21.47 | 26.86 | 31.83 | 36.44 | 40.72 | 44.69 | 48.41 | 51.91 | 55.22 | 58.36 | 61.32 | 63.99 | 66.21 | 67.72 | | | | | | | |
| | 0.73 | 7.42 | 13.47 | 18.82 | 23.61 | 27.97 | 32.00 | 35.81 | 39.45 | 42.95 | 46.33 | 49.58 | 52.72 | 55.72 | 58.63 | 61.51 | 64.52 | | | | | | | |
| 120 | | 6.24 | 13.76 | 20.35 | 26.29 | 31.74 | 36.77 | 41.43 | 45.76 | 49.80 | 53.59 | 57.18 | 60.60 | 63.85 | 66.92 | 69.67 | 71.92 | 73.36 | | | | | | |
| | | 5.16 | 11.92 | 17.99 | 23.46 | 28.41 | 32.91 | 37.06 | 40.96 | 44.68 | 48.26 | 51.74 | 55.10 | 58.36 | 61.49 | 64.53 | 67.59 | 70.82 | | | | | | |
| 130 | | 3.19 | 11.42 | 18.79 | 25.37 | 31.28 | 36.66 | 41.63 | 46.28 | 50.66 | 54.81 | 58.75 | 62.49 | 66.04 | 69.40 | 72.57 | 75.42 | 77.75 | 79.17 | | | | | |
| | | 2.63 | 10.37 | 17.51 | 23.86 | 29.49 | 34.52 | 39.10 | 43.35 | 47.33 | 51.09 | 54.67 | 58.09 | 61.37 | 64.55 | 67.65 | 70.70 | 73.79 | 77.18 | | | | | |
| 140 | | | 9.18 | 17.52 | 24.80 | 31.21 | 36.94 | 42.17 | 47.04 | 51.65 | 56.03 | 60.17 | 64.16 | 68.00 | 71.66 | 75.10 | 78.35 | 81.30 | 83.70 | 85.21 | | | | |
| | | | 8.33 | 16.41 | 23.50 | 29.74 | 35.30 | 40.37 | 45.07 | 49.49 | 53.63 | 57.48 | 61.18 | 64.68 | 67.97 | 71.06 | 74.06 | 77.02 | 80.06 | 83.49 | | | | |
| 150 | | | 6.48 | 15.63 | 23.75 | 30.98 | 37.42 | 43.18 | 48.40 | 53.22 | 57.80 | 62.22 | 66.49 | 70.55 | 74.34 | 77.93 | 81.34 | 84.48 | 87.36 | 89.76 | 91.38 | | | |
| | | | 5.73 | 14.54 | 22.42 | 29.42 | 35.65 | 41.21 | 46.27 | 50.96 | 55.44 | 59.74 | 63.87 | 67.77 | 71.40 | 74.84 | 78.00 | 80.80 | 83.54 | 86.39 | 89.63 | | | |
| 160 | | | | 13.82 | 22.90 | 30.89 | 37.96 | 44.24 | 49.91 | 55.10 | 59.93 | 64.51 | 68.96 | 73.27 | 77.38 | 81.19 | 84.66 | 87.93 | 91.06 | 93.76 | 95.92 | 97.51 | | |
| | | | | 12.70 | 21.43 | 29.09 | 35.89 | 42.00 | 47.57 | 52.72 | 57.52 | 62.10 | 66.51 | 70.75 | 74.74 | 78.39 | 81.71 | 84.86 | 87.88 | 90.37 | 92.77 | 95.60 | | |
| 170 | | | | 12.07 | 22.09 | 30.78 | 38.36 | 45.06 | 51.10 | 56.64 | 61.80 | 66.68 | 71.35 | 75.91 | 80.32 | 84.45 | 88.20 | 91.52 | 94.50 | 97.36 | 99.98 | 102.19 | 103.63 | |
| | | | | 11.00 | 20.53 | 28.78 | 36.09 | 42.64 | 48.60 | 54.10 | 59.26 | 64.15 | 68.89 | 73.52 | 77.89 | 81.90 | 85.52 | 88.71 | 91.55 | 94.30 | 96.88 | 99.23 | 101.50 | |
| 180 | | | | 9.75 | 21.06 | 30.49 | 38.59 | 45.68 | 52.05 | 57.90 | 63.36 | 68.52 | 73.45 | 78.23 | 82.91 | 87.38 | 91.42 | 95.00 | 98.13 | 100.86 | 103.32 | 105.58 | 107.44 | 108.72 |
| | | | | 9.03 | 19.62 | 28.54 | 36.37 | 43.31 | 49.59 | 55.37 | 60.81 | 66.00 | 70.96 | 75.78 | 80.52 | 84.99 | 88.96 | 92.44 | 95.48 | 98.10 | 100.50 | 102.81 | 104.91 | 106.89 |
| 190 | | | | | 19.65 | 30.16 | 38.89 | 46.36 | 53.00 | 59.09 | 64.76 | 70.12 | 75.28 | 80.26 | 85.08 | 89.75 | 94.12 | 97.94 | 101.23 | 104.08 | 106.52 | 108.55 | 110.28 | 111.56 |
| | | | | | 18.59 | 28.59 | 36.95 | 44.20 | 50.74 | 56.76 | 62.42 | 67.86 | 73.15 | 78.23 | 83.07 | 87.74 | 92.10 | 95.87 | 99.11 | 101.93 | 104.36 | 106.47 | 108.52 | 110.48 |

(mm)

DIAMETER D= 400
HEIGHT h= 112
EXPANSION ANGLE $\lambda$ = 120
BOSS RATIO $\nu$ = 0.275

TABLE 208

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 195-198,
Replace Table 209 with the following:

| θ / r | 4.5 | 9 | 13.5 | 18 | 22.5 | 27 | 31.5 | 36 | 40.5 | 45 | 49.5 | 54 | 58.5 | 63 | 67.5 | 72 | 76.5 | 81 | 85.5 | 90 | 94.5 | 99 | 103.5 | 108 (deg) |
|---|---|---|---|---|---|---|---|---|---|---|---|---|---|---|---|---|---|---|---|---|---|---|---|---|
| 60 | | | 24.06 | 27.30 | 30.34 | 33.32 | 36.27 | 39.18 | 42.00 | 44.71 | 47.33 | 49.83 | 52.20 | 54.41 | 56.36 | 57.94 | 58.91 | 58.95 | | | | | | |
| | | | 21.15 | 23.18 | 25.23 | 27.27 | 29.31 | 31.41 | 33.62 | 35.94 | 38.34 | 40.79 | 43.22 | 45.61 | 48.00 | 50.42 | 53.03 | 56.09 | | | | | | |
| 70 | | 18.55 | 22.86 | 26.77 | 30.46 | 33.99 | 37.38 | 40.58 | 43.63 | 46.57 | 49.38 | 52.06 | 54.55 | 56.65 | 58.14 | 58.61 | | | | | | | | |
| | | 15.96 | 18.98 | 21.85 | 24.68 | 27.50 | 30.36 | 33.27 | 36.22 | 39.15 | 42.04 | 44.84 | 47.55 | 50.25 | 53.03 | 56.13 | | | | | | | | |
| 80 | 11.07 | 16.76 | 21.67 | 26.20 | 30.45 | 34.48 | 38.28 | 41.85 | 45.24 | 48.47 | 51.55 | 54.44 | 57.06 | 59.23 | 60.71 | 61.12 | | | | | | | | |
| | 9.57 | 13.87 | 17.82 | 21.54 | 25.09 | 28.55 | 31.96 | 35.32 | 38.63 | 41.86 | 44.96 | 47.92 | 50.74 | 53.49 | 56.28 | 59.37 | | | | | | | | |
| 90 | 8.85 | 14.85 | 20.40 | 25.58 | 30.43 | 34.96 | 39.21 | 43.20 | 46.95 | 50.49 | 53.83 | 56.97 | 59.86 | 62.34 | 64.25 | 65.20 | | | | | | | | |
| | 6.99 | 12.25 | 17.10 | 21.58 | 25.75 | 29.70 | 33.49 | 37.18 | 40.76 | 44.23 | 47.55 | 50.69 | 53.65 | 56.50 | 59.33 | 62.38 | | | | | | | | |
| 100 | 5.31 | 12.56 | 19.04 | 24.94 | 30.39 | 35.45 | 40.17 | 44.57 | 48.69 | 52.55 | 56.19 | 59.62 | 62.83 | 65.75 | 68.22 | 70.01 | 70.65 | | | | | | | |
| | 4.12 | 10.49 | 16.32 | 21.57 | 26.32 | 30.72 | 34.88 | 38.86 | 42.70 | 46.42 | 49.98 | 53.37 | 56.58 | 59.64 | 62.63 | 65.70 | 69.15 | | | | | | | |
| 110 | 1.25 | 10.00 | 17.49 | 24.15 | 30.22 | 35.81 | 40.99 | 45.81 | 50.28 | 54.46 | 58.40 | 62.12 | 65.65 | 68.98 | 71.99 | 74.49 | 76.19 | | | | | | | |
| | 0.83 | 8.35 | 15.15 | 21.17 | 26.56 | 31.46 | 36.00 | 40.29 | 44.38 | 48.32 | 52.12 | 55.78 | 59.31 | 62.69 | 65.96 | 69.20 | 72.58 | | | | | | | |
| 120 | | 7.02 | 15.48 | 22.89 | 29.58 | 35.71 | 41.37 | 46.61 | 51.48 | 56.02 | 60.29 | 64.33 | 68.17 | 71.83 | 75.28 | 78.38 | 80.91 | 82.53 | | | | | | |
| | | 5.80 | 13.41 | 20.24 | 26.40 | 31.96 | 37.02 | 41.69 | 46.08 | 50.26 | 54.30 | 58.20 | 61.99 | 65.65 | 69.18 | 72.60 | 76.04 | 79.67 | | | | | | |
| 130 | | 3.59 | 12.84 | 21.14 | 28.54 | 35.19 | 41.24 | 46.84 | 52.07 | 57.00 | 61.66 | 66.09 | 70.30 | 74.29 | 78.07 | 81.64 | 84.85 | 87.47 | 89.07 | | | | | |
| | | 2.96 | 11.67 | 19.69 | 26.84 | 33.18 | 38.84 | 43.99 | 48.77 | 53.25 | 57.48 | 61.50 | 65.35 | 69.04 | 72.62 | 76.10 | 79.53 | 83.02 | 86.83 | | | | | |
| 140 | | | 10.33 | 19.71 | 27.90 | 35.11 | 41.56 | 47.44 | 52.92 | 58.10 | 63.03 | 67.69 | 72.19 | 76.50 | 80.62 | 84.49 | 88.14 | 91.46 | 94.17 | 95.86 | | | | |
| | | | 9.37 | 18.47 | 26.44 | 33.46 | 39.72 | 45.42 | 50.71 | 55.68 | 60.33 | 64.66 | 68.82 | 72.77 | 76.47 | 79.95 | 83.31 | 86.65 | 90.07 | 93.93 | | | | |
| 150 | | | 7.29 | 17.59 | 26.72 | 34.86 | 42.10 | 48.58 | 54.45 | 59.87 | 65.03 | 70.00 | 74.80 | 79.37 | 83.64 | 87.67 | 91.51 | 95.04 | 98.28 | 100.98 | 102.80 | | | |
| | | | 6.45 | 16.35 | 25.22 | 33.10 | 40.10 | 46.37 | 52.05 | 57.33 | 62.37 | 67.20 | 71.85 | 76.24 | 80.33 | 84.20 | 87.75 | 90.90 | 93.98 | 97.19 | 100.83 | | | |
| 160 | | | | 15.55 | 25.76 | 34.76 | 42.70 | 49.77 | 56.15 | 61.98 | 67.42 | 72.58 | 77.58 | 82.43 | 87.06 | 91.34 | 95.24 | 98.93 | 102.45 | 105.48 | 107.91 | 109.70 | | |
| | | | | 14.29 | 24.10 | 32.73 | 40.38 | 47.25 | 53.52 | 59.31 | 64.71 | 69.86 | 74.83 | 79.59 | 84.08 | 88.19 | 91.92 | 95.47 | 98.87 | 101.67 | 104.37 | 107.54 | | |
| 170 | | | | 13.57 | 24.85 | 34.63 | 43.15 | 50.69 | 57.49 | 63.72 | 69.52 | 75.01 | 80.27 | 85.39 | 90.37 | 95.01 | 99.23 | 102.96 | 106.32 | 109.53 | 112.48 | 114.96 | 116.58 | |
| | | | | 12.37 | 23.09 | 32.38 | 40.60 | 47.97 | 54.68 | 60.87 | 66.67 | 72.17 | 77.50 | 82.71 | 87.63 | 92.14 | 96.21 | 99.79 | 102.99 | 106.09 | 108.99 | 111.63 | 114.19 | |
| 180 | | | | 10.97 | 23.69 | 34.30 | 43.42 | 51.39 | 58.56 | 65.14 | 71.28 | 77.08 | 82.63 | 88.00 | 93.27 | 98.30 | 102.85 | 106.87 | 110.40 | 113.46 | 116.24 | 118.78 | 120.87 | 122.31 |
| | | | | 10.16 | 22.07 | 32.11 | 40.91 | 48.72 | 55.78 | 62.29 | 68.41 | 74.25 | 79.83 | 85.25 | 90.58 | 95.61 | 100.08 | 104.00 | 107.42 | 110.36 | 113.07 | 115.86 | 118.02 | 120.25 |
| 190 | | | | | 22.10 | 33.93 | 43.76 | 52.15 | 59.62 | 66.47 | 72.85 | 78.89 | 84.69 | 90.30 | 95.71 | 100.97 | 105.88 | 110.18 | 113.88 | 117.10 | 119.83 | 122.12 | 124.06 | 125.50 |
| | | | | | 20.91 | 32.16 | 41.57 | 49.72 | 57.08 | 63.86 | 70.23 | 76.34 | 82.30 | 88.01 | 93.45 | 98.71 | 103.61 | 107.85 | 111.50 | 114.67 | 117.40 | 119.78 | 122.09 | 124.29 |

(mm)

DIAMETER $D = 400$
HEIGHT $h = 126$
EXPANSION ANGLE $\lambda = 108$
BOSS RATIO $\nu = 0.275$

TABLE 209

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 197-200,
Replace Table 210 with the following:

| θ / r | 3.75 | 7.5 | 11.25 | 15 | 18.75 | 22.5 | 26.25 | 30 | 33.75 | 37.5 | 41.25 | 45 | 48.75 | 52.5 | 56.25 | 60 | 63.75 | 67.5 | 71.25 | 75 | 78.75 | 82.5 | 86.25 | 90 (deg) |
|---|---|---|---|---|---|---|---|---|---|---|---|---|---|---|---|---|---|---|---|---|---|---|---|---|
| 60 | | | 26.73 | 30.33 | 33.72 | 37.03 | 40.30 | 43.53 | 46.66 | 49.68 | 52.58 | 55.37 | 58.00 | 60.46 | 62.63 | 64.38 | 65.45 | 65.50 | | | | | | |
| | | | 23.50 | 25.75 | 28.03 | 30.30 | 32.56 | 34.90 | 37.35 | 39.94 | 42.60 | 45.32 | 48.02 | 50.68 | 53.33 | 56.03 | 58.92 | 62.32 | | | | | | |
| 70 | | 20.62 | 25.40 | 29.74 | 33.84 | 37.77 | 41.53 | 45.09 | 48.48 | 51.74 | 54.87 | 57.84 | 60.61 | 62.95 | 64.60 | 65.12 | | | | | | | | |
| | | 17.73 | 21.07 | 24.27 | 27.42 | 30.56 | 33.74 | 36.97 | 40.24 | 43.50 | 46.71 | 49.82 | 52.84 | 55.83 | 58.92 | 62.36 | | | | | | | | |
| 80 | 12.30 | 18.62 | 24.08 | 29.11 | 33.83 | 38.32 | 42.53 | 46.50 | 50.27 | 53.86 | 57.28 | 60.49 | 63.40 | 65.81 | 67.46 | 67.91 | | | | | | | | |
| | 10.63 | 15.41 | 19.80 | 23.93 | 27.88 | 31.72 | 35.51 | 39.25 | 42.92 | 46.51 | 49.96 | 53.24 | 56.38 | 59.43 | 62.53 | 65.97 | | | | | | | | |
| 90 | 9.83 | 16.50 | 22.67 | 28.43 | 33.81 | 38.84 | 43.57 | 48.00 | 52.16 | 56.10 | 59.81 | 63.30 | 66.51 | 69.27 | 71.39 | 72.44 | | | | | | | | |
| | 7.77 | 13.61 | 19.00 | 23.98 | 28.61 | 33.00 | 37.22 | 41.31 | 45.29 | 49.14 | 52.83 | 56.33 | 59.61 | 62.78 | 65.93 | 69.31 | | | | | | | | |
| 100 | 5.90 | 13.96 | 21.16 | 27.71 | 33.76 | 39.39 | 44.64 | 49.53 | 54.10 | 58.39 | 62.43 | 66.24 | 69.81 | 73.05 | 75.80 | 77.79 | 78.50 | | | | | | | |
| | 4.58 | 11.65 | 18.13 | 23.96 | 29.25 | 34.14 | 38.76 | 43.18 | 47.45 | 51.57 | 55.53 | 59.30 | 62.87 | 66.26 | 69.59 | 73.00 | 76.83 | | | | | | | |
| 110 | 1.39 | 11.11 | 19.43 | 26.84 | 33.57 | 39.79 | 45.55 | 50.89 | 55.87 | 60.51 | 64.89 | 69.03 | 72.95 | 76.65 | 79.99 | 82.76 | 84.65 | | | | | | | |
| | 0.92 | 9.28 | 16.83 | 23.52 | 29.51 | 34.96 | 40.00 | 44.76 | 49.31 | 53.69 | 57.91 | 61.98 | 65.90 | 69.65 | 73.28 | 76.89 | 80.65 | | | | | | | |
| 120 | | 7.80 | 17.20 | 25.43 | 32.87 | 39.68 | 45.97 | 51.79 | 57.20 | 62.25 | 66.99 | 71.48 | 75.74 | 79.81 | 83.65 | 87.09 | 89.90 | 91.70 | | | | | | |
| | | 6.45 | 14.90 | 22.49 | 29.33 | 35.51 | 41.14 | 46.33 | 51.20 | 55.85 | 60.33 | 64.67 | 68.88 | 72.95 | 76.87 | 80.67 | 84.48 | 88.52 | | | | | | |
| 130 | | 3.98 | 14.27 | 23.49 | 31.72 | 39.10 | 45.82 | 52.04 | 57.85 | 63.33 | 68.52 | 73.44 | 78.11 | 82.55 | 86.75 | 90.71 | 94.28 | 97.19 | 98.97 | | | | | |
| | | 3.28 | 12.97 | 21.88 | 29.83 | 36.87 | 43.16 | 48.88 | 54.19 | 59.17 | 63.87 | 68.33 | 72.61 | 76.72 | 80.69 | 84.56 | 88.37 | 92.24 | 96.48 | | | | | |
| 140 | | | 11.47 | 21.90 | 31.00 | 39.01 | 46.18 | 52.71 | 58.80 | 64.56 | 70.03 | 75.21 | 80.21 | 85.01 | 89.57 | 93.88 | 97.94 | 101.62 | 104.63 | 106.51 | | | | |
| | | | 10.41 | 20.52 | 29.37 | 37.17 | 44.13 | 50.46 | 56.34 | 61.86 | 67.04 | 71.85 | 76.47 | 80.86 | 84.96 | 88.83 | 92.57 | 96.28 | 100.08 | 104.36 | | | | |
| 150 | | | 8.10 | 19.54 | 29.69 | 38.73 | 46.78 | 53.98 | 60.50 | 66.52 | 72.25 | 77.78 | 83.11 | 88.18 | 92.93 | 97.42 | 101.68 | 105.60 | 109.20 | 112.20 | 114.22 | | | |
| | | | 7.17 | 18.17 | 28.03 | 36.78 | 44.56 | 51.52 | 57.83 | 63.70 | 69.29 | 74.67 | 79.83 | 84.71 | 89.26 | 93.56 | 97.50 | 101.00 | 104.43 | 107.99 | 112.04 | | | |
| 160 | | | | 17.27 | 28.63 | 38.62 | 47.45 | 55.30 | 62.39 | 68.87 | 74.92 | 80.64 | 86.20 | 91.59 | 96.73 | 101.49 | 105.83 | 109.92 | 113.83 | 117.20 | 119.90 | 121.89 | | |
| | | | | 15.88 | 26.78 | 36.36 | 44.86 | 52.50 | 59.47 | 65.90 | 71.91 | 77.62 | 83.14 | 88.44 | 93.42 | 97.99 | 102.13 | 106.08 | 109.86 | 112.97 | 115.97 | 119.49 | | |
| 170 | | | | 15.08 | 27.61 | 38.48 | 47.95 | 56.32 | 63.87 | 70.80 | 77.25 | 83.34 | 89.19 | 94.88 | 100.41 | 105.57 | 110.25 | 114.40 | 118.13 | 121.70 | 124.98 | 127.73 | 129.54 | |
| | | | | 13.74 | 25.66 | 35.97 | 45.11 | 53.30 | 60.75 | 67.63 | 74.08 | 80.19 | 86.11 | 91.90 | 97.36 | 102.38 | 106.90 | 110.88 | 114.44 | 117.87 | 121.10 | 124.04 | 126.88 | |
| 180 | | | | 12.19 | 26.33 | 38.11 | 48.24 | 57.10 | 65.07 | 72.38 | 79.20 | 85.65 | 91.82 | 97.78 | 103.63 | 109.23 | 114.28 | 118.75 | 122.66 | 126.07 | 129.15 | 131.98 | 134.30 | 135.90 |
| | | | | 11.29 | 24.52 | 35.68 | 45.46 | 54.14 | 61.98 | 69.21 | 76.01 | 82.50 | 88.70 | 94.72 | 100.65 | 106.24 | 111.20 | 115.55 | 119.35 | 122.62 | 125.63 | 128.52 | 131.13 | 133.61 |
| 190 | | | | | 24.56 | 37.70 | 48.62 | 57.95 | 66.25 | 73.86 | 80.95 | 87.65 | 94.11 | 100.33 | 106.35 | 112.19 | 117.65 | 122.43 | 126.54 | 130.11 | 133.15 | 135.68 | 137.85 | 139.45 |
| | | | | | 23.24 | 35.74 | 46.19 | 55.25 | 63.42 | 70.96 | 78.03 | 84.82 | 91.44 | 97.79 | 103.84 | 109.68 | 115.12 | 119.84 | 123.88 | 127.41 | 130.45 | 133.09 | 135.65 | 138.10 |

(mm)

DIAMETER D= 400
HEIGHT h= 140
EXPANSION ANGLE λ = 90
BOSS RATIO ν = 0.275

TABLE 210

UNITED STATES PATENT AND TRADEMARK OFFICE
CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 201-202,
Replace Table 211 with the following:

| θ / r | 5.5 | 11 | 16.5 | 22 | 27.5 | 33 | 38.5 | 44 | 49.5 | 55 | 60.5 | 66 | 71.5 | 77 | 82.5 | 88 | 93.5 | 99 | 104.5 | 110 | 115.5 | 121 | 126.5 | 132 (deg) |
|---|---|---|---|---|---|---|---|---|---|---|---|---|---|---|---|---|---|---|---|---|---|---|---|---|
| 60 | | | 26.73 | 30.33 | 33.72 | 37.03 | 40.30 | 43.53 | 46.66 | 49.68 | 52.58 | 55.37 | 58.00 | 60.46 | 62.63 | 64.38 | 65.45 | 65.50 | | | | | | |
| | | | 23.50 | 25.75 | 28.03 | 30.30 | 32.56 | 34.90 | 37.35 | 39.94 | 42.60 | 45.32 | 48.02 | 50.68 | 53.33 | 56.03 | 58.92 | 62.32 | | | | | | |
| 70 | | 20.62 | 25.40 | 29.74 | 33.84 | 37.77 | 41.53 | 45.09 | 48.48 | 51.74 | 54.87 | 57.84 | 60.61 | 62.95 | 64.60 | 65.12 | | | | | | | | |
| | | 17.73 | 21.07 | 24.27 | 27.42 | 30.56 | 33.74 | 36.97 | 40.24 | 43.50 | 46.71 | 49.82 | 52.84 | 55.83 | 58.92 | 62.36 | | | | | | | | |
| 80 | 12.30 | 18.62 | 24.08 | 29.11 | 33.83 | 38.32 | 42.53 | 46.50 | 50.27 | 53.86 | 57.28 | 60.49 | 63.40 | 65.81 | 67.46 | 67.91 | | | | | | | | |
| | 10.63 | 15.41 | 19.80 | 23.93 | 27.88 | 31.72 | 35.51 | 39.25 | 42.92 | 46.51 | 49.96 | 53.24 | 56.38 | 59.43 | 62.53 | 65.97 | | | | | | | | |
| 90 | 9.83 | 16.50 | 22.67 | 28.43 | 33.81 | 38.84 | 43.57 | 48.00 | 52.16 | 56.10 | 59.81 | 63.30 | 66.51 | 69.27 | 71.39 | 72.44 | | | | | | | | |
| | 7.77 | 13.61 | 19.00 | 23.98 | 28.61 | 33.00 | 37.22 | 41.31 | 45.29 | 49.14 | 52.83 | 56.33 | 59.61 | 62.78 | 65.93 | 69.31 | | | | | | | | |
| 100 | 5.90 | 13.96 | 21.16 | 27.71 | 33.76 | 39.39 | 44.64 | 49.53 | 54.10 | 58.39 | 62.43 | 66.24 | 69.81 | 73.05 | 75.80 | 77.79 | 78.50 | | | | | | | |
| | 4.58 | 11.65 | 18.13 | 23.96 | 29.25 | 34.14 | 38.76 | 43.18 | 47.45 | 51.57 | 55.53 | 59.30 | 62.87 | 66.26 | 69.59 | 73.00 | 76.83 | | | | | | | |
| 110 | 1.39 | 11.11 | 19.43 | 26.84 | 33.57 | 39.79 | 45.55 | 50.89 | 55.87 | 60.51 | 64.89 | 69.03 | 72.95 | 76.65 | 79.99 | 82.76 | 84.65 | | | | | | | |
| | 0.92 | 9.28 | 16.83 | 23.52 | 29.51 | 34.96 | 40.00 | 44.76 | 49.31 | 53.69 | 57.91 | 61.98 | 65.90 | 69.65 | 73.28 | 76.89 | 80.65 | | | | | | | |
| 120 | | 7.80 | 17.20 | 25.43 | 32.87 | 39.68 | 45.97 | 51.79 | 57.20 | 62.25 | 66.99 | 71.48 | 75.74 | 79.81 | 83.65 | 87.09 | 89.90 | 91.70 | | | | | | |
| | | 6.45 | 14.90 | 22.49 | 29.33 | 35.51 | 41.14 | 46.33 | 51.20 | 55.85 | 60.33 | 64.67 | 68.88 | 72.95 | 76.87 | 80.67 | 84.48 | 88.52 | | | | | | |
| 130 | | 3.98 | 14.27 | 23.49 | 31.72 | 39.10 | 45.82 | 52.04 | 57.85 | 63.33 | 68.52 | 73.44 | 78.11 | 82.55 | 86.75 | 90.71 | 94.28 | 97.19 | 98.97 | | | | | |
| | | 3.28 | 12.97 | 21.88 | 29.83 | 36.87 | 43.16 | 48.88 | 54.19 | 59.17 | 63.87 | 68.33 | 72.61 | 76.72 | 80.69 | 84.56 | 88.37 | 92.24 | 96.48 | | | | | |
| 140 | | | 11.47 | 21.90 | 31.00 | 39.01 | 46.18 | 52.71 | 58.80 | 64.56 | 70.03 | 75.21 | 80.21 | 85.01 | 89.57 | 93.88 | 97.94 | 101.62 | 104.63 | 106.51 | | | | |
| | | | 10.41 | 20.52 | 29.37 | 37.17 | 44.13 | 50.46 | 56.34 | 61.86 | 67.04 | 71.85 | 76.47 | 80.86 | 84.96 | 88.83 | 92.57 | 96.28 | 100.08 | 104.36 | | | | |
| 150 | | | 8.10 | 19.54 | 29.69 | 38.73 | 46.78 | 53.98 | 60.50 | 66.52 | 72.25 | 77.78 | 83.11 | 88.18 | 92.93 | 97.42 | 101.68 | 105.60 | 109.20 | 112.20 | 114.22 | | | |
| | | | 7.17 | 18.17 | 28.03 | 36.78 | 44.56 | 51.52 | 57.83 | 63.70 | 69.29 | 74.67 | 79.83 | 84.71 | 89.26 | 93.56 | 97.50 | 101.00 | 104.43 | 107.99 | 112.04 | | | |
| 160 | | | | 17.27 | 28.63 | 38.62 | 47.45 | 55.30 | 62.39 | 68.87 | 74.92 | 80.64 | 86.20 | 91.59 | 96.73 | 101.49 | 105.83 | 108.92 | 113.83 | 117.20 | 119.90 | 121.89 | | |
| | | | | 15.88 | 26.78 | 36.36 | 44.86 | 52.50 | 59.47 | 65.90 | 71.91 | 77.62 | 83.14 | 88.44 | 93.42 | 97.99 | 102.13 | 106.08 | 109.86 | 112.97 | 115.97 | 119.49 | | |
| 170 | | | | 15.08 | 27.61 | 38.48 | 47.95 | 56.32 | 63.87 | 70.80 | 77.25 | 83.34 | 89.19 | 94.88 | 100.41 | 105.57 | 110.25 | 114.40 | 118.13 | 121.70 | 124.98 | 127.73 | 129.54 | |
| | | | | 13.74 | 25.66 | 35.97 | 45.11 | 53.30 | 60.75 | 67.63 | 74.08 | 80.19 | 86.11 | 91.90 | 97.36 | 102.38 | 106.90 | 110.88 | 114.44 | 117.87 | 121.10 | 124.04 | 126.88 | |
| 180 | | | | 12.19 | 26.33 | 38.11 | 48.24 | 57.10 | 65.07 | 72.38 | 79.20 | 85.65 | 91.82 | 97.78 | 103.63 | 109.23 | 114.28 | 118.75 | 122.66 | 126.07 | 129.15 | 131.98 | 134.30 | 135.90 |
| | | | | 11.29 | 24.52 | 35.68 | 45.46 | 54.14 | 61.98 | 69.21 | 76.01 | 82.50 | 88.70 | 94.72 | 100.65 | 106.24 | 111.20 | 115.55 | 119.35 | 122.62 | 125.63 | 128.52 | 131.13 | 133.61 |
| 190 | | | | | 24.56 | 37.70 | 48.62 | 57.95 | 66.25 | 73.86 | 80.95 | 87.65 | 94.11 | 100.33 | 106.35 | 112.19 | 117.65 | 122.43 | 126.54 | 130.11 | 133.15 | 135.88 | 137.85 | 139.45 |
| | | | | | 23.24 | 35.74 | 46.19 | 55.25 | 63.42 | 70.96 | 78.03 | 84.82 | 91.44 | 97.79 | 103.84 | 109.68 | 115.12 | 119.84 | 123.88 | 127.41 | 130.45 | 133.09 | 135.65 | 138.10 |

(mm)

DIAMETER D= 400
HEIGHT h= 140
EXPANSION ANGLE $\lambda$ = 132
BOSS RATIO $\nu$ = 0.275

TABLE 211

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 203-206,
Replace Table 212 with the following:

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 74.48 | | | 26.73 | 30.33 | 33.72 | 37.03 | 40.30 | 43.53 | 46.66 | 49.68 | 52.58 | 55.37 | 58.00 | 60.46 | 62.63 | 64.38 | 65.45 | 65.50 | | | | | | |
| | | | 23.50 | 25.75 | 28.03 | 30.30 | 32.56 | 34.90 | 37.35 | 39.94 | 42.60 | 45.32 | 48.02 | 50.68 | 53.33 | 56.03 | 58.92 | 62.32 | | | | | | |
| 83.45 | | 20.62 | 25.40 | 29.74 | 33.84 | 37.77 | 41.53 | 45.09 | 48.48 | 51.74 | 54.87 | 57.84 | 60.61 | 62.95 | 64.60 | 65.12 | | | | | | | | |
| | | 17.73 | 21.07 | 24.27 | 27.42 | 30.56 | 33.74 | 36.97 | 40.24 | 43.50 | 46.71 | 49.82 | 52.84 | 55.83 | 58.92 | 62.36 | | | | | | | | |
| 92.41 | 12.30 | 18.62 | 24.08 | 29.11 | 33.83 | 38.32 | 42.53 | 46.50 | 50.27 | 53.86 | 57.28 | 60.49 | 63.40 | 65.81 | 67.46 | 67.91 | | | | | | | | |
| | 10.63 | 15.41 | 19.80 | 23.93 | 27.88 | 31.72 | 35.51 | 39.25 | 42.92 | 46.51 | 49.96 | 53.24 | 56.38 | 59.43 | 62.53 | 65.97 | | | | | | | | |
| 101.4 | 9.83 | 16.50 | 22.67 | 28.43 | 33.81 | 38.84 | 43.57 | 48.00 | 52.16 | 56.10 | 59.81 | 63.30 | 66.51 | 69.27 | 71.39 | 72.44 | | | | | | | | |
| | 7.77 | 13.61 | 19.00 | 23.98 | 28.61 | 33.00 | 37.22 | 41.31 | 45.29 | 49.14 | 52.83 | 56.33 | 59.61 | 62.78 | 65.93 | 69.31 | | | | | | | | |
| 110.3 | 5.90 | 13.96 | 21.16 | 27.71 | 33.76 | 39.39 | 44.64 | 49.53 | 54.10 | 58.39 | 62.43 | 66.24 | 69.81 | 73.05 | 75.80 | 77.79 | 78.50 | | | | | | | |
| | 4.58 | 11.65 | 18.13 | 23.96 | 29.25 | 34.14 | 38.76 | 43.18 | 47.45 | 51.57 | 55.53 | 59.30 | 62.87 | 66.26 | 69.59 | 73.00 | 76.83 | | | | | | | |
| 119.3 | 1.39 | 11.11 | 19.43 | 26.84 | 33.57 | 39.79 | 45.55 | 50.89 | 55.87 | 60.51 | 64.89 | 69.03 | 72.95 | 76.65 | 79.99 | 82.76 | 84.65 | | | | | | | |
| | 0.92 | 9.28 | 16.83 | 23.52 | 29.51 | 34.96 | 40.00 | 44.76 | 49.31 | 53.69 | 57.91 | 61.98 | 65.90 | 69.65 | 73.28 | 76.89 | 80.65 | | | | | | | |
| 128.3 | | 7.80 | 17.20 | 25.43 | 32.87 | 39.68 | 45.97 | 51.79 | 57.20 | 62.25 | 66.99 | 71.48 | 75.74 | 79.81 | 83.65 | 87.09 | 89.90 | 91.70 | | | | | | |
| | | 6.45 | 14.90 | 22.49 | 29.33 | 35.51 | 41.14 | 46.33 | 51.20 | 55.85 | 60.33 | 64.67 | 68.88 | 72.95 | 76.87 | 80.67 | 84.48 | 88.52 | | | | | | |
| 137.2 | | 3.98 | 14.27 | 23.49 | 31.72 | 39.10 | 45.82 | 52.04 | 57.85 | 63.33 | 68.52 | 73.44 | 78.11 | 82.55 | 86.75 | 90.71 | 94.28 | 97.19 | 98.97 | | | | | |
| | | 3.28 | 12.97 | 21.88 | 29.83 | 36.87 | 43.16 | 48.88 | 54.19 | 59.17 | 63.87 | 68.33 | 72.61 | 76.72 | 80.69 | 84.56 | 88.37 | 92.24 | 96.48 | | | | | |
| 146.2 | | | 11.47 | 21.90 | 31.00 | 39.01 | 46.18 | 52.71 | 58.80 | 64.56 | 70.03 | 75.21 | 80.21 | 85.01 | 89.57 | 93.88 | 97.94 | 101.62 | 104.63 | 106.51 | | | | |
| | | | 10.41 | 20.52 | 29.37 | 37.17 | 44.13 | 50.46 | 56.34 | 61.86 | 67.04 | 71.85 | 76.47 | 80.86 | 84.96 | 88.83 | 92.57 | 96.28 | 100.08 | 104.36 | | | | |
| 155.2 | | | 8.10 | 19.54 | 29.69 | 38.73 | 46.78 | 53.98 | 60.50 | 66.52 | 72.25 | 77.78 | 83.11 | 88.18 | 92.93 | 97.42 | 101.68 | 105.60 | 109.20 | 112.20 | 114.22 | | | |
| | | | 7.17 | 18.17 | 28.03 | 36.78 | 44.56 | 51.52 | 57.83 | 63.70 | 69.29 | 74.67 | 79.83 | 84.71 | 89.26 | 93.56 | 97.50 | 101.00 | 104.43 | 107.99 | 112.04 | | | |
| 164.1 | | | | 17.27 | 28.63 | 38.62 | 47.45 | 55.30 | 62.39 | 68.87 | 74.92 | 80.64 | 86.20 | 91.59 | 96.73 | 101.49 | 105.83 | 109.92 | 113.83 | 117.20 | 119.90 | 121.89 | | |
| | | | | 15.88 | 26.78 | 36.36 | 44.86 | 52.50 | 59.47 | 65.90 | 71.91 | 77.62 | 83.14 | 88.44 | 93.42 | 97.99 | 102.13 | 106.08 | 109.86 | 112.97 | 115.97 | 119.49 | | |
| 173.1 | | | | 15.08 | 27.61 | 38.48 | 47.95 | 56.32 | 63.87 | 70.80 | 77.25 | 83.34 | 89.19 | 94.88 | 100.41 | 105.57 | 110.25 | 114.40 | 118.13 | 121.70 | 124.98 | 127.73 | 129.54 | |
| | | | | 13.74 | 25.66 | 35.97 | 45.11 | 53.30 | 60.75 | 67.63 | 74.08 | 80.19 | 86.11 | 91.90 | 97.36 | 102.38 | 106.90 | 110.88 | 114.44 | 117.87 | 121.10 | 124.04 | 126.88 | |
| 182.1 | | | | 12.19 | 26.33 | 38.11 | 48.24 | 57.10 | 65.07 | 72.38 | 79.20 | 85.65 | 91.82 | 97.78 | 103.63 | 109.23 | 114.28 | 118.75 | 122.66 | 126.07 | 129.15 | 131.98 | 134.30 | 135.90 |
| | | | | 11.29 | 24.52 | 35.68 | 45.46 | 54.14 | 61.98 | 69.21 | 76.01 | 82.50 | 88.70 | 94.72 | 100.65 | 106.24 | 111.20 | 115.55 | 119.35 | 122.62 | 125.63 | 128.52 | 131.13 | 133.61 |
| 191 | | | | | 24.56 | 37.70 | 48.62 | 57.95 | 66.25 | 73.86 | 80.95 | 87.65 | 94.11 | 100.33 | 106.35 | 112.19 | 117.65 | 122.43 | 126.54 | 130.11 | 133.15 | 135.68 | 137.85 | 139.45 |
| | | | | | 23.24 | 35.74 | 46.19 | 55.25 | 63.42 | 70.96 | 78.03 | 84.82 | 91.44 | 97.79 | 103.84 | 109.68 | 115.12 | 119.84 | 123.88 | 127.41 | 130.45 | 133.09 | 135.65 | 138.10 |

(mm)

DIAMETER D= 400
HEIGHT h= 140
EXPANSION ANGLE $\lambda$ = 120
BOSS RATIO $\nu$ = 0.35

TABLE 212

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

<u>Columns 205-208</u>,
Replace Table 213 with the following:

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 21.39 | 24.26 | 26.97 | 29.62 | 32.24 | 34.82 | 37.33 | 39.74 | 42.07 | 44.29 | 46.40 | 48.37 | 50.10 | 51.51 | 52.36 | 52.40 | | | | | | |
| | | | 17.86 | 19.57 | 21.30 | 23.02 | 24.75 | 26.53 | 28.39 | 30.35 | 32.38 | 34.44 | 36.49 | 38.52 | 40.53 | 42.58 | 44.78 | 47.36 | | | | | | |
| 70 | | 16.49 | 20.32 | 23.79 | 27.07 | 30.22 | 33.22 | 36.07 | 38.78 | 41.39 | 43.89 | 46.28 | 48.49 | 50.36 | 51.88 | 52.10 | | | | | | | | |
| | | 13.47 | 16.01 | 18.45 | 20.84 | 23.22 | 25.64 | 28.10 | 30.58 | 33.06 | 35.50 | 37.86 | 40.16 | 42.43 | 44.78 | 47.39 | | | | | | | | |
| 80 | 9.84 | 14.90 | 19.26 | 23.29 | 27.07 | 30.65 | 34.03 | 37.20 | 40.22 | 43.09 | 45.82 | 48.39 | 50.72 | 52.65 | 53.97 | 54.33 | | | | | | | | |
| | 8.08 | 11.71 | 15.05 | 18.19 | 21.19 | 24.11 | 26.99 | 29.83 | 32.62 | 35.34 | 37.97 | 40.47 | 42.85 | 45.17 | 47.52 | 50.13 | | | | | | | | |
| 90 | 7.86 | 13.20 | 18.13 | 22.74 | 27.05 | 31.08 | 34.85 | 38.40 | 41.73 | 44.88 | 47.85 | 50.64 | 53.21 | 55.41 | 57.11 | 57.95 | | | | | | | | |
| | 5.90 | 10.34 | 14.44 | 18.23 | 21.74 | 25.08 | 28.28 | 31.40 | 34.42 | 37.35 | 40.15 | 42.81 | 45.31 | 47.71 | 50.10 | 52.67 | | | | | | | | |
| 100 | 4.72 | 11.17 | 16.93 | 22.17 | 27.01 | 31.51 | 35.71 | 39.62 | 43.28 | 46.71 | 49.95 | 52.99 | 55.85 | 58.44 | 60.64 | 62.23 | 62.80 | | | | | | | |
| | 3.48 | 8.86 | 13.78 | 18.21 | 22.23 | 25.94 | 29.46 | 32.82 | 36.06 | 39.20 | 42.20 | 45.07 | 47.78 | 50.36 | 52.89 | 55.48 | 58.39 | | | | | | | |
| 110 | 1.11 | 8.89 | 15.55 | 21.47 | 26.86 | 31.83 | 36.44 | 40.72 | 44.69 | 48.41 | 51.91 | 55.22 | 58.36 | 61.32 | 63.99 | 66.21 | 67.72 | | | | | | | |
| | 0.70 | 7.05 | 12.79 | 17.88 | 22.43 | 26.57 | 30.40 | 34.02 | 37.47 | 40.80 | 44.01 | 47.11 | 50.08 | 52.93 | 55.70 | 58.43 | 61.29 | | | | | | | |
| 120 | | 6.24 | 13.76 | 20.35 | 26.29 | 31.74 | 36.77 | 41.43 | 45.76 | 49.80 | 53.59 | 57.18 | 60.60 | 63.85 | 66.92 | 69.67 | 71.92 | 73.36 | | | | | | |
| | | 4.90 | 11.32 | 17.09 | 22.29 | 26.99 | 31.26 | 35.21 | 38.91 | 42.45 | 45.85 | 49.15 | 52.35 | 55.44 | 58.42 | 61.31 | 64.21 | 67.28 | | | | | | |
| 130 | | 3.19 | 11.42 | 18.79 | 25.37 | 31.28 | 36.66 | 41.63 | 46.28 | 50.66 | 54.81 | 58.75 | 62.49 | 66.04 | 69.40 | 72.57 | 75.42 | 77.75 | 79.17 | | | | | |
| | | 2.50 | 9.86 | 16.63 | 22.67 | 28.02 | 32.80 | 37.15 | 41.18 | 44.97 | 48.54 | 51.93 | 55.18 | 58.30 | 61.33 | 64.26 | 67.16 | 70.10 | 73.32 | | | | | |
| 140 | | | 9.18 | 17.52 | 24.80 | 31.21 | 36.94 | 42.17 | 47.04 | 51.65 | 56.03 | 60.17 | 64.16 | 68.00 | 71.66 | 75.10 | 78.35 | 81.30 | 83.70 | 85.21 | | | | |
| | | | 7.91 | 15.59 | 22.32 | 28.25 | 33.54 | 38.35 | 42.82 | 47.02 | 50.95 | 54.61 | 58.12 | 61.45 | 64.57 | 67.51 | 70.35 | 73.17 | 76.06 | 79.32 | | | | |
| 150 | | | 6.48 | 15.63 | 23.75 | 30.98 | 37.42 | 43.18 | 48.40 | 53.22 | 57.80 | 62.22 | 66.49 | 70.55 | 74.34 | 77.93 | 81.34 | 84.48 | 87.36 | 89.76 | 91.38 | | | |
| | | | 5.45 | 13.81 | 21.30 | 27.95 | 33.86 | 39.15 | 43.95 | 48.41 | 52.66 | 56.75 | 60.67 | 64.38 | 67.83 | 71.10 | 74.10 | 76.76 | 79.36 | 82.07 | 85.15 | | | |
| 160 | | | | 13.82 | 22.90 | 30.89 | 37.96 | 44.24 | 49.91 | 55.10 | 59.93 | 64.51 | 68.96 | 73.27 | 77.38 | 81.19 | 84.66 | 87.93 | 91.06 | 93.76 | 95.92 | 97.51 | | |
| | | | | 12.07 | 20.36 | 27.64 | 34.10 | 39.90 | 45.20 | 50.08 | 54.65 | 58.99 | 63.19 | 67.21 | 71.00 | 74.47 | 77.62 | 80.62 | 83.49 | 85.85 | 88.13 | 90.82 | | |
| 170 | | | | 12.07 | 22.09 | 30.78 | 38.36 | 45.06 | 51.10 | 56.64 | 61.80 | 66.68 | 71.35 | 75.91 | 80.32 | 84.45 | 88.20 | 91.52 | 94.50 | 97.36 | 99.98 | 102.19 | 103.63 | |
| | | | | 10.45 | 19.50 | 27.34 | 34.28 | 40.51 | 46.17 | 51.40 | 56.30 | 60.95 | 65.45 | 69.84 | 74.00 | 77.81 | 81.24 | 84.27 | 86.97 | 89.58 | 92.04 | 94.27 | 96.43 | |
| 180 | | | | 9.75 | 21.06 | 30.49 | 38.59 | 45.68 | 52.05 | 57.90 | 63.36 | 68.52 | 73.45 | 78.23 | 82.91 | 87.38 | 91.42 | 95.00 | 98.13 | 100.86 | 103.32 | 105.58 | 107.44 | 108.72 |
| | | | | 8.58 | 18.64 | 27.11 | 34.55 | 41.14 | 47.11 | 52.60 | 57.77 | 62.70 | 67.42 | 71.99 | 76.49 | 80.74 | 84.51 | 87.82 | 90.71 | 93.19 | 95.48 | 97.67 | 99.68 | 101.55 |
| 190 | | | | | 19.65 | 30.16 | 38.89 | 46.36 | 53.00 | 59.09 | 64.76 | 70.12 | 75.28 | 80.26 | 85.08 | 89.75 | 94.12 | 97.94 | 101.23 | 104.08 | 106.52 | 108.55 | 110.28 | 111.56 |
| | | | | | 17.66 | 27.16 | 35.10 | 41.99 | 48.20 | 53.93 | 59.30 | 64.47 | 69.50 | 74.32 | 78.92 | 83.36 | 87.49 | 91.08 | 94.15 | 96.83 | 99.14 | 101.15 | 103.09 | 104.96 |

(mm)

DIAMETER $D = 400$
HEIGHT $h = 112$ ($eu = 112$, $ed = 106.4$, $fu = fd = 0$)
EXPANSION ANGLE $\lambda = 120$
BOSS RATIO $\nu = 0.275$

TABLE 213

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 209-212,
Replace Table 214 with the following:

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 24.39 | 27.26 | 29.97 | 32.62 | 35.24 | 37.82 | 40.33 | 42.74 | 45.07 | 47.29 | 49.40 | 51.37 | 53.10 | 54.51 | 55.36 | 55.40 | | | | | | |
| | | | 18.80 | 20.60 | 22.42 | 24.24 | 26.05 | 27.92 | 29.88 | 31.95 | 34.08 | 36.25 | 38.42 | 40.55 | 42.67 | 44.82 | 47.14 | 49.86 | | | | | | |
| 70 | | 19.49 | 23.32 | 26.79 | 30.07 | 33.22 | 36.22 | 39.07 | 41.78 | 44.39 | 46.89 | 49.28 | 51.49 | 53.36 | 54.68 | 55.10 | | | | | | | | |
| | | 14.18 | 16.85 | 19.42 | 21.93 | 24.45 | 26.99 | 29.58 | 32.19 | 34.80 | 37.37 | 39.86 | 42.27 | 44.67 | 47.13 | 49.89 | | | | | | | | |
| 80 | 12.84 | 17.90 | 22.26 | 26.29 | 30.07 | 33.65 | 37.03 | 40.20 | 43.22 | 46.09 | 48.82 | 51.39 | 53.72 | 55.65 | 56.97 | 57.33 | | | | | | | | |
| | 8.51 | 12.33 | 15.84 | 19.14 | 22.30 | 25.38 | 28.41 | 31.40 | 34.34 | 37.20 | 39.97 | 42.60 | 45.10 | 47.54 | 50.02 | 52.77 | | | | | | | | |
| 90 | 10.86 | 16.20 | 21.13 | 25.74 | 30.05 | 34.08 | 37.85 | 41.40 | 44.73 | 47.88 | 50.85 | 53.64 | 56.21 | 58.41 | 60.11 | 60.95 | | | | | | | | |
| | 6.21 | 10.88 | 15.20 | 19.18 | 22.89 | 26.40 | 29.77 | 33.05 | 36.23 | 39.32 | 42.27 | 45.06 | 47.89 | 50.22 | 52.74 | 55.45 | | | | | | | | |
| 100 | 7.72 | 14.17 | 19.93 | 25.17 | 30.01 | 34.51 | 38.71 | 42.62 | 46.28 | 49.71 | 52.95 | 55.99 | 58.85 | 61.44 | 63.64 | 65.23 | 65.80 | | | | | | | |
| | 3.66 | 9.32 | 14.51 | 19.17 | 23.40 | 27.31 | 31.01 | 34.54 | 37.96 | 41.26 | 44.42 | 47.44 | 50.29 | 53.01 | 55.67 | 58.40 | 61.47 | | | | | | | |
| 110 | 4.11 | 11.89 | 18.55 | 24.47 | 29.86 | 34.83 | 39.44 | 43.72 | 47.69 | 51.41 | 54.91 | 58.22 | 61.36 | 64.32 | 66.99 | 69.21 | 70.72 | | | | | | | |
| | 0.73 | 7.42 | 13.47 | 18.82 | 23.61 | 27.97 | 32.00 | 35.81 | 39.45 | 42.95 | 46.33 | 49.58 | 52.72 | 55.72 | 58.63 | 61.51 | 64.52 | | | | | | | |
| 120 | | 9.24 | 16.76 | 23.35 | 29.29 | 34.74 | 39.77 | 44.43 | 48.76 | 52.80 | 56.59 | 60.18 | 63.60 | 66.85 | 69.92 | 72.67 | 74.92 | 76.36 | | | | | | |
| | | 5.16 | 11.92 | 17.99 | 23.46 | 28.41 | 32.91 | 37.06 | 40.96 | 44.68 | 48.26 | 51.74 | 55.10 | 58.36 | 61.49 | 64.53 | 67.59 | 70.82 | | | | | | |
| 130 | | 6.19 | 14.42 | 21.79 | 28.37 | 34.28 | 39.66 | 44.63 | 49.28 | 53.66 | 57.81 | 61.75 | 65.49 | 69.04 | 72.40 | 75.57 | 78.42 | 80.75 | 82.17 | | | | | |
| | | 2.63 | 10.37 | 17.51 | 23.88 | 29.49 | 34.52 | 39.10 | 43.35 | 47.33 | 51.09 | 54.67 | 58.09 | 61.37 | 64.55 | 67.65 | 70.70 | 73.79 | 77.18 | | | | | |
| 140 | | | 12.18 | 20.52 | 27.80 | 34.21 | 39.94 | 45.17 | 50.04 | 54.65 | 59.03 | 63.17 | 67.16 | 71.00 | 74.66 | 78.10 | 81.35 | 84.30 | 86.70 | 88.21 | | | | |
| | | | 8.33 | 16.41 | 23.50 | 29.74 | 35.30 | 40.37 | 45.07 | 49.49 | 53.63 | 57.48 | 61.18 | 64.68 | 67.97 | 71.06 | 74.06 | 77.02 | 80.06 | 83.49 | | | | |
| 150 | | | 9.48 | 18.63 | 26.75 | 33.98 | 40.42 | 46.18 | 51.40 | 56.22 | 60.80 | 65.22 | 69.49 | 73.55 | 77.34 | 80.93 | 84.34 | 87.48 | 90.36 | 92.76 | 94.38 | | | |
| | | | 5.73 | 14.54 | 22.42 | 29.42 | 35.65 | 41.21 | 46.27 | 50.96 | 55.44 | 59.74 | 63.87 | 67.77 | 71.40 | 74.84 | 78.00 | 80.80 | 83.54 | 86.39 | 89.63 | | | |
| 160 | | | | 16.82 | 25.90 | 33.89 | 40.96 | 47.24 | 52.91 | 58.10 | 62.93 | 67.51 | 71.96 | 76.27 | 80.38 | 84.19 | 87.66 | 90.93 | 94.06 | 96.76 | 98.92 | 100.51 | | |
| | | | | 12.70 | 21.43 | 29.09 | 35.89 | 42.00 | 47.57 | 52.72 | 57.52 | 62.10 | 66.51 | 70.75 | 74.74 | 78.39 | 81.71 | 84.86 | 87.88 | 90.37 | 92.77 | 95.60 | | |
| 170 | | | | 15.07 | 25.09 | 33.78 | 41.36 | 48.06 | 54.10 | 59.64 | 64.80 | 69.68 | 74.35 | 78.91 | 83.32 | 87.45 | 91.20 | 94.52 | 97.50 | 100.36 | 102.98 | 105.19 | 106.63 | |
| | | | | 11.00 | 20.53 | 28.78 | 36.09 | 42.64 | 48.60 | 54.10 | 59.26 | 64.15 | 68.89 | 73.52 | 77.89 | 81.90 | 85.52 | 88.71 | 91.55 | 94.30 | 96.88 | 99.23 | 101.50 | |
| 180 | | | | 12.75 | 24.06 | 33.49 | 41.59 | 48.68 | 55.05 | 60.90 | 66.36 | 71.52 | 76.45 | 81.23 | 85.91 | 90.38 | 94.42 | 98.00 | 101.13 | 103.86 | 106.32 | 108.58 | 110.44 | 111.72 |
| | | | | 9.03 | 19.62 | 28.54 | 36.37 | 43.31 | 49.59 | 55.37 | 60.81 | 66.00 | 70.96 | 75.78 | 80.52 | 84.99 | 88.96 | 92.44 | 95.48 | 98.10 | 100.50 | 102.81 | 104.91 | 106.89 |
| 190 | | | | | 22.65 | 33.16 | 41.89 | 49.36 | 56.00 | 62.09 | 67.76 | 73.12 | 78.28 | 83.26 | 88.08 | 92.75 | 97.12 | 100.94 | 104.23 | 107.08 | 109.52 | 111.55 | 113.28 | 114.56 |
| | | | | | 18.59 | 28.59 | 36.95 | 44.20 | 50.74 | 56.76 | 62.42 | 67.86 | 73.15 | 78.23 | 83.07 | 87.74 | 92.10 | 95.87 | 99.11 | 101.93 | 104.36 | 106.47 | 108.52 | 110.48 |

(mm)

DIAMETER D= 400
HEIGHT h= 112 (eu=112, ed=112, fu=3, fd=0)
EXPANSION ANGLE $\lambda$ = 120
BOSS RATIO $\nu$ = 0.275

TABLE 214

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 211-214,
Replace Table 215 with the following:

| r \ θ | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 60 | | | 24.39 | 27.26 | 29.97 | 32.62 | 35.24 | 37.82 | 40.33 | 42.74 | 45.07 | 47.29 | 49.40 | 51.37 | 53.10 | 54.51 | 55.36 | 55.40 | | | | | | |
| | | | 17.86 | 19.57 | 21.30 | 23.02 | 24.75 | 26.53 | 28.39 | 30.35 | 32.38 | 34.44 | 36.49 | 38.52 | 40.53 | 42.58 | 44.78 | 47.36 | | | | | | |
| 70 | | 19.49 | 23.32 | 26.79 | 30.07 | 33.22 | 36.22 | 39.07 | 41.78 | 44.39 | 46.89 | 49.28 | 51.49 | 53.36 | 54.68 | 55.10 | | | | | | | | |
| | | 13.47 | 16.01 | 18.45 | 20.84 | 23.22 | 25.64 | 28.10 | 30.58 | 33.06 | 35.50 | 37.86 | 40.16 | 42.43 | 44.78 | 47.39 | | | | | | | | |
| 80 | 12.84 | 17.90 | 22.26 | 26.29 | 30.07 | 33.65 | 37.03 | 40.20 | 43.22 | 46.09 | 48.82 | 51.39 | 53.72 | 55.65 | 56.97 | 57.33 | | | | | | | | |
| | 8.08 | 11.71 | 15.05 | 18.19 | 21.19 | 24.11 | 26.99 | 29.83 | 32.62 | 35.34 | 37.97 | 40.47 | 42.85 | 45.17 | 47.52 | 50.13 | | | | | | | | |
| 90 | 10.86 | 16.20 | 21.13 | 25.74 | 30.05 | 34.08 | 37.85 | 41.40 | 44.73 | 47.88 | 50.85 | 53.64 | 56.21 | 58.41 | 60.11 | 60.95 | | | | | | | | |
| | 5.90 | 10.34 | 14.44 | 18.23 | 21.74 | 25.08 | 28.28 | 31.40 | 34.42 | 37.35 | 40.15 | 42.81 | 45.31 | 47.71 | 50.10 | 52.67 | | | | | | | | |
| 100 | 7.72 | 14.17 | 19.93 | 25.17 | 30.01 | 34.51 | 38.71 | 42.62 | 46.28 | 49.71 | 52.95 | 55.99 | 58.85 | 61.44 | 63.64 | 65.23 | 65.80 | | | | | | | |
| | 3.48 | 8.86 | 13.78 | 18.21 | 22.23 | 25.94 | 29.46 | 32.82 | 36.06 | 39.20 | 42.20 | 45.07 | 47.78 | 50.36 | 52.89 | 55.48 | 58.39 | | | | | | | |
| 110 | 4.11 | 11.89 | 18.55 | 24.47 | 29.86 | 34.83 | 39.44 | 43.72 | 47.69 | 51.41 | 54.91 | 58.22 | 61.36 | 64.32 | 66.99 | 69.21 | 70.72 | | | | | | | |
| | 0.70 | 7.05 | 12.79 | 17.88 | 22.43 | 26.57 | 30.40 | 34.02 | 37.47 | 40.80 | 44.01 | 47.11 | 50.08 | 52.93 | 55.70 | 58.43 | 61.29 | | | | | | | |
| 120 | | 9.24 | 16.76 | 23.35 | 29.29 | 34.74 | 39.77 | 44.43 | 48.76 | 52.80 | 56.59 | 60.18 | 63.60 | 66.85 | 69.92 | 72.67 | 74.92 | 76.36 | | | | | | |
| | | 4.90 | 11.32 | 17.09 | 22.29 | 26.99 | 31.26 | 35.21 | 38.91 | 42.45 | 45.85 | 49.15 | 52.35 | 55.44 | 58.42 | 61.31 | 64.21 | 67.28 | | | | | | |
| 130 | | 6.19 | 14.42 | 21.79 | 28.37 | 34.28 | 39.66 | 44.63 | 49.28 | 53.66 | 57.81 | 61.75 | 65.49 | 69.04 | 72.40 | 75.57 | 78.42 | 80.75 | 82.17 | | | | | |
| | | 2.50 | 9.86 | 16.63 | 22.67 | 28.02 | 32.80 | 37.15 | 41.18 | 44.97 | 48.54 | 51.93 | 55.18 | 58.30 | 61.33 | 64.26 | 67.16 | 70.10 | 73.32 | | | | | |
| 140 | | | 12.18 | 20.52 | 27.80 | 34.21 | 39.94 | 45.17 | 50.04 | 54.65 | 59.03 | 63.17 | 67.16 | 71.00 | 74.66 | 78.10 | 81.35 | 84.30 | 86.70 | 88.21 | | | | |
| | | | 7.91 | 15.59 | 22.32 | 28.25 | 33.54 | 38.35 | 42.82 | 47.02 | 50.95 | 54.61 | 58.12 | 61.45 | 64.57 | 67.51 | 70.35 | 73.17 | 76.06 | 79.32 | | | | |
| 150 | | | 9.48 | 18.63 | 26.75 | 33.98 | 40.42 | 46.18 | 51.40 | 56.22 | 60.80 | 65.22 | 69.49 | 73.56 | 77.34 | 80.93 | 84.34 | 87.48 | 90.36 | 92.76 | 94.38 | | | |
| | | | 5.45 | 13.81 | 21.30 | 27.95 | 33.86 | 39.15 | 43.95 | 48.41 | 52.66 | 56.75 | 60.67 | 64.38 | 67.83 | 71.10 | 74.10 | 76.76 | 79.36 | 82.07 | 85.15 | | | |
| 160 | | | | 16.82 | 25.90 | 33.89 | 40.96 | 47.24 | 52.91 | 58.10 | 62.93 | 67.51 | 71.96 | 76.27 | 80.38 | 84.19 | 87.66 | 90.93 | 94.06 | 96.76 | 98.92 | 100.51 | | |
| | | | | 12.07 | 20.36 | 27.64 | 34.10 | 39.90 | 45.20 | 50.08 | 54.65 | 58.99 | 63.19 | 67.21 | 71.00 | 74.47 | 77.62 | 80.62 | 83.49 | 85.85 | 88.13 | 90.82 | | |
| 170 | | | | 15.07 | 25.09 | 33.78 | 41.36 | 48.06 | 54.10 | 59.64 | 64.80 | 69.68 | 74.35 | 78.91 | 83.32 | 87.45 | 91.20 | 94.52 | 97.50 | 100.36 | 102.98 | 105.19 | 106.63 | |
| | | | | 10.45 | 19.50 | 27.34 | 34.28 | 40.51 | 46.17 | 51.40 | 56.30 | 60.95 | 65.45 | 69.84 | 74.00 | 77.81 | 81.24 | 84.27 | 86.97 | 89.58 | 92.04 | 94.27 | 96.43 | |
| 180 | | | | 12.75 | 24.06 | 33.49 | 41.59 | 48.68 | 55.05 | 60.90 | 66.36 | 71.52 | 76.45 | 81.23 | 85.91 | 90.38 | 94.42 | 98.00 | 101.13 | 103.86 | 106.32 | 108.58 | 110.44 | 111.72 |
| | | | | 8.58 | 18.64 | 27.11 | 34.55 | 41.14 | 47.11 | 52.60 | 57.77 | 62.70 | 67.42 | 71.99 | 76.49 | 80.74 | 84.51 | 87.82 | 90.71 | 93.19 | 95.48 | 97.67 | 99.66 | 101.55 |
| 190 | | | | | 22.65 | 33.18 | 41.89 | 49.36 | 56.00 | 62.09 | 67.76 | 73.12 | 78.28 | 83.26 | 88.08 | 92.75 | 97.12 | 100.94 | 104.23 | 107.08 | 109.52 | 111.55 | 113.28 | 114.56 |
| | | | | | 17.66 | 27.16 | 35.10 | 41.99 | 48.20 | 53.93 | 59.30 | 64.47 | 69.50 | 74.32 | 78.92 | 83.36 | 87.49 | 91.08 | 94.15 | 96.83 | 99.14 | 101.15 | 103.09 | 104.96 |

(mm)

DIAMETER $D = 400$
HEIGHT $h = 112$ ($eu = 112$, $ed = 106.4$, $fu = 3$, $fd = 0$)
EXPANSION ANGLE $\lambda = 120$
BOSS RATIO $\nu = 0.275$

TABLE 215

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 215-218,
Replace Table 216 with the following:

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 46.97 | | | 19.09 | 21.66 | 24.08 | 26.45 | 28.79 | 31.09 | 33.33 | 35.49 | 37.56 | 39.55 | 41.43 | 43.18 | 44.73 | 45.99 | 46.75 | 46.78 | | | | | | |
| | | | 16.78 | 18.40 | 20.02 | 21.64 | 23.26 | 24.93 | 26.68 | 28.53 | 30.43 | 32.37 | 34.30 | 36.20 | 38.09 | 40.02 | 42.09 | 44.51 | | | | | | |
| 54.9 | | 14.73 | 18.14 | 21.24 | 24.17 | 26.98 | 29.66 | 32.21 | 34.63 | 36.96 | 39.19 | 41.32 | 43.29 | 44.96 | 46.14 | 46.51 | | | | | | | | |
| | | 12.66 | 15.05 | 17.34 | 19.58 | 21.83 | 24.10 | 26.41 | 28.75 | 31.07 | 33.36 | 35.59 | 37.74 | 39.88 | 42.08 | 44.54 | | | | | | | | |
| 62.83 | 8.78 | 13.30 | 17.20 | 20.79 | 24.17 | 27.37 | 30.38 | 33.22 | 35.91 | 38.47 | 40.91 | 43.21 | 45.29 | 47.01 | 48.19 | 48.51 | | | | | | | | |
| | 7.60 | 11.01 | 14.14 | 17.09 | 19.91 | 22.66 | 25.37 | 28.03 | 30.66 | 33.22 | 35.68 | 38.03 | 40.27 | 42.45 | 44.66 | 47.12 | | | | | | | | |
| 70.76 | 7.02 | 11.78 | 16.19 | 20.30 | 24.15 | 27.75 | 31.12 | 34.28 | 37.26 | 40.07 | 42.72 | 45.21 | 47.50 | 49.48 | 50.99 | 51.74 | | | | | | | | |
| | 5.55 | 9.72 | 13.57 | 17.13 | 20.44 | 23.57 | 26.58 | 29.51 | 32.35 | 35.10 | 37.74 | 40.23 | 42.58 | 44.84 | 47.09 | 49.51 | | | | | | | | |
| 78.69 | 4.21 | 9.97 | 15.11 | 19.79 | 24.12 | 28.14 | 31.88 | 35.38 | 38.64 | 41.71 | 44.59 | 47.32 | 49.86 | 52.18 | 54.14 | 55.56 | 56.07 | | | | | | | |
| | 3.27 | 8.32 | 12.95 | 17.12 | 20.89 | 24.38 | 27.68 | 30.84 | 33.89 | 36.84 | 39.66 | 42.36 | 44.90 | 47.33 | 49.71 | 52.14 | 54.88 | | | | | | | |
| 86.62 | 0.99 | 7.94 | 13.88 | 19.17 | 23.98 | 28.42 | 32.53 | 36.35 | 39.91 | 43.22 | 46.35 | 49.30 | 52.11 | 54.75 | 57.14 | 59.12 | 60.47 | | | | | | | |
| | 0.65 | 6.63 | 12.02 | 16.80 | 21.08 | 24.97 | 28.57 | 31.97 | 35.22 | 38.35 | 41.36 | 44.27 | 47.07 | 49.75 | 52.35 | 54.92 | 57.60 | | | | | | | |
| 94.55 | | 5.57 | 12.29 | 18.17 | 23.48 | 28.34 | 32.83 | 36.99 | 40.86 | 44.46 | 47.85 | 51.05 | 54.10 | 57.01 | 59.75 | 62.21 | 64.21 | 65.50 | | | | | | |
| | | 4.60 | 10.64 | 16.06 | 20.95 | 25.36 | 29.38 | 33.09 | 36.57 | 39.89 | 43.09 | 46.19 | 49.20 | 52.10 | 54.90 | 57.62 | 60.35 | 63.23 | | | | | | |
| 102.5 | | 2.85 | 10.19 | 16.78 | 22.65 | 27.93 | 32.73 | 37.17 | 41.32 | 45.24 | 48.94 | 52.45 | 55.79 | 58.96 | 61.96 | 64.79 | 67.34 | 69.42 | 70.69 | | | | | |
| | | 2.35 | 9.26 | 15.63 | 21.30 | 26.33 | 30.83 | 34.91 | 38.71 | 42.26 | 45.62 | 48.81 | 51.86 | 54.80 | 57.64 | 60.40 | 63.12 | 65.89 | 68.91 | | | | | |
| 110.4 | | | 8.19 | 15.64 | 22.14 | 27.87 | 32.99 | 37.65 | 42.00 | 46.11 | 50.02 | 53.72 | 57.29 | 60.72 | 63.98 | 67.06 | 69.96 | 72.59 | 74.74 | 76.08 | | | | |
| | | | 7.44 | 14.66 | 20.98 | 26.55 | 31.52 | 36.04 | 40.24 | 44.19 | 47.88 | 51.32 | 54.62 | 57.75 | 60.69 | 63.45 | 66.12 | 68.77 | 71.49 | 74.54 | | | | |
| 118.3 | | | 5.78 | 13.96 | 21.21 | 27.66 | 33.41 | 38.56 | 43.21 | 47.52 | 51.61 | 55.56 | 59.36 | 62.99 | 66.38 | 69.58 | 72.63 | 75.43 | 78.00 | 80.15 | 81.59 | | | |
| | | | 5.12 | 12.98 | 20.02 | 26.27 | 31.83 | 36.80 | 41.31 | 45.50 | 49.50 | 53.33 | 57.02 | 60.51 | 63.75 | 66.83 | 69.64 | 72.14 | 74.59 | 77.14 | 80.03 | | | |
| 126.3 | | | | 12.34 | 20.45 | 27.58 | 33.89 | 39.50 | 44.56 | 49.19 | 53.51 | 57.60 | 61.57 | 65.42 | 69.09 | 72.49 | 75.59 | 78.51 | 81.31 | 83.71 | 85.64 | 87.06 | | |
| | | | | 11.34 | 19.13 | 25.97 | 32.04 | 37.50 | 42.48 | 47.07 | 51.36 | 55.45 | 59.39 | 63.17 | 66.73 | 69.99 | 72.95 | 75.77 | 78.47 | 80.69 | 82.83 | 85.35 | | |
| 134.2 | | | | 10.77 | 19.72 | 27.48 | 34.25 | 40.23 | 45.62 | 50.57 | 55.18 | 59.53 | 63.71 | 67.77 | 71.72 | 75.41 | 78.75 | 81.72 | 84.38 | 86.93 | 89.27 | 91.24 | 92.53 | |
| | | | | 9.82 | 18.33 | 25.69 | 32.22 | 38.07 | 43.39 | 48.31 | 52.91 | 57.28 | 61.51 | 65.64 | 69.54 | 73.13 | 76.36 | 79.20 | 81.74 | 84.20 | 86.50 | 88.60 | 90.63 | |
| 142.1 | | | | 8.71 | 18.81 | 27.22 | 34.46 | 40.79 | 46.48 | 51.70 | 56.57 | 61.18 | 65.58 | 69.84 | 74.02 | 78.02 | 81.63 | 84.82 | 87.62 | 90.05 | 92.25 | 94.27 | 95.93 | 97.07 |
| | | | | 8.06 | 17.52 | 25.48 | 32.47 | 38.67 | 44.27 | 49.44 | 54.29 | 58.93 | 63.36 | 67.66 | 71.89 | 75.88 | 79.43 | 82.54 | 85.25 | 87.59 | 89.74 | 91.80 | 93.67 | 95.44 |
| 150.1 | | | | | 17.54 | 26.93 | 34.73 | 41.39 | 47.32 | 52.76 | 57.82 | 62.61 | 67.22 | 71.67 | 75.96 | 80.13 | 84.03 | 87.45 | 90.38 | 92.93 | 95.11 | 96.92 | 98.46 | 99.60 |
| | | | | | 16.60 | 25.53 | 32.99 | 39.46 | 45.30 | 50.68 | 55.74 | 60.59 | 65.32 | 69.85 | 74.17 | 78.34 | 82.23 | 85.60 | 88.49 | 91.01 | 93.18 | 95.06 | 96.89 | 98.64 |

(mm)

DIAMETER $D = 316$
HEIGHT $h = 100$
EXPANSION ANGLE $\lambda = 120$
BOSS RATIO $\nu = 0.272$

TABLE 216

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 217-220,
Replace Table 217 with the following:

| θ / r | 3.75 | 7.5 | 11.25 | 15 | 18.75 | 22.5 | 26.25 | 30 | 33.75 | 37.5 | 41.25 | 45 | 48.75 | 52.5 | 56.25 | 60 | 63.75 | 67.5 | 71.25 | 75 | 78.75 | 82.5 | 86.25 | 90 (deg) |
|---|---|---|---|---|---|---|---|---|---|---|---|---|---|---|---|---|---|---|---|---|---|---|---|---|
| 46.97 | | | 19.09 | 21.66 | 24.08 | 26.45 | 28.79 | 31.09 | 33.33 | 35.49 | 37.56 | 39.55 | 41.43 | 43.18 | 44.73 | 45.99 | 46.75 | 46.78 | | | | | | |
| | | | 16.78 | 18.40 | 20.02 | 21.64 | 23.26 | 24.93 | 26.68 | 28.53 | 30.43 | 32.37 | 34.30 | 36.20 | 38.09 | 40.02 | 42.09 | 44.51 | | | | | | |
| 54.9 | | 14.73 | 18.14 | 21.24 | 24.17 | 26.98 | 29.66 | 32.21 | 34.63 | 36.96 | 39.19 | 41.32 | 43.29 | 44.96 | 46.14 | 46.51 | | | | | | | | |
| | | 12.66 | 15.05 | 17.34 | 19.58 | 21.83 | 24.10 | 26.41 | 28.75 | 31.07 | 33.36 | 35.59 | 37.74 | 39.88 | 42.08 | 44.54 | | | | | | | | |
| 62.83 | 8.78 | 13.30 | 17.20 | 20.79 | 24.17 | 27.37 | 30.38 | 33.22 | 35.91 | 38.47 | 40.91 | 43.21 | 45.29 | 47.01 | 48.19 | 48.51 | | | | | | | | |
| | 7.60 | 11.01 | 14.14 | 17.09 | 19.91 | 22.66 | 25.37 | 28.03 | 30.66 | 33.22 | 35.68 | 38.03 | 40.27 | 42.45 | 44.66 | 47.12 | | | | | | | | |
| 70.76 | 7.02 | 11.78 | 16.19 | 20.30 | 24.15 | 27.75 | 31.12 | 34.28 | 37.26 | 40.07 | 42.72 | 45.21 | 47.50 | 49.48 | 50.99 | 51.74 | | | | | | | | |
| | 5.55 | 9.72 | 13.57 | 17.13 | 20.44 | 23.57 | 26.58 | 29.51 | 32.35 | 35.10 | 37.74 | 40.23 | 42.58 | 44.84 | 47.09 | 49.51 | | | | | | | | |
| 78.69 | 4.21 | 9.97 | 15.11 | 19.79 | 24.12 | 28.14 | 31.88 | 35.38 | 38.64 | 41.71 | 44.59 | 47.32 | 49.86 | 52.18 | 54.14 | 55.56 | 56.07 | | | | | | | |
| | 3.27 | 8.32 | 12.95 | 17.12 | 20.89 | 24.38 | 27.68 | 30.84 | 33.89 | 36.84 | 39.66 | 42.36 | 44.90 | 47.33 | 49.71 | 52.14 | 54.88 | | | | | | | |
| 86.62 | 0.99 | 7.94 | 13.88 | 19.17 | 23.98 | 28.42 | 32.53 | 36.35 | 39.91 | 43.22 | 46.35 | 49.30 | 52.11 | 54.75 | 57.14 | 59.12 | 60.47 | | | | | | | |
| | 0.65 | 6.63 | 12.02 | 16.80 | 21.08 | 24.97 | 28.57 | 31.97 | 35.22 | 38.35 | 41.36 | 44.27 | 47.07 | 49.75 | 52.35 | 54.92 | 57.60 | | | | | | | |
| 94.55 | | 5.57 | 12.29 | 18.17 | 23.48 | 28.34 | 32.83 | 36.99 | 40.86 | 44.46 | 47.85 | 51.05 | 54.10 | 57.01 | 59.75 | 62.21 | 64.21 | 65.50 | | | | | | |
| | | 4.60 | 10.64 | 16.06 | 20.95 | 25.36 | 29.38 | 33.09 | 36.57 | 39.89 | 43.09 | 46.19 | 49.20 | 52.10 | 54.90 | 57.62 | 60.35 | 63.23 | | | | | | |
| 102.5 | | 2.85 | 10.19 | 16.78 | 22.65 | 27.93 | 32.73 | 37.17 | 41.32 | 45.24 | 48.94 | 52.45 | 55.79 | 58.96 | 61.96 | 64.79 | 67.34 | 69.42 | 70.69 | | | | | |
| | | 2.35 | 9.26 | 15.63 | 21.30 | 26.33 | 30.83 | 34.91 | 38.71 | 42.26 | 45.62 | 48.81 | 51.86 | 54.80 | 57.64 | 60.40 | 63.12 | 65.89 | 68.91 | | | | | |
| 110.4 | | | 8.19 | 15.64 | 22.14 | 27.87 | 32.99 | 37.65 | 42.00 | 46.11 | 50.02 | 53.72 | 57.29 | 60.72 | 63.98 | 67.06 | 69.96 | 72.59 | 74.74 | 76.08 | | | | |
| | | | 7.44 | 14.66 | 20.98 | 26.55 | 31.52 | 36.04 | 40.24 | 44.19 | 47.88 | 51.32 | 54.62 | 57.75 | 60.69 | 63.45 | 66.12 | 68.77 | 71.49 | 74.54 | | | | |
| 118.3 | | | 5.78 | 13.96 | 21.21 | 27.66 | 33.41 | 38.56 | 43.21 | 47.52 | 51.61 | 55.56 | 59.36 | 62.99 | 66.38 | 69.58 | 72.63 | 75.43 | 78.00 | 80.15 | 81.59 | | | |
| | | | 5.12 | 12.98 | 20.02 | 26.27 | 31.83 | 36.60 | 41.31 | 45.50 | 49.50 | 53.33 | 57.02 | 60.51 | 63.75 | 66.83 | 69.64 | 72.14 | 74.59 | 77.14 | 80.03 | | | |
| 126.3 | | | | 12.34 | 20.45 | 27.58 | 33.89 | 39.50 | 44.56 | 49.19 | 53.51 | 57.60 | 61.57 | 65.42 | 69.09 | 72.49 | 75.59 | 78.51 | 81.31 | 83.71 | 85.84 | 87.06 | | |
| | | | | 11.34 | 19.13 | 25.97 | 32.04 | 37.50 | 42.48 | 47.07 | 51.36 | 55.45 | 59.39 | 63.17 | 66.73 | 69.99 | 72.95 | 75.77 | 78.47 | 80.69 | 82.83 | 85.35 | | |
| 134.2 | | | | 10.77 | 19.72 | 27.48 | 34.25 | 40.23 | 45.62 | 50.57 | 55.18 | 59.53 | 63.71 | 67.77 | 71.72 | 75.41 | 78.75 | 81.72 | 84.38 | 86.93 | 89.27 | 91.24 | 92.53 | |
| | | | | 9.82 | 18.33 | 25.69 | 32.22 | 38.07 | 43.39 | 48.31 | 52.91 | 57.28 | 61.51 | 65.64 | 69.54 | 73.13 | 76.36 | 79.20 | 81.74 | 84.20 | 86.50 | 88.60 | 90.63 | |
| 142.1 | | | | 8.71 | 18.81 | 27.22 | 34.46 | 40.79 | 46.48 | 51.70 | 56.57 | 61.18 | 65.58 | 69.84 | 74.02 | 78.02 | 81.63 | 84.82 | 87.62 | 90.05 | 92.25 | 94.27 | 95.93 | 97.07 |
| | | | | 8.06 | 17.52 | 25.48 | 32.47 | 38.67 | 44.27 | 49.44 | 54.29 | 58.93 | 63.36 | 67.66 | 71.89 | 75.88 | 79.43 | 82.54 | 85.25 | 87.59 | 89.74 | 91.80 | 93.67 | 95.44 |
| 150.1 | | | | | 17.54 | 26.93 | 34.73 | 41.39 | 47.32 | 52.76 | 57.82 | 62.61 | 67.22 | 71.67 | 75.96 | 80.13 | 84.03 | 87.45 | 90.38 | 92.93 | 95.11 | 96.92 | 98.46 | 99.60 |
| | | | | | 16.60 | 25.53 | 32.99 | 39.46 | 45.30 | 50.68 | 55.74 | 60.59 | 65.32 | 69.85 | 74.17 | 78.34 | 82.23 | 85.60 | 88.49 | 91.01 | 93.18 | 95.06 | 96.89 | 98.64 |

(mm)

DIAMETER $D = 316$
HEIGHT $h = 100$
EXPANSION ANGLE $\lambda = 90$
BOSS RATIO $\nu = 0.272$

TABLE 217

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 221-222,
Replace Table 218 with the following:

| θ / r | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 (deg) |
|---|---|---|---|---|---|---|---|---|---|---|---|---|---|---|---|---|---|---|---|---|---|---|---|---|
| 45.97 | | | 19.09 | 21.66 | 24.08 | 26.45 | 28.79 | 31.09 | 33.33 | 35.49 | 37.56 | 39.55 | 41.43 | 43.18 | 44.73 | 45.99 | 46.75 | 46.78 | | | | | | |
| | | | 16.78 | 18.40 | 20.02 | 21.64 | 23.26 | 24.93 | 26.68 | 28.53 | 30.43 | 32.37 | 34.30 | 36.20 | 38.09 | 40.02 | 42.09 | 44.51 | | | | | | |
| 54.9 | | 14.73 | 18.14 | 21.24 | 24.17 | 26.98 | 29.66 | 32.21 | 34.63 | 36.96 | 39.19 | 41.32 | 43.29 | 44.96 | 46.14 | 46.51 | | | | | | | | |
| | | 12.66 | 15.05 | 17.34 | 19.58 | 21.83 | 24.10 | 26.41 | 28.75 | 31.07 | 33.36 | 35.59 | 37.74 | 39.88 | 42.08 | 44.54 | | | | | | | | |
| 62.83 | 8.78 | 13.30 | 17.20 | 20.79 | 24.17 | 27.37 | 30.38 | 33.22 | 35.91 | 38.47 | 40.91 | 43.21 | 45.29 | 47.01 | 48.19 | 48.51 | | | | | | | | |
| | 7.60 | 11.01 | 14.14 | 17.09 | 19.91 | 22.66 | 25.37 | 28.03 | 30.66 | 33.22 | 35.68 | 38.03 | 40.27 | 42.45 | 44.66 | 47.12 | | | | | | | | |
| 70.76 | 7.02 | 11.78 | 16.19 | 20.30 | 24.15 | 27.75 | 31.12 | 34.28 | 37.26 | 40.07 | 42.72 | 45.21 | 47.50 | 49.48 | 50.99 | 51.74 | | | | | | | | |
| | 5.55 | 9.72 | 13.57 | 17.13 | 20.44 | 23.57 | 26.58 | 29.51 | 32.35 | 35.10 | 37.74 | 40.23 | 42.58 | 44.84 | 47.09 | 49.51 | | | | | | | | |
| 78.69 | 4.21 | 9.97 | 15.11 | 19.79 | 24.12 | 28.14 | 31.88 | 35.38 | 38.64 | 41.71 | 44.59 | 47.32 | 49.86 | 52.18 | 54.14 | 55.56 | 56.07 | | | | | | | |
| | 3.27 | 8.32 | 12.95 | 17.12 | 20.89 | 24.38 | 27.68 | 30.84 | 33.89 | 36.84 | 39.66 | 42.36 | 44.90 | 47.33 | 49.71 | 52.14 | 54.88 | | | | | | | |
| 86.62 | 0.99 | 7.94 | 13.88 | 19.17 | 23.98 | 28.42 | 32.53 | 36.35 | 39.91 | 43.22 | 46.35 | 49.30 | 52.11 | 54.75 | 57.14 | 59.12 | 60.47 | | | | | | | |
| | 0.65 | 6.63 | 12.02 | 16.80 | 21.08 | 24.97 | 28.57 | 31.97 | 35.22 | 38.35 | 41.36 | 44.27 | 47.07 | 49.75 | 52.35 | 54.92 | 57.60 | | | | | | | |
| 94.55 | | 5.57 | 12.29 | 18.17 | 23.48 | 28.34 | 32.83 | 36.99 | 40.86 | 44.46 | 47.85 | 51.05 | 54.10 | 57.01 | 59.75 | 62.21 | 64.21 | 65.50 | | | | | | |
| | | 4.60 | 10.64 | 16.06 | 20.95 | 25.36 | 29.38 | 33.09 | 36.57 | 39.89 | 43.09 | 46.19 | 49.20 | 52.10 | 54.90 | 57.62 | 60.35 | 63.23 | | | | | | |
| 102.5 | | 2.85 | 10.19 | 16.78 | 22.65 | 27.93 | 32.73 | 37.17 | 41.32 | 45.24 | 48.94 | 52.45 | 55.79 | 58.96 | 61.96 | 64.79 | 67.34 | 69.42 | 70.69 | | | | | |
| | | 2.35 | 9.26 | 15.63 | 21.30 | 26.33 | 30.83 | 34.91 | 38.71 | 42.26 | 45.62 | 48.81 | 51.86 | 54.80 | 57.64 | 60.40 | 63.12 | 65.89 | 68.91 | | | | | |
| 110.4 | | | 8.19 | 15.64 | 22.14 | 27.87 | 32.99 | 37.65 | 42.00 | 46.11 | 50.02 | 53.72 | 57.29 | 60.72 | 63.98 | 67.06 | 69.96 | 72.59 | 74.74 | 76.08 | | | | |
| | | | 7.44 | 14.66 | 20.98 | 26.55 | 31.52 | 36.04 | 40.24 | 44.19 | 47.88 | 51.32 | 54.62 | 57.75 | 60.69 | 63.45 | 66.12 | 68.77 | 71.49 | 74.54 | | | | |
| 118.3 | | | 5.78 | 13.96 | 21.21 | 27.66 | 33.41 | 38.56 | 43.21 | 47.52 | 51.61 | 55.56 | 59.36 | 62.99 | 66.38 | 69.58 | 72.63 | 75.43 | 78.00 | 80.15 | 81.59 | | | |
| | | | 5.12 | 12.98 | 20.02 | 26.27 | 31.83 | 36.80 | 41.31 | 45.50 | 49.50 | 53.33 | 57.02 | 60.51 | 63.75 | 66.83 | 69.64 | 72.14 | 74.59 | 77.14 | 80.03 | | | |
| 126.3 | | | | 12.34 | 20.45 | 27.58 | 33.89 | 39.50 | 44.56 | 49.19 | 53.51 | 57.60 | 61.57 | 65.42 | 69.09 | 72.49 | 75.59 | 78.51 | 81.31 | 83.71 | 85.64 | 87.06 | | |
| | | | | 11.34 | 19.13 | 25.97 | 32.04 | 37.50 | 42.48 | 47.07 | 51.36 | 55.45 | 59.39 | 63.17 | 66.73 | 69.99 | 72.95 | 75.77 | 78.47 | 80.69 | 82.83 | 85.35 | | |
| 134.2 | | | | 10.77 | 19.72 | 27.48 | 34.25 | 40.23 | 45.62 | 50.57 | 55.18 | 59.53 | 63.71 | 67.77 | 71.72 | 75.41 | 78.75 | 81.72 | 84.38 | 86.93 | 89.27 | 91.24 | 92.53 | |
| | | | | 9.82 | 18.33 | 25.69 | 32.22 | 38.07 | 43.39 | 48.31 | 52.91 | 57.28 | 61.51 | 65.64 | 69.54 | 73.13 | 76.36 | 79.20 | 81.74 | 84.20 | 86.50 | 88.60 | 90.63 | |
| 142.1 | | | | 8.71 | 18.81 | 27.22 | 34.46 | 40.79 | 46.48 | 51.70 | 56.57 | 61.18 | 65.58 | 69.84 | 74.02 | 78.02 | 81.63 | 84.82 | 87.62 | 90.05 | 92.25 | 94.27 | 95.93 | 97.07 |
| | | | | 8.06 | 17.52 | 25.48 | 32.47 | 38.67 | 44.27 | 49.44 | 54.29 | 58.93 | 63.36 | 67.66 | 71.89 | 75.88 | 79.43 | 82.54 | 85.25 | 87.59 | 89.74 | 91.80 | 93.67 | 95.44 |
| 150.1 | | | | | 17.54 | 26.93 | 34.73 | 41.39 | 47.32 | 52.76 | 57.82 | 62.61 | 67.22 | 71.67 | 75.96 | 80.13 | 84.03 | 87.45 | 90.38 | 92.93 | 95.11 | 96.92 | 98.46 | 99.60 |
| | | | | | 16.60 | 25.53 | 32.99 | 39.46 | 45.30 | 50.68 | 55.74 | 60.59 | 65.32 | 69.85 | 74.17 | 78.34 | 82.23 | 85.60 | 88.49 | 91.01 | 93.18 | 95.06 | 96.89 | 98.64 |

(mm)

DIAMETER $D = 316$
HEIGHT $h = 100$
EXPANSION ANGLE $\lambda = 72$
BOSS RATIO $\nu = 0.272$

TABLE 218

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 223-226,
Replace Table 219 with the following:

| θ \ r | 4.521 | 9.042 | 13.56 | 18.08 | 22.6 | 27.13 | 31.65 | 36.17 | 40.69 | 45.21 | 49.73 | 54.25 | 58.77 | 63.29 | 67.81 | 72.33 | 76.85 | 81.38 | 85.9 | 90.42 | 94.94 | 99.46 | 104 | 108.5 (deg) |
|---|---|---|---|---|---|---|---|---|---|---|---|---|---|---|---|---|---|---|---|---|---|---|---|---|
| 46.97 | | | 19.09 | 21.66 | 24.08 | 26.45 | 28.79 | 31.09 | 33.33 | 35.49 | 37.56 | 39.55 | 41.43 | 43.18 | 44.73 | 45.99 | 46.75 | 46.78 | | | | | | |
| | | | 16.78 | 18.40 | 20.02 | 21.64 | 23.26 | 24.93 | 26.68 | 28.53 | 30.43 | 32.37 | 34.30 | 36.20 | 38.09 | 40.02 | 42.09 | 44.51 | | | | | | |
| 54.9 | | 14.73 | 18.14 | 21.24 | 24.17 | 26.98 | 29.66 | 32.21 | 34.63 | 36.96 | 39.19 | 41.32 | 43.29 | 44.96 | 46.14 | 46.51 | | | | | | | | |
| | | 12.66 | 15.05 | 17.34 | 19.58 | 21.83 | 24.10 | 26.41 | 28.75 | 31.07 | 33.36 | 35.59 | 37.74 | 39.88 | 42.08 | 44.54 | | | | | | | | |
| 62.83 | 8.78 | 13.30 | 17.20 | 20.79 | 24.17 | 27.37 | 30.38 | 33.22 | 35.91 | 38.47 | 40.91 | 43.21 | 45.29 | 47.01 | 48.19 | 48.51 | | | | | | | | |
| | 7.60 | 11.01 | 14.14 | 17.09 | 19.91 | 22.66 | 25.37 | 28.03 | 30.66 | 33.22 | 35.68 | 38.03 | 40.27 | 42.45 | 44.66 | 47.12 | | | | | | | | |
| 70.76 | 7.02 | 11.78 | 16.19 | 20.30 | 24.15 | 27.75 | 31.12 | 34.28 | 37.26 | 40.07 | 42.72 | 45.21 | 47.50 | 49.48 | 50.99 | 51.74 | | | | | | | | |
| | 5.55 | 9.72 | 13.57 | 17.13 | 20.44 | 23.57 | 26.58 | 29.51 | 32.35 | 35.10 | 37.74 | 40.23 | 42.58 | 44.84 | 47.09 | 49.51 | | | | | | | | |
| 78.69 | 4.21 | 9.97 | 15.11 | 19.79 | 24.12 | 28.14 | 31.88 | 35.38 | 38.64 | 41.71 | 44.59 | 47.32 | 49.86 | 52.18 | 54.14 | 55.56 | 56.07 | | | | | | | |
| | 3.27 | 8.32 | 12.95 | 17.12 | 20.89 | 24.38 | 27.68 | 30.84 | 33.89 | 36.84 | 39.66 | 42.36 | 44.90 | 47.33 | 49.71 | 52.14 | 54.88 | | | | | | | |
| 86.62 | 0.99 | 7.94 | 13.88 | 19.17 | 23.98 | 28.42 | 32.53 | 36.35 | 39.91 | 43.22 | 46.35 | 49.30 | 52.11 | 54.75 | 57.14 | 59.12 | 60.47 | | | | | | | |
| | 0.65 | 6.63 | 12.02 | 16.80 | 21.08 | 24.97 | 28.57 | 31.97 | 35.22 | 38.35 | 41.36 | 44.27 | 47.07 | 49.75 | 52.35 | 54.92 | 57.60 | | | | | | | |
| 94.55 | | 5.57 | 12.29 | 18.17 | 23.48 | 28.34 | 32.83 | 36.99 | 40.86 | 44.46 | 47.85 | 51.05 | 54.10 | 57.01 | 59.75 | 62.21 | 64.21 | 65.50 | | | | | | |
| | | 4.60 | 10.64 | 16.06 | 20.95 | 25.36 | 29.38 | 33.09 | 36.57 | 39.89 | 43.09 | 46.19 | 49.20 | 52.10 | 54.90 | 57.62 | 60.35 | 63.23 | | | | | | |
| 102.5 | | 2.85 | 10.19 | 16.78 | 22.65 | 27.93 | 32.73 | 37.17 | 41.32 | 45.24 | 48.94 | 52.45 | 55.79 | 58.96 | 61.96 | 64.79 | 67.34 | 69.42 | 70.69 | | | | | |
| | | 2.35 | 9.26 | 15.63 | 21.30 | 26.33 | 30.83 | 34.91 | 38.71 | 42.26 | 45.62 | 48.81 | 51.86 | 54.80 | 57.64 | 60.40 | 63.12 | 65.89 | 68.91 | | | | | |
| 110.4 | | | 8.19 | 15.64 | 22.14 | 27.87 | 32.99 | 37.66 | 42.00 | 46.11 | 50.02 | 53.72 | 57.29 | 60.72 | 63.98 | 67.06 | 69.96 | 72.59 | 74.74 | 76.08 | | | | |
| | | | 7.44 | 14.66 | 20.98 | 26.55 | 31.52 | 36.04 | 40.24 | 44.19 | 47.88 | 51.32 | 54.62 | 57.75 | 60.69 | 63.45 | 66.12 | 68.77 | 71.49 | 74.54 | | | | |
| 118.3 | | | 5.78 | 13.96 | 21.21 | 27.66 | 33.41 | 38.56 | 43.21 | 47.52 | 51.61 | 55.56 | 59.36 | 62.99 | 66.38 | 69.58 | 72.63 | 75.43 | 78.00 | 80.15 | 81.59 | | | |
| | | | 5.12 | 12.98 | 20.02 | 26.27 | 31.83 | 36.80 | 41.31 | 45.50 | 49.50 | 53.33 | 57.02 | 60.51 | 63.75 | 66.83 | 69.64 | 72.14 | 74.59 | 77.14 | 80.03 | | | |
| 126.3 | | | | 12.34 | 20.45 | 27.58 | 33.89 | 39.50 | 44.56 | 49.19 | 53.51 | 57.60 | 61.57 | 65.42 | 69.09 | 72.49 | 75.59 | 78.51 | 81.31 | 83.71 | 85.64 | 87.06 | | |
| | | | | 11.34 | 19.13 | 25.97 | 32.04 | 37.50 | 42.48 | 47.07 | 51.36 | 55.45 | 59.39 | 63.17 | 66.73 | 69.99 | 72.95 | 75.77 | 78.47 | 80.69 | 82.83 | 85.35 | | |
| 134.2 | | | | 10.77 | 19.72 | 27.48 | 34.25 | 40.23 | 45.62 | 50.57 | 55.18 | 59.53 | 63.71 | 67.77 | 71.72 | 75.41 | 78.75 | 81.72 | 84.38 | 86.93 | 89.27 | 91.24 | 92.53 | |
| | | | | 9.82 | 18.33 | 25.69 | 32.22 | 38.07 | 43.39 | 48.31 | 52.91 | 57.28 | 61.51 | 65.64 | 69.54 | 73.13 | 76.36 | 79.20 | 81.74 | 84.20 | 86.50 | 88.60 | 90.63 | |
| 142.1 | | | | 8.71 | 18.81 | 27.22 | 34.46 | 40.79 | 46.48 | 51.70 | 56.57 | 61.18 | 65.58 | 69.84 | 74.02 | 78.02 | 81.63 | 84.82 | 87.62 | 90.05 | 92.25 | 94.27 | 95.93 | 97.07 |
| | | | | 8.06 | 17.52 | 25.48 | 32.47 | 38.67 | 44.27 | 49.44 | 54.29 | 58.93 | 63.36 | 67.66 | 71.89 | 75.88 | 79.43 | 82.54 | 85.25 | 87.59 | 89.74 | 91.80 | 93.67 | 95.44 |
| 150.1 | | | | | 17.54 | 26.93 | 34.73 | 41.39 | 47.32 | 52.76 | 57.82 | 62.61 | 67.22 | 71.67 | 75.96 | 80.13 | 84.03 | 87.45 | 90.38 | 92.93 | 95.11 | 96.92 | 98.46 | 99.60 |
| | | | | | 16.60 | 25.53 | 32.99 | 39.46 | 45.30 | 50.68 | 55.74 | 60.59 | 65.32 | 69.85 | 74.17 | 78.34 | 82.23 | 85.60 | 88.49 | 91.01 | 93.18 | 95.06 | 96.89 | 98.64 |

(mm)

DIAMETER D= 316
HEIGHT h= 100
EXPANSION ANGLE λ = 108.5
BOSS RATIO ν = 0.272

TABLE 219

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 226-228,
Replace Table 220 with the following:

| θ / r | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 | 120 (deg) |
|---|---|---|---|---|---|---|---|---|---|---|---|---|---|---|---|---|---|---|---|---|---|---|---|---|
| 80.34 | | | 30.74 | 34.88 | 38.77 | 42.58 | 46.35 | 50.06 | 53.66 | 57.13 | 60.47 | 63.67 | 66.70 | 69.53 | 72.02 | 74.04 | 75.27 | 75.32 | | | | | | |
| | | | 27.02 | 29.62 | 32.23 | 34.84 | 37.45 | 40.14 | 42.95 | 45.93 | 48.99 | 52.12 | 55.22 | 58.28 | 61.33 | 64.43 | 67.76 | 71.67 | | | | | | |
| 91.03 | | 23.71 | 29.21 | 34.20 | 38.92 | 43.44 | 47.78 | 51.85 | 55.75 | 59.50 | 63.10 | 66.52 | 69.70 | 72.39 | 74.29 | 74.89 | | | | | | | | |
| | | 20.39 | 24.23 | 27.92 | 31.53 | 35.14 | 38.80 | 42.52 | 46.28 | 50.03 | 53.71 | 57.29 | 60.76 | 64.21 | 67.76 | 71.72 | | | | | | | | |
| 101.7 | 14.14 | 21.41 | 27.69 | 33.48 | 38.91 | 44.06 | 48.91 | 53.48 | 57.81 | 61.94 | 65.87 | 69.56 | 72.91 | 75.88 | 77.58 | 78.10 | | | | | | | | |
| | 12.23 | 17.72 | 22.77 | 27.52 | 32.06 | 36.48 | 40.84 | 45.14 | 49.36 | 53.48 | 57.45 | 61.23 | 64.84 | 68.34 | 71.91 | 75.86 | | | | | | | | |
| 112.4 | 11.30 | 18.97 | 26.07 | 32.69 | 38.88 | 44.67 | 50.10 | 55.20 | 59.99 | 64.51 | 68.79 | 72.80 | 76.48 | 79.66 | 82.09 | 83.31 | | | | | | | | |
| | 8.93 | 15.65 | 21.85 | 27.58 | 32.90 | 37.95 | 42.80 | 47.51 | 52.09 | 56.52 | 60.76 | 64.77 | 68.56 | 72.19 | 75.82 | 79.70 | | | | | | | | |
| 123.1 | 6.78 | 16.05 | 24.33 | 31.87 | 38.83 | 45.30 | 51.33 | 56.95 | 62.21 | 67.15 | 71.80 | 76.18 | 80.28 | 84.01 | 87.17 | 89.46 | 90.28 | | | | | | | |
| | 5.26 | 13.40 | 20.85 | 27.56 | 33.64 | 39.26 | 44.57 | 49.66 | 54.57 | 59.31 | 63.86 | 68.20 | 72.29 | 76.20 | 80.03 | 83.95 | 88.36 | | | | | | | |
| 133.8 | 1.60 | 12.78 | 22.35 | 30.86 | 38.61 | 45.75 | 52.38 | 58.53 | 64.25 | 69.59 | 74.62 | 79.38 | 83.89 | 88.14 | 91.99 | 95.18 | 97.35 | | | | | | | |
| | 1.05 | 10.67 | 19.36 | 27.05 | 33.94 | 40.20 | 46.00 | 51.48 | 56.70 | 61.74 | 66.60 | 71.28 | 75.78 | 80.10 | 84.28 | 88.42 | 92.74 | | | | | | | |
| 144.5 | | 8.97 | 19.78 | 29.25 | 37.80 | 45.63 | 52.86 | 59.56 | 65.78 | 71.58 | 77.03 | 82.20 | 87.11 | 91.78 | 96.19 | 100.15 | 103.38 | 105.45 | | | | | | |
| | | 7.41 | 17.13 | 25.86 | 33.73 | 40.83 | 47.31 | 53.27 | 58.88 | 64.23 | 69.38 | 74.37 | 79.21 | 83.89 | 88.40 | 92.77 | 97.16 | 101.80 | | | | | | |
| 155.2 | | 4.58 | 16.41 | 27.01 | 36.47 | 44.96 | 52.70 | 59.85 | 66.53 | 72.83 | 78.79 | 84.45 | 89.83 | 94.93 | 99.76 | 104.32 | 108.42 | 111.77 | 113.81 | | | | | |
| | | 3.78 | 14.91 | 25.16 | 34.30 | 42.39 | 49.63 | 56.21 | 62.32 | 68.04 | 73.45 | 78.59 | 83.50 | 88.22 | 92.80 | 97.24 | 101.63 | 106.08 | 110.95 | | | | | |
| 165.9 | | | 13.19 | 25.19 | 35.65 | 44.87 | 53.11 | 60.62 | 67.62 | 74.24 | 80.54 | 86.49 | 92.24 | 97.76 | 103.01 | 107.96 | 112.63 | 116.86 | 120.32 | 122.49 | | | | |
| | | | 11.98 | 23.60 | 33.78 | 42.75 | 50.75 | 58.03 | 64.79 | 71.14 | 77.09 | 82.63 | 87.94 | 92.98 | 97.71 | 102.15 | 106.46 | 110.72 | 115.09 | 120.02 | | | | |
| 176.6 | | | 9.31 | 22.47 | 34.14 | 44.54 | 53.79 | 62.08 | 69.57 | 76.50 | 83.09 | 89.44 | 95.58 | 101.41 | 106.87 | 112.03 | 116.93 | 121.44 | 125.58 | 129.03 | 131.36 | | | |
| | | | 8.24 | 20.90 | 32.23 | 42.30 | 51.24 | 59.25 | 66.51 | 73.26 | 79.69 | 85.87 | 91.81 | 97.42 | 102.64 | 107.59 | 112.12 | 116.15 | 120.09 | 124.19 | 128.84 | | | |
| 187.2 | | | | 19.87 | 32.92 | 44.41 | 54.56 | 63.60 | 71.74 | 79.20 | 86.15 | 92.74 | 99.13 | 105.33 | 111.24 | 116.71 | 121.70 | 126.40 | 130.91 | 134.78 | 137.88 | 140.17 | | |
| | | | | 18.26 | 30.80 | 41.82 | 51.59 | 60.38 | 68.39 | 75.79 | 82.69 | 89.27 | 95.62 | 101.70 | 107.44 | 112.69 | 117.45 | 121.99 | 126.33 | 129.91 | 133.36 | 137.42 | | |
| 197.9 | | | | 17.35 | 31.75 | 44.25 | 55.14 | 64.77 | 73.45 | 81.42 | 88.83 | 95.85 | 102.57 | 109.12 | 115.47 | 121.40 | 126.79 | 131.56 | 135.85 | 139.95 | 143.72 | 146.89 | 148.97 | |
| | | | | 15.81 | 29.51 | 41.37 | 51.87 | 61.30 | 69.86 | 77.77 | 85.19 | 92.22 | 99.03 | 105.68 | 111.97 | 117.73 | 122.93 | 127.51 | 131.60 | 135.56 | 139.27 | 142.64 | 145.91 | |
| 208.6 | | | | 14.02 | 30.28 | 43.83 | 55.48 | 65.67 | 74.83 | 83.24 | 91.08 | 98.50 | 105.59 | 112.45 | 119.18 | 125.61 | 131.42 | 136.56 | 141.06 | 144.98 | 148.53 | 151.77 | 154.44 | 156.28 |
| | | | | 12.98 | 28.20 | 41.03 | 52.28 | 62.26 | 71.28 | 79.60 | 87.41 | 94.87 | 102.01 | 108.93 | 115.74 | 122.17 | 127.88 | 132.89 | 137.25 | 141.02 | 144.48 | 147.79 | 150.80 | 153.65 |
| 219.3 | | | | | 28.24 | 43.36 | 55.91 | 66.64 | 76.18 | 84.94 | 93.09 | 100.80 | 108.22 | 115.38 | 122.30 | 129.01 | 135.29 | 140.79 | 145.52 | 149.62 | 153.12 | 156.04 | 158.52 | 160.36 |
| | | | | | 26.72 | 41.10 | 53.12 | 63.53 | 72.94 | 81.60 | 89.73 | 97.55 | 105.16 | 112.46 | 119.41 | 126.13 | 132.39 | 137.81 | 142.47 | 146.52 | 150.01 | 153.05 | 156.00 | 158.82 |

(mm)

DIAMETER D= 460
HEIGHT h= 161
EXPANSION ANGLE $\lambda$ = 120
BOSS RATIO $\nu$ = 0.326

TABLE 220

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 229-232,
Replace Table 221 with the following:

| θ / r | 5.217 | 10.43 | 15.65 | 20.87 | 26.08 | 31.3 | 36.52 | 41.73 | 46.95 | 52.17 | 57.38 | 62.6 | 67.82 | 73.03 | 78.25 | 83.47 | 88.68 | 93.9 | 99.12 | 104.3 | 109.6 | 114.8 | 120 | 125.2 (deg) |
|---|---|---|---|---|---|---|---|---|---|---|---|---|---|---|---|---|---|---|---|---|---|---|---|---|
| 80.34 | | | 32.08 | 36.39 | 40.46 | 44.43 | 48.37 | 52.24 | 55.99 | 59.62 | 63.10 | 66.44 | 69.60 | 72.55 | 75.15 | 77.26 | 78.55 | 78.60 | | | | | | |
| | | | 28.20 | 30.91 | 33.63 | 36.35 | 39.08 | 41.88 | 44.82 | 47.92 | 51.12 | 54.38 | 57.62 | 60.82 | 64.00 | 67.23 | 70.71 | 74.78 | | | | | | |
| 91.03 | | 24.74 | 30.47 | 35.69 | 40.61 | 45.33 | 49.83 | 54.11 | 58.18 | 62.09 | 65.84 | 69.41 | 72.73 | 75.53 | 77.52 | 78.14 | | | | | | | | |
| | | 21.28 | 25.28 | 29.13 | 32.90 | 36.67 | 40.48 | 44.37 | 48.29 | 52.20 | 56.05 | 59.78 | 63.40 | 67.00 | 70.70 | 74.83 | | | | | | | | |
| 101.7 | 14.76 | 22.34 | 28.90 | 34.93 | 40.60 | 45.98 | 51.04 | 55.80 | 60.32 | 64.63 | 68.73 | 72.59 | 76.08 | 78.97 | 80.95 | 81.49 | | | | | | | | |
| | 12.76 | 18.49 | 23.76 | 28.72 | 33.45 | 38.07 | 42.61 | 47.10 | 51.51 | 55.81 | 59.95 | 63.89 | 67.66 | 71.32 | 75.03 | 79.16 | | | | | | | | |
| 112.4 | 11.80 | 19.80 | 27.20 | 34.11 | 40.57 | 46.61 | 52.28 | 57.60 | 62.59 | 67.32 | 71.78 | 75.96 | 79.81 | 83.12 | 85.66 | 86.93 | | | | | | | | |
| | 9.32 | 16.33 | 22.80 | 28.78 | 34.33 | 39.60 | 44.66 | 49.57 | 54.35 | 58.97 | 63.40 | 67.59 | 71.54 | 75.33 | 79.11 | 83.17 | | | | | | | | |
| 123.1 | 7.08 | 16.75 | 25.39 | 33.25 | 40.52 | 47.27 | 53.56 | 59.43 | 64.91 | 70.07 | 74.92 | 79.49 | 83.77 | 87.66 | 90.96 | 93.35 | 94.20 | | | | | | | |
| | 5.49 | 13.98 | 21.76 | 28.76 | 35.10 | 40.96 | 46.51 | 51.81 | 56.94 | 61.89 | 66.64 | 71.16 | 75.44 | 79.52 | 83.51 | 87.60 | 92.20 | | | | | | | |
| 133.8 | 1.67 | 13.33 | 23.32 | 32.20 | 40.29 | 47.74 | 54.66 | 61.07 | 67.04 | 72.62 | 77.86 | 82.83 | 87.54 | 91.97 | 95.99 | 99.32 | 101.58 | | | | | | | |
| | 1.10 | 11.13 | 20.20 | 28.23 | 35.41 | 41.95 | 48.00 | 53.72 | 59.17 | 64.42 | 69.49 | 74.38 | 79.07 | 83.58 | 87.94 | 92.26 | 96.77 | | | | | | | |
| 144.5 | | 9.36 | 20.64 | 30.52 | 39.44 | 47.62 | 55.16 | 62.15 | 68.64 | 74.70 | 80.38 | 85.77 | 90.89 | 95.77 | 100.37 | 104.51 | 107.88 | 110.04 | | | | | | |
| | | 7.73 | 17.87 | 26.99 | 35.19 | 42.61 | 49.36 | 55.59 | 61.44 | 67.02 | 72.40 | 77.61 | 82.65 | 87.54 | 92.24 | 96.80 | 101.38 | 106.23 | | | | | | |
| 155.2 | | 4.78 | 17.13 | 28.18 | 38.06 | 46.92 | 54.99 | 62.45 | 69.42 | 76.00 | 82.22 | 88.12 | 93.73 | 99.05 | 104.10 | 108.85 | 113.14 | 116.63 | 118.76 | | | | | |
| | | 3.94 | 15.56 | 26.26 | 35.79 | 44.24 | 51.79 | 58.66 | 65.03 | 71.00 | 76.84 | 82.00 | 87.13 | 92.06 | 96.83 | 101.47 | 106.04 | 110.69 | 115.77 | | | | | |
| 165.9 | | | 13.77 | 26.28 | 37.20 | 46.82 | 55.42 | 63.25 | 70.56 | 77.47 | 84.04 | 90.25 | 96.25 | 102.01 | 107.49 | 112.65 | 117.52 | 121.94 | 125.56 | 127.82 | | | | |
| | | | 12.50 | 24.62 | 35.25 | 44.61 | 52.96 | 60.56 | 67.61 | 74.24 | 80.44 | 86.22 | 91.76 | 97.03 | 101.96 | 106.60 | 111.09 | 115.54 | 120.10 | 125.23 | | | | |
| 176.6 | | | 9.72 | 23.45 | 35.63 | 46.47 | 56.13 | 64.78 | 72.60 | 79.83 | 86.70 | 93.33 | 99.73 | 105.82 | 111.52 | 116.90 | 122.01 | 126.72 | 131.04 | 134.64 | 137.07 | | | |
| | | | 8.60 | 21.80 | 33.63 | 44.14 | 53.47 | 61.82 | 69.40 | 76.44 | 83.15 | 89.60 | 95.80 | 101.66 | 107.11 | 112.27 | 117.00 | 121.20 | 125.31 | 129.59 | 134.44 | | | |
| 187.2 | | | | 20.73 | 34.35 | 46.34 | 56.93 | 66.36 | 74.86 | 82.64 | 89.90 | 96.77 | 103.44 | 109.91 | 116.08 | 121.78 | 126.99 | 131.90 | 136.60 | 140.64 | 143.88 | 146.27 | | |
| | | | | 19.05 | 32.14 | 43.64 | 53.84 | 63.00 | 71.36 | 79.06 | 86.29 | 93.15 | 99.77 | 106.13 | 112.11 | 117.58 | 122.56 | 127.29 | 131.83 | 135.56 | 139.16 | 143.39 | | |
| 197.9 | | | | 18.10 | 33.13 | 46.17 | 57.54 | 67.58 | 76.65 | 84.96 | 92.70 | 100.01 | 107.03 | 113.86 | 120.49 | 126.68 | 132.30 | 137.28 | 141.76 | 146.04 | 149.97 | 153.28 | 155.44 | |
| | | | | 16.49 | 30.79 | 43.17 | 54.13 | 63.96 | 72.90 | 81.16 | 88.89 | 96.23 | 103.33 | 110.27 | 116.83 | 122.85 | 128.28 | 133.06 | 137.32 | 141.45 | 145.32 | 148.84 | 152.25 | |
| 208.6 | | | | 14.63 | 31.59 | 45.74 | 57.89 | 68.53 | 78.08 | 86.86 | 95.04 | 102.76 | 110.18 | 117.34 | 124.36 | 131.07 | 137.13 | 142.50 | 147.20 | 151.29 | 154.98 | 158.37 | 161.16 | 163.08 |
| | | | | 13.55 | 29.43 | 42.81 | 54.55 | 64.96 | 74.38 | 83.06 | 91.22 | 98.99 | 106.45 | 113.67 | 120.78 | 127.48 | 133.44 | 138.66 | 143.22 | 147.15 | 150.76 | 154.22 | 157.36 | 160.33 |
| 219.3 | | | | | 29.47 | 45.25 | 58.34 | 69.54 | 79.50 | 88.63 | 97.14 | 105.18 | 112.93 | 120.40 | 127.61 | 134.62 | 141.18 | 146.91 | 151.85 | 156.13 | 159.78 | 162.82 | 165.42 | 167.33 |
| | | | | | 27.88 | 42.88 | 55.43 | 66.30 | 76.11 | 85.15 | 93.64 | 101.79 | 109.73 | 117.35 | 124.60 | 131.61 | 138.14 | 143.80 | 148.66 | 152.89 | 156.54 | 159.70 | 162.78 | 165.72 |

(mm)

DIAMETER $D = 460$
HEIGHT $h = 168$
EXPANSION ANGLE $\lambda = 125.2$
BOSS RATIO $\nu = 0.326$

TABLE 221

UNITED STATES PATENT AND TRADEMARK OFFICE
CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 231-234,
Replace Table 222 with the following:

| θ / r | 4.346 | 8.692 | 13.04 | 17.38 | 21.73 | 26.08 | 30.42 | 34.77 | 39.11 | 43.46 | 47.8 | 52.15 | 56.5 | 60.84 | 65.19 | 69.53 | 73.88 | 78.23 | 82.57 | 86.92 | 91.26 | 95.61 | 99.95 | 104.3 (deg) |
|---|---|---|---|---|---|---|---|---|---|---|---|---|---|---|---|---|---|---|---|---|---|---|---|---|
| 80.34 | | | 26.73 | 30.33 | 33.72 | 37.03 | 40.30 | 43.53 | 46.66 | 49.68 | 52.58 | 55.37 | 58.00 | 60.46 | 62.63 | 64.38 | 65.45 | 65.50 | | | | | | |
| | | | 23.50 | 25.75 | 28.03 | 30.30 | 32.56 | 34.90 | 37.35 | 39.94 | 42.60 | 45.32 | 48.02 | 50.68 | 53.33 | 56.03 | 58.92 | 62.32 | | | | | | |
| 91.03 | | 20.62 | 25.40 | 29.74 | 33.84 | 37.77 | 41.53 | 45.09 | 48.48 | 51.74 | 54.87 | 57.84 | 60.61 | 62.95 | 64.60 | 65.12 | | | | | | | | |
| | | 17.73 | 21.07 | 24.27 | 27.42 | 30.56 | 33.74 | 36.97 | 40.24 | 43.50 | 46.71 | 49.82 | 52.84 | 55.83 | 58.92 | 62.36 | | | | | | | | |
| 101.7 | 12.30 | 18.62 | 24.08 | 29.11 | 33.83 | 38.32 | 42.53 | 46.50 | 50.27 | 53.86 | 57.28 | 60.49 | 63.40 | 65.81 | 67.46 | 67.91 | | | | | | | | |
| | 10.63 | 15.41 | 19.80 | 23.93 | 27.88 | 31.72 | 35.51 | 39.25 | 42.92 | 46.51 | 49.96 | 53.24 | 56.38 | 59.43 | 62.53 | 65.97 | | | | | | | | |
| 112.4 | 9.83 | 16.50 | 22.67 | 28.43 | 33.81 | 38.84 | 43.57 | 48.00 | 52.16 | 56.10 | 59.81 | 63.30 | 66.51 | 69.27 | 71.39 | 72.44 | | | | | | | | |
| | 7.77 | 13.61 | 19.00 | 23.98 | 28.61 | 33.00 | 37.22 | 41.31 | 45.29 | 49.14 | 52.83 | 56.33 | 59.61 | 62.78 | 65.93 | 69.31 | | | | | | | | |
| 123.1 | 5.90 | 13.96 | 21.16 | 27.71 | 33.76 | 39.39 | 44.64 | 49.53 | 54.10 | 58.39 | 62.43 | 66.24 | 69.81 | 73.05 | 75.80 | 77.79 | 78.50 | | | | | | | |
| | 4.58 | 11.65 | 18.13 | 23.96 | 29.25 | 34.14 | 38.76 | 43.18 | 47.45 | 51.57 | 55.53 | 59.30 | 62.87 | 66.26 | 69.59 | 73.00 | 76.83 | | | | | | | |
| 133.8 | 1.39 | 11.11 | 19.43 | 26.84 | 33.57 | 39.79 | 45.55 | 50.89 | 55.87 | 60.51 | 64.89 | 69.03 | 72.95 | 76.65 | 79.99 | 82.76 | 84.65 | | | | | | | |
| | 0.92 | 9.28 | 16.83 | 23.52 | 29.51 | 34.96 | 40.00 | 44.76 | 49.31 | 53.69 | 57.91 | 61.98 | 65.90 | 69.65 | 73.28 | 76.89 | 80.65 | | | | | | | |
| 144.5 | | 7.80 | 17.20 | 25.43 | 32.87 | 39.68 | 45.97 | 51.79 | 57.20 | 62.25 | 66.99 | 71.48 | 75.74 | 79.81 | 83.65 | 87.09 | 89.90 | 91.70 | | | | | | |
| | | 6.45 | 14.90 | 22.49 | 29.33 | 35.51 | 41.14 | 46.33 | 51.20 | 55.85 | 60.33 | 64.67 | 68.88 | 72.95 | 76.87 | 80.67 | 84.48 | 88.52 | | | | | | |
| 155.2 | | 3.98 | 14.27 | 23.49 | 31.72 | 39.10 | 45.82 | 52.04 | 57.85 | 63.33 | 68.52 | 73.44 | 78.11 | 82.55 | 86.75 | 90.71 | 94.28 | 97.19 | 98.97 | | | | | |
| | | 3.28 | 12.97 | 21.88 | 29.83 | 36.87 | 43.16 | 48.88 | 54.19 | 59.17 | 63.87 | 68.33 | 72.61 | 76.72 | 80.69 | 84.56 | 88.37 | 92.24 | 96.48 | | | | | |
| 165.9 | | | 11.47 | 21.90 | 31.00 | 39.01 | 46.18 | 52.71 | 58.80 | 64.56 | 70.03 | 75.21 | 80.21 | 85.01 | 89.57 | 93.88 | 97.94 | 101.62 | 104.63 | 106.51 | | | | |
| | | | 10.41 | 20.52 | 29.37 | 37.17 | 44.13 | 50.46 | 56.34 | 61.86 | 67.04 | 71.85 | 76.47 | 80.86 | 84.96 | 88.83 | 92.57 | 96.28 | 100.08 | 104.36 | | | | |
| 176.6 | | | 8.10 | 19.54 | 29.69 | 38.73 | 46.78 | 53.98 | 60.50 | 66.52 | 72.25 | 77.78 | 83.11 | 88.18 | 92.93 | 97.42 | 101.68 | 105.60 | 109.20 | 112.20 | 114.22 | | | |
| | | | 7.17 | 18.17 | 28.03 | 36.78 | 44.56 | 51.52 | 57.83 | 63.70 | 69.29 | 74.67 | 79.83 | 84.71 | 89.26 | 93.56 | 97.50 | 101.00 | 104.43 | 107.99 | 112.04 | | | |
| 187.2 | | | | 17.27 | 28.63 | 38.62 | 47.45 | 56.30 | 62.39 | 68.87 | 74.92 | 80.64 | 86.20 | 91.59 | 96.73 | 101.49 | 105.83 | 109.92 | 113.83 | 117.20 | 119.90 | 121.89 | | |
| | | | | 15.88 | 26.78 | 36.36 | 44.86 | 52.50 | 59.47 | 65.90 | 71.91 | 77.62 | 83.14 | 88.44 | 93.42 | 97.99 | 102.13 | 106.08 | 109.86 | 112.97 | 115.97 | 119.49 | | |
| 197.9 | | | | 15.08 | 27.61 | 38.48 | 47.95 | 56.32 | 63.87 | 70.80 | 77.25 | 83.34 | 89.19 | 94.88 | 100.41 | 105.57 | 110.25 | 114.40 | 118.13 | 121.70 | 124.98 | 127.73 | 129.54 | |
| | | | | 13.74 | 25.66 | 35.97 | 45.11 | 53.30 | 60.75 | 67.63 | 74.08 | 80.19 | 86.11 | 91.90 | 97.36 | 102.38 | 106.90 | 110.88 | 114.44 | 117.87 | 121.10 | 124.04 | 126.88 | |
| 208.6 | | | | 12.19 | 26.33 | 38.11 | 48.24 | 57.10 | 65.07 | 72.38 | 79.20 | 85.65 | 91.82 | 97.78 | 103.63 | 109.23 | 114.28 | 118.75 | 122.66 | 126.07 | 129.15 | 131.98 | 134.30 | 135.90 |
| | | | | 11.29 | 24.52 | 35.68 | 45.46 | 54.14 | 61.98 | 69.21 | 76.01 | 82.50 | 88.70 | 94.72 | 100.65 | 106.24 | 111.20 | 115.55 | 119.35 | 122.62 | 125.63 | 128.52 | 131.13 | 133.61 |
| 219.3 | | | | | 24.56 | 37.70 | 48.62 | 57.95 | 66.25 | 73.86 | 80.95 | 87.65 | 94.11 | 100.33 | 106.35 | 112.19 | 117.65 | 122.43 | 126.54 | 130.11 | 133.15 | 135.68 | 137.85 | 139.45 |
| | | | | | 23.24 | 35.74 | 46.19 | 55.25 | 63.42 | 70.96 | 78.03 | 84.82 | 91.44 | 97.79 | 103.84 | 109.68 | 115.12 | 119.84 | 123.88 | 127.41 | 130.45 | 133.09 | 135.65 | 138.10 |

(mm)

DIAMETER D= 460
HEIGHT h= 140
EXPANSION ANGLE $\lambda$ = 104.3
BOSS RATIO $\nu$ = 0.326

TABLE 222

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 235-236,
Replace Table 223 with the following:

COMPARISON EXAMPLE 7

| θ / r | 10° | 15° | 20° | 25° | 30° | 35° | 40° | 45° | 50° | 55° | 60° | 65° | 70° | 75° | 80° | 85° | 90° | 95° | 100° |
|---|---|---|---|---|---|---|---|---|---|---|---|---|---|---|---|---|---|---|---|
| r 80 | 11.73 | 19.10 | 25.44 | 30.60 | 35.31 | 39.90 | 44.45 | 48.84 | 53.00 | 56.91 | 60.54 | 63.79 | 66.69 | | | | | | |
| | 6.47 | 13.00 | 19.27 | 24.95 | 29.81 | 34.29 | 38.60 | 42.80 | 46.92 | 50.95 | 54.90 | 58.74 | 62.24 | 65.73 | | | | | |
| r 90 | | 12.73 | 20.94 | 27.79 | 33.67 | 39.12 | 44.39 | 49.38 | 54.09 | 58.55 | 62.71 | 66.45 | 69.78 | 72.78 | | | | | |
| | | 7.72 | 15.35 | 22.37 | 28.82 | 34.15 | 39.00 | 43.69 | 48.20 | 52.63 | 56.99 | 61.24 | 65.20 | 69.05 | 72.74 | | | | |
| r 100 | | | 16.09 | 24.55 | 31.82 | 38.32 | 44.30 | 50.03 | 55.39 | 60.47 | 65.25 | 69.55 | 73.43 | 76.96 | | | | | |
| | | | 11.10 | 19.49 | 27.06 | 33.78 | 39.34 | 44.59 | 49.60 | 54.42 | 59.19 | 63.83 | 68.22 | 72.41 | 76.43 | 79.97 | | | |
| r 110 | | | | 21.17 | 29.78 | 37.40 | 44.32 | 50.81 | 56.89 | 62.60 | 67.99 | 72.88 | 77.34 | 81.37 | 84.91 | | | | |
| | | | 6.47 | 16.35 | 25.27 | 32.95 | 39.56 | 45.48 | 51.16 | 56.38 | 61.52 | 66.48 | 71.29 | 75.84 | 80.24 | 84.27 | | | |
| r 120 | | | | 16.62 | 27.71 | 36.46 | 44.43 | 51.73 | 58.63 | 65.02 | 70.96 | 76.44 | 81.49 | 86.04 | 90.12 | 93.56 | | | |
| | | | | 12.48 | 23.19 | 32.11 | 39.60 | 46.35 | 52.75 | 58.54 | 64.01 | 69.27 | 74.42 | 79.38 | 84.27 | 88.88 | 92.94 | | |
| r 130 | | | | | 25.07 | 35.42 | 44.45 | 52.76 | 60.49 | 67.60 | 74.14 | 80.18 | 85.76 | 90.79 | 95.43 | 99.34 | | | |
| | | | | | 20.47 | 30.82 | 39.57 | 47.10 | 54.26 | 60.75 | 66.61 | 72.15 | 77.63 | 83.00 | 88.46 | 93.70 | 98.22 | | |
| r 140 | | | | | 21.38 | 34.00 | 44.38 | 53.67 | 62.26 | 70.13 | 77.30 | 83.88 | 90.14 | 95.73 | 100.80 | 105.22 | 108.78 | | |
| | | | | | 16.83 | 29.05 | 39.13 | 47.59 | 55.60 | 62.95 | 69.35 | 75.17 | 80.99 | 86.79 | 92.74 | 98.44 | 103.48 | 107.80 | |
| r 150 | | | | | 15.39 | 31.83 | 43.84 | 54.32 | 63.84 | 72.47 | 80.37 | 87.60 | 94.28 | 100.52 | 106.07 | 110.94 | 114.95 | | |
| | | | | | 12.94 | 26.57 | 38.27 | 47.91 | 56.81 | 64.97 | 72.10 | 78.38 | 84.69 | 90.96 | 97.16 | 103.19 | 108.58 | 113.56 | |
| r 160 | | | | | | 29.55 | 43.21 | 54.64 | 65.14 | 74.33 | 82.96 | 90.49 | 97.62 | 104.34 | 110.63 | 116.05 | 120.85 | 124.87 | |
| | | | | | | 23.69 | 37.38 | 48.40 | 57.93 | 66.86 | 74.86 | 81.82 | 88.68 | 95.47 | 101.96 | 108.15 | 113.87 | 119.15 | 123.49 |
| r 170 | | | | | | 27.10 | 42.68 | 55.44 | 66.28 | 75.62 | 84.39 | 92.42 | 100.19 | 107.31 | 114.13 | 120.38 | 126.11 | 130.86 | |
| | | | | | | 21.19 | 36.26 | 48.76 | 59.06 | 68.53 | 77.20 | 85.22 | 92.83 | 99.88 | 106.68 | 113.09 | 119.02 | 124.38 | 128.87 |
| r 180 | | | | | | 21.52 | 42.14 | 56.11 | 67.43 | 77.37 | 86.87 | 95.58 | 103.50 | 111.06 | 118.11 | 124.80 | 130.98 | 136.36 | 140.79 |
| | | | | | | 19.14 | 35.30 | 49.17 | 60.36 | 70.38 | 79.63 | 88.20 | 96.29 | 103.91 | 110.87 | 117.74 | 123.88 | 129.55 | 134.46 |

(mm)

TABLE 223

Columns 237-238,
Replace Table 224 with the following:

COMPARISON EXAMPLE 8

| θ / r | 0° | 5° | 10° | 15° | 20° | 25° | 30° | 35° | 40° | 45° | 50° | 55° | 60° | 65° | 70° | 75° | 80° | 85° | 90° | 95° | 100° |
|---|---|---|---|---|---|---|---|---|---|---|---|---|---|---|---|---|---|---|---|---|---|
| r 45 | 31.80 | 33.99 | 36.21 | 38.47 | 40.72 | 42.84 | 44.86 | 46.79 | 48.62 | 50.36 | | | | | | | | | | | |
| r 55 | | 21.58 | 25.42 | 29.09 | 32.62 | 36.02 | 39.20 | 42.17 | 44.94 | 47.51 | 49.89 | 52.12 | 54.19 | | | | | | | | |
| r 65 | | | | 18.45 | 23.54 | 28.39 | 32.91 | 37.05 | 40.87 | 44.39 | 47.64 | 50.63 | 53.40 | 55.95 | 58.28 | | | | | | |
| r 75 | | | | | 14.55 | 20.92 | 26.88 | 32.29 | 37.22 | 41.75 | 45.90 | 49.71 | 53.21 | 56.42 | 59.35 | 62.01 | | | | | |
| r 85 | | | | | 5.55 | 13.74 | 21.12 | 27.82 | 33.89 | 39.42 | 44.49 | 49.13 | 53.38 | 57.26 | 60.82 | 64.05 | 66.97 | | | | |
| r 95 | | | | | | 7.05 | 15.69 | 23.59 | 30.77 | 37.25 | 43.20 | 48.63 | 53.60 | 58.14 | 62.30 | 66.10 | 69.55 | 72.72 | | | |
| r 105 | | | | | | 0.87 | 10.64 | 19.57 | 27.73 | 35.11 | 41.84 | 47.98 | 53.62 | 58.78 | 63.51 | 40.83 | 71.77 | 75.43 | | | |
| r 115 | | | | | | | 5.87 | 15.71 | 24.68 | 32.84 | 40.30 | 47.10 | 53.33 | 59.02 | 64.28 | 69.03 | 73.40 | 77.43 | 81.05 | | |
| r 125 | | | | | | | | 11.89 | 21.58 | 30.43 | 38.57 | 45.95 | 52.70 | 58.91 | 64.59 | 69.71 | 74.39 | 78.67 | 82.62 | 86.11 | |
| r 135 | | | | | | | | 8.27 | 18.40 | 27.98 | 36.72 | 44.67 | 51.94 | 58.58 | 64.65 | 70.17 | 75.14 | 79.63 | 83.70 | 87.39 | |
| r 145 | | | | | | | | | 15.14 | 25.50 | 34.77 | 43.28 | 51.06 | 58.04 | 64.45 | 70.43 | 75.63 | 80.43 | 84.74 | 88.67 | 92.17 |
| r 155 | | | | | | | | | | 22.91 | 32.82 | 41.86 | 50.08 | 57.34 | 64.11 | 70.44 | 75.95 | 81.10 | 85.79 | 89.95 | 93.67 |

(mm)

TABLE 224

UNITED STATES PATENT AND TRADEMARK OFFICE

CERTIFICATE OF CORRECTION

PATENT NO. : 6,688,848 B2 
DATED : February 10, 2004
INVENTOR(S) : M. Ohtsuka

It is certified that error appears in the above-identified patent and that said Letters Patent is hereby corrected as shown below:

Columns 237-240,
Replace Table 225 with the following:

COMPARISON EXAMPLE 9

| θ / r | END POINT AT TRAILING EDGE SIDE | 5° | 10° | 15° | 20° | 25° | 30° | 35° | 40° | 45° | 50° | 55° | 60° | 65° | 70° | 75° | 80° | 85° | 90° | 95° | 100° | 102.5° | END POINT AT LEADING EDGE SIDE |
|---|---|---|---|---|---|---|---|---|---|---|---|---|---|---|---|---|---|---|---|---|---|---|---|
| r88.5 | | | | | | | | | | | | | | | | | | | | | | | |
| | 0.00 | 6.00 | 12.54 | 19.50 | 25.83 | 31.51 | 37.02 | 42.04 | 46.64 | 51.26 | 55.75 | 60.17 | 64.51 | 68.67 | 72.48 | | | | | | | | 72.48 |
| r95 | | 5.78 | 12.77 | 20.55 | 27.94 | 34.52 | 40.58 | 46.17 | 51.36 | 56.45 | 61.43 | 66.35 | 71.14 | 75.75 | 80.17 | | | | | | | | |
| | 1.15 | 2.38 | 9.19 | 16.80 | 24.01 | 30.41 | 36.30 | 41.71 | 46.72 | 51.63 | 56.44 | 61.18 | 65.79 | 70.23 | 74.47 | | | | | | | | 77.09 |
| r105 | | | 7.06 | 15.24 | 23.89 | 31.71 | 38.60 | 44.82 | 50.57 | 56.08 | 61.49 | 66.82 | 71.97 | 76.95 | 81.75 | 86.34 | | | | | | | |
| | 2.75 | | 4.46 | 12.50 | 21.01 | 28.69 | 35.45 | 41.53 | 47.14 | 52.51 | 57.78 | 62.97 | 67.99 | 72.83 | 77.49 | 81.94 | | | | | | | 84.02 |
| r115 | | | | 10.57 | 20.43 | 29.72 | 37.80 | 44.75 | 51.05 | 57.01 | 62.82 | 68.52 | 74.06 | 79.40 | 84.48 | 89.39 | 94.10 | | | | | | |
| | 4.21 | | | 8.02 | 17.76 | 26.94 | 34.90 | 41.73 | 47.92 | 53.76 | 59.45 | 65.04 | 70.46 | 75.68 | 80.65 | 85.44 | 90.03 | | | | | | 90.83 |
| r125 | | | | | 16.59 | 27.30 | 37.02 | 44.95 | 51.87 | 58.29 | 64.48 | 70.52 | 76.37 | 82.01 | 87.39 | 92.61 | 97.65 | | | | | | |
| | 5.57 | | | | 14.09 | 24.70 | 34.31 | 42.14 | 48.95 | 55.27 | 61.35 | 67.29 | 73.04 | 78.57 | 83.85 | 88.96 | 93.90 | | | | | | 97.58 |
| r135 | | | | | 12.44 | 24.47 | 35.74 | 45.14 | 52.86 | 59.74 | 66.31 | 72.68 | 78.87 | 84.80 | 90.45 | 95.95 | 100.97 | 106.23 | | | | | |
| | 6.83 | | | | 9.94 | 21.89 | 33.09 | 42.41 | 50.05 | 56.86 | 63.35 | 69.64 | 75.75 | 81.61 | 87.18 | 92.60 | 97.55 | 102.73 | | | | | 104.29 |
| r145 | | | | | | 21.11 | 33.79 | 44.82 | 53.72 | 61.26 | 68.23 | 74.93 | 81.42 | 87.63 | 93.61 | 99.36 | 104.90 | 110.30 | | | | | |
| | 8.02 | | | | | 18.66 | 31.28 | 42.24 | 51.08 | 58.55 | 65.46 | 72.10 | 78.52 | 84.67 | 90.59 | 96.27 | 101.75 | 107.08 | | | | | 110.99 |
| r155 | | | | | | 17.35 | 31.43 | 44.01 | 54.51 | 62.82 | 70.23 | 77.27 | 84.05 | 90.56 | 96.87 | 102.90 | 108.74 | 114.38 | 119.80 | | | | |
| | 9.15 | | | | | 14.95 | 28.98 | 41.52 | 51.97 | 60.24 | 67.60 | 74.59 | 81.33 | 87.79 | 94.05 | 100.04 | 105.83 | 111.43 | 116.80 | | | | 117.70 |
| r165 | | | | | | 13.24 | 28.66 | 42.69 | 54.86 | 64.35 | 72.28 | 79.71 | 86.81 | 93.62 | 100.28 | 106.59 | 112.67 | 118.62 | 124.26 | | | | |
| | 10.21 | | | | | 10.84 | 26.23 | 40.23 | 52.37 | 61.83 | 69.72 | 77.12 | 84.19 | 90.97 | 97.60 | 103.88 | 109.93 | 115.85 | 121.46 | | | | 124.41 |
| r175 | | | | | | | 25.49 | 40.94 | 54.68 | 65.61 | 74.21 | 82.07 | 89.53 | 96.68 | 103.71 | 110.32 | 116.69 | 122.88 | 128.76 | | | | |
| | 11.21 | | | | | | 23.09 | 38.52 | 52.25 | 63.16 | 71.74 | 79.59 | 87.03 | 94.16 | 101.18 | 107.77 | 114.12 | 120.30 | 126.16 | | | | 131.15 |
| r185 | | | | | | | 22.17 | 38.89 | 53.89 | 66.48 | 75.97 | 84.38 | 92.23 | 99.77 | 107.13 | 114.13 | 120.81 | 127.30 | 133.42 | 139.16 | | | |
| | 12.16 | | | | | | 19.77 | 36.48 | 51.47 | 64.05 | 73.53 | 81.94 | 89.78 | 97.31 | 104.66 | 111.65 | 118.32 | 124.80 | 130.91 | 136.64 | | | 137.92 |
| r195 | | | | | | | 18.66 | 36.55 | 52.61 | 66.83 | 77.52 | 86.56 | 94.90 | 102.97 | 110.57 | 117.83 | 124.92 | 131.63 | 137.97 | 144.00 | | | |
| | 13.06 | | | | | | 16.26 | 34.15 | 50.21 | 64.43 | 75.12 | 84.16 | 92.50 | 100.57 | 108.17 | 115.53 | 122.52 | 129.23 | 135.57 | 141.60 | | | 144.71 |
| r205 | | | | | | | | 33.78 | 51.15 | 66.92 | 78.89 | 88.62 | 97.59 | 106.19 | 114.31 | 122.06 | 129.26 | 136.03 | 142.66 | 148.92 | | | |
| | 13.91 | | | | | | | 31.38 | 48.75 | 64.52 | 76.49 | 86.22 | 95.19 | 103.79 | 111.91 | 119.66 | 126.86 | 133.63 | 140.26 | 146.52 | | | 151.53 |
| r215 | | | | | | | | 30.90 | 49.52 | 66.71 | 80.05 | 90.51 | 100.20 | 109.51 | 118.09 | 126.39 | 133.95 | 140.62 | 147.40 | 153.94 | 160.13 | | |
| | 14.71 | | | | | | | 28.50 | 47.12 | 64.31 | 77.65 | 88.11 | 97.80 | 107.11 | 115.69 | 123.99 | 131.55 | 138.22 | 145.00 | 151.54 | 157.73 | | 158.39 |
| r225 | | | | | | | | 28.01 | 47.58 | 66.09 | 80.91 | 92.25 | 102.71 | 112.71 | 121.82 | 130.66 | 138.70 | 145.51 | 152.30 | 159.09 | 165.48 | | |
| | 15.47 | | | | | | | 25.61 | 45.18 | 63.69 | 78.51 | 89.85 | 100.31 | 110.31 | 119.42 | 128.26 | 136.30 | 143.11 | 149.90 | 156.69 | 163.08 | | 165.27 |
| r230 | | | | | | | | 26.46 | 46.67 | 65.62 | 81.23 | 93.06 | 103.93 | 114.27 | 123.67 | 132.77 | 141.10 | 148.07 | 154.81 | 161.74 | 168.14 | 171.12 | |
| | 15.82 | | | | | | | 24.06 | 44.27 | 63.22 | 78.83 | 90.66 | 101.53 | 111.87 | 121.27 | 130.37 | 138.70 | 145.67 | 152.41 | 159.34 | 165.74 | 168.72 | 168.72 |

(mm)

TABLE 225

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272,
Replace claims 1-45 with the following:

1. A propeller fan, comprising:
when coordinates in a cylindrical coordinate system having a z axis as a rotation axis of the propeller fan are (r, θ, z),
a curved shape defined by a r coordinate value, a θ coordinate value and a z coordinate value indicated in tables 1 and 2 below is determined as a base shape of a surface of a blade of said propeller fan,
the surface of the blade of said propeller fan being configured by a curved surface obtained by enlarging or reducing said base shape in at least one of r, θ and z directions, said tables 1 and 2 defined as follows:

| θ / r | 0.042 | 0.083 | 0.125 | 0.167 | 0.208 | 0.25 | 0.292 | 0.333 | 0.375 | 0.417 | 0.458 | 0.5 | 0.542 | 0.583 | 0.625 | 0.667 | 0.708 | 0.75 | 0.792 | 0.833 | 0.875 | 0.917 | 0.958 | 1 |
|---|---|---|---|---|---|---|---|---|---|---|---|---|---|---|---|---|---|---|---|---|---|---|---|---|
| 0.4 | | 0.145 | 0.181 | 0.214 | 0.246 | 0.276 | 0.304 | 0.329 | 0.353 | 0.375 | 0.395 | 0.414 | 0.429 | 0.438 | | | | | | | | | | |
| | | 0.137 | 0.164 | 0.190 | 0.214 | 0.237 | 0.261 | 0.284 | 0.307 | 0.329 | 0.350 | 0.371 | 0.392 | 0.414 | | | | | | | | | | |
| 0.45 | 0.085 | 0.134 | 0.176 | 0.215 | 0.249 | 0.280 | 0.310 | 0.337 | 0.363 | 0.388 | 0.412 | 0.433 | 0.452 | 0.466 | 0.474 | | | | | | | | | |
| | 0.080 | 0.118 | 0.152 | 0.183 | 0.211 | 0.239 | 0.265 | 0.291 | 0.317 | 0.341 | 0.365 | 0.387 | 0.409 | 0.430 | 0.453 | | | | | | | | | |
| 0.5 | 0.074 | 0.124 | 0.168 | 0.209 | 0.246 | 0.282 | 0.315 | 0.345 | 0.375 | 0.402 | 0.428 | 0.453 | 0.475 | 0.494 | 0.508 | 0.515 | | | | | | | | |
| | 0.061 | 0.105 | 0.144 | 0.179 | 0.211 | 0.242 | 0.271 | 0.300 | 0.328 | 0.365 | 0.381 | 0.405 | 0.428 | 0.450 | 0.473 | 0.498 | | | | | | | | |
| 0.55 | 0.044 | 0.102 | 0.153 | 0.200 | 0.242 | 0.282 | 0.319 | 0.354 | 0.386 | 0.417 | 0.445 | 0.473 | 0.498 | 0.521 | 0.540 | 0.554 | 0.559 | | | | | | | |
| | 0.036 | 0.087 | 0.133 | 0.174 | 0.211 | 0.246 | 0.279 | 0.310 | 0.340 | 0.369 | 0.397 | 0.424 | 0.449 | 0.473 | 0.497 | 0.522 | 0.549 | | | | | | | |
| 0.6 | | 0.077 | 0.137 | 0.190 | 0.238 | 0.283 | 0.325 | 0.364 | 0.399 | 0.433 | 0.464 | 0.494 | 0.522 | 0.549 | 0.573 | 0.593 | 0.606 | | | | | | | |
| | | 0.065 | 0.120 | 0.168 | 0.211 | 0.250 | 0.286 | 0.320 | 0.352 | 0.384 | 0.414 | 0.443 | 0.471 | 0.498 | 0.524 | 0.550 | 0.577 | | | | | | | |
| 0.65 | | 0.050 | 0.119 | 0.180 | 0.234 | 0.285 | 0.331 | 0.374 | 0.413 | 0.450 | 0.484 | 0.517 | 0.547 | 0.577 | 0.605 | 0.630 | 0.650 | 0.663 | | | | | | |
| | | 0.043 | 0.105 | 0.160 | 0.210 | 0.254 | 0.295 | 0.332 | 0.367 | 0.400 | 0.433 | 0.464 | 0.494 | 0.524 | 0.552 | 0.580 | 0.607 | 0.637 | | | | | | |
| 0.7 | | | 0.096 | 0.167 | 0.228 | 0.283 | 0.333 | 0.379 | 0.422 | 0.462 | 0.501 | 0.538 | 0.572 | 0.604 | 0.634 | 0.662 | 0.688 | 0.709 | 0.723 | | | | | |
| | | | 0.087 | 0.152 | 0.210 | 0.261 | 0.307 | 0.349 | 0.387 | 0.423 | 0.457 | 0.489 | 0.521 | 0.551 | 0.580 | 0.608 | 0.636 | 0.664 | 0.696 | | | | | |
| 0.75 | | | 0.072 | 0.152 | 0.222 | 0.284 | 0.339 | 0.389 | 0.435 | 0.478 | 0.519 | 0.558 | 0.595 | 0.629 | 0.662 | 0.692 | 0.720 | 0.746 | 0.769 | 0.784 | | | | |
| | | | 0.065 | 0.137 | 0.201 | 0.258 | 0.308 | 0.354 | 0.395 | 0.435 | 0.473 | 0.510 | 0.544 | 0.577 | 0.608 | 0.638 | 0.666 | 0.693 | 0.722 | 0.753 | | | | |
| 0.8 | | | 0.043 | 0.133 | 0.212 | 0.282 | 0.346 | 0.402 | 0.452 | 0.498 | 0.541 | 0.582 | 0.621 | 0.659 | 0.694 | 0.726 | 0.756 | 0.785 | 0.809 | 0.829 | 0.845 | | | |
| | | | 0.040 | 0.119 | 0.191 | 0.255 | 0.311 | 0.361 | 0.408 | 0.450 | 0.490 | 0.529 | 0.567 | 0.604 | 0.638 | 0.670 | 0.700 | 0.729 | 0.754 | 0.779 | 0.809 | | | |
| 0.85 | | | | 0.114 | 0.203 | 0.282 | 0.350 | 0.410 | 0.465 | 0.514 | 0.560 | 0.604 | 0.646 | 0.686 | 0.725 | 0.761 | 0.793 | 0.821 | 0.848 | 0.873 | 0.895 | 0.907 | 0.913 | |
| | | | | 0.103 | 0.183 | 0.252 | 0.313 | 0.369 | 0.419 | 0.466 | 0.510 | 0.552 | 0.593 | 0.632 | 0.670 | 0.705 | 0.736 | 0.764 | 0.790 | 0.816 | 0.840 | 0.864 | 0.893 | |
| 0.9 | | | | 0.093 | 0.183 | 0.278 | 0.351 | 0.415 | 0.473 | 0.526 | 0.575 | 0.621 | 0.666 | 0.709 | 0.751 | 0.791 | 0.826 | 0.858 | 0.885 | 0.908 | 0.930 | 0.949 | 0.963 | 0.969 |
| | | | | 0.086 | 0.174 | 0.250 | 0.317 | 0.376 | 0.431 | 0.481 | 0.528 | 0.572 | 0.615 | 0.657 | 0.699 | 0.737 | 0.772 | 0.802 | 0.829 | 0.852 | 0.875 | 0.897 | 0.919 | 0.943 |
| 0.95 | | | | | 0.180 | 0.274 | 0.352 | 0.420 | 0.480 | 0.535 | 0.586 | 0.635 | 0.681 | 0.726 | 0.769 | 0.811 | 0.850 | 0.884 | 0.914 | 0.939 | 0.960 | 0.976 | 0.990 | 0.997 |
| | | | | | 0.165 | 0.251 | 0.324 | 0.387 | 0.444 | 0.496 | 0.546 | 0.594 | 0.640 | 0.685 | 0.728 | 0.769 | 0.807 | 0.840 | 0.869 | 0.894 | 0.916 | 0.936 | 0.957 | 0.979 |

BOSS RATIO $\nu = 0.35$

TABLE 1

It is certified that error appears in the above-identified patent and that said Letters Patent is hereby corrected as shown below:

Columns 253-272 (cont'd),

| r | θ | z |
|---|---|---|
| 0.383 | 0.641 | 0.453 |
| | | 0.446 |
| 0.466 | 0.660 | 0.487 |
| | | 0.480 |
| 0.569 | 0.724 | 0.577 |
| | | 0.571 |
| 0.697 | 0.814 | 0.721 |
| | | 0.714 |
| 0.859 | 0.984 | 0.923 |
| | | 0.916 |
| 0.924 | 1.034 | 0.984 |
| | | 0.978 |
| 0.972 | 0.981 | 0.998 |
| | | 0.991 |
| 0.993 | 0.910 | 0.985 |
| | | 0.977 |
| 1.000 | 0.838 | 0.953 |
| | | 0.946 |
| 1.000 | 0.757 | 0.900 |
| | | 0.893 |

| r | θ | z |
|---|---|---|
| 1.000 | 0.678 | 0.829 |
| | | 0.823 |
| 1.000 | 0.539 | 0.680 |
| | | 0.674 |
| 1.000 | 0.403 | 0.515 |
| | | 0.509 |
| 1.000 | 0.334 | 0.415 |
| | | 0.411 |
| 1.000 | 0.260 | 0.279 |
| | | 0.275 |
| 1.000 | 0.209 | 0.157 |
| | | 0.154 |
| 0.972 | 0.181 | 0.092 |
| | | 0.090 |
| 0.946 | 0.170 | 0.077 |
| | | 0.075 |
| 0.877 | 0.147 | 0.051 |
| | | 0.049 |
| 0.847 | 0.138 | 0.044 |
| | | 0.042 |

| r | θ | z |
|---|---|---|
| 0.808 | 0.125 | 0.038 |
| | | 0.037 |
| 0.762 | 0.110 | 0.033 |
| | | 0.031 |
| 0.726 | 0.098 | 0.028 |
| | | 0.026 |
| 0.704 | 0.090 | 0.026 |
| | | 0.024 |
| 0.680 | 0.079 | 0.023 |
| | | 0.022 |
| 0.641 | 0.062 | 0.015 |
| | | 0.013 |
| 0.584 | 0.034 | 0.006 |
| | | 0.004 |
| 0.521 | 0.014 | 0.027 |
| | | 0.020 |

TABLE 2

2. A die for molding a propeller fan, wherein a surface of a portion forming a surface of a blade of said propeller fan in the die is configured by a curved surface obtained by enlarging or reducing the base shape according to claim 1 in at least one of r, θ and z directions.

3. The propeller fan according to claim 1, wherein
when a diameter of said propeller fan is D, a height in said z direction is h and an expansion angle of said blade is λ,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (1) below using three-dimensional coordinate values indicated in said tables 1 and 2, $$\left.\begin{array}{l}
\theta_1 = c \times \theta + d \ (\text{deg}) \\
z_{1u} = e_u \times z_u + f_u \ (\text{mm}) \\
z_{1d} = e_d \times z_d + f_d \ (\text{mm}) \\
(a,\ c,\ e_u,\ e_d\text{: factor of proportionality, } b,\ d,\ f_u,\ f_d\text{: constant}) \\
\text{wherein} \\
a = \frac{D}{2} \\
b = 0 \\
c = \lambda \\
d\text{: optional} \\
h = e_u \geqq e_d \\
f_u \geqq f_d\text{: optional}
\end{array}\right\} \quad (1)$$

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd), the surface of the blade of said propeller fan being configured by a curved surface defined by said ($r_1$, $\theta_1$, $z_{1u}$) and said ($r_1$, $\theta_1$, $z_{1d}$).

4. A die for molding a propeller fan, wherein a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (1) recited in claim 3.

5. The propeller fan according to claim 1, wherein when a diameter of said propeller fan is D, a height in said z direction is h and the number of blades is n; r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (2) below using three-dimensional coordinate values indicated in tables 1 and 2, $$\left.\begin{array}{l}
r_1 = a \times r + b \text{ (mm)} \\
\theta_1 = c \times \theta + d \text{ (deg)} \\
z_{1u} = e_u \times z_u + f_u \text{ (mm)} \\
z_{1d} = e_d \times z_d + f_d \text{ (mm)} \\
(a,\ c,\ e_u,\ e_d\text{: factor of proportionality, } b,\ d,\ f_u,\ f_d\text{: constant}) \\
\text{wherein} \\
a = \dfrac{D}{2} \\
b = 0 \\
c = \dfrac{360}{n} \\
d\text{: optional} \\
h = e_u \geqq e_d \\
f_u \geqq f_d\text{: optional}
\end{array}\right\} \quad (2)$$

the surface of the blade of said propeller fan being configured by a curved surface defined by said ($r_1$, $\theta_1$, $z_{1u}$) and said ($r_1$, $\theta_1$, $z_{1d}$).

6. A die for molding a propeller fan, wherein a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (2) recited in claim 5.

7. The propeller fan according to claim 1, wherein when the diameter of said propeller fan is D and the height in said z direction is h, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (3) below using three-dimensional coordinate values indicated in tables 1 and 2,

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd), $$\left.\begin{array}{l} r_1 = a \times r + b \text{ (mm)} \\ \theta_1 + c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = \frac{D}{2} \\ b = 0 \\ c = \frac{2400}{7} \times \frac{h}{D} \\ d\text{: optional} \\ h = e_u \geqq e_d \\ f_u \geqq f_d\text{: optional} \end{array}\right\} \quad (3)$$

the surface of the blade of said propeller fan being configured by a curved surface defined by said ($r_1$, $\theta_1$, $z_{1u}$) and said ($r_1$, $\theta_1$, $z_{1d}$).

8. A die for molding a propeller fan, wherein
a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (3) recited in claim 7.

9. The propeller fan according to claim 1, wherein
said propeller fan comprises a boss portion, and
when a diameter of said propeller fan is D, a boss ratio which is a ratio of the diameter of said propeller fan to a diameter of said boss portion is v, a height in said z direction is h, and an expansion angle of said blade is $\lambda$,
r, $\theta$, z coordinates ($r_1$, $\theta_1$, $z_{1u}$) defining a surface on a suction side of said blade and r, $\theta$, z coordinates ($r_1$, $\theta_1$, $z_{1d}$) defining a surface on a blowing side of said blade are obtained by a transformation formula (4) below using three-dimensional coordinate values indicated in said tables 1 and 2, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = \frac{10}{13} D(1 - v) \\ b = -\frac{10}{13} D(1 - v) \times 0.35 + \frac{vD}{2} \\ c = \lambda \\ d\text{: optional} \\ h = e_u \geqq e_d \\ f_u \geqq f_d\text{: optional} \end{array}\right\} \quad (4)$$

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd), the surface of the blade of said propeller fan being configured by a curved surface defined by said ($r_1$, $\theta_1$, $z_{1u}$) and said ($r_1$, $\theta_1$, $z_{1d}$).

10. A die for molding the propeller fan, wherein
a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (4) recited in claim 9.

11. The propeller fan according to claim 1, wherein
said propeller fan comprises a boss portion, and
when a diameter of said propeller fan is D, a boss ratio which is a ratio of the diameter of said propeller fan to a diameter of said boss portion is v, a height in said z direction is h, and the number of blades is n,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (5) below using three-dimensional coordinate values indicated in said tables 1 and 2, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = \frac{10}{13}D(1-v) \\ b = -\frac{10}{13}D(1-v) \times 0.35 + \frac{vD}{2} \\ c = \frac{360}{n} \\ d\text{: optional} \\ h = e_u \geqq e_d \\ f_u \geqq f_d \end{array}\right\} \quad (5)$$

the surface of the blade of said propeller fan being configured by a curved surface defined by said ($r_1$, $\theta_1$, $z_{1u}$) and said ($r_1$, $\theta_1$, $z_{1d}$).

12. A die for molding a propeller fan, wherein
a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (5) recited in claim 11.

13. The propeller fan according to claim 1, wherein
said propeller fan comprises a boss portion, and
when a diameter of said propeller fan is D, a boss ratio which is a ratio of the diameter of said propeller fan to a diameter of said boss portion is v, and a height in said z direction is h,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (6) below using three-dimensional coordinate values indicated in tables 1 and 2,

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd), $$\left.\begin{aligned}
&r_1 = a \times r + b \text{ (mm)}\\
&\theta_1 = c \times \theta + d \text{ (deg)}\\
&z_{1u} = e_u \times z_u + f_u \text{ (mm)}\\
&z_{1d} = e_d \times z_d + f_d \text{ (mm)}\\
&(a, c, e_u, e_d\text{: factor of proportionality, } b, d, f_u, f_d\text{: constant})\\
&\text{wherein}\\
&a = \frac{10}{13}D(1-v)\\
&b = -\frac{10}{13}D(1-v)\times 0.35 + \frac{vD}{2}\\
&c = \frac{2400}{7}\times\frac{h}{D}\\
&d\text{: optional}\\
&h = e_u \geqq e_d\\
&f_u \geqq f_d\text{: optional}
\end{aligned}\right\} \quad (6)$$

the surface of the blade of said propeller fan being configured by a curved surface defined by said $(r_1, \theta_1, z_{1u})$ and said $(r_1, \theta_1, z_{1d})$.

14. A die for molding the propeller fan, wherein
a surface of a portion forming a surface of a blade of said propeller fan in the die is configured by a curved surface defined by the $(r_1, \theta_1, z_{1u})$ and the $(r_1, \theta_1, z_{1d})$ obtained by the transformation formula (6) recited in claim 13.

15. A fluid feeding device, comprising:
a blower having a propeller fan recited in any one of claims 1, 3, 5, 7, 9, 11 and 13, and a drive motor driving the propeller fan.

16. A propeller fan, comprising:
when coordinates in a cylindrical coordinate system having a z axis as a rotation axis of the propeller fan are (r, θ, z),
a curved shape defined by a r coordinate value, a θ coordinate value and a z coordinate value indicated in table 101 below is determined as a base shape of a surface of a blade of said propeller fan,
the surface of the blade of said propeller fan being configured by a curved surface obtained by enlarging or reducing said base shape in at least one of r, θ and z directions, said table 101 defined as follows:

It is certified that error appears in the above-identified patent and that said Letters Patent is hereby corrected as shown below:

Columns 253-272 (cont'd),

| r \ θ | 0.042 | 0.083 | 0.125 | 0.167 | 0.208 | 0.25 | 0.292 | 0.333 | 0.375 | 0.417 | 0.458 | 0.5 | 0.542 | 0.583 | 0.625 | 0.667 | 0.708 | 0.75 | 0.792 | 0.833 | 0.875 | 0.917 | 0.958 | 1 |
|---|---|---|---|---|---|---|---|---|---|---|---|---|---|---|---|---|---|---|---|---|---|---|---|---|
| 0.3 | | | 0.190 | 0.215 | 0.238 | 0.261 | 0.284 | 0.307 | 0.329 | 0.350 | 0.371 | 0.390 | 0.409 | 0.427 | 0.443 | 0.456 | 0.465 | 0.468 | | | | | | |
| | | | 0.168 | 0.184 | 0.201 | 0.218 | 0.234 | 0.252 | 0.270 | 0.288 | 0.308 | 0.327 | 0.346 | 0.365 | 0.384 | 0.403 | 0.422 | 0.444 | | | | | | |
| 0.35 | | 0.146 | 0.180 | 0.210 | 0.238 | 0.266 | 0.292 | 0.318 | 0.342 | 0.365 | 0.387 | 0.409 | 0.428 | 0.446 | 0.459 | 0.465 | | | | | | | | |
| | | 0.126 | 0.150 | 0.174 | 0.197 | 0.220 | 0.243 | 0.267 | 0.290 | 0.314 | 0.337 | 0.359 | 0.381 | 0.402 | 0.423 | 0.445 | | | | | | | | |
| 0.4 | 0.087 | 0.132 | 0.170 | 0.205 | 0.238 | 0.270 | 0.300 | 0.328 | 0.355 | 0.380 | 0.405 | 0.428 | 0.449 | 0.466 | 0.479 | 0.485 | | | | | | | | |
| | 0.076 | 0.110 | 0.142 | 0.172 | 0.201 | 0.229 | 0.257 | 0.284 | 0.310 | 0.336 | 0.361 | 0.384 | 0.407 | 0.428 | 0.449 | 0.472 | | | | | | | | |
| 0.45 | 0.069 | 0.116 | 0.160 | 0.201 | 0.238 | 0.274 | 0.307 | 0.339 | 0.368 | 0.396 | 0.423 | 0.448 | 0.471 | 0.491 | 0.506 | 0.516 | | | | | | | | |
| | 0.055 | 0.098 | 0.137 | 0.173 | 0.207 | 0.239 | 0.270 | 0.299 | 0.328 | 0.355 | 0.382 | 0.407 | 0.430 | 0.453 | 0.475 | 0.497 | | | | | | | | |
| 0.5 | 0.042 | 0.099 | 0.150 | 0.196 | 0.239 | 0.278 | 0.315 | 0.350 | 0.382 | 0.413 | 0.442 | 0.469 | 0.494 | 0.518 | 0.538 | 0.553 | 0.560 | | | | | | | |
| | 0.033 | 0.084 | 0.131 | 0.173 | 0.212 | 0.247 | 0.280 | 0.312 | 0.343 | 0.373 | 0.401 | 0.428 | 0.453 | 0.477 | 0.501 | 0.524 | 0.549 | | | | | | | |
| 0.55 | 0.010 | 0.079 | 0.138 | 0.190 | 0.238 | 0.282 | 0.292 | 0.360 | 0.395 | 0.428 | 0.459 | 0.489 | 0.517 | 0.543 | 0.568 | 0.588 | 0.603 | | | | | | | |
| | 0.006 | 0.067 | 0.121 | 0.170 | 0.213 | 0.252 | 0.289 | 0.323 | 0.356 | 0.387 | 0.418 | 0.447 | 0.475 | 0.502 | 0.527 | 0.552 | 0.578 | | | | | | | |
| 0.6 | | 0.056 | 0.122 | 0.180 | 0.233 | 0.281 | 0.326 | 0.367 | 0.405 | 0.441 | 0.475 | 0.507 | 0.537 | 0.566 | 0.594 | 0.618 | 0.639 | 0.654 | | | | | | |
| | | 0.046 | 0.107 | 0.162 | 0.211 | 0.256 | 0.296 | 0.334 | 0.369 | 0.403 | 0.435 | 0.466 | 0.496 | 0.525 | 0.553 | 0.580 | 0.606 | 0.634 | | | | | | |
| 0.65 | | 0.029 | 0.102 | 0.167 | 0.226 | 0.278 | 0.326 | 0.370 | 0.411 | 0.450 | 0.487 | 0.522 | 0.555 | 0.586 | 0.616 | 0.644 | 0.670 | 0.692 | 0.706 | | | | | |
| | | 0.023 | 0.093 | 0.157 | 0.214 | 0.264 | 0.309 | 0.351 | 0.389 | 0.425 | 0.459 | 0.491 | 0.522 | 0.551 | 0.580 | 0.608 | 0.635 | 0.662 | 0.690 | | | | | |
| 0.7 | | | 0.082 | 0.156 | 0.221 | 0.278 | 0.329 | 0.376 | 0.419 | 0.460 | 0.499 | 0.535 | 0.571 | 0.605 | 0.637 | 0.668 | 0.696 | 0.723 | 0.745 | 0.760 | | | | |
| | | | 0.074 | 0.147 | 0.210 | 0.266 | 0.316 | 0.361 | 0.403 | 0.443 | 0.480 | 0.515 | 0.548 | 0.580 | 0.609 | 0.637 | 0.664 | 0.691 | 0.717 | 0.746 | | | | |
| 0.75 | | | 0.058 | 0.139 | 0.212 | 0.276 | 0.333 | 0.385 | 0.431 | 0.474 | 0.515 | 0.554 | 0.592 | 0.628 | 0.662 | 0.694 | 0.724 | 0.752 | 0.777 | 0.799 | 0.815 | | | |
| | | | 0.051 | 0.130 | 0.201 | 0.263 | 0.319 | 0.369 | 0.414 | 0.456 | 0.496 | 0.535 | 0.572 | 0.607 | 0.639 | 0.670 | 0.699 | 0.724 | 0.749 | 0.774 | 0.801 | | | |
| 0.8 | | | | 0.123 | 0.204 | 0.275 | 0.338 | 0.394 | 0.444 | 0.491 | 0.534 | 0.575 | 0.614 | 0.653 | 0.689 | 0.723 | 0.754 | 0.783 | 0.811 | 0.835 | 0.854 | 0.870 | | |
| | | | | 0.114 | 0.192 | 0.261 | 0.322 | 0.376 | 0.426 | 0.472 | 0.515 | 0.556 | 0.595 | 0.633 | 0.669 | 0.702 | 0.731 | 0.760 | 0.787 | 0.809 | 0.830 | 0.855 | | |
| 0.85 | | | | 0.107 | 0.197 | 0.274 | 0.341 | 0.401 | 0.455 | 0.504 | 0.550 | 0.594 | 0.636 | 0.676 | 0.716 | 0.752 | 0.786 | 0.815 | 0.842 | 0.867 | 0.891 | 0.910 | 0.924 | |
| | | | | 0.098 | 0.221 | 0.258 | 0.324 | 0.382 | 0.435 | 0.485 | 0.531 | 0.574 | 0.617 | 0.658 | 0.697 | 0.733 | 0.765 | 0.794 | 0.819 | 0.844 | 0.867 | 0.888 | 0.907 | |
| 0.9 | | | | 0.087 | 0.187 | 0.271 | 0.343 | 0.406 | 0.463 | 0.515 | 0.564 | 0.610 | 0.654 | 0.697 | 0.739 | 0.779 | 0.815 | 0.847 | 0.875 | 0.899 | 0.921 | 0.941 | 0.958 | 0.970 |
| | | | | 0.081 | 0.176 | 0.256 | 0.326 | 0.388 | 0.444 | 0.496 | 0.545 | 0.591 | 0.636 | 0.678 | 0.720 | 0.760 | 0.796 | 0.827 | 0.854 | 0.878 | 0.899 | 0.920 | 0.938 | 0.955 |
| 0.95 | | | | | 0.175 | 0.268 | 0.346 | 0.413 | 0.472 | 0.526 | 0.577 | 0.625 | 0.671 | 0.716 | 0.759 | 0.800 | 0.839 | 0.873 | 0.903 | 0.928 | 0.950 | 0.968 | 0.984 | 0.996 |
| | | | | | 0.166 | 0.254 | 0.331 | 0.396 | 0.454 | 0.508 | 0.559 | 0.607 | 0.654 | 0.700 | 0.743 | 0.785 | 0.823 | 0.857 | 0.886 | 0.911 | 0.933 | 0.952 | 0.970 | 0.987 |

BOSS RATIO $\nu$ = 0.275

TABLE 101

17. A die for molding the propeller fan, wherein a surface of a portion forming a surface of a blade of said propeller fan in the die is configured by a curved surface obtained by enlarging or reducing the base shape according to claim 16 in at least one of r, θ and z directions.

18. The propeller fan according to claim 16 wherein when a diameter of said propeller fan is D, a height in said z direction is h and an expansion angle of said blade is λ, r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (101) below using three-dimensional coordinate values indicated in said table 101,

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd), $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = D/2 \\ b = 0 \\ c = \lambda \\ d\text{: optional} \\ h = e_u \geqq e_d \\ f_u \geqq f_d\text{: optional} \end{array}\right\} \quad (101)$$

the surface of the blade of said propeller fan being configured by a curved surface defined by said ($r_1$, $\theta_1$, $z_{1u}$) and said ($r_1$, $\theta_1$, $z_{1d}$).

19. A die for molding the propeller fan, wherein
a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (101) recited in claim 18.

20. The propeller fan according to claim 16, wherein
when a diameter of said propeller fan is D, a height in said z direction is h, and the number of blades is n,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (102) below using three-dimensional coordinate values indicated in table 101, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = D/2 \\ b = 0 \\ c = 360/n \\ d\text{: optional} \\ h = e_u \geqq e_d \\ f_u \geqq f_d\text{: optional} \end{array}\right\} \quad (102)$$

the surface of the blade of said propeller fan being configured by a curved surface defined by said ($r_1$, $\theta_1$, $z_{1u}$) and said ($r_1$, $\theta_1$, $z_{1d}$).

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd),

21. A die for molding the propeller fan, wherein
a surface of a portion forming a surface of a blade of said propeller fan in the die is configured by a curved surface defined by the $(r_1, \theta_1, z_{1u})$ and the $(r_1, \theta_1, z_{1d})$ obtained by the transformation formula (102) recited in claim 20.

22. The propeller fan according to claim 16, wherein
when a diameter of said propeller fan is D and a height in said z direction is h,
r, θ, z coordinates $(r_1, \theta_1, z_{1u})$ defining a surface on a suction side of said blade and r, θ, z coordinates $(r_1, \theta_1, z_{1d})$ defining a surface on a blowing side of said blade are obtained by a transformation formula (103) below using three-dimensional coordinate values indicated in said table 101, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = D/2 \\ b = 0 \\ c = \dfrac{2400}{7} \times \dfrac{h}{D} \\ d\text{: optional} \\ h = e_u \geqq e_d \\ f_u \geqq f_d\text{: optional} \end{array}\right\} \quad (103)$$

the surface of the blade of said propeller fan being configured by a curved surface defined by said $(r_1, \theta_1, z_{1u})$ and said $(r_1, \theta_1, z_{1d})$.

23. A die for molding a propeller fan, wherein
a surface of a portion forming a surface of a blade of said propeller fan in the die is configured by a curved surface defined by the $(r_1, \theta_1, z_{1u})$ and the $(r_1, \theta_1, z_{1d})$ obtained by the transformation formula (103) recited in claim 22.

24. The propeller fan according to claim 16, wherein
said propeller fan comprises a boss portion, and
when a diameter of said propeller fan is D, a boss ratio which is a ratio of the diameter of said propeller fan to a diameter of said boss portion is v, a height in said z direction is h, and an expansion angle of said blade is λ,
r, θ, z coordinates $(r_1, \theta_1, z_{1u})$ defining a surface on a suction side of said blade and r, θ, z coordinates $(r_1, \theta_1, z_{1d})$ defining a surface on a blowing side of said blade are obtained by a transformation formula (104) below using three-dimensional coordinate values indicated in said table 101, It is certified that error appears in the above-identified patent and that said Letters Patent is hereby corrected as shown below:

Columns 253-272 (cont'd), $$\left.\begin{array}{l} r_1 = a \times r + b \ (mm) \\ \theta_1 = c \times \theta + d \ (deg) \\ z_{1u} = e_u \times z_u + f_u \ (mm) \\ z_{1d} = e_d \times z_d + f_d \ (mm) \\ (a,\ c,\ e_u,\ e_d\text{: factor of proportionality, } b,\ d,\ f_u,\ f_d\text{: constant}) \\ \text{wherein} \\ a = \frac{20}{29}D(1-v) \\ b = -\frac{20}{29}D(1-v) \times 0.275 + \frac{vD}{2} \\ c = \lambda \\ d\text{: optional} \\ h = e_u \geqq e_d \\ f_u \geqq f_d\text{: optional} \end{array}\right\} \quad (104)$$

the surface of the blade of said propeller fan being configured by a curved surface defined by said ($r_1$, $\theta_1$, $z_{1u}$) and said ($r_1$, $\theta_1$, $z_{1d}$).

25. A die for molding a propeller fan, wherein a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (104) recited in claim 24.

26. The propeller fan according to claim 16, wherein
said propeller fan comprises a boss portion, and
when a diameter of said propeller fan is D, a boss ratio which is a ratio of the diameter of said propeller fan to a diameter of said boss portion is v, a height in said z direction is h, and the number of blades is n,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by the transformation formula (105) below using three-dimensional coordinate values indicated in said table 101, $$\left.\begin{array}{l} r_1 = a \times r + b \ (mm) \\ \theta_1 = c \times \theta + d \ (deg) \\ z_{1u} = e_u \times z_u + f_u \ (mm) \\ z_{1d} = e_d \times z_d + f_d \ (mm) \\ (a,\ c,\ e_u,\ e_d\text{: factor of proportionality, } b,\ d,\ f_u,\ f_d\text{: constant}) \\ \text{wherein} \\ a = \frac{20}{29}D(1-v) \\ b = -\frac{20}{29}D(1-v) \times 0.275 + \frac{vD}{2} \\ c = 360/n \\ d\text{: optional} \\ h = e_u \geqq e_d \\ f_u \geqq f_d\text{: optional} \end{array}\right\} \quad (105)$$

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

<u>Columns 253-272 (cont'd),</u> the surface of the blade of said propeller fan being configured by a curved surface defined by said ($r_1$, $\theta_1$, $z_{1u}$) and said ($r_1$, $\theta_1$, $z_{1d}$).

27. A die for molding a propeller fan, wherein
a surface of the portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (105) recited in claim 26.

28. The propeller fan according to claim 16, wherein
said propeller fan comprises a boss portion,
when a diameter of said propeller fan is D, a boss ratio which is a ratio of the diameter of said propeller fan to a diameter of said boss portion is v, and a height in said z direction is h,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (106) below using three-dimensional coordinate values indicated in said table 101, $$\left.\begin{array}{l}
r_1 = a \times r + b \text{ (mm)} \\
\theta_1 = c \times \theta + d \text{ (deg)} \\
z_{1u} = e_u \times z_u + f_u \text{ (mm)} \\
z_{1d} = e_d \times z_d + f_d \text{ (mm)} \\
(a, c, e_u, e_d\text{: factor of proportionality, } b, d, f_u, f_d\text{: constant}) \\
\text{wherein} \\
a = \frac{20}{29} D(1-v) \\
b = -\frac{20}{29} D(1-v) \times 0.275 + \frac{vD}{2} \\
c = \frac{2400}{7} \times \frac{h}{D} \\
d\text{: optional} \\
h = e_u \geqq e_d \\
f_u \geqq f_d\text{: optional}
\end{array}\right\} \quad (106)$$

the surface of the blade of said propeller fan being configured by a curved surface defined by said ($r_1$, $\theta_1$, $z_{1u}$) and said ($r_1$, $\theta_1$, $z_{1d}$).

29. A die for molding a propeller fan, wherein
a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (106) recited in claim 28.

30. A fluid feeding device, comprising:
a blower having a propeller fan recited in any one of claims 16, 18, 20, 22, 24, 26 and 28, and a drive motor driving the propeller fan.

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd),

31. A propeller fan, comprising:
when coordinates in a cylindrical coordinate system having a z axis as a rotation axis of the propeller fan are (r, θ, z),
a curved shape defined by a r coordinate value, a θ coordinate value and a z coordinate value indicated in table 201 below is determined as a base shape of a surface of a blade of said propeller fan,
the surface of the blade of said propeller fan being configured by a curved surface obtained by enlarging or reducing said base shape in at least one of r, θ and z directions, said table 201 defined as follows:

| r \ θ | 0.042 | 0.083 | 0.125 | 0.167 | 0.208 | 0.25 | 0.292 | 0.333 | 0.375 | 0.417 | 0.458 | 0.5 | 0.542 | 0.583 | 0.625 | 0.667 | 0.708 | 0.75 | 0.792 | 0.833 | 0.875 | 0.917 | 0.958 | 1 |
|---|---|---|---|---|---|---|---|---|---|---|---|---|---|---|---|---|---|---|---|---|---|---|---|---|
| 0.3 | | | 0.191 | 0.217 | 0.241 | 0.264 | 0.288 | 0.311 | 0.333 | 0.355 | 0.376 | 0.395 | 0.414 | 0.432 | 0.447 | 0.460 | 0.468 | 0.468 | | | | | | |
| | | | 0.168 | 0.184 | 0.200 | 0.218 | 0.233 | 0.249 | 0.267 | 0.285 | 0.304 | 0.324 | 0.343 | 0.362 | 0.381 | 0.400 | 0.421 | 0.445 | | | | | | |
| 0.35 | | 0.147 | 0.181 | 0.212 | 0.242 | 0.270 | 0.297 | 0.322 | 0.346 | 0.370 | 0.392 | 0.413 | 0.433 | 0.450 | 0.461 | 0.465 | | | | | | | | |
| | | 0.127 | 0.150 | 0.173 | 0.196 | 0.218 | 0.241 | 0.264 | 0.287 | 0.311 | 0.334 | 0.356 | 0.377 | 0.399 | 0.421 | 0.445 | | | | | | | | |
| 0.4 | 0.088 | 0.133 | 0.172 | 0.208 | 0.242 | 0.274 | 0.304 | 0.332 | 0.359 | 0.385 | 0.409 | 0.432 | 0.453 | 0.470 | 0.482 | 0.485 | | | | | | | | |
| | 0.076 | 0.110 | 0.141 | 0.171 | 0.199 | 0.227 | 0.254 | 0.280 | 0.307 | 0.332 | 0.357 | 0.380 | 0.403 | 0.424 | 0.447 | 0.471 | | | | | | | | |
| 0.45 | 0.070 | 0.118 | 0.162 | 0.203 | 0.241 | 0.277 | 0.311 | 0.343 | 0.373 | 0.401 | 0.427 | 0.452 | 0.475 | 0.495 | 0.510 | 0.517 | | | | | | | | |
| | 0.055 | 0.097 | 0.136 | 0.171 | 0.204 | 0.236 | 0.266 | 0.295 | 0.324 | 0.351 | 0.377 | 0.402 | 0.428 | 0.448 | 0.471 | 0.495 | | | | | | | | |
| 0.5 | 0.042 | 0.100 | 0.151 | 0.198 | 0.241 | 0.281 | 0.319 | 0.354 | 0.386 | 0.417 | 0.446 | 0.473 | 0.499 | 0.522 | 0.541 | 0.556 | 0.561 | | | | | | | |
| | 0.033 | 0.083 | 0.130 | 0.171 | 0.209 | 0.244 | 0.277 | 0.308 | 0.339 | 0.368 | 0.307 | 0.424 | 0.449 | 0.473 | 0.497 | 0.521 | 0.549 | | | | | | | |
| 0.55 | 0.010 | 0.079 | 0.139 | 0.192 | 0.240 | 0.284 | 0.325 | 0.364 | 0.399 | 0.432 | 0.463 | 0.493 | 0.521 | 0.547 | 0.571 | 0.591 | 0.605 | | | | | | | |
| | 0.007 | 0.066 | 0.120 | 0.168 | 0.211 | 0.250 | 0.286 | 0.320 | 0.352 | 0.383 | 0.414 | 0.443 | 0.471 | 0.498 | 0.523 | 0.549 | 0.576 | | | | | | | |
| 0.6 | | 0.056 | 0.123 | 0.182 | 0.235 | 0.283 | 0.328 | 0.370 | 0.409 | 0.445 | 0.478 | 0.511 | 0.541 | 0.570 | 0.597 | 0.622 | 0.642 | 0.655 | | | | | | |
| | | 0.046 | 0.106 | 0.161 | 0.209 | 0.254 | 0.294 | 0.331 | 0.366 | 0.399 | 0.431 | 0.462 | 0.492 | 0.521 | 0.549 | 0.576 | 0.603 | 0.632 | | | | | | |
| 0.65 | | 0.028 | 0.102 | 0.168 | 0.227 | 0.279 | 0.327 | 0.372 | 0.413 | 0.452 | 0.489 | 0.525 | 0.558 | 0.590 | 0.620 | 0.648 | 0.673 | 0.694 | 0.707 | | | | | |
| | | 0.023 | 0.093 | 0.156 | 0.213 | 0.263 | 0.306 | 0.349 | 0.387 | 0.423 | 0.456 | 0.488 | 0.519 | 0.548 | 0.578 | 0.604 | 0.631 | 0.659 | 0.689 | | | | | |
| 0.7 | | | 0.082 | 0.156 | 0.221 | 0.279 | 0.330 | 0.377 | 0.420 | 0.461 | 0.500 | 0.537 | 0.573 | 0.607 | 0.640 | 0.671 | 0.700 | 0.726 | 0.747 | 0.761 | | | | |
| | | | 0.074 | 0.147 | 0.210 | 0.266 | 0.315 | 0.360 | 0.402 | 0.442 | 0.479 | 0.513 | 0.546 | 0.578 | 0.607 | 0.634 | 0.661 | 0.688 | 0.715 | 0.745 | | | | |
| 0.75 | | | 0.058 | 0.140 | 0.212 | 0.277 | 0.334 | 0.386 | 0.432 | 0.475 | 0.516 | 0.556 | 0.594 | 0.630 | 0.664 | 0.696 | 0.726 | 0.754 | 0.780 | 0.801 | 0.816 | | | |
| | | | 0.051 | 0.130 | 0.200 | 0.263 | 0.318 | 0.368 | 0.413 | 0.455 | 0.495 | 0.533 | 0.570 | 0.605 | 0.638 | 0.668 | 0.696 | 0.721 | 0.746 | 0.771 | 0.800 | | | |
| 0.8 | | | | 0.123 | 0.204 | 0.276 | 0.339 | 0.395 | 0.446 | 0.492 | 0.536 | 0.576 | 0.616 | 0.654 | 0.691 | 0.725 | 0.756 | 0.785 | 0.813 | 0.837 | 0.856 | 0.871 | | |
| | | | | 0.113 | 0.191 | 0.260 | 0.320 | 0.375 | 0.425 | 0.471 | 0.514 | 0.554 | 0.594 | 0.632 | 0.667 | 0.700 | 0.730 | 0.758 | 0.785 | 0.807 | 0.828 | 0.854 | | |
| 0.85 | | | | 0.108 | 0.197 | 0.275 | 0.342 | 0.402 | 0.456 | 0.506 | 0.552 | 0.595 | 0.637 | 0.678 | 0.717 | 0.754 | 0.788 | 0.817 | 0.844 | 0.869 | 0.893 | 0.912 | 0.925 | |
| | | | | 0.098 | 0.183 | 0.257 | 0.322 | 0.381 | 0.434 | 0.483 | 0.529 | 0.573 | 0.615 | 0.656 | 0.695 | 0.731 | 0.764 | 0.792 | 0.817 | 0.842 | 0.865 | 0.886 | 0.906 | |
| 0.9 | | | | 0.087 | 0.188 | 0.272 | 0.345 | 0.408 | 0.465 | 0.517 | 0.560 | 0.612 | 0.666 | 0.698 | 0.740 | 0.780 | 0.816 | 0.848 | 0.876 | 0.901 | 0.923 | 0.943 | 0.959 | 0.971 |
| | | | | 0.081 | 0.175 | 0.255 | 0.325 | 0.387 | 0.443 | 0.494 | 0.543 | 0.589 | 0.634 | 0.677 | 0.719 | 0.759 | 0.794 | 0.825 | 0.853 | 0.878 | 0.897 | 0.918 | 0.937 | 0.954 |
| 0.95 | | | | | 0.175 | 0.269 | 0.347 | 0.414 | 0.473 | 0.528 | 0.578 | 0.626 | 0.672 | 0.717 | 0.760 | 0.801 | 0.840 | 0.874 | 0.904 | 0.929 | 0.951 | 0.969 | 0.985 | 0.996 |
| | | | | | 0.166 | 0.255 | 0.330 | 0.395 | 0.453 | 0.507 | 0.557 | 0.606 | 0.653 | 0.698 | 0.742 | 0.783 | 0.822 | 0.856 | 0.885 | 0.910 | 0.932 | 0.951 | 0.969 | 0.986 |

BOSS RATIO $\nu = 0.275$

TABLE 201

32. A die for molding a propeller fan, wherein
a surface of a portion forming a surface of a blade of said propeller fan in the die is configured by a curved surface obtained by enlarging or reducing the base shape according to claim 31 in at least one of r, θ and z directions.

33. The propeller fan according to claim 31, wherein
when a diameter of said propeller fan is D, a height in said z direction is h and an expansion angle of said blade is λ,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (201) below using three-dimensional coordinate values indicated in said table 201,

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd), $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = D/2 \\ b = 0 \\ c = \lambda \\ d\text{: optional} \\ h = e_u \geqq e_d \\ f_u \geqq f_d\text{: optional} \end{array}\right\} \quad (201)$$

the surface of the blade of said propeller fan being configured by a curved surface defined by said $(r_1, \theta_1, z_{1u})$ and said $(r_1, \theta_1, z_{1d})$.

34. A die for molding a propeller fan, wherein
a surface of a portion forming a surface of a blade of said propeller fan in the die is configured by a curved surface defined by $(r_1, \theta_1, z_{1u})$ and the $(r_1, \theta_1, z_{1d})$ obtained by the transformation formula (201) recited in claim 33.

35. The propeller fan according to claim 31, wherein
when a diameter of said propeller fan is D, a height in said z direction is h, and the number of blades is n,
r, θ, z coordinates $(r_1, \theta_1, z_{1u})$ defining a surface on a suction side of said blade and r, θ, z coordinates $(r_1, \theta_1, z_{1d})$ defining a surface on a blowing side of said blade are obtained by a transformation formula (202) below using three-dimensional coordinate values indicated in said table 201, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality, } b,\ d,\ f_u,\ f_d\text{: constant}) \\ \text{wherein} \\ a = D/2 \\ b = 0 \\ c = 360/n \\ d\text{: optional} \\ h = e_u \geqq e_d \\ f_u \geqq f_d\text{: optional} \end{array}\right\} \quad (202)$$

the surface of the blade of said propeller fan being configured by a curved surface defined by said $(r_1, \theta_1, z_{1u})$ and said $(r_1, \theta_1, z_{1d})$.

It is certified that error appears in the above-identified patent and that said Letters Patent is hereby corrected as shown below:

Columns 253-272 (cont'd),

36. A die for molding a propeller fan, wherein
a surface of a portion forming a surface of a blade of said propeller fan is configured by a curved surface defined by the ($r_1$, $\theta_1$, $z_{1u}$) and the ($r_1$, $\theta_1$, $z_{1d}$) obtained by the transformation formula (202) recited in claim 35.

37. The propeller fan according to claim 31, wherein
when a diameter of said propeller fan is D and a height in said z direction is h,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (203) below using three-dimensional coordinate values indicated in said table 201, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a,\ c,\ e_u,\ e_d\text{: factor of proportionality } b,\ d,\ f_u,\ f_d\text{: constant}) \\ \text{wherein} \\ a = D/2 \\ b = 0 \\ c = \dfrac{2400}{7} \times \dfrac{h}{D} \\ d\text{: optional} \\ h = e_u \geqq e_d \\ f_u \geqq f_d\text{: optional} \end{array}\right\} \quad (203)$$

the surface of the blade of said propeller fan being configured by a curved surface defined by said ($r_1$, $\theta_1$, $z_{1u}$) and said ($r_1$, $\theta_1$, $z_{1d}$).

38. A die for molding a propeller fan, wherein
a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (203) recited in claim 37.

39. (currently amended) The propeller fan according to claim 31, wherein
said propeller fan comprises a boss portion, and
when a diameter of said propeller fan is D, a boss ratio which is a ratio of the diameter of said propeller fan to a diameter of said boss portion is v, a height in said z direction is h, and an expansion angle of said blade is λ,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (204) below using three-dimensional coordinate values indicated in said table 201,

UNITED STATES PATENT AND TRADEMARK OFFICE
CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd), $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = \frac{20}{29} D(1-v) \\ b = -\frac{20}{29} D(1-v) \times 0.275 + \frac{vD}{2} \\ c = \lambda \\ d\text{: optional} \\ h = e_u \geqq e_d \\ f_u \geqq f_d\text{: optional} \end{array}\right\} \quad (204)$$

the surface of the blade of said propeller fan being configured by a curved surface defined by said ($r_1$, $\theta_1$, $z_{1u}$) and said ($r_1$, $\theta_1$, $z_{1d}$).

40. A die for molding a propeller fan, wherein
a surface of a portion forming a surface of a blade of said propeller fan in the die is configured by a curved surface defined by the ($r_1$, $\theta_1$, $z_{1u}$) and the ($r_1$, $\theta_1$, $z_{1d}$) obtained by the transformation formula (204) recited in claim 39.

41. The propeller fan according to claim 31, wherein
said propeller fan comprises a boss portion, and
when a diameter of said propeller fan is D, a boss ratio which is a ratio of the diameter of said propeller fan to a diameter of said boss portion is v, a height in said z direction is h, and the number of blades is n,
r, θ, z coordinates ($r_1$, $\theta_1$, $z_{1u}$) defining a surface on a suction side of said blade and r, θ, z coordinates ($r_1$, $\theta_1$, $z_{1d}$) defining a surface on a blowing side of said blade are obtained by a transformation formula (205) below using three-dimensional coordinate values indicated in said table 201, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = \frac{20}{29} D(1-v) \\ b = -\frac{20}{29} D(1-v) \times 0.275 + \frac{vD}{2} \\ c = 360/n \\ d\text{: optional} \\ h = e_u \geqq e_d \\ f_u \geqq f_d\text{: optional} \end{array}\right\} \quad (205)$$

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd), the surface of the blade of said propeller fan being configured by a curved surface defined by said $(r_1, \theta_1, z_{1u})$ and said $(r_1, \theta_1, z_{1d})$.

42. A die for molding a propeller fan, wherein
a surface of a portion forming a surface of a blade of said propeller fan in the die is configured by a curved surface defined by the $(r_1, \theta_1, z_{1u})$ and the $(r_1, \theta_1, z_{1d})$ obtained by the transformation formula (205) recited in claim 41.

43. The propeller fan according to claim 31, wherein
said propeller fan comprises a boss portion, and
when a diameter of said propeller fan is D, a boss ratio which is a ratio of the diameter of said propeller fan to a diameter of said boss portion is v, and a height in said z direction is h,
r, θ, z coordinates $(r_1, \theta_1, z_{1u})$ defining a surface on a suction side of said blade and r, θ, z coordinates $(r_1, \theta_1, z_{1d})$ defining a surface on a blowing side of said blade are obtained by a transformation formula (206) below using three-dimensional coordinate values indicated in said table 201, $$\left.\begin{array}{l} r_1 = a \times r + b \text{ (mm)} \\ \theta_1 = c \times \theta + d \text{ (deg)} \\ z_{1u} = e_u \times z_u + f_u \text{ (mm)} \\ z_{1d} = e_d \times z_d + f_d \text{ (mm)} \\ (a, c, e_u, e_d\text{: factor of proportionality, } b, d, f_u, f_d\text{: constant}) \\ \text{wherein} \\ a = \frac{20}{29} D(1-v) \\ b = -\frac{20}{29} D(1-v) \times 0.275 + \frac{vD}{2} \\ c = \frac{2400}{7} \times \frac{h}{D} \\ d\text{: optional} \\ h = e_u \geqq e_d \\ f_u \geqq f_d\text{: optional} \end{array}\right\} \quad (206)$$

the surface of the blade of said propeller fan being configured by a curved surface defined by said $(r_1, \theta_1, z_{1u})$ and said $(r_1, \theta_1, z_{1d})$.

44. A die for molding a propeller fan, wherein
a surface of a portion forming a surface of a blade of said propeller fan in the die is configured by a curved surface defined by the $(r_1, \theta_1, z_{1u})$ and the $(r_1, \theta_1, z_{1d})$ obtained by the transformation formula (206) recited in claim 43.

UNITED STATES PATENT AND TRADEMARK OFFICE

CERTIFICATE OF CORRECTION

PATENT NO. : 6,688,848 B2
DATED : February 10, 2004
INVENTOR(S) : M. Ohtsuka

It is certified that error appears in the above-identified patent and that said Letters Patent is hereby corrected as shown below:

Columns 253-272 (cont'd),

45. A fluid feeding device, comprising:
a blower having a propeller fan recited in any one of claims 31, 33, 35, 37, 39, 41 and 43, and a drive motor driving the propeller fan.

Signed and Sealed this

Eleventh Day of April, 2006

JON W. DUDAS
*Director of the United States Patent and Trademark Office*